US008788655B2

(12) United States Patent
Dare et al.

(10) Patent No.: US 8,788,655 B2

(45) Date of Patent: Jul. 22, 2014

(54) SYSTEMS FOR ACCEPTING AND APPROVING APPLICATIONS AND METHODS OF OPERATION OF SAME

(75) Inventors: Robert M. Dare, Sunrise, FL (US); Vadim Kacherov, Boca Raton, FL (US); Paul Krzyzanowski, Flemington, NJ (US); Daniel Gittleman, Delray Beach, FL (US)

(73) Assignee: OpenPeak Inc., Boca Raton, FL (US)

( * ) Notice: Subject to any disclaimer, the term of this patent is extended or adjusted under 35 U.S.C. 154(b) by 0 days.

(21) Appl. No.: 13/179,510

(22) Filed: Jul. 9, 2011

(65) Prior Publication Data

US 2012/0036220 A1 Feb. 9, 2012

Related U.S. Application Data

(63) Continuation-in-part of application No. 12/639,139, filed on Dec. 16, 2009.

(60) Provisional application No. 61/139,090, filed on Dec. 19, 2008.

(51) Int. Cl.

| | |
|---|---|
| ***G06F 15/173*** | (2006.01) |
| ***H04L 12/66*** | (2006.01) |
| ***G06F 9/445*** | (2006.01) |
| *G06F 15/16* | (2006.01) |
| *G06F 17/00* | (2006.01) |

(52) U.S. Cl.

CPC ........................................ *G06F 8/61* (2013.01)

USPC ........... 709/224; 370/352; 709/203; 709/223; 726/1

(58) Field of Classification Search

None

See application file for complete search history.

(56) References Cited

U.S. PATENT DOCUMENTS

| | | | |
|---|---|---|---|
| 5,265,951 | A | 11/1993 | Kumar |
| 5,294,782 | A | 3/1994 | Kumar |
| 5,357,585 | A | 10/1994 | Kumar |
| 5,381,348 | A | 1/1995 | Ernst et al. |
| 5,386,106 | A | 1/1995 | Kumar |

(Continued)

FOREIGN PATENT DOCUMENTS

| | | | |
|---|---|---|---|
| WO | 2010080498 | A1 | 7/2010 |
| WO | 2010080500 | A1 | 7/2010 |

(Continued)

OTHER PUBLICATIONS

International Search Report in Int'l Patent Application No. PCT/US11/38184, mailed Aug. 26, 2011.

(Continued)

*Primary Examiner* — Wen-Tai Lin

(57) ABSTRACT

A managed services platform and method of operation of same are described herein. The platform can include a device management service (DMS) server in which the DMS server can act as a gateway for communications with one or more computing devices, and the computing devices are associated with a first entity. The platform can also include an application service (AS) server in which the AS server is communicatively coupled with the DMS server. When a first computing device contacts the DMS server, the DMS server is operable to provide a bundle to the first computing device. As an example, the bundle contains content that at least includes one or more configuration messages and an application set that contains one or more predefined applications. The content of the bundle can be determined at least in part by the first entity.

61 Claims, 157 Drawing Sheets

(56) References Cited

U.S. PATENT DOCUMENTS

| | | | |
|---|---|---|---|
| 5,484,989 | A | 1/1996 | Kumar et al. |
| 5,489,001 | A | 2/1996 | Yang |
| 5,489,773 | A | 2/1996 | Kumar |
| 5,519,783 | A | 5/1996 | Kumar |
| 5,521,369 | A | 5/1996 | Kumar |
| 5,548,477 | A | 8/1996 | Kumar et al. |
| 5,548,478 | A | 8/1996 | Kumar et al. |
| 5,616,906 | A | 4/1997 | Kumar |
| 5,632,373 | A | 5/1997 | Kumar et al. |
| 5,638,257 | A | 6/1997 | Kumar et al. |
| 5,648,760 | A | 7/1997 | Kumar |
| 5,696,496 | A | 12/1997 | Kumar |
| 5,708,560 | A | 1/1998 | Kumar et al. |
| 5,872,699 | A | 2/1999 | Nishii et al. |
| 5,902,991 | A | 5/1999 | Kumar |
| 5,925,873 | A | 7/1999 | Kumar |
| 6,023,721 | A | 2/2000 | Cummings |
| 6,027,021 | A | 2/2000 | Kumar |
| 6,072,401 | A | 6/2000 | Kumar |
| 6,084,769 | A | 7/2000 | Moore et al. |
| 6,104,451 | A | 8/2000 | Matsuoka et al. |
| 6,151,606 | A | 11/2000 | Mendez |
| 6,181,553 | B1 | 1/2001 | Cipolla et al. |
| 6,223,815 | B1 | 5/2001 | Shibasaki |
| 6,266,539 | B1 | 7/2001 | Pardo |
| 6,276,448 | B1 | 8/2001 | Maruno |
| 6,449,149 | B1 | 9/2002 | Ohashi et al. |
| 6,457,030 | B1 | 9/2002 | Adams et al. |
| 6,647,103 | B2 | 11/2003 | Pinard et al. |
| 6,674,640 | B2 | 1/2004 | Pokharna et al. |
| 6,708,221 | B1 | 3/2004 | Mendez et al. |
| 6,769,022 | B1 | 7/2004 | DeKoning et al. |
| 6,952,617 | B1 | 10/2005 | Kumar |
| 6,952,671 | B1 | 10/2005 | Kolesnik et al. |
| 7,039,041 | B2 | 5/2006 | Robohm et al. |
| 7,058,088 | B2 | 6/2006 | Tomita et al. |
| 7,120,462 | B2 | 10/2006 | Kumar |
| 7,130,193 | B2 | 10/2006 | Hirafuji et al. |
| 7,149,543 | B2 | 12/2006 | Kumar |
| 7,236,770 | B2 | 6/2007 | Sankaramanchi |
| 7,243,163 | B1 | 7/2007 | Friend et al. |
| 7,275,073 | B2 | 9/2007 | Ganji et al. |
| 7,301,767 | B2 | 11/2007 | Takenoshita et al. |
| 7,447,799 | B2 | 11/2008 | Kushner |
| 7,574,177 | B2 | 8/2009 | Tupman et al. |
| 7,574,200 | B2 | 8/2009 | Hassan et al. |
| 7,577,462 | B2 | 8/2009 | Kumar |
| 7,620,001 | B2 | 11/2009 | Ganji |
| 7,620,392 | B1 | 11/2009 | Maurya et al. |
| 7,627,343 | B2 | 12/2009 | Fadell et al. |
| 7,688,952 | B2 | 3/2010 | Light et al. |
| 7,702,322 | B1 | 4/2010 | Maurya et al. |
| 7,778,035 | B2 | 8/2010 | Huang et al. |
| 7,788,382 | B1 | 8/2010 | Jones et al. |
| 7,823,214 | B2 | 10/2010 | Rubinstein et al. |
| 7,869,789 | B2 | 1/2011 | Hassan et al. |
| 7,885,645 | B2 | 2/2011 | Postma et al. |
| 7,890,091 | B2 | 2/2011 | Puskoor et al. |
| 7,970,386 | B2 | 6/2011 | Bhat et al. |
| 8,000,736 | B2 | 8/2011 | Forstall et al. |
| 8,010,701 | B2 | 8/2011 | Wilkinson et al. |
| 8,012,219 | B2 | 9/2011 | Mendez et al. |
| 8,054,211 | B2 | 11/2011 | Vidal |
| 8,060,074 | B2 | 11/2011 | Danford et al. |
| 8,078,157 | B2 | 12/2011 | Maurya et al. |
| 8,086,332 | B2 | 12/2011 | Dorogusker et al. |
| 8,099,090 | B2 | 1/2012 | Postma et al. |
| 8,180,893 | B1 | 5/2012 | Spertus |
| 8,185,149 | B2 | 5/2012 | Forstall et al. |
| 8,249,939 | B2 | 8/2012 | Cue et al. |
| 8,254,902 | B2 | 8/2012 | Bell et al. |
| 8,351,908 | B2 | 1/2013 | Bhat et al. |
| 8,359,016 | B2 | 1/2013 | Lindeman et al. |
| 8,516,446 | B2 | 8/2013 | Williams et al. |
| 8,572,706 | B2 | 10/2013 | Lucovsky et al. |
| 2001/0047363 | A1 | 11/2001 | Peng |
| 2002/0013852 | A1 | 1/2002 | Janik |
| 2002/0131404 | A1* | 9/2002 | Mehta et al. .................. 370/352 |
| 2002/0172336 | A1 | 11/2002 | Postma et al. |
| 2003/0002637 | A1 | 1/2003 | Miyauchi et al. |
| 2003/0090864 | A1 | 5/2003 | Kuo |
| 2003/0130984 | A1 | 7/2003 | Quinlan et al. |
| 2004/0034853 | A1 | 2/2004 | Gibbons et al. |
| 2004/0052343 | A1 | 3/2004 | Glaser et al. |
| 2004/0060687 | A1 | 4/2004 | Moss, II |
| 2004/0078812 | A1 | 4/2004 | Calvert |
| 2004/0098449 | A1 | 5/2004 | Bar-Lavi et al. |
| 2004/0162092 | A1 | 8/2004 | Marsico et al. |
| 2004/0190256 | A1 | 9/2004 | Genova et al. |
| 2005/0131885 | A1 | 6/2005 | Komatsu et al. |
| 2005/0144445 | A1 | 6/2005 | Yeap et al. |
| 2005/0183143 | A1 | 8/2005 | Anderholm et al. |
| 2005/0213331 | A1 | 9/2005 | Lewis |
| 2006/0030341 | A1 | 2/2006 | Pham |
| 2006/0112428 | A1 | 5/2006 | Etelapera |
| 2006/0200658 | A1 | 9/2006 | Penkethman |
| 2006/0277209 | A1 | 12/2006 | Kral et al. |
| 2006/0277311 | A1 | 12/2006 | Franco et al. |
| 2007/0080823 | A1 | 4/2007 | Fu et al. |
| 2007/0093243 | A1 | 4/2007 | Kapadekar et al. |
| 2007/0156870 | A1 | 7/2007 | McCollum |
| 2007/0165654 | A1 | 7/2007 | Chai et al. |
| 2007/0169105 | A1 | 7/2007 | Amberny et al. |
| 2007/0183772 | A1 | 8/2007 | Baldwin et al. |
| 2007/0239878 | A1 | 10/2007 | Bowers et al. |
| 2007/0294380 | A1 | 12/2007 | Natarajan et al. |
| 2008/0070495 | A1 | 3/2008 | Stricklen et al. |
| 2008/0115225 | A1 | 5/2008 | Jogand-Coulomb et al. |
| 2008/0125079 | A1 | 5/2008 | O'Neil et al. |
| 2008/0140969 | A1 | 6/2008 | Lawrence |
| 2008/0201453 | A1 | 8/2008 | Assenmacher |
| 2008/0222621 | A1 | 9/2008 | Knight et al. |
| 2008/0281953 | A1 | 11/2008 | Blaisdell |
| 2009/0150970 | A1 | 6/2009 | Hinds et al. |
| 2010/0005523 | A1 | 1/2010 | Hassan et al. |
| 2010/0077035 | A1 | 3/2010 | Li et al. |
| 2010/0157543 | A1 | 6/2010 | Shohet et al. |
| 2010/0157989 | A1 | 6/2010 | Krzyzanowski et al. |
| 2010/0157990 | A1 | 6/2010 | Krzyzanowski et al. |
| 2010/0159898 | A1 | 6/2010 | Krzyzanowski et al. |
| 2010/0222097 | A1 | 9/2010 | Gisby et al. |
| 2010/0299152 | A1 | 11/2010 | Batchu et al. |
| 2010/0299376 | A1 | 11/2010 | Batchu et al. |
| 2010/0328064 | A1 | 12/2010 | Rogel |
| 2010/0330953 | A1 | 12/2010 | Rogel et al. |
| 2010/0330961 | A1 | 12/2010 | Rogel |
| 2010/0332635 | A1 | 12/2010 | Rogel et al. |
| 2010/0333088 | A1 | 12/2010 | Rogel et al. |
| 2011/0004941 | A1 | 1/2011 | Mendez et al. |
| 2011/0038120 | A1 | 2/2011 | Merz et al. |
| 2011/0058052 | A1 | 3/2011 | Bolton et al. |
| 2011/0082789 | A1 | 4/2011 | Boyd |
| 2011/0082900 | A1 | 4/2011 | Nagpal et al. |
| 2011/0093583 | A1 | 4/2011 | Piemonte et al. |
| 2011/0145932 | A1 | 6/2011 | Nerger et al. |
| 2011/0179483 | A1 | 7/2011 | Paterson et al. |
| 2011/0225252 | A1 | 9/2011 | Bhat et al. |
| 2012/0066223 | A1 | 3/2012 | Schentrup et al. |
| 2012/0070017 | A1 | 3/2012 | Dorogusker et al. |
| 2012/0088481 | A1 | 4/2012 | Postma et al. |
| 2012/0096364 | A1 | 4/2012 | Wilkinson et al. |
| 2012/0096365 | A1 | 4/2012 | Wilkinson et al. |
| 2012/0102564 | A1 | 4/2012 | Schentrup et al. |
| 2012/0102574 | A1 | 4/2012 | Schentrup et al. |
| 2012/0117274 | A1 | 5/2012 | Lydon et al. |
| 2013/0007245 | A1 | 1/2013 | Malik et al. |

(56) References Cited

U.S. PATENT DOCUMENTS

| | | | |
|---|---|---|---|
| 2013/0018792 | A1 | 1/2013 | Casey et al. |
| 2013/0132941 | A1 | 5/2013 | Lindeman et al. |

FOREIGN PATENT DOCUMENTS

| | | | |
|---|---|---|---|
| WO | 2012024418 | A1 | 2/2012 |
| WO | 2012064870 | A2 | 5/2012 |
| WO | 2012064870 | A3 | 7/2012 |

OTHER PUBLICATIONS

A Closer Look at Horizon App Manager Printout from Website: http://www.horizonmanager.com/?page_id=211 Copyright 2011 VMware, Inc.

International Search Report and Written Opinion for International Application No. PCT/US2012/045923 mailed on Oct. 4, 2012, 8 pages.

International Search Report and Written Opinion received for International Application No. PCT/US2011/048109, mailed on Dec. 12, 2011, 10 pages.

International Search Report and Written Opinion received for International Application No. PCT/US2011/060023, mailed on May 25, 2012, 10 pages.

International Search Report received for International Patent Application No. PCT/US2011/51302, mailed Jan. 26, 2012, 2 pages.

International Search Report and Written Opinion for Int'l Appln. No. PCT/US2009/068475, mailed on Apr. 23, 2010, 17 pgs.

International Search Report and Written Opinion for Int'l Appln. No. PCT/US2009/068482, mailed on Feb. 23, 2010, 12 pgs.

Fulton, S.M., "Xerox Goes Up Against RIM in 'BYOD' Mobile Device Management," dated Feb. 22, 2012 [retrieved Mar. 7, 2012] retrieved from the Internet: <http://www.readwriteweb.com/cloud/2012/02/xerox-goes-up-against-rim-in-b.php>, 3 pgs.

Fulton, S.M., "Xerox Goes Up Against RIM in 'BYOD' Mobile Device Management," dated Feb. 22, 2012 [retrieved Aug. 2, 2012] retrieved from the Internet: <http://www.readwriteweb.com/cloud/2012/02/xerox-goes-up-against-rim-in-b.php>, 4 pgs.

Non-Final Rejection for U.S. Appl. No. 13/17,509, Mailed on May 7, 2013, 79 pages.

International Search Report and Written Opinion for International Application No. PCT/US2011/068196 mailed on Jan. 2, 2013, 10 pages.

Non-Final Rejection for U.S. Appl. No. 12/639,139, mailed on Mar. 7, 2012, 7 pages.

Amendment and Reply for Non-Final Rejection for U.S. Appl. No. 12/639,139, dated Aug. 7, 2013, 8 pages.

Final Rejection for U.S. Appl. No. 12/639,139, mailed Sep. 18, 2013, 7 pages.

* cited by examiner

FIG. 1
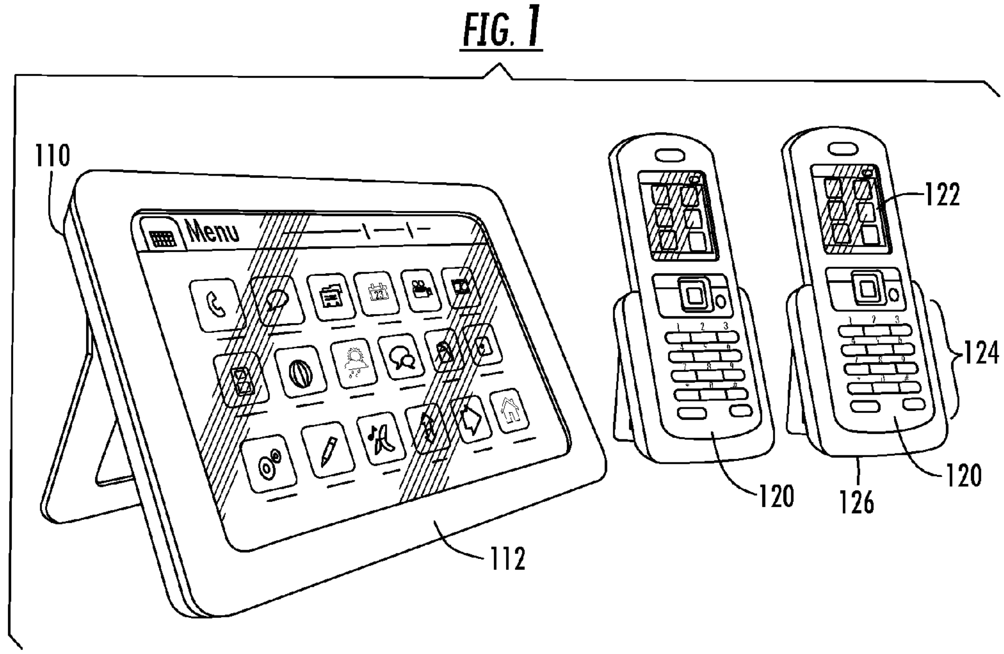
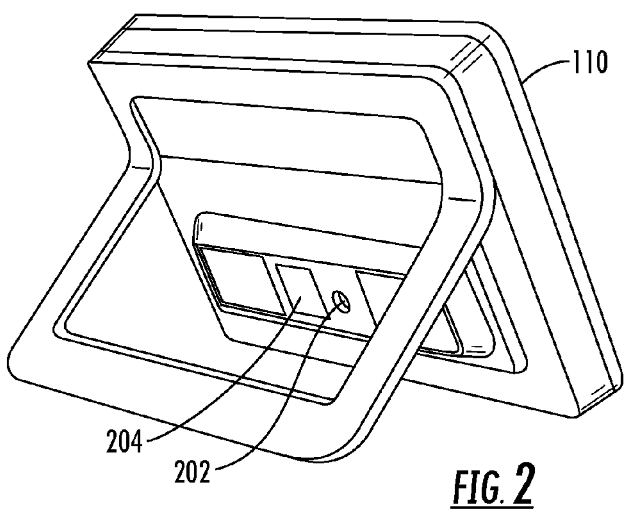
FIG. 2

2500

SYSTEMS FOR ACCEPTING AND APPROVING APPLICATIONS AND METHODS OF OPERATION OF SAME

CROSS-REFERENCE TO RELATED APPLICATIONS

This application is a continuation-in-part of U.S. patent application Ser. No. 12/639,139, filed on Dec. 16, 2009, which claims priority to U.S. Provisional Patent Application No. 61/139,090, filed Dec. 19, 2008, both of which are incorporated by reference herein in their entirety.

FIELD OF THE INVENTION

The present invention relates to systems and methods for managing and offering services to networked devices.

BACKGROUND

The use of applications, commonly referred to as “apps,” has become prevalent over the past few years. To meet this demand, several entities have developed services to enable users of mobile devices to download apps to such devices. For example, Apple, Inc. of Cupertino, Calif. offers an interface to permit apps to be uploaded from app developers and for users to search, select and possibly purchase apps for download to Apple devices. As part of this process, the company offers a software development kit (SDK) to developers for guidance on creating these apps, and the apps must be approved by Apple before being made available to users. In addition, Apple shares with the app developers the revenue that is generated by the downloads. Other companies, such as Google, Inc. of Mountain View, Calif. and Research In Motion, Ltd., of Waterloo, Ontario, Canada, also offer interfaces for developers to create and upload apps and for users to retrieve such software.

Thus, there are multiple companies that offer this service, and it is expected that the number of them doing so will increase. While this recent development has established a new platform for the delivery of software to a wide variety of mobile devices, general oversight of this process is lacking. This aspect can be particularly troublesome in an enterprise setting. For example, a company may be leery of allowing employees to access and download apps from these services onto its work devices because the employer has no control over the process. A similar concern exists in a personal or family environment because a parent will not have any control over his/her child’s activities in this area. In fact, supervisory authorities, like employers and parents, have very little control over mobile devices that are distributed to their subordinates.

SUMMARY

As described herein, telephony and digital media services may be provided to a plurality of locations, such as to a plurality of homes and offices, though the deployment of telephony and digital media services devices to the locations, wherein each device is configured to function as a voice, data and media information center. A services platform in accordance with an embodiment of the present invention enables entities to deploy, manage optimize and monitor a network of such devices in a turnkey fashion.

In accordance with one embodiment of the present invention, the services platform is implemented on one or more computers and includes at least a device monitoring subsystem, a device management subsystem and a user interface. The device monitoring subsystem and the device management subsystem are each communicatively connected to a plurality of devices that provide telephony and digital media services to one or more end users. The device monitoring subsystem is operable to monitor each of the plurality of devices. The device management subsystem is operable to manage each of the plurality of devices. The user interface is communicatively connected to the services platform and is operable to provide access to functionality of at least one of the subsystems.

A managed services platform is also described herein. The platform can include a device management service (DMS) server in which the DMS server acts as a gateway for communications with one or more computing devices and the computing devices are associated with a first entity. The platform can also include an application service (AS) server in which the AS server is communicatively coupled with the DMS server. When a first computing device contacts the DMS server, the DMS server can be operable to provide a bundle to the first computing device. Providing a bundle can mean direct transmission of content to the first device, indirect transmission of content by directing a source to transmit such content to the first device, through messaging the first device to obtain or retrieve content from a source or any combination of these alternatives. In one arrangement, the bundle can contain content that at least includes one or more configuration messages and an application set that contains one or more predefined applications. The content of the bundle is determined at least in part by, for example, the first entity. In another arrangement, the first computing device can include a display, and the configuration messages can cause the display to present graphical user interface (GIU) elements that are associated with the first entity.

As an example, the application set can include a default application set that contains one or more default applications. The default application set can be selected from an application repository that is associated with the first entity. As another example, the application set can include a custom application set that includes one or more custom applications, which can also be from an application repository that is associated with the first entity.

The content of the bundle provided to the first computing device can be based on an identification associated with the first computing device. As an example, the identification associated with the first computing device can be a unique identifier assigned to the first computing device. In addition, the configuration commands or the application set can be provided to the first computing device according to the identification associated with the first computing device. In one arrangement, the identification associated with the first computing device can be related to a performance function of a first intended user of the first computing device such that the configuration commands or the application set that are provided to the first computing device are related to the performance function of the first intended user.

The DMS server can be further operable to provide a second bundle to a second computing device. This second bundle can contain content that at least includes one or more configuration messages and an application set that contains at least predefined applications. The content of the second bundle provided to the second computing device, like the first computing device, can be based on an identification associated with the second computing device such that the configuration messages or the application set are provided to the second computing device according to the identification associated with the second computing device. Also similar to the first computing device, the identification associated with the second computing device can be related to a performance function of a second intended user of the second computing device such that the configuration messages or the application set that are provided to the second computing device are related to the performance function of the second intended user. The performance function of the second intended user may be different from the performance function of an intended user of the first computing device. If so, the content of the bundle provided to the second computing device may be different from the content of the bundle provided to the first computing device.

The DMS server can be further operable to provide a default set of applications and a custom set of applications for both the first computing device and the second computing device. As an example, the default set of applications can be the same for both the first computing device and the second computing device. In contrast, the custom set of applications for the first computing device may be different from the custom set of applications for the second computing device, particularly if the performance functions of the users of such devices are different. The first intended user and the second intended user may be both associated with the first entity, although not necessarily so.

The first computing device can include a DMS client, and the first computing device can contact the DMS server through a consolidated polling technique, although communications between these components are not limited to such an arrangement. In any event, the bundle may be provided to the first computing device through a series of message exchanges using the consolidated polling technique.

In one particular arrangement but without limitation, the DMS server and the AS server can be hosted by a second entity that is distinct from the first entity. The second entity may be a managing entity that is responsible for preparing and providing the bundles according to input from the first entity.

In response to the receipt of the bundle, the first computing device can be provided with access to an application repository that is assigned to and associated with the first entity. The first device can also be provided with access to one or more other application repositories, which may be associated with the first entity or other entities, i.e., second entity, third entity, etc.

The content of the bundle provided to the first computing device can be based on an identification associated with the first computing device, and the DMS server can be further operable to provide a second bundle to the computing device based on the identification associated with the first computing device. For example, a first user and a second user can be both assigned to the first computing device, and the first computing device can provide an identification for both the first user and the second user of the first computing device. The content of the bundle can be arranged for the first user, and the content of the second bundle can be arranged for the second user. As an example, the first user and the second user can both be associated with the first entity.

A method of managing services for a first client is also described herein. The method can include the steps of receiving an activation notice in which the activation notice is from a first computing device that is associated with the first client and in response to the receipt of the activation notice, providing a bundle to the first computing device. The method can also include the steps of maintaining an application repository that is associated with the first client and presenting the application repository to the first computing device based on an identification of the first computing device.

In one embodiment, the bundle can contain content that at least includes one or more configuration messages and an application set that contains one or more predefined applications. The application set can include a default application set or a custom application set, and the default application set can contain one or more default applications from the application repository. In contrast, the custom application set can contain one or more custom applications from the application repository. In another embodiment, the first computing device can include a display, and the configuration messages are arranged to cause the display to present graphical user interface (GUI) elements that are associated with the first client.

As an example, providing the bundle to the first computing device further includes providing the bundle to the first computing device based on the identification of the first computing device. The identification of the first computing device can be related to, for example, a performance function of a first intended user of the first computing device. Thus, providing the bundle to the first computing device further includes providing the bundle to the first computing device such that the content of the bundle is related to the performance function of the first intended user. The bundle provided to the first computing device can include a first default application set or a first custom application set. The first default application set or the first custom application set can be based on the performance function of the first intended user.

The method can further include the step of receiving a second activation notice in which the second activation notice is from a second computing device that is associated with the first client. In response to the receipt of the second activation notice, a second bundle can be provided to the second computing device. The options for providing a second bundle to a second computing device can be similar to that described above in relation to the first computing device. The method can also include the step of presenting the application repository to the second computing device based on an identification of the second computing device.

As an example, providing the second bundle to the second computing device can further include providing the second bundle to the second computing device based on the identification of the second computing device. The identification of the second computing device can be related to a performance function of a second intended user of the second computing device. Moreover, providing the second bundle to the second computing device can further include providing the second bundle to the second computing device such that the content of the second bundle is related to the performance function of the second intended user. The content of the second bundle for the second computing device may be different from the content of the bundle for the first computing device if the performance function of the second intended user is different from the performance function of the first intended user.

In one embodiment, the second bundle provided to the second computing device can include a second default application set or a second custom application set, and the second default application set or the second custom application set can be based on the performance function of the second intended user. The default application set for the second computing device can be the same as the first default application set for the first computing device. Additionally, the second custom application set for the second computing device may be different from the first custom application set if the performance function of the second intended user is different from the performance function of the first intended user. The first intended user and the second intended user may be both associated with the first client, although not necessarily so.

Providing the bundle to the first computing device at least partly comprises providing the bundle to the first computing device through, for example, a series of messages exchanges using a consolidated polling technique. It is understood, however, that other communication methods can be used.

The activation notice can be received by a DMS server and the application repository is maintained by an AS server. The DMS server and the AS server can be hosted by an entity that is different from the first client. As an example, the entity that hosts the DMS server and the AS server can provide the bundle as a service for the first client in which the first client provides input to the entity for the bundle.

The method can also include the step of receiving a second activation notice from the first computing device. In response to the receipt of the second activation notice, a second bundle can be provided to the first computing device. It can be determined that a first user and a second user are both assigned to the first computing device. As such, the bundle can be sent to the first computing device for the first user, and the second bundle can be sent to the second computing device for the second user. The first user can have a first performance function, and the second user can have a second performance function. In one arrangement, the content of the bundle can be related to the first performance function of the first user and the content of the second bundle can be related to the second performance function of the second user. The content of the bundle may be different from the content of the second bundle if the first performance function of the first user is different from the second performance function on the second user. As an example, the first user and the second user may be both associated with the first client, although not necessarily so.

Another managed services platform is described herein. The platform can have a DMS server in which the DMS server is a gateway for communications with one or more computing devices. The computing devices may be associated with a first client. This platform can also include an AS server that is communicatively coupled with the DMS server. When one of the computing devices is activated, the DMS server can be operable to flash the activated first computing device to cause the first computing device to incorporate, for example, a GUI layout that is associated with the first client. The AS server is also operable to maintain an application repository that includes at least applications that are associated with and at least partially determined by the first client. The activated first computing device can be provided with access to these applications.

A second computing device may be activated, and the second computing device can be associated with a second client. The DMS server can be operable to flash the activated second computing device to cause the second computing device to incorporate a GUI layout that is associated with the second client. Further, the AS server can be operable to maintain an application repository that includes at least applications that are associated with and at least partially determined by the second client. The activated second computing device is provided with access to the applications.

In one arrangement, in addition to the first managed services platform, a second managed services platform is described herein. The second platform can include a second DMS server in which the second DMS server can be a gateway for communications with one or more second computing devices and the second computing devices are associated with a second client. The second platform can also include a second AS server that is communicatively coupled with the second DMS server. When one of the second computing devices is activated, the second DMS server can be operable to flash the activated second computing device to cause the second computing device to incorporate a graphical user interface (GUI) layout that is associated with the second client. The second AS server can be operable to maintain a second application repository that includes at least applications that are associated with and at least partially determined by the second client. The activated second computing device can be provided with access to the applications of the second application repository. There can be any suitable number of managed services platforms for servicing any suitable number of portable computing devices. The first managed services platform or the second managed services platform can be hosted by, for example, a managing entity that is distinct from the first client and the second client.

A method of managing services is described herein. The method can include the step of receiving a first activation notice from a first computing device that is associated with a first client. In response to the receipt of the first activation notice, one or more configuration messages can be transmitted, and these messages can be arranged to cause the first computing device to incorporate a GUI layout that is associated with the first client. The method can also include the step of maintaining an application repository that includes at least applications that are associated with and at least partially determined by the first client. The activated first computing device is provided with access to the applications. A second activation notice can be received from a second computing device that is associated with a second client. In response to the receipt of the second activation notice, one or more configuration messages can be transmitted, and the messages can be arranged to cause the second computing device to incorporate a GUI layout that is associated with the second client. The method can also include the step of maintaining another application repository that includes at least applications that are associated with and at least partially determined by the second client. The activated second computing device can be provided with access to the applications.

A computer program product is also described herein. The computer program product can include a computer readable storage medium having stored thereon computer readable program code. When executed by a system including a processor and a memory, the computer readable program code can cause the system to receive an activation notice in which the activation notice is from a first computing device that is associated with the first client. In response to the receipt of the activation notice, the code can cause the system to further provide a bundle to the first computing device and maintain an application repository that is associated with the first client. The code can further cause the system to present the application repository to the first computing device based on an identification of the first computing device.

A portable computing device is also described herein. The device can include a display that is configured to display GUI elements that are associated with a client and a transceiver that is configured to communicate with a managed services platform. The device can also include a processor that is communicatively coupled to both the display and the transceiver. The processor is operable to instruct the transceiver to transmit an activation notice to the managed services platform and in response to the activation notice, receive from the managed services platform a first bundle that is associated with the client and that is arranged to cause the display to display GUI elements that are associated with the client. The first bundle can include predefined applications in which the content of the first bundle can be determined at least in part by the client.

In this context, receiving a first bundle from the managed services platform can refer to several different alternatives.

For example, content of the bundle can be directly received from the managed services platform or indirectly from another component under the direction or assistance of the managed services platform. As another example, the managed services platform can direct the portable computing device to retrieve or obtain content from a source. Content of the bundle can also be delivered to the portable computing device in accordance with any combination of these alternatives or other suitable techniques. In one embodiment, the predefined applications can be selected from an application repository that is associated with the client, although not necessarily so.

The activation notice can include an identification that is unique to the portable computing device. At least some of the content of the first bundle can be based on the identification of the portable computing device. In one arrangement, the identification of the portable computing device can be related to a performance function of an intended user of the portable computing device such that at least some of the content of the first bundle is related to the performance function. In another arrangement, responsive to the receipt of the first bundle, the portable computing device can be configured to gain access to an application repository that is associated with the client.

The processor can be further operable to switch between a first account associated with a first user and a second account associated with a second user. Here, the first bundle can be assigned to the first account, and the processor can be further operable to, in response to a second activation notice associated with the second account, receive a second bundle assigned to the second account. The content of the first bundle assigned to the first account can be related to a first performance function, and the content of the second bundle is related to a second performance function. As an example, the first user and the second user may be both associated with the client.

In one arrangement, the portable computing device can be configured to communicate with the managed services platform through the use of a consolidated polling technique. It is understood however, that other techniques may be employed to effect such a communication.

A method of operating a portable computing device is also described herein. The method can include the steps of transmitting an activation notice to a managed services platform and in response to the activation notice, receiving from the managed services platform a first bundle that is associated with a client. In response to the receipt of the first bundle, GUI elements that are associated with a client can be displayed. The first bundle includes predefined applications, and the content of the first bundle is determined at least in part by the client. As an option, the predefined applications of the first bundle can be from an application repository that is associated with the client.

Transmitting an activation notice to the managed services platform can further include transmitting an identification that is unique to the portable computing device. In addition, at least some of the content of the first bundle can be based on the identification of the portable computing device. In one particular arrangement, the identification of the portable computing device can be related to a performance function of an intended user of the portable computing device such that at least some of the content of the first bundle is related to the performance function. Responsive to the receipt of the first bundle, access to an application repository that is associated with the client can be gained or permitted.

The method can further include the step of switching between a first account associated with a first user and a second account associated with a second user in which the first bundle can be assigned to the first account. In response to a second activation notice associated with the second account, a second bundle can be received in which the second bundle can be assigned to the second account. The content of the first bundle assigned to the first account can be related to a first performance function, and the content of the second bundle can be related to a second performance function. As an example but without limitation, the first user and the second user can be both associated with the client.

In one arrangement, communications with the managed services platform can be conducted through a consolidated polling technique. It is understood, however, that other suitable techniques for communications with the platform are within contemplation here.

Another method of operating a portable computing device is described herein. This method can include the steps of receiving the portable computing device based on an assigned performance function and transmitting an activation notice from the portable computing device to a managed services platform. For example, a company may assign the computing device to one of its employees who has a particular job function, and the employee may then cause an activation notice to be transmitted from the computing device. The method can also include the step of receiving—from the managed services platform—a first bundle that can be associated with a client (e.g., the employee) and that can be related to the assigned performance function. In response to the receipt of the first bundle, GUI elements that are associated with the client can be displayed. As an example, the client may assign the performance function. In addition, the first bundle may include predefined applications, and the content of the first bundle can be determined at least in part by the client based on the performance function.

A computer program product is also described herein. The computer program product can be a computer readable storage medium having stored thereon computer readable program code. When executed by a system including a processor and a memory, the computer readable program code can cause the system to transmit an activation notice to a managed services platform and in response to the activation notice, receive from the managed services platform a first bundle that is associated with a client. In response to the receipt of the first bundle, the program code can also cause the system to display GUI elements that are associated with a client. The first bundle may include predefined applications, and the content of the first bundle can be determined at least in part by the client.

A system for approving applications is also described herein. The system can include a first computing device that can be configured to present a first interface to permit application developers to submit applications for approval for selective publication in a first application repository associated with a first client and a second application repository associated with a second client. The system can also include a second computing device that can be communicatively coupled to the first computing device. The second computing device can be configured to present a second interface to permit the approval of submitted applications for the selective publication in the first application repository and the second application repository. If a submitted application is approved, the second computing device can be configured to notify the first computing device that the submitted application has been approved.

The first computing device can be further configured to enable the upload of applications prior to being submitted for approval. In addition, the first computing device can be further configured to present an uploaded application and information associated with the uploaded application. As an example, the information includes one or more of the following items: an application name; a language type; a category; a version; a rating; a licensing model; or a transaction price. The first computing device can be further configured to enable the selection of the information prior to the uploaded application being submitted for approval. In one arrangement, the first computing device can be further configured to push the uploaded application to or pull the uploaded application from a testing device.

The second computing device can be further configured to enable a user to permit the rejection of a submitted application. In addition, the second computing can be further configured to notify the first computing device when the submitted application has been rejected.

The first computing device can be further configured to present one or more of the submitted applications. In one arrangement, the submitted applications can be assigned a status indicator at the first computing device that provides information as to the stage of review for approval for a submitted application. For example, once an application is submitted for approval, the status indicator can indicate the submitted application as being in a pending state. As another example, once a submitted application is approved for publication, the status indicator can indicate the approved application as being in an approved state. In yet another example, once an approved application is published in either the first application repository or the second application repository, the status indicator can indicate the published application as being in a published state. Conversely, if a submitted application is rejected for approval for publication, the status indicator may indicate the submitted application as being rejected. In addition, if an application has been upgraded, the status indicator may indicate the application as being upgraded. The upgraded application can be a submitted application, a published application or a rejected application.

The first computing device can be further configured to provide performance data relating to a submitted application once the application is published in the first application repository or the second application repository. In addition, the first computing device can be further configured to provide cumulative performance data relating to a plurality of published applications in the first application repository or the second application repository. As an option, the first computing device can be further configured to selectively isolate performance data relating to submitted applications such that access to such performance data is restricted. This can prevent sensitive data from being seen by unauthorized individuals, for example.

The second computing device, in one arrangement, can be further configured to receive the submitted application, and the second interface can enable the selection of an approval indicator or a rejection indicator. If the submitted application is approved, the second computing device may notify the first computing device of the approval of the submitted application upon the selection of the approval indicator. The second computing device can be further configured to notify the first computing device of the rejection of a submitted application upon the selection of the rejection indicator. As another option, the second computing device can be further configured to provide the first computing device with rejection information when notifying the first computing device of the rejection of the submitted application.

The second computing device can be further configured to present the submitted application and to provide information associated with the submitted application. The following items are examples of such information: an application name; a language type; a category; a version; a rating; a licensing model; or a transaction price.

In one arrangement, the second computing device can be further configured to push the submitted application to or pull the submitted application from a testing device. The second computing device can be further configured to notify a third computing device that the submitted application has been approved. The third computing device can be configured to notify operators of the first application repository and the second application repository of the approval of the submitted application.

A method for approving applications is also described herein. The method can include the step of presenting a first interface to permit application developers to submit applications for approval for selective publication in a first application repository associated with a first client and a second application repository associated with a second client. The method can also include the steps of presenting a second interface to permit the approval of submitted applications for the selective publication in the first application repository and the second application repository. If a submitted application is approved, the application developer can be notified that the submitted application has been approved.

The method can further include the steps of enabling the upload of applications prior to being submitted for approval and presenting an uploaded application and information associated with the uploaded application. As an example, the information can include one or more of the following items: an application name; a language type; a category; a version; a rating; a licensing model; or a transaction price. The method can also include the step of enabling the selection of the information prior to the uploaded application being submitted for approval.

One or more of the applications can be tested. As such, the method can include the steps of pushing the uploaded application to a testing device or pulling the uploaded application from a testing device.

In another arrangement, the method can include the steps of enabling a user to permit the rejection of a submitted application and notifying the application developer that the submitted application has been rejected. The method can also include the steps of presenting one or more of the submitted applications and assigning a status indicator to the presented submitted applications. In particular, the status indicator can provide information as to the stage of review for approval for a submitted application. For example, once an application is submitted for approval, assigning a status indicator can include assigning a status indicator to the submitted application that indicates that the application is in a pending state. As another example, once a submitted application is approved for publication, assigning a status indicator can include assigning a status indicator to the approved application that indicates that the application is in an approved state. In yet another example, once an approved application is published in either the first application repository or the second application repository, assigning a status indicator can include assigning a status indicator to the published application that indicates that the application is in a published state.

There are several other examples to consider. Specifically, if a submitted application is rejected for approval for publication, assigning a status indicator can include assigning a status indicator that indicates that the submitted application is in a rejected state. If an application has been upgraded, assigning a status indicator can include assigning a status indicator that indicates that the application is upgraded. The upgraded application can be a submitted application, a published application or a rejected application.

The method can also include the step of providing performance data relating to a submitted application once the application is published in the first application repository or the second application repository. Cumulative performance data relating to a plurality of published applications in the first application repository or the second application repository may also be provided. The method can also include the step of selectively isolating performance data relating to submitted applications such that access to such performance data is restricted.

In one embodiment, the method can include the steps of receiving the submitted application and enabling the selection of an approval indicator or a rejection indicator. As an example, the submitted application may be approved, and a notification of the approval of the submitted application can be provided upon the selection of the approval indicator. As another example, a notification of the rejection of a submitted application can be provided upon the selection of the rejection indicator. Providing a notification of the rejection of the submitted application can include providing rejection information when providing notification of the rejection of the submitted application. The method can further include the steps of presenting a third interface that is configured to indicate that the submitted application has been approved and notifying operators of the first application repository and the second application repository of the approval of the submitted application.

Another method for approving applications is also described herein. The method can include the step of presenting a first interface that is configured to permit an application developer to submit an application for approval for selective publication in a first application repository associated with a first client and in a second application repository associated with a second client. The method can also include the steps of presenting a second interface that is configured to enable the approval of the submitted application, approving the submitted application and notifying the application developer that the submitted application has been approved. The method can also include the step of notifying a managing entity that the submitted application is available for publication in the first application repository that is assigned to and associated with the first client and available for publication in the second application repository that is assigned to and associated with the second client. The term "available for publication" is defined as actually being published or being in a condition that enables publication.

A computing device for accepting applications for selective publication in multiple application repositories is also described herein. The computing device can include a display that is configured to present one or more applications that may be received from an application developer and a processor that can be communicatively coupled to the display. The processor can be operable to receive a publication command for a submitted application and in response to the receipt of the publication command, can cause the transmission of the submitted application to an approval entity for at least possible publication of the submitted application in a first application repository assigned to a first client and in a second application repository assigned to a second client. "At least possible publication" includes actual publication of the application in the first or second application repositories or a condition in which the application is able to be published in the first or second application repositories.

The processor can be further operable to cause the display of performance data relating to the submitted application once the submitted application is published in the first application repository or the second application repository. In addition, the processor can be further operable to receive a notification that the submitted application has been approved for publication in the first application repository or the second application repository.

A method for accepting applications for selective publication in multiple application repositories is also described herein. The method can include the steps of receiving one or more applications and receiving a publication command for a submitted application. The term "publication command" is defined as an indication that an application is to be submitted or has been submitted for approval for publication in an application repository. In response to the receipt of the publication command, the submitted application can be sent to an approval entity for at least possible publication of the submitted application in a first application repository assigned to a first client and in a second application repository assigned to a second client.

The method can also include the step of presenting performance data relating to the submitted application once the submitted application is published in the first application repository or the second application repository. In addition, the method can include the step of receiving a notification that the submitted application has been approved for publication in the first application repository or the second application repository.

A computing device for accepting and approving applications for selective publication in multiple application repositories is also described herein. The device can include a display that is configured to present one or more applications that are submitted for approval and a processor that is communicatively coupled to the display. The processor can be operable to receive an approval command for a submitted application. An "approval command" is defined as an indication that a submitted application meets the requirements for at least possible publication in an application repository. In response to the receipt of the approval command, the processor can be further operable to notify a managing entity that the submitted application is available for publication in a first application repository assigned to a first client and in a second application repository assigned to a second client.

In one arrangement, the computing device is communicatively coupled to a developer computing device and the processor is further operable to notify the developer computing device when the submitted application has been made available for publication in the first client application repository and the second client application repository. In another arrangement, the processor can be further operable to receive a rejection command for a submitted application and in response to the receipt of the rejection command, notify the developer computing device of the rejection of the submitted application.

Yet another method for accepting and approving applications for selective publication in multiple application repositories is described herein. The method can include the steps of presenting one or more applications that are submitted for approval and receiving an approval command for a submitted application. In response to the receipt of the approval command, a managing entity can be notified that the submitted application is available for publication in a first application repository assigned to a first client and in a second application repository assigned to a second client. The method can further include the step of notifying a developer computing device when the submitted application has been made available for publication in the first client application repository and the second client application repository. In another arrangement, the method can include the steps of receiving a rejection command for a submitted application and in response to the receipt of the rejection command, notifying the developer computing device of the rejection of the submitted application.

A computer program product is described herein. The computer program product can include a computer readable storage medium having stored thereon computer readable program code. When executed by a system comprising a processor and a memory, the program code causes the system to receive one or more applications and receive a publication command for a submitted application. The program code can also cause the system to—in response to the receipt of the publication command—send the submitted application to an approval entity for at least possible publication of the submitted application in a first application repository assigned to a first client and in a second application repository assigned to a second client.

Yet another computer program product is described herein. The computer program product can include a computer readable storage medium having stored thereon computer readable program code. When executed by a system comprising a processor and a memory, the program code causes the system to present one or more applications that are submitted for approval and receive an approval command for a submitted application. The program code can also cause the system to—in response to the receipt of the approval command—notify a managing entity that the submitted application is available for publication in a first application repository assigned to a first client and in a second application repository assigned to a second client.

A managed services portal is also described herein in which the portal can include one or more user interface elements that can be configured to enable a user to make selections associated with the management of services for a first client portal and a second client portal. The first client portal can be assigned a first application repository that is associated with the first client portal, and the second client portal can be assigned a second application repository that is associated with the second client portal. The managed services portal can also include a processor that is communicatively coupled to the user interface elements. The processor can be operable to receive a notification of an application that has met an approval threshold, and to cause the presentation of the application. The processor can be further operable to cause the transmission of the availability of the application to the first client portal for publication in the first application repository and to cause the transmission of the availability of the application to the second client portal for publication in the second application repository.

In one arrangement, the managed services portal can be associated with a managing entity, and the managing entity can be assigned a third application repository. The third application repository can be associated with the managed services portal, and the processor can be further operable to cause the publication of the application in the third application repository.

The processor can be further operable to cause the presentation of the application in an available category or an in-house category or to cause the presentation of an application that has not yet met an approval threshold in a pending category. The processor can be further operable to cause the presentation of an application that has been published in a third application repository in a published category. The presentation of the application may include an identification of the application and one or more of the following exemplary, non-limiting parameters: a description of the application; an identification of the developer of the application; a category of the application; a version of the application; a creation date of the application; a most recent update of the application; a rating of the application; a licensing model of the application; a cumulative user rating of the application; or a transactional fee for the application. In one arrangement, the licensing model is selectable from one of the following exemplary, non-limiting arrangements: a free model; a subscription-based model; a floating model; a volume model; or a paid model.

The processor can be further operable to cause the application to be pushed to or pulled from one or more testing devices. In addition, the managed services portal and the testing device can both be associated with a managing entity.

In another arrangement, the processor can be further operable to cause a global addition of the application to a plurality of portable computing devices or a global removal of the application from the plurality of portable computing devices. The managed services portal can be associated with a managing entity, one or more portable computing devices may also be associated with the managing entity, and a display can be one of the user interface elements. In this case, the processor can be further operable to cause the presentation of at least some of the portable computing devices on the display. As an example, the presentation of the portable computing devices can be such that the portable computing devices are segmented into one or more distinct groups. As another example, the managed services portal can also include a searching feature that is configured to enable the portable computing devices to be searched individually or by the groups.

In one embodiment, the processor can be further operable to generate a message for selective transmission to the portable computing devices such that the message can be sent to the portable computing devices on an individual basis, a group basis or a broadcast basis. Also, the presentation of a portable computing device may include a listing of applications that are installed on the portable computing device or that are available for installation on the portable computing device. Further, the processor can be further operable to enable the installation of applications on a portable computing device or the removal of applications on the portable computing device on an individual basis, a group basis or a broadcast basis. The processor can further be operable to enable the management of certificates on the portable computing devices on an individual basis, a group basis or a broadcast basis.

As an example, one of the user interface elements can be a display, and the processor can be further operable to cause an arrangement to be shown on the display. The arrangement may demonstrate an application repository relationship between the managed services portal, the first client portal and the second client portal. In another embodiment, the first client portal can be associated with one or more first sub-client portals or the second client portal can be associated with one or more second sub-client portals. The arrangement can further demonstrate an application repository relationship between the managed services computing portal, the first and second client portals and the first and second sub-client portals, if such sub-client portals exist. As an example, the arrangement that the processor is operable to cause to be shown on the display can be a hierarchical arrangement.

In one embodiment, the processor can be further operable to cause the selective presentation of information relating to an application repository associated with the managed services portal. In addition, the processor can be operable to cause the selective presentation of information relating to an application repository associated with the first client portal, the first sub-client portal, the second client portal or the second sub-client portal.

As an example, the presented information may include at least one of the following: identification of an application repository managing entity and one or more security keys; identification of one or more certificates; or identification of settings or applications. As another example, the settings can include one or more of a VPN setting, a location services setting, an application repository control setting or a firmware setting. The processor can be further operable to cause an editing of the settings, the certificates or the applications. In yet another example, the processor can be further operable to present a schedule rollout option to set a delivery schedule for the editing of the settings, the certificates or the applications.

Delivery of any settings, certificates or applications may be intended for portable computing devices that may be assigned to the application repository associated with the managed services portal. In one arrangement, the settings and the applications may be default settings and default applications. Also, the processor can be further operable to receive a control notification, and in response to the receipt of the control notification, the managed services portal can be operable to control the operation of the first application repository of the first client portal, the second application repository of the second client portal, an application repository of the first sub-client portal or an application repository of the second sub-client portal.

The managed services portal can be operable to control the operation of the first application repository of the first client portal, the application repository of the first sub-client portal, the second application repository of the second client portal and the application repository of the second sub-client portal. This control can be by at least one of causing the publication of the application in the first client portal application repository, the second client portal application repository, the first sub-client portal application repository or the second sub-client portal application repository or causing the selective presentation of information relating to the first client portal application repository, the second client portal application repository, the first sub-client portal application repository or the second sub-client portal application repository.

The processor can be further operable to receive a control notification. In response to the receipt of the control notification, the managed services portal can be operable to provide settings or applications to portable computing devices that are assigned to the first client portal, the second client portal, the first sub-client portal or the second sub-client portal. As an example, the settings and the applications may be default settings and default applications. When the processor receives the control notification, the processor can be further operable to generate messages and cause them to be transmitted to the portable computing devices that are assigned to the first client portal, the second client portal, the first sub-client portal or the second sub-client portal.

One or more portable computing devices may be associated with the first client portal, the first sub-client portal, the second client portal or the second sub-client portal, and the processor can be further operable to receive a control notification. In response to the receipt of the control notification, the processor can be further operable to selectively cause the removal or modification of one or more applications installed on the portable computing devices of the first client portal, the first sub-client portal, the second client portal or the second sub-client portal. In response to the receipt of the control notification, the processor can be further operable to also cause the installation of one or more applications on the portable computing devices of the first client portal, the first sub-client portal, the second client portal or the second sub-client portal. In one arrangement, the processor can be further operable to cause the removal, modification or installation of the applications on an individual basis, a group basis or a global basis.

The managed services portal may be associated with a managing entity, and one or more portable computing devices may be associated with the managing entity. The processor can be further operable to cause the presentation of user identifications that may be associated with the portable computing devices. The portable computing devices that are associated with the managing entity can include portable computing devices that may be assigned to an application repository of the managing entity, portable computing devices that are assigned to application developers who develop applications for the application repository of the managing entity or portable computing devices that are assigned to testing personnel. The processor can be further operable to enable access control to at least some of the portable computing devices that are associated with the user identifications.

One or more portable computing devices may be associated with the first client portal or the second client portal, and the processor can be further operable to receive a control notification. In response to the control notification, the processor can be further operable to cause the presentation of user identifications that are associated with the portable computing devices that are associated with the first client portal or the second client portal.

One or more additional portable computing devices may be associated with the first client portal or the second client portal. The processor can be further operable to cause the presentation of at least some of the portable computing devices associated with the first client portal or the second client portal on the display. The portable computing devices may be presented as available portable computing devices or provisioned portable computing devices. The processor can be further operable to cause an available portable computing device to become a provisioned portable computing device if, for example, the processor receives a control notification.

In yet another embodiment, the processor can be further operable to receive a notification that a firmware update is available for one or more portable computing devices that are associated with the first client portal and to receive a notification that a firmware update is available for one or more portable computing devices that are associated with the second client portal. The processor can be further operable to cause the transmission of the availability of the firmware update for the first client portal portable computing devices to the first client portal and cause the transmission of the availability of the firmware update for the second client portal portable computing devices to the second client portal.

The processor can be further operable to cause the presentation of one or more bundles. As an example, the bundles can be assigned to one or more performance functions, and the bundles can contain information that may be based on their assigned performance function. In addition, the information contained in the bundles can include one or more configuration settings or one or more applications, and the configuration settings and the applications may be arranged based on the assigned performance function. The processor can be further operable to enable the information contained in the bundles to be edited such that the configuration settings or the applications may be modified.

In another embodiment, the bundles may be designated for users associated with a managing entity, and the managed services portal can be associated with the managing entity or the bundles may be associated with the first client portal or the second client portal. The processor can be further operable to enable the managing entity to modify the bundles associated with the first client portal or the second client portal if, for example, the managed services portal has respective authority from the first client portal and the second client portal. In another arrangement, the processor can be further operable to selectively generate a modification signal in response to the information contained in a bundle being edited such that modifications of the configuration settings or the applications may be dynamically effected on one or more portable computing devices that have already received the bundles.

A method for managing services is also described herein. The method can include the step of enabling a user to make selections associated with the management of services for a first client portal and a second client portal. The first client portal can be assigned a first application repository that can be associated with the first client portal, and the second client portal can be assigned a second application repository that can be associated with the second client portal. The method can also include the steps of receiving a notification of an application that has met an approval threshold, presenting the application, transmitting the availability of the application to the first client portal for publication in the first application repository and transmitting the availability of the application to the second client portal for publication in the second application repository.

In one arrangement, enabling the user to make selections associated with the management of services for a first client portal and a second client portal further includes enabling the user to make the selections through a managed services portal that can be associated with a managing entity. The managed services portal can be assigned a third application repository, and the method can further include publishing the application in the third application repository.

As an example, presenting the application further includes presenting the application in an available category, an inhouse category or a published category. The method can also include the step of presenting an application that has not yet met an approval threshold in a pending category. As another example, presenting the application can further include presenting the application in the published category if the application has been published in a third application repository.

Presenting the application can further include presenting an identification of the application and one or more of the following exemplary, non-limiting parameters: a description of the application; an identification of the developer of the application; a category of the application; a version of the application; a creation date of the application; a most recent update of the application; a rating of the application; a licensing model of the application; a cumulative user rating of the application; or a transactional fee for the application. The licensing model can be selectable from one of the following arrangements: a free model; a subscription-based model; a floating model; a volume model; or a paid model.

The method can further include the step of pushing the application to or pulling the application from one or more testing devices. As an example, the testing devices can be associated with a managing entity. The method can also include the steps of performing a global addition of the application to a plurality of portable computing devices or performing a global removal of the application from the plurality of portable computing devices.

One or more portable computing devices can be associated with a managed services portal, and the method can further include presenting at least some of the portable computing devices associated with the managed services portal. Presenting the portable computing devices can further include presenting the portable computing devices such that the portable computing devices are segmented into one or more distinct groups. In another embodiment, the method also includes the steps of presenting a searching feature that is configured to enable searching of the portable computing devices and searching the portable computing devices in accordance with an individual or group basis. The method can further include the steps of generating a message for selective transmission to the portable computing devices and transmitting the message to the portable computing devices on an individual basis, a group basis or a broadcast basis. In another embodiment, presenting the portable computing devices can further include presenting a listing of applications that are installed on a portable computing device or that are available for installation on the portable computing device.

The method can also include the step of enabling the installation of applications on a portable computing device or the removal of applications on the portable computing device on an individual basis, a group basis or a broadcast basis. Similarly, the method can include the step of enabling the management of certificates on the portable computing devices on an individual basis, a group basis or a broadcast basis.

In one embodiment, the method can include the step of displaying an arrangement that demonstrates an application repository relationship between a managed services portal and the first and second client portals. As an example, the managed services portal may oversee the management of services for the first client portal and the second client portal. The first client portal can be associated with one or more first sub-client portals, or the second client portal can be associated with one or more second sub-clients portals. The arrangement can further demonstrate an application repository relationship between the managed services computing device, the first and second client portals and first and second sub-client portals, if such sub-client portals exist. As an example, the arrangement can be in a hierarchical form.

The method can also include the step of selectively presenting information relating to an application repository associated with the managed services portal and the step of selectively presenting information relating to an application repository for the first client portal, the first sub-client portal, the second client portal or the second sub-client portal. As an example, the presented information can include at least one of the following: identification of an application repository managing entity and one or more security keys; identification of one or more certificates; or identification of settings or applications. As another example, the settings can include one or more of a VPN setting, a location services setting, an application repository control setting or a firmware setting.

The method can also include the steps of editing the settings or the applications, and presenting a schedule rollout option to set a delivery schedule for the editing of the settings or the applications. The method may also include the step of delivering settings or applications to portable computing devices that are assigned to the managed services computing device. As an example, the settings and the applications can be default settings and default applications.

In another arrangement, the method can further include the steps of receiving a control notification, and in response to the receipt of the control notification, at least partially controlling the operation of the application repository of the first client portal, the application repository of the second client portal, an application repository of the first sub-client portal or an application repository of the second sub-client portal. In one example, controlling the operation of the application repository of the first client portal, the application repository of the first sub-client portal, the application repository of the second client portal and the application repository of the second sub-client portal is conducted by at least one of causing the publication of the application in the first client portal application repository, the second client portal application repository, the first sub-client portal application repository or the second sub-client portal application repository or causing the selective presentation of information relating to the first client portal application repository, the second client portal application repository, the first sub-client portal application repository or the second sub-client portal application repository.

The method can include the steps of receiving a control notification, and in response to the receipt of the control notification, providing settings or applications to portable computing devices that are assigned to the first client portal, the second client portal, the first sub-client portal or the second sub-client portal. As an example, the settings and the applications are default settings and default applications. When the control notification is received, messages to be delivered to the portable computing devices that are assigned to the first client portal, the second client portal, the first sub-client portal or the second sub-client portal can be generated. The method can further include the step of transmitting the messages to the portable computing devices that are assigned to the first client portal, the second client portal, the first sub-client portal or the second sub-client portal.

One or more portable computing devices are associated with the first client portal, the first sub-client portal, the second client portal or the second sub-client portal, and the method can further include the steps of receiving a control notification, and in response to the receipt of the control notification, selectively causing the removal or modification of one or more applications installed on the portable computing devices of the first client portal, the first sub-client portal, the second client portal or the second sub-client portal. Also in response to the receipt of the control notification, the method can further include the step of causing the installation of one or more applications on the portable computing devices of the first client portal, the first sub-client portal, the second client portal or the second sub-client portal. As an example, the removal, modification or installation of the applications is on an individual basis, a group basis or a global basis.

In another embodiment, one or more portable computing devices may be associated with a managed computing services device, and the method can further include the step of presenting user identifications that are associated with the portable computing devices. The portable computing devices that are associated with the managed services portal may include portable computing devices that are assigned to an application repository associated with the managed services portal, portable computing devices that are assigned to application developers who develop applications for the application repository of the managing entity and portable computing devices that are assigned to testing personnel.

The method can further include the step of enabling access control to at least some of the portable computing devices that are associated with the user identifications. One or more portable computing devices may be associated with the first client portal or the second client portal. Thus, the method can further include receiving a control notification and in response to the control notification, presenting user identifications that are associated with the portable computing devices that are associated with the first client portal or the second client portal. One or more additional portable computing devices may be associated with the first client portal or the second client portal, and the method may further include presenting at least some of the portable computing devices associated with the first client portal or the second client portal.

Presenting the portable computing devices associated with the first client portal or the second client portal can include, for example, presenting the portable computing devices associated with the first client portal or the second client portal as available portable computing devices. The method can further include the step of converting an available portable computing device to a provisioned portable computing device if a control notification is received.

In another arrangement, the method can include the steps of receiving a notification that a firmware update is available for one or more portable computing devices that are associated with the first client portal and receiving a notification that a firmware update is available for one or more portable computing devices that are associated with the second client portal. As such, the method can include the steps of transmitting the availability of the firmware update for the first client portable computing devices to the first client portal and transmitting the availability of the firmware update for the second client portable computing devices to the second client portal.

In yet another arrangement, the method can further include the step of presenting one or more bundles in which the bundles can be assigned to one or more performance functions. As an example, the bundles can contain information that is based on their assigned performance function. As another example, the information contained in the bundles may include one or more configuration settings or one or more applications, and the configuration settings and the applications can be arranged based on the assigned performance function. The method can further include the step of enabling the information contained in the bundles to be edited such that the configuration settings or the applications may be modified.

As another example, the bundles may be designated for users associated with a managed services computing device, or the bundles may be designated for the first client portal and the second client portal. The method can also include the step of enabling the managed services portal to modify the bundles designated for the first client portal and the second client portal if the managing entity has respective authority from the first client portal and the second client portal. The method can further include the step of selectively generating a modification signal in response to the information contained in a bundle being edited such that modifications of the configuration settings or the applications may be dynamically effected on one or more portable computing devices that have already received the bundles.

Another method of managing services is described herein. The method can include the step of presenting an interface to enable selections associated with the management of services for a first client portal and a second client portal. The first client portal can be assigned a first application repository that can be associated with the first client portal, and the second client portal can be assigned a second application repository that can be associated with the second client portal. The method can also include the steps of receiving a notification of an application that has met an approval threshold and transmitting the availability of the application to the first client portal for publication in the first application repository. The availability of the application can be transmitted to the second client portal for publication in the second application repository.

Another managed services portal that is associated with a managing entity is described herein. The managed services portal can include one or more user interface elements configured to enable a user to make selections associated with the management of services for a first client portal and a second client portal. The first client portal can be assigned a first application repository that can be associated with the first client portal, the second client portal can be assigned a second application repository that can be associated with the second client portal and the managing entity can be assigned a third application repository that can be associated with the managing entity. The managed services portal can also include a processor that can be communicatively coupled to the user interface elements. As an example, the processor can be operable to receive a notification of an application that has met an approval threshold, cause the presentation of the application, cause the transmission of the availability of the application to the first client portal for publication in the first application repository, cause the transmission of the availability of the application to the second client portal for publication in the second application repository and cause the publication of the application in the third application repository.

Yet another method of managing services is described herein. The method can include the step of presenting an interface to enable selections associated with the management of services for a first client portal and a second client portal by a managed services portal. The first client portal can be assigned a first application repository that can be associated with the first client portal, and the second client portal can be assigned a second application repository that can be associated with the second client portal. The method can also include the steps of receiving a notification of an application that has met an approval threshold, transmitting the availability of the application to the first client portal for publication in the first application repository and transmitting the availability of the application to the second client portal for publication in the second application repository. The method can also include the step of publishing the application in a third application repository that is assigned to and associated with the managed services portal.

A method for managing configuration updates for a first client portal and a second client portal is described herein. The method can include the steps of receiving a notification that a first configuration update is available for the first client portal and that a second configuration update is available for the second client portal and notifying the first client portal that the first configuration update is available for one or more portable computing devices that are associated with the first client portal. The first client portal can determine whether to provide the first configuration update to the first client portal portable computing devices. This method can further include the step of notifying the second client portal that the second configuration update is available for one or more portable computing devices that are associated with the second client portal. The second client portal can determine whether to provide the second configuration update to the second client portal portable computing devices.

The method can further include the step of notifying—through the first client portal—a first sub-client portal that is associated with the first client portal that the first configuration update is available for one or more portable computing devices that are associated with the first-sub client portal. The first sub-client portal may determine whether to provide the first configuration update to the first sub-client portal portable computing devices. As an example, the configuration update can at least include a firmware update.

A managed services computing device for managing one or more bundles is also described herein. The managed services computing device can include one or more user interface elements configured to enable a user to assign a first bundle to a first performance function category, assign a second bundle to a second performance function category and select the contents of the first and second bundles. The managed services computing device can also include a processor that can be communicatively coupled to the user interface elements. As an example, the processor can be operable to generate the first and second bundles by loading the contents of the first and second bundles and to direct the storage of the first and second bundles for selective transmission to one or more portable computing devices.

The processor can be further operable to, in response to an editing process conducted through the user interface elements, correspondingly edit the contents of the first bundle or the second bundle. As an example, the first bundle and the second bundle may have been respectively received at a first portable computing device and a second portable computing device and the processor is further operable to generate a signal that is configured to cause the contents of the first bundle on the first portable computing device or the contents of the second bundle on the second portable computing device to be correspondingly edited.

A method for managing one or more bundles is also described herein. The method can include the steps of assigning a first bundle to a first performance function category, assigning a second bundle to a second performance function category, selecting the contents of the first and second bundles, generating the first and second bundles by loading the contents of the first and second bundles and moving to storage the first and second bundles for selective transmission to one or more portable computing devices. The method can also include the steps of editing the contents of the first bundle or the second bundle, forwarding the first bundle to a first portable computing device, forwarding the second bundle to a second portable computing device, detecting the editing of the contents of the first bundle or the second bundle and generating a signal that is configured to cause the contents of the first bundle or the second bundle to be correspondingly edited.

Yet another managed services platform is described herein. The managed services platform can include a first computing device that can be configured to present a first interface to permit application developers to submit applications for eventual publication, a second computing device that can be communicatively coupled to the first computing device and that can be configured to present a second interface to permit the approval of submitted applications and a third computing device that can be communicatively coupled to the second computing device. The third computing device can be configured to receive a notification from the second computing device that a submitted application has been approved, transmit the availability of the approved application to a first client portal for publication in a first application repository that is associated with the first client portal and transmit the availability of the approved application to a second client portal for publication in a second application repository that is associated with the second client portal.

A method of managing applications is also described herein. The method can include the steps of receiving an application that has been submitted for approval for possible publication in a first application repository that may be associated with a first client portal and a second application repository that may be associated with a second client portal and approving the submitted application for the possible publication in the first application repository and the second application repository. The method can also include the steps of receiving a notification that the submitted application has been approved and in response to the receipt of the notification, transmitting the availability of the approved application to the first client portal for publication in the first application repository. In response to the receipt of the notification, the availability of the approved application can be transmitted to the second client portal for publication in the second application repository.

A method of managing applications is also described herein. The method can include the step of receiving a notification that an application submitted for approval for possible publication in a first application repository that is associated with a first client portal and for possible publication in a second application repository that is associated with a second client portal has been approved. In response to the receipt of the notification, the availability of the approved application can be transmitted to the first client portal for publication in the first application repository. Also in response to the receipt of the notification, the availability of the approved application can be transmitted to the second client portal for publication in the second application repository.

A computer program product is also described herein. The computer program product can include a computer readable storage medium having stored thereon computer readable program code. When executed by a system that includes a processor and a memory, the program code causes the system to enable a user to make selections associated with the management of services for a first client portal and a second client portal. The first client portal can be assigned a first application repository that can be associated with the first client portal, and the second client portal can be assigned a second application repository that can be associated with the second client portal. The program code can also cause the system to receive a notification of an application that has met an approval threshold, to present the application, to transmit the availability of the application to the first client portal for publication in the first application repository and to transmit the availability of the application to the second client portal for publication in the second application repository.

A client computing device associated with a first client is also described herein. The client computing device includes one or more user interface elements configured to enable a user to make selections associated with the management of services for the first client. The client computing device can be assigned a first application repository. The client computing device includes a processor that is communicatively coupled with the user interface elements. The processor can be operable to receive a notification of the availability of an application for publication into the client computing device application repository. The notification can be from a managing computing device that may also provide notification of the availability of the application for publication into an application repository associated with a second client computing device. The processor can also be operable to selectively cause the publication of the available application into the client computing device application repository.

The processor can be further operable to generate a publication notice for transmission to the managing computing device when the available application is published in the client computing device application repository. In addition, the client computing device can be communicatively coupled with a sub-client computing device that may be associated with a sub-client and may be assigned a sub-client computing device application repository. When the available application is published in the client computing device application repository, the processor can be further operable to generate a notification for transmission to the sub-client computing device that the application is available for publication in the sub-client computing device application repository.

A system is also described herein in which the system can include a first computing device that can be associated with a first application repository and that can be configured to receive a notification of the availability of an application for publication in the first application repository, and in response, to selectively cause the publication of the available application in the first application repository. The system can also include a sub-client computing device that can be communicatively coupled to the first computing device and that can be associated with a sub-client. The sub-client computing device can be assigned a sub-client application repository. The sub-client computing device can be configured to receive a second notification of the availability of the application for publication in the sub-client computing device application repository when the application is published in the first application repository.

A method for managing services for a first client is also described herein. The method can include the step of receiving a notification of the availability of an application for publication into an application repository associated with the first client portal. The notification can be from a managing computing device that can also provide notification of the availability of the application for publication into an application repository associated with a second client portal. The method can also include the step of selecting the available application for publication into the first client portal application repository such that the application is available for download from the first client portal application repository to computing devices that are associated with the first client portal but not for computing devices that are associated with the second client portal.

The method can also include the step of generating a publication notice for transmission to the managing computing device when the available application is published in the first client portal application repository. As an example, the client computing device can be communicatively coupled with a sub-client computing device that can be associated with a sub-client and that can be assigned a sub-client computing device application repository. When the available application is published in the first client portal application repository, the method can further include the step of generating a notification for transmission to the sub-client computing device that the application is available for publication in the sub-client computing device application repository.

A method for managing applications of a client portal and a sub-client portal is also described herein in which the client portal can be assigned a client portal application repository and the sub-client portal can be assigned a sub-client portal application repository. The method can include the step of receiving a notification of the availability of an application for publication in the client portal application repository, selecting the application for publication in the client portal application repository and in response to the publication of the application in the client portal application repository, notifying the sub-client portal of the availability of the application for publication in the sub-client portal application repository.

A managed services computing device for managing configuration updates for a first client portal and a second client portal is also described herein. The managed services computing device can include a processor. The processor can be operable to receive a notification that a first configuration update is available for the first client portal and that a second configuration update is available for the second client portal. The processor can also be operable to generate a notification for the first client portal that the first configuration update is available for one or more portable computing devices that are associated with the first client portal. The first client portal can determine whether to provide the first configuration update to the first client portal portable computing devices. The processor can also be operable to generate a notification for the second client portal that the second configuration update is available for one or more portable computing devices that are associated with the second client portal. The second client portal may determine whether to provide the second configuration update to the second client portal portable computing devices.

A managed services portal is also described herein. The managed services portal can include one or more user interface elements configured to enable a user to make selections associated with the management of services for one or more portable computing devices and a processor that can be communicatively coupled to the user interface elements. The processor can be operable to receive a request to determine a status of one or more of the portable computing devices or to cause an action to occur on one or more of the portable computing devices. The processor can be further operable to provide the status of the one or more portable computing devices or to effect the action on the one or more portable computing devices. The processor can be further operable to provide the status of the one or more portable computing devices or to effect the action on the one or more portable computing devices on an individual basis, a group basis or a global basis.

As an example, a display can be one of the user interface elements, and the processor can be further operable to cause the presentation of at least some of the portable computing devices on the display. The managed services portal can also include a searching module that can be configured to enable the portable computing devices to be searched individually or by groups.

In one arrangement, the processor can be further operable to effect the action on the one or more portable computing devices by generating a message for transmission to the portable computing devices and causing the delivery of the message to the portable computing devices. In another arrangement, the processor can be further operable to provide the status of the one or more portable computing devices by causing the presentation of a listing that includes applications that may be installed on a portable computing device or a listing that may include applications that may be available to be installed on the portable computing device.

The processor can be further operable to effect the action on the one or more portable computing devices by causing the installation of applications on the portable computing devices or by causing the removal of applications from the portable computing devices. As an example, the installation of applications and the removal of applications may be executed in real-time or in accordance with a delivery schedule. The processor can be further operable to provide the status of the one or more portable computing devices by providing location information of the portable computing devices.

The processor can be further operable to effect the action on the one or more portable computing devices by causing one or more of the following: locking at least a portion of a portable computing device; unlocking at least a portion of a portable computing device; logging a user in a portable computing device; logging a user out of a portable computing device; wiping at least a portion of the data on a portable computing device; restoring at least a portion of the data on a portable computing device that has been deleted from the portable computing device; resetting a portable computing device to one or more default settings; adding a user to a portable computing device; removing a user from a portable computing device; or ringing a portable computing device.

The processor can be further operable to effect the action on the one or more portable computing devices by causing the delivery of content to the one or more portable computing devices. For example, the content can include one or more configuration settings or a firmware package. As another example, the delivery of content can be executed in real-time or in accordance with a delivery schedule.

The processor can also be further operable to provide the status of the one or more portable computing devices by causing the presentation of user identifications that are associated with the portable computing devices. In another arrangement, the processor can be further operable to effect the action on the one or more portable computing devices by controlling access to a portable computing device that may be associated with one or more of the user identifications.

The processor can be further operable to provide the status of the one or more portable computing devices by presenting the one or more portable computing devices as available portable computing devices or as provisioned portable computing devices. The processor can be further operable to effect the action on the one or more portable computing devices by causing an available portable computing device to become a provisioned portable computing device.

In another arrangement, the processor can be further operable to cause the presentation of one or more bundles in which the bundles may be assigned to one or more performance functions, and the bundles can contain information that can be based on the assigned performance functions. As an example, the information can include configuration settings or applications. The applications may be default applications, and the processor can be further operable to enable an application to be designated as a default application for a bundle.

The processor can be further operable to effect the action on the one or more portable computing devices by causing the delivery of a bundle to the portable computing devices. Moreover, the processor can be further operable to effect the action on the one or more portable computing devices by generating a modification signal in response to the information contained in a bundle being edited such that modifications of such information may be dynamically effected on portable computing devices that have already received the bundle.

As an example, the configuration settings include one or more of the following: a password profile; a wireless protocol profile; a VPN profile; a hardware profile; or a certificate profile. The configuration settings may include one or more policies, and the policies can define one or more actions to be executed in response to a detected event. The policies can include one or more of the following: a VPN policy; a proxy policy; a blacklist policy; a whitelist policy; or a report policy.

For example, the policy can be the VPN policy, and the action can include the implementation of one or more VPN settings. As another example, the policy can be the proxy policy, and the action can include the enablement of a proxy. In yet another example, the policy can be the blacklist policy, and the action can include blocking the download or installation of an application. In yet another example, the policy can be the whitelist policy, and the action can include allowing the download or installation of an application. In yet another example, the policy can be the report policy, and the action can include reporting a characteristic of the portable computing device.

The processor can be further operable to cause the presentation of user identifications. As an example, the processor can be further operable to manage user identifications by at least controlling the access of the user identifications.

A method for managing services is also described herein. The method can include the steps of enabling a user to make selections associated with the management of services for one or more portable computing devices and receiving a request to determine a status of one or more of the portable computing devices or to cause an action to occur on one or more of the portable computing devices. The method can also include the step of providing the status of the one or more portable computing devices or to effecting the action on the one or more portable computing devices. The status of the one or more portable computing devices can be provided or the action on the one or more portable computing devices can be effected on an individual basis, a group basis or a global basis.

The method can further include the steps of presenting at least some of the portable computing devices on the display, and enabling the portable computing devices to be searched individually or by groups. As an example, the action on the one or more portable computing devices can be effected by generating a message for transmission to the portable computing devices and causing the message to be sent to the portable computing devices.

As another example, the status of the one or more portable computing devices can be provided by presenting a listing that includes applications that can be installed on a portable computing device or a listing that can include applications that may be available to be installed on the portable computing device. The action on the one or more portable computing devices can be effected by selectively causing the installation of applications on the portable computing devices or selectively causing the removal of applications from the portable computing devices. Causing the installation of applications and the removal of applications can be such that the installation and removal may be executed in real-time or in accordance with a delivery schedule.

The status of the one or more portable computing devices can be provided by providing location information of the portable computing devices. The action on the one or more portable computing devices can be effected by one or more of the following: locking at least a portion of a portable computing device; unlocking at least a portion of a portable computing device; logging a user in a portable computing device; logging a user out of a portable computing device; wiping at least a portion of the data on a portable computing device; restoring at least a portion of the data on a portable computing device that has been deleted from the portable computing device; resetting a portable computing device to one or more default settings; adding a user to a portable computing device; removing a user from a portable computing device; or ringing a portable computing device.

The action on the one or more portable computing devices can be effected by delivering content to the one or more portable computing devices. For example, the content can include one or more configuration settings or a firmware package. The method can further include the step of executing the delivery of content in real-time or in accordance with a delivery schedule. The status of the one or more portable computing devices can be provided by causing the presentation of user identifications that are associated with the portable computing devices. Also, the action on the one or more portable computing devices can be effected by controlling access to a portable computing device that may be associated with one or more of the user identifications. As another example, the status of the one or more portable computing devices can be provided by presenting the one or more portable computing devices as available portable computing devices or as provisioned portable computing devices. As yet another example, the action on the one or more portable computing devices can be effected by causing an available portable computing device to become a provisioned portable computing device.

The method can further include the step of presenting one or more bundles in which the bundles may be assigned to one or more performance functions, and the bundles can contain information that may be based on the assigned performance functions. As an example, the information of the bundles can include configuration settings or applications. As another example, the applications can be default applications, and the method can further include the step of designating an application as a default application for a bundle.

In one arrangement, the action on the one or more portable computing devices can be effected by causing a bundle to be sent to the portable computing devices. In another arrangement, the action on the one or more portable computing devices can be effected by generating a modification signal in response to the information contained in a bundle being edited such that modifications of such information may be dynamically effected on portable computing devices that have already received the bundle.

As an example, the configuration settings may include one or more of the following: a password profile; a wireless protocol profile; a VPN profile; a hardware profile; or a certificate profile. As another example, the configuration settings can include one or more policies, and the policies may define one or more actions to be executed in response to a detected event. For example, the policies may include one or more of the following: a VPN policy; a proxy policy; a blacklist policy; a whitelist policy; or a report policy.

In one embodiment, the policy can be the VPN policy, and the action may include the implementation of one or more VPN settings. In another embodiment, the policy can be the proxy policy, and the action may include the enablement of a proxy. In another embodiment, the policy can be the blacklist policy, and the action may include blocking the download or installation of an application. In yet another embodiment, the policy can be the whitelist policy, and the action can include allowing the download or installation of an application. In yet another embodiment, the policy can be the report policy, and the action may include reporting a characteristic of the portable computing device.

The method can also include the steps of presenting user identifications and managing user identifications by at least controlling the access of the user identifications.

A managed services portal is also described herein. The managed services portal can include a display that can be configured to present representations of one or more portable computing devices and a processor that can be communicatively coupled to the display. The processor can be operable to receive a request to populate at least one of the portable computing devices with a bundle and to direct the delivery of the bundle to the portable computing devices. The bundle can include configuration settings and applications that may be selected at least partially based on performance functions associated with the portable computing devices. It is important to note that for all embodiments and arrangements described herein, content may be delivered to any number of portable computing devices, including on an individual basis, and is not necessarily limited to being delivered in bundles.

As an example, the configuration settings include one or more of the following: a password profile; a wireless protocol profile; a VPN profile; a hardware profile; or a certificate profile. Also, the configuration settings may include one or more policies, and the policies define one or more actions to be executed in response to a detected event. For example, the policies include one or more of the following: a VPN policy; a proxy policy; a blacklist policy; a whitelist policy; or a report policy.

A method of managing services is also described herein. The method can include the steps of presenting representations of one or more portable computing devices, receiving a request to populate at least one of the portable computing devices with a bundle and directing the delivery of the bundle to the portable computing devices. The bundle can include configuration settings and applications that are selected at least partially based on performance functions associated with the portable computing devices.

In one arrangement, the configuration settings can include one or more of the following: a password profile; a wireless protocol profile; a VPN profile; a hardware profile; or a certificate profile. The configuration settings can include one or more policies, and the policies may define one or more actions to be executed in response to a detected event. The policies may include one or more of the following: a VPN policy; a proxy policy; a blacklist policy; a whitelist policy; or a report policy.

Another method of managing services is described herein. The method can include the steps of presenting representations of one or more portable computing devices, generating one or more bundles that include configurations settings and applications that are selected at least partially based on performance functions associated with the portable computing devices, receiving a request to populate at least one of the portable computing devices with a bundle and directing the delivery of the bundle to the portable computing devices.

Another managed services portal is described herein. The managed services portal can include one or more user interface elements that can be configured to enable a user to make selections associated with the management of services for a first set of portable computing devices and to enable a user to make selections associated with the management of services for a second set of portable computing devices. The managed services portal can also include a processor that can be communicatively coupled to the user interface elements. The processor can be operable to receive a first request to determine a status of one or more of the portable computing devices of the first set or to cause an action to occur on one or more of the portable computing devices of the first set and to provide the status of the one or more portable computing devices of the first set or to effect the action on the one or more portable computing devices of the first set. The processor can be further operable to provide the status of the one or more portable computing devices of the first set or to effect the action on the one or more portable computing devices of the first set on an individual basis, a group basis or a global basis.

The processor can also be operable to receive a second request to determine a status of one or more of the portable computing devices of the second set or to cause an action to occur on one or more of the portable computing devices of the second set. If authorized, the processor can also be operable to provide the status of the one or more portable computing devices of the second set or to effect the action on the one or more portable computing devices of the second set. The processor can be further operable to provide the status of the one or more portable computing devices of the second set or to effect the action on the one or more portable computing devices of the second set on an individual basis, a group basis or a global basis.

As an example, the first set of portable computing devices can be associated with a first entity, and the second set of portable computing devices can be associated with a second entity. As another example, the first entity can be a managing entity responsible for operating the managed services portal.

A display is one of the user interface elements, and the processor can be further operable to cause the presentation of at least some of the portable computing devices of the second set on the display. The method can further include a searching module that can be configured to enable the portable computing devices of the second set to be searched individually or by groups.

The processor can be further operable to effect the action on the one or more portable computing devices of the second set by, for example, generating a message for transmission to the portable computing devices and causing the delivery of the message to the portable computing devices. As another example, the processor can be further operable to provide the status of the one or more portable computing devices of the second set by causing the presentation of a listing that includes applications that are installed on a portable computing device of the second set or a listing that includes applications that are available to be installed on the portable computing device of the second set. The processor can also be further operable to effect the action on the one or more portable computing devices of the second set by causing the installation of applications on the portable computing devices of the second set or causing the removal of applications from the portable computing devices of the second set. The installation of applications and the removal of applications can be executed in real-time or in accordance with a delivery schedule.

In one arrangement, the processor can be further operable to provide the status of the one or more portable computing devices of the second set by providing location information of the portable computing devices of the second set. The processor can be further operable to effect the action on the one or more portable computing devices of the second set by causing one or more of the following: locking at least a portion of a portable computing device of the second set; unlocking at least a portion of a portable computing device of the second set; logging a user in a portable computing device of the second set; logging a user out of a portable computing device of the second set; wiping at least a portion of the data on a portable computing device of the second set; restoring at least a portion of the data on a portable computing device of the second set that has been deleted from the portable computing device of the second set; resetting a portable computing device of the second set to one or more default settings; adding a user to a portable computing device of the second set; removing a user from a portable computing device of the second set; or ringing a portable computing device of the second set.

The processor can be further operable to effect the action on the one or more portable computing devices of the second set by causing the delivery of content to the one or more portable computing devices of the second set. As an example, the content can include one or more configuration settings or a firmware package. The delivery of content can be executed in real-time or in accordance with a delivery schedule.

The processor can be further operable to provide the status of the one or more portable computing devices of the second set by causing the presentation of user identifications that are associated with the portable computing devices of the second set. Moreover, the processor can be operable to effect the action on the one or more portable computing devices of the second set by controlling access to a portable computing device of the second set that may be associated with one or more of the user identifications.

The processor can be further operable to cause the presentation of one or more bundles. As an example, the bundles can be assigned to one or more performance functions, and the bundles can contain information that may be based on the assigned performance functions. As a more specific example, the information may include configuration settings or applications. The applications may be default applications, and the processor can be further operable to enable an application to be designated as a default application for a bundle.

The processor can be further operable to effect the action on the one or more portable computing devices of the second set by causing the delivery of a bundle to the portable computing devices of the second set. In another arrangement, the processor can be operable to effect the action on the one or more portable computing devices of the second set by generating a modification signal in response to the information contained in a bundle being edited such that modifications of such information may be dynamically effected on portable computing devices of the second set that have already received the bundle.

As an example, the configuration settings can include one or more of the following: a password profile; a wireless protocol profile; a VPN profile; a hardware profile; or a certificate profile. As another example, the configuration settings can include one or more policies, and the policies may define one or more actions to be executed in response to a detected event. For example, the policies can include one or more of the following: a VPN policy; a proxy policy; a blacklist policy; a whitelist policy; or a report policy.

In one embodiment, the policy can be the VPN policy, and the action may include the implementation of one or more VPN settings, while in another embodiment, the policy can be the proxy policy, and the action may include the enablement of a proxy. In another embodiment, the policy may be the blacklist policy, and the action cam includes blocking the download or installation of an application. In another embodiment, the policy can be the whitelist policy, and the action can include allowing the download or installation of an application. In yet another embodiment, the policy can be the report policy, and the action may include reporting a characteristic of the portable computing device.

The processor can be further operable to cause the presentation of user identifications. In addition, the processor can be further operable to manage user identifications by at least controlling the access of the user identifications.

Another method for managing services is also described herein. The method can include the steps of enabling a user to make selections associated with the management of services for one or more portable computing devices of a first set, enabling the user to make selections associated with the management of services for one or more portable computing devices of a second set, receiving a request to determine a status of one or more of the portable computing devices of the first set or to cause an action to occur on one or more of the portable computing devices of the first set and providing the status of the one or more portable computing devices of the first set or effecting the action on the one or more portable computing devices of the first set. The status of the one or more portable computing devices of the first set can be provided or the action on the one or more portable computing devices of the first set can be effected on an individual basis, a group basis or a global basis.

The method can also include the steps of receiving a second request to determine a status of one or more portable computing devices of the second set or to cause an action to occur on one or more of the portable computing devices of the second set and if authorized, providing the status of the one or more portable computing devices of the second set or effecting the action on the one or more portable computing devices of the second set. The status of the one or more portable computing devices of the second set can be provided or the action on the one or more portable computing devices of the second set can be effected on an individual basis, a group basis or a global basis. The first set of portable computing devices can be associated with a first entity, and the second set of portable computing devices can be associated with a second entity. The first entity can be a managing entity responsible for operating the managed services portal.

The method can further include the steps of presenting at least some of the portable computing devices of the second set on the display and enabling the portable computing devices of the second set to be searched individually or by groups. In one arrangement, the action on the one or more portable computing devices of the second set can be effected by generating a message for transmission to the portable computing devices of the second set and causing the message to be sent to the portable computing devices of the second set.

In another arrangement, the status of the one or more portable computing devices of the second set can be provided by presenting a listing that includes applications that can be installed on a portable computing device of the second set or a listing that can include applications that may be available to be installed on the portable computing device of the second set.

In yet another arrangement, the action on the one or more portable computing devices of the second set can be effected by selectively causing the installation of applications on the portable computing devices of the second set or selectively causing the removal of applications from the portable computing devices of the second set. As an example, causing the installation of applications and the removal of applications can be such that the installation and removal may be executed in real-time or in accordance with a delivery schedule.

In one embodiment, the status of the one or more portable computing devices of the second set can be provided by providing location information of the portable computing devices of the second set. In another embodiment, the action on the one or more portable computing devices of the second set can be effected by one or more of the following: locking at least a portion of a portable computing device of the second set; unlocking at least a portion of a portable computing device of the second set; logging a user in a portable computing device of the second set; logging a user out of a portable computing device of the second set; wiping at least a portion of the data on a portable computing device of the second set; restoring at least a portion of the data on a portable computing device of the second set that has been deleted from the portable computing device of the second set; resetting a portable computing device of the second set to one or more default settings; adding a user to a portable computing device of the second set; removing a user from a portable computing device of the second set; or ringing a portable computing device of the second set.

The action on the one or more portable computing devices of the second set can be effected by delivering content to the one or more portable computing devices of the second set. As an example, the content can include one or more configuration settings or a firmware package. The method can also include the step of executing the delivery of content in real-time or in accordance with a delivery schedule.

In another embodiment, the status of the one or more portable computing devices of the second set can be provided by causing the presentation of user identifications that are associated with the portable computing devices of the second set. In yet another embodiment, the action on the one or more portable computing devices of the second set can be effected by controlling access to a portable computing device of the second set that is associated with one or more of the user identifications.

The method can also include the step of presenting one or more bundles. For example, the bundles can be assigned to one or more performance functions, and the bundles may contain information that can be based on the assigned performance functions. The information of the bundles can include configuration settings or applications. The applications, for example, can be default applications, and the method can further include the step of designating an application as a default application for a bundle.

In one arrangement, the action on the one or more portable computing devices of the second set can be effected by causing a bundle to be sent to the portable computing devices of the second set. In another arrangement, the action on the one or more portable computing devices of the second set can be effected by generating a modification signal in response to the information contained in a bundle being edited such that modifications of such information may be dynamically effected on portable computing devices of the second set that have already received the bundle.

As an example, the configuration settings include one or more of the following: a password profile; a wireless protocol profile; a VPN profile; a hardware profile; or a certificate profile. As another example, the configuration settings may include one or more policies, and the policies may define one or more actions to be executed in response to a detected event. The policies can include, for example, one or more of the following: a VPN policy; a proxy policy; a blacklist policy; a whitelist policy; or a report policy.

In one arrangement, the policy can be the VPN policy, and the action can include the implementation of one or more VPN settings. In one embodiment, the policy can be the proxy policy, and the action can include the enablement of a proxy. In another embodiment, the policy can be the blacklist policy, and the action may include blocking the download or installation of an application. In another embodiment, the policy can be the whitelist policy, and the action may include allowing the download or installation of an application. In yet another embodiment, the policy can be the report policy, and the action includes reporting a characteristic of the portable computing device.

The method can also include the step of presenting user identifications. The method can further include the step of managing user identifications by at least controlling the access of the user identifications.

A managed services portal that can be operated by a first entity is also described herein. The managed services portal can include one or more user interface elements that can be configured to enable the first entity to make selections associated with the management of services for portable computing devices associated with a second entity. The managed services portal can also include a processor that can be communicatively coupled to the user interface elements. The processor can be operable to receive a request to determine a status of one or more of the portable computing devices of the second entity or to cause an action to occur on one or more of the portable computing devices of the second entity. If authorized, the processor can be operable to provide the status of the one or more portable computing devices of the second entity or to effect the action on the one or more portable computing devices of the second entity. The processor can be further operable to provide the status of the one or more portable computing devices of the second entity or to effect the action on the one or more portable computing devices of the second entity on an individual basis, a group basis or a global basis.

Another method for managing services is described herein. The method can include the steps of enabling a management entity to make selections associated with the management of services for one or more portable computing devices associated with a second entity, receiving a request from the management entity to determine a status of one or more of the portable computing devices of the second entity or to cause an action to occur on one or more of the portable computing devices of the second entity and if authorized and in response to the request, providing the status of the one or more portable computing devices of the second entity or effecting the action on the one or more portable computing devices of the second entity. The status of the one or more portable computing devices of the second entity can be provided or the action on the one or more portable computing devices of the second entity can be effected on an individual basis, a group basis or a global basis.

Embodiments are also directed to a supervisory portal systems and methods. In one method, a user interface element is presented to manage or control one or more portable computing devices. An input can be received from the user interface element to manage or control all of or a subset set of the one or more child devices. In response to receiving the input, a directive, content or a message can be transmitted to the child device. In this way, supervisory oversight of the one or more child portable computing devices can be provided.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 1 depicts exemplary elements of a system for providing telephony and digital media services to a location, such as a home or office.

FIG. 2 is a back perspective view of an exemplary telephony and digital media services device.

Figure 3:
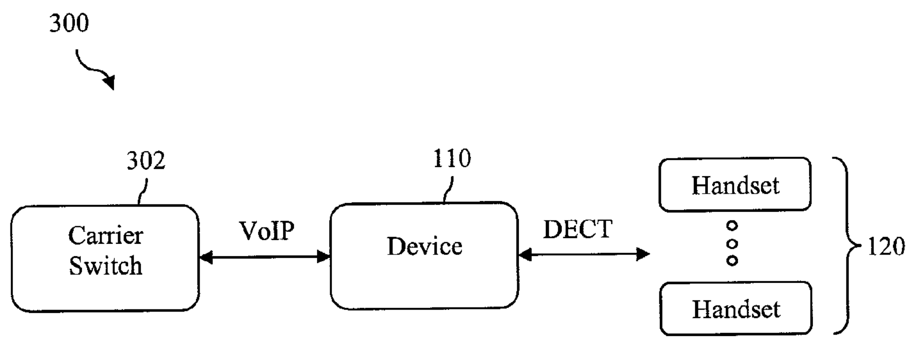
FIG. 3 is a block diagram of an exemplary system for providing telephony and digital media services.

Applicants expressly disclaim any rights to any third-party trademarks or copyrighted images included in the figures. Such marks and images have been included for illustrative purposes only and constitute the sole property of their respective owners.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Several definitions that apply throughout this document will now be presented. The term "exemplary" as used herein is defined as an example or an instance of an object, apparatus, system, entity, composition, method, step or process. The term "gateway" is defined as an element or a group of elements that enable or facilitate the transfer of communication signals from one component or network to another. The term "communicatively coupled" is defined as a state in which two or more components are connected such that communication signals are able to be exchanged between the components on a unidirectional or bidirectional manner, either wirelessly, through a wired connection or a combination of both. A "computing device" is defined as a component or a group of components that are configured to process and/or present data to a user or another component or group of components. The term "identification" is defined as information or data that is used to uniquely distinguish a component or a group of components from other components or groups of components. The term "set" is defined as a collection of one or more. A "portable computing device" is defined as a mobile or fixed communication device that presents a user interface to a user and that is capable of being managed.

The term "managing entity" is defined as an entity or a group of entities that are assigned to oversee or are otherwise responsible for an operation, act, component or service on behalf of a separate entity or group of entities. A "user interface element" is defined as a component or a group of components that enables a user to interact with a machine. The term "graphical user interface element" is defined as an image or a portion of an image that presents information to a user or allows the user to interact with a device through a display. An "interface" is defined as a component, system or arrangement or groups thereof that enable information/data to be entered into a machine.

A "display" is defined as a component or a group of components that present information/data in visual form. A "processor" is defined as a component or a group of components that at least execute instructions. A "transceiver" is defined as a component or a group of components that transmit signals, receive signals or transmit and receive signals, whether wirelessly or through a hard-wired connection. The term "managed services platform" is a collection of one or more components that manage services for one or more portable computing devices by controlling the exchange of messages and data with the portable computing devices. The term "portal" is defined as any combination of components or systems that permit a user or another system or component to input, output, manage, generate, process or manipulate data or to control another component or system and can include hardware, software or any suitable combination of hardware and software. The term "firmware" is defined as a software component or components that lend to the state and user interface of a device, including a complete image of a device or an edit or modification to an existing image on a device. Examples include micro-code, a bootloader, a kernel, a root file system and the dissemination of configuration of details, updates (such as updates to artifacts of a running system), profiles and settings.

II. Example System for Providing Telephony and Digital Media Services

II.A Example System Elements

FIG. 1 depicts elements of a system 100 for providing telephony and digital media services to a location, such as a home or office, in accordance with an embodiment of the present invention. As used herein, the term "digital media services" broadly refers to any service that is based on the transfer and/or presentation of digital content to a user. As shown, in FIG. 1, system 100 includes a telephony and digital media services device ("device") 110 and associated handsets 120.

As shown in FIG. 1, device 110 includes a display 112. Display 112 is used to provide a graphical user interface (GUI) that enables a user to initiate, manage and experience telephony and digital media services provided by system 100. In one embodiment, display 112 comprises a color LCD display with a capacitive touch screen panel. In such an embodiment, a user may interact with the GUI by touching display 112 with a finger.

Handsets 120 provide a means for extending the telephony services, and optionally other services, of device 110 to other areas within a given location, such as to other areas within a home or office. As shown in FIG. 1, each handset 120 includes a user interface that comprises both a display 122, such as a color LCD display, and a keypad 124. Each handset 120 may be placed in a corresponding docking station 126. Docking station 126 provides an interface by which a battery internal to a handset may be recharged and also provides a means for supporting a handset when it is not in use.

Handsets 120 are configured to wirelessly communicate with device 110 for the purposes of providing telephony services and to optionally provide other services to a user. In one embodiment, such communications are carried out in accordance with the Digital Enhanced Cordless Telecommunications (DECT) standard published by the European Telecommunications Standards Institute (ETSI). Thus, in one embodiment, device 110 is configured to act as a DECT base station and handsets 120 are configured to act as DECT handsets. Other communication configurations will be discussed elsewhere herein, as the device 110 may be arranged to communicate with other units in addition to or in lieu of the handsets 120.

FIG. 2 is a back perspective view of device 110. As shown in FIG. 2, device 110 includes an interface 202 for connecting to a power supply, such as an AC adapter as well as an interface 204 for connecting to a network, such as a local area network or wide area network. In one embodiment, interface 204 comprises an Ethernet interface, such as a 10/100/1000 megabit per second (Mbps) Ethernet interface. Device 110 may also include an internal wireless network adapter, such as an 802.11 wireless network adapter, for providing network connectivity. As will be described in more detail herein, such network connectivity may be utilized by device 110 for providing telephony services and/or certain digital media services to a user.

The foregoing provides by way of introduction only a brief description of certain implementations of device 110 and handsets 120 that comprise a portion of telephony and digital media service delivery system 100. Additional details concerning such implementations, as well as various alternative implementations, will be described in detail herein.

II.B System Connectivity Options

In order to provide telephony services and certain digital media services, device 110 and handsets 120 may be communicatively connected to a telecommunications carrier and/or Internet Protocol (IP) network. Various manners of implementing such connectivity will now be described with reference to FIGS. 3-8.

FIG. 3 depicts connectivity aspects of a first example installation 300. In installation 300, device 110 is communicatively connected to a remote telecommunication carrier switch 302 and is configured to receive Voice over Internet Protocol (VoIP) telephony services therefrom via a VoIP connection. The VoIP connection may be implemented, for example, over a broadband data service such as Digital Subscriber Line (DSL), Integrated Services Digital Network (IDSN), data over cable, T1/T3, optical carrier, carrier-class Ethernet, satellite, cellular or any other suitable data service. The various physical transport media used for implementing such data services are well known. In one embodiment, device 110 connects to the appropriate data service via an Ethernet interface or WiFi interface, although these are only examples. The broadband data service may be also used by device 110 to provide other services, such as digital media services, to a user.

In one embodiment of installation 300, carrier switch 302 acts as a Session Initiation Protocol (SIP) server and device 110 acts as a SIP client for the purposes of conducting VoIP telephony services. Handsets 120 are wirelessly connected to device 110 using the well-known DECT protocol, which is used to extend telephony services to each handset. A limitation of installation 300 is that the installation is limited to one device 110, which is configured to act as a DECT base station.

Figure 4:
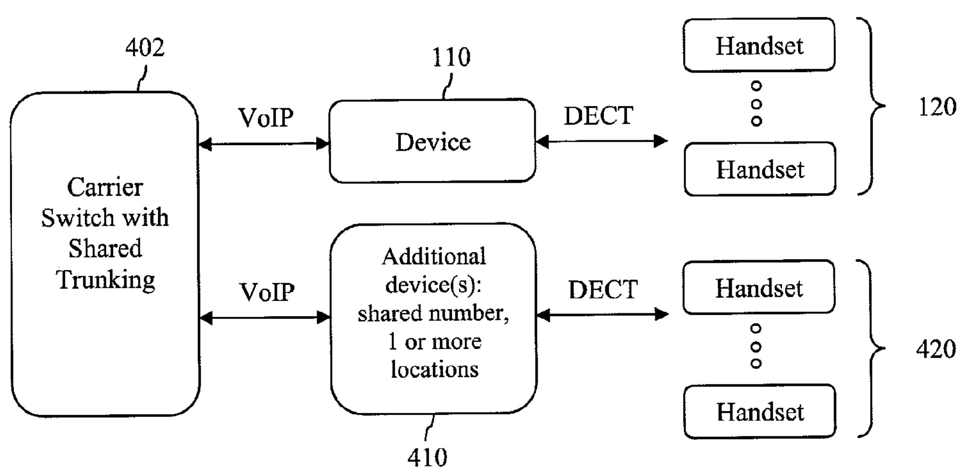
FIG. 4 is a block diagram of an exemplary alternative system for providing telephony and digital media services.

FIG. 4 depicts connectivity aspects of an alternative example installation 400. In installation 400, a carrier switch 402 is configured to perform shared trunking. This arrangement allows multiple devices, including device 110 and additional device(s) 410, to be associated with the same telephone number for the purposes of receiving incoming telephony calls. As shown in FIG. 4, a separate VoIP connection is maintained between carrier switch 402 and each device. Additionally, each device is associated with one or more handsets (e.g., device 110 is associated with handsets 120, each of device(s) 410 is associated with corresponding handset(s) 420) and communicates wirelessly therewith using DECT. A limitation of installation 400 is that the handsets associated with one device cannot communicate with handsets associated with another device through standard DECT intercom mechanisms because each handset is configured to communicate with a different DECT base station.

Figure 5:
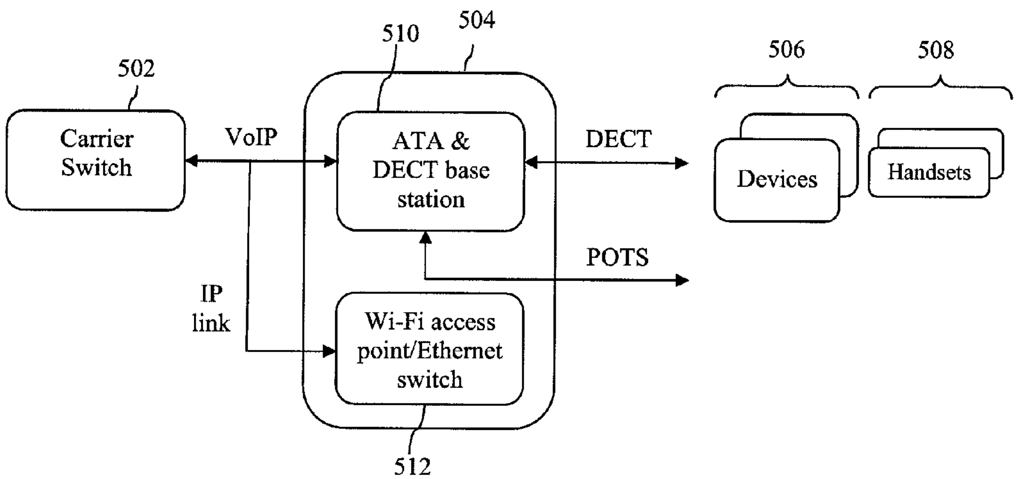
FIG. 5 is a block diagram of an exemplary system for providing telephony and digital media services that supports multiple devices and handsets via an adapter unit in an environment in which a telecommunication carrier provides Voice over Internet Protocol (VoIP) service.

FIG. 5 depicts an alternate installation 500 that supports multiple devices 506 and handsets 508 via an adapter unit 504 in an environment in which a telecommunication carrier provides VoIP service. In installation 500, devices 506 do not act as DECT base stations but instead are configured to operate as DECT clients in a like manner to handsets 508. Adapter unit 504 is installed on-site along with devices 506 and handsets 508 and is connected to a remote carrier switch 502. Adapter unit 504 includes an Analog Terminal Adapter (ATA) and DECT base station 510. As will be appreciated by persons skilled in the relevant art(s), an ATA comprises an adapter that allows a Plain Old Telephony System (POTS) telephone to interface to a VoIP provider.

In installation 500, devices 506 and handsets 508 perform telephony-related operations by communicating via the DECT protocol with the DECT base station within ATA and DECT base station 510. Installation 500 also advantageously supports the operation of legacy POTS equipment (such as POTS telephones, fax machines and security systems) by allowing such equipment to be connected via a POTS interface to the ATA within ATA and DECT base station 510.

Adapter unit 504 further includes a Wi-Fi access point (i.e., an IEEE 802.11 access point) and/or Ethernet switch 512. This element provides access to the Internet via an IP link. As shown in FIG. 5, the IP link may be supported by the same data service and physical transport media used to support the VoIP connection with carrier switch 502. In an embodiment, each of devices 506 is communicatively connected to Wi-Fi access point/Ethernet switch 512 for the purpose of accessing digital media that may be used to provide services to a user. In an alternate implementation, Wi-Fi access point/Ethernet switch 512 is not integrated within adapter unit 504 but instead comprises one or more separate stand-alone devices.

Figure 6:
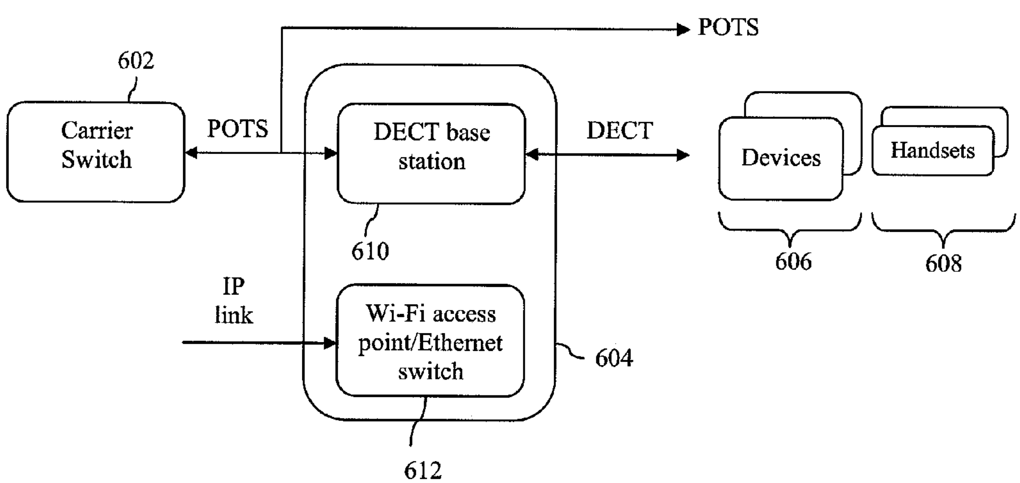
FIG. 6 is a block diagram of an exemplary system for providing telephony and digital media services that supports multiple devices and handsets via an adapter unit in an environment in which a telecommunications carrier provides POT service.

FIG. 6 depicts an installation 600 that supports multiple devices 606 and handsets 608 via an adapter unit 604 in an environment in which a telecommunications carrier provides POTS service. In installation 600, devices 606 do not act as DECT base stations but instead are configured to operate as DECT clients in a like manner to handsets 608. Adapter unit 604, which includes a DECT base station 610 and a Wi-Fi access point and/or Ethernet switch 612, is installed on-site along with devices 606 and handsets 608. DECT base station 610 is connected to a carrier switch 602 via a POTS interface.

Devices 606 and handsets 608 perform telephony-related operations by communicating via the DECT protocol with DECT base station 610. Legacy POTS equipment may be connected to a POTS interface to receive POTS service directly from carrier switch 602.

Wi-Fi access point/Ethernet switch 612 provides access to the Internet via an IP link that is not associated with carrier switch 602. Such IP link may be provided using any known data service/physical transport media combination. In an embodiment, each of devices 606 is communicatively connected to Wi-Fi access point/Ethernet switch 612 for the purpose of accessing digital media that may be used to provide services to a user. In an alternate implementation, Wi-Fi access point/Ethernet switch 612 is not integrated within adapter unit 604 but instead comprises one or more separate stand-alone devices.

Figure 7:
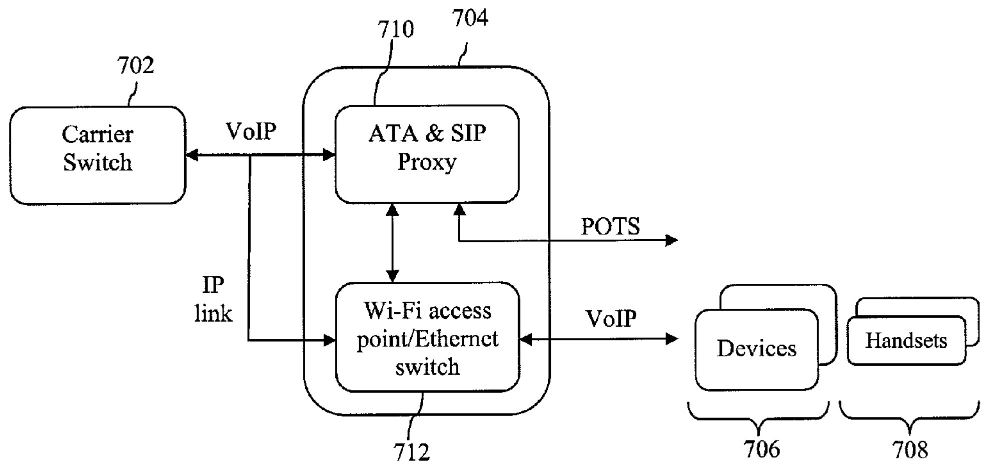
FIG. 7 is a block diagram of an exemplary system for providing telephony and digital media services that supports multiple devices and handsets via an adapter unit in an environment in which a telecommunications carrier provides VoIP service.

FIG. 7 depicts an alternate installation 700 that supports multiple devices 706 and handsets 708 via an adapter unit 704 in an environment in which a telecommunications carrier provides VoIP service. In installation 700, VoIP services are provided directly to devices 706 and handsets 708. To achieve this, adapter unit 704 is installed on-site along with devices 706 and handsets 708. Adapter unit 704 includes an ATA and a Session Initiation Protocol (SIP) proxy 710 that is communicatively connected to a carrier switch 702 via a VoIP connection. Adapter unit 704 also includes a Wi-Fi access point and/or Ethernet switch 712 that is communicatively connected to carrier switch 702 via an IP link and to ATA and SIP proxy 710.

The SIP proxy within ATA and SIP proxy 710 allows devices 706 to register with it and maintains a local numbering plan. Thus, SIP proxy essentially operates as a home private branch exchange (PBX). The SIP proxy in turn registers with carrier switch 702. Communication between each device 706 and the SIP proxy is via Wi-FI access point/Ethernet switch 712. Preferably, each handset 708 is also capable of communicating with the SIP proxy via Wi-Fi or some other protocol capable of supporting SIP communication.

In installation 700, the ATA within ATA and SIP proxy 710 can provide a POTS interface for providing telephony service to legacy POTS equipment. Wi-Fi access point/Ethernet switch 712 can be used by devices 706 to access digital media for providing services to a user. Wi-Fi access point/Ethernet switch 712 may either be integrated within adapter unit 704 or comprise one or more separate stand-alone devices.

Figure 8:
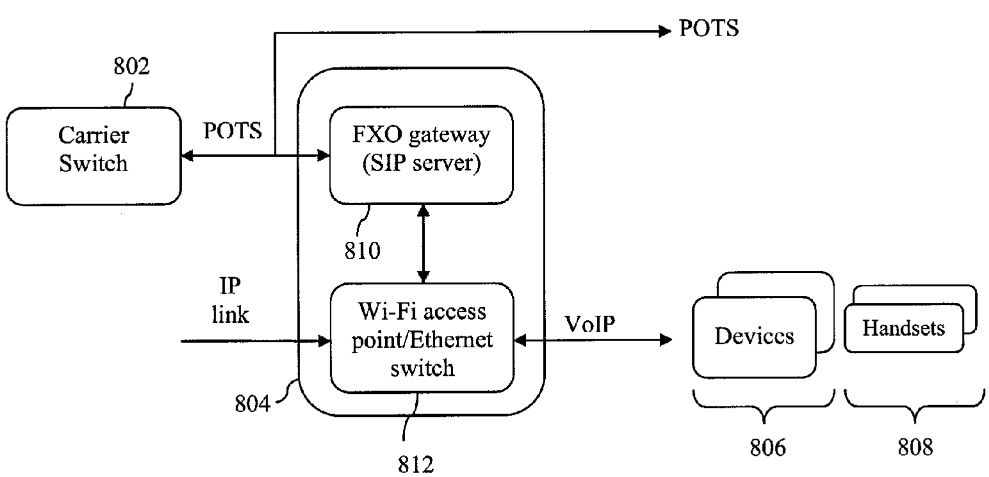
FIG. 8 is a block diagram of an exemplary system for providing telephony and digital media services that supports multiple devices and handsets via an adapter unit in an environment in which a telecommunications carrier provides POT service.

FIG. 8 depicts an alternate installation 800 that supports multiple devices 806 and handsets 808 via an adapter unit 804 in an environment in which a telecommunications carrier provides POTS service. In installation 800, VoIP services are provided directly to devices 806 and handsets 808. To achieve this, adapter unit 804 is installed on-site along with devices 806 and handsets 808. Adapter unit 804 includes a Foreign Exchange Office (FXO) gateway (SIP server) 810 that is connected via a POTS interface to a carrier switch 802. Adapter unit 804 further includes a Wi-Fi access point and/or Ethernet switch 812 that provides access to the Internet via an IP link and that is connected to FXO gateway 810.

FXO gateway 810 allows devices 806 to register with it and maintains a local numbering plan. Thus, FXO gateway 810 essentially operates as a home PBX. Communication between each device 806 and FXO gateway 810 is via Wi-Fi access point/Ethernet switch 812. Preferably, each handset 808 is also capable of communicating with FXO gateway 810 via Wi-Fi or some other protocol capable of supporting SIP communication. FXO gateway in turn communicates with carrier switch 802 via one or more POTS lines.

In installation 800, legacy POTS equipment may be connected to a POTS interface to receive POTS service directly from carrier switch 802. Wi-Fi access point/Ethernet switch 812 can be used by devices 806 to access digital media or other information for providing services to a user. Wi-Fi access point/Ethernet switch 812 may either be integrated within adapter unit 804 or comprise one or more separate stand-alone devices.

Figure 9:
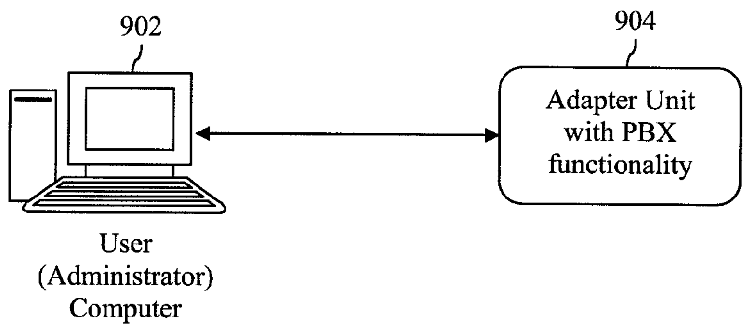
FIG. 9 depicts an embodiment in which an adapter unit within a system for providing telephony and digital media service provides PBX-like features to a user of a computer connected to the adapter unit.

Depending upon the implementation, the adapter unit described above in reference to FIG. 7 or FIG. 8 may be configured to function as a "mini-PBX," offering a variety of features to a user acting as administrator. For example, the adapter unit may be configured to present a Web page, Adobe® Flash® movie, or some other interface that provides programmatic control to a user of a computer that is connected to the adapter unit. The computer may be connected to the adapter unit via a wired interface, such as an Ethernet or Universal Serial Bus interface, or via a wireless interface, such as an 802.11 interface. Such a configuration is depicted in FIG. 9, which shows a computer 902 connected to an adapter unit 904 having PBX functionality (which may represent, for example, adapter unit 706 of FIG. 7 or adapter unit 806 of FIG. 8) for the purpose of providing a user with programmatic control over certain features implemented by adapter unit 904.

The adapter unit may be configured to discover new devices or handsets in a location such as a home. The discovery protocol may be implemented, for example, using an IP protocol or via DECT.

The adapter unit may also be configured to present a list of newly-discovered devices and handsets to the user. The adapter unit may permit a user to assign names, locations and/or extension numbers to the devices/handsets. In an implementation in which the devices and handsets are VoIP devices, the adapter unit may allow a user to define a numbering plan (e.g., 4-digit extensions) and assign numbers to the devices. If DECT is used for communication with the devices, then single-digit identifiers may instead be used due to limitations associated with that protocol. The adapter unit may also be configured to allow a user to assign an owner to a device, wherein the association of an owner with a device may cause other items of information to be associated with the device. Thus, for example, if a particular owner is associated with a device, then the device may be configured with a contact list associated with the particular owner.

The adapter unit may also be configured to allow a user to manage permissions for each connected device or handset. Such permissions may include, for example: time-of-day restrictions on calls (e.g., no calls after 10:00 PM except for 911 calls); dialing restrictions (e.g., no calls to 1-900 numbers or international numbers); call restrictions (e.g., no outgoing calls or no incoming calls); and restrictions on the ability to modify device settings or add/modify/delete contacts. This list of examples is by no means exhaustive and other types of permissions may be managed as will be appreciated by persons skilled in the relevant art(s).

The adapter unit may also be configured to present a user with status information associated with each device/handset. Such status information may include, and is not limited to, whether a device is in use, whether a device is still functioning (i.e., whether the device is "alive" or "dead"), and other properties associated with a device.

II.C Example Device Hardware Architecture

Figure 10:
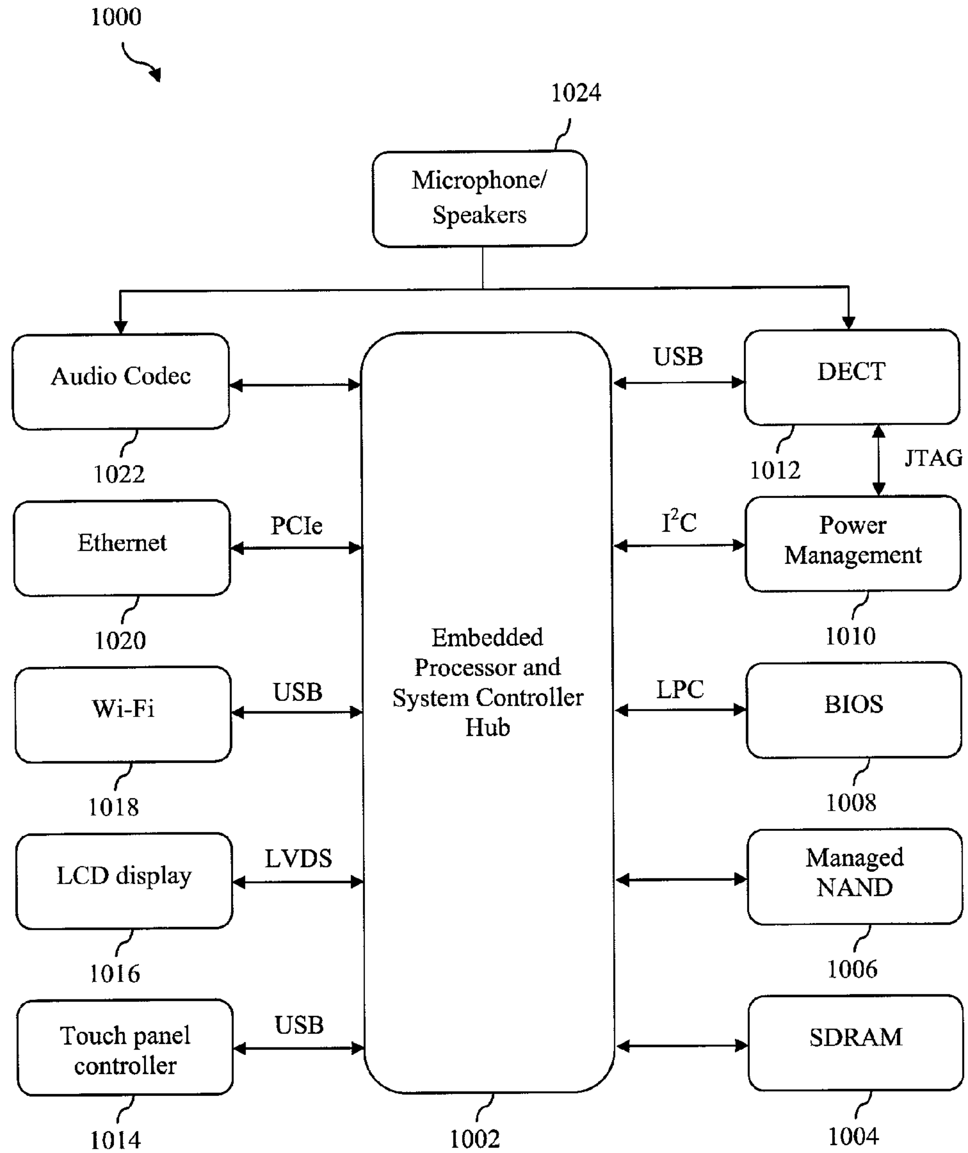
FIG. 10 is a hardware block diagram of an exemplary telephony and digital media services device.

FIG. 10 is a block diagram of an example hardware architecture 1000 of device 110. This hardware architecture is described by way of example only and is not intended to limit the present invention. Persons skilled in the relevant art(s) will readily appreciate that other hardware architectures may be used to implement device 110 that are within the scope and spirit of the present invention.

As shown in FIG. 10, hardware architecture 1000 includes an embedded processor and system controller hub 1002 that is connected to a plurality of peripheral devices or chips. The embedded processor is preferably one that has been designed for use in portable and low-power applications, such as Mobile Internet Devices (MIDs). The system controller hub comprises a chipset that handles peripheral input/output (I/O) and performs memory and power management functions for the embedded processor. In one embodiment, the embedded processor comprises a 1.1 Gigahertz (GHz) Intel® Atom™ processor designed and sold by Intel Corporation of Santa Clara, Calif., and the system controller hub comprises the Intel® System Controller Hub US15W Chipset, also designed and sold by Intel Corporation of Santa Clara, Calif., although this is only one example; other processors can be implemented into the architecture 1000.

As shown in FIG. 10, hardware architecture 1000 includes volatile system memory in the form of SDRAM (Synchronous Dynamic Random Access Memory) 1004. In one embodiment, the embedded processor supports an integral 64-bit-wide 4-Gigabits (Gbits) of DDR2 (Double Data Rate 2) SDRAM clocked at 533 Megahertz (MHz). In such an embodiment, SDRAM 1004 may comprise four 512 Megabit (Mbit) DDR2 SDRAM 667 MHz integrated circuits (ICs) directly mounted onto a motherboard along with embedded processor and system controller hub 1002. The capacity may be increased from 512 Megabytes (MB) to 1 gigabyte (GB) by populating the board with four 1 Gbit ICs instead. However, these are only examples, and other DDR2 SDRAM configurations, other types of SDRAM, or other types of volatile memory may be used.

Hardware architecture 1000 also includes non-volatile memory in the form of a managed NAND flash memory 1006, although other forms of non-volatile memory may be used. In one embodiment, managed NAND flash memory 1006 comprises a 512 MB or 1 GB MMC NAND flash memory that is mounted on a motherboard along with embedded processor and system controller hub 1002. The use of an MMC NAND flash memory avoids the inclusion in device 110 of spinning media storage devices, such as hard disk drives or optical drives. The use of an MMC NAND flash memory also means that it is not necessary to employ wear-leveling and error correction when using a file system such as YAFFS2 and that an EXT3 file system can be used instead.

Hardware architecture 1000 further includes a chip 1008 for storing the system BIOS. In one embodiment, chip 1008 comprises an 8 Mbit NOR flash memory that is connected to the system controller hub via a Low Pin Count (LPC) bus, although this is only an example.

Power management functions are performed in hardware architecture 1000 by a power management chip 1010. In one embodiment, power management chip 1010 comprises an Intel® Mobile Voltage Positioning chip designed and sold by Intel Corporation of Santa Clara, Calif. that is connected to embedded processor and system controller hub 1002 via an Inter-Integrated Circuit ($I^2C$) bus. Power management chip 1010 is used to sequence power to embedded processor and system controller hub 1002. As a secondary function, a subset of a plurality of general purpose input/output (GPIO) connections of power management chip 1010 are used to connect to a Joint Test Action Group (JTAG) interface of a DECT processor 1012 (to be described below). This enables updating of the firmware of DECT processor 1012 in a manner that minimizes the likelihood that the firmware will be left in an unrecoverable state.

Hardware architecture 1000 also includes a DECT processor 1012. In one embodiment, DECT processor 1012 comprises a DECT base station processor that supports up to five handsets. In an implementation in which DECT processor 1012 has no explicit hardware reset input, a GPIO connection from the embedded processor may be used to reset the device by turning its power supply off and then on again.

A Universal Serial Bus (USB) is used to transfer audio (e.g., up to four channels of audio) in each direction between DECT processor 1012 and the system controller hub. DECT processor 1012 may be configured to act as the bus master and drive the USB bus. In an implementation in which the maximum speed of the USB bus is 4.096 MHz, DECT processor 1012 may drive the USB bus with a bit clock rate of 2.048 MHz.

In one embodiment, universal asynchronous receivers/transmitters (UARTS) on the system controller hub and DECT processor 1012 implement a 115200 baud channel that is used to transfer control and data packets between the two. Packets on this link are encapsulated using Serial Line IP (SLIP) (as documented in Request for Comments: 1055, published by the Internet Engineering Task Force, June 1988). Layered on top of this is a cordless telephone application programming interface (CTAPI) protocol. The CTAPI protocol comprises request, response and event message types. These message types all have a common header and, optionally, some data. Responses and events are asynchronous; each request is tagged with a sufficiently unique identifier that is copied into a header of the corresponding response. The identifier is used to match responses with their originating requests.

To perform an API operation (e.g., obtain firmware version number, go off-hook, update handset name, etc.), a main application running on the embedded processor sends a request message to DECT processor 1012 or to one of handsets 120 via DECT processor 1012. The message recipient performs the requested actions and returns a response. Additionally, a spontaneous action such as a handset going off-hook or propagating a name or address book update can generate an event message to be sent from DECT processor 1012 to the embedded processor.

In one embodiment, DECT processor 1012 is configured to execute acoustic echo cancellation (AEC) software. In accordance with such an embodiment, a microphone and speakers 1024 internal to device 110 are connected directly to DECT processor 1012 whenever speakerphone functionality of device 110 is in use. During high-fidelity audio playback, however, speaker and microphone 1024 are connected to an audio codec 1022.

As noted above, hardware architecture 1000 includes an internal microphone and speakers 1024. The microphone may comprise a mono microphone and the speakers may comprise stereo speakers with an associated stereo amplifier. The speakers may be driven by an audio codec 1022. In one embodiment, audio codec 1022 comprises a 2-channel audio codec such as the Intel® High Definition Audio (HDA) system designed and sold by Intel Corporation of Santa Clara, Calif. In such an embodiment, audio codec 1022 connects to embedded processor and system controller hub 1002 via an HDA bus.

A stereo jack may be provided on device 110 for connecting headphones or an external amplifier and speakers to audio codec 1022. In one embodiment, when a plug is inserted into this jack, the internal speakers are automatically disconnected and their amplifier is powered down. The state of this jack may be determined by software.

As described above in reference to FIG. 1, device 110 includes an LCD display 1016. As shown in FIG. 10, LCD display 1016 connects to embedded processor and system controller hub 1002 via a low-voltage differential signaling (LVDS) connection over twisted pair copper cables. In one example implementation, LCD display 1016 comprises a thin film transistor (TFT) LCD display that has a 7 inch (17.8 centimeter (cm)) wide screen and supports 24-bit color. LCD display 1016 may provide an active viewing area of 152.4 millimeters (mm)×91.4 mm, support a pixel format of 800×480 pixels, and have a pixel pitch of 0.1805 (H)×01.905 (V). LCD display 1016 may further provide a 15:9 aspect ratio, a display mode that is normally white, LED backlighting, and a brightness of approximately 350 candelas per square meter (cd/m$^2$).

In an embodiment, LCD display 1016 may be used in both a transmissive mode and a reflective mode. In accordance with such an embodiment, a color display may be used when in the transmissive mode and a very low-power monochrome display may be used when in the reflective mode. In further accordance with such an embodiment, the LCD backlight for the transmissive mode may be provided by white light emitting diodes (LEDs). In particular, multiple LEDs may be connected in series into three chains in order to equalize their brightness. These chains may then be powered in parallel. LEDs from all three chains may be interleaved to minimize the impact of a single chain burning out. In one implementation, up to 60 milliamps (mA) of current at 25.6 Volts (V) is provided to drive the backlight. Two signals may be used to control the backlight operation. The first signal enables/disables the backlight and the second signal is pulse-width modulated to generate a voltage that varies the brightness of the backlight.

As also described above in reference to FIG. 1, a touch panel is integrated with LCD display 1016 to provide a user interface to device 110. The touch panel includes an integrated programmable system on chip (PSOC) controller 1014 that is connected to embedded processor and system controller hub 1002 via a USB bus.

In one embodiment, the touch panel comprises a 7 inch capacitive touch panel having a glass surface. As will be appreciated by persons skilled in the relevant art(s), capacitive touch panels are highly responsive to the touch of a finger, but do not respond to other types of touches. Consequently, the use of such a panel reduces the chance of false touches from jewelry, clothing or other contaminants. Furthermore, it is expected that such a glass capacitive touch panel will be more durable and last longer than other types of touch panels such as resistive touch panels. A glass capacitive touch panel will also have less of an impact on screen brightness as compared to resistive touch panels.

Hardware architecture 1000 further includes an internal Wi-Fi controller 1018 for supporting wireless networking. Wi-Fi controller 1018 is connected to embedded processor and system controller hub 1002 via a USB interface. In one embodiment, Wi-Fi controller 1018 comprises an 802.11b/g controller. In an alternative embodiment Wi-Fi controller 1018 comprises an 802.11b/g/n controller. Wi-Fi controller 1018 may include an integrated internal antenna.

Hardware architecture 1000 also includes an Ethernet chip 1020 that supports wired networking in accordance with the Ethernet protocol. In one embodiment, Ethernet chip 1020 comprises a 10/100/1000 Mbps Ethernet chip. As shown in FIG. 10, Ethernet chip 1020 is connected to embedded processor and system controller hub 1002 via a PCI Express (PCIe) bus. An external RJ45 jack is provided on device 110 to facilitate connection to Ethernet chip 1020.

Hardware architecture 1000 may further include an external USB 2.0 port (not shown in FIG. 10) that connects to embedded processor and system controller hub 1002 via a USB bus. Also not shown in FIG. 10 is a power supply that is connected to hardware architecture 1000 and supplies power thereto. In one embodiment the power supply comprises a 5V, 4A AC power supply.

Figure 11:
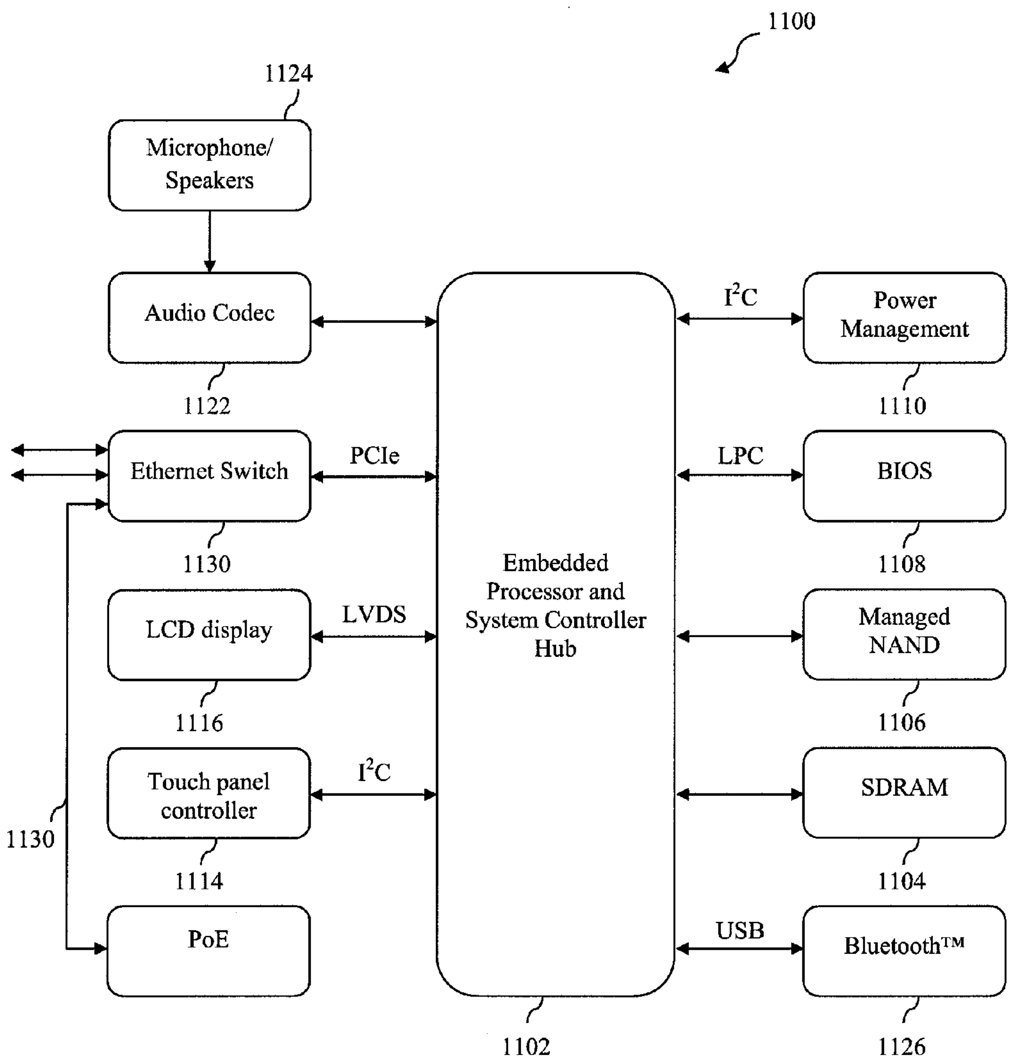
FIG. 11 is a hardware block diagram of an exemplary telephony and digital media services device designed for office environments.

FIG. 11 depicts an alternate hardware architecture 1100 for a device 110 that has been designed specifically for office environments. Hardware architecture 1100 may be thought of as a modified version of hardware architecture 1000 of FIG. 10, or vice versa. As shown in FIG. 11, hardware architecture 1100 does not include a DECT processor for wireless handset support or a Wi-FI controller for 802.11 wireless networking. These features may be deemed less useful or not useful in an office environment.

Hardware architecture 1100, however, does include some additional elements as compared to hardware architecture 1000. These include a Bluetooth® adapter 1126, an Ethernet switch 1130, and a Power over Ethernet (PoE) connector.

Bluetooth® adapter 1126 allows an end user to invoke the telephony features of device 110 using a Bluetooth® cordless headset or like device. Bluetooth® adapter 1126 may be connected to embedded processor and system controller hub 1102 via a USB bus. In a further embodiment, hardware architecture 1100 may also include an integrated charger that allows an end user to charge the battery or batteries of a Bluetooth® cordless headset or like device by plugging the device into a USB port, mini-USB port, or other suitable port of device 110.

Ethernet switch 1130 comprises a multi-port (e.g., two-port) Ethernet switch with an additional port host interface via PCIe. Ethernet switch 1130 provides a convenient Internet pass-through for other network-capable devices (e.g., personal computers, laptops, printers, storage devices, or the like) that might be used in an office environment. Because it is a switch, Ethernet switch 1130 allows multiple Ethernet devices to be connected to a single Ethernet connection in a non-interfering manner.

PoE connector 1130 comprises a connector that allows power to be delivered to device 110 via an Ethernet connection. In one embodiment, PoE connector 1130 comprises an eight-pin RJ-45 connector that uses two pairs for power (two for + and two for −) as well as the normal two pairs for data (1-2, 3-6). A switching regulator with good isolation (transformer and opto-coupler).

Although not shown in FIG. 11, hardware architecture 1100 may further include a fingerprint scanner that allows device 110 to be placed in a locked/unlocked state by only authorized user(s). Such protection may be deemed desirable in an office environment. In a further embodiment, the configuration of device 110 (e.g., owner, phone number, contacts, etc.) may be determined based on the fingerprint used to unlock device 110.

The other components shown in FIG. 11 (embedded processor and system controller hub 1102, SDRAM 1104, managed NAND 1106, BIOS 1108, power management 1110, touch panel controller 1114, LCD display 1116, audio codec 1122 and microphone/speakers 1124) are generally similar to like-named elements of hardware architecture 1000, although certain implementation details may vary. In addition, both of the embodiments shown in FIGS. 10 and 11 can include components for wide area networks (WAN), wired or wireless. These components will not be described herein for the sake of brevity.

II.D Example Device Software Architecture

Figure 12:
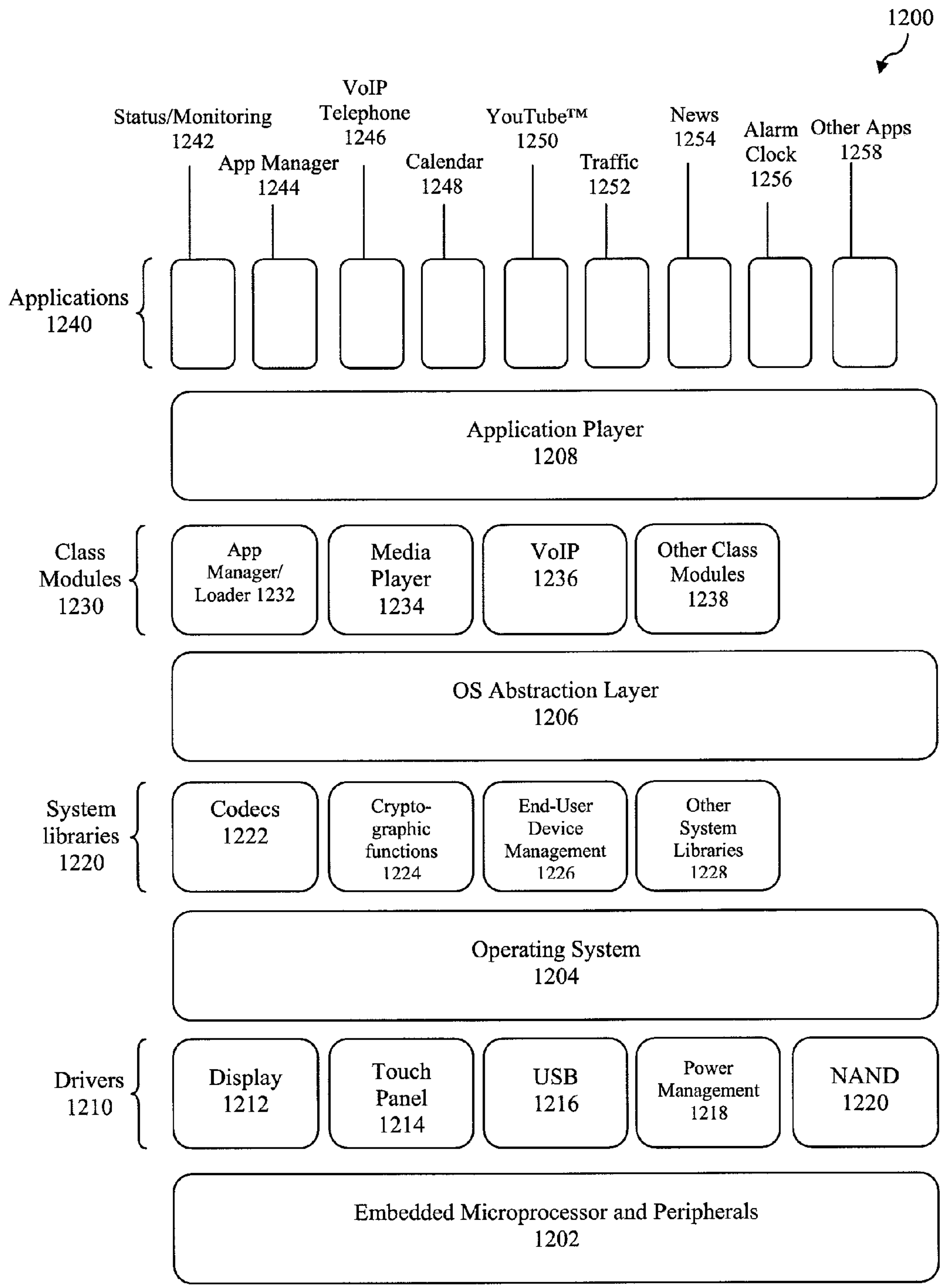
FIG. 12 is a block diagram of an exemplary architecture of a telephony and digital media services device.

FIG. 12 is a block diagram of an example software architecture 1200 of device 110. As shown in FIG. 11, software architecture 1200 includes a plurality of software components running atop an embedded processor and peripherals 1202. As noted above, the embedded processor preferably comprises a processor designed for use in portable and low-power applications, such as Mobile Internet Devices (MIDs), and in one embodiment comprises an Intel® Atom™ processor designed and sold by Intel Corporation of Santa Clara, Calif.

The embedded processor executes an operating system 1204 that provides a context for the execution of system and application processes that will be described in more detail herein. In one embodiment, operating system 1204 comprises a Linux-based operating system, such as an Ubuntu® MID Edition operating system based on Linux kernel release 2.6.24, although this is only an example. In one embodiment, operating system 1204 is optimized through custom configuration for a small size and rapid startup.

Certain system and/or application processes that run in the context of operating system 1204 are designed to interact with hardware peripherals that are communicatively connected to the embedded microprocessor. To facilitate such interaction, software architecture 1200 includes a plurality of device drivers 1210, each of which provides an abstraction layer between a hardware peripheral and the system and/or application processes that use it.

As shown in FIG. 12, device drivers 1210 include a device driver 1212 for facilitating interaction with a display, a device driver 1214 for facilitating interaction with a touch panel associated with the display, a device driver 1216 for facilitating interaction with a Universal Serial Bus (USB) device or port, a device driver 1218 for facilitating interaction with a power management device, and a device driver 1220 for facilitating interaction with a managed NAND flash memory. These are only examples, and other device drivers 1210 may be used depending on the hardware peripherals present in telephony and digital media services device 110.

As further shown in FIG. 12, software architecture 1200 also includes a plurality of shared system libraries 1220 that contain code and data that may be used to provide services to independent programs running in the context of operating system 1204. System libraries 1220 include codecs 1222, cryptographic functions 1224, home device management services 1226, and other system libraries 1228.

Codecs 1222 are utilized for performing compression and decompression of multimedia content such as images, audio content and video content. Codecs 1222 may include, for example, codecs for compressing/decompressing images in accordance with one or more of the JPEG, TIFF, PNG, GIF and BMP image compression formats, codecs for compressing/decompressing audio content in accordance with one or more of the MP3, WAV, WMA and RealAudio audio compression formats, and codecs for compressing/decompressing video content in accordance with one or more of the MPEG-2, MPEG-4 part 2, MPEG-4 part 10 (H.264), WMV 9, DivX, VC1 and FLV compression formats. However, these are only examples and other types of codecs may be used.

Cryptographic functions 1224 comprises a library of cryptographic algorithms and tools that may be utilized for encrypting and decrypting data. End-user device management services 1226 include functions necessary to implement protocols for remotely managing end-user devices, such as protocols in accordance with the DSL Forum Technical Specifications TR-069/TR-111.

As shown in FIG. 12, software architecture 1200 also includes an operating system (OS) abstraction layer 1206 that runs atop operating system 1204. OS abstraction layer 1206 serves to insulate any component running above it (e.g. application player 1208 and applications 1240) from any idiosyncrasies of operating system 1204. This serves to localize the efforts of porting applications to a single component.

Software architecture 1200 further includes a plurality of class modules 1230. Class modules 1230 comprise libraries, such as C and/or C++ libraries, that may be used by certain applications to perform certain functions. In one embodiment, class modules 1230 define function calls that can be made available to one or more applications running in the context of application player 1208. For example, class modules 1230 may define ActionScript function calls that can be made available to one or more Shockwave Flash (SWF) applications that are executed by application player 1208. As will be described in more detail herein, class modules 1230 may be downloaded to telephony and digital media services device 110 along with applications that they support.

Class modules 1230 include an application (app) manager/loader 1232 which provides functionality for an application (app) manager application 1244, a media player 1234 that provides functionality for applications that play back digital media, and a VoIP module 1236 that provides functionality for a VoIP telephony application 1246. VoIP module 1236 may provide, for example, access to SIP functionality, audio engine functionality and DECT functionality used in performing VoIP telephony operations. Class modules 1230 also include additional class modules 1238 as well. Additional class modules 1238 may include, for example, APIs for sending requests to Web services made available over a Wide Area Network (WAN) such as the Internet and receiving content responsive to the requests.

Software architecture further includes an application player 1208. In one embodiment, application player 1208 comprises an Adobe® Flash® Player or an equivalent Flash® player, suitable for executing Shockwave Flash (.swf) files to display vector-based animations, to stream audio and video content, and to allow various forms of user interaction. Application player 1208 may comprise, for example, a Flash®-compatible player that has been optimized for embedded environments. In accordance with such an embodiment, application player 1208 provides support for an embedded scripting language called ActionScript, which is based on ECMAScript. Application player 1208 may provide native support for a plurality of ActionScript function calls. Furthermore, as noted above, class modules 1230 may define additional ActionScript function calls that can be used by one or more applications that are executed by application player 1208.

Software architecture 1200 further includes a plurality of applications 1240, each of which may be executed by application player 1208. Applications 1240 may comprise Flash® applications. Applications 1240 may be selectively executed by users to invoke telephony or digital media services provided by device 110. Where an application provides digital media services, such services may be provided using functionality and/or data stored locally with respect to device 110 as well as using remotely-located functionality and/or data, such as functionality and/or data obtained over a WAN such as the Internet. For example, provision of a digital media service may entail invoking a Web service via the Internet.

As shown in FIG. 12, these applications may include a status/monitoring application 1242, an application (app) manager 1244, a VoIP telephone 1246, a local or network calendar 1248, a YouTube™ application 1250, a traffic monitoring application 1252, a news application 1254, an alarm clock 1256, and other applications 1258.

Other applications 1258 may include for example, a calculator, a local or network address book, a media player, an Internet radio/video application, a weather application, a comics application, a to-do list application, a world clocks application, a countdown timer (e.g., days until Christmas), a games application (e.g., solitaire, Soduko, Tetris, etc.), a Web browser, an e-mail application, a city guide application, a wireless cameras application, a home monitoring application, a home control application (e.g. lights, audio/video (A/V) system, HVAC, UPnP), a Flickr™ photos application, a Google™ talk application, a map application, a directory services/yellow pages application, an EPG (TV Guide) application, a word of the day application, a joke of the day application, a quotations application, a dictionary application, a movie times application, a delivery services application, an RSS reader, a stock ticker, or a social networking application, such as a Ning™ or Facebook™ application. Various features associated with certain ones of these applications will be described in more detail herein.

The use of Flash® applications to implement the various GUI screens of device 110 provides distinct advantages over using more traditional programming languages such as C or C++. For example, development of GUI screens using Flash® is simpler and easier as compared to programming bit maps in C code. Furthermore, because Flash® files are small, a complex GUI screen may be rendered smoothly and at very high speeds. Also the use of Flash® applications provides a distinct separation between the implementation of a GUI screen and the underlying functionality, such that the GUI screen may be constructed, revised or upgraded without affecting underlying programs.

II.D.1 Systems Software

Figure 13:
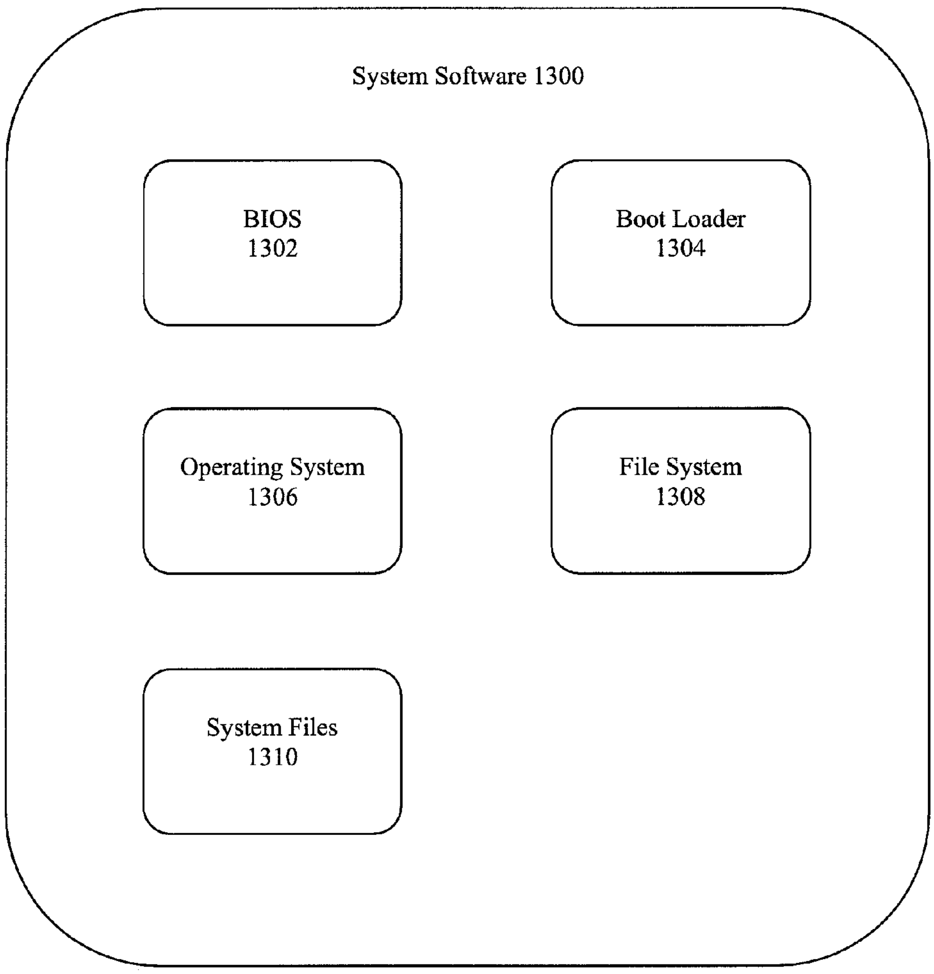
FIG. 13 is a block diagram that depicts exemplary system elements of a telephony and digital media services device.

FIG. 13 is a block diagram that depicts systems software elements 1300 of the software architecture of device 110 in accordance with an embodiment of the present invention. As shown in FIG. 13, systems software elements 1300 include a BIOS 1302, a boot loader 1304, an operating system 1306, a file system 1308, and system files 1310. Each of these elements will now be described.

BIOS 1302 defines a software interface between the operating system and the platform firmware and hardware of device 110. BIOS 1302 is stored in non-volatile memory that is connected to a system controller hub within device 110 and is executed automatically at system startup. In one embodiment, BIOS 1302 is stored in an 8 Mbit NOR flash memory that is connected to the system controller hub via an LPC bus.

In one implementation, BIOS 1302 comprises a software interface defined in accordance with the Extensible Firmware Interface (EFI) specification. As will be appreciated by persons skilled in the relevant art(s), EFI comprises an improved replacement of the legacy BIOS used by all IBM PC-compatible computers. EFI has a modular structure that provides a set of modular interfaces that replace the traditional BIOS interfaces. EFI dramatically shortens boot times and improves the reliability of the boot architecture while providing full legacy support.

In an embodiment, BIOS 1302 may also be thought of as encompassing a video BIOS. The video BIOS provides a set of video-related functions that are used by programs to access video hardware within device 110. The video BIOS may comprise for example an Intel® Embedded Graphics Driver (IEGD) video BIOS, developed and sold by Intel Corporation of Santa Clara, Calif., although this is only an example.

In one embodiment of the present invention, BIOS 1302 outputs a splash screen to the display of device 110 during system startup. In a further embodiment, system hardware allows a video feed to be overlaid upon the splash screen prior to initialization of a graphic sub-system. In such an embodiment, the video feed functionality may be used to overlay a visual progress indicator upon the splash screen during system startup. The visual progress indicator may comprise a status bar, text, or some other visual indicator of the progress of the loading of BIOS 1302 and booting of the operating system. This visual progress indicator can advantageously be used both by developers during manufacturing and end-users after deployment to monitor device performance. Such a visual progress indicator can be displayed even in an instance where initialization of the graphic sub-system has failed.

Boot loader 1304 comprises a program that is launched by BIOS 1302 during system startup and that is configured to load operating system 1306 of device 110. As noted above, in one embodiment, operating system 1306 comprises a Linux-based operating system, such as an Ubuntu® MID Edition operating system based on Linux kernel release 2.6.24, that has been optimized through custom configuration for a small size and rapid startup.

Boot loader 1304 and the files that comprise operating system 1306 are each stored within a file system 1308 implemented using non-volatile storage. In one embodiment, the non-volatile storage comprises a managed NAND flash memory that is connected to a system controller hub within device 110.

In one implementation, file system 1308 comprises two distinct file systems: a Virtual File Allocation Table (VFAT)

file system that is used to store boot loader 1304 and an EXT3 file system that is used to store operating system files and application files. A VFAT file system may be required for storing boot loader 1304 in an implementation in which BIOS 1302 comprises an EFI BIOS that can only read files from a VFAT file system.

In order to ensure system operability, in a further embodiment, a fail-safe version of the operating system kernel is stored in the VFAT file system while another updateable version of the operating system kernel is stored in the EXT3 file system. The fail-safe version of the operating system and boot loader 1304 are not updateable (or are only updateable in a highly restricted manner), thereby providing a means for starting up the system even when the updateable version of the operating system kernel is corrupted (e.g., due to a failed update). In such a case, the fail-safe version of the operating system can be booted from the VFAT file system and can load its file system from VFAT into volatile memory (e.g., SDRAM) and run out of the volatile memory. This allows for files in the EXT3 file system to be repaired without fear of overwriting the kernel. This approach also allows for diagnostic testing and the establishment of a network connection to a known server to download the latest stable version of the system firmware (operating system and applications).

In one embodiment, boot loader 1304 selects the fail-safe kernel instead of the updateable kernel image based on a flag stored in non-volatile storage, which as noted above may comprise a managed NAND flash memory. This flag may be set to select the fail-safe kernel by a process monitor daemon when the process monitor daemon determines that the operating system has been in an unresponsive state for a period of time that equals or exceeds a predetermined period of time. The flag may also be set to select the fail-safe kernel when the system first boots and may be reset to select the updateable kernel upon successful startup of the operating system and process monitor daemon. If the system fails to boot, then a subsequent attempt to boot will force the fail-safe kernel image to boot.

In an embodiment in which the non-volatile memory comprises a managed NAND flash memory, certain features may be implemented to ensure that the EXT3 file system is written to as seldom as possible in order to extend the useful life of the managed NAND flash memory. These features may include, for example, configuring applications that access the EXT3 file system to ensure that such applications do not frequently write files to the file system and configuring the length of a journaling interval of the EXT3 file system so that the lifetime of the managed NAND flash memory will extend beyond the expected lifetime of device 110. Another feature that may be used to extend the life of the managed NAND flash memory comprises turning off a feature of the EXT3 file system that records the last access time of a file. These features are provided by way of example, and other features not described here may be used to extend the life of the managed NAND flash memory.

System files 1308 comprise shared libraries that contain code and data that may be used to provide services to independent programs running in the context of operating system 1306. In an embodiment, the number of system files 1308 maintained on the system is kept to a minimum to conserve system resources. Such files may be stored in an EXT3 file system as described above and updated or added to as needed to support system and application programs.

In one implementation, BIOS 1302, boot loader 1304, operating system 1306 and system files 1308 are all updateable. As noted above, restrictions may be placed on updating boot loader 1304 and a fail-safe version of operating system 1306 that reside in a VFAT filing system in order to ensure that those software modules do not become corrupted. Safe updates of BIOS 1302 may be achieved by maintaining separate version of BIOS 1302 within the same non-volatile memory, such that a first version of BIOS 1302 can be updated while a second version of BIOS 1302 may be maintained in case the update of the first version of BIOS 1302 fails, thereby resulting in the corruption of the first version.

II.D.2 Application Framework

As will be described in more detail in this section, the software architecture of device 110 provides a framework that supports a variety of applications, including applications that delivery telephony and digital media services to an end user. To ensure that device 110 may be deployed by a variety of different service providers (e.g., telecommunications companies, multi system operators, Internet Service Providers, or the like), the application framework supports multiple GUI themes and languages, proprietary protocols, and incremental deployment of applications. The application framework also provides an infrastructure within which a variety of different applications can operate and co-exist without any preconceived notion of what those applications may be. For example, although device 110 may support VoIP telephony, device 110 may nevertheless be deployed without a VoIP telephony application.

The application framework also provides a modular approach for deploying applications such that a common set of application can be deployed for different service providers. Application deployment models supported by the framework include subscription models in which a user of device 110 determines at runtime which applications are to be installed as well as a model in which a static set of applications are deployed that are updated monolithically. Because multiple applications may be deployed, each of which may generate asynchronous events, the application framework also provides a method for synchronizing applications.

Figure 14:
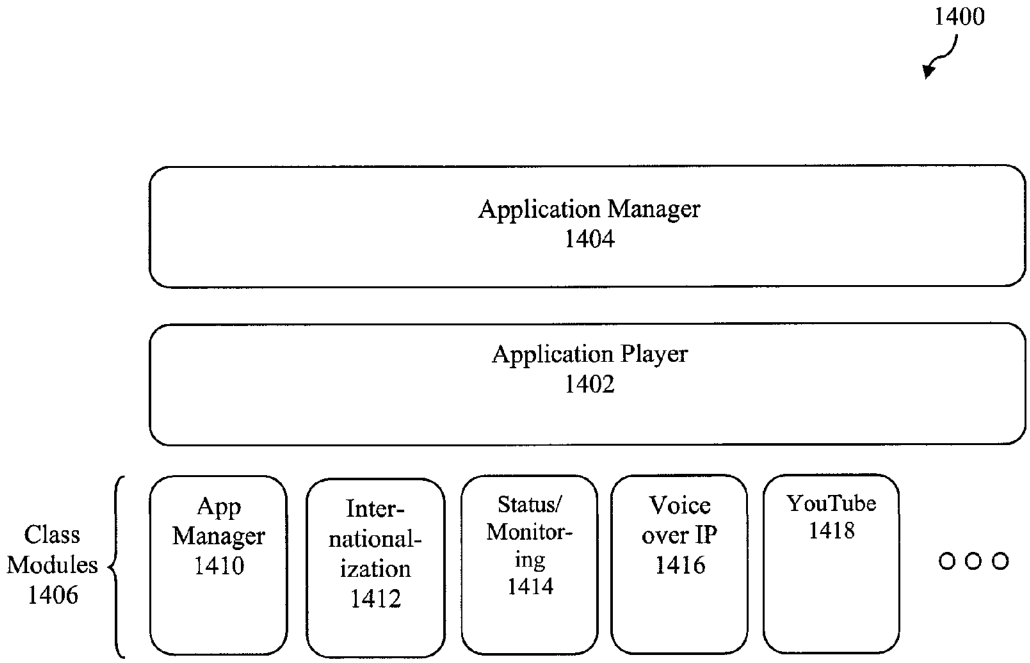
FIG. 14 is a block diagram of an exemplary application framework that may be implemented by a telephony and digital media services device.

FIG. 14 is a block diagram of an application framework 1400 that may be implemented by device 110. As shown in FIG. 14, application framework 1400 includes an application player 1402 that is analogous to application player 1208 described above in reference to FIG. 12. Application player 1402 provides native support for a plurality of ActionScript function calls. In the absence of desired functionality, application player 1402 may be enhanced by adding custom software libraries, such as custom C/C++ libraries, that define additional ActionScript function calls. Such libraries are denoted class modules 1406 in FIG. 14 and are analogous to class modules 1230 described above in reference to FIG. 12. A class module 1406 may be introduced in conjunction with a new application. Also, several class modules 1406 may be provided as part of an initial deployment to assist applications with common functionality such as usage monitoring and language translations.

As shown in FIG. 14, class modules 1406 may include an application manager class module 1410, an internationalization class module 1412, a status/monitoring class module 1414, a VoIP class module 1416, a YouTube™ class module 1418, as well as other class modules. YouTube™ class module 1418 is representative of a class module that provides an API for allowing an application to request and obtain digital content from a Web service such as YouTube™.

Application framework 1400 further includes an application manager 1404, which in an embodiment comprises one or more movie applications. Application manager 1404 may also be thought of as encompassing corresponding class module 1410, which serves to extend the functionality thereof.

Application manager 1404 comprises the launching point for all applications on the system.

In particular, application manager 1404 is configured to interrogate corresponding class module 1410 for a list of available applications, which in one embodiment is acquired from a local XML file. In one embodiment, the list contains sets of Uniform Resource Locators (URLs) that identify an icon movie and application movie corresponding to each application. Application manager 1404 can then display each application icon accordingly via the GUI provided by touch-panel display of device 110. When a user selects an icon, application manager 1404 invokes the corresponding application URL. Because the icons are themselves small applications, they can advantageously be configured to include animations, or to include intelligence for presenting dynamically-changing data such as current weather conditions, stock prices, or time of day.

The following provides an example of an XML configuration file that lists two applications:

```
<apps>
    <app name= "Phone" version="1.0"
    GUID="00df-3434-cccc-3422">
        <icon url= "file://apps/phone/icon__phone.swf"/>
        <app url=file://apps/phone/app__phone.swf/>
    </app>
    <app name="YouTube" version="1.0"
    GUID="00df-3664-aacc-3555">
        <icon url="file://apps/youtube/icon__youtube.swf"/>
        <app url=file://apps/youtube/app__youtube.swf/>
    </app>
</apps>
```

As mentioned above, depending on the deployment model, new and updated applications may be distributed as part of a monolithic update, or incrementally on a device or subscriber basis. In one example of an incremental approach, application manager 1404 is configured to query a remotely-located application server for the latest list of available applications. A user may also optionally be allowed to select certain applications. In response, the application server returns a list that identifies an installation package for each of the various applications. The identification for each installation package may comprise a URL. The following provides an example of such a list:

```
<apps>
    <app name="App1" install= "http://www.customer.com/app1.tar"/>
    <app name="App2" install= "http://www.customer.com/app2.tar"/>
</apps>
```

In the foregoing example, each installation package comprises an archive file. Application manager 1404 may be configured to retrieve and install the applications by executing a shell script (which may be denoted, for example, "install.sh") that is contained in each installation package archive. Once the installation process is complete, application manager 1404 updates the local XML file that contains the list of all installed applications. Similarly, if a user wishes to remove an application, application manager 1404 can be invoked to execute an uninstall shell script that was provided as part of the installation package.

Figure 15:
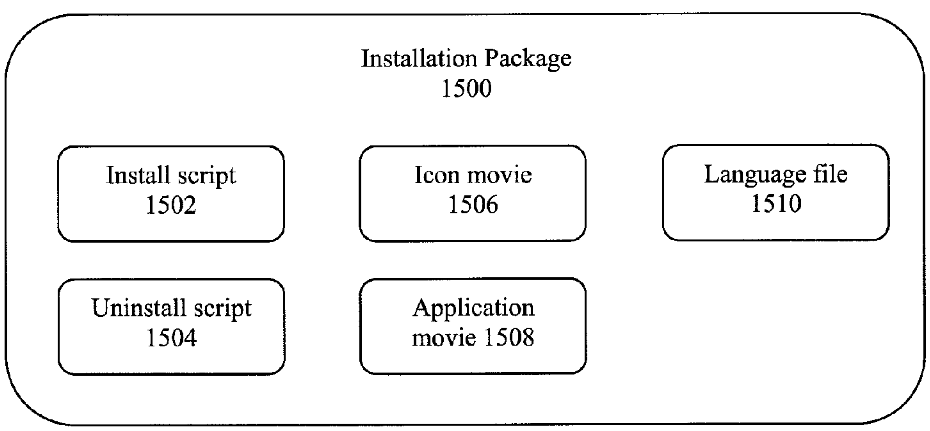
FIG. 15 depicts an exemplary application installation package that may be provided from a remote application server to a telephony and digital media services device.

FIG. 15 depicts an example installation package 1500 that may be provided from a remote application server to device 110 in accordance with one embodiment of the present invention. As shown in FIG. 15, application package 1500 includes an install script 1502 that may be executed to install an application, an uninstall script 1504 that may be executed to uninstall an application, an icon movie 1506 that may be executed to display an icon representative of the application within a GUI, an application movie 1508 that may be executed to deliver the functionality of the application to a user, and a language file 1510 that may be used to provide representations of text elements to be displayed by the application in one or more languages.

A sample directory structure of an application installed on device 110 is as follows:

```
/tango
/apps
    /guid
        /install.sh
        /uninstall.sh
        /icon__app1.swf
        /app__app1.swf
        /language.xml
```

In the foregoing, "install.sh" is the name of an install shell script, "uninstall.sh" is the name of an uninstall shell script, "icon_app1.swf" is the name of the icon movie used to represent the application on the GUI, "app_app1.swf" is the name of the application movie, and "language.XML" is an XML file that includes representations of text elements to be displayed by the application in one or more languages.

Figure 16:
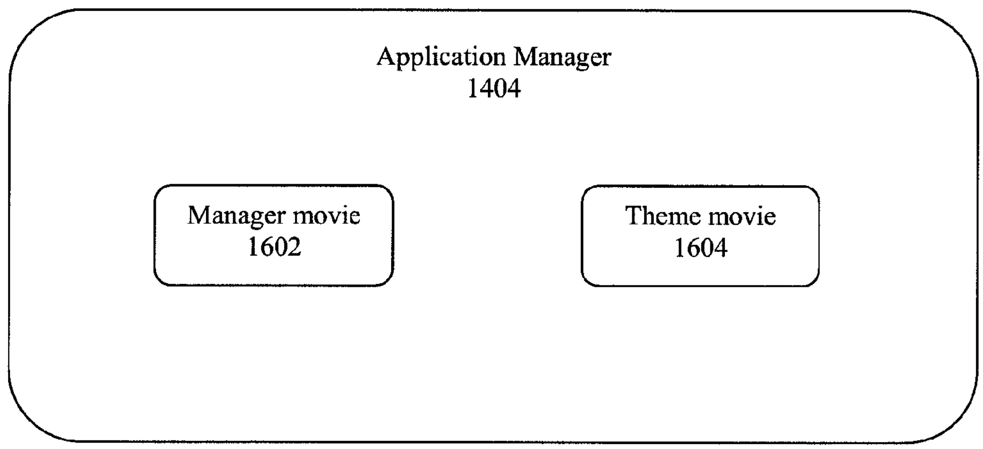
FIG. 16 depicts an exemplary application manager that comprises two movie applications.

FIG. 16 depicts an embodiment of the invention in which application manager 1404 comprises two Flash® movie applications: a manager movie 1602, which may be denoted "manager.swf", and a theme movie 1604, which may be denoted "theme.swf". The prefix .swf denotes a Shockwave Flash file. This embodiment will now be described in more detail.

Figure 17:
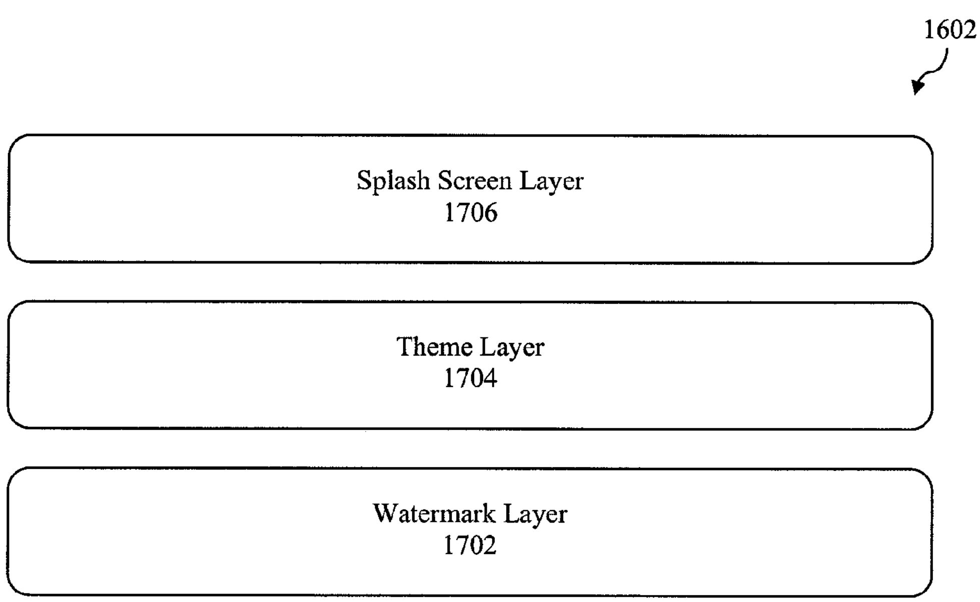
FIG. 17 depicts an exemplary manager movie portion of an application manager.

Manager movie 1602 consists of three layers as illustrated in FIG. 17: a watermark layer 1702, a theme layer 1704 and a splash screen layer 1706. Watermark layer 1702 is optional and is reserved for a branding statement that is viewable via transparent application layers. Above that, theme layer 1704 serves as a container in which theme movie 1604 is loaded. Splash screen layer 1706 is visible during initialization time. Once theme movie 1604 has been loaded, splash screen layer 1706 becomes transparent. Splash screen layer 1706 may contain minimal graphical assets.

Figure 18:
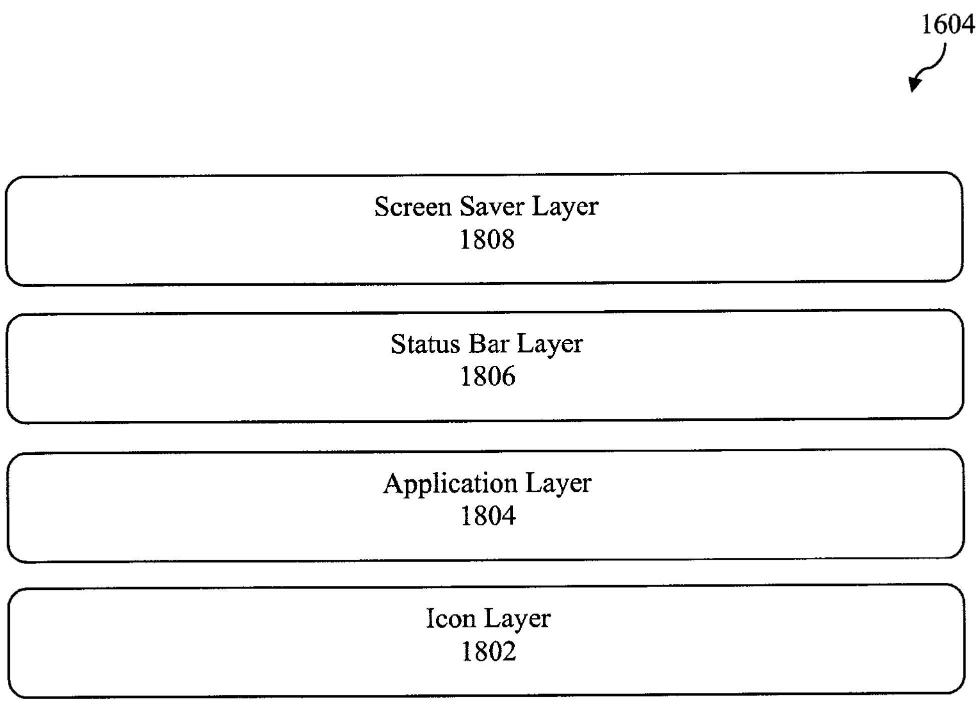
FIG. 18 depicts an exemplary theme movie portion of an application manager.

One purpose of theme movie 1604 is to provide a vehicle by which a service provider deploying device 110 can customize the look and feel of the GUI of device 110. Theme movie 1604 consists of four layers as illustrated in FIG. 18: an icon layer 1802, an application layer 1804, a status bar layer 1806 and a screen saver layer 1808. Icon layer 1802 is used to present small graphic representations of the various applications that are available on device 110. Each icon presented within icon layer 1802 itself comprises a movie. Application layer 1804 is reserved for the application movies that are executed by application player 1402. Within this layer, multiple applications can be stacked. When a user selects an icon, the corresponding application is launched by pushing it onto the application layer stack, hiding icon layer 1802. When the application stack is emptied, icon layer 1802 becomes visible again. Status bar layer 1806 is used to display common information such as titles, navigational buttons and date/time. Screen saver layer 1808 may optionally be overlaid on the other three layers when device 110 has been active for some period of time. The conditions under which screen saver layer 1808 is displayed and the content of the layer may be configurable by a user.

The foregoing application framework further provides common components for alerts, keyboards, a movie player, options, and a photo viewer. Applications may interact with these components via ActionScript listener objects.

II.D.2.a Application Interaction

With continued reference to FIG. 18, when a user launches an application, the application is granted focus and is thus presented in application layer 1804 hiding the lower icon layer 1802. Thus, when an application is running, icon movies continue to run in icon layer 1802 although they are hidden. In one implementation of application framework 1400, a user must exit an active application in order to execute another application. This approach may be deemed suitable for a majority of use cases. However, there are certain scenarios that may require a different approach. For example, consider the case in which an asynchronous network event arrives at a class module 1406, but the Flash® movie corresponding to the class module is not active.

As a specific example, assume that a YouTube™ application is active at the time an incoming telephone call arrives at VoIP class module 1416. Desired behavior may be that the YouTube™ application would be paused, a VoIP telephone application would be instantiated on the GUI foreground, and a user would be allowed to answer or ignore the telephone call. If the user chose to answer the call, then the telephone application would remain active. However, if the user chose to ignore the call, then the telephone application would be dismissed and the YouTube application would regain focus and automatically resume.

To implement this behavior, an embodiment of the invention espouses a solution that allows a class module 1406 to surface an asynchronous event during a period when its corresponding application movie is not active. In accordance with this embodiment, each icon movie associated with an application is required to register an event listener with its corresponding class module. When an asynchronous event is raised by the class module, the corresponding icon movie is notified directly. Subsequently, the icon movie requests that application manager 1404 launch the application represented by the icon movie—for example, the icon movie may request that application manager 1404 launch a specified application URL. Prior to executing the URL, a function of the currently-active application is called (which may be denoted "onFocusOut") to allow the currently-active application to take action (e.g., pausing a movie). Next, application manager 1404 launches the URL and the corresponding application ("the event application") is displayed in the foreground. During initialization, the trigger event is passed to the event application as a means to communicate context. When the event application is eventually dismissed, a function associated with the underlying inactive application (which may be denoted "onFocusIn") is called to allow that application to take further action (e.g., resume playback of a movie).

Figure 19:
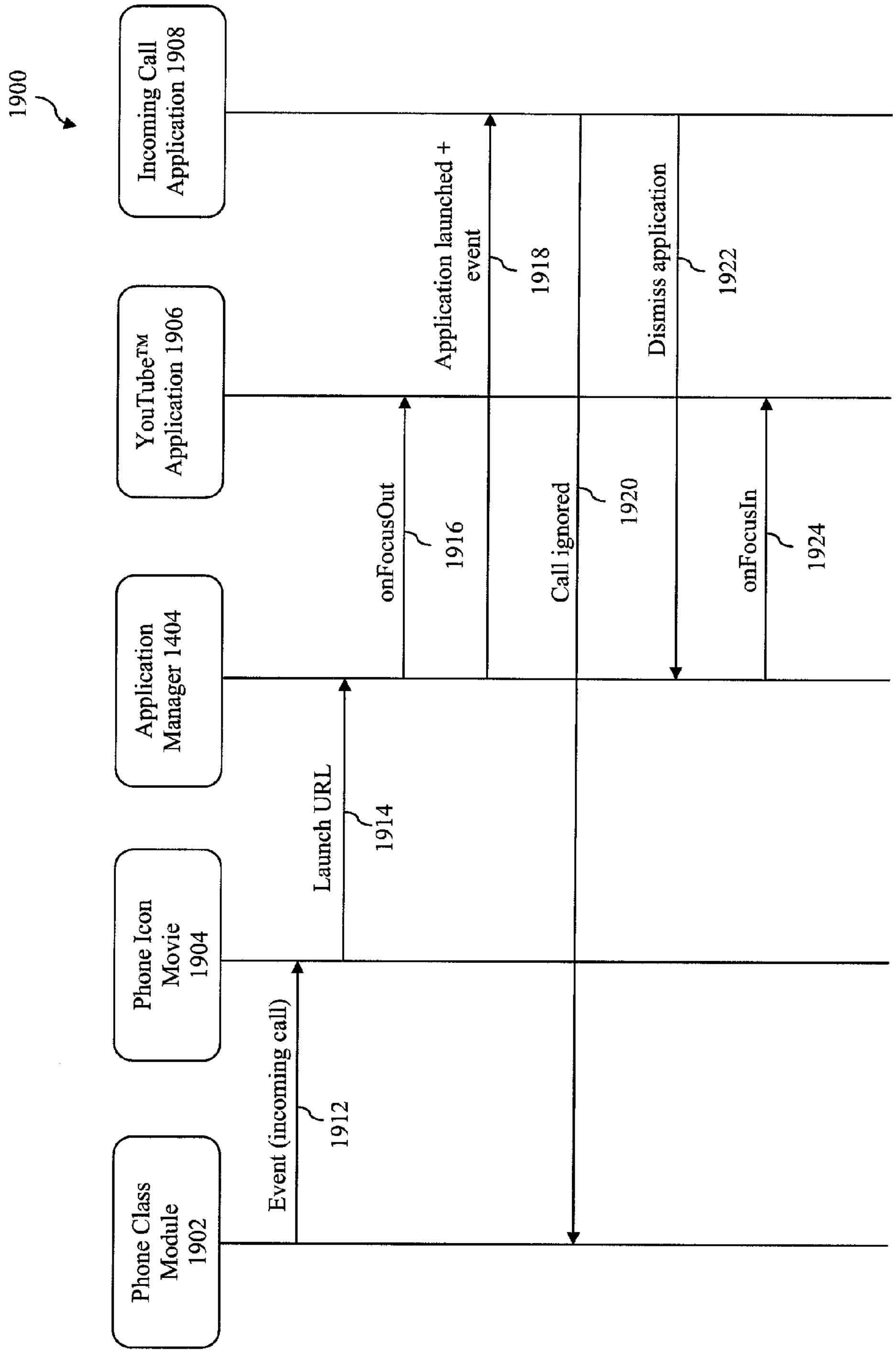
FIG. 19 is a diagram that illustrates an exemplary process for handling an asynchronous event associated with an inactive application during execution of an active application.

The foregoing process will now be described in reference to a specific example process 1900 illustrated in FIG. 19. As shown in FIG. 19, the process begins at step 1912 when a phone class module 1902 notifies a corresponding phone icon movie 1904 of an asynchronous event—namely, an incoming telephone call. As discussed above, phone icon movie 1904 previously registered an event listener with phone class module 1902 that makes such notification possible.

At step 1914, responsive to being notified of the event, phone icon movie 1904 requests that application manager 1404 launch the appropriate application for handling the event, which in this case is an incoming call application 1908. Requesting that application manager 1404 launch incoming call application 1908 may comprise requesting that application manager 1404 launch a specified URL associated with incoming call application 1908.

Prior to launching incoming call application 1908, application manager 1404 places a function call to a currently-active YouTube™ application 1906 as shown at step 1916. This function call is denoted "onFocusOut" in FIG. 19. Placement of this function call allows YouTube™ application 1906 to take some action in advance of launching of incoming call application 1908. This action may comprise, for example, pausing playback of a movie or some other action.

Figure 20:
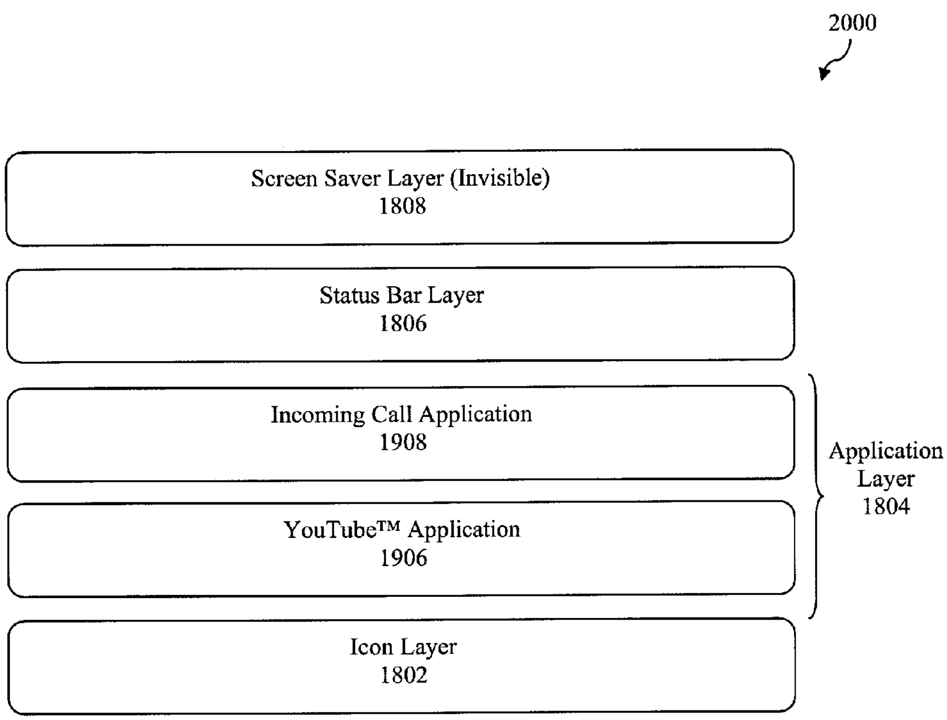
FIG. 20 is a diagram depicting the overlaying of a first application movie with a second application movie pursuant to an asynchronous event handling protocol in accordance with an embodiment of the present invention.

At step 1918, after placing the onFocusOut function call, application manager 1404 launches incoming call application 1908 (for example, by launching a specified URL associated with the application) and passes the incoming call event to application 1908 for appropriate handling. At this point, the interface for incoming call application 1908 is overlaid on top of YouTube™ application interface in application layer 1804 of theme movie 1604. This is depicted in FIG. 20, which shows incoming call application 1908 and YouTube™ application 1906 executing at different Z orders within application layer 1804. The call application 1908 interface may allow the user to perform a variety of actions, including answering the incoming call or ignoring the incoming call. Answering the call may cause yet another application to be launched to perform necessary functions or the necessary functions may be handled exclusively by incoming call application 1908 depending upon the implementation.

In process 1900, it is assumed that the user chooses to ignore the call through some form of interaction with a GUI of incoming call application 1908 or through inaction. In this case, the fact that the call was ignored 1920 is reported from incoming call application 1908 to phone class module 1902 as shown at step 1920. After the call has been ignored, incoming call application 1908 is dismissed either automatically or through some user action. The dismissal of the application is reported to application manager 1404 as shown at step 1922 at which point application manager 1404 removes incoming call application 1908 from application layer 1804.

At step 1924, after incoming call application 1908 has been dismissed, application manager 1404 places a function call to currently inactive YouTube™ application 1906 as shown at step 1924. This function call is denoted "onFocusIn" in FIG. 19. Placement of this function call allows YouTube™ application 1906 to take some action responsive to the dismissal of incoming call application 1908. This action may comprise, for example, resuming playback of a movie or some other action.

It is noted that an application can leverage multiple class modules. For example, if an address book application required support for click-to-dial, e-mail and SMS, it could leverage VoIP, e-mail and SMS class modules. This example introduces an interesting issue. If a user activated a click-to-dial function from the address book, an out-bound call would be initiated from the VoIP class module. The user would need to operate the phone. Given the event listening feature discussed above, the event associated with placing a call would surface accordingly, resulting in the phone application being launched in the foreground. The address book application need only have knowledge of the APIs exposed by the VoIP module. The application framework implements the rest.

II.D.2.b Application Watchdog Timers

Figure 21:
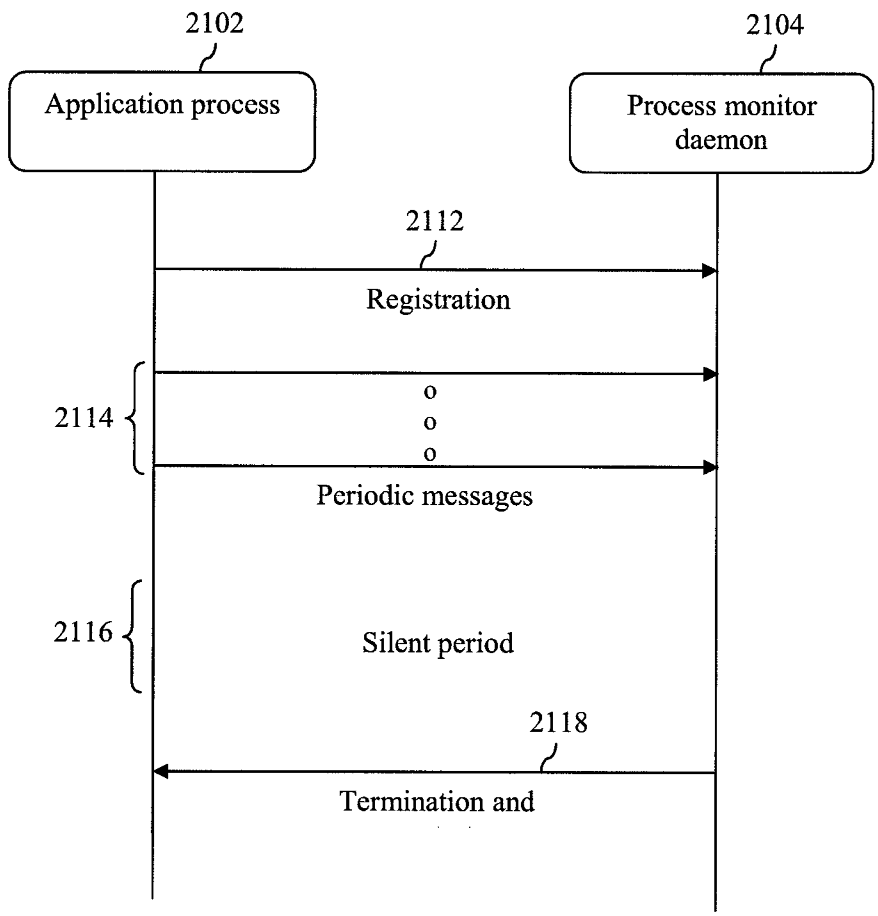
FIG. 21 is a diagram depicting the use of an exemplary watchdog timer to monitor application liveliness.

In one embodiment of the present invention, software watchdog timers are used to monitor application liveliness. FIG. 21 provides a diagram illustrating such an approach. As shown in FIG. 21, after an application process 2102 has been launched, application process 2102 sends a registration message 2112 to register itself with a process monitor daemon 2104. After registration, application process 2102 periodically sends messages 2114 to process monitor daemon 2104 to prove that it is still operating. Upon receipt of each message 2114, process monitor daemon 2104 resets a watchdog timer. If process monitor daemon 2104 fails to receive a message from application process 2102 after a period of time that is greater than or equal to the maximum value of the watchdog timer, denoted silent period 2116 in FIG. 21, process monitor daemon 2104 assumes that application process 2102 is unresponsive, terminates application process 2102, and then restarts it as denoted by reference numeral 2118 in FIG. 21.

Application restart behavior may be configurable on a per-application basis. In one embodiment, one can define the maximum number of restarts per time before an application is considered to be in a state of perennial failure and the action to take in that case. Actions may include uninstalling the application (running an uninstall script that is associated with the application) or rebooting the entire system. The user may be presented with an on-screen dialog in either case. Also, in certain implementations, such actions will not be undertaken while a telephone call is in progress.

Process monitor daemon 2104 may also be configured to monitor the operating condition of the operating system of device 110 using a watchdog timer in a like manner to that described above in reference to FIG. 21. If the watchdog timer expires before the operating system sends a reporting message to process monitor daemon 2104, then process monitor daemon 2104 forces a reboot of the operating system.

II.D.2.c Application Portability

Figure 22:
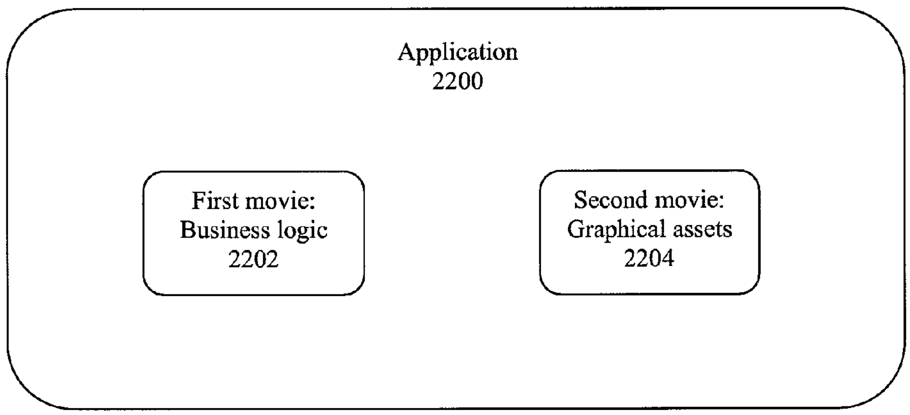
FIG. 22 illustrates an application that includes an exemplary first movie that comprises the business logic of the application and an exemplary second movie that comprises the graphical assets of the application.

Different service providers may wish to deploy the same application. However, each service provider may want the application to reflect its own graphical theme. To simplify the porting effort, an embodiment of the invention implements each application as two movies. An example of this is depicted in FIG. 22, which shows an application 2200 that comprises a first movie 2202 that comprises the business logic of the application and a second movie 2204 that comprises the graphical assets of the application. This approach advantageously allows an application to be ported by simply replacing theme movie 2204, removing most of the risks of regression.

II.D.2.d Internationalization of Applications

In accordance with an embodiment of the invention, multiple language support is achieved by enabling applications to query application manager 1404 for text translation. The active language can be defined on a user or device basis. When application manager 1404 launches an application, it will pass a unique application identifier, which may be referred to as a global unique identifier (GUID), to the application using an application programming interface (API). This API may be denoted the "startApplication" API. Subsequently, the launched application passes the GUID, an identifier of the text to be translated, and optionally the language to translate to. If the language parameter is not provided, application manager 1404 uses a system default language (e.g., English). Application manager 1404 returns the corresponding text in the selected language from a language XML file associated with the application. The functions for querying for and obtaining text translation may be included within internationalization class module 1412 in FIG. 14.

II.D.2.e Activity Logging and Device Heartbeating

An embodiment of the present invention provides the ability to log application usage, system configuration and system health to a remote server. At the application level, each application notifies status/monitoring class module 1414 of page transitions and other events, such as placing a phone call, clicking a button, or entering a search term. The amount of detail reported may vary from application to application. Application manager 1404 also contacts status/monitoring class module 1414 to report application launch and exit events. In an embodiment, application launch occurs when a user activates an application icon and application exit occurs when a user returns back to the icon screen.

Figure 23:
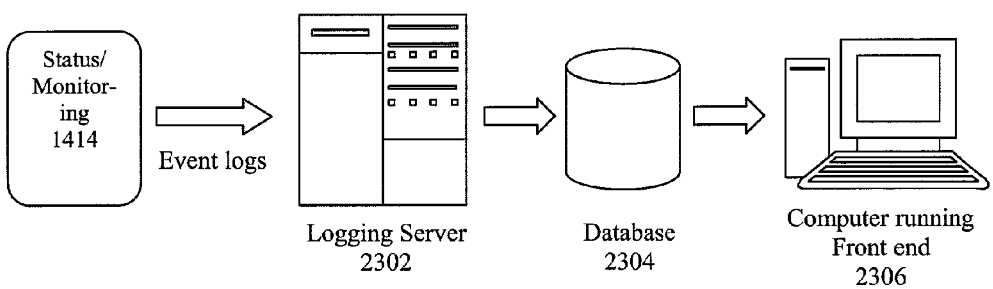
FIG. 23 is a block diagram of an exemplary system for logging and reviewing application usage information, system configuration information and system health information associated with one or more telephony and digital media services devices.

As represented by FIG. 23, status/monitoring class module 1414 accumulates the reported event information in event logs and periodically sends the logs to a configured remote logging server 2302. In one embodiment, status/monitoring class module 1414 will attempt to send this data every five minutes by default. If logging server 2302 is not reachable, status/monitoring class module 1414 will append new events to the log and then will attempt to send the data again. The number of events that may be added to a log may be limited to some predefined number. Events may be marked with timestamps indicative of the time at which each event occurred. In one embodiment, the timestamps are stored as relative offsets so as not to rely on the time of day setting on each specific device 110. In accordance with such an embodiment, the offsets may be converted to a time-of-day timestamp at logging server 2302.

Logging server 2302 is configured to receive a sequence of logs from a plurality of deployed devices 110 and to add each log record to a database 2304, which is shown in FIG. 23. A front end, such as a Web front end, executing on a computer 2306 may then be used to provide a human-friendly interface for viewing the data. Where a Web front end is used, the Web pages may comprise PHP programs that perform Structured Query Language (SQL) queries on the data and allow a user to examine aspects such as the top applications used by a specific group of users or the amount of time customers spend in different applications. Understanding which applications are most popular is valuable to service providers deploying applications via devices 110. Such information can be used, for example, to perform trend spotting and to drive new application development.

Figure 24:
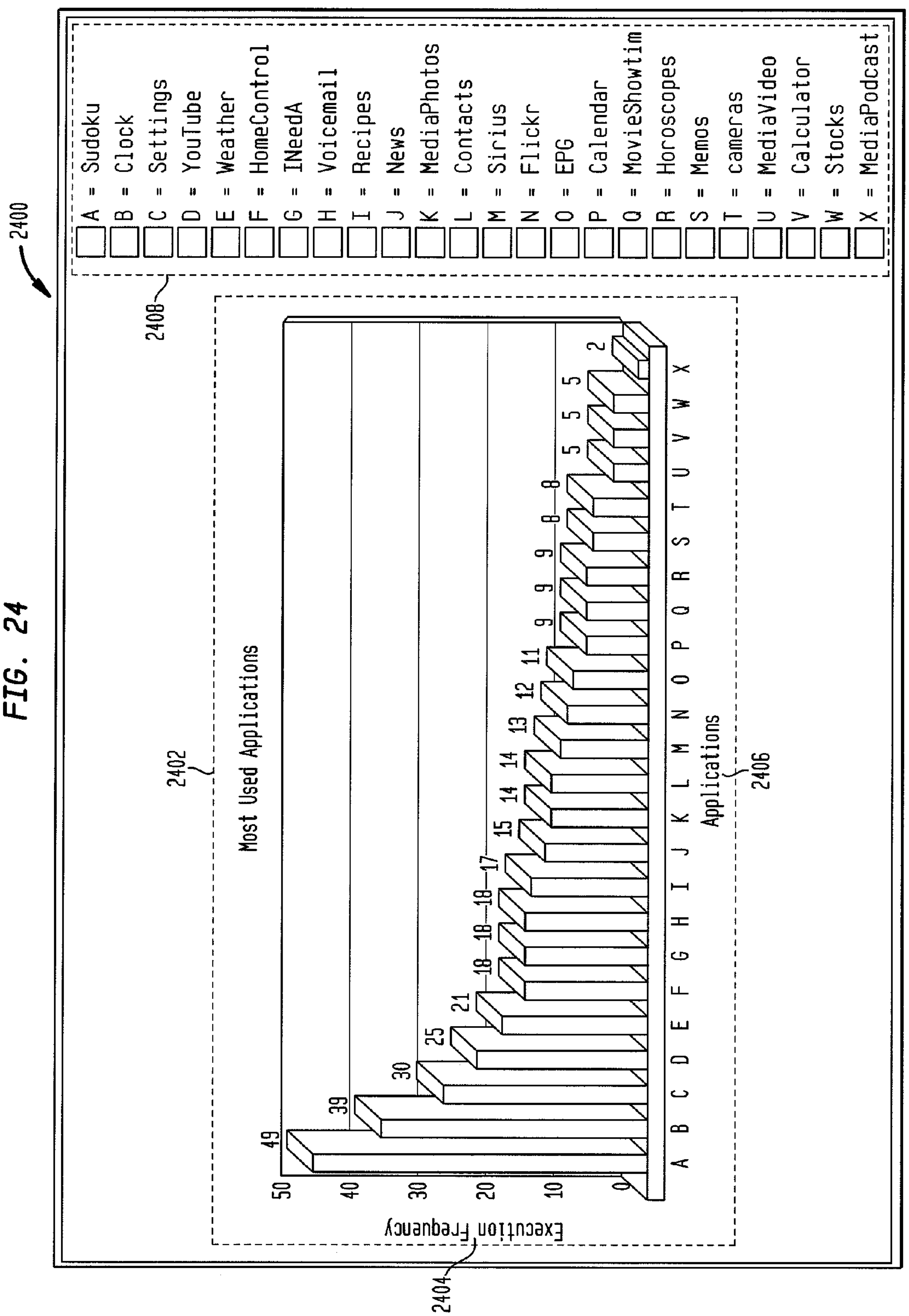
FIG. 24 depicts an exemplary interface screen that may be presented by an exemplary system for reviewing application usage information associated with one or more telephony and digital media services devices.

FIG. 24 depicts an example interface screen 2400 that may be presented by computer 2306 in accordance with an embodiment of the present invention. As shown in FIG. 24, interface screen 2400 presents a bar chart 2402 showing an execution frequency 2404 of a plurality of applications 2406 that comprise a plurality of most used applications. Each application 2406 is represented by a different colored bar, as shown by a legend 2408.

Figure 25:
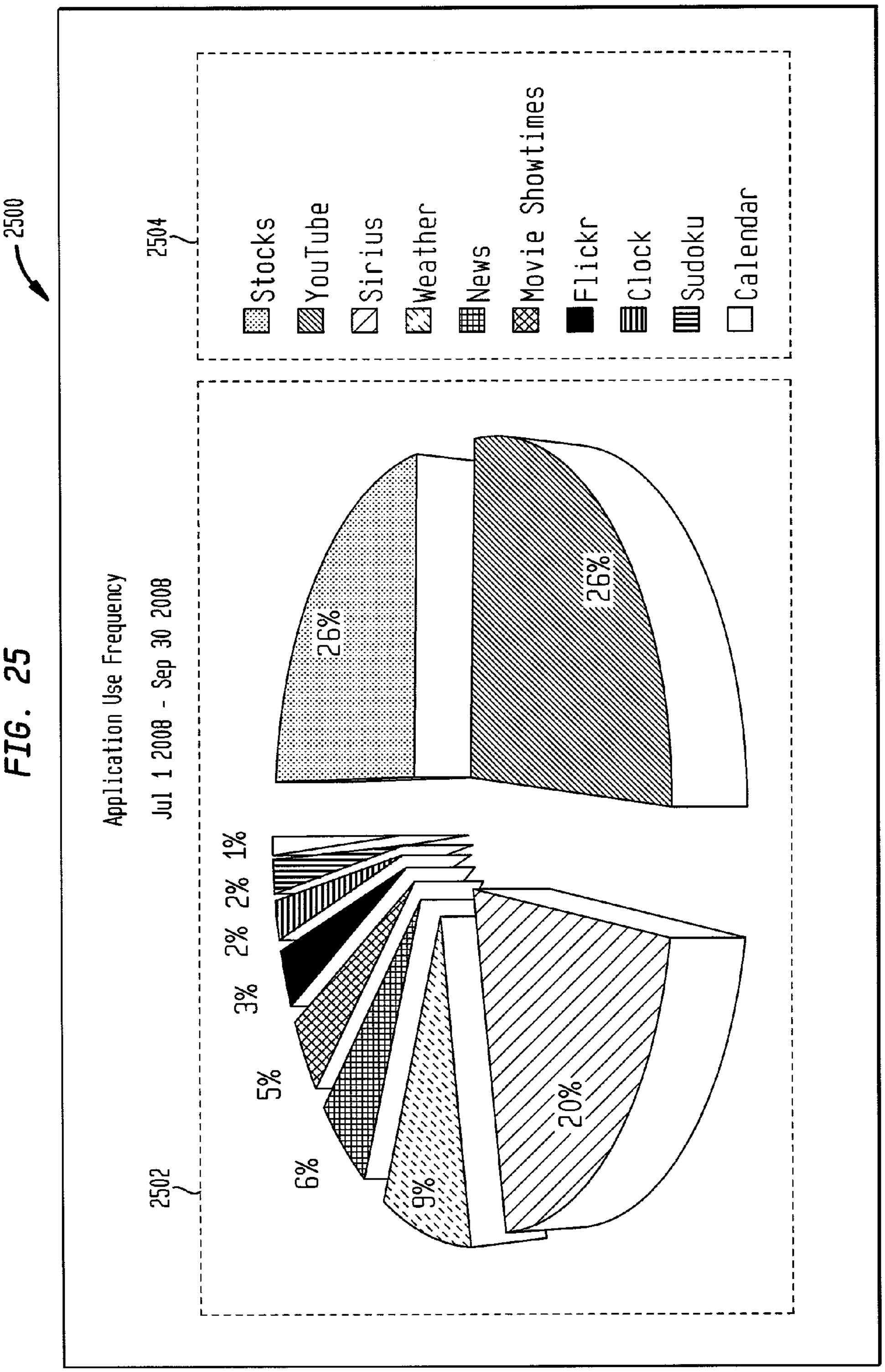
FIG. 25 depicts another exemplary interface screen interface screen that may be presented by an exemplary system for reviewing application usage information associated with one or more telephony and digital media services devices.

FIG. 25 depicts another example interface screen 2500 that may be presented by computer 2306 in accordance with an embodiment of the present invention. As shown in FIG. 25, interface screen 2500 presents a pie chart 2502 showing a frequency of use of a plurality of applications as a percentage of a total frequency of use over a given time period. Each application is represented by a different colored sector of the pie chart, as shown by legend 2504.

Figure 26:
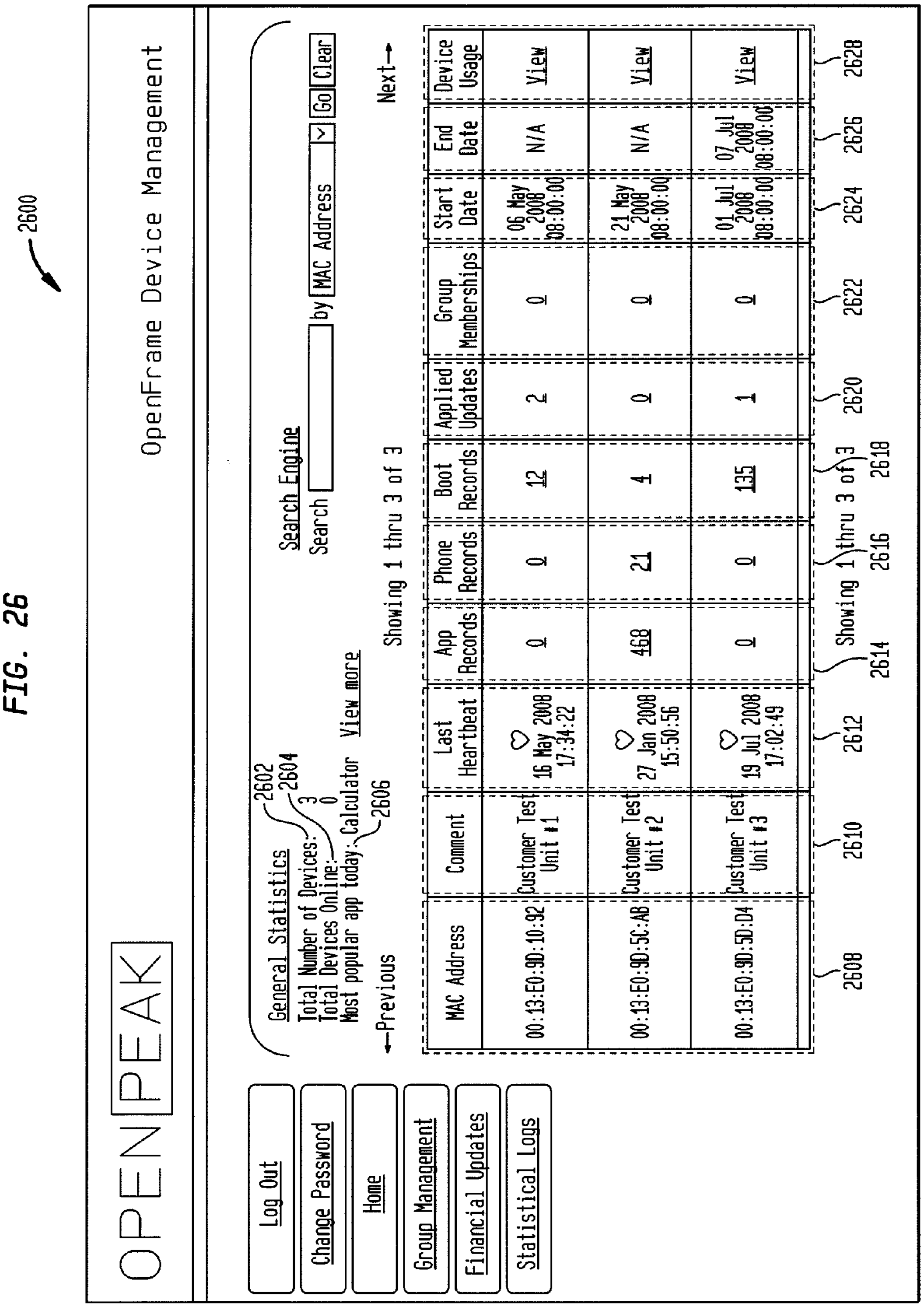
FIG. 26 depicts an exemplary interface screen that may be presented by an exemplary system for reviewing application usage information, system configuration information and system health information associated with one or more telephony and digital media services devices.

Periodic updates received by logging server 2302 may also serve as a device heartbeat, allowing logging server 2302 to present a status of active or dead devices. The front end presented by computer 2306 may include a Web interface that shows a list of devices 110 associated with a particular customer and a visual indicator of the last heartbeat status of each such device 110. An example of such an interface 2600 is shown in FIG. 26. As shown in that figure, interface 2600 includes a column 2612 that displays a last heartbeat date and time for a plurality of devices associated with a customer.

Other information that may be obtained by logging server 2602 and provided by interface 2600 includes a total number of devices associated with the customer 2602, a total number of devices associated with the customer that are currently online 2604, a most popular application for the day 2606 (based on customer usage), a MAC address for each device 2608, a comment for each device 2610, a number of application records for each device 2614 (which itself comprises a link to the application records), a number of phone records for each device 2616 (which itself comprises a link to the phone records), a number of boot records for each device 2618 (which itself comprises a link to the boot records), a number of applied updates for each device 2620 (which itself comprises a link to information about the applied updates), a number of group memberships for each device 2622 (which itself comprises a link to information about the group memberships), a start date for each device 2624, an end date for each device 2626, and a link to device usage information for each device 2628. The information collected and presented by server 2302 may be useful for performing status monitoring, troubleshooting, upgrading and service provisioning.

In an embodiment, logging server 2602, database 2304 and computer 2306 each comprise part of a device monitoring subsystem that is described in Section II.G.2 below.

II.E Example Handset Implementation Details

Example implementation details concerning handset 120 will now be provided. As discussed above in reference to FIG. 1, each handset 120 includes a user interface that comprises both a display 122 and a keypad 124. In an embodiment, display 122 comprises a 2 in. (5.1 mm) 18-bit color TFT LCD display having an active viewing area of 31.68 mm×39.6 mm, a pixel format of 176×220 pixels, a pixel size of 0.18 mm×0.18 mm, LED backlighting, and a maximum brightness of 350 cd/$m^2$. Keypad 124 comprises a standard telephone keypad including 10 numbers, "*" and "#" keys. In an embodiment, each key is implemented using a pressure membrane switch that is responsive to 180 grams of pressure.

Figure 27:
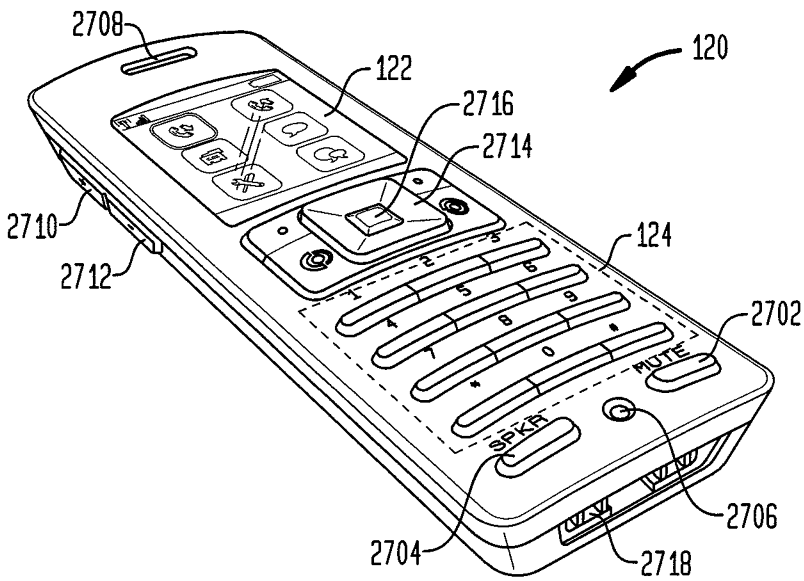
FIG. 27 is a front perspective view of an exemplary handset.

As shown in FIG. 27, handset 120 further comprises user interface navigation controls in the form of a 4-way scroll pad 2714 and a selection/activation button 2716 (also referred to as an "OK" button).

Figure 28:
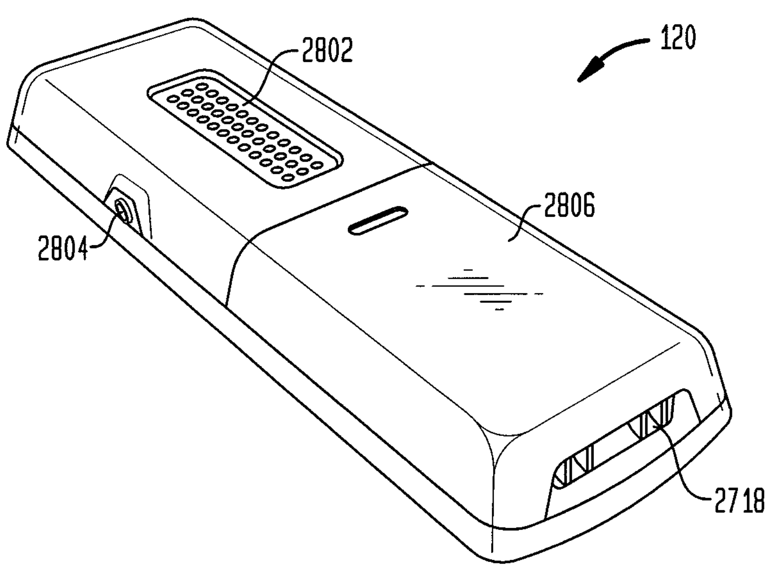
FIG. 28 is a back view of an exemplary handset.

As further shown in FIG. 27, handset 120 includes a microphone 2706 and speaker 2708 for conducting a telephone call in a normal mode. As shown in FIG. 28, handset 120 also includes a rear-facing speaker 2802 for conducting a phone call in a speakerphone mode. A speakerphone button 2704 is provided for activating the speakerphone mode. An earpiece and microphone connector 2804 is provided for plugging in a wired headset. To control speaker volume, a "volume up" button 2710 and a "volume down" button 2712 are provided on one side of handset 120. A mute button 2702 is also provided to turn off microphone 2706 during a telephone call.

Figure 29:
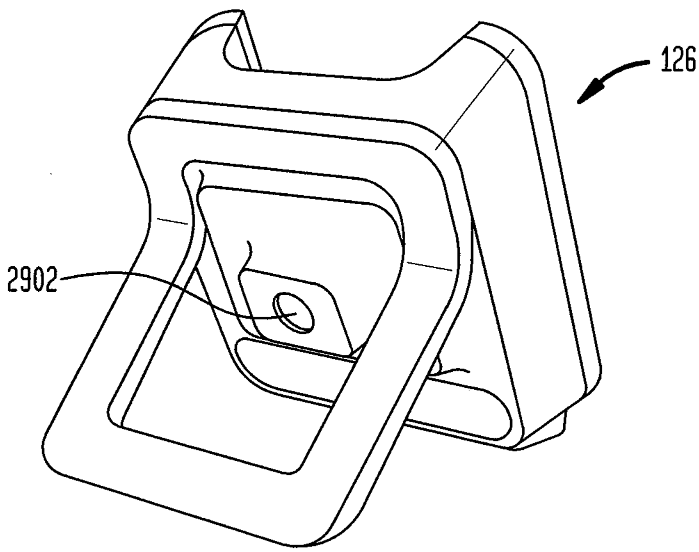
FIG. 29 is a front perspective view of an exemplary handset docking station.
Figure 30:
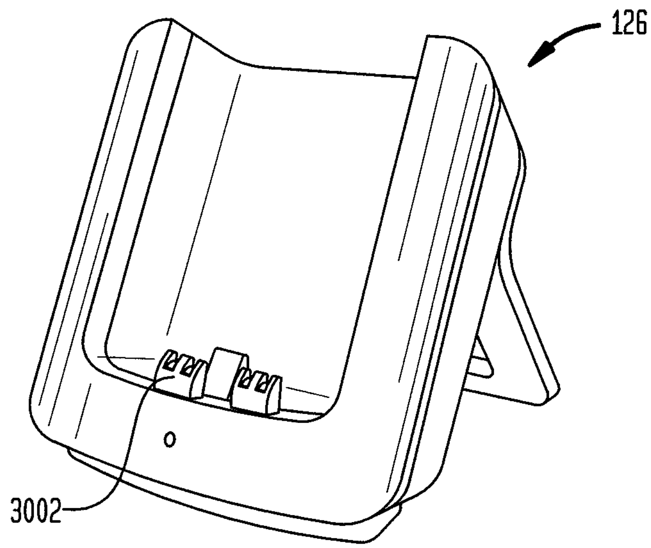
FIG. 30 is a back perspective view of an exemplary handset docking station.

Handset charging contacts 2718 are provided at the bottom of handset 120. When handset 120 is placed in a corresponding docking station 126 (as shown in FIGS. 1, 29 and 30), handset charging contacts 2718 come into contact with docking station charging contacts 3002. This allows docking station 126 to charge a battery internal to handset 120. In one embodiment, the battery internal to handset 120 comprises a 550 mAh Lithium-Ion battery. The battery is accessible for replacement via a removable back plate 2806. Docking station 126 also includes a connector 2902 for receiving power via an AC adapter. In one embodiment, the AC adapter comprises a 5V/500 milliampere-hour (mAh) AC adapter.

As described above, in one embodiment, handset 120 is configured to act as a DECT client that wirelessly communicates with device 110 which acts as a DECT base station. In accordance with such an embodiment, handset 120 may include DECT firmware that supports features such as two- or three-party conferencing, an enhanced graphical user interface, uploadable ringtones (e.g., MIDI and MP3), a synchronized address book, and remotely managed firmware upgrades.

II.F Example Device Graphical User Interface Screens

As discussed above in reference to FIG. 1, a device 110 in accordance with an embodiment of the present invention includes a display 112 that is used to provide a GUI by which a user may initiate, manage and experience telephony and digital media services. Example GUI screens by which the user may perform such functions will now be described. The example GUI screens described in this section are particularly suitable for use with an embodiment of device 110 in which display 112 comprises a color LCD display and integrated capacitive touch screen panel. In accordance with such an embodiment, a user may interact with the GUI by touching display 112 with a finger. For example, a user may touch a portion of display 112 corresponding to a graphic element in order to activate or select that element. However, the GUI screens described in this section are not limited to such an implementation and other forms of interaction may be used.

Figure 31:
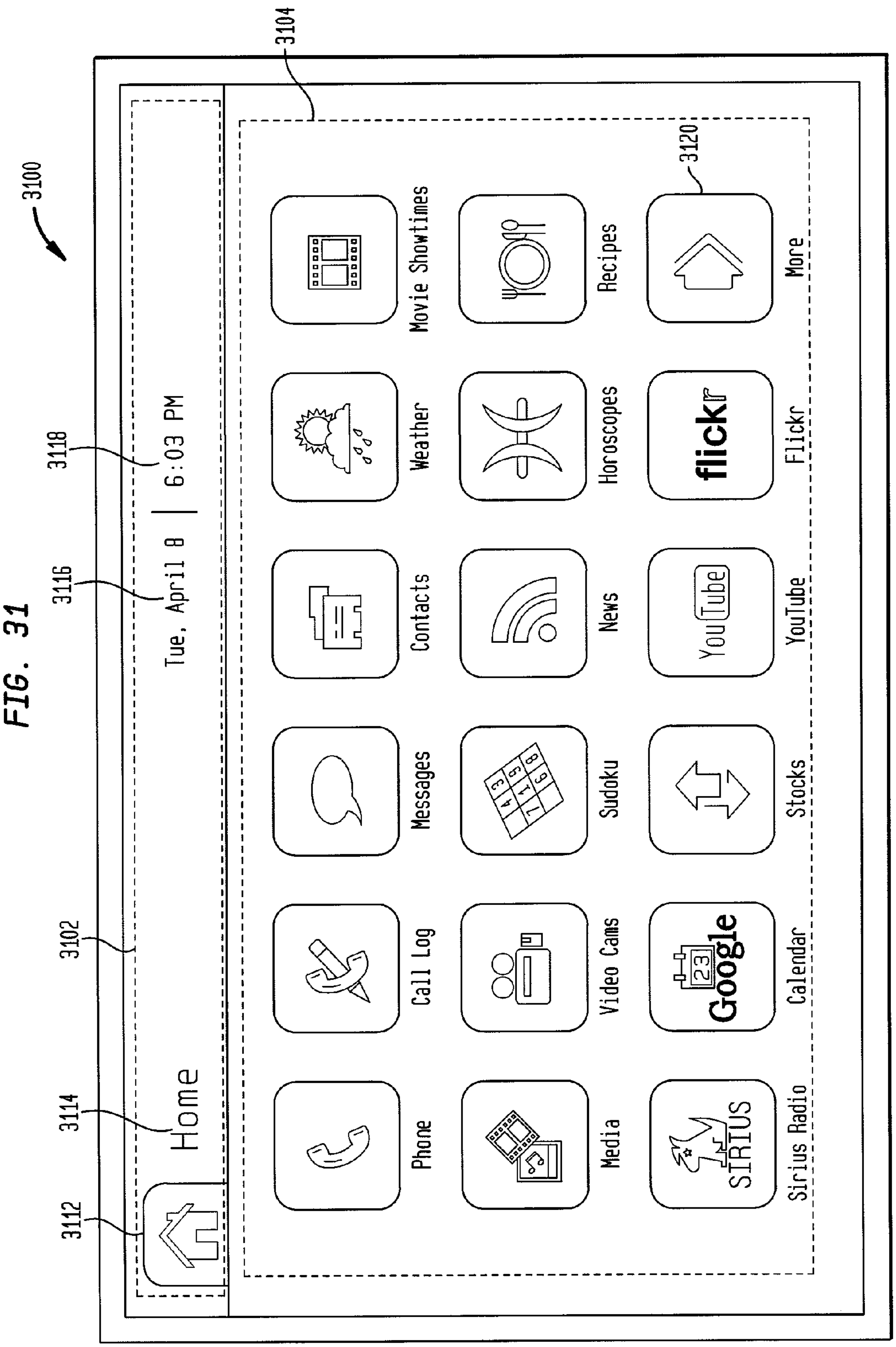
FIG. 31 depicts an exemplary home graphical user interface (GUI) screen that may be displayed by an exemplary telephony and digital media services device.

FIG. 31 depicts an example home GUI screen 3100 in accordance with an embodiment of the present invention. As shown in FIG. 31, example home GUI screen 3100 comprises a plurality of icons 3104, each of which is representative of a different application that may be executed on device 110. In an embodiment, an application is launched when a user activates an icon associated with the application. An exception to this is icon 3120 which, when activated, will display addition application icons. As noted above, in an embodiment, activation of an icon may comprise touching the icon on display 112, although other forms of activation may be used depending upon the implementation. Home GUI screen 3100 also includes a status bar 3102. Status bar 3102 includes an icon 3112 representative of home GUI screen 3100, a name 3114 ("Home") associated with home GUI screen 3100, and an indication of the current date 3116 and time 3118.

As discussed elsewhere herein, each icon on home screen 3100 may comprise a Shockwave Flash movie that is executed within an icon layer of a theme movie displayed on display 112. Likewise, status bar 3102 may comprise a Shockwave Flash movie that is executed within a status bar layer of the theme movie. Various example GUI screens described below also include a status bar that may be implemented in a like manner.

Figure 32:
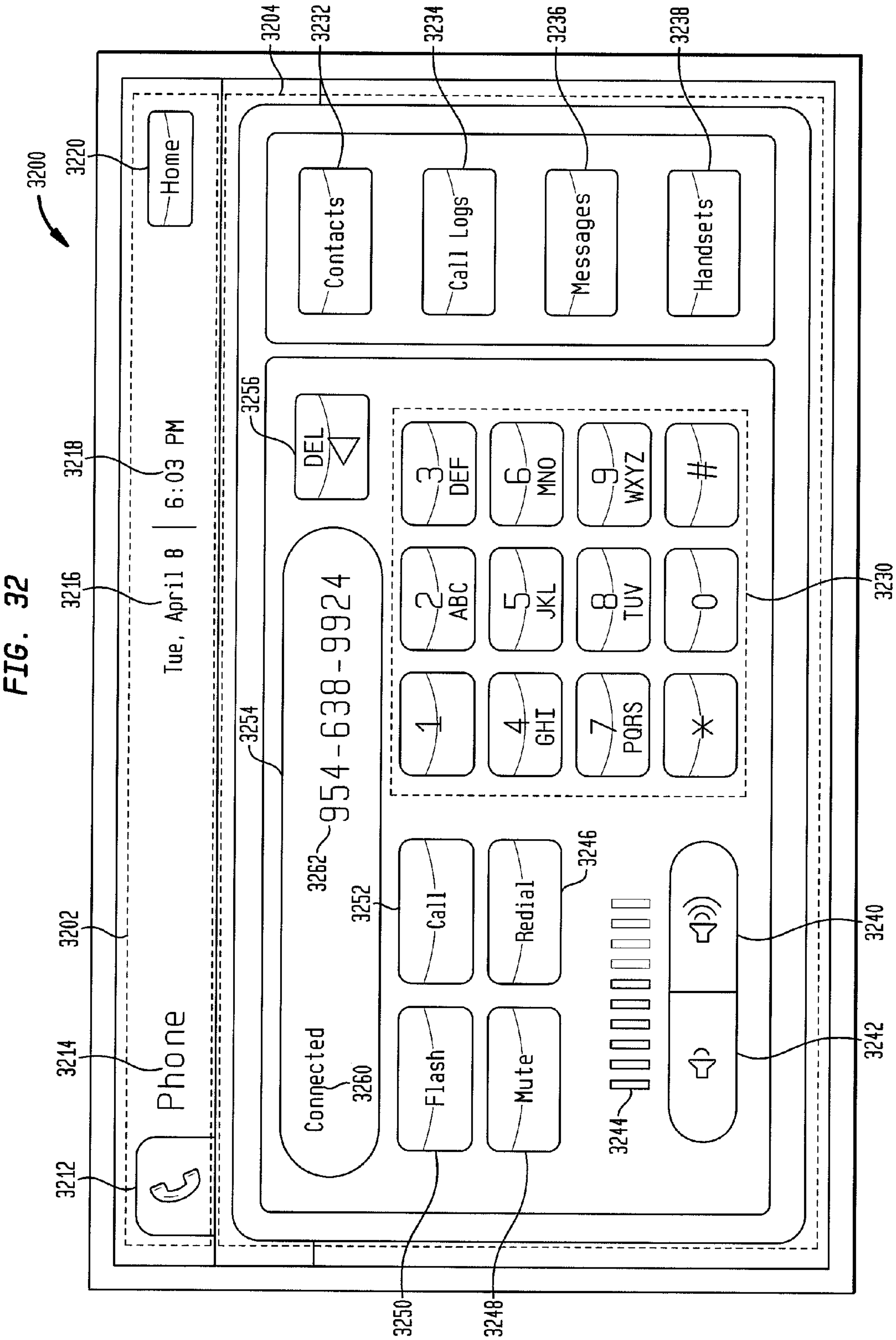
FIG. 32 depicts an exemplary GUI screen for a telephony application.

FIG. 32 depicts an example GUI screen 3200 for a telephony application in accordance with an embodiment of the present invention. As shown in FIG. 32, example GUI screen 3200 includes a status bar 3202 and a telephony application interface 3204. Telephony application interface may comprise a Shockwave Flash movie that is executed within an application layer of a theme movie displayed on display 112. Various example GUI screens described below also include application interfaces that may be implemented in a like manner.

Status bar 3202 includes an icon 3212 representative of the telephony application, a name 3214 ("Phone") associated with the telephony application, an indication of the current date 3216 and time 3218 and a "home" button 3220. When a user activates "home" button 3220, the user will be returned to home GUI screen 3100.

Telephony application interface 3204 includes a keypad 3230 that can be used to enter a telephone number 3262 which appears in a display window 3254. Any numbers entered in this fashion can be deleted using a delete button 3256. Display window 3254 also includes an indication of a call status 3260. In the example GUI depicted in FIG. 32, the call status is "connected."

Telephony application interface 3204 further includes a button 3240 for increasing the volume at which the audio content of a call will be heard and a button 3242 for decreasing the volume. A volume indicator 3244 provides a graphical indication of the current volume level. A "redial" button 3246 may be activated to automatically dial the most-recently dialed number. A "mute" button 3248 may be activated to turn off a microphone associated with device 110 during a telephone call. A "flash" button 3250 may be activated to perform special services that may be provided by the telephony application such as, for example, three-way calling, call waiting, conference calling, or call transfers. A "call" button 3252 may be activated to place a call to the number shown in display window 3254.

Telephony application interface 3204 also includes a "contacts" button 3232 that when activated causes a contacts application to be launched, a "call logs" button 3234 that when activated causes a call logs application to be launched, a "messages" button 3236 that when activated causes a voicemail application to be launched, and a "handsets" button 3238.

Figure 33:
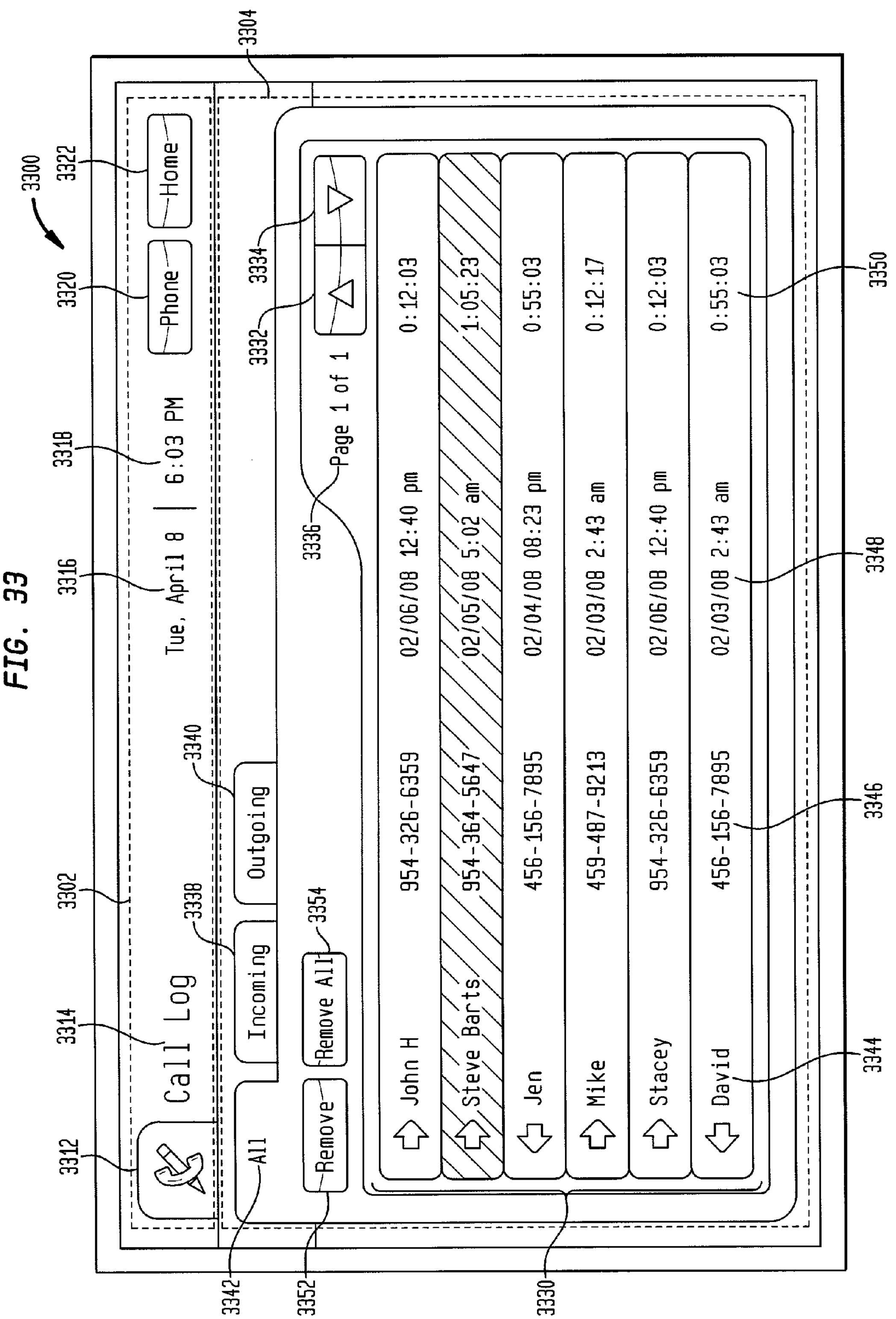
FIG. 33 depicts an exemplary GUI screen for a call log application.

FIG. 33 depicts an example GUI screen 3300 for a call log application in accordance with an embodiment of the present invention. As shown in FIG. 33, example GUI screen 3300 includes a status bar 3302 and a call log application interface 3304.

Status bar 3302 includes an icon 3312 representative of the call log application, a name 3314 ("Call Log") associated with the call log application, an indication of the current date 3316 and time 3318, a "phone" button 3320 and a "home" button 3322. When a user activates "phone" button 3320, GUI screen 3200 for a telephony application will be displayed. When a user activates "home" button 3322, the user will be returned to home GUI screen 3100.

Call log application interface 3304 displays all or a portion of a log 3330 of previously-placed outgoing and incoming telephone calls. To page up through log 3330 a "page up" button 3332 may be activated and to page down a "page down" button 3334 may be activated. A page indicator 3336 indicates which of one or more pages of log 3330 is currently being displayed. To see incoming calls only, an "incoming" tab 3338 may be activated, to see outgoing calls only an "outgoing" tab 3340 may be activated, and to return to a list of all incoming and outgoing calls an "all" tab 3342 may be activated. For each call listed in log 3330, the following information is displayed: a name of a calling/called party 3344, a phone number associated with the calling/called party 3346, a date/time of the previous call 3348 and a duration of the previous call 3350. To select a call listed in log 3330, the horizontal bar that provides information about the call may be activated. Call log application interface 3304 further includes a "remove" button 3352 that can be used to remove a selected entry from log 3330 and a "remove all" button 3354 that can be used to remove all incoming and/or outgoing entries from log 3330.

Figure 34:
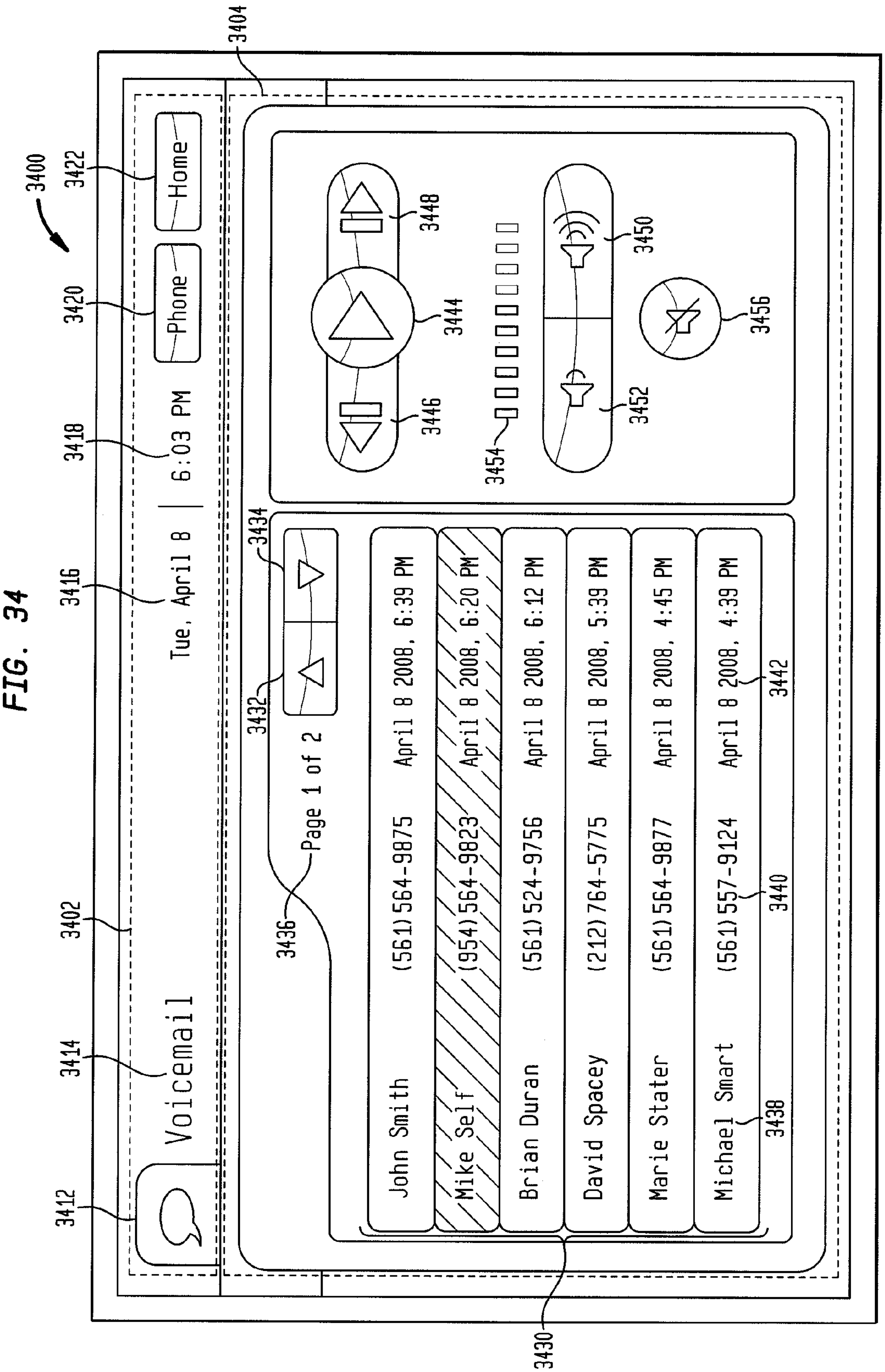
FIG. 34 depicts an exemplary GUI screen for a voicemail application.

FIG. 34 depicts an example GUI screen 3400 for a voicemail application in accordance with an embodiment of the present invention. As shown in FIG. 34, example GUI screen 3400 includes a status bar 3402 and a voicemail application interface 3404.

Status bar 3402 includes an icon 3412 representative of the voicemail application, a name 3414 ("Voicemail") associated with the voicemail application, an indication of the current date 3416 and time 3418, a "phone" button 3420 and a "home" button 3422. When a user activates "phone" button 3420, GUI screen 3200 for a telephony application will be displayed. When a user activates "home" button 3422, the user will be returned to home GUI screen 3100.

Voicemail application interface 3404 displays all or a portion of a list 3430 of saved voicemail messages. To page up through list 3430 a "page up" button 3432 may be activated and to page down a "page down" button 3434 may be activated. A page indicator 3436 indicates which of one or more pages of list 3430 is currently being displayed. For each voicemail message in list 3430, the following information is displayed: a name of a party that left the voicemail message 3438, a phone number 3440 associated with the party that left the voicemail message, and a date/time 3442 that the voicemail message was left. To select a voicemail message listed in list 3430, the horizontal bar that provides information about the voicemail may be activated.

Voicemail application interface 3404 further includes a "play" button 3444 for playing a selected voicemail message, a "rewind" button 3446 for rewinding the content of a selected voicemail message, and a "fast forward" button 3448 for fast forwarding the content of a selected voicemail message. A button 3450 is provided for increasing the volume at which the content of a voicemail message will be heard and a button 3452 is provided for decreasing the volume. A volume indicator 3454 provides a graphical indication of the current volume level. A "mute" button 3456 is also provided for turning off the audio output associated with a voicemail message.

Figure 35:
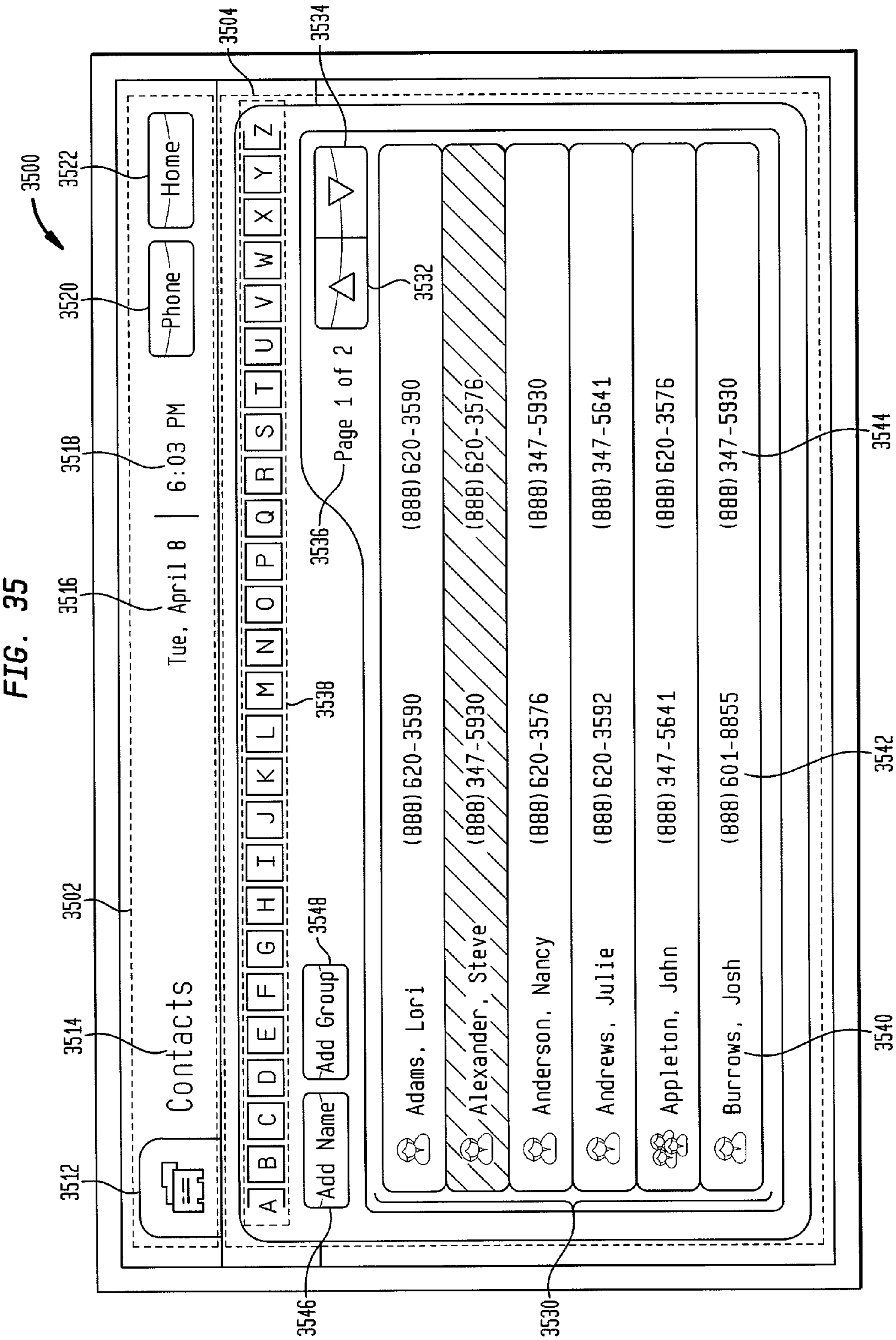
FIG. 35 depicts an exemplary GUI screen for a contacts application.

FIG. 35 depicts an example GUI screen 3500 for a contacts application in accordance with an embodiment of the present invention. As shown in FIG. 35, example GUI screen 3500 includes a status bar 3502 and a contacts application interface 3504.

Status bar 3502 includes an icon 3512 representative of the contacts application, a name 3514 ("Contacts") associated with the contacts application, an indication of the current date 3516 and time 3518, a "phone" button 3520 and a "home" button 3522. When a user activates "phone" button 3520, GUI screen 3200 for a telephony application will be displayed. When a user activates "home" button 3522, the user will be returned to home GUI screen 3100.

Contacts application interface 3504 displays all or a portion of a list 3530 of user contacts. To page up through list 3530 a "page up" button 3532 may be activated and to page down a "page down" button 3534 may be activated. A page indicator 3536 indicates which of one or more pages of list 3530 is currently being displayed. To view contacts starting with a particular letter of the alphabet, one a series of buttons 3538 corresponding to each letter of the alphabet may be activated. For each contact in list 3530, the following information is displayed: a name of the contact 3540, a first phone number 3542 associated with the contact, and a second phone number 3544 associated with the contact. To select a contact from among those in list 3530, the horizontal bar that provides information about the contact may be activated.

Contacts application interface 3504 further includes an "add name" button 3546 that when activated launches a dialog for adding a person to list 3530 and an "add group" button 3548 that when activated launches a dialog for adding a group of people to list 3530.

Figure 36:
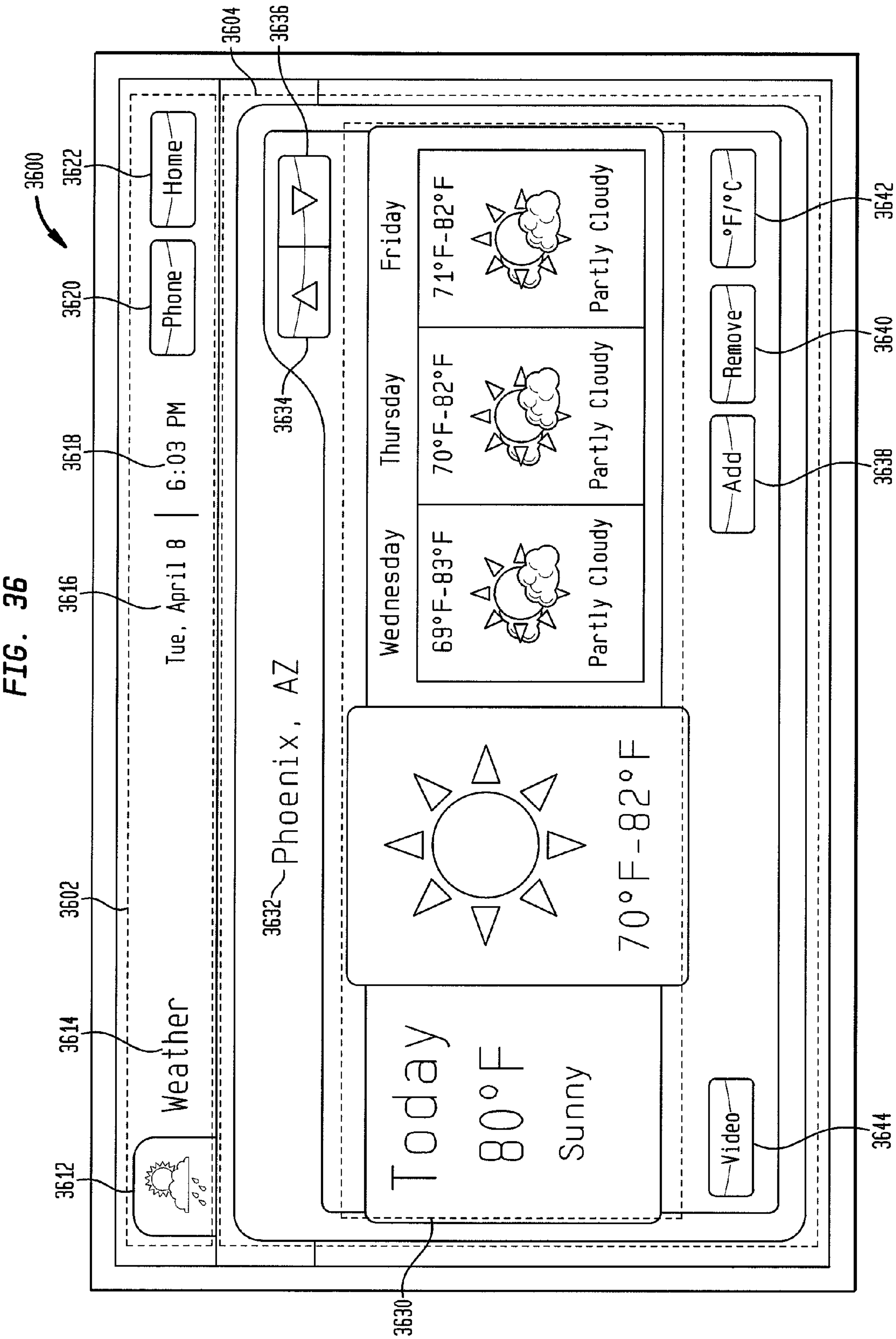
FIG. 36 depicts an exemplary GUI screen for a weather application.

FIG. 36 depicts an example GUI screen 3600 for a weather application in accordance with an embodiment of the present invention. As shown in FIG. 36, example GUI screen 3600 includes a status bar 3602 and a weather application interface 3604.

Status bar 3602 includes an icon 3612 representative of the weather application, a name 3614 ("Weather") associated with the weather application, an indication of the current date 3616 and time 3618, a “phone” button 3620 and a “home” button 3622. When a user activates “phone” button 3620, GUI screen 3200 for a telephony application will be displayed. When a user activates “home” button 3622, the user will be returned to home GUI screen 3100.

Weather application interface 3604 includes a display area 3630 that provides weather information for a particular location 3632. In the example of FIG. 36, the particular location is “Phoenix, Ariz.” The particular location may be one of a series of predefined locations for which weather information is available. To view weather information for a preceding location in the series a “page up” button 3634 is provided. To view weather information for a subsequent location in the series a “page down” button 3636 is provided. An “add” button 3638 is provided that, when activated, launches a dialog by which a location may be added to the series of locations. A “remove” button 3640 is also provided that, when activated, launches a dialog by which a location may be removed from the series of locations. A button 3642 allows a user to select whether temperatures should be displayed in degrees Fahrenheit (° F.) or degrees Celsius (° C.). A “video” button 3644 is provided that allows a user to watch weather-related video content such as a video feed from a weather camera or the like.

Figure 37:
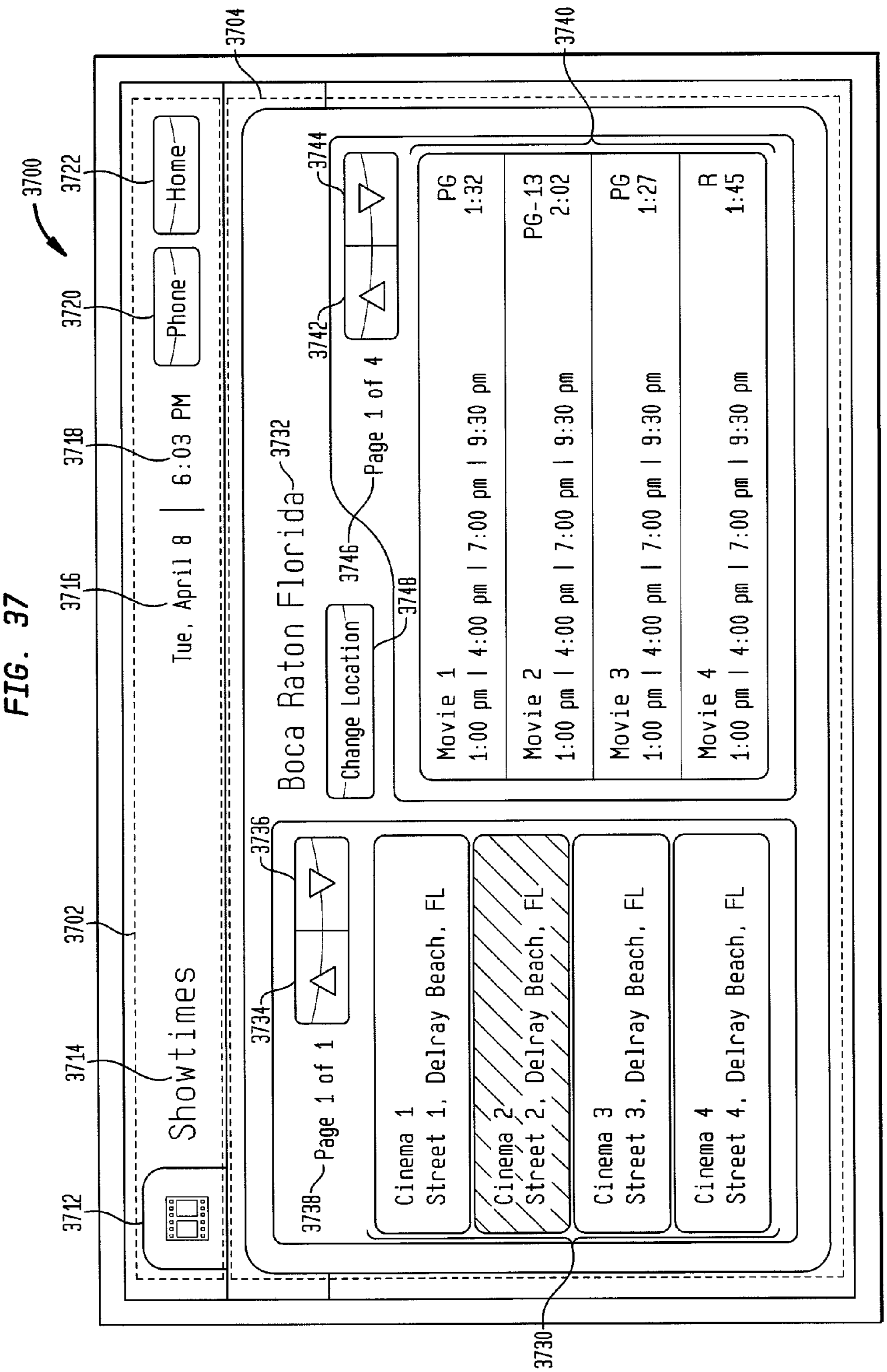
FIG. 37 depicts an exemplary GUI screen for a movie showtimes application.

FIG. 37 depicts an example GUI screen 3700 for a movie showtimes application in accordance with an embodiment of the present invention. As shown in FIG. 37, example GUI screen 3700 includes a status bar 3702 and a movie showtimes application interface 3704.

Status bar 3702 includes an icon 3712 representative of the movie showtimes application, a name 3714 (“Showtimes”) associated with the movie showtimes application, an indication of the current date 3716 and time 3718, a “phone” button 3720 and a “home” button 3722. When a user activates “phone” button 3720, GUI screen 3200 for a telephony application will be displayed. When a user activates “home” button 3722, the user will be returned to home GUI screen 3100.

Movie showtimes application interface 3704 includes a first display area that displays all or a portion of a list of movie theaters 3730 associated with a particular location 3732. In the example of FIG. 37, the particular location is “Boca Raton Fla.” To page up through list 3730 a “page up” button 3734 may be activated and to page down a “page down” button 3736 may be activated. A page indicator 3738 indicates which of one or more pages of list 3730 is currently being displayed. To select a movie theater from among those in list 3730, the horizontal bar that provides information about the movie theater may be activated.

Movie showtimes application interface 3704 also includes a second display area that displays all or a portion of a list of movies and associated showtimes 3740 associated with a movie theater selected in the first display area. To page up through list 3740 a “page up” button 3742 may be activated and to page down a “page down” button 3744 may be activated. A page indicator 3746 indicates which of one or more pages of list 3740 is currently being displayed.

A “change location” button 3748 is provided that, when activated, launches a dialog by which a user can select a different location for which to obtain movie showtime information.

Figure 38:
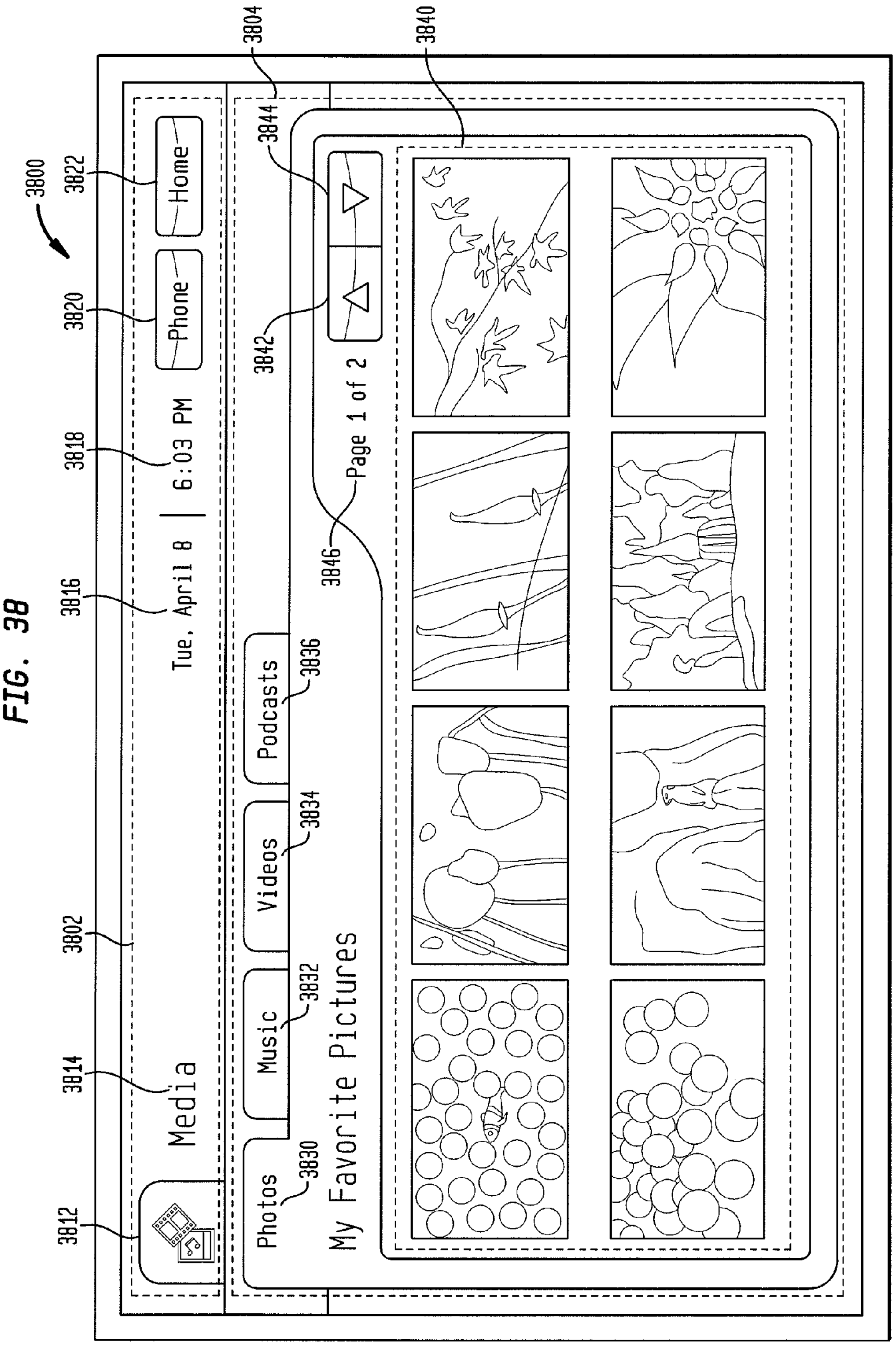
FIG. 38 depicts an exemplary GUI screen for a media application in which a photos interface is displayed.

FIG. 38 depicts an example GUI screen 3800 for a media application in accordance with an embodiment of the present invention. As shown in FIG. 38, example GUI screen 3800 includes a status bar 3802 and a media application interface 3804.

Status bar 3802 includes an icon 3812 representative of the media application, a name 3814 (“Media”) associated with the media application, an indication of the current date 3816 and time 3818, a “phone” button 3820 and a “home” button 3822. When a user activates “phone” button 3820, GUI screen 3200 for a telephony application will be displayed. When a user activates “home” button 3822, the user will be returned to home GUI screen 3100.

Media application interface 3804 comprises four different interfaces, only one of which may be shown at any given time: a photos interface that may be selected by activating a “photos” tab 3830, a music interface that may be selected by activating a “music” tab 3832, a videos interface that may be selected by activating a “videos” tab 3834, and a podcasts interface that may be selected by activating a “podcasts” tab 3836. In FIG. 38, the photos interface is currently being displayed. As shown in that figure, the photos interface includes a display area 3840 within which a plurality of digital photos is displayed. The displayed photos may comprise one page in a series of pages of digital photos. To page up through the series a “page up” button 3842 may be activated and to page down a “page down” button 3844 may be activated. A page indicator 3846 indicates which of one or more pages in the series of pages is currently being displayed.

Figure 39:
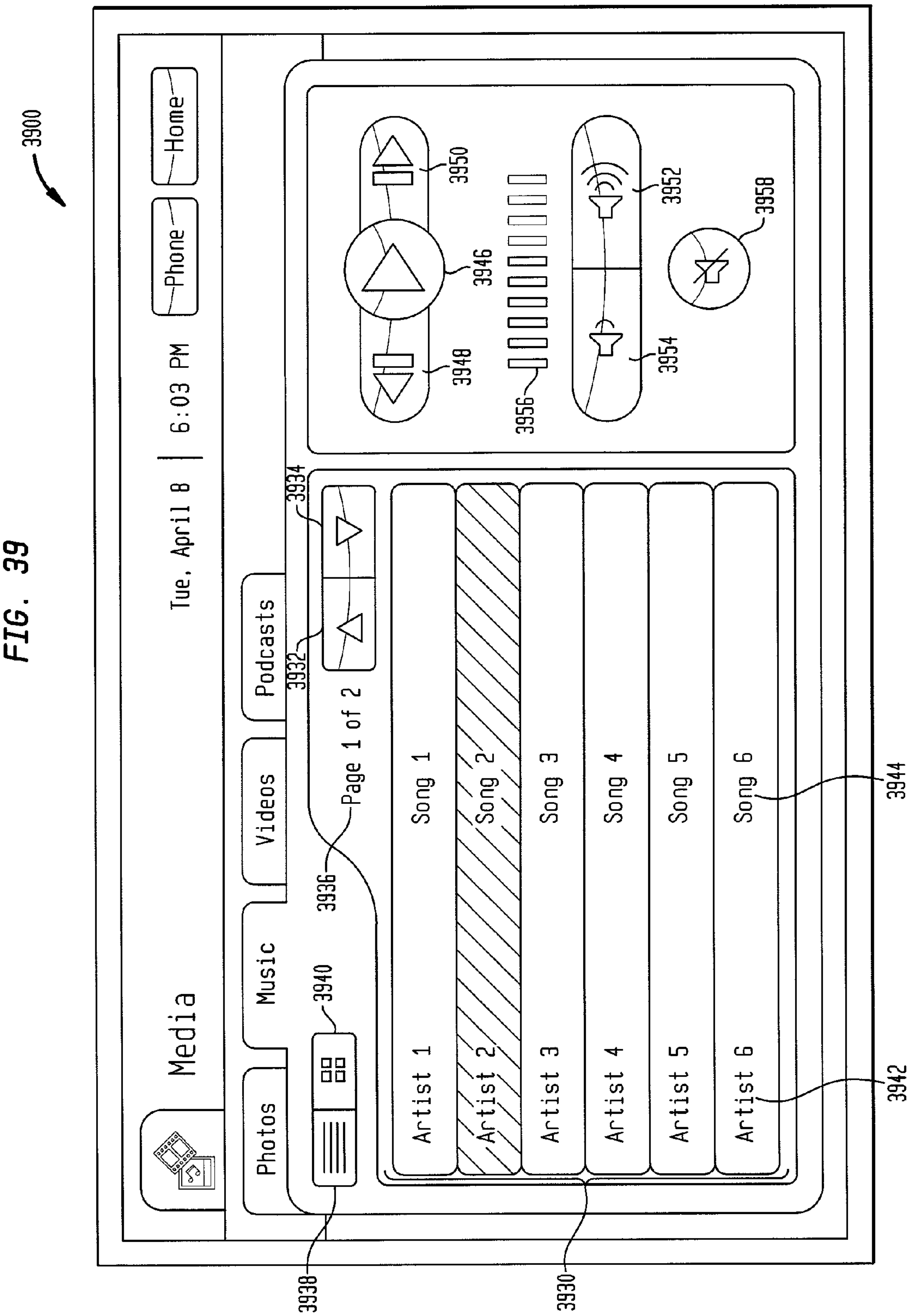
FIG. 39 depicts an exemplary GUI screen for a media application in which a music interface is displayed.

FIG. 39 depicts a GUI screen 3900 for the aforementioned media application in which the music interface is displayed. As shown in FIG. 39, the music interface includes a display area that displays all or a portion of a list of songs 3930. To page up through list 3930 a “page up” button 3932 may be activated and to page down a “page down” button 3934 may be activated. A page indicator 3936 indicates which of one or more pages of list 3930 is currently being displayed. For each song in list 3930 the following information is provided: a performer of the song 3942 and the song title 3944. A song in list 3930 may be selected by activating the horizontal bar upon which the song information is provided.

The music interface further includes a “play” button 3946 for playing a selected song, a “rewind” button 3948 for rewinding the content of a selected song, and a “fast forward” button 3950 for fast forwarding the content of a selected song. A button 3952 is provided for increasing the volume at which the audio content of a song will be heard and a button 3954 is provided for decreasing the volume. A volume indicator 3956 provides a graphical indication of the current volume level. A “mute” button 3956 is also provided for turning off the audio output associated with a song.

Figure 40:
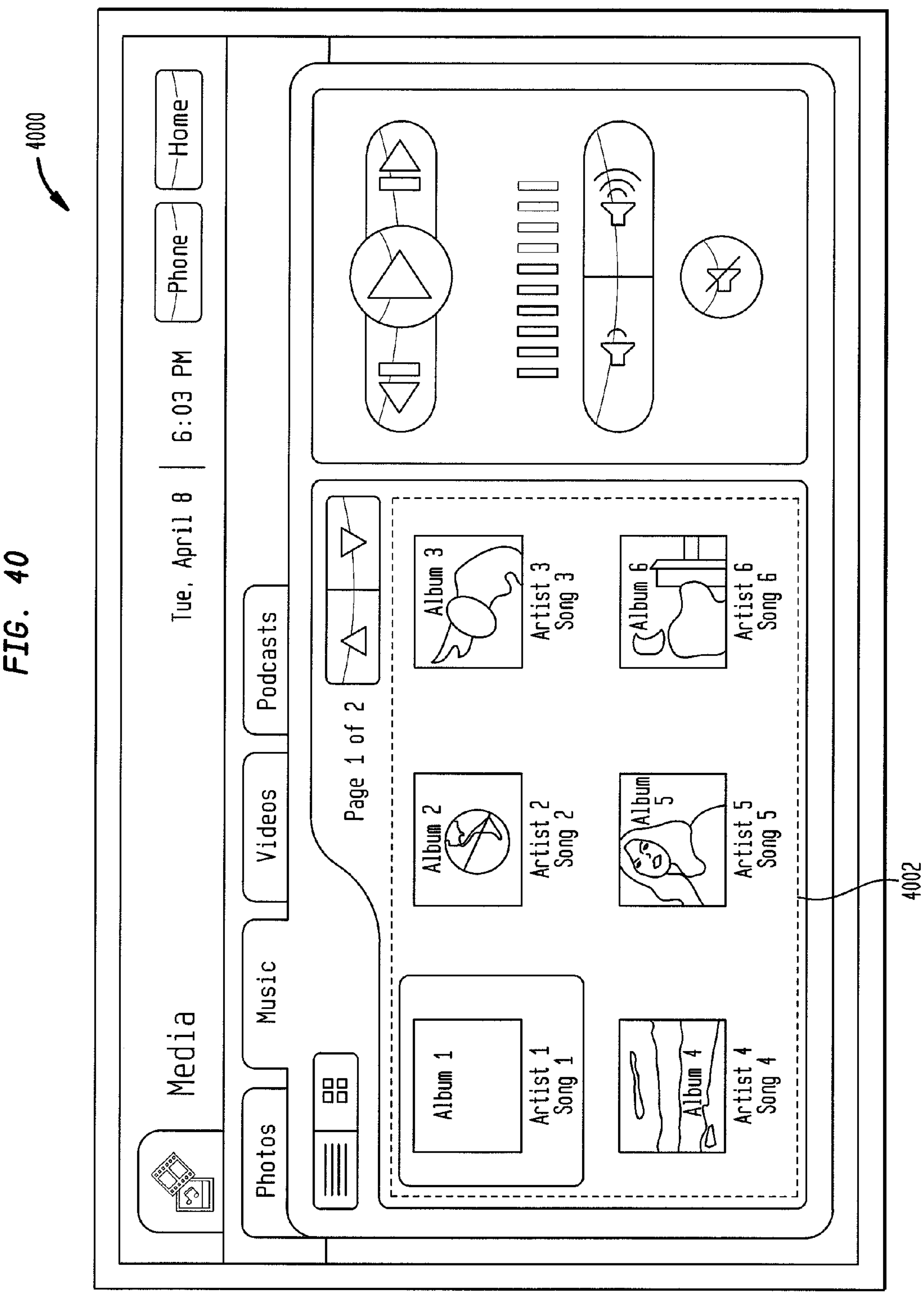
FIG. 40 depicts a further exemplary GUI screen for a media application in which a music interface is displayed.

The music interface allows song information to be displayed in two formats. The list format shown in FIG. 39 may be obtained by activating a first display format button 3938. An icon format shown in GUI interface screen 4000 of FIG. 40 may be obtained by activating a second display format button 3940. As shown in FIG. 40, when the icon format is selected, a display area 4002 is presented that displays an icon associated with each song. The song performer and title is displayed below each icon.

Figure 41:
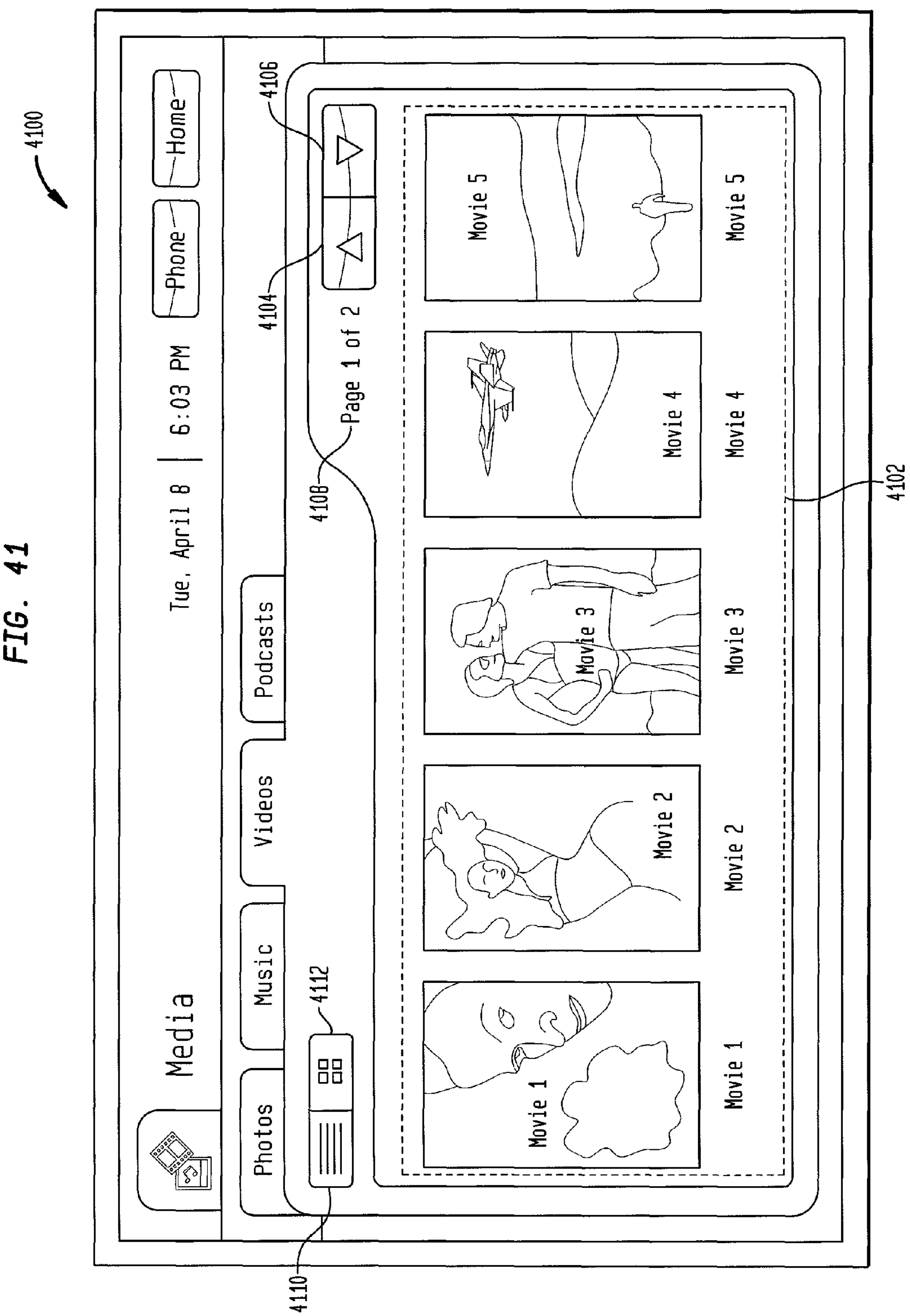
FIG. 41 depicts an exemplary GUI screen for a media application in which a videos interface is displayed.

FIG. 41 depicts a GUI screen 4100 for the aforementioned media application in which the videos interface is displayed. As shown in FIG. 41, the videos interface includes a display area that displays all or a portion of a collection of movies 4102. To page up through collection 4102 a “page up” button 4104 may be activated and to page down a “page down” button 4106 may be activated. A page indicator 4108 indicates which of one or more pages of collection 4102 is currently being displayed. For each movie in collection 4108 the following information is provided: a graphic icon representative of the movie and the name of the movie. A movie in collection 4102 may be selected by activating the icon associated with the movie.

The videos interface allows movies to be displayed in two formats. A list format in which information about each movie is provided in a horizontal bar may be obtained by activating a first display format button 4110. The icon format shown in FIG. 41 may be obtained by activating a second display format button 4112.

Figure 42:
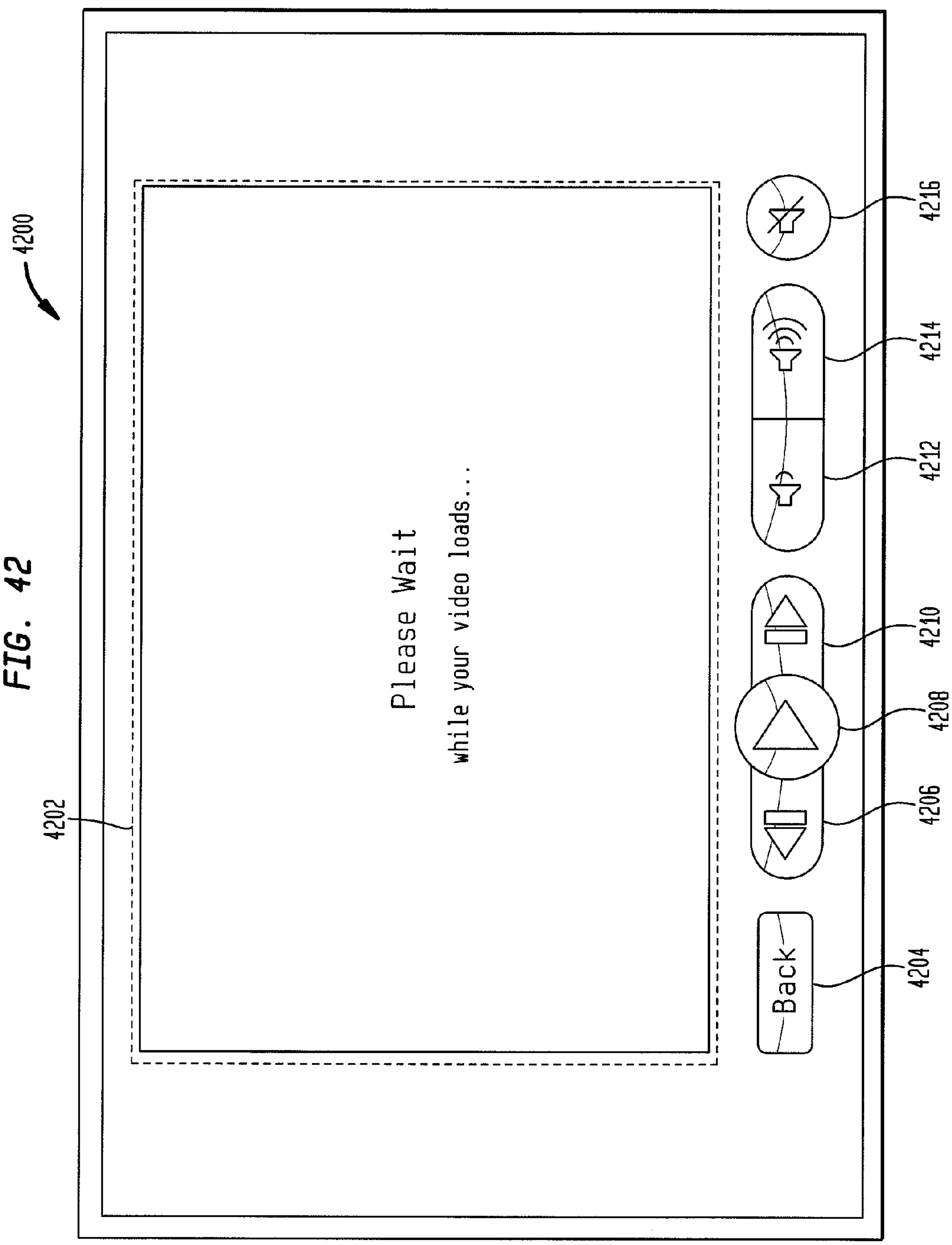
FIGS. 42 and 43 depict an exemplary GUI screen for a video player application.

FIG. 42 depicts a GUI screen 4200 for a video player application in accordance with an embodiment of the present invention. In one embodiment, the video player application is launched and GUI interface screen 4200 is presented to a user when the user activates a movie in collection 4102 that is displayed within GUI screen 4100.

As shown in FIG. 42, GUI interface screen 4200 includes a display area 4202 for displaying video content such as video content associated with a movie. GUI interface screen 4200 also includes a "back" button 4204 that allows a user to terminate the playback of the video content and return to a previously-viewed GUI screen, a "play" button 4208 that allows a user to play the video content, a "rewind" button 4206 that allows a user to rewind the video content, a "fast forward" button 4210 that allows a user to fast forward the video content, a button 4214 that allows a user to increase the volume of audio content associated with the video content, a button 4212 that allows a user to decrease the volume of the audio content, and a "mute" button 4216 that allows the user to turn off the audio content entirely.

Figure 43:
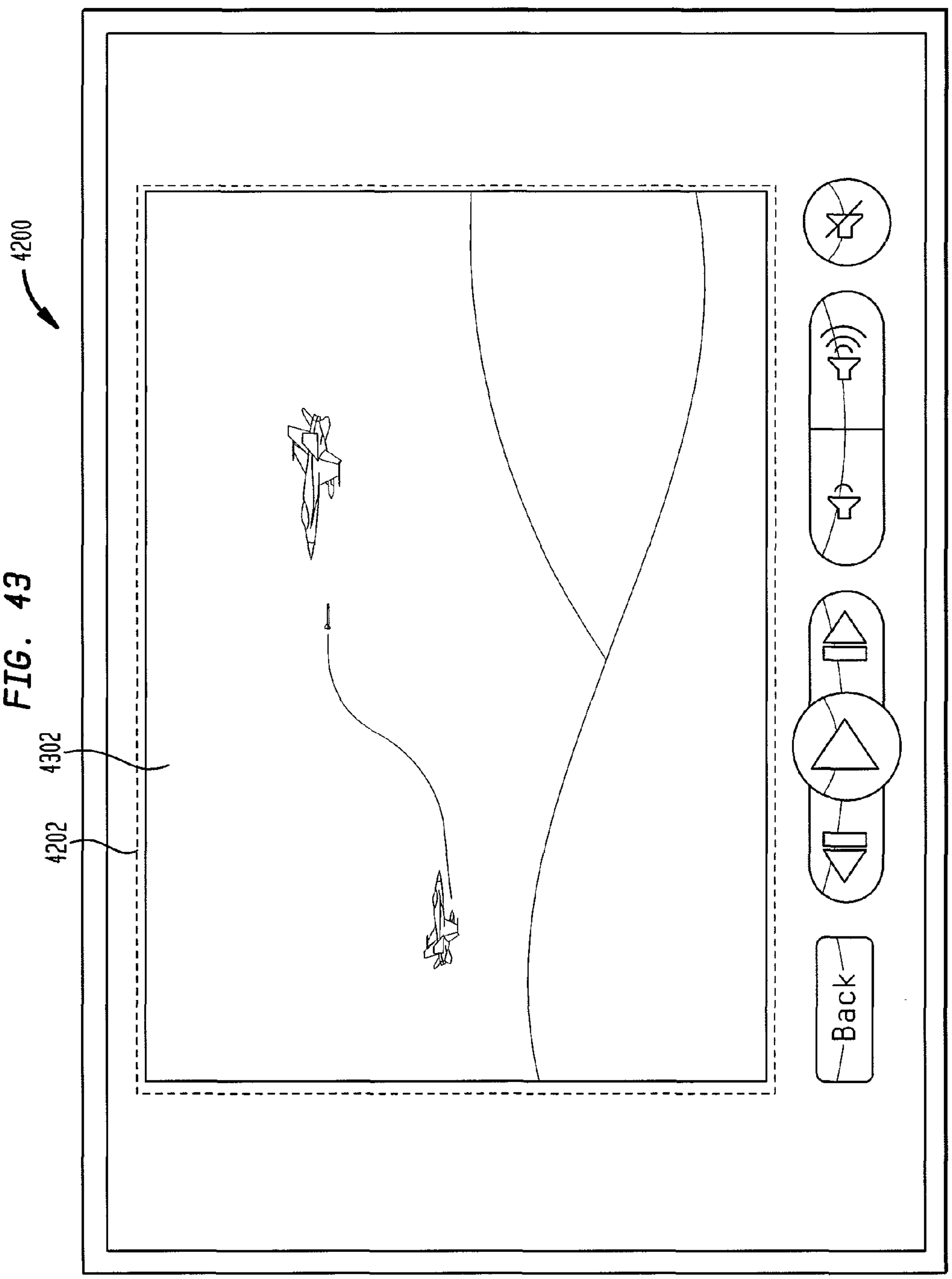

In FIG. 42, display area 4202 displays a message that indicates that video content is being loaded. FIG. 43 depicts another view of GUI interface screen 4200 in which video content 4302 associated with a movie is playing in display area 4202.

Figure 44:
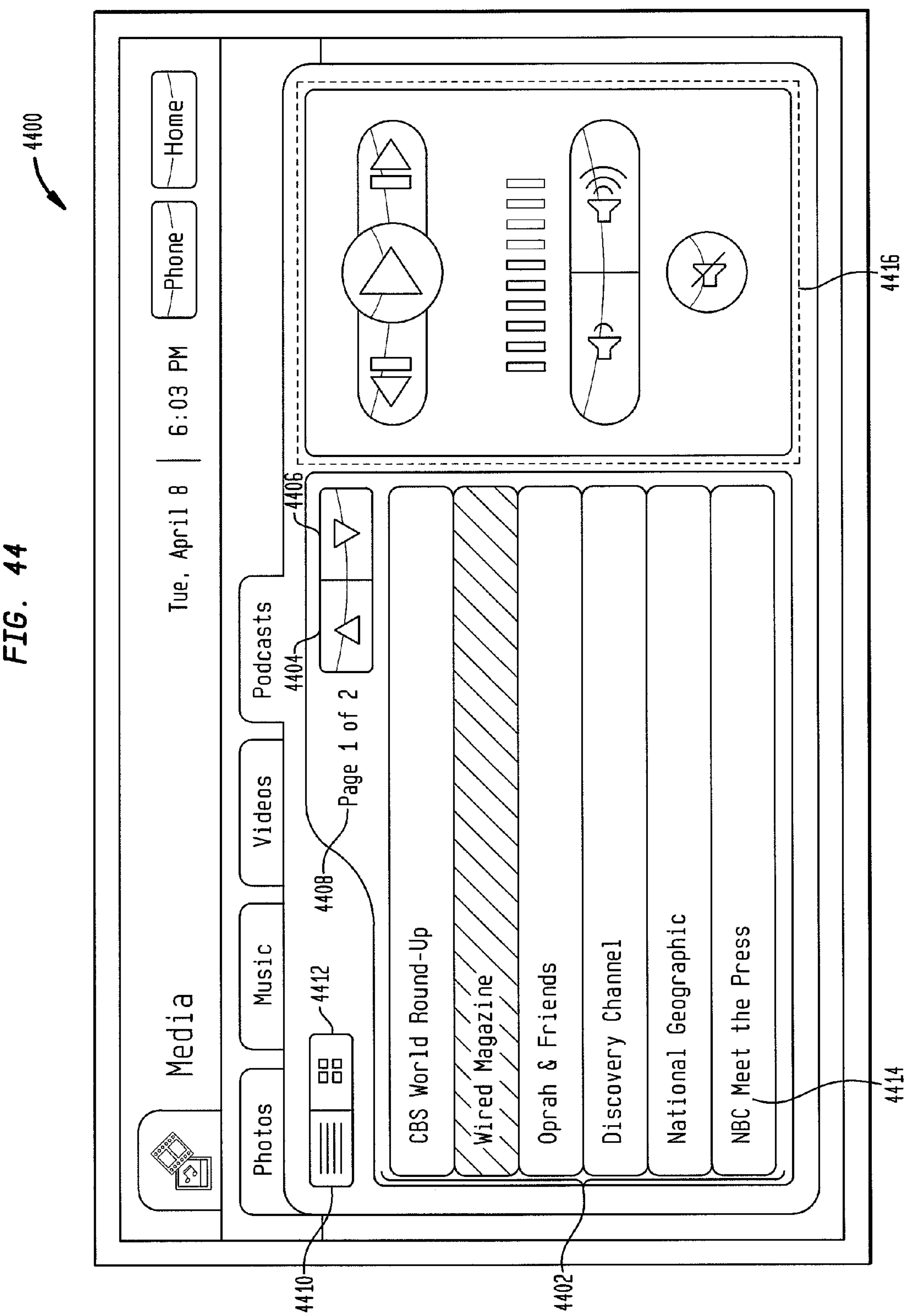
FIG. 44 depicts an exemplary GUI screen for a media application in which a podcasts interface is displayed.

FIG. 44 depicts a GUI screen 4400 for the aforementioned media application in which the podcasts interface is displayed. As shown in FIG. 44, the podcasts interface includes a display area that displays all or a portion of a list of podcast providers 4402. To page up through list 4402 a "page up" button 4404 may be activated and to page down a "page down" button 4406 may be activated. A page indicator 4408 indicates which of one or more pages of list 4402 is currently being displayed. A name 4414 is provided for each podcast provider in list 4402. A podcast provider in list 4402 may be selected by activating the horizontal bar upon which the song information is provided.

Control over the playback and volume of audio content of a podcast is provided using an interface 4416 that includes elements that are substantially similar to elements described above in example GUI screen 4000 of FIG. 40.

Figure 45:
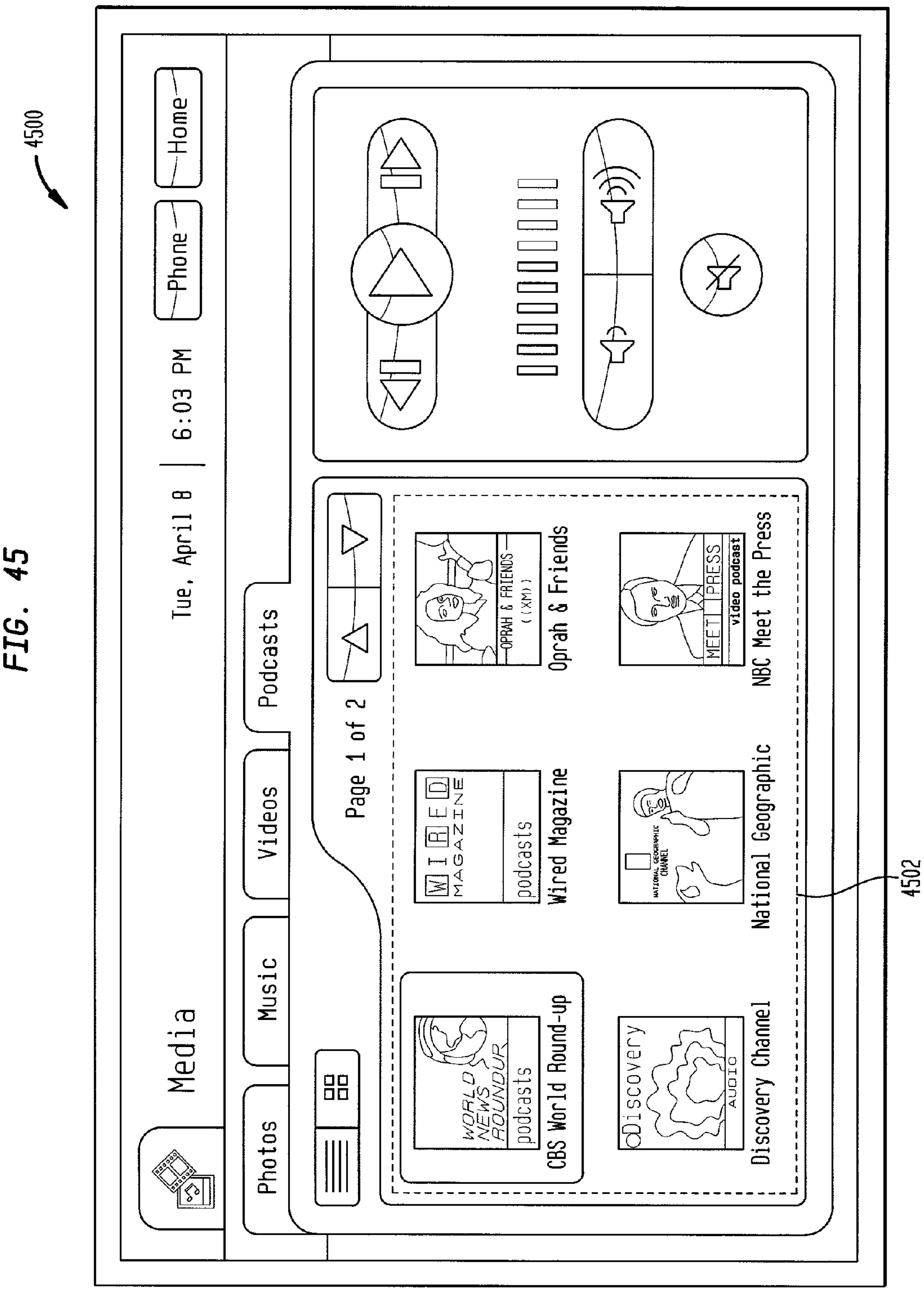
FIG. 45 depicts a further exemplary GUI screen for a media application in which a podcasts interface is displayed.

The podcasts interface allows podcast provider information to be displayed in two formats. The list format shown in FIG. 44, in which information about each podcast provider is displayed in a horizontal bar, may be obtained by activating a first display format button 4410. An icon format shown in GUI interface screen 4500 of FIG. 45 may be obtained by activating a second display format button 4412. As shown in FIG. 45, when the icon format is selected, a display area 4502 is presented that displays an icon associated with each podcast provider. The name of the podcast provider is displayed below each icon.

Figure 46:
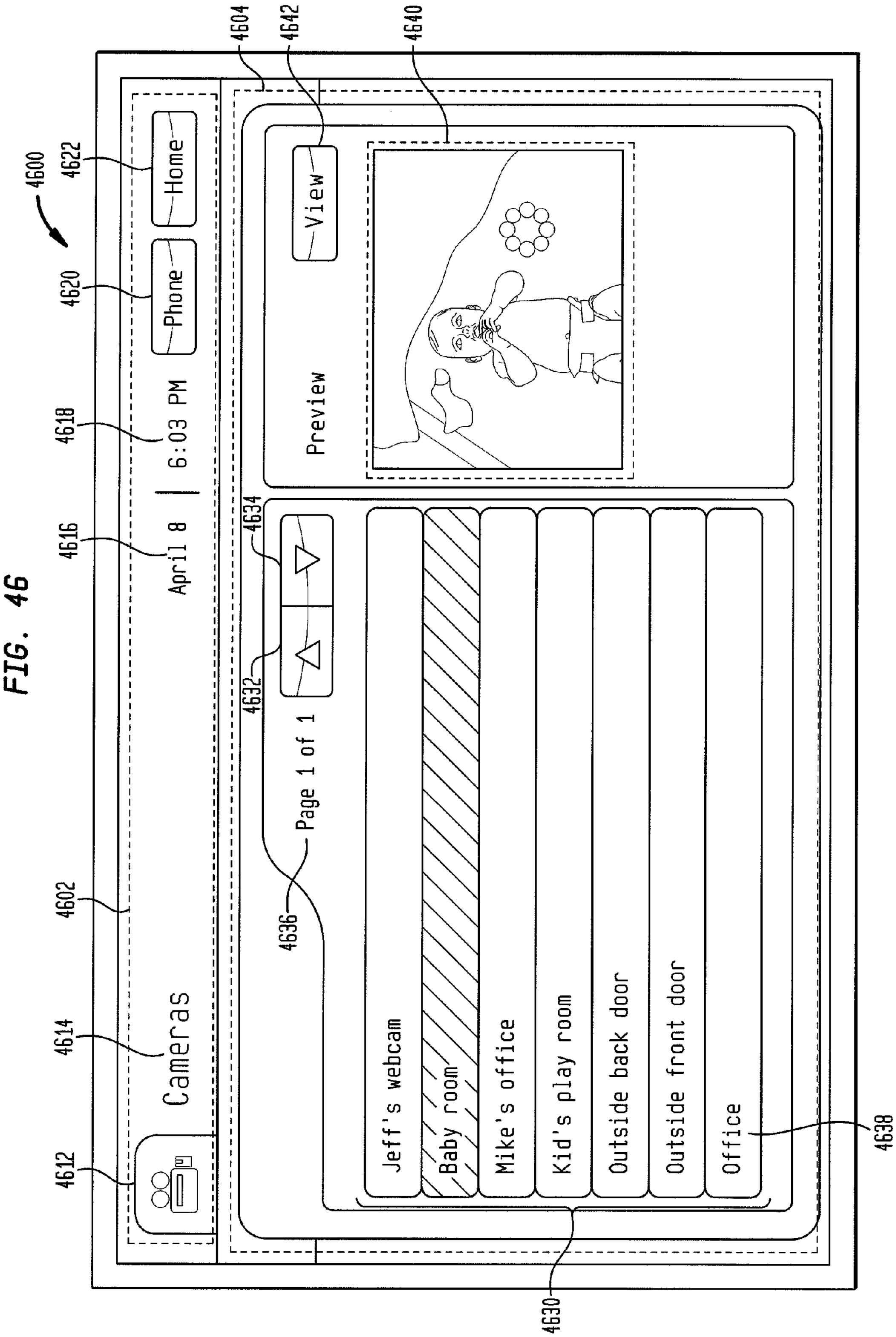
FIG. 46 depicts an exemplary GUI screen for a cameras application.

FIG. 46 depicts an example GUI screen 4600 for a cameras application in accordance with an embodiment of the present invention. As shown in FIG. 46, example GUI screen 4600 includes a status bar 4602 and a cameras application interface 4604.

Status bar 4602 includes an icon 4612 representative of the cameras application, a name 4614 ("Cameras") associated with the cameras application, an indication of the current date 4616 and time 4618, a "phone" button 4620 and a "home" button 4622. When a user activates "phone" button 4620, GUI screen 3200 for a telephony application will be displayed. When a user activates "home" button 4622, the user will be returned to home GUI screen 3100.

Cameras application interface 4604 includes a first display area that displays all or a portion of a list of cameras 4630 that are capable of providing a video feed to device 110. To page up through list 4630 a "page up" button 4632 may be activated and to page down a "page down" button 4634 may be activated. A page indicator 4636 indicates which of one or more pages of list 4630 is currently being displayed. For each camera identified in list 4630, a name 4638 is provided. To select a camera from among those in list 4630, the horizontal bar that provides the name of the camera may be activated.

Figure 47:
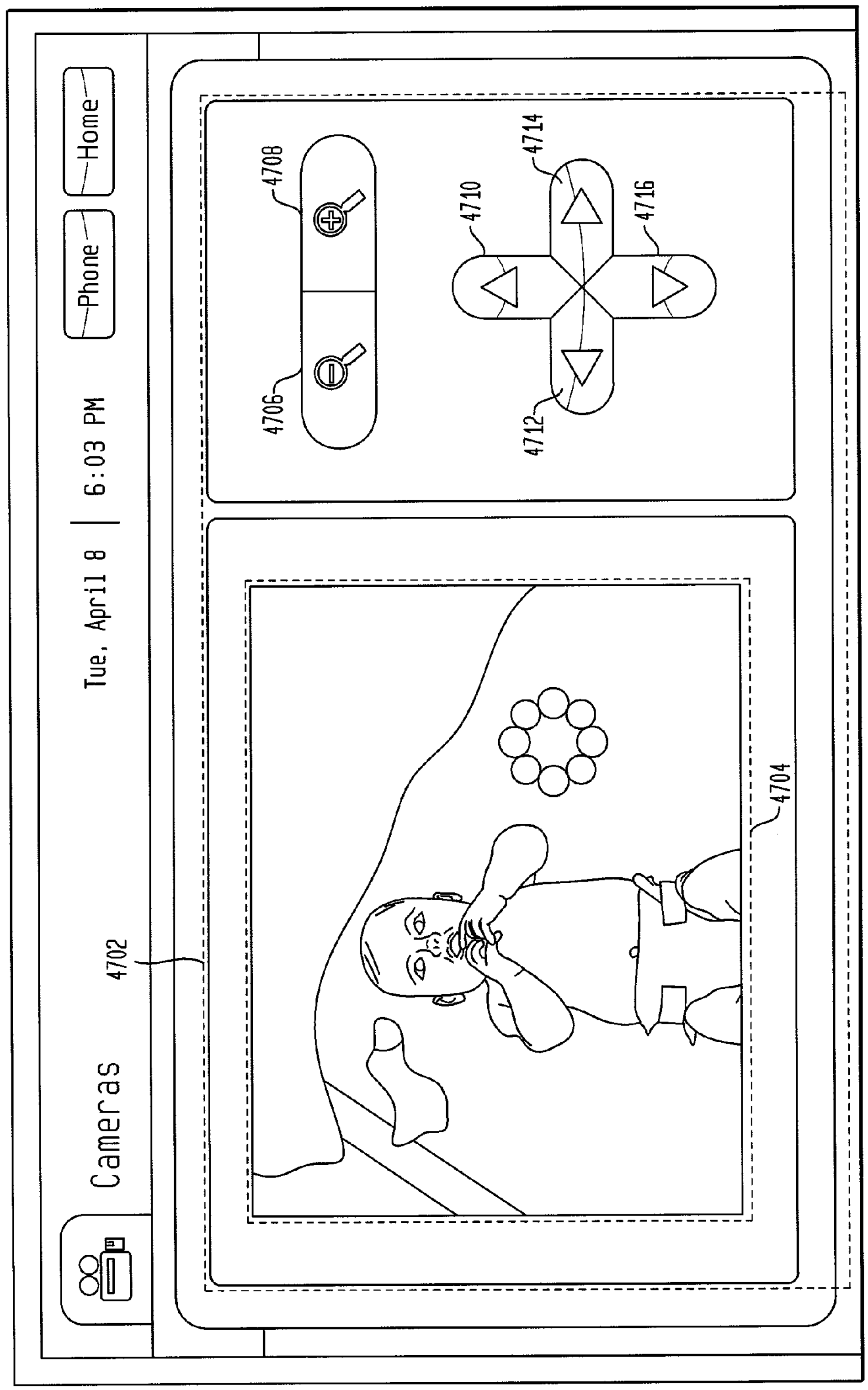
FIG. 47 depicts an additional exemplary GUI screen for a cameras application.

Cameras application interface 4604 also includes a second display area that displays video content received from a selected camera in a preview window 4640. A "view" button 4642 may be activated to allow a user to view the video content from the selected camera in a further cameras application interface 4702 which is depicted in example GUI screen 4700 of FIG. 47. As shown in FIG. 47, cameras application interface 4702 includes an expanded window 4704 in which video content from the selected camera is displayed as well as a camera control interface that includes a "zoom out" button 4706, a "zoom in" button 4708, a "pan left" button 4712, a "pan right" button 4714, a "tilt up" button 4716 and a "tilt down" button 4710. As will be appreciated by persons skilled in the relevant art(s), these buttons may be used to control pan, tilt and zoom features of cameras that support such functionality.

Figure 48:
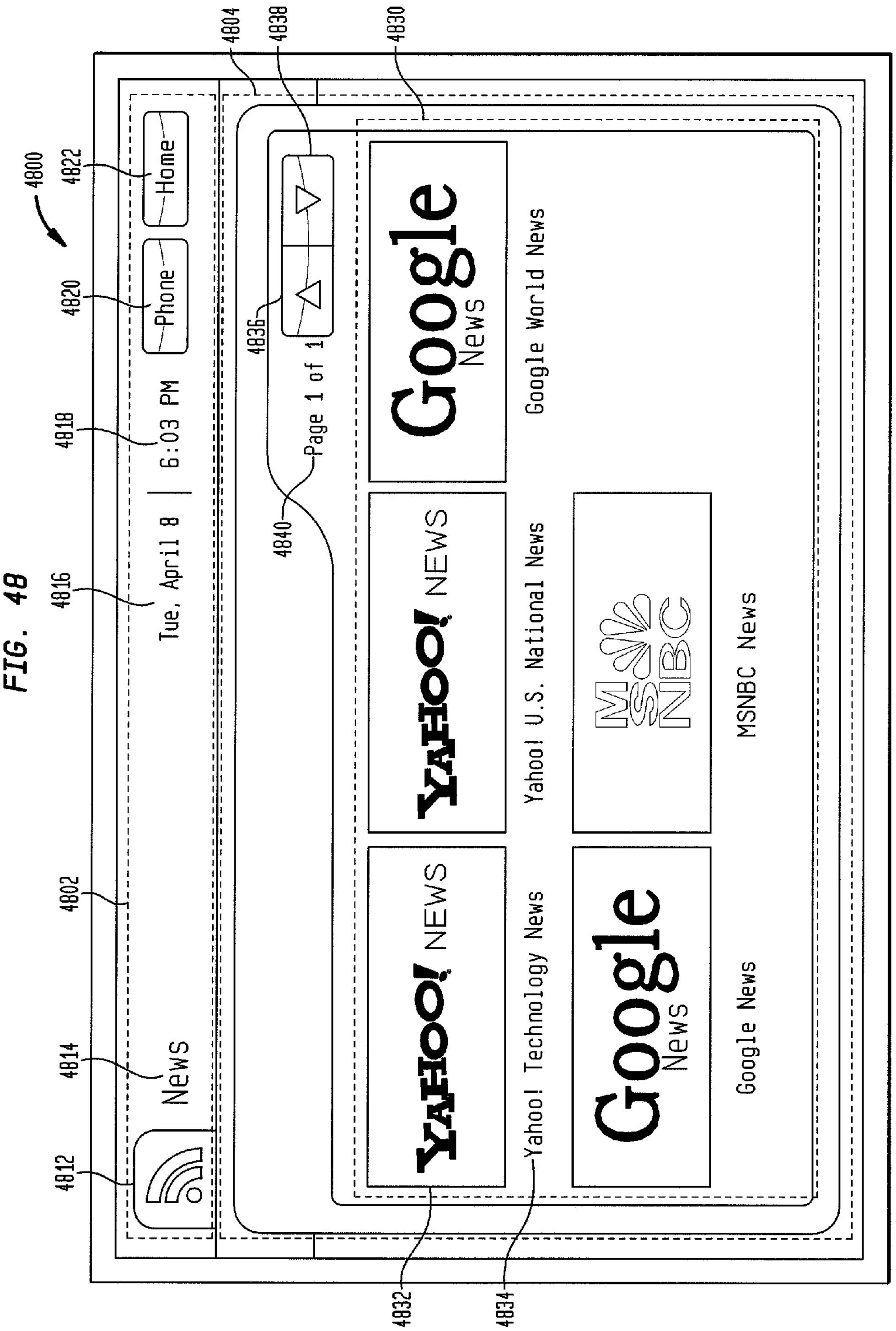
FIG. 48 depicts an exemplary GUI screen for a news application.

FIG. 48 depicts an example GUI screen 4800 for a news application in accordance with an embodiment of the present invention. As shown in FIG. 48, example GUI screen 4800 includes a status bar 4802 and a news application interface 4804.

Status bar 4802 includes an icon 4812 representative of the news application, a name 4814 ("News") associated with the news application, an indication of the current date 4816 and time 4818, a "phone" button 4820 and a "home" button 4822. When a user activates "phone" button 4820, GUI screen 3200 for a telephony application will be displayed. When a user activates "home" button 4822, the user will be returned to home GUI screen 3100.

News application interface 4804 includes a display area 4830 that displays all or a portion of a collection of news sources that are capable of feeding news articles to device 110. To page backwards through the collection of news sources a "page backward" button 4836 may be activated and to page forward a "page forward" button 4838 may be activated. A page indicator 4840 indicates which of one or more pages of the collection is currently being displayed. For each news source identified in display area 4830, a graphic icon (such as icon 4832) is provided and a name of the news source (such as name 4834) is provided. To obtain news from a news source identified in display area 4830, the icon representing the news source may be activated.

Figure 49:
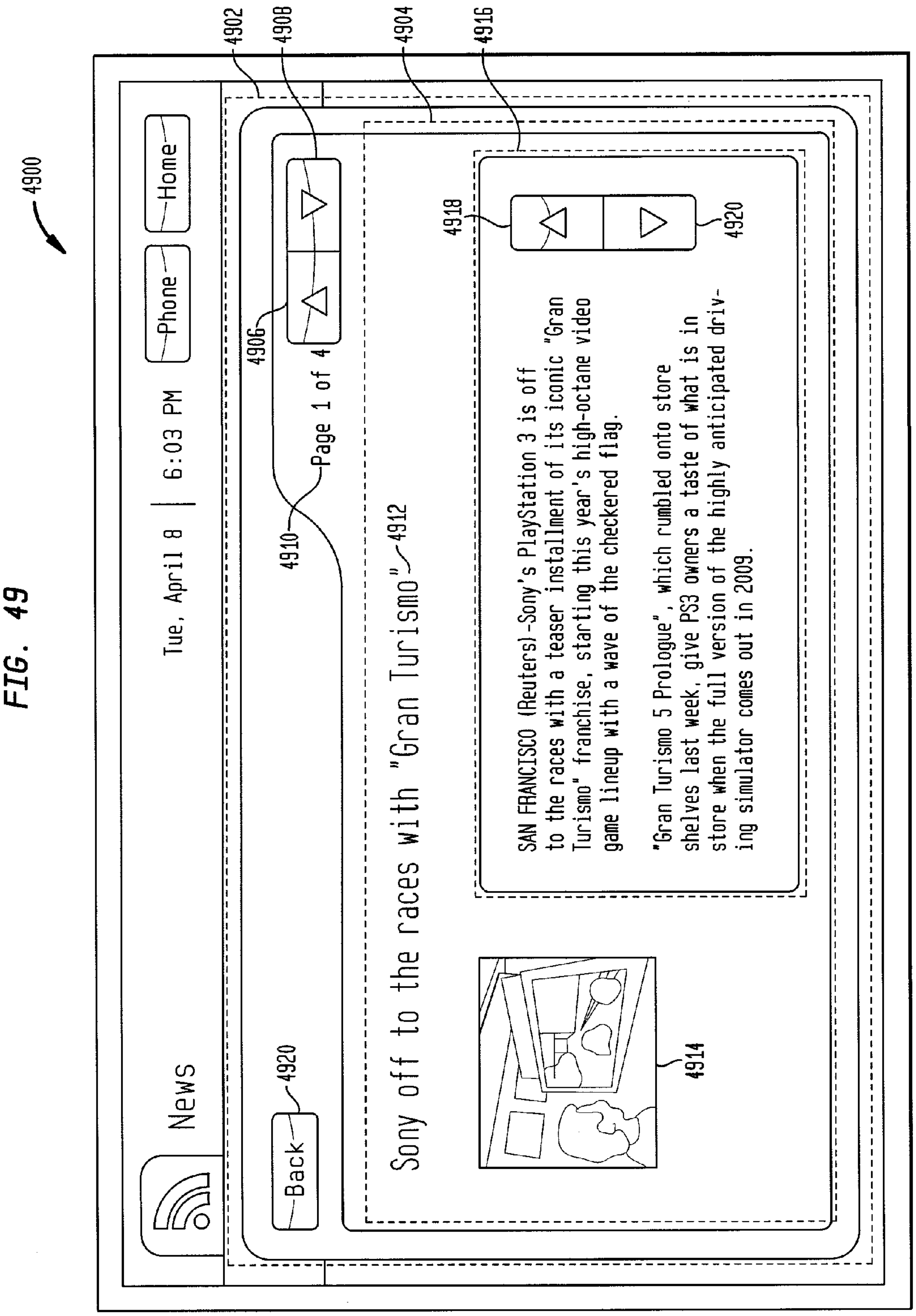
FIG. 49 depicts an additional exemplary GUI screen for a news application.

If a user activates a news source icon, a further news application interface is provided by which news articles from the selected source may be viewed. An example of such an interface 4902 is depicted in example GUI screen 4900 of FIG. 49. As shown in FIG. 49, interface 4902 includes a display area 4904 that presents content associated with a news article. Such content may include for example a title of the news article 4912, a graphic or video associated with the news article 4912, and text associated with the news article which is displayed in a text display area 4916. A user may scroll the text displayed within text display area 4916 up and down by activating a "scroll up" button 4918 and a "scroll down" button 4920 respectively.

Additional news articles from the same news source may be available on one or more preceding or subsequent pages viewable within display area 4904. To access such articles, a "page backward" button 4906 or a "page forward" button 4908 may be activated. A page indicator 4910 indicates which of one or more pages of news articles is currently being displayed. A "back" button may be activated to return to GUI screen 4800 of FIG. 48.

Figure 50:
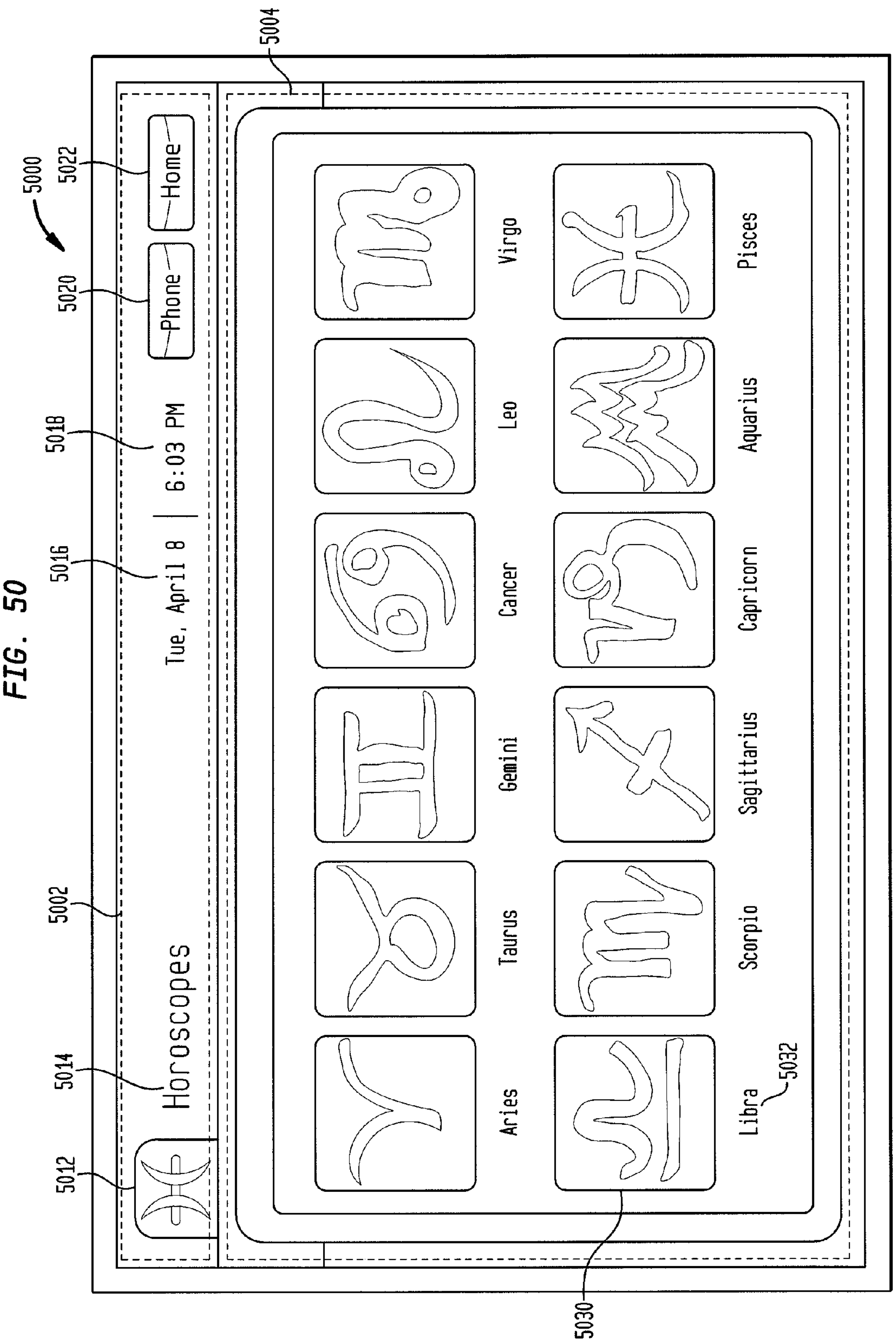
FIG. 50 depicts an exemplary GUI screen for a horoscopes application.

FIG. 50 depicts an example GUI screen 5000 for a horoscopes application in accordance with an embodiment of the present invention. As shown in FIG. 50, example GUI screen 5000 includes a status bar 5002 and a horoscopes application interface 5004.

Status bar 5002 includes an icon 5012 representative of the horoscopes application, a name 5014 ("Horoscopes") associated with the horoscopes application, an indication of the current date 5016 and time 5018, a "phone" button 5020 and a "home" button 5022. When a user activates "phone" button 5020, GUI screen 3200 for a telephony application will be displayed. When a user activates "home" button 5022, the user will be returned to home GUI screen 3100.

Horoscopes application interface 5004 includes a display area that displays a graphic icon representing each sign of the zodiac (such as icon 5030) and an associated name (such as name 5032). To obtain a current horoscope for a zodiac sign identified in horoscopes application interface 5004, the icon representing the zodiac sign may be activated.

Figure 51:
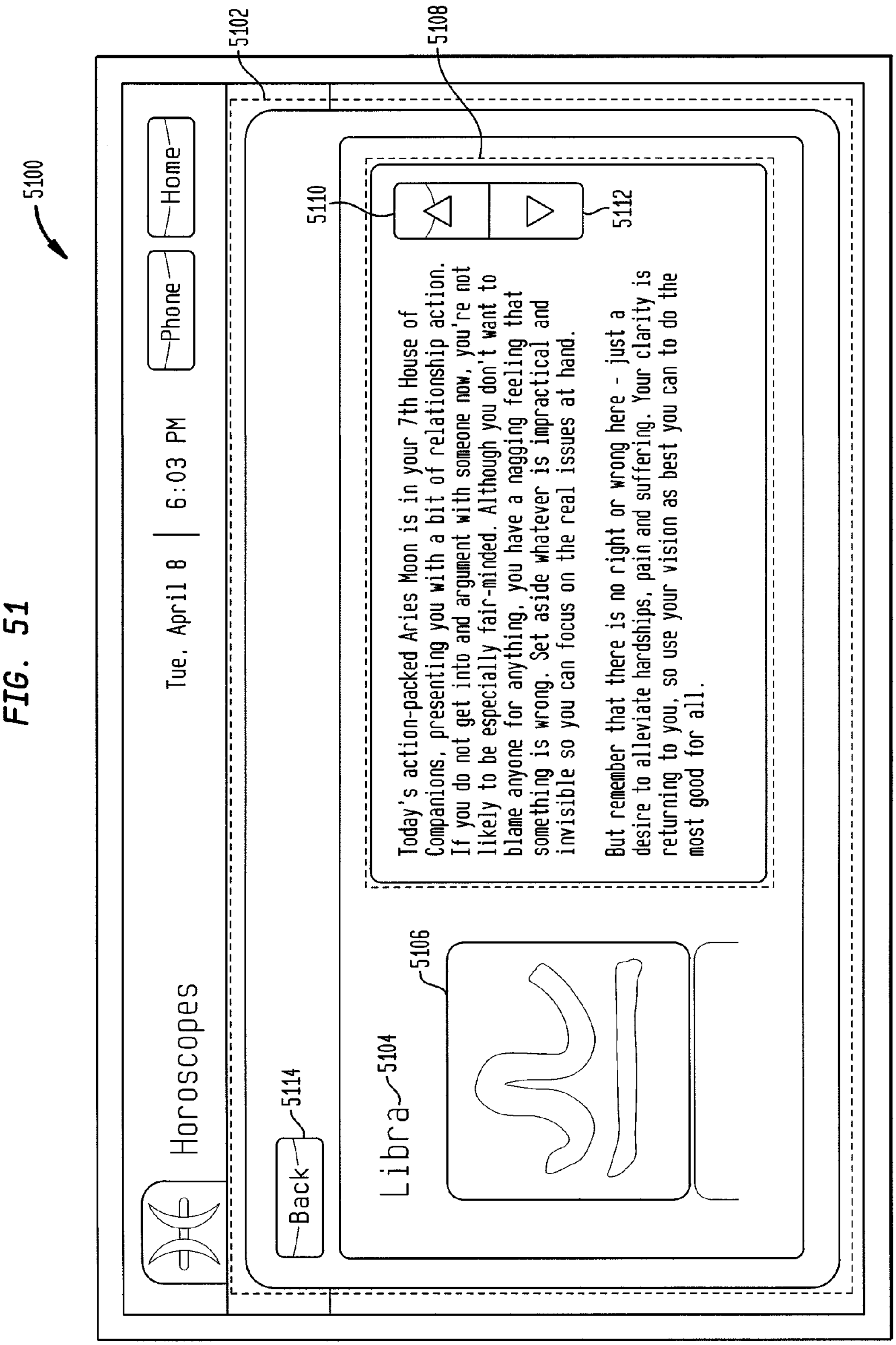
FIG. 51 depicts an additional exemplary GUI screen for a horoscopes application.

If a user activates a zodiac sign icon, a further horoscopes interface is provided in which a current horoscope for the activated zodiac sign may be viewed. An example of such an interface 5102 is depicted in example GUI screen 5100 of FIG. 51. As shown in FIG. 51, interface 5102 displays the name of the relevant zodiac sign 5104, an icon 5106 that represents the relevant zodiac sign, and a text display area 5108 in which the horoscope text for the relevant zodiac sign is displayed. A user may scroll the text displayed within text display area 5108 up and down by activating a "scroll up" button 5110 and a "scroll down" button 5112 respectively. A "back" button 5114 may be activated to return to GUI screen 5000 of FIG. 50.

Figure 52:
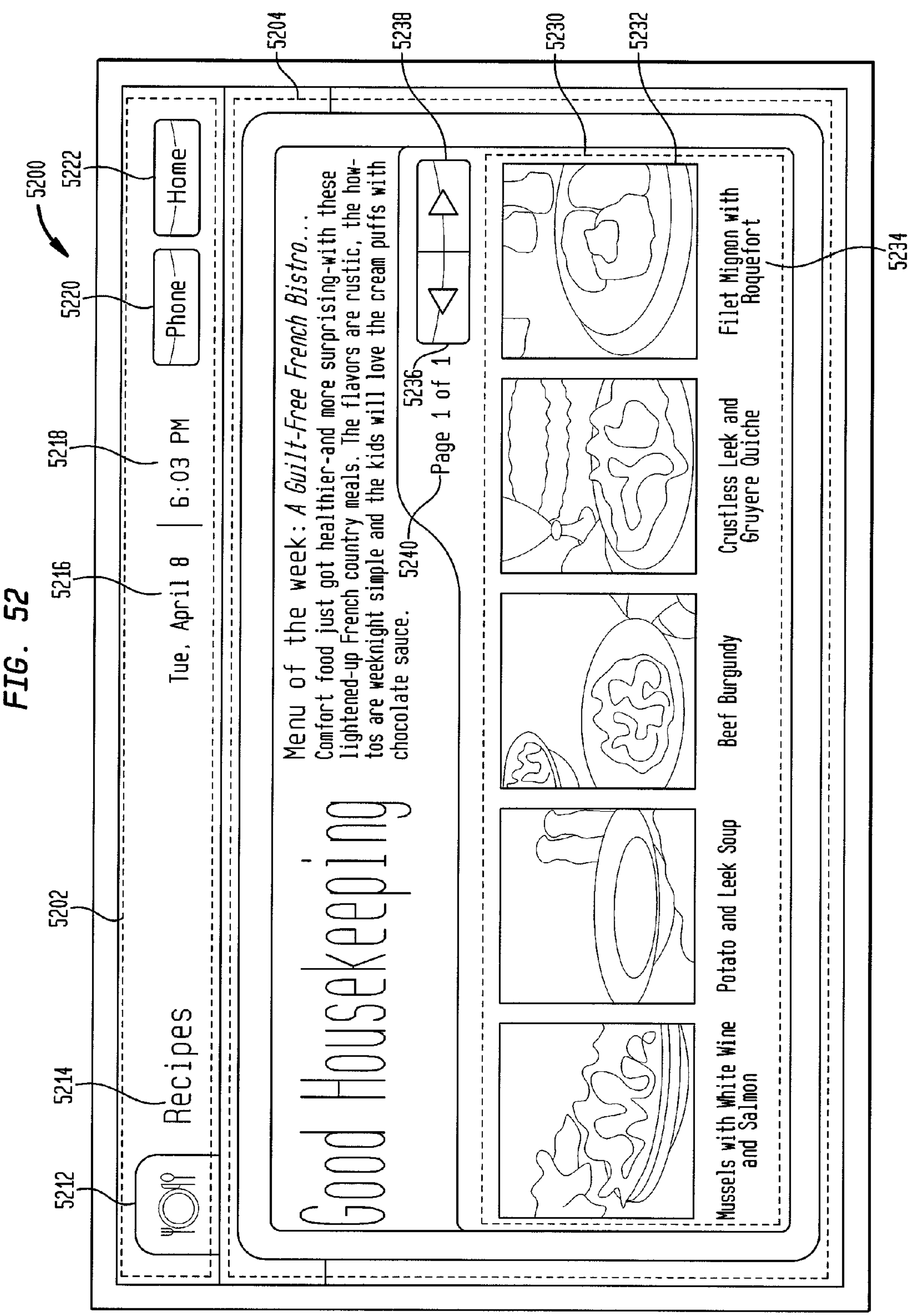
FIG. 52 depicts an exemplary GUI screen for a recipes application.

FIG. 52 depicts an example GUI screen 5200 for a recipes application in accordance with an embodiment of the present invention. As shown in FIG. 52, example GUI screen 5200 includes a status bar 5202 and a recipes application interface 5204.

Status bar 5202 includes an icon 5212 representative of the recipes application, a name 5214 ("Recipes") associated with the recipes application, an indication of the current date 5216 and time 5218, a "phone" button 5220 and a "home" button 5222. When a user activates "phone" button 5220, GUI screen 3200 for a telephony application will be displayed. When a user activates "home" button 5222, the user will be returned to home GUI screen 3100.

Recipes application interface 5204 includes a display area 5230 that displays all or a portion of a collection of recipes. To page backwards through the collection of recipes a "page backward" button 5236 may be activated and to page forward a "page forward" button 5238 may be activated. A page indicator 5240 indicates which of one or more pages of the collection is currently being displayed. For each recipe identified in display area 5230, a graphic icon (such as icon 5232) is provided and a name of the recipe (such as name 5234) is provided. To obtain details concerning a recipe identified in display area 5230, the icon representing the recipe may be activated.

Figure 53:
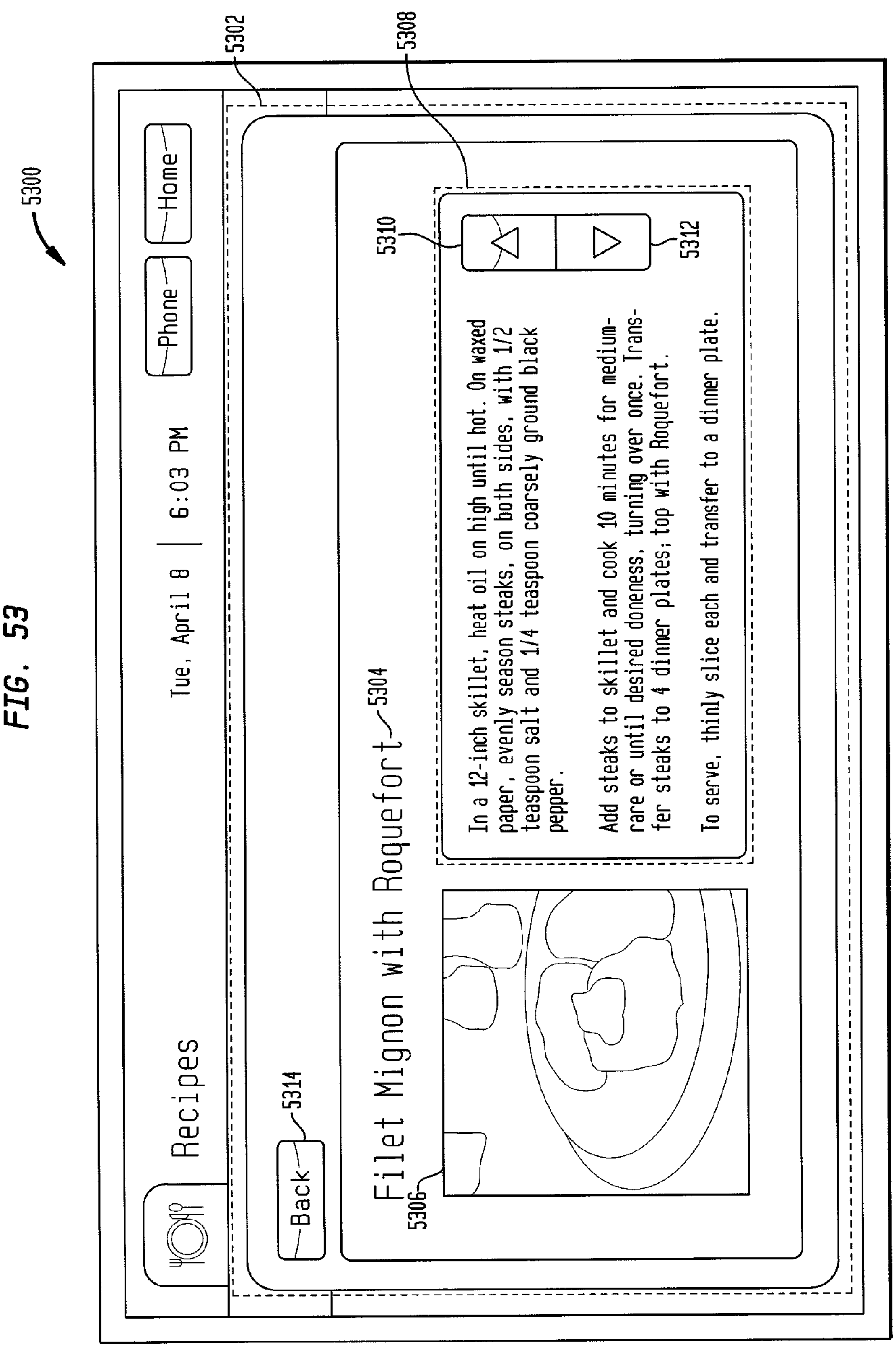
FIG. 53 depicts an additional exemplary GUI screen for a recipes application.

If a user activates a recipe icon, a further recipes interface is provided in which recipe details may be viewed. An example of such an interface 5302 is depicted in example GUI screen 5300 of FIG. 53. As shown in FIG. 53, interface 5302 displays the name of the relevant recipe 5304, a picture or graphic icon 5306 that represents the relevant recipe, and a text display area 5308 in which the recipe text for the relevant recipe is displayed. A user may scroll the text displayed within text display area 5308 up and down by activating a "scroll up" button 5310 and a "scroll down" button 5312 respectively. A "back" button 5314 may be activated to return to GUI screen 5300 of FIG. 53.

Figure 54:
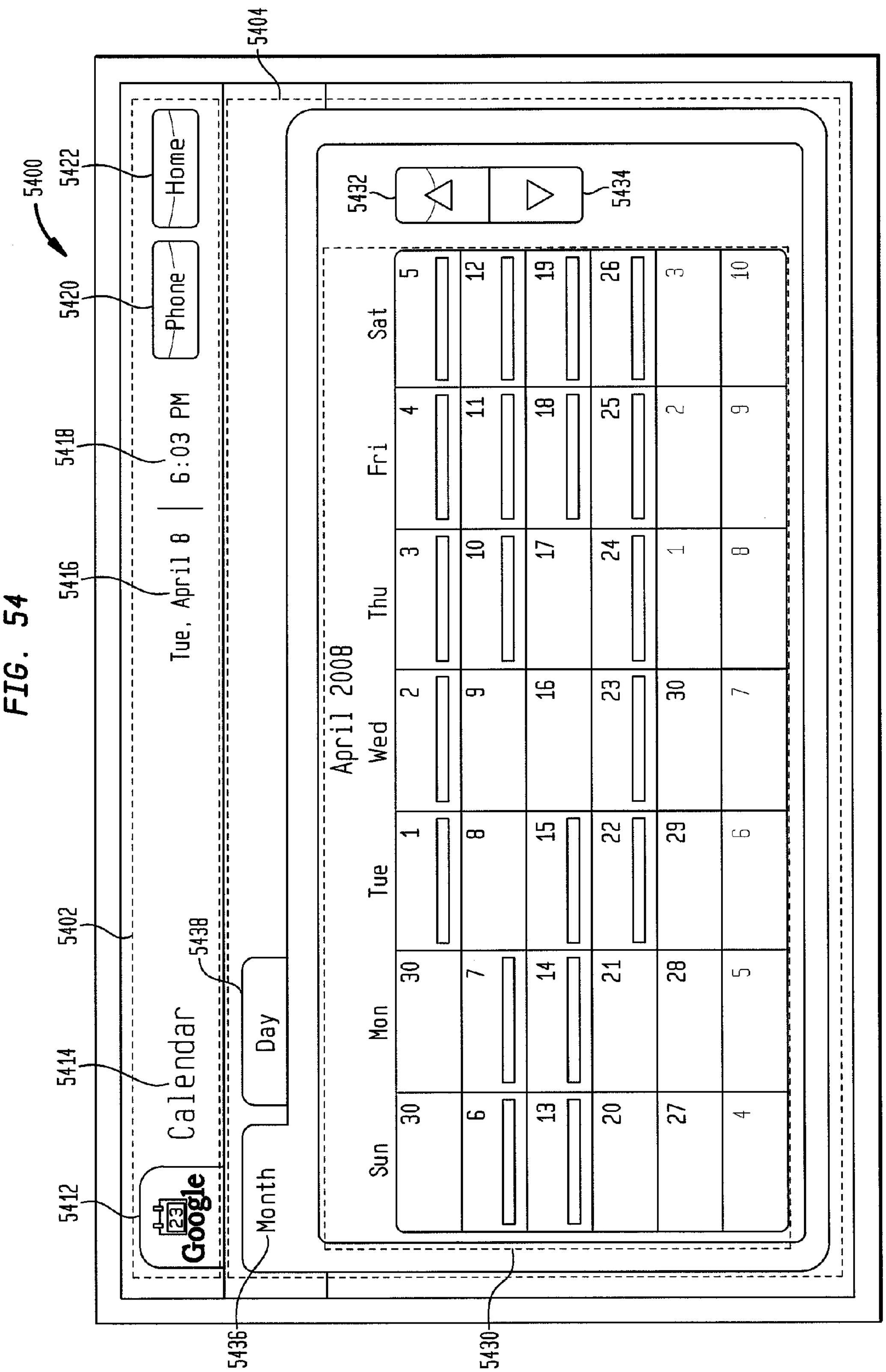
FIG. 54 depicts an exemplary GUI screen for a calendar application.

FIG. 54 depicts an example GUI screen 5400 for a calendar application in accordance with an embodiment of the present invention. As shown in FIG. 54, example GUI screen 5400 includes a status bar 5402 and a calendar application interface 5404.

Status bar 5402 includes an icon 5412 representative of the news application, a name 5414 ("News") associated with the news application, an indication of the current date 5416 and time 5418, a "phone" button 5420 and a "home" button 5422. When a user activates "phone" button 5420, GUI screen 3200 for a telephony application will be displayed. When a user activates "home" button 5422, the user will be returned to home GUI screen 3100.

Calendar application interface 5404 comprises two different interfaces, only one of which may be shown at any given time: a monthly calendar interface that may be selected by activating a "month" tab 5436 and a daily calendar interface that may be selected by activating a "day" tab 5438. In FIG. 54, the monthly calendar interface is currently being displayed. As shown in that figure, the monthly calendar interface includes a display area 5430 within which a monthly calendar is displayed. Activating a particular date within the monthly calendar will cause the daily calendar interface to be displayed for that date. An "up arrow" button 5432 allows a user to display a previous month within display area 5430 and a "down arrow" button 5434 allows a user to display a subsequent month within display area 5430.

Figure 55:
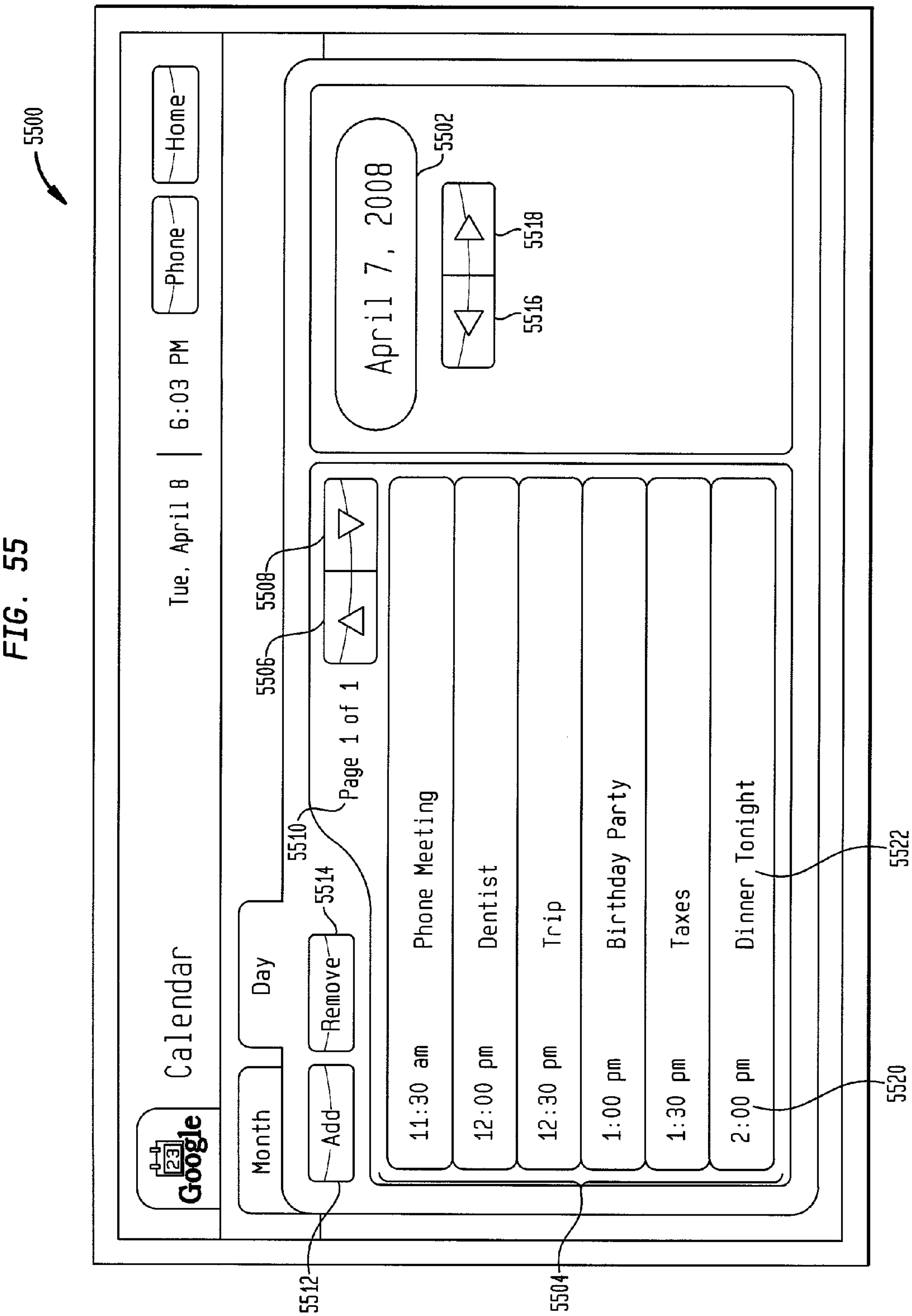
FIG. 55 depicts an additional exemplary GUI screen for a calendar application.

FIG. 55 depicts a GUI screen 5500 for the aforementioned calendar application in which the daily calendar interface is displayed. As shown in FIG. 55, the daily calendar interface includes a temporally-ordered list of scheduled daily activities or appointments 5504 corresponding to a particular date which is displayed in a window 5502. To page up through list 5504 a "page up" button 5506 may be activated and to page down a "page down" button 5508 may be activated. A page indicator 5510 indicates which of one or more pages of list 5504 is currently being displayed. For each scheduled appointment or activity scheduled in list 5504 an appointment/activity time 5520 and descriptor 5522 is displayed. An "add" button 5512 may be activated to launch a dialog by which a new appointment or activity may be added to list 5504. A "remove" button 5514 may be activated to remove a selected appointment or activity from list 5504. To change the date for which calendar information is being displayed to a previous date a "backward arrow" button 5516 may be activated and to change the date to a subsequent date a "forward arrow" 5518 button may be activated.

Figure 56:
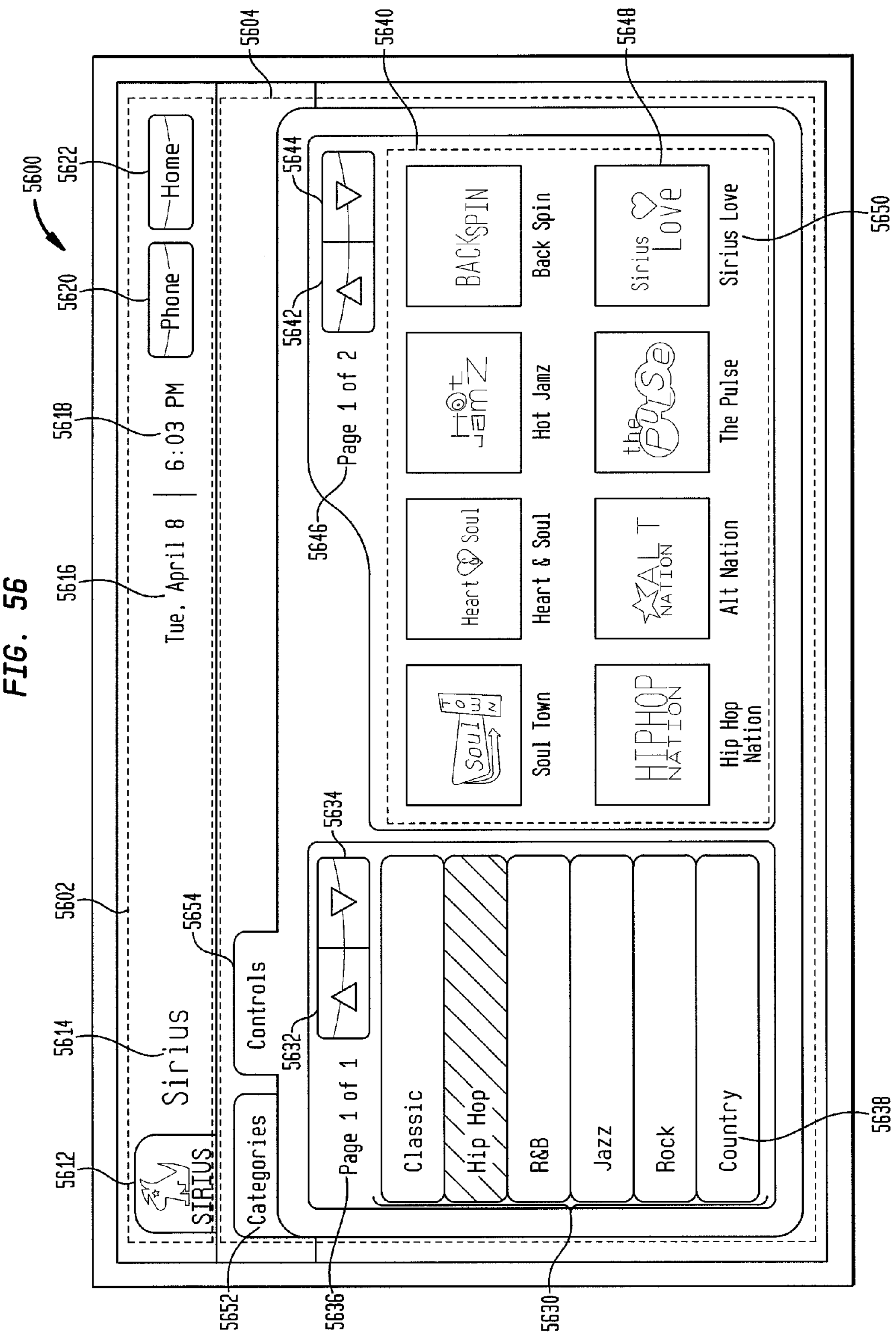
FIG. 56 depicts an exemplary GUI screen for an Internet radio application.

FIG. 56 depicts an example GUI screen 5600 for an Internet radio application in accordance with an embodiment of the present invention. In an embodiment, the Internet radio application comprises an application premised on SIRIUS® Internet radio service offered by SIRIUS XM Radio of New York, N.Y. As shown in FIG. 56, example GUI screen 5600 includes a status bar 5602 and a calendar application interface 5604.

Status bar 5602 includes an icon 5612 representative of the Internet radio application, a name 5614 ("Sirius") associated with the Internet radio application, an indication of the current date 5616 and time 5618, a "phone" button 5620 and a "home" button 5622. When a user activates "phone" button 5620, GUI screen 3200 for a telephony application will be displayed. When a user activates "home" button 5622, the user will be returned to home GUI screen 3100.

Internet radio application interface 5604 comprises two different interfaces, only one of which may be shown at any given time: a categories interface that may be selected by activating a "categories" tab 5652 and a controls interface that may be selected by activating a "controls" tab 5654. In FIG. 56, the categories interface is currently being displayed. As shown in that figure, the categories interface includes a first display area that displays all or a portion of a list of radio categories 5630. To page up through list 5630 a "page up" button 5632 may be activated and to page down a "page down" button 5634 may be activated. A page indicator 5636 indicates which of one or more pages of category list 5630 is currently being displayed. A name 5638 is provided for each category in list 5630. A category in list 5630 may be selected by activating the horizontal bar upon which the category name is provided.

As further shown in FIG. 56, the categories interface further includes a second display area that displays all or a portion of a collection of radio channels 5640 corresponding to a selected radio category in list 5630. To page up through collection 5640 a "page up" button 5642 may be activated and to page down a "page down" button 5644 may be activated. A page indicator 5646 indicates which of one or more pages of collection 5640 is currently being displayed. For each channel displayed in collection 5640, a graphic icon 5648 representing the channel and a name 5650 of the channel is displayed. A channel in collection 5640 may be selected for listening by activating the icon associated with the channel.

Figure 57:
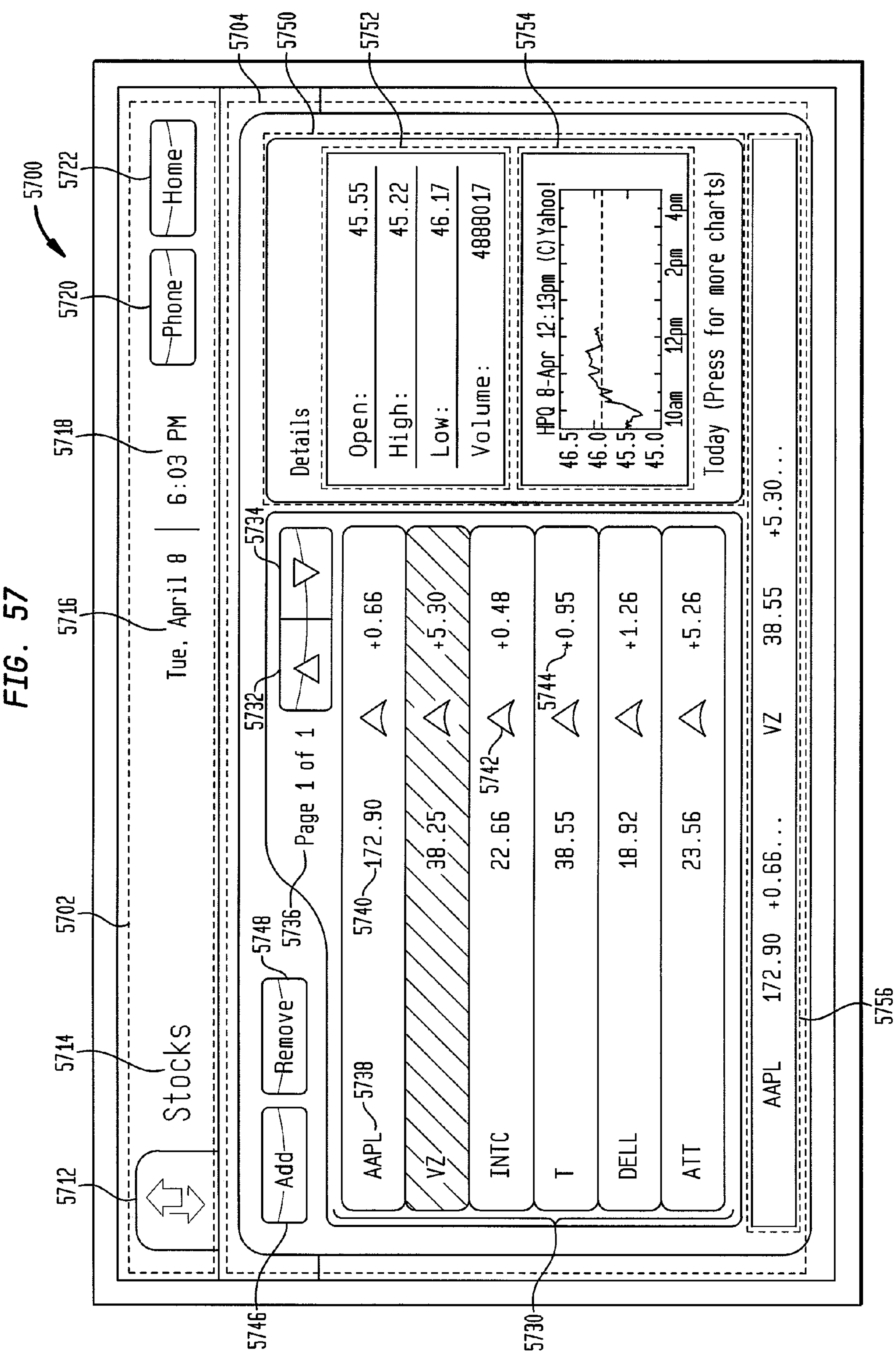
FIG. 57 depicts an exemplary GUI screen for a stocks application.

FIG. 57 depicts an example GUI screen 5700 for a stocks application in accordance with an embodiment of the present invention. As shown in FIG. 57, example GUI screen 5700 includes a status bar 5702 and a stocks application interface 5704.

Status bar 5702 includes an icon 5712 representative of the stocks application, a name 5714 ("Stocks") associated with the stocks application, an indication of the current date 5716 and time 5718, a "phone" button 5720 and a "home" button 5722. When a user activates "phone" button 5720, GUI screen 3200 for a telephony application will be displayed. When a user activates "home" button 5722, the user will be returned to home GUI screen 3100.

Stocks application interface 5704 includes a first display area that displays all or a portion of a list of stocks 5730. To page up through list 5730 a "page up" button 5732 may be activated and to page down a "page down" button 5734 may be activated. A page indicator 5736 indicates which of one or more pages of list 5730 is currently being displayed. For each stock identified in list 5730 the following information is provided: a stock symbol 5738, a current share price 5740, a visual indicator 5742 of whether the current share price is up or down for the day, and an amount 5744 by which the current share price is up or down for the day. A stock in list 5730 may be selected by activating the horizontal bar upon which the stock symbol is provided. A user may activate an "add" button 5746 to launch a dialog by which a stock may be added to list 5730. A user may also activate a "remove" button 5748 to remove a selected stock from list 5730.

Stocks application interface 5704 further includes a second display area 5750 that provides details about a stock selected from list 5730. As shown in FIG. 57, second display area 5750 includes a window 5752 that displays textual information about the relevant stock such as opening price, high price, low price and volume for the current day. As further shown in FIG. 57, second display area 5750 further includes a stock chart 5754 that graphically depicts the performance of the relevant stock for the current day. By activating stock chart 5754 a user may access additional charts associated with the relevant stock.

Stock application interface 5704 also includes a dynamically-updated stock ticker 5756 which displays stock symbols and associated share prices for a variety of stocks in a scrolling fashion.

Figure 58:
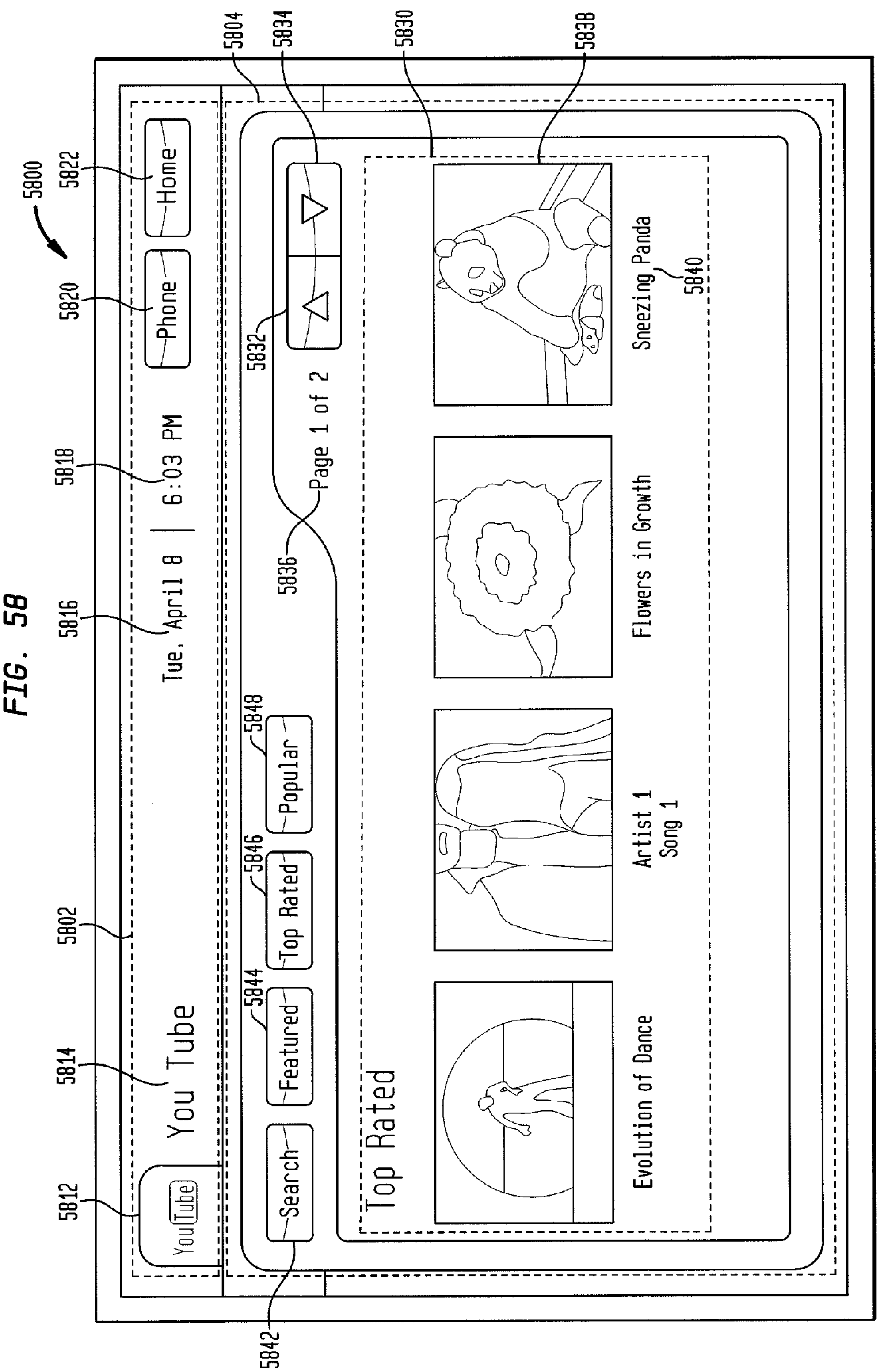
FIG. 58 depicts an exemplary GUI screen for an Internet video application.

FIG. 58 depicts an example GUI screen 5800 for an Internet video application in accordance with an embodiment of the present invention. In an embodiment, the Internet video application comprises an application premised on a YouTube™ Web service offered by YouTube LLC of San Bruno, Calif. As shown in FIG. 58, example GUI screen 5800 includes a status bar 5802 and an Internet video application interface 5804.

Status bar 5802 includes an icon 5812 representative of the Internet video application, a name 5814 ("You Tube") associated with the Internet video application, an indication of the current date 5816 and time 5818, a "phone" button 5820 and a "home" button 5822. When a user activates "phone" button 5820, GUI screen 3200 for a telephony application will be displayed. When a user activates "home" button 5822, the user will be returned to home GUI screen 3100.

Internet video application interface 5804 comprises four different interfaces, only one of which may be shown at any given time: a video search interface that may be selected by activating a "search" button 5842, a featured videos interface that may be selected by activating a "featured" button 5844, a top-rated videos interface that may be selected by activating a "top rated" button 5846 and a popular videos interface that may be selected by activating a "popular" button 5848. In FIG. 58, the top-rated videos interface is currently being displayed. As shown in that figure, the top-rated videos interface includes a display area 5830 that displays all or a portion of a collection of top-rated videos 5830. To page up through the collection a "page up" button 5832 may be activated and to page down a "page down" button 5834 may be activated. A page indicator 5836 indicates which of one or more pages of the collection is currently being displayed. For each video identified in the collection, an icon 5838 and a name 5840 is displayed. A video in collection 5830 may be selected for playback by activating the icon associated with the video.

Figure 59:
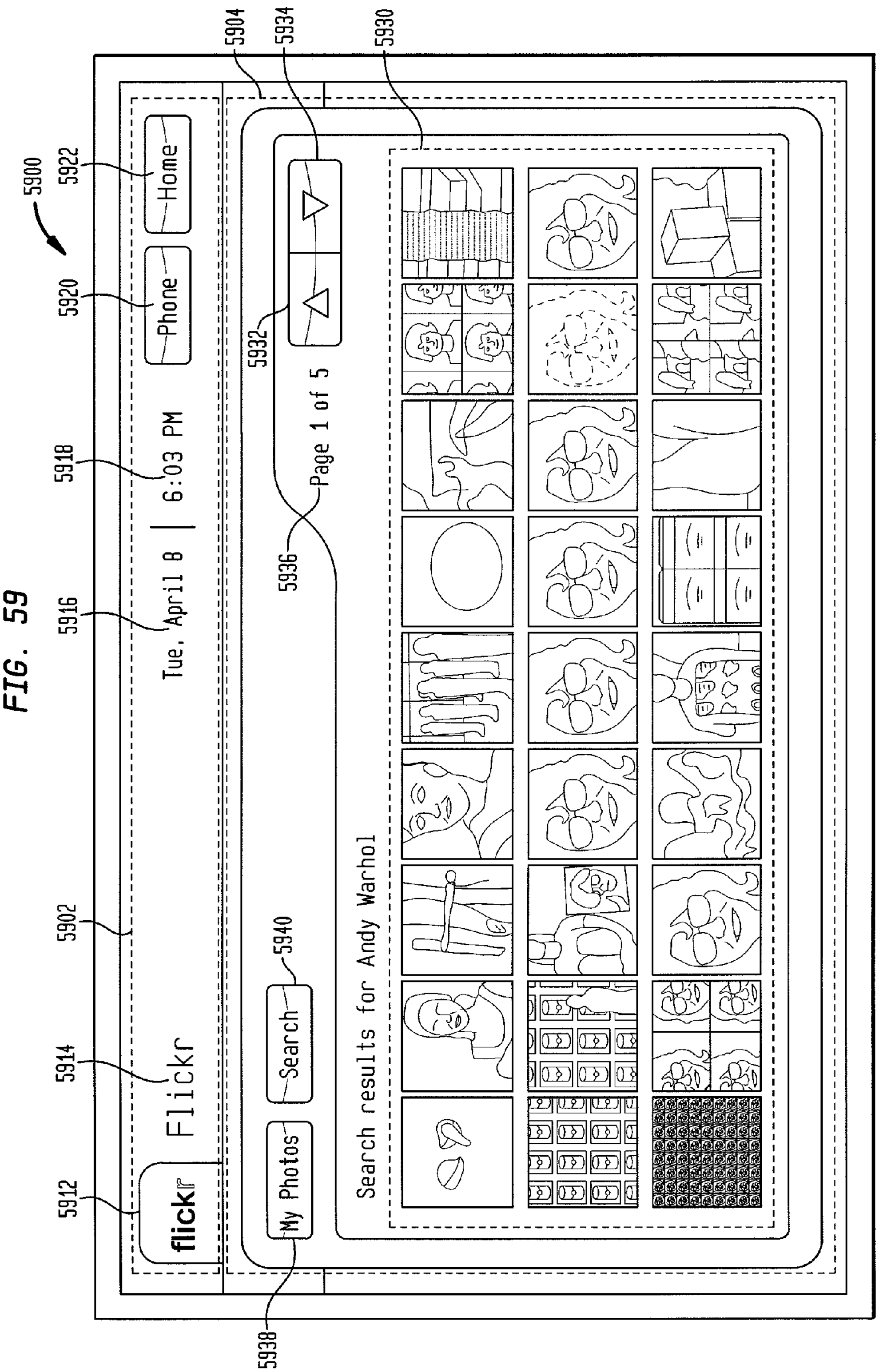
FIG. 59 depicts an exemplary GUI screen for an Internet-based photo application.

FIG. 59 depicts an example GUI screen 5900 for an Internet-based photo application in accordance with an embodiment of the present invention. In an embodiment, the Internet-based photo application comprises an application premised on a Flickr™ Web service offered by Yahoo! Inc. of Sunnyvale, Calif. As shown in FIG. 59, example GUI screen 5900 includes a status bar 5902 and an Internet-based photo application interface 5904.

Status bar 5902 includes an icon 5912 representative of the Internet-based photo application, a name 5914 ("Flickr") associated with the Internet-based photo application, an indication of the current date 5916 and time 5918, a "phone" button 5920 and a "home" button 5922. When a user activates "phone" button 5920, GUI screen 3200 for a telephony application will be displayed. When a user activates "home" button 5922, the user will be returned to home GUI screen 3100.

Internet-based photo application interface 5904 comprises two different interfaces, only one of which may be shown at any given time: a personal photos interface that may be selected by activating a "my photos" button 5938 and a search interface that may be selected by activating a "search" button 5940. In FIG. 59, the search interface is currently being displayed. As shown in that figure, the results from a search premised on the query terms "Andy Warhol" has returned a collection of photos 5930. To page up through the collection a "page up" button 5932 may be activated and to page down a "page down" button 5934 may be activated. A page indicator 5936 indicates which of one or more pages of the collection is currently being displayed. A photo in collection 5930 may be selected for viewing in a larger window by activating the photo.

Figure 60:
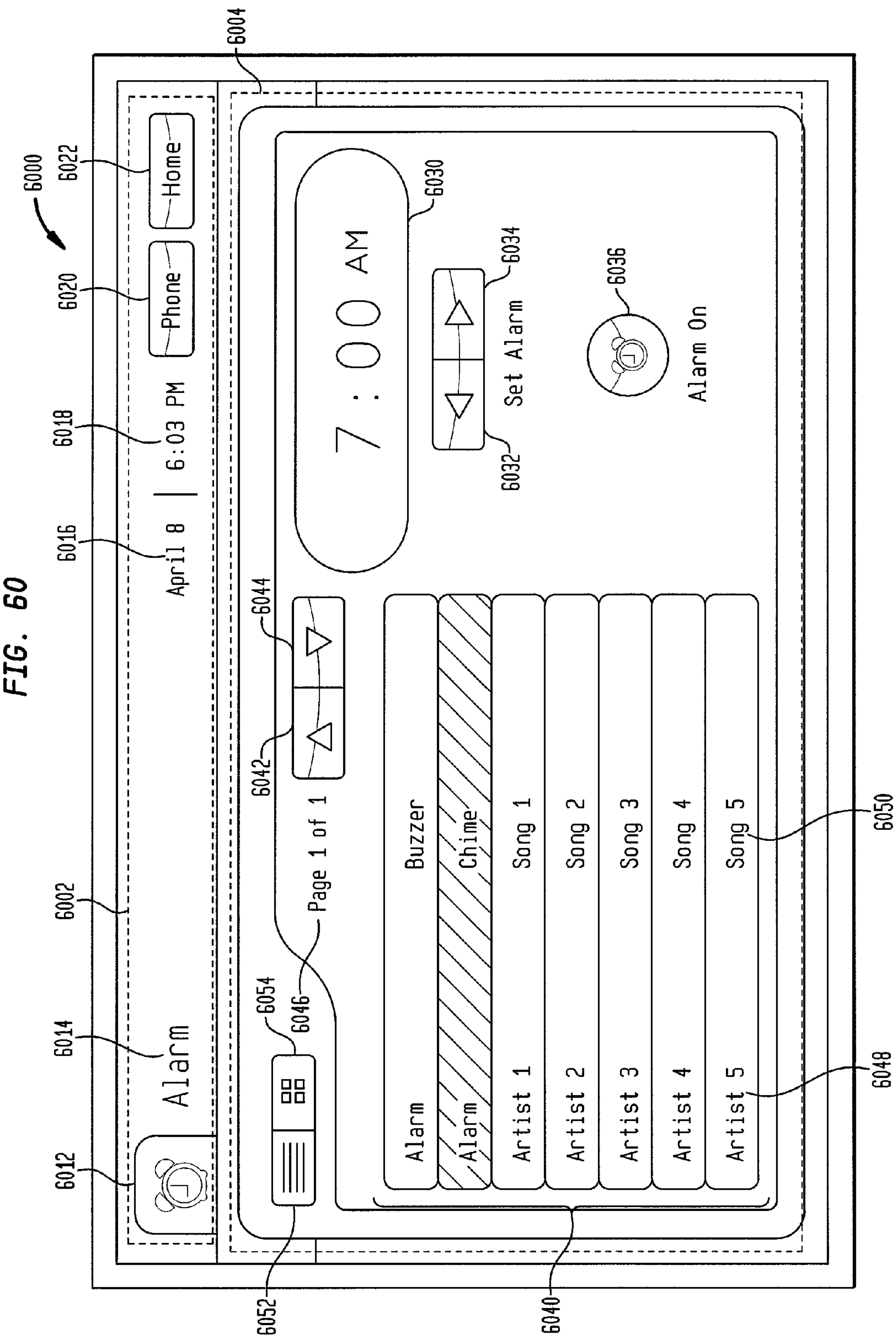
FIG. 60 depicts an exemplary GUI screen for an alarm application.

FIG. 60 depicts an example GUI screen 6000 for an alarm application in accordance with an embodiment of the present invention. As shown in FIG. 60, example GUI screen 6000 includes a status bar 6002 and an alarm application interface 6004.

Status bar 6002 includes an icon 6012 representative of the alarm application, a name 6014 ("Alarm") associated with the alarm application, an indication of the current date 6016 and time 6018, a "phone" button 6020 and a "home" button 6022. When a user activates "phone" button 6020, GUI screen 3200 for a telephony application will be displayed. When a user activates "home" button 6022, the user will be returned to home GUI screen 3100.

Alarm application interface 6004 includes an alarm on/off button 6036 that a user may activate to turn on or off an alarm. A window 6030 displays a time at which the alarm will sound. A "backward arrow" button may be activated to select a previous time while a "forward arrow" button may be activated to select a subsequent time.

Alarm application interface 6004 further includes all or a portion of a list 6040 of audio files that may be used as an alarm. To page backward through list 6040 a "page backward" button 6042 may be activated and to page forward a "page forward" button 6044 may be activated. A page indicator 6044 indicates which of one or more pages of list 6040 is currently being displayed. For each audio file identified in list 6040, an audio source 6048 and a descriptor associated with the audio file 6050 is displayed. System-provided alarms as well as digital music files may be used as the alarm. For system-provided alarms, the audio source is listed as "alarm" and the descriptor of the audio file denotes the alarm type. For digital music files, the audio source is the performer of the digital music and the descriptor provides a name of the song. To select an audio file displayed in list 6040 as the alarm, the horizontal bar that provides information about the audio file may be activated.

Figure 61:
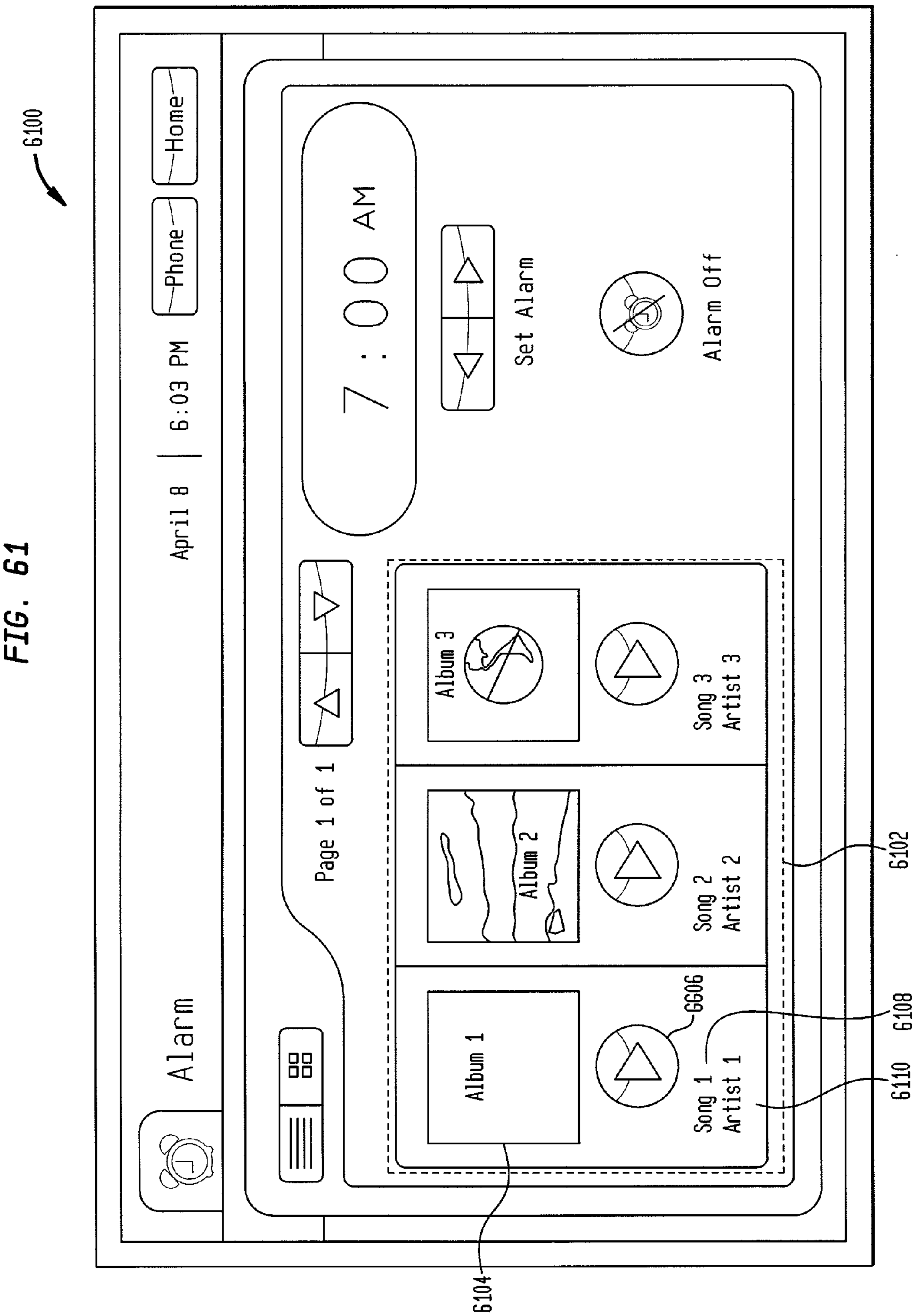
FIG. 61 depicts an additional exemplary GUI screen for an alarm application.

Alarm application interface 6004 allows audio file information to be displayed in two formats. The list format shown in FIG. 60 may be obtained by activating a first display format button 6052. An icon format shown in GUI interface screen 6100 of FIG. 61 may be obtained by activating a second display format button 6054. As shown in FIG. 61, when the icon format is selected, a display area 6102 is presented that displays an icon 6104 associated with each audio file. A playback button 6106, a title 6108 and performer 6110 may be displayed below each icon.

Figure 62:
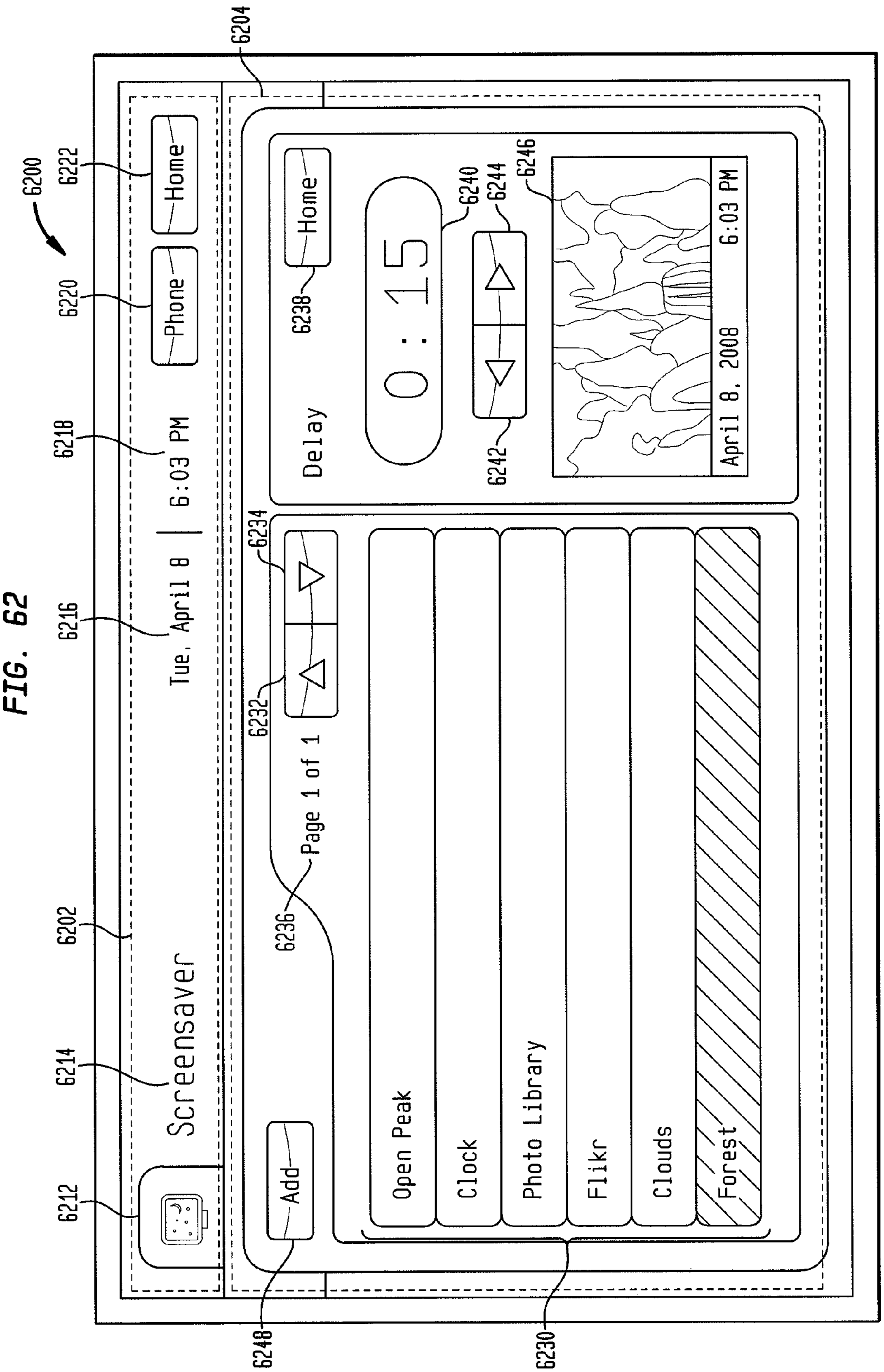
FIG. 62 depicts an exemplary GUI screen for a screensaver application.

FIG. 62 depicts an example GUI screen 6200 for a screensaver application in accordance with an embodiment of the present invention. As shown in FIG. 62, example GUI screen 6200 includes a status bar 6202 and a screensaver application interface 6204.

Status bar 6202 includes an icon 6212 representative of the screensaver application, a name 6214 ("Screensaver") associated with the screensaver application, an indication of the current date 6216 and time 6218, a "phone" button 6220 and a "home" button 6222. When a user activates "phone" button 6220, GUI screen 3200 for a telephony application will be displayed. When a user activates "home" button 6222, the user will be returned to home GUI screen 3100.

Screensaver application interface 6204 includes all or a portion of a list screensavers 6230 that may be activated by a user for display after a predetermined period of device inactivity. To page up through list 6230 a "page up" button 6232 may be activated and to page down a "page down" button 6234 may be activated. A page indicator 6236 indicates which of one or more pages of list 6230 is currently being displayed. To select a screensaver, a user may activate one of the screensavers displayed in list 6230.

Screensaver application interface 6204 further includes a window 6240 that displays the current amount of delay (i.e., time of device inactivity) that must occur before a selected screensaver will be displayed. The amount of delay may be decreased by activating a "left arrow" button 6242 or increased by activating a "right arrow" button 6244. A window 6246 displays a preview of a currently selected screensaver. A screensaver configuration may be saved by activating a "save" button 6238. A "back" button 6248 is also provided on screensaver application interface 6204 that, when activated, causes a previously-displayed GUI screen to be displayed.

Figure 63:
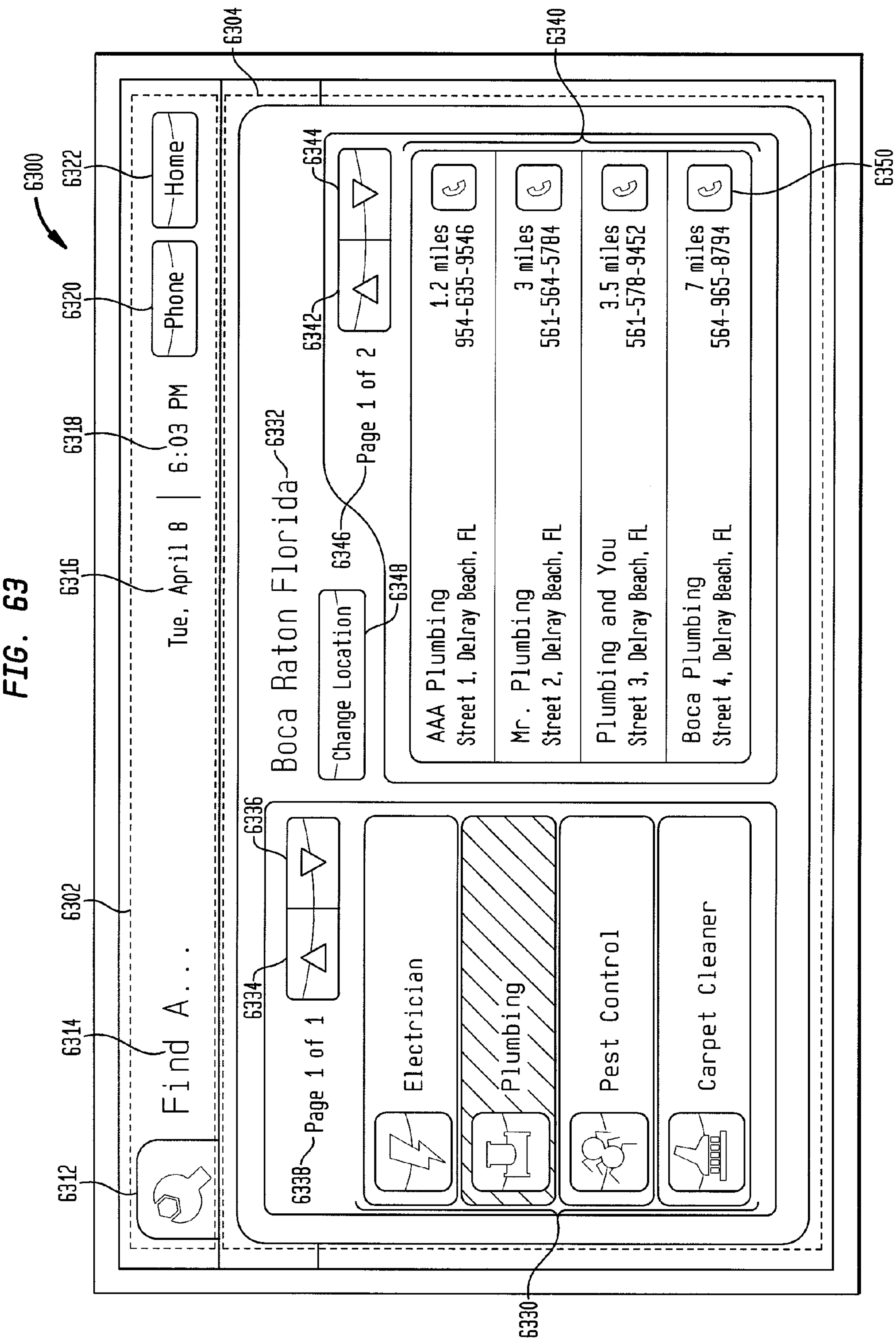
FIG. 63 depicts an exemplary GUI screen for a directory services application.

FIG. 63 depicts an example GUI screen 6300 for a directory services application in accordance with an embodiment of the present invention. As shown in FIG. 63, example GUI screen 6300 includes a status bar 6302 and a directory services application interface 6304.

Status bar 6302 includes an icon 6312 representative of the directory services application, a name 6314 ("Find A . . . ") associated with the directory services application, an indication of the current date 6316 and time 6318, a "phone" button 6320 and a "home" button 6322. When a user activates "phone" button 6320, GUI screen 3200 for a telephony application will be displayed. When a user activates "home" button 6322, the user will be returned to home GUI screen 3100.

Directory services application interface 6304 includes a first display area that displays all or a portion of a list of business categories 6330. To page up through list 6330 a "page up" button 6334 may be activated and to page down a "page down" button 6336 may be activated. A page indicator 6338 indicates which of one or more pages of list 6330 is currently being displayed. To select a business category from among those in list 6330, the horizontal bar that provides information about the business category may be activated.

Directory services application interface 6304 further includes a second display area that displays all or a portion of a list of businesses 6340 of the type currently selected in list 6330. The businesses are selected based on proximity to a particular location 6332. In the example of FIG. 63, the particular location is "Boca Raton Fla." To page up through list 6340 a "page up" button 6342 may be activated and to page down a "page down" button 6344 may be activated. A page indicator 6346 indicates which of one or more pages of list 6340 is currently being displayed. For each business identified in list 6340, a name, address and phone number is provided. A "telephone" button 6350 associated with each business may be activated to place a telephone call to the business via device 110.

A "change location" button 6348 is provided that, when activated, launches a dialog by which a user can select a different location for which to obtain directory services information.

Figure 64:
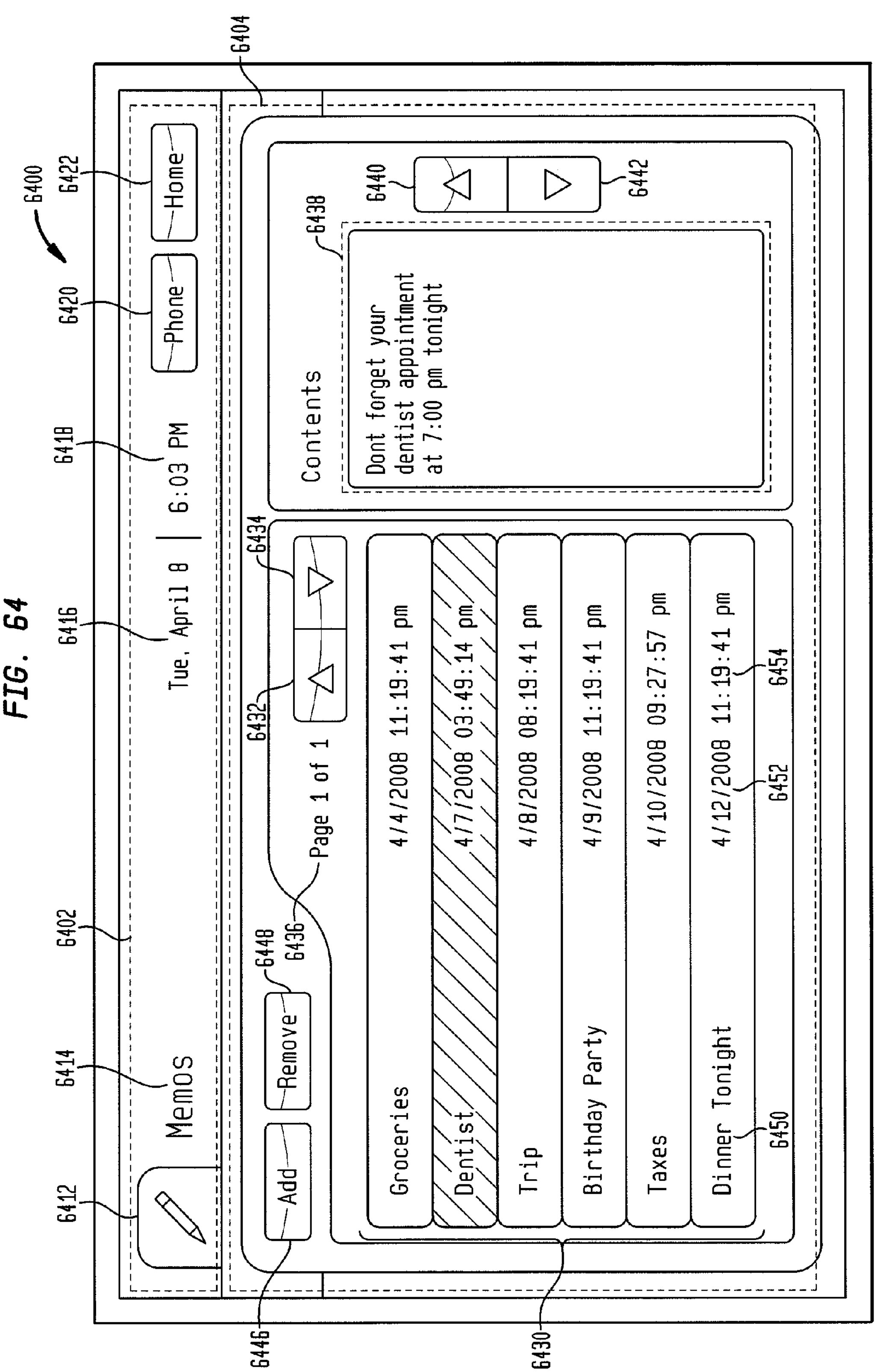
FIG. 64 depicts an exemplary GUI screen for a memos application.

FIG. 64 depicts an example GUI screen 6400 for a memos application in accordance with an embodiment of the present invention. As shown in FIG. 64, example GUI screen 6400 includes a status bar 6402 and a memos application interface 6404.

Status bar 6402 includes an icon 6412 representative of the memos application, a name 6414 ("Memos") associated with the memos application, an indication of the current date 6416 and time 6418, a "phone" button 6420 and a "home" button 6422. When a user activates "phone" button 6420, GUI screen 3200 for a telephony application will be displayed. When a user activates "home" button 6422, the user will be returned to home GUI screen 3100.

Memos application interface 6404 includes a first display area that displays all or a portion of a list of memos 6430. Each memo may comprise a task, appointment or reminder that a user might wish to make note of. To page up through list 6430 a "page up" button 6432 may be activated and to page down a "page down" button 6434 may be activated. A page indicator 6436 indicates which of one or more pages of list 6430 is currently being displayed. For each memo identified in list 6430 the following information is provided: a text descriptor 6450 of the subject matter of the memo and a date 6452 and time 6454 associated with the memo (such as the date and time the memo was created). List 6430 may be temporally-ordered. A memo in list 6430 may be selected for viewing by activating the horizontal bar upon which the memo information is provided. A user may activate an "add" button 6446 to launch a dialog by which a memo may be added to list 6430. A user may also activate a "remove" button 6448 to remove a selected memo from list 6430.

Memos application interface 6404 further includes a window 6438 that displays the text content of a memo selected from list 6430. A user may scroll the text displayed within window 6438 up and down by activating a "scroll up" button 6440 and a "scroll down" button 6442 respectively.

Figure 65:
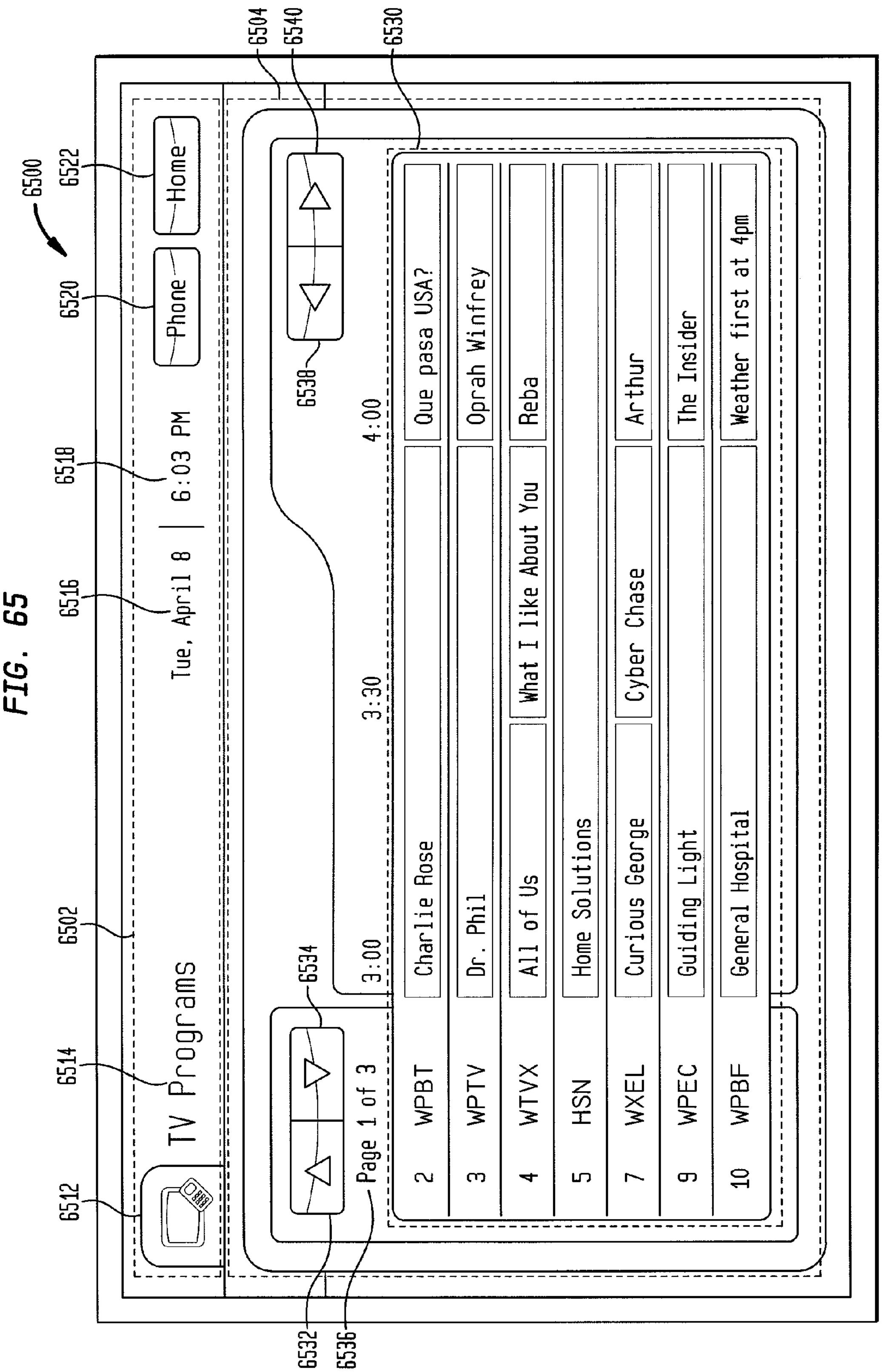
FIG. 65 depicts an exemplary GUI screen for a television (TV) programming guide application.

FIG. 65 depicts an example GUI screen 6500 for a television (TV) programming guide application in accordance with an embodiment of the present invention. As shown in FIG. 65, example GUI screen 6500 includes a status bar 6502 and a TV programming guide application interface 6504.

Status bar 6502 includes an icon 6512 representative of the TV programming guide application, a name 6514 ("TV Programs") associated with the TV programming guide application, an indication of the current date 6516 and time 6518, a "phone" button 6520 and a "home" button 6522. When a user activates "phone" button 6520, GUI screen 3200 for a telephony application will be displayed. When a user activates "home" button 6522, the user will be returned to home GUI screen 3100.

TV programming guide application interface 6504 includes a display area 6530 that provides TV programming information for a plurality of TV channels across a plurality of time slots. To view information about other channels than those currently shown in display area 6530 a user may activate either a "page up" button 6532 or a "page down" button 6534. A page indicator 6536 indicates which of one or more pages of channel information is currently being displayed. To view programming information for previous time slots a user may activate a "backward" button 6538 and to view programming information for subsequent time slots a user may activate a "forward" button 6540.

Figure 66:
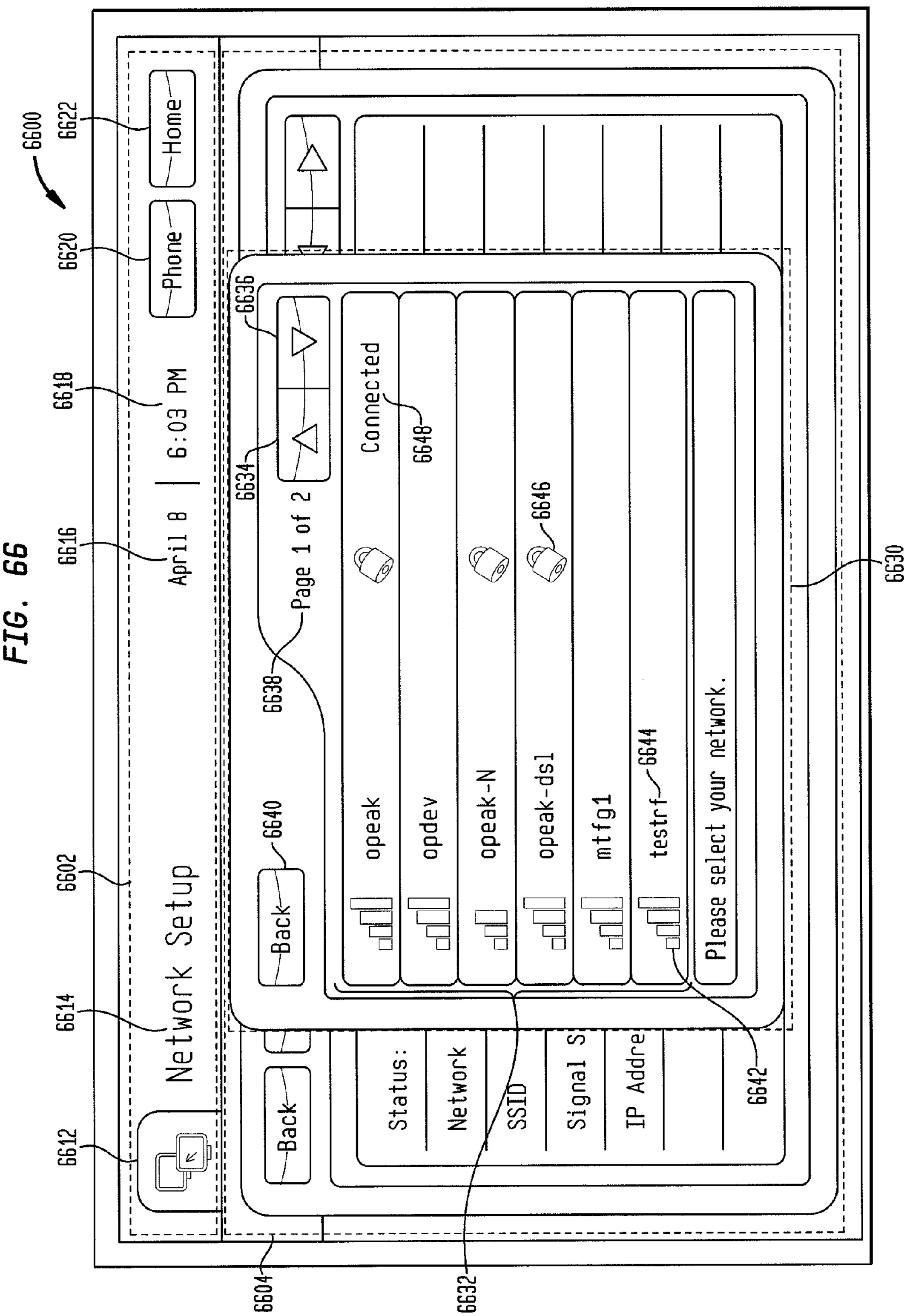
FIG. 66 depicts an exemplary GUI screen for a network setup application.

FIG. 66 depicts an example GUI screen 6600 for a network setup application in accordance with an embodiment of the present invention. As shown in FIG. 66, example GUI screen 6600 includes a status bar 6602 and a network setup application interface 6604.

Status bar 6602 includes an icon 6612 representative of the network setup application, a name 6614 ("Network Setup") associated with the network setup application, an indication of the current date 6616 and time 6618, a "phone" button 6620 and a "home" button 6622. When a user activates "phone" button 6620, GUI screen 3200 for a telephony application will be displayed. When a user activates "home" button 6622, the user will be returned to home GUI screen 3100.

In FIG. 66, network setup application interface 6604 is overlaid by a network selection interface 6630 that allows a user to select a wireless network to which device 110 may attempt to connect. As further shown in that figure, network selection interface 6630 displays all or a portion of a list 6632 of detected wireless networks. To page up through list 6632 a "page up" button 6634 may be activated and to page down a "page down" button 6636 may be activated. A page indicator 6638 indicates which of one or more pages of list 6632 is currently being displayed. For each wireless network identified in list 6632, a visual indicator 6642 of the strength of the wireless signal and a name 6644 of the wireless network is provided. Optionally, a visual indicator 6646 of whether the network is encrypted and a connection status 6648 may also be provided. A "back" button 6640 is also provided in network selection interface 6630 to allow a user to return to network setup application interface 6604.

Figure 67:
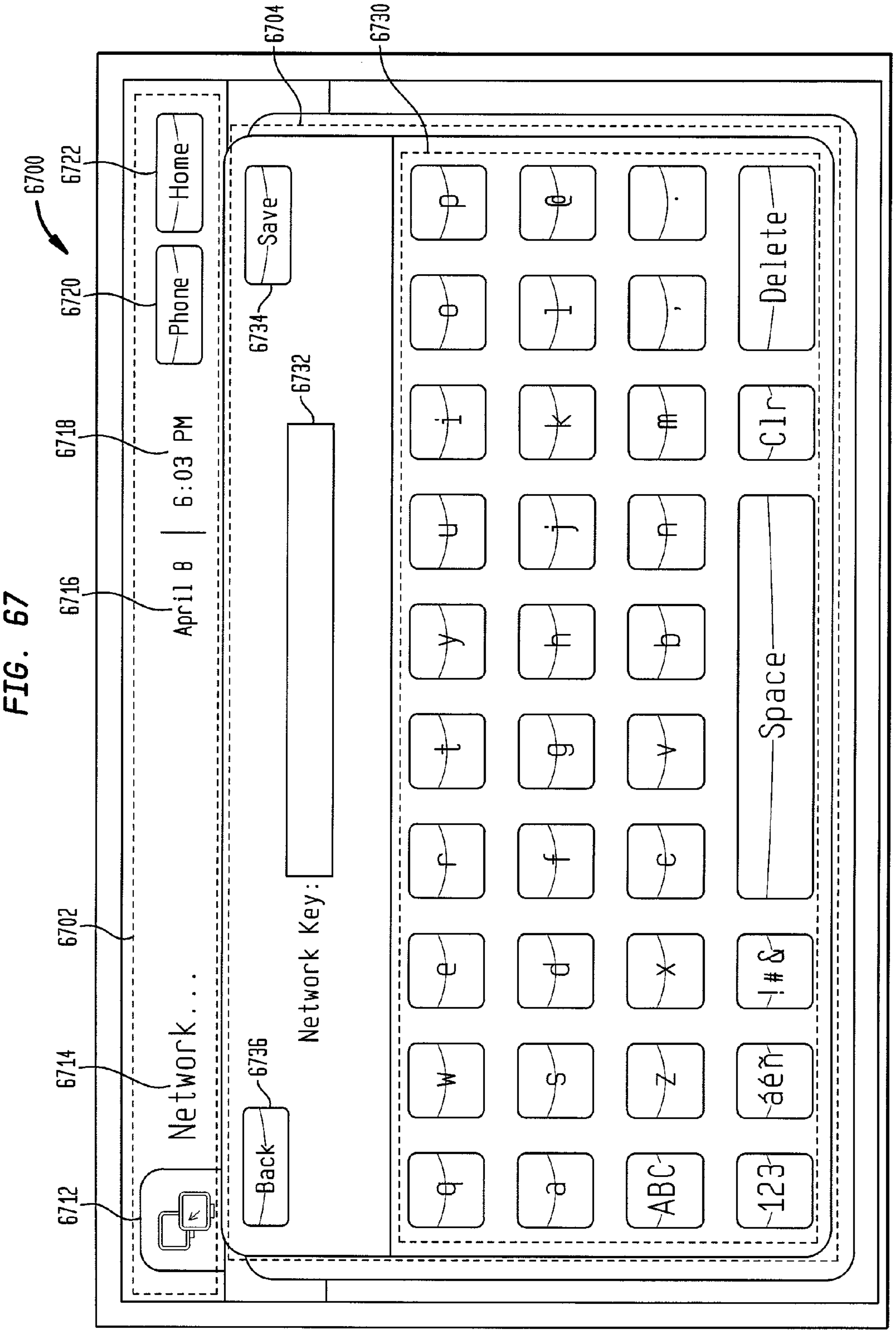
FIG. 67 depicts an additional exemplary GUI screen for a network setup application.

FIG. 67 depicts an additional example GUI screen 6700 for a network setup application in accordance with an embodiment of the present invention. As shown in FIG. 67, example GUI screen 6700 includes a status bar 6702 and a network setup application interface.

Status bar 6702 includes an icon 6712 representative of the network setup application, a name 6714 ("Network . . . ") associated with the network setup application, an indication of the current date 6716 and time 6718, a "phone" button 6720 and a "home" button 6722. When a user activates "phone" button 6720, GUI screen 3200 for a telephony application will be displayed. When a user activates "home" button 6722, the user will be returned to home GUI screen 3100.

In FIG. 67, the network setup application interface is overlaid by an encrypted network interface 6704 that allows a user to enter an encryption key for setting up or logging into an encrypted wireless network. As further shown in that figure, encrypted network setup interface 6704 displays a keyboard 6730 that may be used to type an encryption key that appears in a window 6732. The user may save the key by activating a "save" button 6734. A "back" button 6740 is also provided to allow a user to return to the normal network setup application interface.

Figure 68:
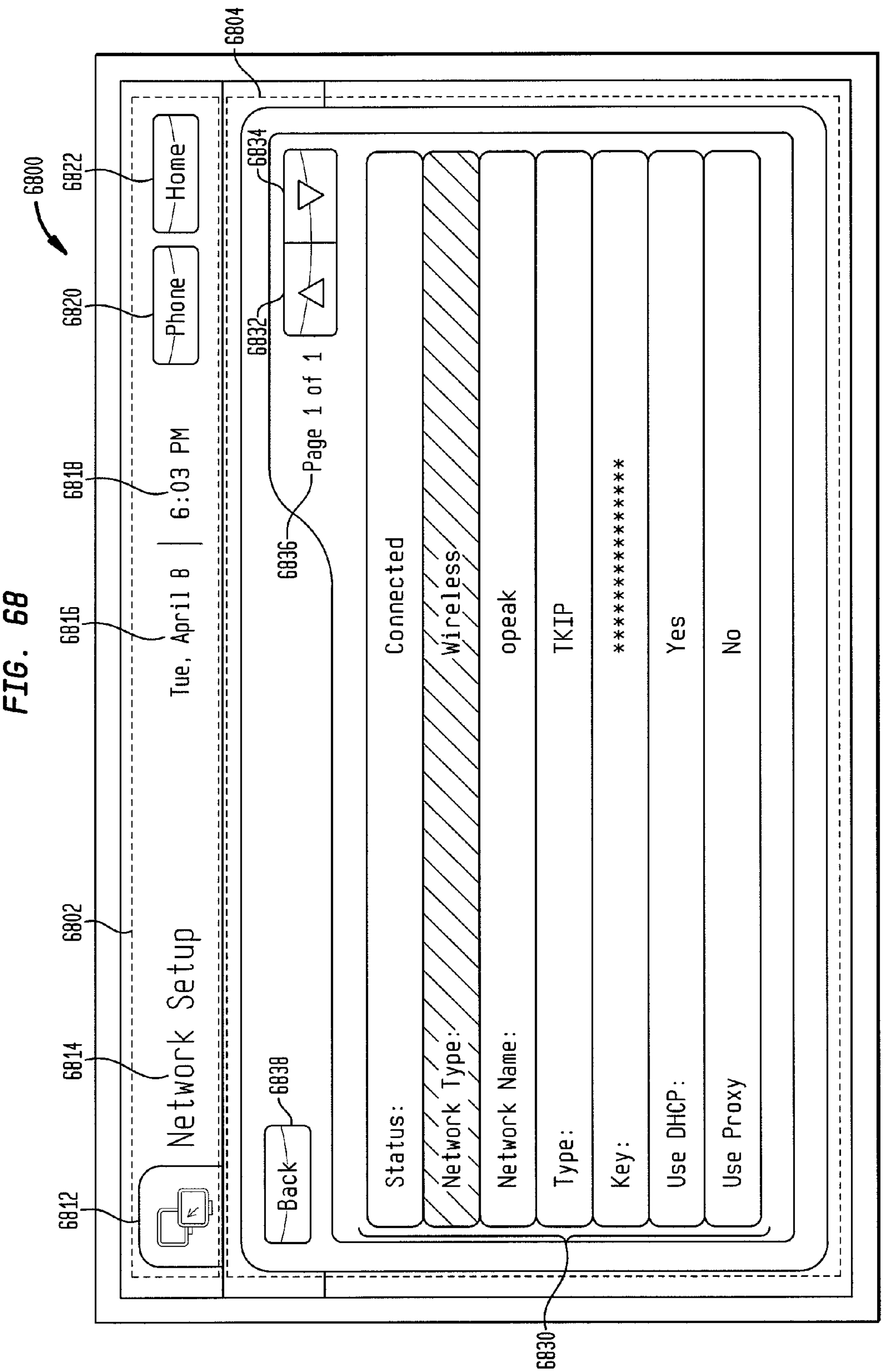
FIG. 68 depicts an exemplary GUI screen for an advanced network setup application.

FIG. 68 depicts an example GUI screen 6800 for an advanced network setup application in accordance with an embodiment of the present invention. As shown in FIG. 68, example GUI screen 6800 includes a status bar 6802 and an advanced network setup application interface 6804.

Status bar 6802 includes an icon 6812 representative of the advanced network setup application, a name 6814 ("Network Setup") associated with the advanced network setup application, an indication of the current date 6816 and time 6818, a "phone" button 6820 and a "home" button 6822. When a user activates "phone" button 6820, GUI screen 3200 for a telephony application will be displayed. When a user activates "home" button 6822, the user will be returned to home GUI screen 3100.

Advanced network setup application interface 6804 displays all or a portion of a list 6830 of network-related information and parameters, some of which may be configurable. To page up through list 6830 a "page up" button 6832 may be activated and to page down a "page down" button 6834 may be activated. A page indicator 6836 indicates which of one or more pages of list 6830 is currently being displayed. As shown in FIG. 68, information/parameters provided within list 6830 include a connection status, a network type, a network name, a security protocol type, an encryption key, whether Dynamic Host Configuration Protocol (DHCP) is used and whether proxy is used. A "back" button 6838 is provided to allow a user to return to the normal network setup application interface.

Figure 69:
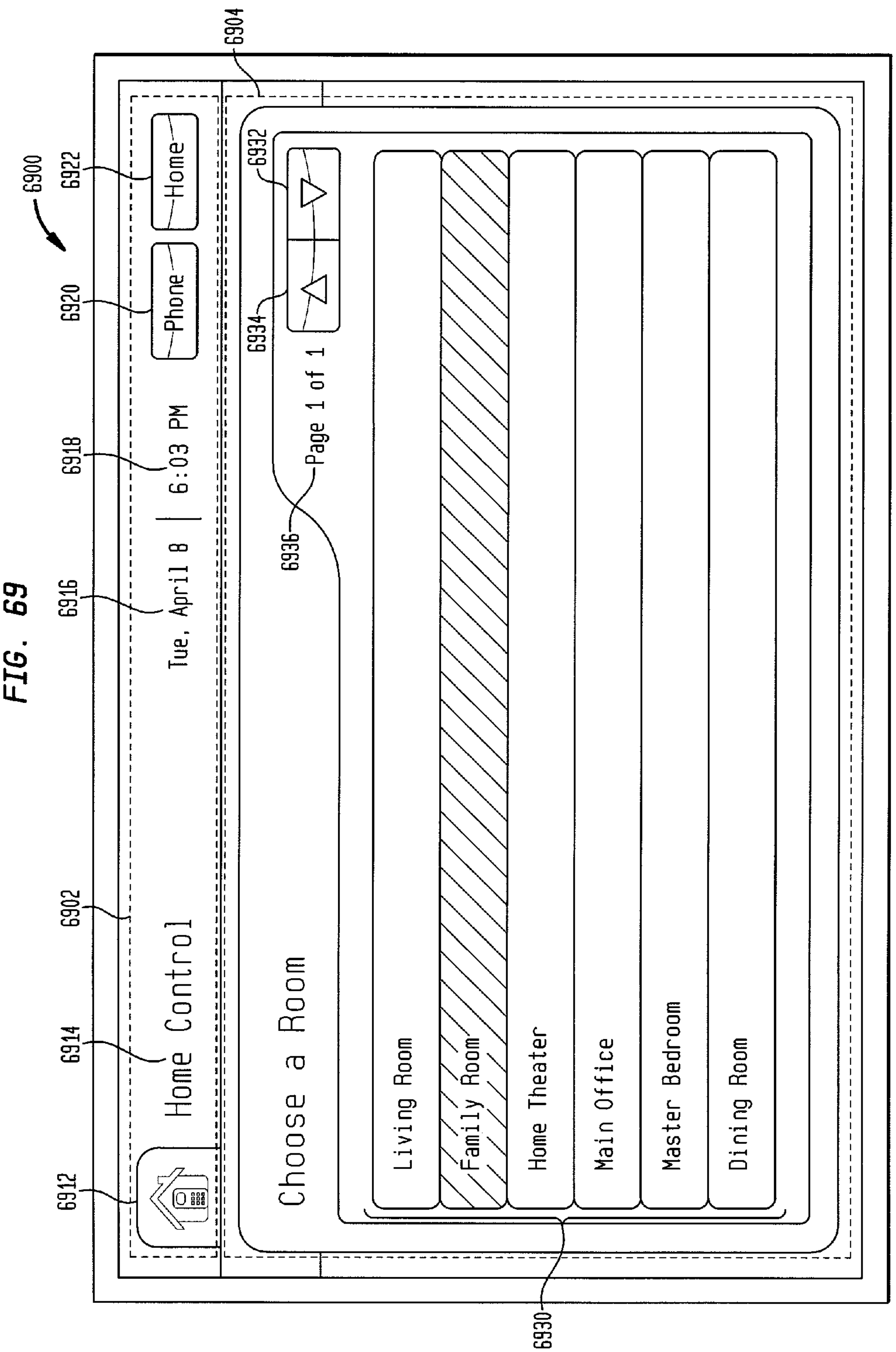
FIG. 69 depicts an exemplary GUI screen for a home control application.

FIG. 69 depicts an example GUI screen 6900 for a home control application in accordance with an embodiment of the present invention. As shown in FIG. 69, example GUI screen 6900 includes a status bar 6902 and a home control application interface 6904.

Status bar 6902 includes an icon 6912 representative of the home control application, a name 6914 ("Home Control") associated with the home control application, an indication of the current date 6916 and time 6918, a "phone" button 6920 and a "home" button 6922. When a user activates "phone" button 6920, GUI screen 3200 for a telephony application will be displayed. When a user activates "home" button 6922, the user will be returned to home GUI screen 3100.

Home control application interface 6904 displays all or a portion of a list 6930 of rooms for which home control functionality may be provided. To page up through list 6930 a "page up" button 6932 may be activated and to page down a "page down" button 6934 may be activated. A page indicator 6936 indicates which of one or more pages of list 6930 is currently being displayed. As shown in FIG. 69, such rooms may include, for example, a living room, a family room, a home theater, a main office, a master bedroom and a dining room. A room may be selected by activating the horizontal bar upon which the room name is displayed.

Figure 70:
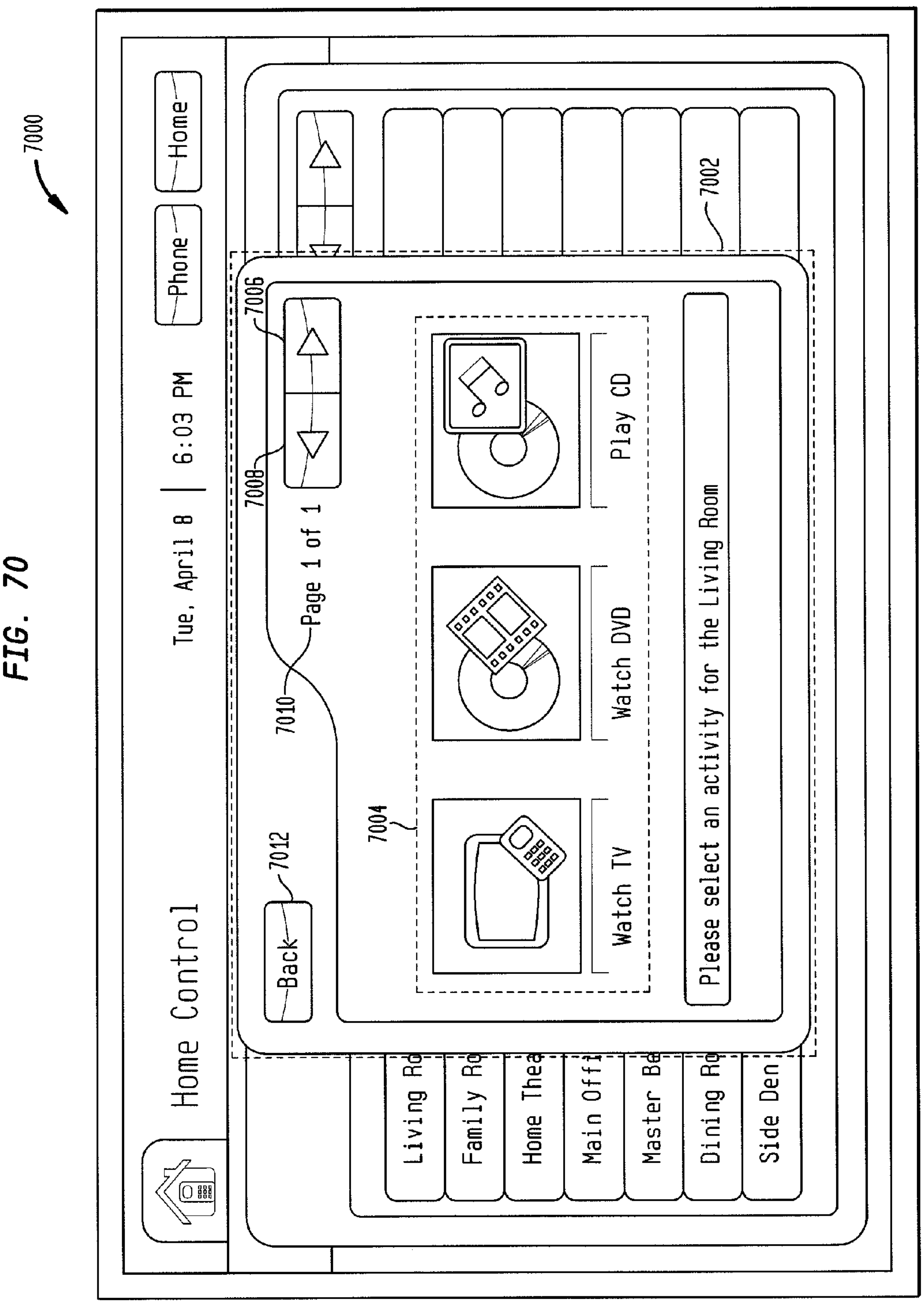
FIG. 70 depicts an exemplary overlay interface for performing home control functions associated with a selected room that may be displayed over the GUI screen of FIG. 69.

Once a room has been selected an overlay interface for performing home control functions associated with the selected room may be displayed. Example GUI screen 7000 of FIG. 70 shows such an overlay interface 7002. As shown in that figure, overlay interface 7002 displays all or a portion of a collection 7004 of home control functions for a living room. To page forward through collection 7004 a "page forward" button 7006 may be activated and to page backward a "page backward" button 7008 may be activated. A page indicator 7010 indicates which of one or more pages of collection 7004 is currently being displayed. Each home control function in collection 7004 is represented by an associated icon and text. The home control functions shown in FIG. 70 include "Watch TV," "Watch DVD" and "Play CD." A user may select a home control function by activating the icon associated with the function. A "back" button 7012 is provided to return to the original home control application interface.

Figure 71:
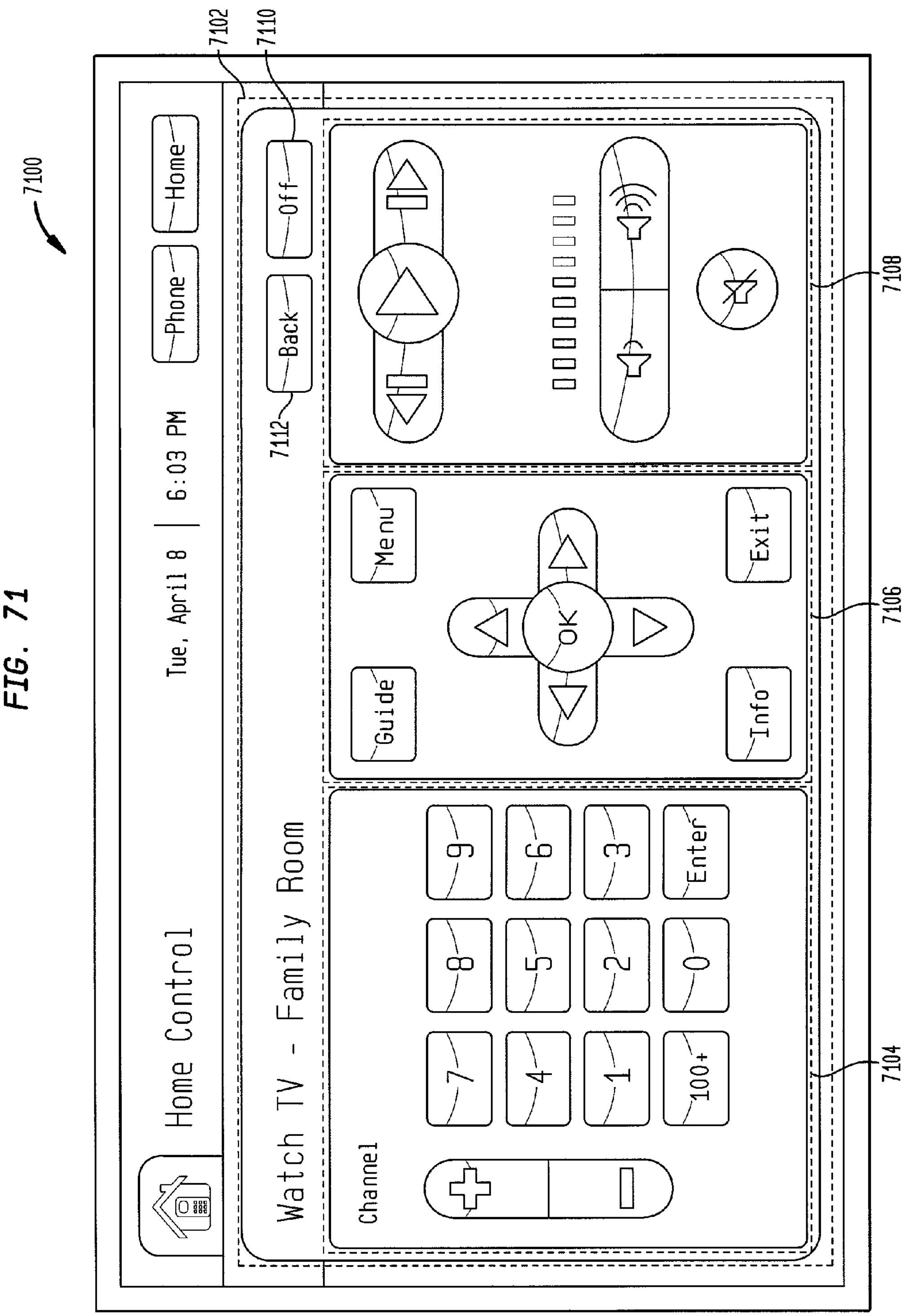
FIG. 71 depicts a further exemplary overlay interface for performing a selected home control function that may be displayed over the GUI screen of FIG. 69.

Once a home control function for a room has been selected a further overlay interface for performing the selected function may be displayed. Example GUI screen 7100 of FIG. 71 shows such an overlay interface which is configured to control a TV. As shown in that figure, overlay interface 7102 includes a channel selection interface 7104, a function navigation interface 7106 and an audio/video control interface 7108 for a TV. An on/off button 7110 is provided for powering the TV on and off and a "back" button 7112 is provided to return to the previous overlay interface.

II.G Example Services Platform

Figure 72:
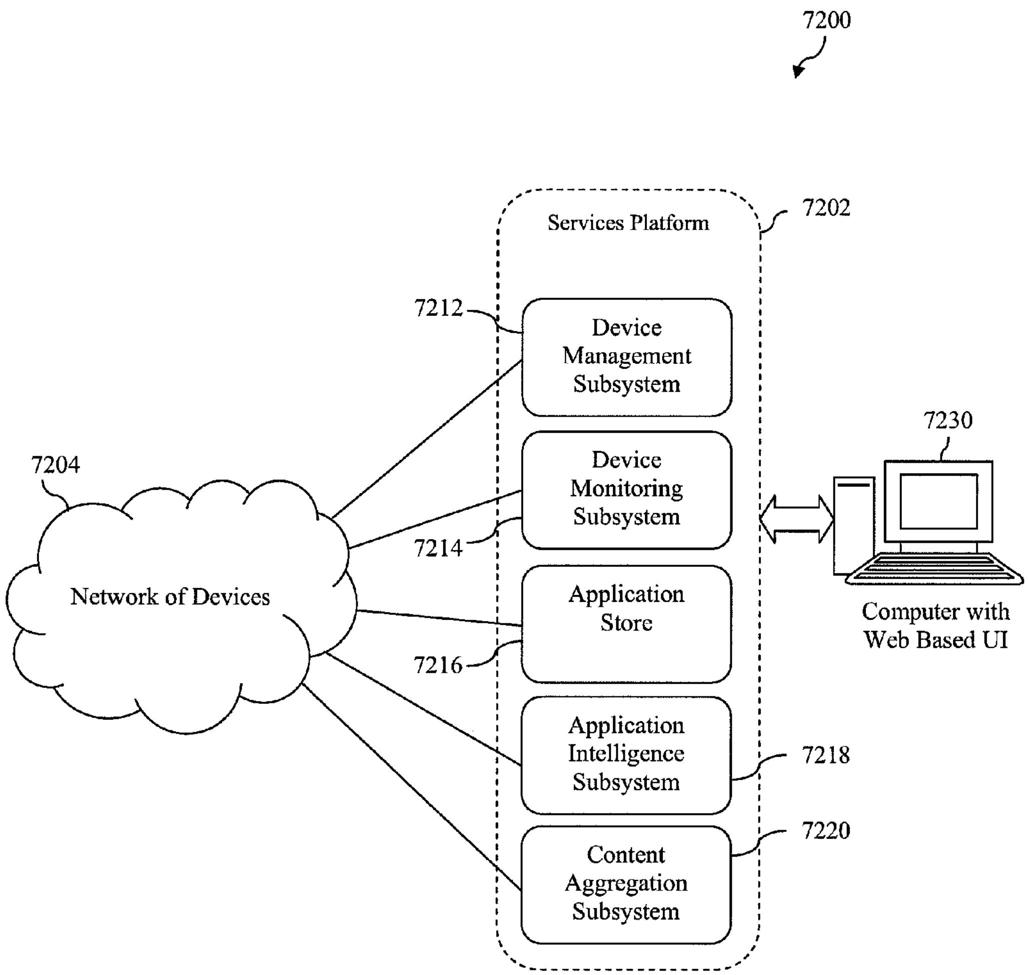
FIG. 72 is a block diagram of an exemplary system that includes a services platform for enabling entities to deploy, manage optimize and monitor a network of telephony and multimedia services devices.

FIG. 72 depicts a system 7200 in accordance with an embodiment of the present invention that includes a services platform 7202 for enabling entities to deploy, manage optimize and monitor a network of devices 7204 (such as a network of devices 110) in a turnkey fashion. As shown in FIG. 72, services platform 7202 includes a device management subsystem 7212, a device monitoring subsystem 7214, an application store 7216, an application intelligence subsystem 7218 and a content aggregation subsystem 7220.

System 7200 further includes a computer 7230 that provides a Web-based user interface for easy access to the functionality provided by services platform 7202. Such a Web-based user interface may include, for example, a control panel for user access assignment and administration. Although only a single computer 7230 is shown in FIG. 72, any number of such computers may be provided to access services platform 7202.

Depending upon the implementation, services platform 7202 may include less than all of subsystems 7212, 7214, 7216, 7218 and 7220. Furthermore, an integrated user interface may be provided for accessing all of the included subsystems or, alternatively, separate user interfaces may be provided for each subsystem. Each of the various subsystems will now be described.

II.G.1 Device Management Subsystem

Device management subsystem 7212 is responsible for reliably communicating updated firmware and device configuration to deployed devices. These types of operations may be focused on a single device, various sub-sets of devices, or applied to all devices on network 7204. For example, a firmware update may be applied to a small community of devices as a test prior to updating the entire network 7204 of devices. This is critical to prevent a network of end users from having a negative experience.

Device configuration information may include but is not limited to GUI configuration, brand information, applications, or the like.

The ability to provision the network of devices is a critical component, especially when telephony is involved. Depending upon the implementation, this may involve integration with an existing telephony infrastructure. An embodiment of the present invention provides a "faceless" Web service that enables customers to populate a device configuration database. Device management subsystem 7212 then communicates those parameters to devices in network 7204. An embodiment of the invention also provides a provisioning application to administrators so as to support provisioning of small trials as a sales tool.

II.G.1.a Updates

A firmware image for a particular deployment may comprise a boot loader, kernel, file system, a branded framework application, and optionally DECT firmware for both a device and associated handsets. In one embodiment, these images are provided from device management subsystem 7212 to end user devices via File Transfer Protocol (FTP). Device management subsystem 7212 may include an import mechanism that maps the firmware images to particular device product line. Once a firmware image has been imported, an administrator may then explicitly instruct that the image be deployed to a specific group of devices on network 7204. This could equate to single device or tens of thousands. As devices complete the upgrade process, they will register the firmware update with device monitoring subsystem 7214.

In an embodiment, device management subsystem 7212 provides a unique deployment process for each of four categories of firmware updates: (1) new device initial start-up; (2) new application; (3) software version updates; and (4) fixes.

The process for new device initial start-up occurs automatically and no scheduling is required. Between the time of manufacture to end user activation, software upgrades may have occurred. Upon initial start-up, a set-up wizard executing on a device 110 automatically "checks in" with device management sub-system 7212 to pull down the latest version of the code.

The deployment of new applications is scheduled by a telecommunications carrier or other entity that administers network 7204 and pushed. Such applications may be communicated to end users via proactive promotion, and deployment may include post-delivery notification.

Software version updates may be dependent upon expansion of a feature set or technology progression (e.g., a new version of a video codec). Such updates may not be urgent in nature any may not produce a visible difference to an end user. In an embodiment, such updates are communicated from device management subsystem 7212 to a device using a non-intrusive awareness notification, such as a simple update in a settings screen of the device.

Fixes may be required as determined via support teams. Fixes may be global or individual in nature. Depending upon the severity and impact to the user, it may be desirable for the implementation of such fixes to be as "invisible" to an end user as possible. Different types of fixes include scheduled global fixes, immediate global fixes and individual fixes Scheduled global fixes may be planned and pushed from device management subsystem 7212 to devices on network 7204. Such fixes may be non-interruptive in nature.

In the event a global fix must be immediately deployed (e.g., the severity of the problem is high), device management subsystem 7212 may cause a device to display an interruptive, non-dismissable dialog box with messaging that an important download is in progress and apologizing for any inconvenience.

Support representatives may be required to update an individual device to implement a fix. This may occur, for example, when a support representative is troubleshooting with an end user. To facilitate this, device management subsystem 7212 is configured to allow a release to be pushed to a device on demand. Also, devices may be configured to automatically check for the latest firmware upon re-boot. In this case, a support representative may request that an end user reboot his/her device. Devices may also provide an automatic update tool as part of a device settings application and may be directed to utilize the tool by a support representative to pull the latest update.

In an embodiment, device management subsystem 7212 is configured to minimize device interruption and required end-user activity while keeping end users appropriately notified. To this end, device management subsystem 7212 may be configured to perform one or more of the following functions: (1) confirm prior to download that a target device is currently inactive; (2) not disrupt any customer-initiated activity in progress; (3) wait for a target device to return to an idle state before deployment; (4) display to the user a notification message such as "update in progress, please wait"; (5) cause a device "version number" to be updated on a settings screen of a device when all updates have been deployed; (6) after delivery of a new application update, deliver a notification message to the user (such as "Congratulations, you have new features to enjoy from . . . ") that can be deleted or saved by the user.

Device management subsystem 7212 may also be configured to obtain necessary end user permissions prior to delivery of new applications or firmware updates. For example, a global permission may be obtained via a general notification during new device initial start-up. Alternatively or additionally, individual permissions may be obtained for each download. For example, device management subsystem 7212 may be configured to display a message on a device requesting permission to deliver a firmware update and provide an interface by which an end user can provide a yes or no decision. Device management system 7212 will take the appropriate action based on the end user decision.

Device management subsystem 7212 may deploy a firmware update automatically in certain instances. For example, this may occur at new device initial start-up as mentioned above. In an embodiment, logic that automatically checks for the most recent software version is embedded in a set-up wizard that is executed by a device during initial start-up. This ensures that each new end user has the latest approved software and application set in the event devices have been shelved for periods of time prior to purchase/deployment.

A firmware update may also be automatically triggered in the event that a periodic check function implemented by device monitoring subsystem 7214 (described below) determines that a device does not have the latest firmware code.

An automatic firmware update may also be triggered upon device re-boot in an embodiment in which devices are configured to automatically check for the latest firmware upon re-boot.

Ideally, service providers will deploy firmware updates when devices are least likely to be in use (e.g., 1 A.M.-4 A.M.). Accordingly, in one implementation, device management subsystem 7212 allows an approved firmware update to be deployed immediately (upon command execution) or at a future set time via pre-programming II.G.1.b Provisioning Preferably, every application is responsible for implementing its own provisioning solution. To simplify field trials of a telephony application and customer deployments, an embodiment of the invention implements this support as part of the solution. A provision database exposes a Web service that enables a customer's existing telephony infrastructure to populate a device's telephony parameters. A change in configuration triggers notification of the device. The device will in turn retrieve the latest configurations via Hypertext Transfer Protocol (HTTP). This does not suggest that a physical file needs to be created on the file system of the provisioning server. Again, the device contacts device monitoring subsystem 7214 to log the event.

II.G.1.c Administration

The Web-based user interface provided on computer 7230 provides administrative functions required for device management. In an embodiment, it allows assignment of view, approval and update authorization and implements a hierarchy for various levels of access. Example access levels may include: (1) view only (for tier 1 support representatives; the platform may be able to manage potentially hundreds or thousands of view access grants); (2) view and individual device deployment (for tier 2 support representatives, allowing them to proactively push the latest software version to an individual device at a time); (3) view and global device deployment (for managers that have access and authority to push a global or group targeted update); (4) view and release approval; (5) product managers (required to approve any new application global updates prior to such updates being made available for deployment); (6) technical managers (required to approve any software upgrades or fixes prior to such upgrades/fixes being made available for deployment); and (7) system administration (employees with access to assign and manage the above access).

II.G.1.d Web-based Interface

In an embodiment, the Web-based interface implemented on computer 7230 is uncluttered and simple by design. It easily accommodates a change of look and feel (e.g., logo and brand color palette) so that it may be tailored for individual service providers. The user interface may also be configured to take into consideration scalability by providing easy search functionality to locate an individual device, or subsets of devices, among many thousands. Such device searching may permit devices to be searched for based on MAC ID, customer name, billing telephone number, zip code, etc.

Main sections of the user interface may include administration, device monitoring (as will be described in more detail below) and device management. In an embodiment, the device management interface allows for selection, approvals, push and monitoring of all upgrades. It may further include firmware history that provides a reference guide to version control. The firmware history may indicate when an update occurred, what was updated, why it was updated, who approved the update, and when the most recent update occurred. The device management interface may further include the ability to manage (view, create, add, change, delete) assigned groups of devices. The user interface may further include an "about device upgrades" section that comprises a central source for device management policies, procedures and frequently asked questions (FAQs). This section may be customizable by a service provider for their internal use.

FIG. 26, described above in reference to the application framework of device 110 provides an example of a Web-based user interface screen for interacting with device management subsystem 7212/device monitoring subsystem 7214.

II.G.2 Device Monitoring Subsystem

Device monitoring subsystem 7214 is configured to perform functions such as identifying a device's firmware version, installed applications, and activity. These functions may be important in providing customer support. Device monitoring subsystem 7214 also provides a reporting interface that allows near real time data to be presented to accurately understand device state, health and performance. Such reports may be provided for an individual device or for large groups of devices to provide global, visual views for executive management reporting.

By allowing a network of devices (such as network 7204) to be surveyed, device monitoring subsystem 7214 allows administrators as well as customer support representatives to determine what firmware a device is executing, the health of that device, as well as the frequency and the manner in which the device is used. Such information may be used for individual device insight and action as well as to monitor and report on devices on an aggregated basis.

II.G.2.a Customer Support

In an embodiment, device monitoring subsystem 7214 is configured to report the following information about a device: connection state, if in active or fail-safe mode, current firmware version, information on when historical updates were applied and frequency of usage (daily, weekly, etc.). This information may be made available to customer support representatives so that they can take appropriate action in the event of a customer issue.

II.G.2.b Reporting

In an embodiment, device monitoring subsystem 7214 is configured to allow an administrator to query near real time statistics of deployed device and applications. For example, an administrator may determine what percentage of all registered devices is actively connected. The aggregate number may be used as a metric of overall performance and also as an important tool for customer retention teams. For example, such data can provide such teams with the ability to proactively contact those customers that have purchased and registered a device but for some reason are not currently connected. Additionally, device monitoring subsystem 7214 may be queried to identify any devices not currently using the most current firmware version and to initiate an investigation as to why such devices are not accepting pushed updates.

II.G.2.c Administration

In one implementation, the Web-based user interface to device monitoring subsystem 7214 provides administrative functions necessary for device monitoring. It may implement a set of access levels such as was previously described in reference to device management subsystem 7212. However, it may expand functionality to allow authorization to specified tiers to run subset or global reports.

II.G.2.d Web-based Interface

In an embodiment, the Web-based interface to device monitoring subsystem 7214 is configured to take into consideration scalability by providing easy search functionality to locate an individual device, or subsets of devices, among many thousands. Such device searching may permit devices to be searched for based on MAC ID, customer name, billing telephone number, zip code, etc. Additionally, the Web-based interface to device monitoring subsystem 7214 may provide the capability to generate predetermined queries and to display query results in various manners (text or visual).

FIG. 26, described above in reference to the application framework of device 110 provides an example of a Web-based user interface screen for interacting with device management subsystem 7212/device monitoring subsystem 7214.

II.G.3 Application Store

Application store 7216 comprises a portal that promotes application development in a managed subscription-based model. New applications are developed by authorized developers, verified by a regional organization, and subsequently released to the public via this platform. Revenue sharing is supported.

In one implementation, application store 7216 comprises a repository of Flash applications that device 110 and like devices can subscribe to, which may be offered for free, or at a nominal fee to an end user.

Figure 73:
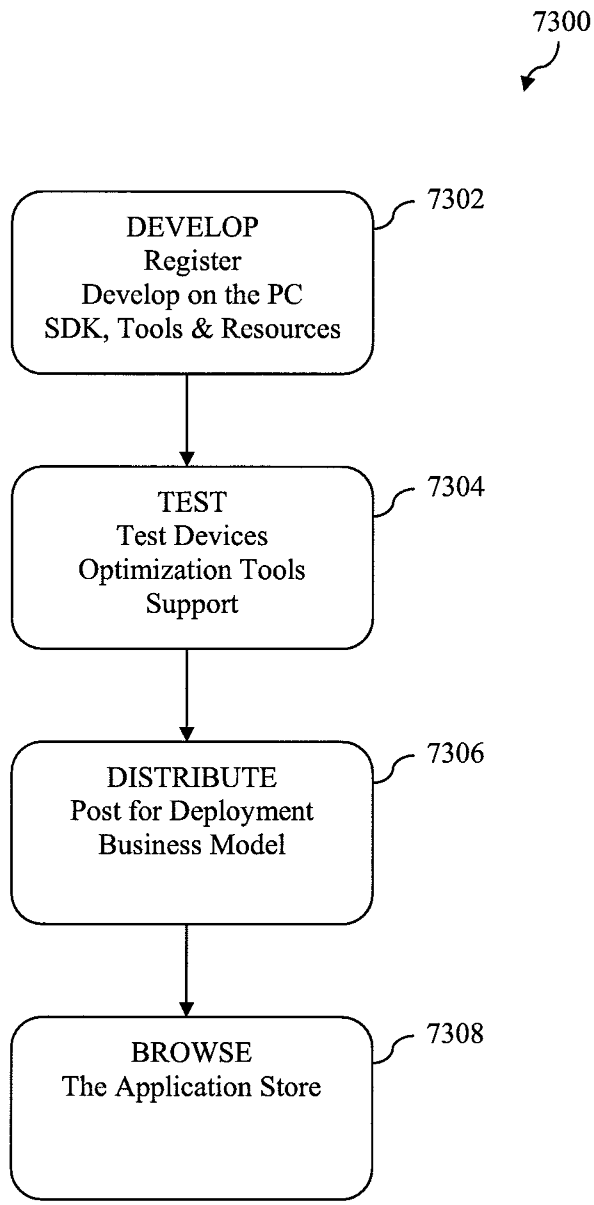
FIG. 73 depicts four main areas of an exemplary application store life cycle.

FIG. 73 depicts four main areas of the application store life cycle 7300. As shown in FIG. 73, the life cycle begins with the development 7302 of the applications. Applications may be developed by any number of entities including a developer of device 110, service providers that provide services via device 110, and independent developers. Such applications are tested 7304 and uploaded to a services database. Once applications have been validated, they can then be distributed 7306 to selected (or global) devices by an administrator. At this point, the selected devices in the field would now be capable of browsing 7308 and subscribing to the new application.

II.G.3.a Develop

As shown in FIG. 73, application store life cycle begins with development 7302.

II.G.3.a.i Developer Registration

In one embodiment, before a developer is eligible to submit applications, they must first register. This may involve creating a profile consisting of contact information, technical experience and account information for revenue sharing purposes. Once registered, a developer may become a Beta tester of his/her own applications. In addition, necessary terms and conditions may be required for developers to view and accept.

II.G.3.a.ii Application Development—SDK, Tools and Resources

In an embodiment, application development involves working within predefined guidelines. By conforming to such guidelines, a developer may ensure that the application will behave correctly on all devices 110.

To assist the development community, encourage their interest in creating new applications, and provide them with the aforementioned guidelines, a Web-based developers program may be made available under an appropriate license. The Web-based developers program may comprise a Software Development Kit (SDK) and additional tools and resources.

In an embodiment, the Web-based developers program includes but is not limited to: (1) an introduction and overview; (2) a getting started guide for development on a personal computer (PC) and installing the SDK; (3) a programming guide for a Flash player used by device 110; (4) a description of how applications work within the application framework of device 110; (5) a "Hello World" program; (6) additional sample code via simple program examples; (7) user interface and design information, including guidelines and Actionscript code for common design elements and components; (8) an emulator that allows the application to be developed and tested on a PC prior to migrating the application to device 110; (9) go-to-market insight, including information about target audiences, most popular categories and the like; (10) application lifecycle information, including information about managing updates and changes; and (11) frequently asked questions.

The resource pool for developers may also include an Internet-based developers' blog or community forum.

II.G.3.b Test

Developers may be provided with development devices and software that allow them to test and optimize their applications prior to submission. Some means of support for questions and assistance may further be provided.

A service provider may require that an approved ITL (Independent Test Lab) certify an application at the developer's expense before it will be accepted for publishing.

II.G.3.c Distribute

Once an application has been created and tested by a developer, it may be packaged for distribution, approved and published. Life cycle management may also be accommodated for.

II.G.3.c.i Packaging Applications for Distribution

Once various application components have been developed and tested to run on a device such as device 110, they may be packaged as defined for a target platform and uploaded accordingly. The upload process may be configured to identify the application as vendor specific or generic.

The developer may be required to package up several resources to satisfy deployment requirements. For example, the developer may be required to supply an application store icon and information movie. These two movies can then be utilized by application store 7216 when a user is browsing for applications to install. Once an application has been selected to be installed, the runtime requirements may require an icon movie and application movie. Optionally, a supporting native library and language file may also be provided. There may be instances when an application requires additional files. In addition, pricing requirements may need to be specified and included with the submitted package.

II.G.3.c.ii Upload to the Application Store

At this point in time, the developer can test the application through application store 7216 and seek any necessary approvals from a developer of device 110 or a service provider based upon agreed upon terms and conditions. For example, if a service provider positions device 110 as a family device, a term and condition may state that explicit content is not permitted.

Once approved, the application package may be uploaded and published as generally available, or to a certain device platform, and possibly vendor. Global or specified users would now have access to the application.

II.G.3.c.iii Lifecycle Management

Application store 7216 may enable independent developers, developers of device 110, or service providers (as appropriate) to post updated versions of an application, as well as the ability to delete.

Depending upon the implementation, update and delete capabilities may apply to applications available on application store 7216, applications already deployed to devices, or both. In certain situations, a published application may be revoked. Such revocation may result in a notification being sent to all subscribed devices and an automatic uninstall of the application. Alternatively, a developer may elect to allow existing users to keep the current application and simply decide to remove the offering from further availability.

Application store 7216 may also be configured to provide developers with a summary of customer reviews on a per-application basis to promote improvements in future releases.

II.G.3.d Browse—The Application Store

Application store 7216 is an application storefront that is executed on the display/touch panel of device 110. Its purpose is to present a list of authorized applications from which the user can optionally install, wherein the list of authorized applications may be a subset of all the applications stored in an application repository. Whether an application is authorized for a particular user may depend upon the identity of the user, upon which vendor is offering the application, and/or upon other alternative or additional factors. Depending upon the implementation, access to application store may be via devices 110 only or also via an Internet-based customer portal accessible to any browser-enabled system or device.

Certain applications may have associated costs to the end user. When these applications are purchased, a charge is processed to the appropriate subscriber account. To facilitate this, application store 7216 may be integrated with a billing system administered by a service provider.

Research has validated that consumers want to be able to choose from a range of applications and services, and then tailor them to their individual needs. Since device 110 may be accessible to various family members in a home, it may be configured to distinguish between individual users. A device so configured may present a list of applications to all users and then allow for presentation of a particular application within a single active user's profile.

Figure 85:
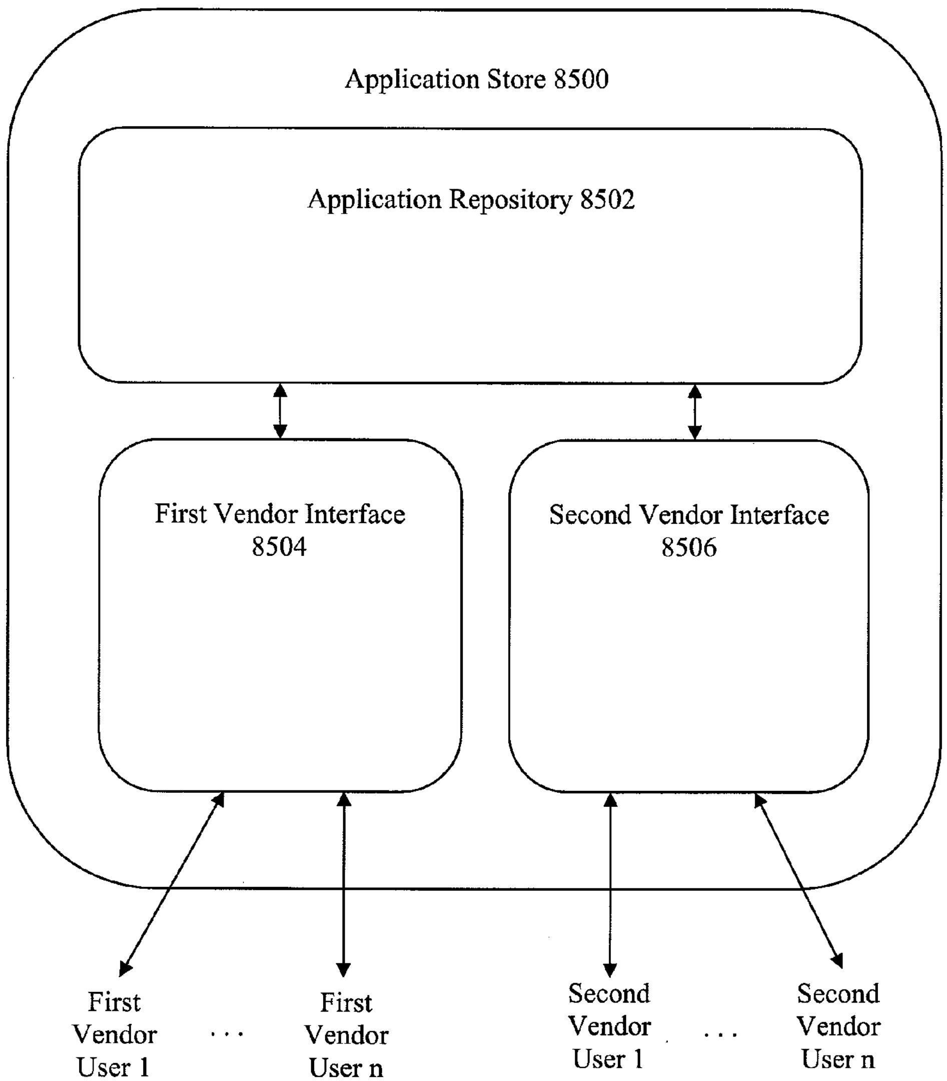
FIG. 85 is a block diagram of an exemplary application store.

FIG. 85 is a block diagram of an exemplary application store 8500 in accordance with one embodiment of the present invention. As shown in FIG. 85, application store 8500 includes a repository of applications 8502 that are suitable for downloading to and installation and execution upon one or more networked telephony and digital media devices such as those described elsewhere herein. Each application stored in repository 8502 may comprise an application package such as was described elsewhere herein that includes: (1) an application movie that is executable by an application player installed on each of the network devices; (2) an install script that, when executed by a networked device, installs the application movie on the device; (3) an uninstall script that, when executed by a networked device, uninstalls the application movie from the device, and (4) an icon movie that, when executed by an application player installed on a networked device, presents a graphical representation of the application movie to a GUI of the device and that is operable to invoke the application movie after installation thereof on the device.

As further shown in FIG. 85, application store 8500 further includes at least a first vendor interface 8504 and a second vendor interface 8506. First vendor interface 8504 is associated with a first vendor (e.g., a telecommunications company, multi system operator, Internet Service Provider, or the like) and is operable to provide access to a first subset of the applications stored in application repository 8502 for downloading to and installation and execution upon a first plurality of networked devices. The first plurality of networked devices are associated with one or more customers or subscribers of the first vendor, denoted first vendor users 1-n in FIG. 85.

Second vendor interface 8506 is associated with a second vendor that is different than the first vendor and is operable to provide access to a second subset of the applications stored in application repository 8502 for downloading to and installation and execution upon a second plurality of networked devices. The second plurality of networked devices are associated with one or more customers or subscribers of the second vendor, denoted second vendor users 1-n in FIG. 85.

Although only two vendor interfaces 8504 and 8506 are shown in FIG. 85, it is to be understood that any number of vendor interfaces may be used in accordance with an embodiment of the present invention.

First and second vendor interfaces 8504 and 8506 may each comprise an application storefront that is executed on a display/touch panel of device 110. The storefront may comprise, for example, a GUI such as that described above in reference to FIG. 74. Because application store 8500 includes a different interface for each vendor, each vendor may advantageously customize the "look and feel" of its associated interface. For example, each vendor may include vendor-specific branding or other user-viewable content within its associated interface. As another example, each vendor may include vendor-specific functionality or features within its associated interface.

The subset of applications made available via first vendor interface 8504 may be entirely different from that made available via second vendor interface 8506. Alternatively, the subsets of applications made available via each vendor interface may be overlapping or even identical. The system shown in FIG. 85 advantageously enables each vendor to selectively determine which applications will be made available to its customers and/or subscribers. Applications may also be customized to include functionality or user-viewable information uniquely associated with a particular vendor.

II.G.3.d.i Device User Interface

In view of the breadth of potential application additions and limited screen real estate of certain implementations of device 110 in comparison to a PC, a user interface to application store 7216 may be designed for convenience and simplicity while planning for expansion in navigation and caring for complexities. For example, categorization of applications may be used to assist a user in searching for applications. Example categories include genre, paid vs. free, most popular, highest rated, or newest.

Additionally, as device 110 may comprise a device that is accessible to an entire family, it may be configured to require a password before providing access to application store 7216. This feature may be used, for example, by parents to prevent unauthorized application purchases by their children.

Figure 74:
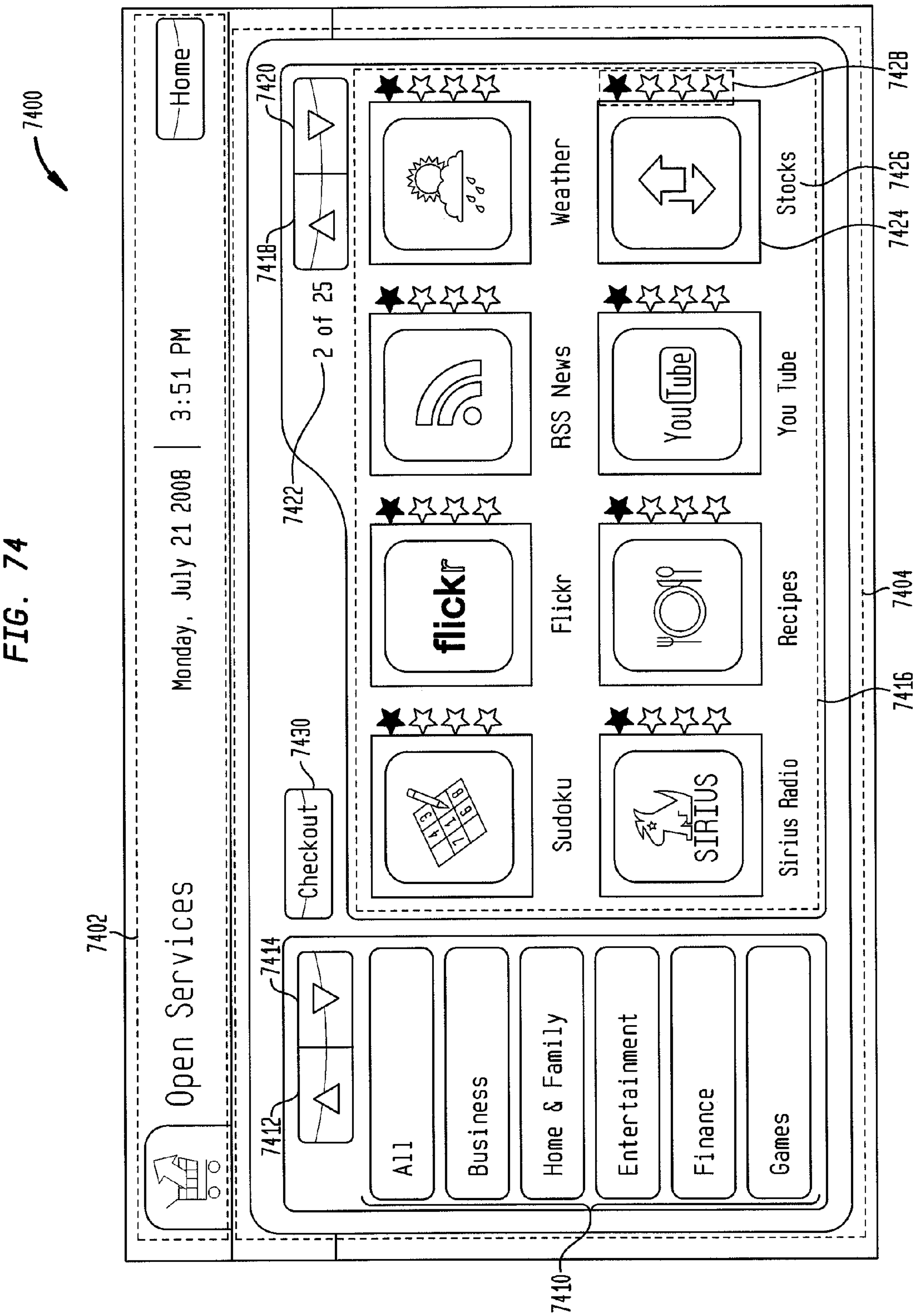
FIG. 74 depicts an exemplary GUI screen that may be used to provide an interface to application store.

FIG. 74 depicts one example GUI screen 7400 that may be used to provide an interface to application store 7216 in accordance with an embodiment of the present invention. As shown in FIG. 74, example GUI screen 7400 includes a status bar 7402 and an application store interface 7404.

Application store interface 7404 includes a first display area that displays all or a portion of a list of application categories 7410. To page up through list 7410 a "page up" button 7412 may be activated and to page down a "page down" button 7414 may be activated. To select an application category from among those in list 7410, the horizontal bar that displays the title of the application category may be activated.

Application store interface 7404 further includes a second display area that displays all or a portion of a collection of applications 7416 that fall within the category currently selected in list 7410. To page up through collection 7416 a "page up" button 7418 may be activated and to page down a "page down" button 7420 may be activated. A page indicator 7422 indicates which of one or more pages of collection 7416 is currently being displayed. For each application identified in collection 7416, an icon 7424, a name 7426 and a rating 7428 (which may be based on end user feedback and/or some other source) is provided. To select an application from among those in collection 7416, the icon associated with the application may be activated. A "checkout" button 7430 may be activated to launch a dialog by which a selected application may be purchased for download and installation to a device 110.

II.G.3.e Administration

As developers submit applications, a formal process may be used to validate the applications before releasing them to the general public. This process may include provisioning devices that will participate in a Beta program. Any Beta device may be able to install newly uploaded applications for early review. The goal is to protect the public from any rough applications that introduce a negative experience.

The network administrator may manage the various users on the platform including subscribers, developers, managers, and customer support representatives.

The network administrator may be able to provision groups of devices. These groups can be assigned various rights that determine their role on the network. To be subjected to early application access, the Beta permission would be granted.

II.G.3.f Web-based Interface

A Web-based interface for the developers program and application store 7216 provides a face of the platform and may facilitate its successful implementation. In one embodiment, the Web-based interface includes four areas that correspond to the four stages of the application store life cycle—namely, develop, test, deploy and browse. Such a Web-base interface may be simple in design and easy to navigate.

II.G.4 Application Intelligence Subsystem

Application intelligence subsystem 7218 is configured to provide application usage analysis by tracking specific application metrics. Such functionality advantageously enables valuable trend spotting for end-user-driven, new application development.

II.G.4.a Usage Analysis

Application intelligence subsystem 7218 may be configured to deliver vital usage analysis by tracking specific application metrics. Such metrics may be of value to marketing teams, product management teams, customer retention teams and developers. In one embodiment, application intelligence subsystem 7218 enables a user to view a ranking of most frequently used/least used applications for all end users in the aggregate or for some subset of end users. Application intelligence subsystem 7218 may also provide statistics on day of week/time of day usage behavior.

In addition to the benefits offered to the service providers and developers, the data may be extended to end users. For example, end users may be notified which applications are the most popular applications.

Application intelligence subsystem 7218 may also be configured to permit end users to rate applications and to share such ratings information in the aggregate with other end users.

II.G.4.b Administration

A system administrator may have the ability to grant or deny entities the ability to generate and view application intelligence reports. Given customer proprietary information policies, the usage behavior of individual devices is securely protected.

II.G.4.c Web-based Interface

In an embodiment, a Web-based interface to application intelligence subsystem 7218 is visual in nature, and has the capability to produce executive level reports. Such reports may be transferable to standard Microsoft® PowerPoint® (developed and sold by Microsoft Corporation of Redmond, Wash.) presentations. FIGS. 24 and 25, described elsewhere herein, depict example Web-based interface screens that may be used to report application intelligence information in accordance with various implementations.

II.G.5 Content Aggregation Subsystem

Content aggregation subsystem 7220 is configured to remove the burden on service providers of individually having to manage delivery of content to devices within network 7204 from multiple content providers. Content aggregation subsystem 7220 provides a pre-packaged content solution with personalization, recurring revenue, ad insertion and aggregated billing opportunities. By managing content processing/transcoding, caching and user preferences, content aggregation subsystem 7220 can optimize the performance of a device within network 7204 by alleviating the content processing needs of the device.

Figure 75:
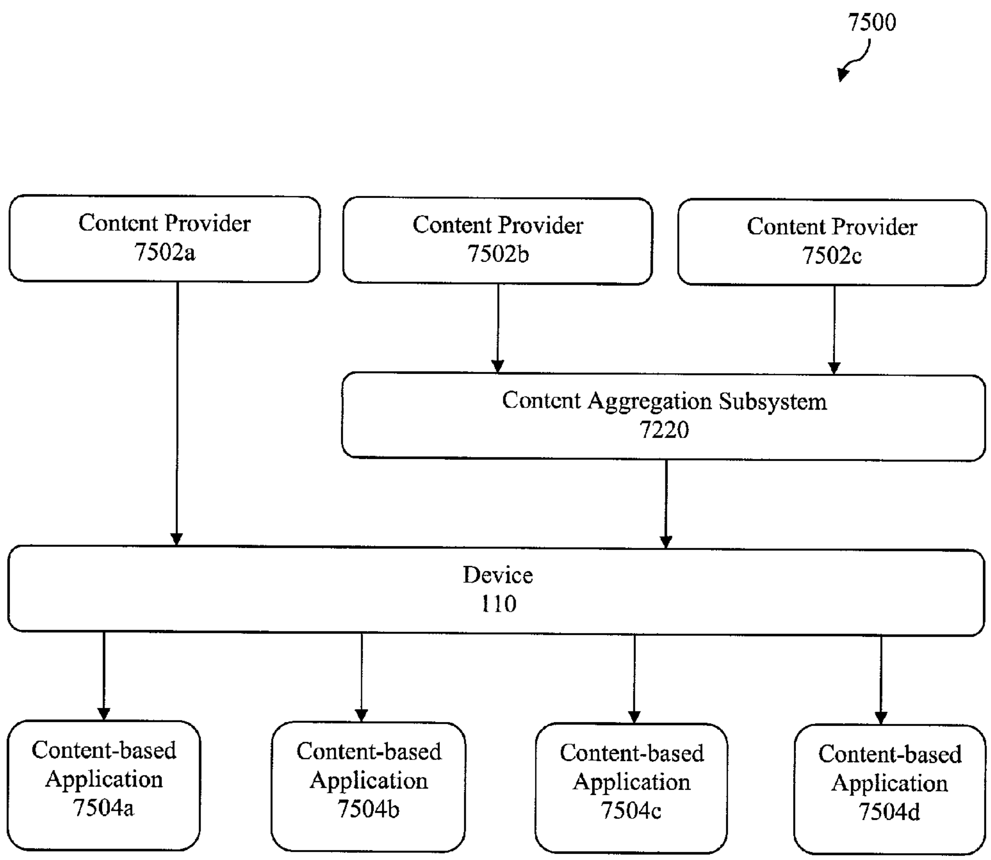
FIG. 75 is a block diagram that shows an example of how a content aggregation subsystem may be used to aggregate content from multiple content providers.

FIG. 75 is a block diagram 7500 that shows how content aggregation subsystem 7220 may be used to aggregate content from multiple content providers in accordance with an embodiment of the present invention. As shown in that figure, a plurality of content providers—namely, content providers 7502*a*, 7502*b* and 7502*c*, are configured to provide content for delivery to device 110. Such content may include for example video content, audio content, graphic content, text content, or any other form of content that can be delivered over a network. Device 110 uses such content to a plurality of content-based applications—namely content-based applications 7504*a*, 7504*b*, 7504*c* and 7504*d*.

Content provided to device 110 by content provider 7502*a* is processed entirely by device 110. Such processing may include content processing via ActionScript functionality of a Flash player executing on device 110, via a dedicated C/C++ class module which is a part of a software architecture of device 110, or via various codecs for audio, video and images that also form a part of the software architecture of device 110.

In contrast, content provided to device 110 by content providers 7502*b* and 7502*c* is first received and processed by content aggregation subsystem 7220. Such processing may include, for example, audio or video transcoding. Content aggregation subsystem 7220 may also cache content so that it need not be retrieved by subsystem 7220 each time it is requested by a device. Any of a variety of caching protocols may be used. Content aggregation subsystem 7220 may also filter or modify content based on user preferences. Processed content is then provided from content aggregation subsystem 7220 to device 110 for use in supporting content-based applications 7504*a*-7504*d*. Since a certain amount of content processing has already been performed by content aggregation subsystem 7220, the amount of processing that must be performed by device 110 is reduced. This helps improve performance by device 110.

Content aggregation subsystem 7220 may perform additional functions such as the insertion of ads into content prior to delivery to device 110. Content aggregation subsystem 7220 can advantageously provide a source of recurring revenue to an administrator of the subsystem. The subsystem can also aggregate services provided by multiple content providers to a single bill.

II.H Directory Services and Click-to-Call

As discussed above with respect to FIG. 63, device 110 may include a directory services application that allows a user to search for businesses within various service categories. Businesses may be selected based on geographic proximity to a particular location. Once a business has been found, the user can activate a telephone button icon associated with the business to place a telephone call directly from the directory services application interface (also referred to herein as "click-to-call"). In an embodiment, the directory services application also supports text messaging to a business in accordance with a Short Message Service (SMS) protocol.

Figure 76:
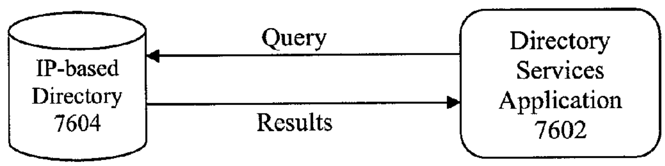
FIG. 76 is a block diagram of an exemplary system that obtains directory services information from a single IP-based directory for presentation on a telephony and digital media services device.

As shown in FIG. 76, a directory services application 7602 executing on device 110 may obtain directory services information in real-time from a single IP-based directory 7604. In particular, directory services application 7602 sends a query via the Internet to IP-based directory 7604. The query may specify, for example, a name of a business, a category of businesses, or one or more search keywords. The query may also include geographic information, such as city, state or zip code in order to obtain location-specific results. Based on the query, the IP-based directory will return one or more results in the form of business names, addresses and telephone numbers. IP-based directory 7604 may comprise a directory provided by any of a wide variety of IP-based directory service providers.

Figure 77:
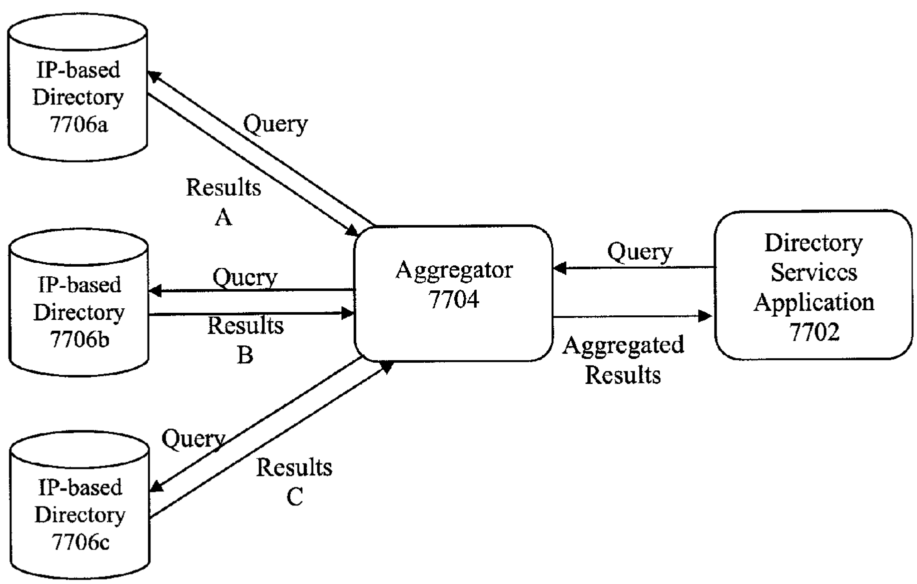
FIG. 77 is a block diagram of an exemplary system in accordance that obtains directory services information from multiple IP-based directories for presentation on a telephony and digital media services device.

As shown in FIG. 77, a directory services application 7702 executing on device 110 may also obtain directory services information in real-time from multiple IP-based directories, such as directories 7706*a*, 7706*b* and 7706*c*. In this case, directory services application 7702 sends a query to an aggregator 7704 that is configured to distribute the query to each of the multiple directories. The query may be formulated in the manner described above in regard to FIG. 76. Aggregator 7704 then receives query results A, query results B and query results C from IP-based directories 7706*a*, 7706*b* and 7706*c*, respectively, and aggregates the results for delivery to directory services application 7702. Aggregating directory information in this fashion may be beneficial in that it may provide an end user with access to more comprehensive directory information. Certain IP-based directories may also provide certain types of information that other IP-based directories don't. Furthermore, if a first IP-based directory is currently being built, a second IP-based directory may also be used as a fallback directory in case the first IP-based directory is not capable of delivering adequate results.

In either of the scenarios depicted in FIGS. 76 and 77, query results may be ordered for presentation to an end user. Depending upon the implementation, results may be ordered by the IP-based directory, the aggregator, and/or the directory services application executing on device 110. Such results may be ordered, for example, alphabetically or by geographic proximity to a specified location.

Figure 78:
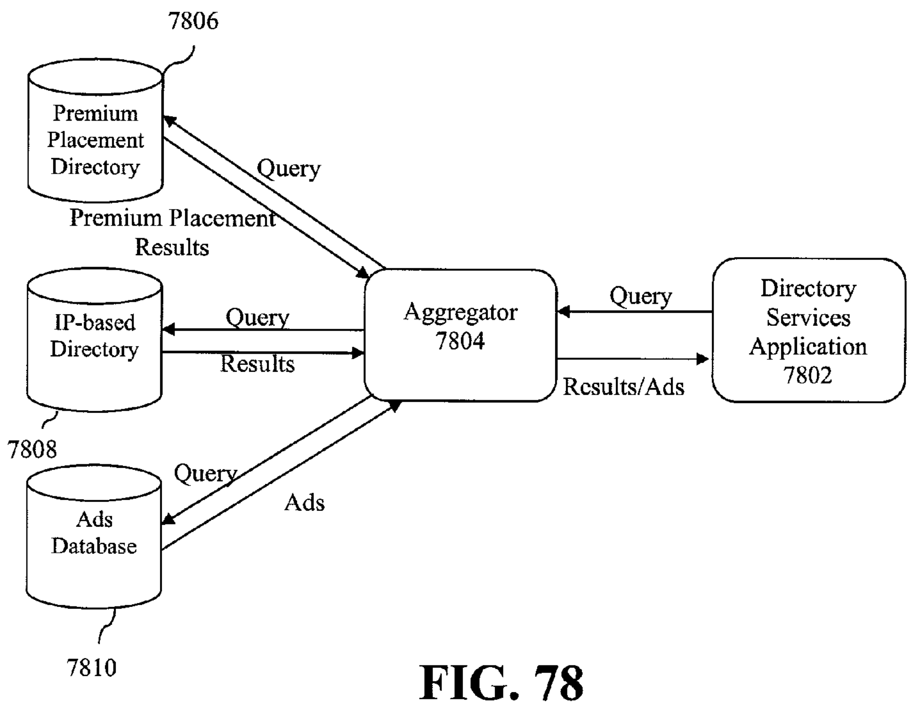
FIG. 78 is a block diagram of an exemplary system in accordance that obtains premium placement directory services information, standard directory services information and advertisements for presentation on a telephony and digital media services device.

In one embodiment, results are ordered in accordance with a "premium placement" scheme in which businesses can pay to have their information appear at the top of the query results or highlighted in some other fashion intended to garner the attention of an end user. Such highlighting techniques may include, for example, providing a larger listing or using bold text, background highlighting, animations or the like. As shown in FIG. 78, an aggregator 7804 may be configured to obtain such "premium placement" results from a premium placement directory 7806 based on a query received from a directory services application 7802, while also obtaining standard directory results from at least one IP-based directory 7808. The query information may also be used to obtain ads from an ads database 7810 for display within the directory services application interface on device 110. This provides yet another revenue opportunity for a proprietor of aggregator 7804. Premium placement directory information, standard directory information and ads may all be returned from aggregator 7804 to directory services application 7802.

Payment for "premium placement" may be based on the display of the premium placement directory information by directory services application 7802 and/or upon the use of directory services application 7802 to place a telephone call to a premium placement business. For example, a payment may be due each time premium placement directory information is displayed or each time a phone call is placed that is attributable to a premium placement entry. The latter payment method is easily implemented because directory services application 7802 is capable of attributing the placement of a call to a particular business entry and can be configured to instantaneously report such information.

A directory services application in accordance with an embodiment of the present invention may also permit a user to click on or otherwise activate a directory entry to access additional information or functionality associated with a particular business. Additional information may be in the form of graphic, audio (e.g., voice) and/or video content that is displayed or played back by device 110. Additional functionality may be in the form of an application interface that allows an end user to place an order or otherwise acquire products or services from the business (e.g., an interface that allows a user to place an order for pizza from a restaurant). A business may pay a fee in order to have such information or functionality associated with its entry and/or may pay a separate fee each time such information or functionality is accessed or used.

Information aggregated from multiple devices 110 can be used to generate valuable reports regarding what types of products and services end users are looking for and which businesses have actually been contacted using the click-to-dial feature. A directory services application or other application operating on device 110 may also solicit ratings or rankings information from end users about businesses that they have called via device 110. Such information may advantageously be used to answer community-based queries such as "What electrician do most people in my neighborhood call?" or "What is the favorite pizza place in my area?"

One implementation of the present invention that uses click-to-dial reporting to provide community-based popularity information will now be described in reference to FIG. 79. As shown in that figure, a directory services application 7902 executing on device 110 provides click-to-dial reporting information to a dialed calls database 7908 each time an end user uses the click-to-dial feature of application 7902. Database 7908 acquires such information from multiple devices 110 to generate accumulated information regarding which businesses have been dialed using the click-to-dial feature and how many times such businesses have been dialed. Dialed calls database 7908 may maintain such information for each of a plurality of geographic locations.

When an end user solicits directory information from directory services application 7902, directory services application 7902 sends a query to an aggregator 7904. Aggregator 7904 distributes the query to multiple directories 7906, which may include both a premium placement directory 7910 and a standard IP-based directory 7912 as discussed above, and obtains corresponding results in the form of business names, addresses and telephone numbers. Such results may be limited to a particular geographic area. Aggregator 7904 then queries dialed calls database 7908 with the returned telephone numbers to determine the popularity of each business based on click-to-call volume. Aggregator 7904 then returns the results along with the popularity information returned from dialed calls database 7908 to directory services application 7902. Directory services application 7902 then presents the results to the end user. For example, directory services application 79Y02 may present all results sorted from most popular to least popular. As another example, directory services application 7902 may present premium placement results followed by ordinary results, wherein the premium placement results and the ordinary results are each sorted by popularity. Still other sorting approaches may be used.

Figure 79:
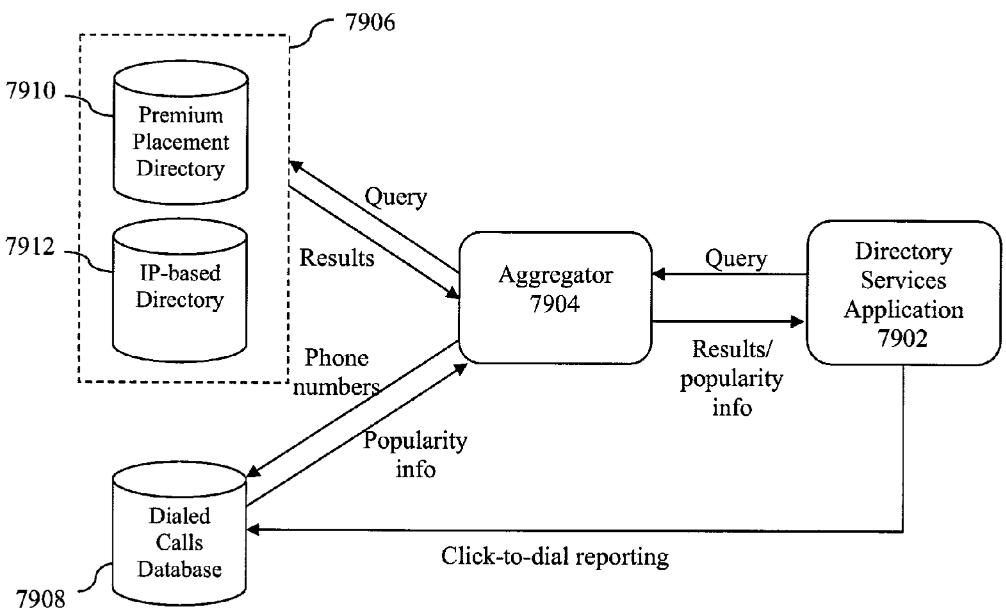
FIG. 79 is a block diagram of an exemplary system that uses click-to-dial reporting to provide community-based popularity information for presentation on a telephony and digital media services device.

In the foregoing example of FIG. 79, the popularity of a business is determined based on reported click-to-call volume alone. In additional embodiments, end user feedback such as end user rating or ranking information may additionally or alternatively be solicited via device 110 and used to determine the popularity of a business. Directory services application 7902 may also be configured to display end user comments about particular businesses.

Figure 80:
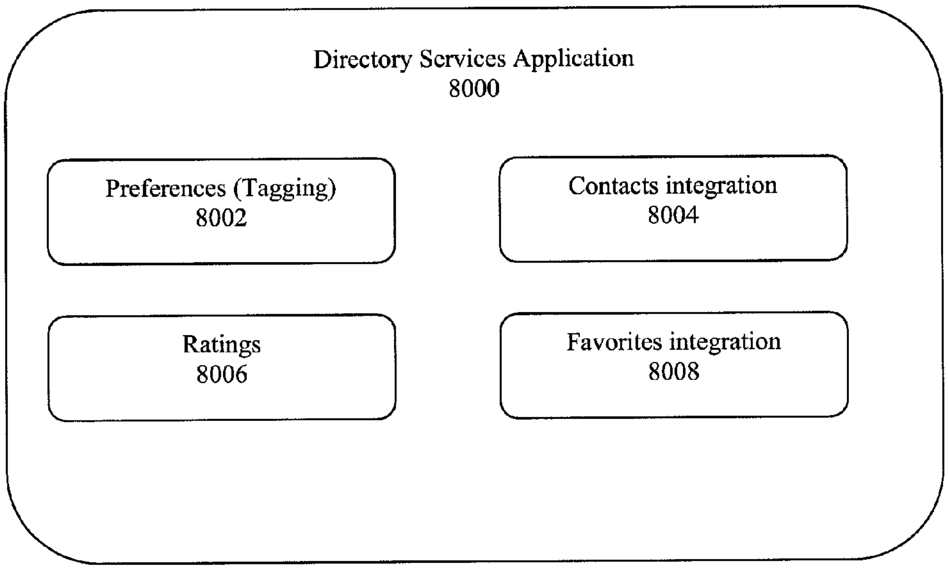
FIG. 80 depicts various components of an exemplary directory services application.

FIG. 80 depicts an embodiment 8000 of a directory services application in accordance with an embodiment of the present invention that includes preferences logic 8002, contacts integration logic 8004, ratings logic 8006 and favorites integration logic 8008. Each of these elements will now be described.

Preferences logic 8002 allows an end user to "tag" an entry for a business that is listed in the application interface of directory services application 8000. The method by which an entry is tagged may vary depending upon the implementation. Once an entry has been tagged it will subsequently be presented at the top of the list for the relevant business category. Thus, for example, if an end user tags a particular movie theater, that movie theater will appear at the top of the list the next time the movie theater category is selected. If multiple businesses within the same category have been tagged, a sorting algorithm may be used to determine the order in which the tagged businesses appear. For example, a most-recently-used sorting algorithm may be used. Preferences logic 8002 thus allows a user to easily access directory information for a preferred business without having to actually create, maintain or find contact information for the business.

Contacts integration logic 8004 is configured to allow an end user to add contact information associated with a business identified in the application interface of directory services application 8000 to an address book maintained by a contacts application resident on device 110.

Ratings logic 8006 is configured to permit a user to submit ratings information about a particular business identified in the application interface of directory service application 8000. Such ratings information can then be aggregated by a service provider and used by directory services application 8000 to display community-based ratings for businesses, or to sort business entries by ratings.

Favorites integration logic 8008 is configured to enable a user to add a business identified in the application interface of directory services application 8000 to a favorites list that may be maintained by directory services application 8000 or a separate application resident on device 110. Activating an entry in the favorites list will invoke a speed-dial feature that will cause the business to be called.

Figure 81:
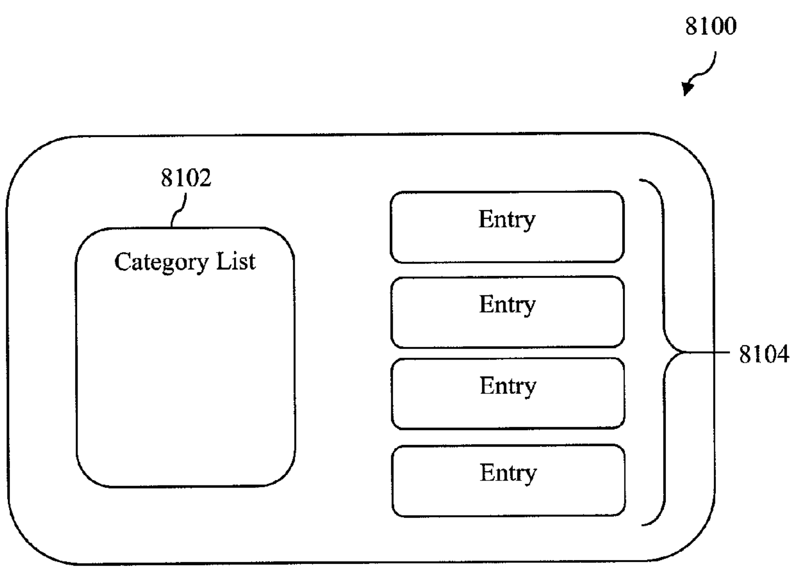
FIGS. 81-83 depict exemplary GUI screens of a directory services application.

One implementation of a click-to-call user interface flow in accordance with an embodiment of the present invention will now be described with reference to FIGS. 81, 82 and 83. As shown in FIG. 81, the flow begins with the presentation of a GUI screen 8100 associated with a directory services application to an end user. GUI screen 8100 includes a list of business categories 8102 and a plurality of entries 8104 corresponding to a selected category within category list 8102.

In an embodiment, category list 8102 represents a subcategory within a hierarchical list of business categories. Thus, for example, category list 8102 may represent the category of "pizza restaurants" which itself is a sub-category of the category "restaurants." In one implementation, the directory services application associated with GUI screen 8100 allows a user to navigate among a hierarchical list of business categories and sub-categories in order to find a desired list of businesses.

In one embodiment, category list 8102 represents a "quick access" list of categories that are deemed most useful to a user. The quick access list may be automatically compiled based on historical information relating to which categories are most often accessed by an end user. Alternatively or additionally, the quick access list may be manually compiled based on express designation of categories by the end user. The use of a quick access list helps ensure that end users are not presented with categories that they do not often use. Category list 8102 may also represent categories that have most recently been accessed by an end user.

Depending upon the implementation, category list 8102 may be sorted alphabetically, by frequency of use, or based on some other sorting algorithm. For manageability, category list 8102 may be limited to some maximum number of entries. End users may be given the option to delete a category from category list 8102.

In a further embodiment, category list 8102 may represent the results of a category search executed by an end user via another GUI screen of the directory services application.

Figure 82:
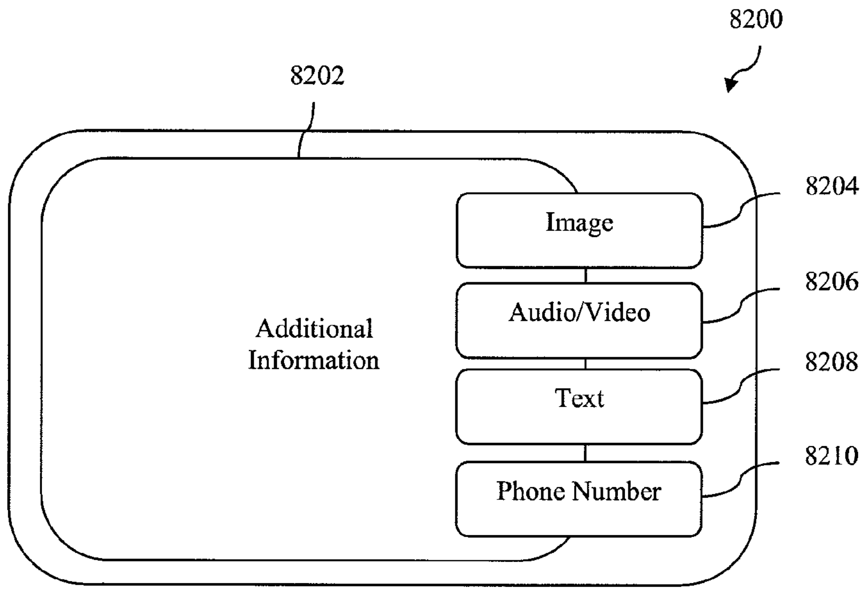

Once an end user has activated one of entries 8104 shown in GUI screen 8100, a GUI screen 8200 depicted in FIG. 82 will be displayed. GUI screen 8200 provides additional information 8202 about the selected business. Such information may include an image 8204, audio and/or video content 8206, and text 8208. Such information also includes a telephone number 8210.

The information presented in GUI screen 8200 may be provided from the business itself or from some third party information provider, such as a third party IP-based directory service. The information may be provided in a very simple format or may be provided in an elaborate format, using animation, streaming audio/video content, or the like.

Figure 83:
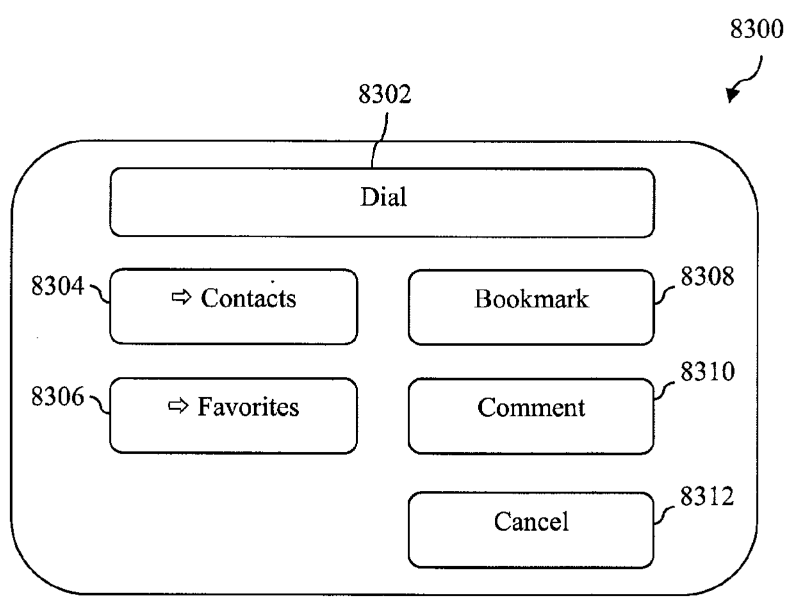

Upon activation of telephone number 8210 by an end user, a GUI screen 8300 depicted in FIG. 83 will be displayed. As shown in FIG. 83, GUI screen 8300 includes a dial button 8302, a contacts button 8304, a favorites button 8306, a bookmark button 8308, a comment button 8310 and a cancel button 8312.

When an end user presses dial button 8302, the click-to-dial functionality of the directory services application will be invoked and a telephone call will be placed from device 110 to the selected business. As noted above, the placement of the call via this interface may be reported to an external entity for tracking business popularity or other statistics.

When an end user activates contacts button 8304, information about the selected business will be imported into an address book maintained by a contacts application resident on device 110. Depending upon the implementation, this process may involve launching an interactive dialog in which the end user must engage.

When an end user activates favorites button 8306, the selected business will be tagged such that it will subsequently be presented at the top of the list for the relevant business category. Thus, for example, if an end user activates favorites button 8306 for a particular movie theater, that movie theater will appear at the top of the list the next time the movie theater category is selected. If multiple businesses within the same category have been selected as favorites, a sorting algorithm may be used to determine the order in which the businesses appear.

When an end user activates bookmark button 8308, the selected business will be saved to a "bookmarked" business category for easy access during subsequent use of the directory services application.

When an end user activates comment button 8310, the user is presented with an interface by which the end user can submit feedback about the selected business. Depending upon the implementation, such feedback may be submitted in the form of a rating (e.g., a certain number of stars out of 5 stars, a "thumbs up" or "thumbs down", etc.) and/or as text comments. Such feedback can then be aggregated by a service provider and then used by the directory services application to display community-based ratings or comments for businesses or to sort business entries by ratings.

When an end user activates cancel button 8312, the end user terminates the transaction and may be returned, for example, to GUI screen 8100.

It should be noted that depending upon the implementation, either or both of GUI screens 8200 and 8300 need not be used. For example, activating an entry within GUI screen 8100 may automatically place a phone call to the selected business. Also, activating phone number 8210 within GUI screen 8200 may automatically place a phone call to the selected business.

Click-to-call records generated by a directory services application in accordance with an embodiment of the present invention may be used to generate a variety of valuable business reports. Such reports may provide a volume of calls per time period, busy hours, a number of entries viewed without calls/skips, a number of hang-ups or unanswered calls or a number of favorite registrations for a particular business.

III. Example Computer System

Figure 84:
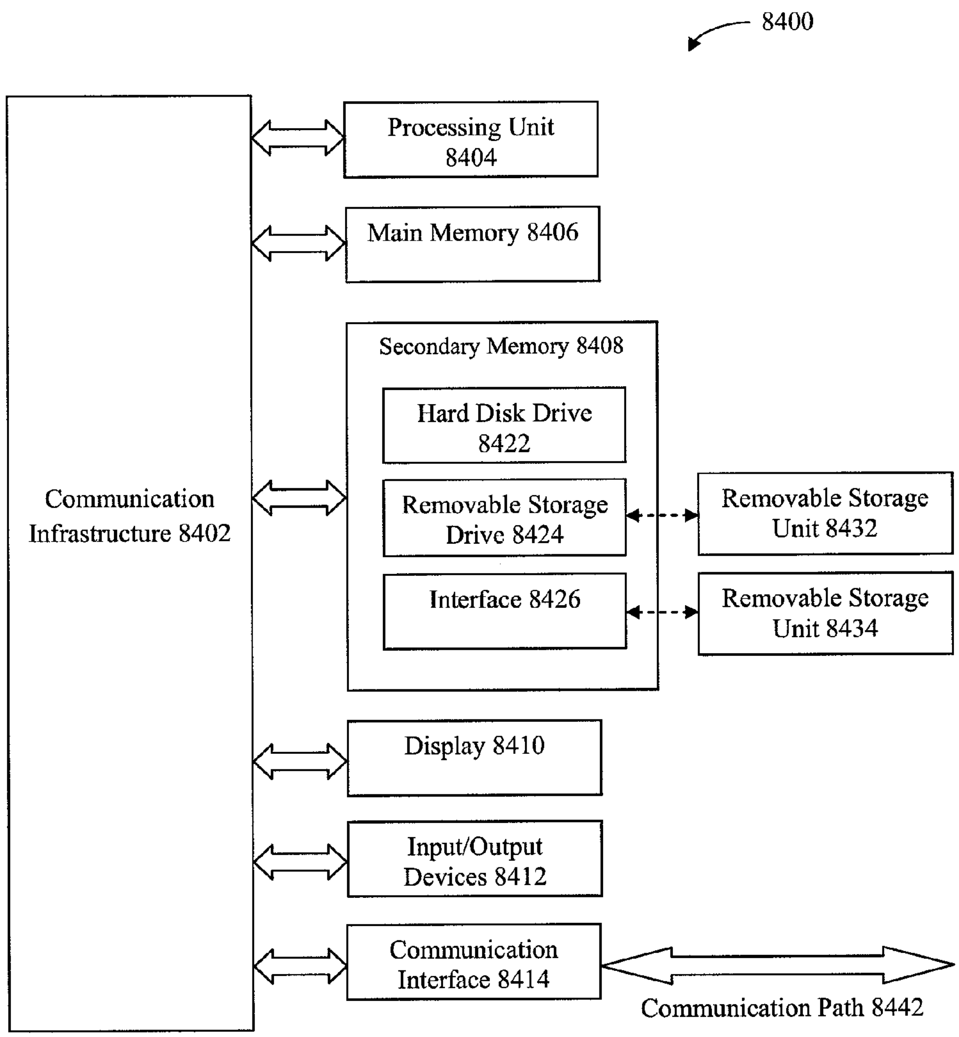
FIG. 84 depicts an exemplary computer system that may be used to implement various features.

Embodiments of the present invention described herein, including systems, methods/processes, and/or apparatuses, may be implemented using one or more processor-based computer systems, such as computer system 8400 shown in FIG. 84. As shown in FIG. 84, computer system 8400 includes a processing unit 8404 that includes one or more processors or processor cores. Processor unit 8404 is connected to a communication infrastructure 8402, which may comprise, for example, a bus or a network.

Computer system 8400 also includes a main memory 8406, preferably random access memory (RAM), and may also include a secondary memory 8408. Secondary memory 8408 may include, for example, a hard disk drive 8422 and/or a removable storage drive 8424. Removable storage drive 8424 may comprise a floppy disk drive, a magnetic tape drive, an optical disk drive, a tape backup, or the like. Removable storage drive 8424 reads from and/or writes to a removable storage unit 8432 in a well-known manner. Removable storage unit 8432 may comprise a floppy disk, magnetic tape, optical disk, or the like, which is read by and written to by removable storage drive 8424. As will be appreciated by persons skilled in the relevant art(s), removable storage unit 8432 includes a computer-readable storage medium having stored therein computer software and/or data.

In alternative implementations, secondary memory 8408 may include other similar means for allowing computer programs or other instructions to be loaded into computer system 8400. Such means may include, for example, a removable storage unit 8434 and an interface 8426. Examples of such means may include a memory stick and an industry standard interface (such as a universal serial bus (USB) interface) suitable for interfacing with the memory stick, a memory card and associated card reader, a removable memory chip (such as an EPROM or PROM) and associated socket, a program cartridge and cartridge interface (such as that found in video game devices), and other removable storage units 8434 and interfaces 8426 that allow software and data to be transferred from removable storage unit 8434 to computer system 8400.

Computer system 8400 may further include a display 8410 for presenting user-viewable content rendered by processing unit 8404 and/or optional display interface hardware (not shown in FIG. 84) as well as one or more input/output (I/O) devices 8412 for receiving input from or producing output to a user. Exemplary input devices include a keyboard, mouse, keypad, touch screen, or the like. Exemplary output devices include audio devices such as speakers. Display 8410 may also be considered an output device.

Computer system 8400 may also include a communication interface 8414. Communication interface 8414 allows software and data to be transferred between computer system 8400 and external devices. Examples of communication interface 8414 may include a modem, a network interface (such as an Ethernet card), a communications port, a PCMCIA slot and card, or the like. Software and data transferred via communication interface 8414 are in the form of signals which may be electronic, electromagnetic, optical, or other signals capable of being received by communication interface 8414. These signals are provided to communication interface 8414 via a communication path 8442. Communications path 8442 carries signals and may be implemented using wired communication media such as a phone line, coaxial cable or fiber optic cable, as well as wireless communication media such as radio frequency (RF) or infrared communication channels.

As used herein, the terms "computer program medium" and "computer readable medium" are used to generally refer to media such as removable storage unit 8432, removable storage unit 8434 and a hard disk installed in hard disk drive 8422. Computer program medium and computer readable medium can also refer to memories, such as main memory 8406 and secondary memory 8408, which can be semiconductor devices (e.g., DRAMs, etc.). These computer program products are means for providing software to computer system 8400.

Computer programs (also called computer control logic, programming logic, or logic) are stored in main memory 8406 and/or secondary memory 8408. Computer programs may also be received via communication interface 8414. Such computer programs, when executed, enable computer system 8400 to implement features of the present invention as discussed herein. Accordingly, such computer programs represent controllers of the computer system 8400. Where the invention is implemented using software, the software may be stored in a computer program product and loaded into computer system 8400 using removable storage drive 8424, interface 8426, or communication interface 8414.

The invention is also directed to computer program products comprising software stored on any computer readable medium. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

IV. Managed Services Platform

As noted previously, several companies offer services where a user can search for and download applications to his mobile device. Currently, however, there is no oversight of such a process, and an enterprise may be averse to permitting employees to freely download applications from such services onto company mobile devices. The description contained herein presents several arrangements that address this concern and that present a secure environment for the retrieval and installation of applications on protected enterprise mobile devices or portable units whose access is or should be restricted in some manner.

To achieve this objective, a managed services platform is presented in which the platform includes a DMS server and an AS server. The DMS server can act as a gateway for communications with one or more computing devices, and the computing devices can be associated with a first entity. The AS server can be communicatively coupled with the DMS server. When a first computing device contacts the DMS server, the DMS server can be operable to provide a bundle to the first computing device. As an example, the bundle contains content that at least includes one or more configuration messages and an application set that contains one or more predefined applications. In another arrangement, the content of the bundle can be determined at least in part by the first entity.

The arrangement described above can permit safe and secure delivery of content to a portable computing device, as the downloaded material can be from a known and authorized source. In addition, steps can be taken to ensure that the content that is delivered is authorized to be delivered to a particular mobile device. Embodiments that have been described above and those that will be presented below can be used to provide such a system.

Figure 86:
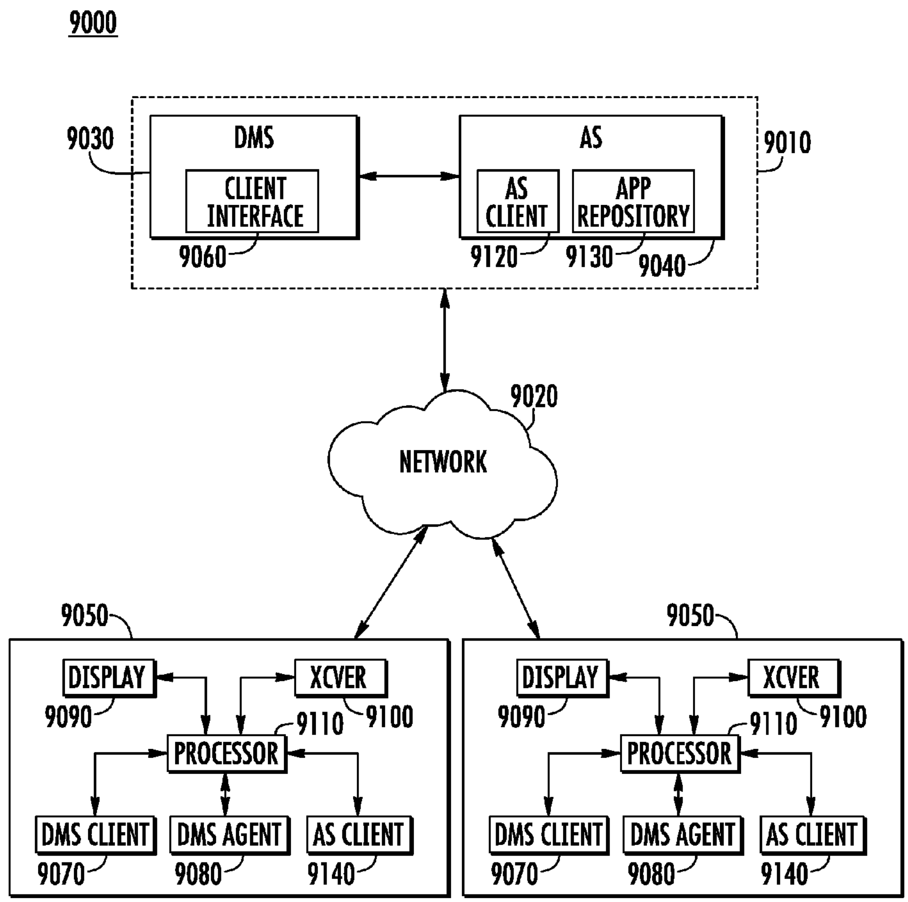
FIG. 86 illustrates an example of a system that includes a managed services platform.

Referring to FIG. 86, an example of a system 9000 that includes a managed services platform 9010 is shown. The managed services platform 9010 can communicate with a network 9020, which can be comprised of any suitable number and type of interconnected communications infrastructure operating in accordance with any suitable type and number of protocols and standards. As an example, the network 9020 can be accessed through a conventional Internet connection, whether wired or wireless. In one arrangement, the platform 9010 can include a device management service (DMS) server 9030 and an application service (AS) server 9040, and the DMS server 9030 and the AS server 9040 can be communicatively coupled to one another such that bi-directional communication exchange between these two components can occur.

The managed services platform 9010 can be configured to communicate with one or more portable computing devices 9050. The DMS server 9030 can serve as a gateway for communications with one or more of the devices 9050 such that the DMS server 9030 is responsible for exchanging messages and data with the devices 9050 or for directing or otherwise overseeing the exchange of messages and data between the devices 9050 and other suitable components. The term “DMS server” is defined as a component or a group of components that enable bi-directional communication with at least a portable computing device such that messages, updates, settings or other data can be delivered to such a device.

In one arrangement, the DMS server 9030 can be a computer that includes a processor (not shown), memory (not shown), a computer-readable storage medium (not shown), a network adapter (not shown), and other components known to those skilled in the art. A DMS client interface 9060 can be stored on the computer-readable storage medium, or stored to a data storage device that is communicatively linked to the DMS server 9030. The DMS client interface 9060 can interface with the portable computing devices 9050. For example, the DMS client interface 9060 can include a message publisher interface (not shown) that communicates DMS commands to the portable computing devices 9050 and that facilitates a communication service that employs a consolidated polling technique to conduct message exchange. This communication service, referred to as a heartbeat service, provides a common message transport bus where individual applications running on a managed device can subscribe to receive messages.

A portable computing device 9050 can be any device that subscribes to or is configured to subscribe to the managed services platform 9010 and that may be communicatively linked to the DMS server 9030 to receive one or more commands from the DMS client interface 9060. As an example, a portable computing device 9050 is a tablet, a laptop computer, a smart phone or a communications device that is embedded within another component, such as a vehicle or an appliance. In one arrangement, a portable computing device 9050 can include a DMS client 9070 and a DMS agent 9080 instantiated thereon. The DMS client 9070 and DMS agent 9080 can be implemented as computer-readable program code that, when executed by a processor, implements the various processes described herein. A portable computing device 9050 can also include one or more displays 9090, one or more transceivers 9100 and one or more processors 9110. The transceivers 9100 can enable the device 9050 to communicate with the DMS server 9030, the AS server 9040 and any other component via any suitable wired or wireless connection.

The term “DMS client” is defined as client-side software instantiated on a portable computing device that establishes a communication link with a DMS server and, among other things, receives DMS commands from the DMS server. In addition, the term “DMS agent” is defined as client-side software that is instantiated on a portable computing device that implements the DMS commands received from the DMS server. The DMS agent 9080 can be implemented on the devices 9050 as a component of the DMS client 9070 or on the devices 9050 as a separate component with which the DMS client 9070 communicates.

In one embodiment, the DMS commands can be communicated to a portable computing device 9050 in response to the DMS server 9030 receiving a solicitation or heartbeat from the device 9050. In this regard, the command can be requested by the DMS client 9070 via the heartbeat, as opposed to being pushed by the DMS server 9030 to the device 9050.

In illustration, the heartbeat service of the portable computing device 9050 can periodically communicate a heartbeat to the DMS server 9030 to indicate that the device 9050 is turned on or active and available to receive DMS commands, which may be available from the DMS server 9030. As used herein, the term “heartbeat” is defined as a message communicated from a portable computing device to a DMS server that indicates the availability of the portable computing device to receive DMS commands or messages. A portable computing device 9050 can be configured to communicate the heartbeat intervals defined by seconds, minutes, hours, days, weeks, a certain event, etc. Such intervals can be static, user configurable, or configurable via the update process.

When a heartbeat is received from a portable computing device 9050, the DMS server 9030 can communicate a heartbeat response. If no commands are presently available, the heartbeat response can indicate such to the device 9050. If one or more commands are available for the device 9050, the heartbeat response can indicate that one or more commands will be communicated to the device 9050. For example, the heartbeat response can indicate that the DMS command will be communicated to a device 9050 in response to a next heartbeat, or at a particular time. In this regard, the heartbeat and heartbeat response can include data that facilitates coordination between the DMS server 9030 and the device 9050 for delivery of the commands. After the commands have been executed, a next heartbeat generated by the portable computing device 9050 can indicate to the DMS server 9030 the status of the update, the status of the device 9050 or any other relevant data. As will be explained below, this transport mechanism can permit the delivery of various types of data to the portable computing devices 9050. It is understood, however, that the system 9000 is not limited to this particular transport mechanism, as other suitable techniques for establishing and maintaining communications in the system 9000 may be used.

The AS server 9040 can be a computer that includes a processor (not shown), memory (not shown), a computer-readable storage medium (not shown), a network adapter (not shown), and other components known to those skilled in the art. An AS client interface 9120 can be stored on the computer-readable storage medium, or stored to a data storage device that is communicatively linked to the AS server 9040. The AS client interface 9120 can interface with the portable computing devices 9050. The AS server 9040 can also host one or more application repositories 9130, which can offer one or more applications for download to the portable computing devices 9050. An “application repository” is defined as a medium for storing one or more applications for download to a computing device. An “application” is defined as software that when installed on a machine enables a user to perform one or more specified tasks. As will be explained below, the application repository 9130 can offer applications to the devices 9050 on an individual, global or group basis, a process in which several applications are grouped together for download to a device 9050. A suitable entity can add applications to, modify applications in or remove applications from the application repositories 9130.

Similar to the DMS arrangement described above, a portable computing device 9050 can include an AS client 9140, which can be implemented as computer-readable program code that, when executed by a processor, implement the various processes described herein. The term “AS client” is defined as client-side software instantiated on a portable computing device that establishes a communication link with an AS server and enables the device or facilitates its ability to receive application downloads.

In one arrangement, one or more of the portable computing devices 9050 can be associated with a first entity, while one or more other portable computing devices can be associated with a second entity. For example, the first entity or second entity may be an enterprise, such as a private business or a government agency, a family or some other group linked by one or more common factors. The phrase "associated with an entity" is defined as a relationship between a first entity and a component, service, employee, agent or other entity such that the first entity maintains at least some control over that component, service, employee, agent or other entity. For example, a portable computing device 9050 can be assigned to a first entity such that information relevant to the operation of the first entity is presented on the device 9050 and employees or agents of the first entity can operate the device 9050 on behalf of the first entity.

As an example, all or a portion of the managed services platform 9010 can be hosted by an entity that is distinct from the first and second entities. Such an arrangement can alleviate from the first and second entities the burden of hosting these systems. For example, if the first entity is a private business, the private business may contract with another business to host the managed services platform. Of course, the first entity may wish to host all or a portion of the managed services platform 9010 itself. In addition, different entities may also host portions of the managed services platform 9010. In particular, a first hosting entity may manage the DMS server 9030, while a second hosting entity may be responsible for the AS server 9040.

Virtually any number of portable computing devices 9050 can be assigned to the managed services platform 9010, and these devices 9050 can be associated with any suitable number of entities. In addition, a portable computing device 9050 can be configured to communicate with several managed services platforms 9010. For example, a first platform 9010 may serve as a primary platform, while a second platform 9010 may operate as a secondary platform. In particular, a portable computing device 9050 may communicate with a primary platform 9010 during normal operation but may communicate with a secondary platform 9010 if the primary platform 9010 malfunctions. Moreover, the device 9050 may initially communicate with the secondary platform 9010 upon activation and then can receive instructions to switch to the primary platform 9010. The use of a secondary platform 9010 can also permit additional messages, such as updates or corrective actions, to be sent to the device 9050, if necessary. The secondary platform 9010 can also be used to ensure security by directing the portable computing device 9050 only to an authorized primary platform 9010 such as, for example, when a device 9050 is first activated or following an update.

As explained earlier, multiple portable computing devices 9050 that are associated with numerous entities are contemplated in this arrangement. In addition, a user who is associated with the first entity may be assigned a portable computing device 9050 that is associated with the first entity. For example, a private business may purchase or lease a portable computing device 9050 and can assign the device 9050 to one of its employees. If desired, the private business can also assign a single device 9050 to multiple employees in which each of the employees can be assigned log-in credentials to access/operate the single device 9050. Additional examples of this principle will be presented below.

The arrangement described above can enable the selective download of applications, settings and other data to be sent to one or more portable computing devices 9050. Such information can be provided to a device 9050 on an individual basis, a group basis or a broadcast basis. Multiple examples of this process and other supporting structures will be presented below. A description will be presented here in which a device 9050 is ready for an initial activation.

In this example, a first entity, which may be a private business, wishes to assign a portable computing device 9050 to a person who is associated with the first entity. This person may be, for example, an employee, agent or contractor of the business. As such, this person may have a performance function that is related to or associated with the business. The term "performance function" is defined as one or more tasks assigned to a person to be conducted on behalf of the assigning party. As an example, a performance function can be the duties assigned to an employee or an agent of the business.

The portable computing device 9050 that is assigned to the person associated with the first entity can have an identification that enables the device 9050 to be uniquely identified from other computing devices 9050. In addition, this identification can be used to identify a particular user of a device 9050, especially if that person is the only user assigned to the device 9050. Of course, multiple users may be assigned to a single device 9050, if so desired. As an example, the unique identifier for a device 9050 can be a media access control (MAC) address, although other elements can be used for such a task. If the portable computing device 9050 supports multiple users, then the identification can also include information that enables the users of the device 9050 to be distinguished from one another. For example, a user name or other moniker can be included with a MAC address to identify the device 9050 and which user of the device 9050 is currently active or currently wishes to receive/transmit/exchange data.

When the user activates the assigned portable computing device 9050, the device 9050 can contact the managed services platform 9010, such as by generating and sending an activation notice to the DMS server 9030. The device 9050 can send the activation notice when the device 9050 is first activated or even during subsequent power up cycles, and this notice can be conducted in accordance with the heartbeat process previously described or some other suitable process. The term "activation notice" is defined as a notice that is intended to inform a component or a group of components that the element that sent the notice is ready to receive data from the component or group of components. In receipt of the activation notice, the DMS server 9030 can use the unique identifier(s) to identify the device 9050 and, if necessary, the user of the device 9050. Additionally, the DMS server 9030 may be operable to provide a bundle to the device 9050, and the contents of the bundle can provision the device 9050 in accordance with one or more predetermined arrangements. The phrase "operable to provide a bundle to a computing device" is defined as directly transmitting content to a computing device, indirectly transmitting content to a computing device by directing a component to effect the transmission of content to the computing device or by directing or assisting the portable computing device to seek the delivery of content from a component.

In one arrangement, the content of the bundle can be determined at least in part by the first entity or client to which the portable computing device 9050 is associated. In particular, the content of the bundle can at least include one or more configuration messages and an application set that contains one or more predefined applications. As an example, the managed services platform 9010 can provide the bundle to the device 9050 through a series of message exchanges in accordance with a consolidated polling technique (i.e., the heartbeat process).

Several definitions of some the terms listed above will now be presented. The term "bundle" is defined as one or more messages or transmissions that include content that is intended for a particular computing device or group of computing devices or one or more directives that cause a computing device or a group of computing devices to retrieve content from one or more sources. The term "content" is defined as data, settings or parameters that when received by a computing device, cause the computing device to perform an action that corresponds to the received data, settings or parameters. A "configuration message" is defined as one or more messages or transmissions that are designed to cause a computing device to select or adjust one or more operational settings of the computing device.

Turning to the configuration messages, the DMS server 9030, once it has been contacted by the device 9050, can forward one or more of them to the device 9050. As an example, a configuration message can include virtual privacy network (VPN) settings, wireless communication settings (such as Wi-Fi settings), location service settings, security certificates, firmware packages or download control settings. Specifically, location service settings can be settings that enable, for example, a managing entity to monitor the whereabouts of the device 9050, and security certificates can be employed for securing communications to and from the device 9050, such as Internet Protocol (IP) communications. As another example, firmware packages can include one or more firmware releases that include programming/code to effect or facilitate operational adjustments or settings in one or more components of the portable computing device 9050, as will be explained below. Control settings, for example, can be used to permit a managing entity or other external party to send messages to or make adjustments to the device 9050.

In addition to the configuration messages, the bundle can include one or more applications, such as application sets that include one or more predefined applications. For example, the managed services platform 9000 can take steps to cause the delivery of applications to the portable computing device 9050 or to direct the device 9050 to one or more different components that make such applications available for download. In one arrangement, the DMS server 9030 can be operable to provide applications to the device 9050 by directly transmitting such data to the device 9050. Alternatively, the DMS server 9050 can direct the AS server 9040 to transmit the applications to the device 9050 or can direct the device 9050 to contact the AS server 9040 to retrieve the applications. The device 9050 can also receive applications via any combination of these options listed here.

As noted above, the AS server 9040 can host one or more application repositories 9130, which can offer multiple applications for download to any number of portable computing devices 9050. In one arrangement, the application set that is to be sent to a particular computing device 9050 can include a default application set that includes one or more default applications. In addition to or in lieu of the default application set, the application set can include a custom application set that includes one or more custom applications. A default application set can include applications (i.e., default applications) that have been approved to be installed on all the devices 9050 of a particular group or all devices associated with an entity. In contrast, a custom application set can include applications (i.e., custom applications) that are geared towards a particular characteristic associated with a device 9050 or a user of the device 9050.

As an example, the content of the bundle provided to a portable computing device 9050 can be based on the identification associated with the device 9050. As such, the configuration messages and/or the applications can be provided to the device 9050 according to the identification associated with the device 9050. In one embodiment, the identification associated with the device 9050 can be related to a performance function of an intended user of the device 9050 such that the configuration messages or the applications that are provided to the device 9050 are related to the performance function of the intended user.

For example, a first entity, such as a corporation, may distribute a portable computing device 9050 to an individual, like an employee. This employee can have a performance function, such as generating sales of the company's products or services. Because this worker is involved in sales, the bundle to be delivered to his device 9050 can be tailored to that function. That is, the configuration message(s) and the applications that are to be provided to the employee's device 9050 can be related to the employee's job function, which is in sales. For example, because this employee may be using public Wi-Fi networks, a configuration message sent to the device 9050 may require the device 9050 to only communicate over a VPN. As another example, because the employee may travel frequently, a configuration message for the device 9050 may direct the enablement of a location service on the device 9050. In addition, the configuration message may include firmware and other code designed expressly for this employee's sales job.

In one arrangement, the receipt of the configuration messages can cause visible changes to the portable computing device 9050. For example, a firmware package that is delivered to the device 9050 may cause the display 9090 of the device 9050 to present certain GUI elements. In one particular arrangement but without limitation, the GUI elements that are displayed can be associated with the first entity that distributed the device 9050 to the user. The first entity can cause the device 9050 to be flashed such that, for example, a company logo or other mark can appear on the display, along with other predetermined visual elements, like a background or other various skins and/or themes. This process can be conducted with other devices 9050 that are associated with a second entity such that these devices 9050 can be provisioned to have a look and feel associated with the second entity.

As previously noted, as part of the bundle for each employee, a default set of applications can be provided to the device 9050 as each employee activates his/her device 9050 or at any other suitable time(s). For example, these default applications can be applications that are relevant to each employee's association with the corporation, such as an application for sharing work contacts, an application that presents written articles about the company's industry or an application that is useful for remembering important personal information related to business contacts. Default applications can also be made available for retrieval by a group of devices 9050, such as from an application repository, at any other suitable time. These default applications can simply be made available to the devices 9050 or can be pushed to the devices 9050 when the default applications become available.

As also referenced earlier, if desired, a custom set of applications can be prepared and provided to employees who are part of a specific group or who meet certain requirements. These custom applications can be related to the performance function of an employee or a group of employees. Continuing with the example concerning the sales employee, because this employee may need to visit clients, a navigation application can be provided to that employee's device 9050. In another example, because this employee will be dealing with numerous clients, an application that manages information concerning business contacts can be provided to the device 9050. Like the default applications, custom applications can be pushed to the device 9050 or made available at an application repository, whether at activation or during any suitable, subsequent time.

The managed services platform 9010 can provide services to multiple portable computing devices 9050. Two or more users of such devices 9050 may be associated with a first entity, although not necessarily so. Similar to the description above, the DMS server 9030, once it identifies the second device 9050, can be operable to provide a second bundle to the second device 9050 that is assigned to, for example, an administrative assistant. The second bundle can also contain content that at least includes one or more configuration commands and an application set that contains at least predefined applications. The second bundle can be provided to the second device 9050 when an activation notice is received from the second device 9050 or by some other suitable act by the second device 9050.

The content of the second bundle can be based on the identification associated with the second computing device 9050 such that the configuration messages and/or the application set that are provided to the second device 9050 are done so according to the identification associated with the second device 9050. The identification associated with the second device 9050 can be related to a performance function of a second intended user of the second device 9050 such that the configuration messages or the applications that are provided to the second device 9050 are related to the performance function of the second intended user. In one arrangement, the performance function of the second intended user is different from the performance function of a first intended user of the first device 9050 described above. In this arrangement, the content of the bundle provided to the second intended user can be different from the content of the bundle provided to the first intended user of the first device 9050.

In view of these multiple devices 9050, the DMS server 9030 or some other suitable component can be operable to provide a default set of applications and a custom set of applications for both the first computing device 9050 and the second computing device 9050. As an example, the default set of applications can be the same for both the first device 9050 and the second device 9050, while the custom set of applications for the first device 9050 can be different from the custom set of applications for the second device 9050.

Continuing with the above example, one of the users may be an employee of the first entity and can be involved in sales. This first user can be assigned a first computing device 9050, which can receive configuration messages and applications that are related to the type of work, i.e., sales, conducted by the first user. A second user may be an administrative assistant who is also an employee of the entity and who is assigned a second portable computing device 9050. This second user has a different performance function from that of the first user. As such, some of the configuration messages for the second device 9050 assigned to this user may be structured differently from those provided to the first device 9050 that is assigned to the first user. As an example, the administrative assistant may only be permitted to use the second device 9050 on the entity's campus, which may eliminate the need to set the second device 9050 for permanent use of a VPN.

Further, some of the applications provided to the first user's device 9050 may be different from those provided to the second device 9050 assigned to the second user. For example, the administrative assistant may never travel on the company's behalf, which would obviate the need for provided the second device 9050 with a navigation application. Accordingly, one or more applications designed for use by the administrative assistant on the second device 9050, i.e., a custom set of applications, can be different from those of the employee involved in sales. Nevertheless, some of the applications provided to the sales employee, the administrative assistant and other employees can be common, i.e., a set of default applications, installed on all relevant devices 9050.

As such, the presentation of applications to employees or other individuals can be general or selective in nature. This control of access to applications can occur when the portable computing device 9050 is initially activated or at any other subsequent time. Moreover, this feature applies to applications that are pushed to a device 9050 without any solicitation from a user or when a user tries to access applications from an application repository. In the latter scenario, a managing entity may control the type of applications that a user of the device 9050 can retrieve from an application repository. For example, the managing entity may only present to a user those applications in the application repository that the user is entitled to install on his/her device 9050, which can be based on, for example, the user's performance function.

In certain embodiments, multiple users may be assigned to a single portable computing device 9050. For example, an entity may assign a first user and a second user to a first device 9050, and both the first user and the second user can set up accounts on the first device 9050. The first device 9050 can be operable to identify the first and second users through various conventional means, like passwords or biometric identification. In addition to providing its own unique identifier, the first device 9050 can provide identification for both the first and second users by, for example, supplying information that identifies which of the first and second users is currently active on the first device 9050.

Because there may be multiple users for a single portable computing device 9050, a corresponding number of bundles may be provided to the device 9050. As such, the content of a first bundle provided to a first device 9050 can be based on an identification associated with the first device 9050. To accommodate this feature, the device 9050 can be operable to switch between a first account associated with the first user and a second account associated with the second user. Additionally, the DMS server 9030 can be further operable to provide a second bundle to the first device 9050 based on the identification associated with the first device 9050. The content of the first bundle can be arranged for the first user, and the content of the second bundle can be arranged for the second user, in accordance with the description above. The first and second users may have similar or even dissimilar performance functions, and the first and second bundles may include configuration messages and applications geared towards those performance functions. The first and second users may be associated with a common entity, such as an employer, but not necessarily so.

As noted earlier, the content of the bundle can be determined, at least in part, by a first entity. This first entity can also be responsible for assigning portable computing devices 9050 to one or more users, each of which can be associated with the first entity. For example, the first entity may be a corporation that provides devices 9050 to a number of its employees. In one arrangement, one more application repositories 9130 can be assigned to and associated with the first entity. Such an application repository 9130 can have a look and feel that is related to the first entity, which can give a user of the repository 9130 that the repository 9130 is maintained by or at least approved by the first entity.

In response to the receipt of a bundle, a portable computing device 9050 can be provided with access to the application repository 9130 that is assigned to and associated with the first entity. The phrase "provided with access to an application repository that is assigned to and associated with the first entity" is defined as a state in which a computing device is authorized to access and retrieve material from an application repository or have material from the application repository pushed to the device in which the application repository is either managed or approved by the first entity. As an example, the device 9050 can download applications from the application repository 9130, whether solicited by the device 9050 or pushed to the device 9050. This relationship means that the default application sets, the custom application sets or both can be selected from an application repository 9130 that is associated with the first entity. As such, the first entity can determine which applications are to be part of the application repository 9130, including the number and types of applications that are to be included in the default application sets, the custom application sets or both. It must be noted, however, that entities other than this first entity may make these determinations, and additional detail on this process will be presented below.

In one arrangement, the first entity referred to above can be responsible for setting up and maintaining the managed services platform 9010 or at least part thereof, in addition to determining the content of the bundles provided to the computing devices 9050. For improved efficiency or to lessen the burden on the first entity, at least part of the managed services platform 9010 can be developed and managed by a second entity that is distinct from the first entity. For example, the DMS server 9030 and the AS server 9040 can be hosted by the second entity. As another example, the second entity can be a managing entity that is responsible for preparing and providing the bundles according to input from the first entity.

An example will be presented to help explain this arrangement. Consistent with the examples above, the first entity may be a corporation that assigns portable computing devices 9050 to a number of its employees. While the corporation may set up and manage a managed services platform 9010—including an application repository 9130—on its own, the corporation may delegate such responsibilities to some other organization, i.e., the second entity. The second entity may be another company that specializes in providing managed services and can, at the direction of the first entity, develop and host the components of the managed services platform 9010. As part of this assignment, the second entity can develop and maintain the application repository 9130 on behalf of the first entity, which may include approving applications for publication in the repository 9130. Further, the first entity can direct the second entity to prepare the bundles that can be provided to the relevant portable computing devices 9050, including the pushing of subsequent updates and other content to these devices 9050. In this case, the first entity can provide input to the second entity to ensure the second entity properly prepares the bundles. Of course, the first entity can take on any of these processes on its own accord.

Figure 87:
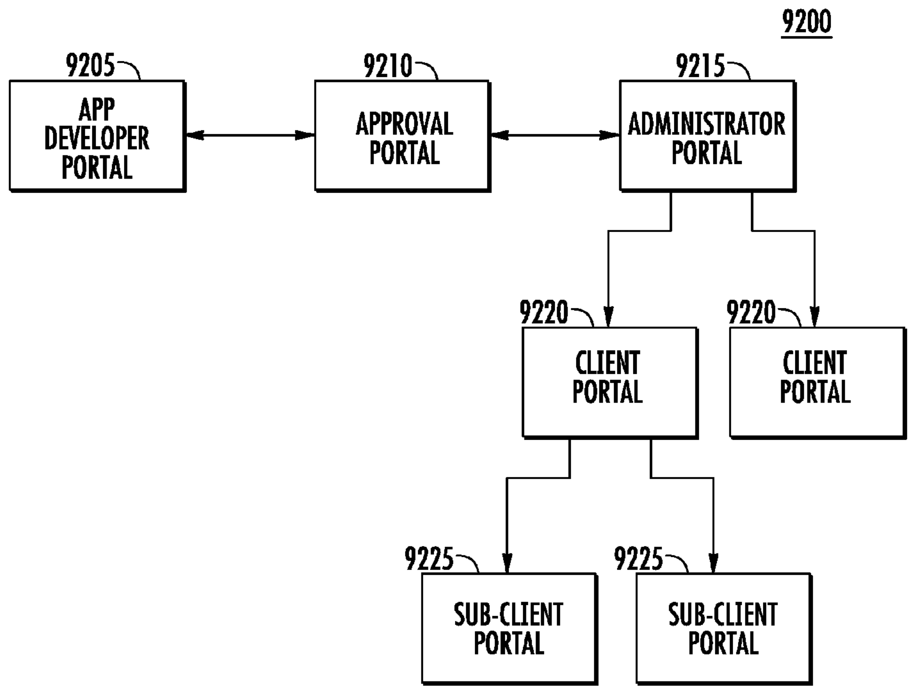
FIG. 87 illustrates an example of a managed services system.

Referring to FIG. 87, an example of a managed services system 9200 is shown. Any number of managed services platforms 9010, as described above, can be implemented into the managed services system 9200. In one arrangement, the system 9200 can include one or more application developer portals 9205, one or more approval portals 9210, one or more administrator portals 9215, one or more client portals 9220 and one or more sub-client portals 9225. An overview of the managed services system 9200 will now be presented.

The application developer portal 9205 is a system that enables one or more application developers to submit applications for publication in one or more, for example, application repositories 9130. Once an application is submitted for publication, the application developer portal 9205 can forward the application to one or more approval portals 9210. The approval portal 9210 is a system that enables testing and analysis on the submitted application to ensure that the application complies with a set of requirements for publication in the application repository. If the application meets these requirements, the application may be approved, and the approval portal 9210 can forward the approved application to, for example, one or more administrator portals 9215. The approval portal 9210 can also signal the application developer portal 9205 that the submitted application has been approved.

The administrator portal 9215 is a system that enables the distribution of the approved application to one or more entities or components. Once it receives the approved application, the administrator portal 9215 can, for example, push the application to one or more of the portable computing devices 9050 (see FIG. 86) through the managed services platform 9010 (see FIG. 86) or can cause the application to be published in the application repository 9130 or to become part of a bundle. In this scenario, the portable computing devices 9050 may be associated with an entity that is responsible for operating or managing the administrator portal 9215.

The administrator portal 9215, once it receives the approved application, may also perform one or more other processes, either in lieu of or in addition to the steps listed above. For example, the administrator portal 9215 can forward the approved application to one or more of the client portals 9220, which can serve as a notice that the application is available for publication in one or more application repositories. The client portals 9220 can be systems that accept approved applications from, for example, the administrator portal 9215 and can make determinations as to whether to publish the approved application in an application repository. As an example, the application repository in which the approved application may be published can be associated with a client portal 9220.

In one arrangement, one of the client portals 9220 may be associated with one or more of the sub-client portals 9225. In one example but without limitation, a client portal 9220 may be associated with a multi-national corporation, and a sub-client portal 9225 may be set up for one or more subsidiaries of the corporation. In this arrangement, the client portal 9220 may facilitate the availability/publication of applications for the sub-client portals 9225, such as for application repositories associated with the entities that oversee or operate the sub-client portals 9225. For example, if the client portal 9220 decides to publish the submitted application in an application repository, the client portal 9220 can forward the application to one or more of the sub-client portals 9225. At this point, the sub-client portals 9225 can determine whether to publish the application on an application repository associated with the entity overseeing or operating the sub-client portal 9225.

The preceding overview is not meant to be limiting, as it is merely one example of a managed services system and its operating processes. Each of the components shown in FIG. 87, however, will be discussed in more detail below, beginning with the application developer portal 9205 and the approval portal 9210.

Figure 88:
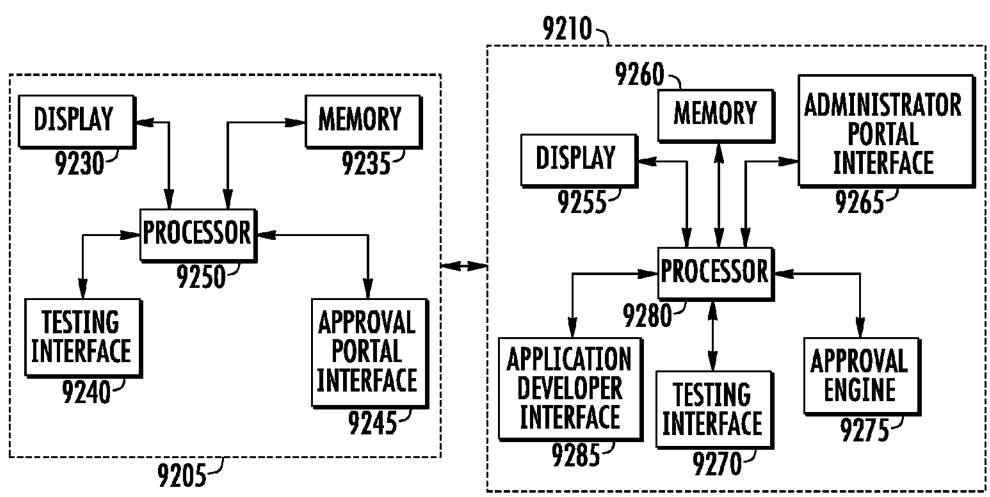
FIG. 88 illustrates an example of an application developer portal and an approval portal.

Referring to FIG. 88, exemplary block diagrams of the application developer portal 9205 and the approval portal 9210 are shown. As explained earlier, the application developer portal 9205 enables one or more application developers to submit one or more applications for possible publication in one or more application repositories. To facilitate this operation, the application developer portal 9205 can include several components, such as a display 9230, memory 9235, a testing interface 9240, and approval portal interface 9245 and a processor 9250. The display 9230 can display various types of relevant information, such as one or more applications that have been received from, for example, an application developer. The memory 9235 can be any suitable type of memory for storing the submitted applications, as well as instructions for carrying out any of the processes described herein.

The testing interface 9240 can be configured to permit an application developer to test, analyze, review or otherwise manage any application that it has submitted to the application developer portal 9205. For example, the testing interface 9240 can support wired or wireless communications with one or more testing devices (not shown), which can permit the installation of a submitted application on a testing device. As an example, a testing device can be similar to a portable computing device 9050 described above or some other similar unit that may eventually install the submitted application. The approval portal interface 9245 can support wired or wireless communications with the approval portal 9210 and/or some other suitable component. This connection can permit the application developer portal 9205 to submit applications to the approval portal 9210 for approval and for message or data exchange between the two components.

Each of the display 9230, the memory 9235, the testing interface 9240 and the approval portal interface 9245 can be communicatively coupled to the processor 9250. In addition, the processor 9250 can control the operation of each of these components. The processor 9250 can be configured or operable to cause the execution of any the processes described herein.

As explained above, the approval portal 9210 can permit the review and approval of applications submitted for publication from the application developer portal 9205. Similar to the application developer portal 9205, the approval portal 9210 can include a display 9255, memory 9260, a testing interface 9270 and a processor 9280. The approval portal 9210 can also include an administrator portal interface 9265, an approval engine 9275 and an application developer interface 9285.

The display 9255 can display one or more applications that have been submitted for approval, as well as other relevant information. The memory 9260 can be any suitable type of memory for storing the applications submitted for approval, as well as instructions for carrying out any of the processes described herein. The testing interface 9270 can be configured to conduct wired or wireless communications with one or more testing devices (not shown), which can permit the applications submitted for approval to be downloaded to such devices. A testing device can permit the submitted application to be tested in an environment similar to that available on a portable computing device 9050. As such, the testing device may be similar in structure and capabilities as a portable computing device 9050, although the testing device is certainly not limited to this arrangement.

The administrator portal interface 9256 can support wired or wireless communications to enable the approval portal 9210 to send approved applications to the administrator portal 9215 (see FIG. 87), as well as to allow message/data exchange between the two systems. Of course, the administrator portal interface 9265 can be used to permit the approval portal 9210 to conduct wired or wireless communications with other suitable systems or components. Similarly, the application developer interface 9285 can support wired or wireless communications with, for example, the approval portal interface 9245 of the application developer portal 9205 or any other suitable component. In one arrangement, the approval engine 9275, which can be any suitable combination of hardware and software, can be configured to conduct testing on the submitted application. For example, the approval engine 9275 can execute testing or analysis programs on the submitted application to provide an indication as to whether the submitted application complies with any number of approval requirements.

Each of the display 9255, the memory 9260, the administrator portal interface 9265, the testing interface 9270 and the approval engine 9275 can be communicatively coupled to the processor 9280. In addition, the processor 9280 can control the operation of each of these components. The processor 9280 can be configured or operable to cause the execution of any the processes described herein.

Examples of the operation of the application developer portal 9205 and the approval portal 9210 will now be presented. The application developer portal 9205, which may also be referred to as a computing device, can be configured to present a first interface to permit application developers to submit applications for approval for selective publication in a first application repository, a second application repository or both first and second application repositories. In one arrangement, the first application repository can be associated with a first client, and the second application repository can be associated with a second client, although either application repository may be associated with a single client or entity. The term "application developer" is defined as an entity that submits an application for approval for publication or at least possible publication in an application repository and includes an entity that actually generates the application or an entity that supervises the generation of the application. The phrase "to submit applications for approval for selective publication" is defined as a process in which applications are submitted for an approval process in which it is determined whether the submitted application meets one or more requirements for publication or at least possible publication in one or more application repositories.

The approval portal 9210, which may also be referred to as a computing device, can be configured to present a second interface to permit the approval of a submitted application for the selective publication in the first application repository and/or the second application repository. The term "approval" is defined as a process or state in which an application has been deemed to meet one or more requirements to be eligible for publication or at least available for publication in one or more application repositories. If a submitted application is approved, the approval portal 9210 can be further configured to notify the application developer portal 9205 that the submitted application has been approved, such as through a communication between the application developer interface 9285 and the approval portal interface 9245.

Figure 89:
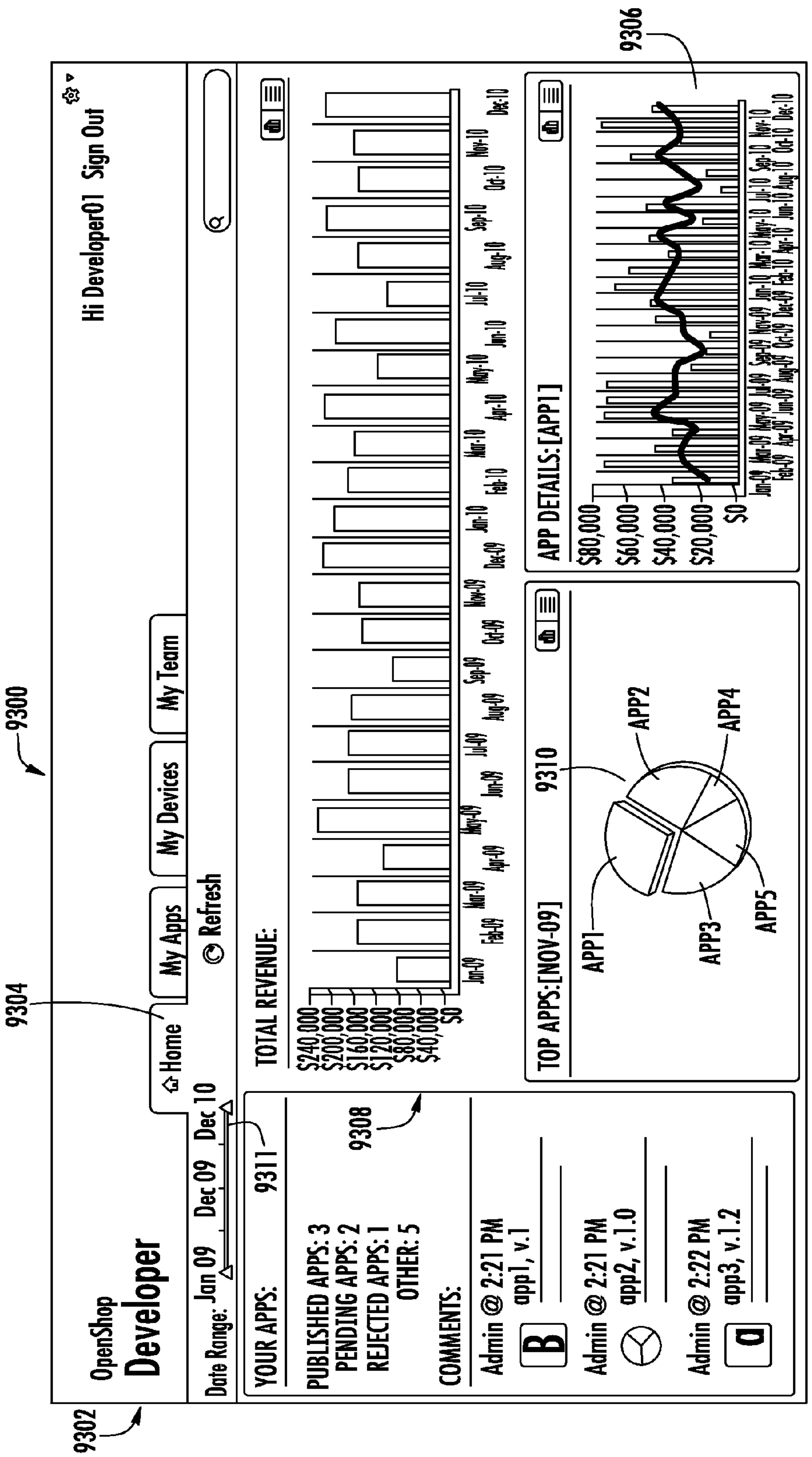
FIG. 89 illustrates an example of an interface that can permit application developers to submit applications.

Referring to FIG. 89, an example of an interface 9300 that the application developer portal 9205 can present to permit application developers to submit applications for approval for selective publication is shown. As an example, the interface 9300 can be one or more GUI elements that provide information to a user and enable the user to take one or more actions. As part of the interface 9300, the application developer portal 9205 can present a home page 9302, which can be accessed through, for example, a home tab 9304.

In one arrangement, the home page 9302 can provide performance data relating to a submitted application once the application is published in the first application repository or the second application repository. Examples of performance data can include the number of times an application has been published in an application repository, how many times the application has been downloaded from the application repository and financial information. In this case, the home page 9302 can include an application performance section 9306 that can display the amount of revenue generated by a selected application, such as over the course of several months. As an example, this revenue can be generated from users downloading the application from an application repository. Of course, one skilled in the art will appreciate that the home page 9302 can demonstrate other information that is related to the performance of one or more individual applications.

In another arrangement, the home page 9302 can be configured to provide cumulative performance data relating to a plurality of published applications in the first application repository or the second application repository. For example, the home page 9302 can include a cumulative performance section 9308, which can show the amount of revenue that has been generated from a plurality of submitted applications that have been published, such as all published applications. This information can be displayed in relation to any suitable amount of time, such as the monthly performance markers shown in the cumulative performance section 9308. As part of the cumulative performance section 9308, a pie chart 9310—or some other form of displaying cumulative data—can be used to demonstrate the total market share of each of the applications that have been published and downloaded. It is understood, however, that the home page 9302 is not in any way limited to these examples, as other suitable formats can be used to display cumulative performance data of a plurality of applications.

In addition to performance data, the home page 9302 can provide other important information. For example, the home page 9302 can show the number of applications that have been submitted by a particular application developer. As part of this feature, the home page 9302 can provide the total number of submitted applications in a particular state, such as the total number of applications that have been published or rejected or are still pending approval. Additional discussion on these states will be presented below. Comments relating to one or more submitted applications may also be presented on the home page 9302. These comments may be submitted by, for example, application developers, personnel involved in approving the submitted applications or any other suitable entities. A date range selection mechanism 9311 can also be provided to enable a user to select a particular date or a range of dates in an effort to focus on performance data or other information associated with a particular temporal period.

The application developer portal 9205 can be configured such that all of or portions of performance data associated with the submitted applications can be selectively isolated such that access to the performance data is restricted. For example, a password or a biometric identification process may be required to access the performance data, which can effectively prevent unauthorized users from obtaining access to this potentially sensitive data.

Figure 90:
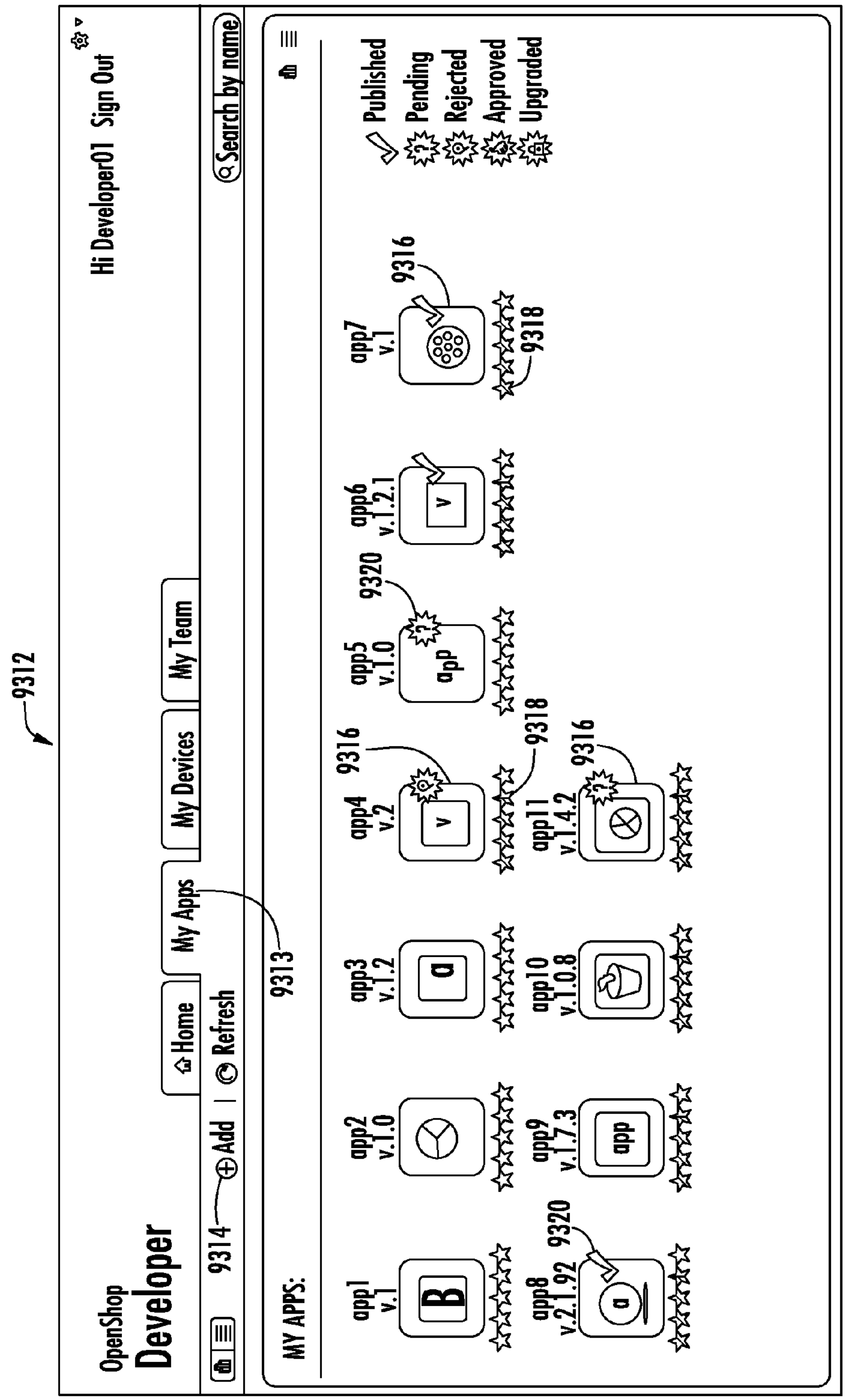
FIG. 90 illustrates an example of an applications page.

Referring to FIG. 90, an example of an applications page 9312 is shown, which can be part of the interface 9300 and can be accessed through an applications tab 9313. As an example, an application developer can upload one or more applications for approval through this applications page 9312, such as by selecting an addition feature 9314. One or more submitted applications 9316 can be presented on the applications page 9312, and these applications can be represented by any suitable type of icon. As part of the display, the name and version of the application 9316 can be shown. Additionally, a rating indicator 9318 can be displayed as part of the presentation of the submitted applications 9316. The rating indicator 9318 can represent an overall rating that is attached to an application 9316 to provide an indication as to, for example, the effectiveness, suitability, performance or utility of the application. As an example, the rating indicator 9318 can be applied to applications that have been published and downloaded to portable computing devices 9050 and can represent a cumulative grading. The cumulative grading can be based on information provided by users who have downloaded and used the published application, for example.

In this case, the rating indicator 9318 can be a grading scale based on a number of stars, which can range from the number zero to the number five, with more stars being hi-lighted as the cumulative grading becomes more favorable for the application. Those submitted applications that have not yet been published and cannot be downloaded may typically have no rating indicator 9318 or a rating indicator 9318 that shows that no such grading is available yet. In this example, none of stars are hi-lighted for a submitted application that has not yet been published and therefore has no grading. While a star system is a suitable example for a rating indicator, it is understood that other mechanisms can be used to indicate the favorability of an application, such as a color coding system or additional icons or adjustments to the application icons.

In one embodiment, the application developer portal 9205 can assign a status indicator 9320, which can provide information as to the stage of review for approval for a submitted application 9316. The term "status indicator" is defined as a GUI element that provides an indication as to the stage of approval review for a particular application. As an example, the status indicator 9320 can be presented proximate to or at least partially directly over the relevant application 9316. The status indicator 9320 can take on several forms, each one representing a particular state. Moreover, a status indicator section 9320 can provide an explanation as to what each status indicator 9320 represents.

For example, once an application 9316 is submitted for approval, the status indicator 9320 for that submitted application 9316 can indicate that the submitted application is in a pending state, if the submitted application 9316 is under review and has not yet been approved for publication by the approval portal 9210. In another example, once a submitted application 9316 is approved for publication, the status indicator 9320 for the application 9316 can indicate that the application 9316 has been approved for publication or is in an approved state. In yet another example, once an approved application 9316 is published in one or more application repositories, the status indicator 9320 can indicate that the application 9316 is in a published state. In contrast, if a submitted application 9316 is rejected for approval for publication, the status indicator 9320 can indicate that the submitted application 9316 has been rejected or is in a rejected state.

In one arrangement, following the submission of an application 9316, an application developer or some other suitable entity may have the opportunity to upgrade the application 9316. This process can involve any suitable type of modification, such as debugging or adding new features to the application 9316. In this case, if a submitted application 9316 is upgraded, the status indicator 9320 can indicate that the application 9316 has been upgraded. These upgrades can occur once an application 9316 is submitted for approval for publication (i.e., a submitted application), once the application 9316 has been published or after it has been rejected.

The status indicator 9320 may indicate multiple states for a particular application 9316, if applicable. For example, if a submitted application 9316 yet to be approved has been upgraded, then the status indicator 9320 can indicate both states (i.e., submitted and upgraded) for the submitted application 9316. Moreover, the status indicator 9320 can change its indication to reflect modifications in the state of an application 9316 once such modifications occur.

Several examples of indications for the status indicator 9320 are presented in FIG. 90. It is understood, however, that the interface 9300 is not limited to these particular examples, as any suitable form of indicating the state of an application 9316 can be employed here. Such forms of the status indicator 9320 can include the use of various colors, shapes and different insignia.

Figure 91:
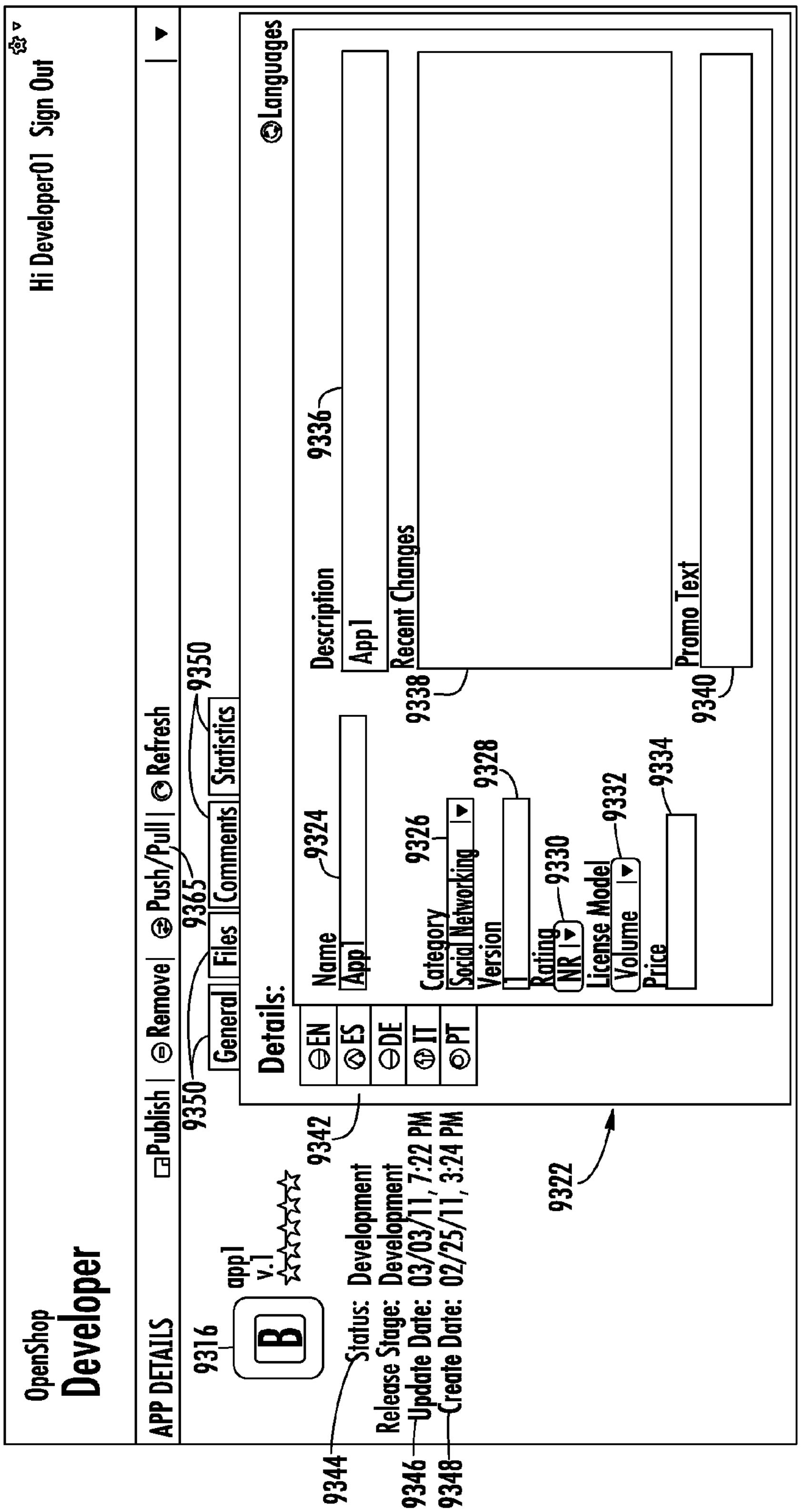
FIG. 91 illustrates an example of an application presentation page.

In one arrangement, the application developer portal 9205, through the interface 9300, can be configured to present information associated with a submitted application 9316 uploaded by, for example, an application developer. The application developer portal 9205 can be further configured to enable the selection of the information, such as prior to the uploaded application being submitted for approval. Referring to FIG. 91, an application presentation page 9322 is shown, which can present such information. For example, a user can select an application 9316, and the application presentation page 9322 can present various types of information associated with the selected application 9316. Information can be displayed for one or more applications 9316, and the selected application 9316 can be in any one of the states described above (e.g., pending, approved, etc.).

Some examples of information that can be presented for a selected application 9316 include an application name 9324, an application category 9326, an application version 9328, an application rating 9330, a licensing model 9332, a price 9334, a description 9336, a log of edits 9338, promotional text 9340 or a language selection 9342. In addition, a status/release stage 9344, which can correspond to the status indicator 9320, can be presented for the selected application 9316. An update date 9346 (if appropriate) and a creation date 9348 can be shown for the submitted application 9316. The rating indicator 9318 can also be presented for the submitted application 9316, if desired.

The application category 9326 can identify a category to which the selected application 9316 belongs. Examples include social networking, gaming, finance, media, etc. The application version 9328 can identify the version of the selected application 9316 (a higher number may indicate a more recent version), while the application rating 9330 can show a rating that has been assigned to the selected application 9316. Examples of such ratings include one that signifies that the application is suitable for all ages, one that indicates that the application is intended for mature audiences and one that shows that the application has no rating. Other ratings may be used here, as the examples listed above are not meant to be limiting.

The licensing model 9332 identifies the licensing arrangement that is available for the selected application 9316. For example, the licensing model 9332 can be a floating license, a free license, a pay license, a subscription-based license or a volume license. In particular, the floating license can be a pool of active licenses that is limited to a certain number of licenses, but members who are part of this number of licenses can be freely exchanged. For example, a company may be granted ten licenses for an application. While the number of licenses at any one time may be limited to ten, employees who are part of this group of ten licenses may be swapped with other employees to permit selective access to other workers. In the case of a free license, no financial transaction is required for download and use of the application 9316, while a pay license can be a one-time, up-front payment to do so. A subscription-based license is one in which a user may pay on a periodic basis for use of an application 9316, which may remain in place so long as the payments continue to be made. A volume license is one in which discounts may be given for relatively large number of licensees, and the discount may increase as the number of licensees rises. The price 9334 can indicate the amount of money involved for any of the licenses described above.

The description 9336 can be, for example, text that explains the operation of the selected application 9316 and any other relevant points. The log of edits 9338 can display all or a portion of any modifications or notes related to such modifications that are involved with the selected application 9316. The promotional text 9340 can present information related to any program or effort to entice users to download and install, whether permanently or on a trial basis, the selected application 9316.

In addition to presenting information associated with the selected application 9316, the application presentation page 9322 can enable any of the information described above to be modified. For example, a developer of the selected application 9316 can determine what type of licensing model 9332 will be assigned to the application 9316 and the price 9334 associated with such determination. As part of the presentation and modification of the information of the application presentation page 9332, the language selection 9342 can enable the application developer or some other party to select the language in which such information will be presented or modified.

The application presentation page 9322 can provide functionality to enable a party to submit the selected application 9316 for approval for publication in an application repository. For example, a publish initiator 9344 can be activated, which can, in response, forward the selected application 9316 to the approval portal 9210 for approval. In another arrangement, the application presentation page 9322 can provide a removal initiator 9346, which, upon being activated, can remove the selected application 9316 from consideration for approval by the approval portal 9210. The application developer or some other suitable party may wish to take this step if it is deemed, for example, that the selected application 9316 is not ready for review by the approval portal 9210.

The application presentation page 9322 may also present one or more features to enable testing of a selected application 9316. For example, the application developer portal 9205 can be configured to push the uploaded (i.e., selected) application 9316 to a testing device, such as a portable computing device 9050. Once pushed to the testing device, the selected and pushed application 9316 can be tested to determine its suitability for submission to the approval portal 9210. Any suitable entity can perform the testing, such as (but not limited to) the application developer. As another example, the application developer portal 9205 can be configured to pull the application 9316 from the testing device, which can be done, for example, following the completion of the testing phase at the application developer portal 9205. Additional discussion on this feature will be presented below.

Figure 92:
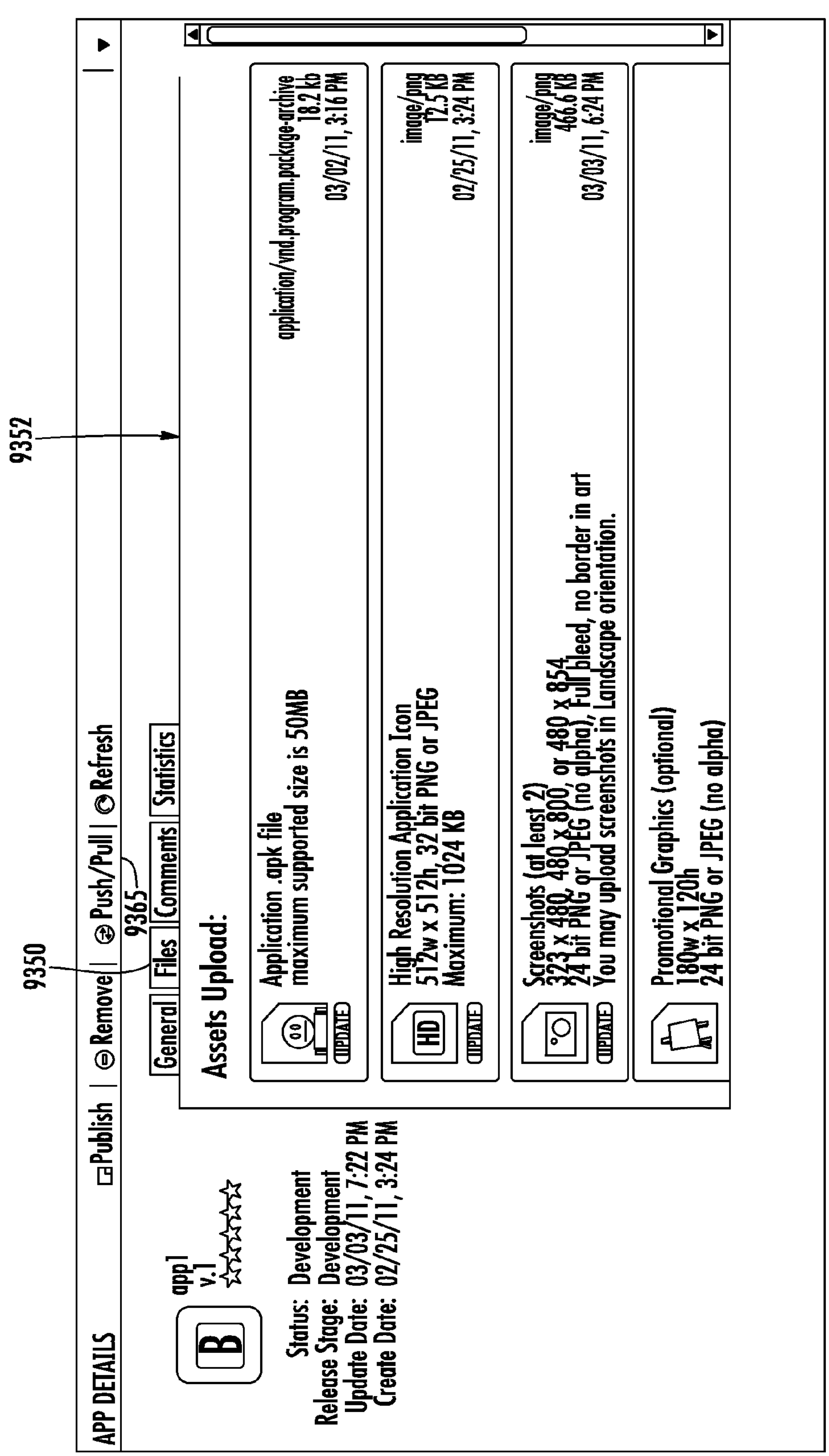
FIG. 92 illustrates an example of a file page that can present information related to files.

The application presentation page 9322 may include several tabs 9350, the selection of which may present different types of information to be displayed or otherwise available. For example, the selection of a tab 9350 labeled with the word "General" can cause the information described above in relation to FIG. 91. In addition, the selection of a tab 9350 labeled with the word "Files" can cause the application developer portal 9205 to display a file page 9352 that presents information related to the files associated with the selection application 9316, an example of which is shown in FIG. 92. In one arrangement, the files that are part of the selected application 9316 and that are uploaded when the application 9316 was submitted for approval can be shown here.

Figure 93:
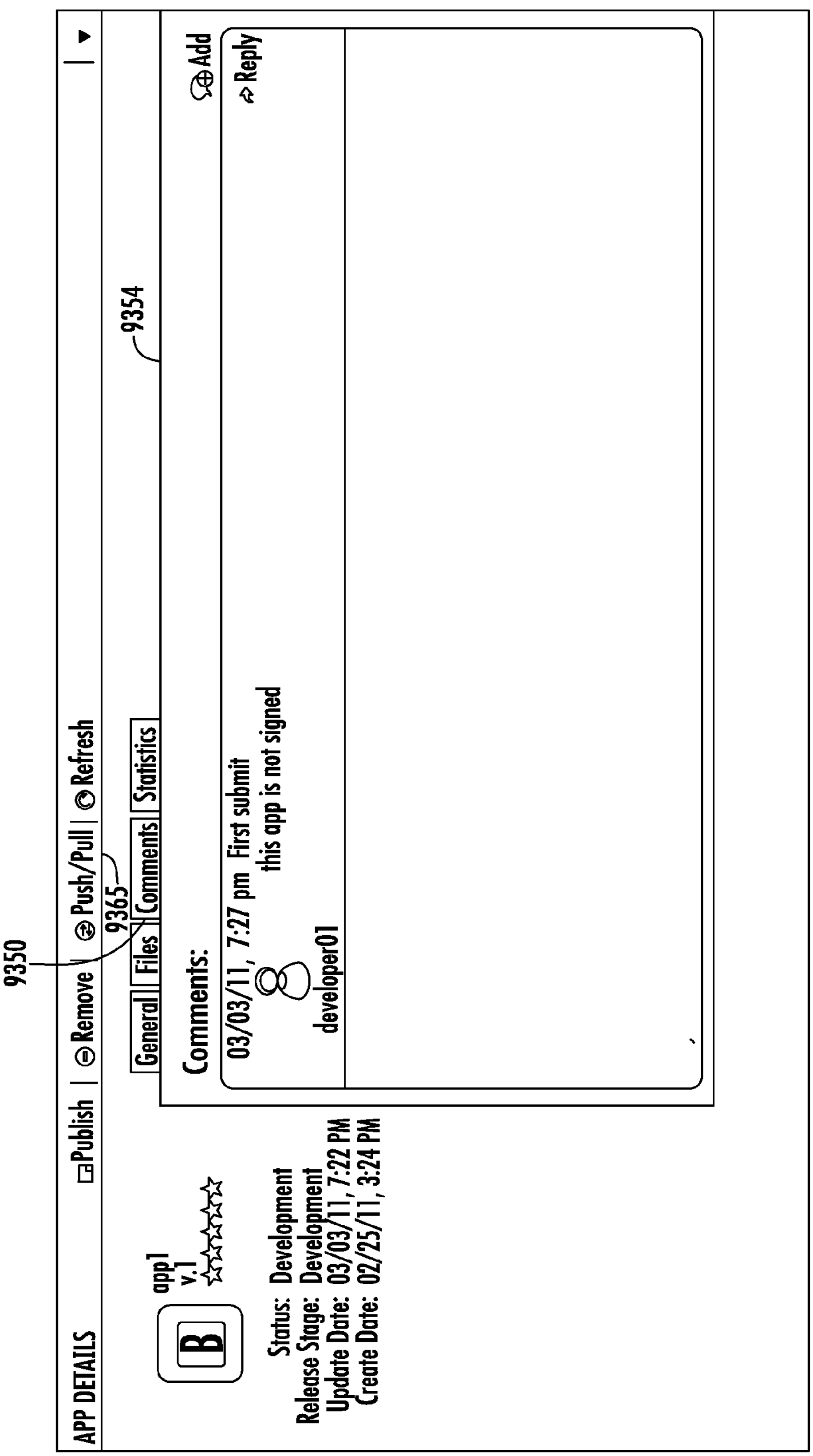
FIG. 93 illustrates an example of a comments page.

Similarly, selection of a tab 9350 noted with the word "Comments" can cause the portal 9205 to show a comments page 9354, an example of which is shown in FIG. 93. Here, the comments of application developers, testing personnel, administrators or any other suitable entities that are related to the selected application 9316 can be presented here. These comments can relate to various aspects of the application 9316, such as its features, its performance, its information presented in the General tab 9350, etc. The comments page 9354 can also enable replies to be submitted in response to any comment presented on the comments page 9354.

Figure 94:
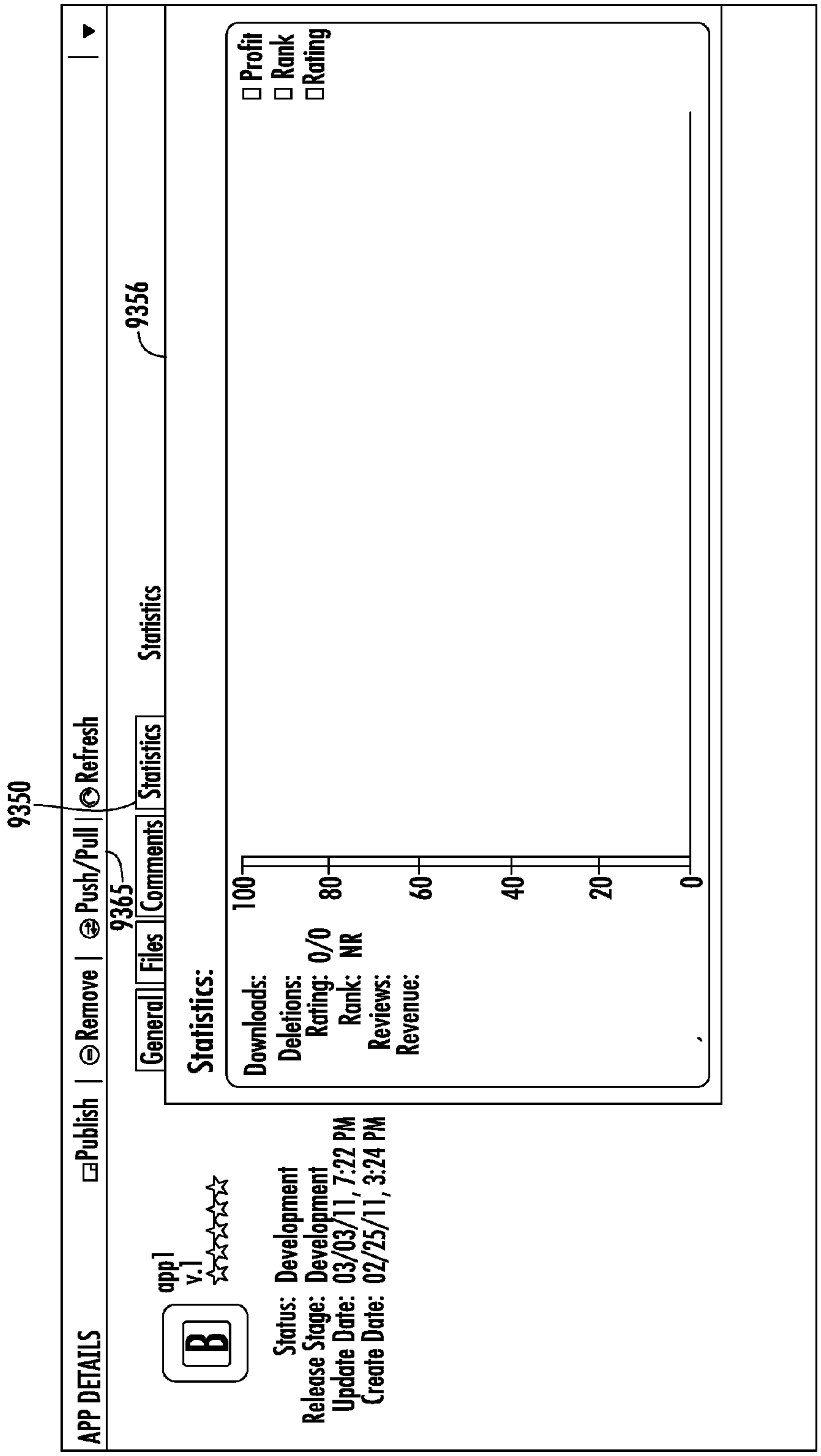
FIG. 94 illustrates an example of a statistics page.

Another example of a tab 9350 is one labeled with the term "Statistics." Selection of this tab 9350 can cause the application developer portal 9205 to present a statistics page 9356, an example of which is shown in FIG. 94. Any suitable statistic associated with the selected application 9316 can be displayed on the statistics page 9356. For example, if the selected application 9316 has been published, the number of times that the application 9316 has been published and the amount of revenue associated with these downloads can be presented. As another example, the grade from the rating indicator 9318 and any reviews of the application 9316 can be presented here. In addition, the number of deletions from units that have installed the application 9316 and the rank of the application 9316, as compared to other published applications 9316, can also be displayed. These examples here are not meant to be limiting, as other suitable types of statistics can be presented on the statistics page 9356. Moreover, the application developer portal 9205 can be configured to present other types of tabs 9350, as those described here are intended to be exemplary in nature.

The application developer portal 9205 can be configured to provide a publication indicator 9357 and a removal indicator 9359. The publication indicator 9357 and the removal indicator 9359 can be part of, for example, the application presentation page 9322, the file page 9352, the comments page 9354 and the statistics page 9356. When the application developer or any other suitable party is ready to submit the application 9316 for approval, the application developer or party can activate a publication indicator 9357. This step can cause the generation of a publication command, and in response, the application developer portal 9205 can forward the application 9316 to the approval portal 9210. If the application developer or some other party does not believe that the application 9316 is ready to be submitted, the application developer of the party has the option to remove the application 9316 from the application developer portal 9205 by activating the removal indicator 9359.

Figure 95:
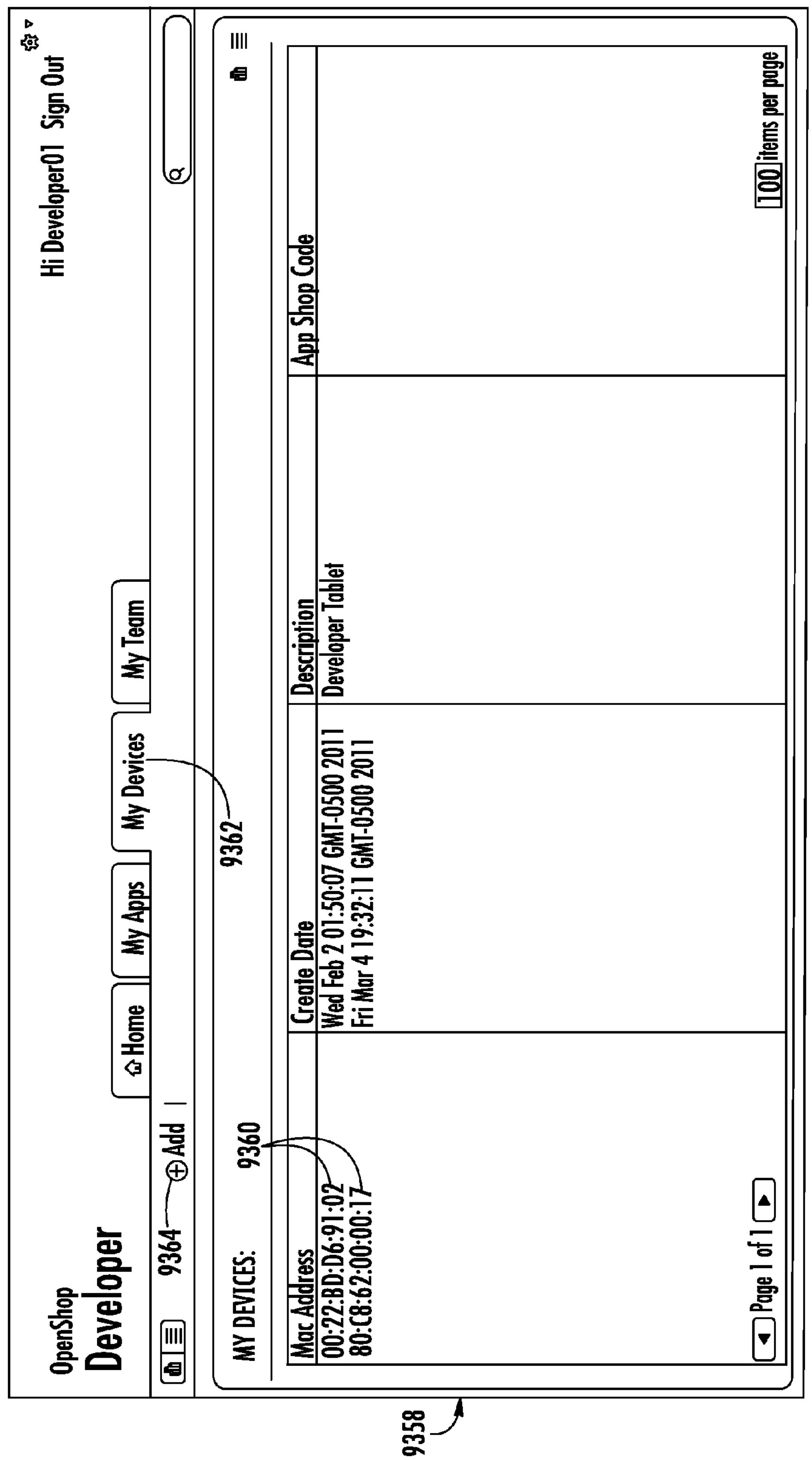
FIG. 95 illustrates an example of a devices page, which can list one or more testing devices.

As noted earlier, an application 9316 can be pushed to or pulled from a testing device. Any suitable computing device can serve as a testing device, and the testing can be performed by any suitable entity (i.e., not just the application developer). To facilitate this process, the interface 9300 can present a devices page 9358, which can list one or more testing devices 9360 and an example of which is shown in FIG. 95. The devices page 9358 can be accessed through a devices tab 9362. Although not so limited, the testing devices 9360 can be listed according to a MAC address, and the devices pages 9358 can also present a short description of the testing devices and when they were added as a testing device. A user can select an add button 9364 to add a testing device to the devices page 9358 to enable such a device to begin testing submitted applications 9316. To push an application 9316 to or pull an application 9316 from a testing device 9360, a push/pull indicator 9365 can be activated. As an example, the push/pull indicator 9365 can be part of the application presentation page 9322, the file page 9352, the comments page 9354 and the statistics page 9356.

Figure 96:
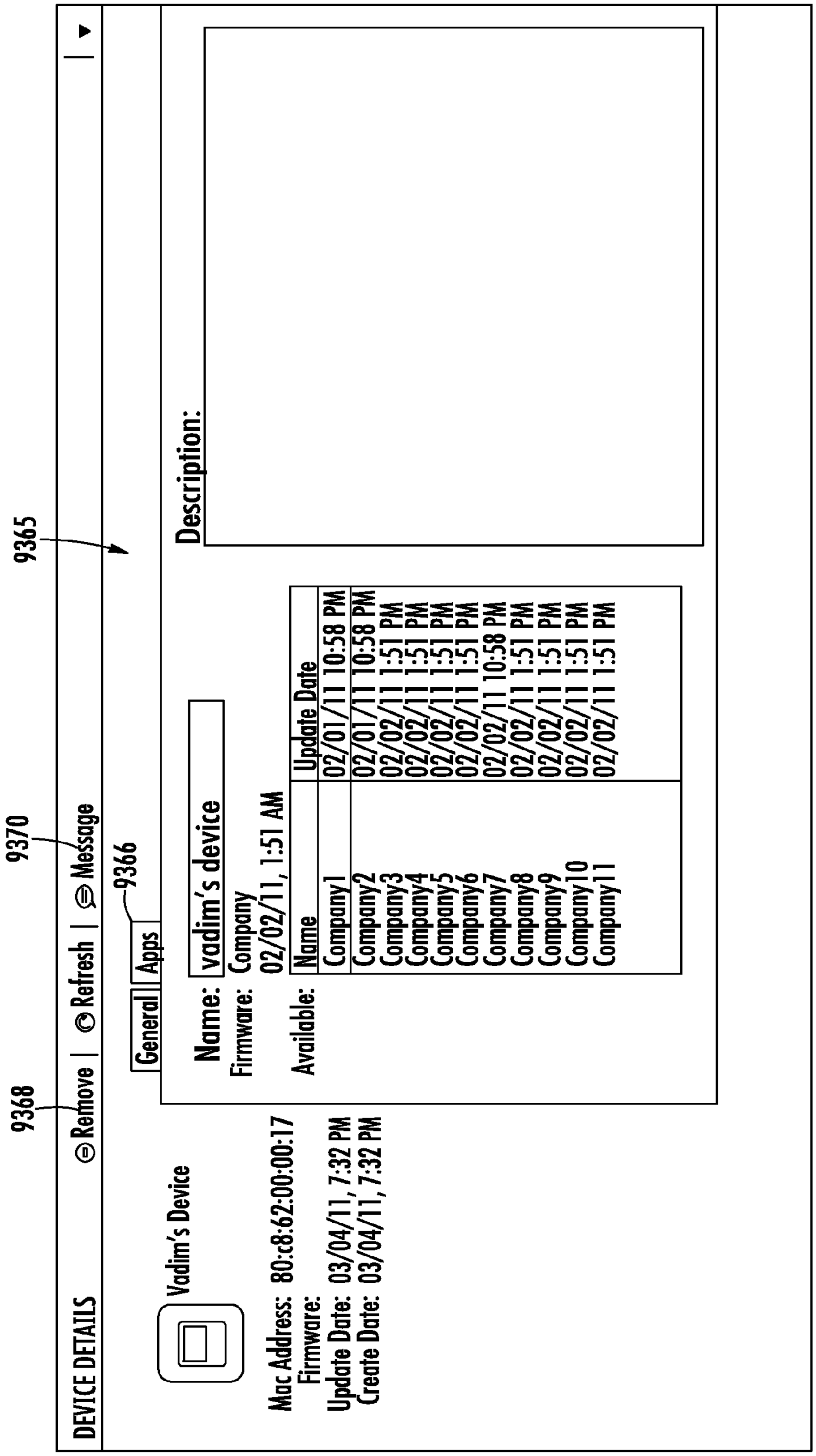
FIG. 96 illustrates an example of a device information page.

As an option, a user can select one of the testing devices 9360 to determine additional information about the selected testing device 9360 or to make edits or selections associated with the selected testing device 9360. When such a testing device 9360 is selected, a device information page 9365 can be presented, an example of which is shown in FIG. 96. As an example, the MAC address of the testing device 9360 can be shown, along with the date the testing device 9360 was added and any update dates associated with the device 9360. The type of firmware installed on the testing device 9360 can be hi-lighted, and additional firmware versions that the testing device 9360 can be flashed with can also be presented. As explained earlier in relation to the portable computing devices 9050, when the testing device 9360 is flashed with one of these firmware selections, the testing device 9360 can take on a look and feel of an entity that is associated with the selected firmware.

In another arrangement, any applications 9316 that are installed on the testing device 9360 for testing can be presented on the devices page 9358, such as through selection of an applications tab 9366. Moreover, a testing device 9360 can be removed as a testing device 9360 via selection of a removal button 9368 and can be messaged, such as through activation of a message button 9370. The devices page 9358 is certainly not limited to the features and arrangements described above, as other elements can be presented here in accordance with other suitable placements.

An application developer may be a single individual or entity or may consist of a group of individuals or entities. If the application developer is comprised of several individuals or entities, there may be a desire to shield sensitive information from some of these individuals or entities. For example, a first company may contract with a second company to develop applications to be uploaded to the application developer portal 9205. As noted above, information related to the performance of an application 9316 may be presented on the home page 9302, and, as an example, the first company may consider such information to be confidential and not to be released or disclosed to the second company. The interface 9300 can be configured to accommodate the privacy concerns of one or more individuals or entities in situations like this.

For example, the home page 9302 can include a tab 9372, which when selected, can present an interface (not shown) that can be similar to the interface 9300 but without displaying sensitive information. That is, a restricted interface can be presented to portions of an application developer team that enables these members to provide applications 9316 in a fashion similar to that described above; however, these members will not be given access to certain types of information, like that related to the performance of an application 9316. Moreover, this restricted interface may also prevent these members from activating certain features that were described above in relation to the interface 9300. For example, these restricted members may not be given the opportunity to cause the transmission of uploaded applications 9316 to the approval portal 9210, with such feature being reserved for a supervisory or managing entity.

Figure 97:
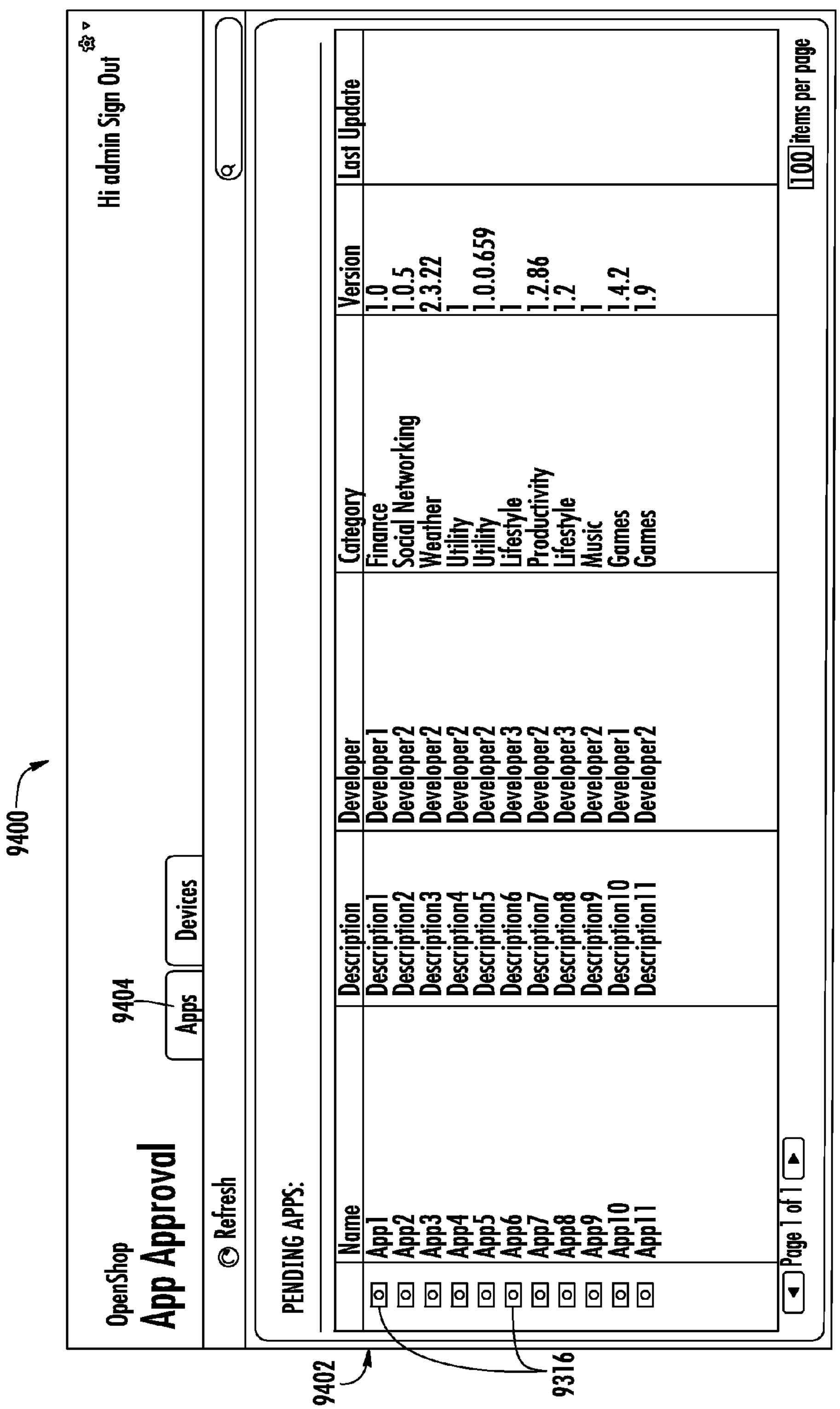
FIG. 97 illustrates an example of an interface that facilitates an approval process.

As previously explained, applications 9316 that are uploaded to the application developer portal 9205 can be forwarded to the approval portal 9210 where they can be evaluated for possible publication in one or more application repositories. One example of an interface 9400 that facilitates such an approval process is shown in FIG. 97. The interface 9400 can include an applications page 9402, which can be accessed via an applications tab 9404. The applications page 9402, in one arrangement, can present one or more applications 9316 that are pending, or waiting to be approved for publication in one or more application repositories. As such, when an application developer uploads an application 9316 in the application developer portal 9205 and releases the application 9316 for approval, the application 9316 can be presented here on the applications page 9402. Once the submitted application 9316 has been received at the approval portal 9210, the approval portal 9210 can signal the application developer portal 9205 (see FIG. 87), which can notify the application developer through any suitable manner, such as through displaying one or more messages on the application developer portal 9205.

As part of presenting applications 9316 on the applications page 9402, information related to the submitted applications 9316 can be displayed. Examples include a brief description of the application 9316, the application developer, the category to which the application 9316 pertains, the version of the application 9316 and the date of the last update of the application 9316. Of course, not all this information is required to be presented as part of the applications page 9402, and other suitable pieces of information about an application 9316 can be shown here. Moreover, although the applications 9316 shown here are pending applications 9316 that are awaiting approval, applications 9316 that have been approved or published may be presented here, as well. In fact, the applications 9316 presented on the applications page 9402 can be tagged with status indicators and/or ratings indicators, similar to those shown in FIG. 90.

Figure 98:
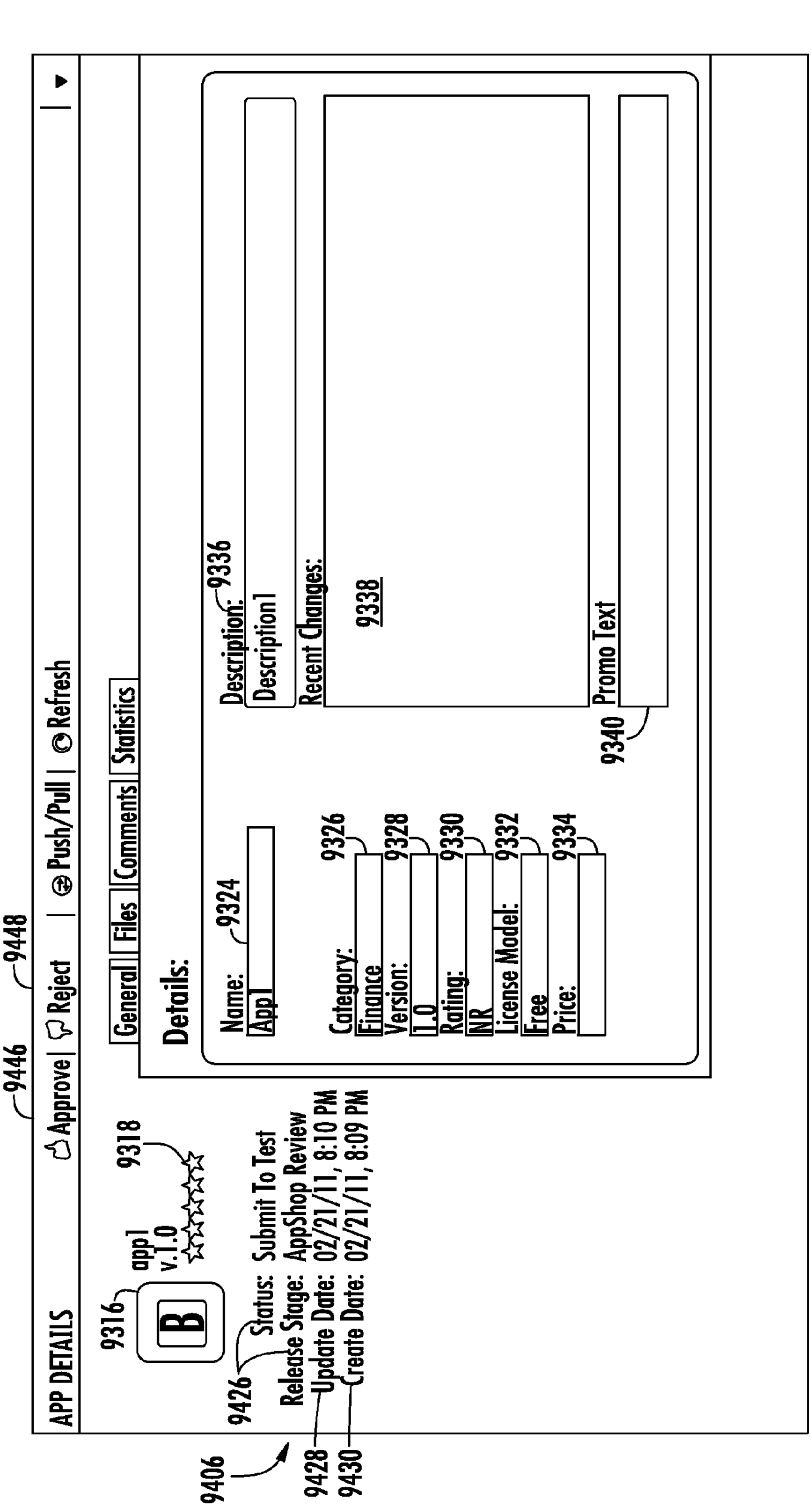
FIG. 98 illustrates an example of an application review page.

From the applications page 9402, an entity that is assigned to approve a submitted application 9316 can select one of the applications 9316. Once selected, an application review page 9406 can be presented to the entity, an example of which is shown in FIG. 98. Here, the approval portal 9210, through the application review page 9406, can provide information associated with the submitted application 9316 that has been selected.

In one arrangement, the information to be presented can be similar to that described in relation to FIG. 91. In particular, the application review page 9406 can present the application name 9324, the application category 9326, the application version 9328, the application rating 9330, the licensing model 9332, the price 9334, the description 9336, the log of edits 9338 or the promotional text 9340. As an option, the information can also include a language selection (not shown here). In addition, a status/release stage 9426, an update date 9428 (if appropriate) and a creation date 9430 can be shown for the submitted application 9316. The status/release stage 9426 can also be presented, which can indicate the stage at which the submitted application 9316 is currently situated. The rating indicator 9318 can also be presented for the submitted application 9316, if desired.

As noted earlier, this information can be based on selections made by the application developer, so corresponding information presented here on the application review page 9406 can be of similar type and content to that of FIG. 91. Of course, the application review page 9406 is not necessarily limited in this regard, as other types of information may also be included. Although in most arrangements, the entity responsible for approving the application 9316 may not alter this information (due to it normally being selected by the application developer), the interface 9400 can be configured to accommodate such a feature.

Figure 99:
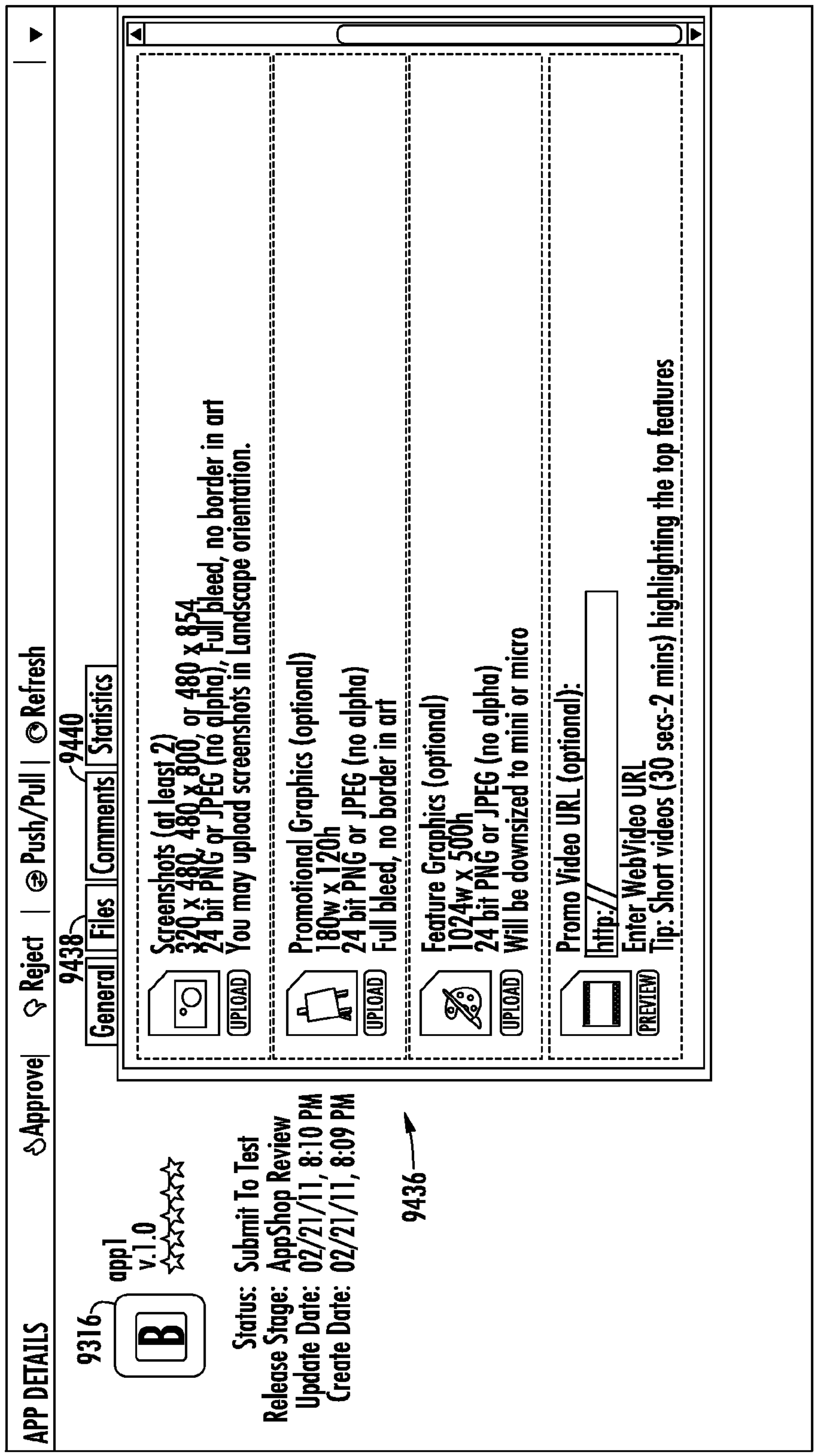
FIG. 99 illustrates an example of a files page.
Figure 100:
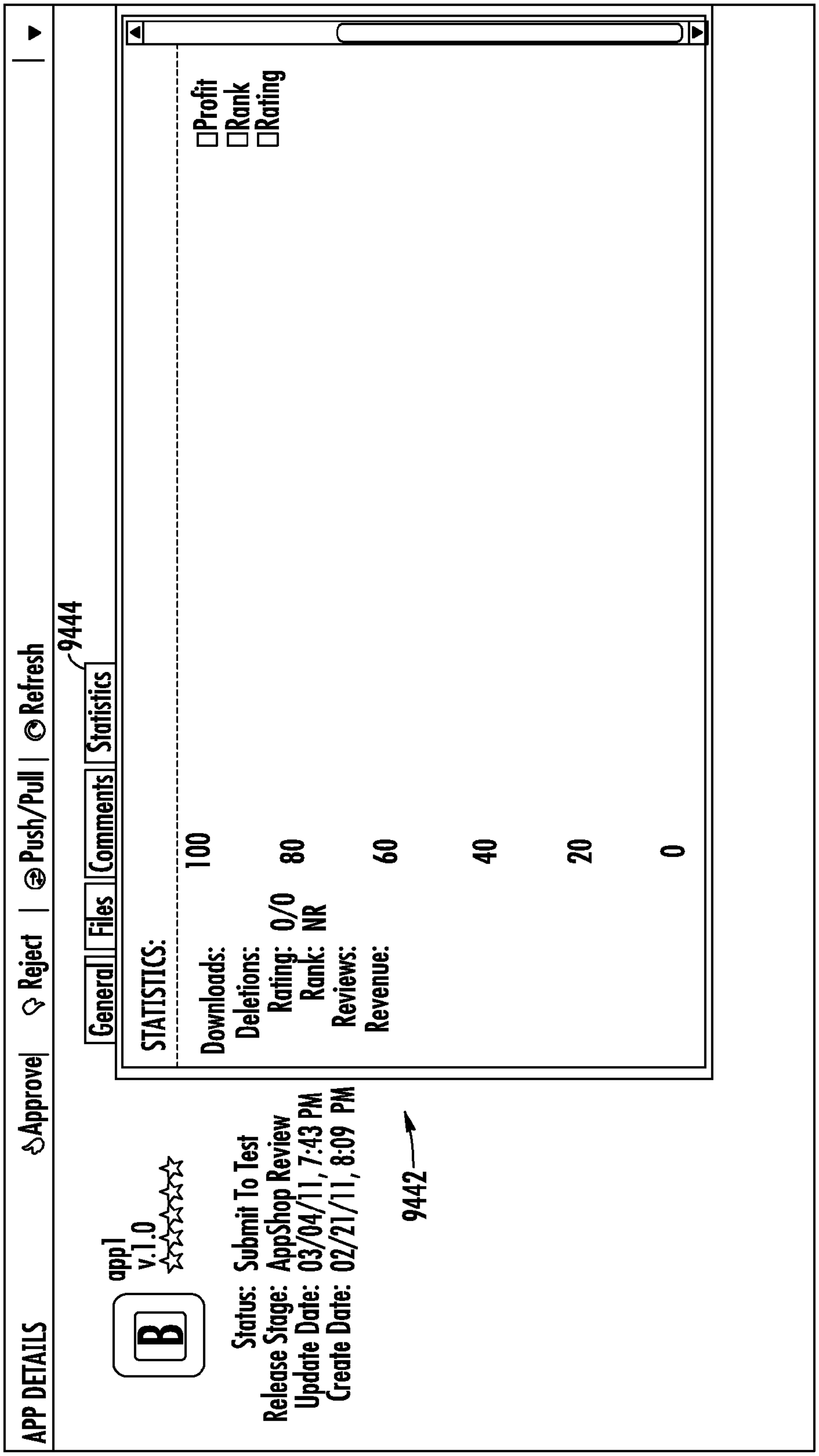
FIG. 100 illustrates an example of a statistics page.

The interface 9400 can also present a files page 9436, which can be accessed through a tab 9438. An example of the files page 9436 is shown in FIG. 99. As an example, the files that are associated with the selected application 9316 can be presented here. In addition, a comments page (not shown) can be accessed by a tab 9440, which can permit users to provide or view comments. For example, during testing, those responsible for approving the submitted application 9316 can provide their comments here, and comments from the application developer or some other suitable entity can be displayed here. A statistics page 9442 can also be part of the interface 9400, an example of which is shown in FIG. 100, and can be accessed through a tab 9444. Information presented on the statistics page 9442 can be related to, for example, the performance of the selected application 9316. In one arrangement, the elements that make up the statistics page 9442 can be similar to those described in relation to FIG. 94, although other parameters can be presented here.

The interface 9400 of the approval portal 9210 can be further configured to enable a user to approve or reject the submitted application for selective publication in one or more application repositories. For example, referring back to FIG. 98, application review page 9406 can include an approval indicator 9446 and a rejection indicator 9448. The approval indicator 9446 or the rejection indicator 9448 can also be part of the files page 9436 (see FIG. 99), the comments page and/or the statistics page 9442 (see FIG. 100). One or more entities can review, test and/or analyze the submitted application 9316 to determine whether to approve the submitted application for selective publication in an application repository. The term “selective publication,” in relation to an application repository, is defined as the actual publication of an application in an application repository such that the application is ready for download from the repository or an indication that the application is in a condition that would permit it to be published in an application repository.

As part of this process, the entity responsible for determining the suitability of the submitted application 9316 can ensure that the application 9316 meets or does not violate a set of predefined criteria. In one arrangement, the predefined criteria can be selected by an entity that is responsible for managing or overseeing an application repository in which the submitted application 9316 is to be published. Of course, other suitable entities can select the predefined criteria for approval. In addition, any suitable party can be tasked with approving or rejecting the submitted applications, examples of which will be presented later.

The predefined criteria against which the submitted applications 9316 are to be reviewed can include any suitable restriction or parameter. For example, the criteria may specify that the application 9316 cannot contain content that is not suited for children. Moreover, the criteria may forbid the collection of certain forms of data by the application 9316, like personal information related to a user or to the user’s family. The criteria may also require that the application 9316 meet certain security requirements, particularly if the application 9316 will facilitate financial transactions. These examples for the predefined criteria are not meant to be limiting, as virtually any suitable requirement can be part of the criteria. Further, the predefined criteria for a first application repository may or may not be the same for a second or more application repositories. As part of the approval process, the party responsible for approving the submitted application 9316 can also ensure that the application 9316 is in working order and that it is substantially free of programming of functional defects.

Figure 101:
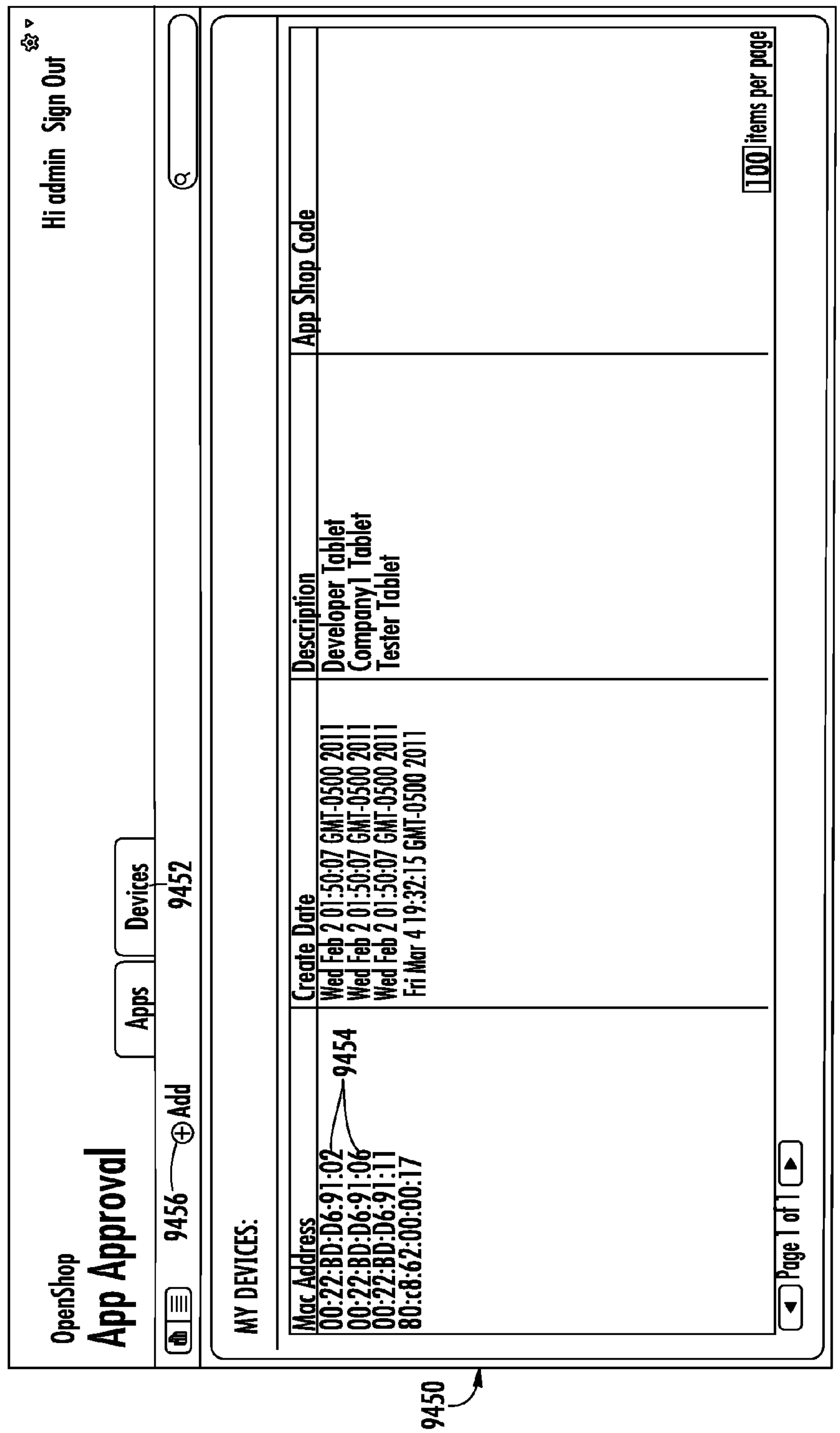
FIG. 101 illustrates an example of a testing devices page.

To facilitate the review of the submitted applications 9316, the interface 9400 can present a testing devices page 9450, an example of which is shown in FIG. 101. The testing devices page 9450 can be accessed through a tab 9452 and can present a listing of all testing devices 9454 (identified here through their MAC addresses) that can be used to test submitted applications 9316. The information presented on the testing devices page 9450 can be similar to that of the devices page 9358 of the application developer portal 9205 (see FIG. 95), although different types of information can be displayed if desired. Testing devices 9454 can be added through an addition button 9456. Moreover, selection of one of the testing devices 9454 can present information and features here that are similar to those presented in relation to FIG. 96 (including the presentation of installed applications and firmware versions on the testing devices 9454). Applications 9316 can be pushed to or pulled from the testing devices 9454 through a push/pull button 9458, which can be positioned on, for example, the application review page 9406 (see FIG. 98), the files page 9436 (see FIG. 99), the comments page and/or the statistics page 9442 (see FIG. 100).

Once the party responsible for reviewing the submitted application 9316 determines that the application 9316 meets the requirements for publication in an application repository, that party can select the approval indicator 9446, such as displayed on the application review page 9406 (see FIG. 98). The approval portal 9210 can be configured to notify the application developer portal 9205 of the approval in response to the selection of the approval indicator 9446. The application developer portal 9205 can take any appropriate steps to ensure that the application developer has been made aware of the approval. For example, the application developer portal 9205 can generate messages to be displayed or broadcast at the portal 9205 or at some other suitable component.

In addition, the approval portal 9205 can be configured to notify other computing devices of the approval of the submitted application 9316. For example, referring to FIG. 87, the approval portal 9210 can signal the administrator portal 9215 about the approval of the application 9316. As part of this process, the approval portal 9210 can also forward the approved application 9316 to the administrator portal 9215. In one arrangement, the other computing device, such as the administrator portal 9215, can be configured to notify operators of one or more application repositories of the approval of the submitted application 9316. This process can also involve the receipt of the approved application 9316 by the operators of the application repositories. This process will be explained in detail below.

If, however, the party responsible for reviewing the submitted application 9316 determines that the application 9316 fails to meet the requirements for publication, that party can select the rejection indicator 9448 (see, for example, FIG. 98). The approval portal 9210 can be configured to notify the application developer portal 9205 of the rejection in response to the selection of the rejection indicator 9448. Similar to the process described above in relation to the receipt of an approval notice, the application developer portal 9205 can take action to inform the application developer and/or any other suitable parties. As part of this feature, the notification may include rejection information that explains why the submitted application 9316 was not approved. This information can be prepared by the party that conducted the review of the application or by some other suitable party. As an example, the rejection information may specify that the submitted application 9316 contains content that is unsuitable for children or does not include certain mandatory security features. This rejection information may also provide guidance for the application developer to modify the rejected application 9316 to ensure its approval during a subsequent review. At this point, the application developer can modify or upgrade the rejected application 9316 and can submit it again in accordance with the discussion presented above.

Referring back to FIG. 87, as previously explained, the administrator portal 9215 is a system that enables the distribution of approved applications to one or more entities or components. Once it receives an approved application, from the approval portal 9210, the administrator portal 9215 can, for example, push the application to one or more of the portable computing devices 9050 (see FIG. 86) through the managed services platform 9010 (see FIG. 86) or can cause the application to be published in an application repository or to become part of a bundle.

The administrator portal 9215 may also perform one or more other processes once it receives the approved application, either in lieu of or in addition to the steps listed above. For example, the administrator portal 9215 can forward the approved application to one or more of the client portals 9220, which can serve as a notice that the application is available for publication in one or more application repositories. The client portals 9220 can, for example, make determinations as to whether to publish the approved application in an application repository. Moreover, the client portal 9220 may facilitate the availability/publication of applications for the sub-client portals 9225, such as for application repositories associated with the entities that oversee or operate the sub-client portals 9225. For example, if the client portal 9220 decides to publish the submitted application in an application repository, the client portal 9220 can forward the application to one or more of the sub-client portals 9225. At this point, the sub-client portals 9225 can determine whether to publish the application on an application repository associated with the entity overseeing or operating the sub-client portal 9225. Examples of this process will now be presented.

Figure 102:
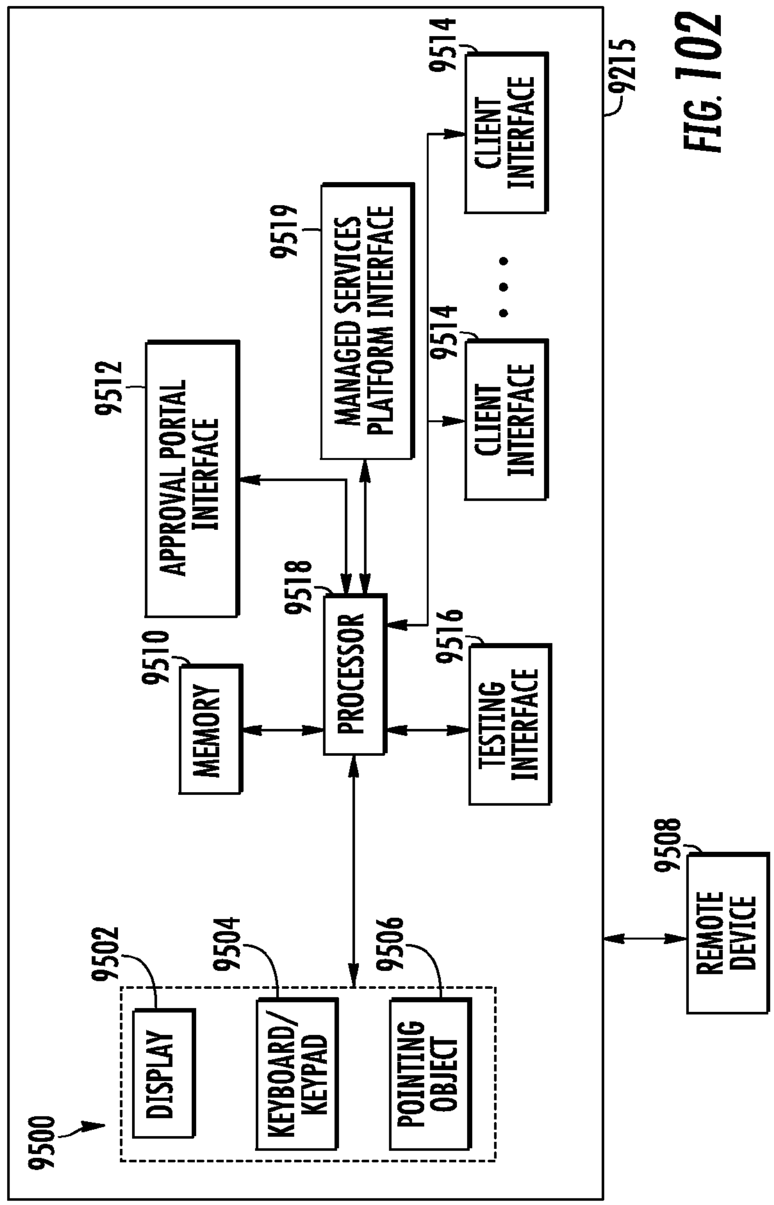
FIG. 102 illustrates a block diagram of an exemplary administrator portal.

The administrator portal 9215 (see FIG. 87) can be, for example, a managed services computing device. The portal 9215 can be made up of one or more components and can be operated by any suitable entity. A block diagram of an example of the administrator portal 9215 is shown in FIG. 102. In particular, the portal 9215 can include one or more user interface elements 9500 that can be configured to enable a user to make selections associated with the management of services for a first client and a second client. As an example, the user interface elements 9500 can include a display 9502 (which can be a touch-screen display or a conventional display), a keyboard or keypad 9504, a mouse or other pointing object 9506 or a remote device 9508 (a component or a group of components that permit a user to enter data from a remote location). In fact, any device that enables a user to enter data into an electronic device can serve as a user interface element 9500. The administrator portal 9215 can also include memory 9510, an approval portal interface 9512, one or more client portal interfaces 9514, a testing interface 9516 and a processor 9518. The portal 9215 can also have a managed services platform interface 9519.

The memory 9510 can be any combination of temporary memory and persistent memory, and the approval portal interface 9512 can be used to facilitate wired and/or wireless communications with the approval portal 9210. Similarly, the client portal interfaces 9514 and the testing interface 9516 can be used to facilitate wired and/or wireless communications with the client portals 9220 (see FIG. 87) and testing devices (not shown), respectively. The processor 9518 can be coupled to each of the components described above and can be operable to execute operations that will be described herein.

Similar to the application developer portal 9205 and the approval portal 9210, the administrator portal 9215 can present an interface that can enable a user to manage services for devices/portals associated with the administrator portal 9215. As part of this configuration, the administrator portal 9215 can be communicatively coupled with a managed services platform 9010, an example of which was previously described in relation to FIG. 86. The managed services platform interface 9519 can accommodate such communications, whether wireless and/or wired. As such, the administrator portal 9215 can communicate with a plurality of portable computing devices 9050 via the DMS server 9030. Moreover, the administrator portal 9215 can be associated with an application repository 9130 via the application server 9040. As will be described below, the administrator portal 9215 can manage portable computing devices 9050 and the application repository 9130 through this arrangement.

As noted above, the managed services system 9200 can include one or more client portals 9220 (see FIG. 87). In one arrangement, the client portals 9220 can be communicatively coupled to the administrator portal 9215. The administrator portal 9215 can have a relationship with the client portals 9220, which, as will be fleshed out below, can range from relatively low cooperation in providing applications to a more extensive managerial function.

Figure 103:
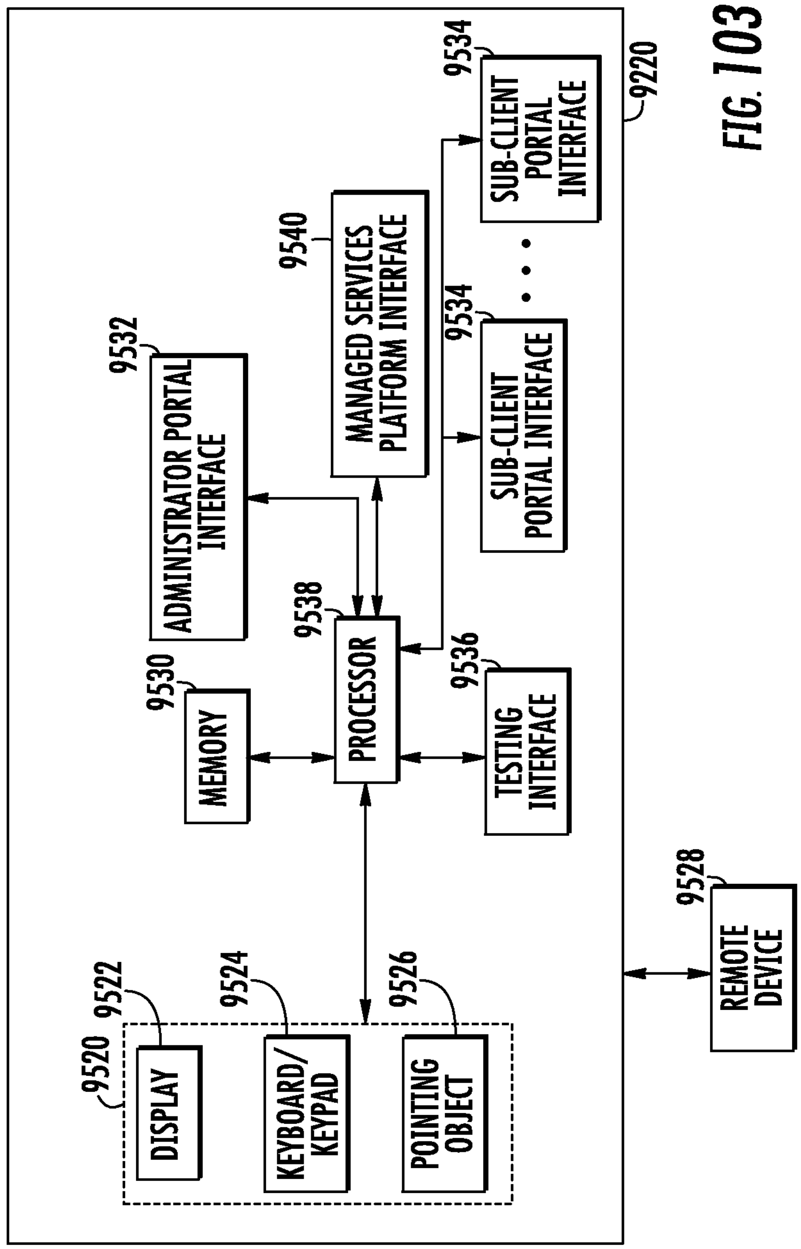
FIG. 103 illustrates a block diagram of an exemplary client portal.

An example of a block diagram of a client portal 9220 is shown in FIG. 103. The structure of the client portal 9220 can be similar to that of the administrator portal 9215, although the client portal 9220 is not so limited. In one arrangement, the client portal 9220 can include one or more user interface elements 9520 that can permit a user to make selections associated with the management of services for, for example, a first sub-client and a second sub-client. As an example, the user interface elements 9520 can include a display 9522 (touch-screen or conventional), a keyboard/keypad 9524, a pointing object 9526 or a remote device 9528. As with the administrator portal 9215, any device that enables a user to enter data into an electronic device can serve as a user interface element 9520. The client portal 9220 can also include memory 9530 (persistent and/or temporary), an administrator portal interface 9532, one or more sub-client portal interfaces 9534, a testing interface 9536 and a processor 9538. The client portal 9220 can also have a managed services platform interface 9540.

The administrator portal interface 9532 allows for wireless and/or wired communications with the administrator portal 9215, while the sub-client portal interface allows for the same with the sub-client portals 9225 (see FIG. 87). The testing interface 9536 permits wired and/or wireless communications with one or more testing devices (not shown). Also like the administrator portal 9215, the client portal 9220 can be communicatively coupled (wired and/or wireless) with a managed services platform 9010 through the managed services platform interface 9540. This arrangement allows the client portal 9220 to communicate with a plurality of portable computing devices 9050 via the DMS server 9030 and to be associated with an application repository 9130 via the AS server 9040. As such, the client portal 9220 can manage portable computing devices 9050 and the application repository 9130 through this arrangement.

As noted above, the managed services system 9200 can include one or more sub-client portals 9225 (see FIG. 87). In one arrangement, the sub-client portals 9225 can be communicatively coupled to a client portal 9220. The client portal 9220 can have a relationship with the sub-client portals 9225 in which the client portals 9220 can provide services to the sub-client portals 9225, examples of which will be presented below. This structure can also allow the administrator portal 9215 to have a relationship with a sub-client portal 9225, if desired. Examples to which the level of services the administrator portal 9215 can provide to a sub-client portal 9225 will also be presented later.

The sub-client portals 9225 can have a structure that is similar to that of the client portals 9220 presented in FIG. 103. The components can be essentially the same, which can permit the sub-client portals 9225 to communicate with a managed services platform 9010, like the client portal 9220 and the administrator portal 9215. The sub-client portal 9225, however, can include a client portal interface (not shown) to communicate with the client portal 9220. In addition, this model is scalable, meaning that additional layers can be added to the system 9200 (see FIG. 87). That is, the system 9200 can include, for example, sub-sub-clients portals (not shown), which can be communicatively coupled with a sub-client portal 9225. In this case, the sub-client portal 9225 can have a sub-sub-client portal interface (not shown) to permit wireless and/or wired communications with a sub-sub-client. In one arrangement, each successive portal in this scalable arrangement, like the sub-sub-client portal, can also communicate with portable computing devices 9050 through the DMS server 9030 and can be associated with an application repository 9130 through the AS server 9040.

Referring back to FIGS. 86 and 87, a brief overview of some of the services that the administrator portal 9215 may offer will now be presented. There are two main parts of this discussion. The first set of services offered by the administrator portal 9215 focuses on devices that are to be directly managed by the administrator portal. For example, the administrator portal 9215 may be operated by a company that has assigned portable computing devices 9050 to its employees, and the company wishes to manage these devices 9050. In one particular but non-limiting example, the company may wish to send messages to the devices 9050 or to package applications, firmware and settings for these devices 9050.

The second set of services offered by the administrator portal 9215 is directed to client portals that have established relationships with the administrator portal 9215, such as the client portals 9220, the sub-client portals 9225, the sub-sub-client portals or any subsequent client portals. For example, the administrator portal 9215 can be operated by a first company, and a client portal 9220 may be operated by a second company. The second company may wish to have the first company manage at least some services for the client portal 9220. In one particular example, the second company may request the first company, through the administrator portal 9215, to forward to it applications that it receives from the approval portal 9210 that have been approved for publication in an application repository. The second company may also ask the first company to manage portable computing devices 9050 on behalf of the second company, which can be done through the administrator portal 9215. Additional discussion/examples concerning these services will be described below. The material that immediately follows, however, is directed to the first set of services summarized above.

Figure 104:
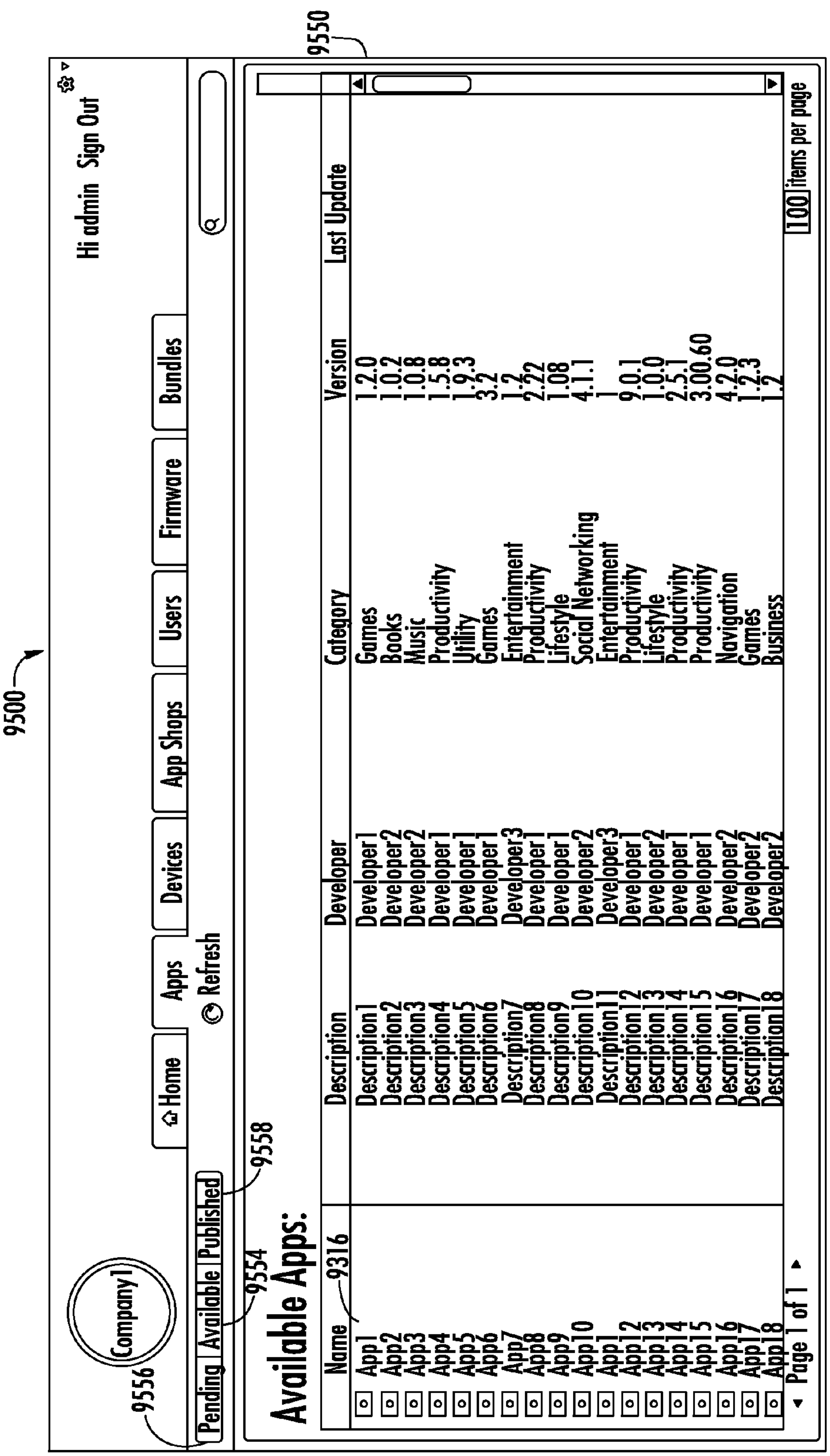
FIG. 104 illustrates an example of an applications page.

To facilitate its operation, the administrator portal 9215 can provide an interface 9500. One part of this interface 9500 is shown in FIG. 104. In particular, an example of an applications page 9550 is illustrated, which can be accessed through a tab 9552. The applications page 9550 can present one or more applications 9316 and information that is associated with the applications 9316. Examples of such information can include an application name, a short description, the application developer, the application category, the most recent version and the last date/time that the application 9316 was updated. Of course, other types of information can be presented on the applications page 9550.

In one arrangement, the applications page 9550 can present applications 9316 in one or more different states or categories. For example, a tab 9554 can be selected to show applications 9316 that have been approved by the approval portal 9210 and that have been received by the administrator portal

9215. These applications 9316 may be categorized as available applications 9316. Another tab 9556 can present applications 9316 that are currently under review at the approval portal 9210 (have not yet met an approval threshold), which may be categorized as pending applications 9316. In yet another example, a tab 9558 can present applications 9316 that have been published in an application repository. These applications 9316 can be categorized as published applications 9316.

In one arrangement, the administrator portal 9215 can be associated with a managing entity, and the managing entity can be assigned an application repository 9130 (see FIG. 87). For example, a managing entity can operate or control the administrator portal 9215 or direct another entity to operate or control the portal 9215. A managing entity can be any entity, organization, corporation or individual that is responsible for this operation or control or its direction. In addition, assigning an application repository 9130 to the managing entity can include the production of an application repository that can be configured to present applications on behalf of the managing entity. In this case, the managing entity can determine which applications are to be part of the application repository 9130 or can direct another individual or organization to make such determinations under the guidance of the managing entity or not. In one arrangement, the application repository 9130 can be designed to show that it is associated with the managing entity, such as by appropriate branding of the repository 9130.

In view of the above arrangement, the managing entity may wish to manage (or have managed) the application repository 9130 and its contents. As such, when an application 9316 has been approved by and received from the approval portal 9210, the managing entity, through the administrator portal 9215, can determine whether to publish the approved application in the application repository 9130 that is assigned to the managing entity.

Figure 105:
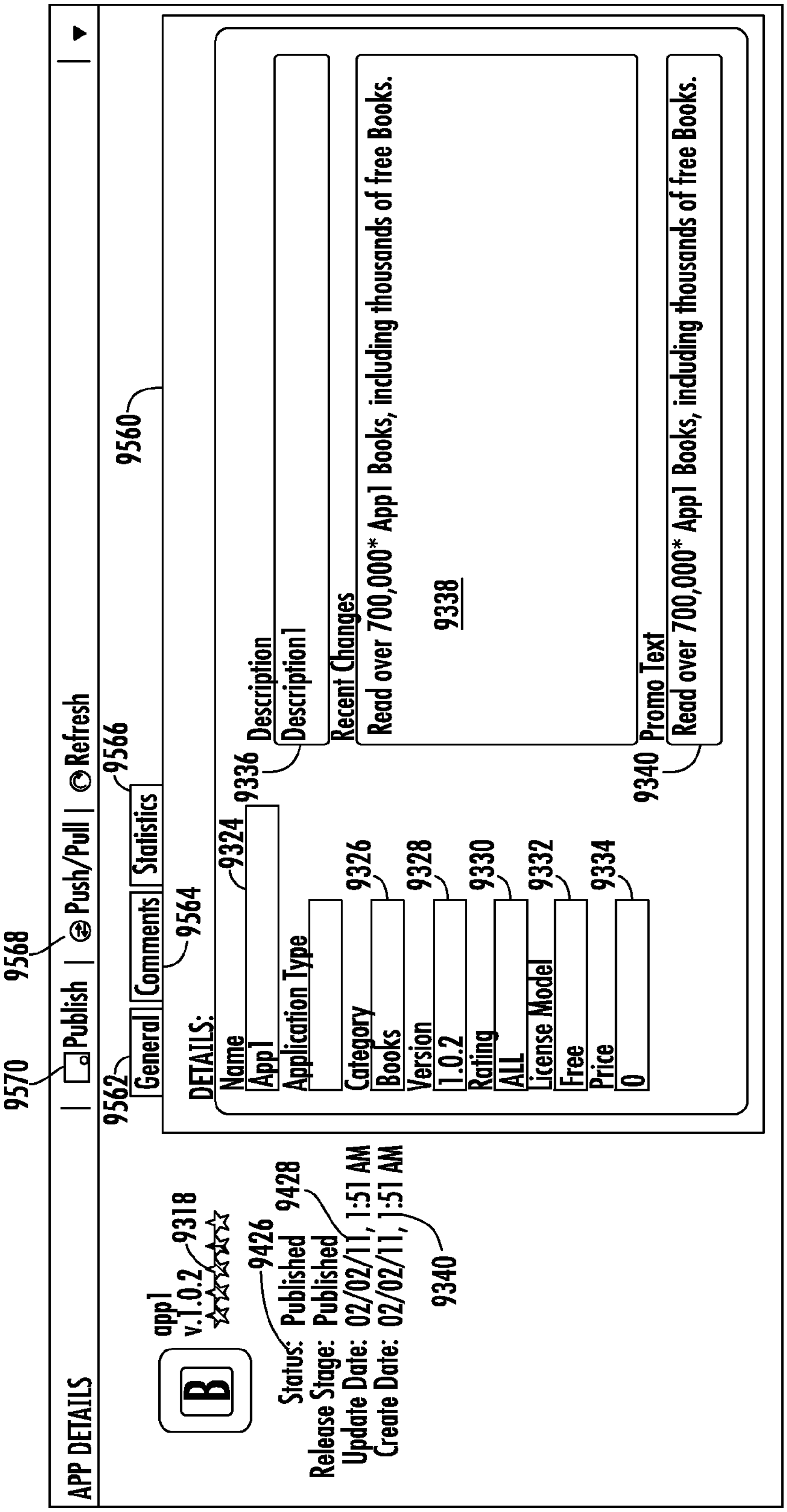
FIG. 105 illustrates an example of an application selection page.

To do so, one of the approved applications 9316 under the tab 9554 (available applications), can be selected. When selected, an application selection page 9560 can be presented, an example of which is shown in FIG. 105. Here, information about the approved application 9316 can be presented, under the tab 9562. In one arrangement, this information can be similar to that described in relation to FIG. 91. In particular, the application selection page 9560 can present the application name 9324, the application category 9326, the application version 9328, the application rating 9330, the licensing model 9332, the transactional fee or price 9334, the description 9336, the log of edits 9338 or the promotional text 9340. The information can also optionally include a language selection (not shown here). In addition, a status/release stage 9426, an update date 9428 (if appropriate) and a creation date 9430 can be shown for the submitted application 9316. The rating indicator 9318 (such as a cumulative user rating) can also be presented for the submitted application 9316, if desired. The licensing model 9332 can be selectable from one of the following arrangements: a free model; a subscription-based model; a floating model; a volume model; or a paid model. The licensing model 9332 can be selected by the application developer or some other suitable entity, including the entity responsible for the administrator portal 9215.

As noted earlier, this information can be based on selections made by the application developer at the application developer portal 9205 (see FIG. 87), so corresponding information presented here on the application selection page 9560 can be of similar type and content to that of FIG. 91. Of course, the application selection page 9560 is not necessarily limited in this regard, as other types of information may be so included. Although in some arrangements, the entity responsible for operation of the administrator portal 9215 may not alter this information (due to it normally being selected by the application developer), the interface 9500 can be configured to accommodate such a feature.

It should be noted that pending applications 9316 (tab 9556) and published applications 9316 (tab 9558) can be selected and their associated information displayed in this manner. Moreover, selection of a tab 9564 can permit the viewing of or entering of comments related to pending, available or published applications 9316, while selection of another tab 9566 can enable the viewing of or entry of statistics for such applications 9316.

In one arrangement, it may be desirable to test or otherwise evaluate applications 9316, particularly applications 9316 that are available. To do so, an application 9316 can be, for example, pushed to or pulled from one or more testing devices (not shown). These testing devices may be associated with an entity that is responsible for operating or managing the administrator portal 9215, such as the managing entity.

As an example, if an available application 9316 has been chosen and the user wishes to push the application 9316 to a testing device, the user can do so by selecting a push/pull feature 9568. Such a process can enable an entity to evaluate on a testing device the suitability of an application 9316 for publication in an application repository 9130. The criteria for determining this suitability can be similar to that described earlier in relation to the approval portal 9210, although different parameters or values may be considered during this evaluation. Such a review, also, does not necessarily have to be as extensive as that carried out at the approval portal 9210.

If it is determined that the available application 9316 is suitable for publication in the application repository 9130, then the entity operating the administrator portal 9215 can take steps to cause the publication of the application 9316 in the repository 9130. For example, the entity can activate a publication feature 9570 to cause the available application 9316 to be published in the relevant application repository 9130. In one arrangement, this application repository 9130 can be assigned to or associated with a managing entity that is responsible for operating the administrator portal 9215. Once the application 9316 is published, anyone with access to the application repository 9130 can install the application 9316 on one or more portable computing devices 9050. This installation can also occur on an automatic basis, under the direction of the managing entity. Moreover, the application 9316 can be published in other application repositories 9130, including repositories 9130 that are assigned to or are associated with entities other than the managing entity. Also following publication, the application 9316 can be shown as a published application 9316 on the applications page 9550 (see FIG. 104).

In summary, a managing entity can operate the administrator portal 9215 and can have an application repository 9130 assigned to the managing entity. The administrator portal 9215 can receive applications 9316 that have been submitted at the application developer portal 9205 and approved at the approval portal 9210. To help populate the application repository 9130, the managing entity, through the administrator portal 9215, can cause the publication of the applications 9316 in the repository 9130. In one arrangement, the managing entity can be responsible for the administrator portal 9215 and can oversee the operation of the application developer portal 9205 and the approval portal 9210. It is understood, however, that the arrangements described herein are not so limited. Other suitable entities (including a single party or multiple parties) can operate or be responsible for the application developer portal 9205, the approval portal 9210, the administrator portal 9215 or any combination of the three.

Figure 106:
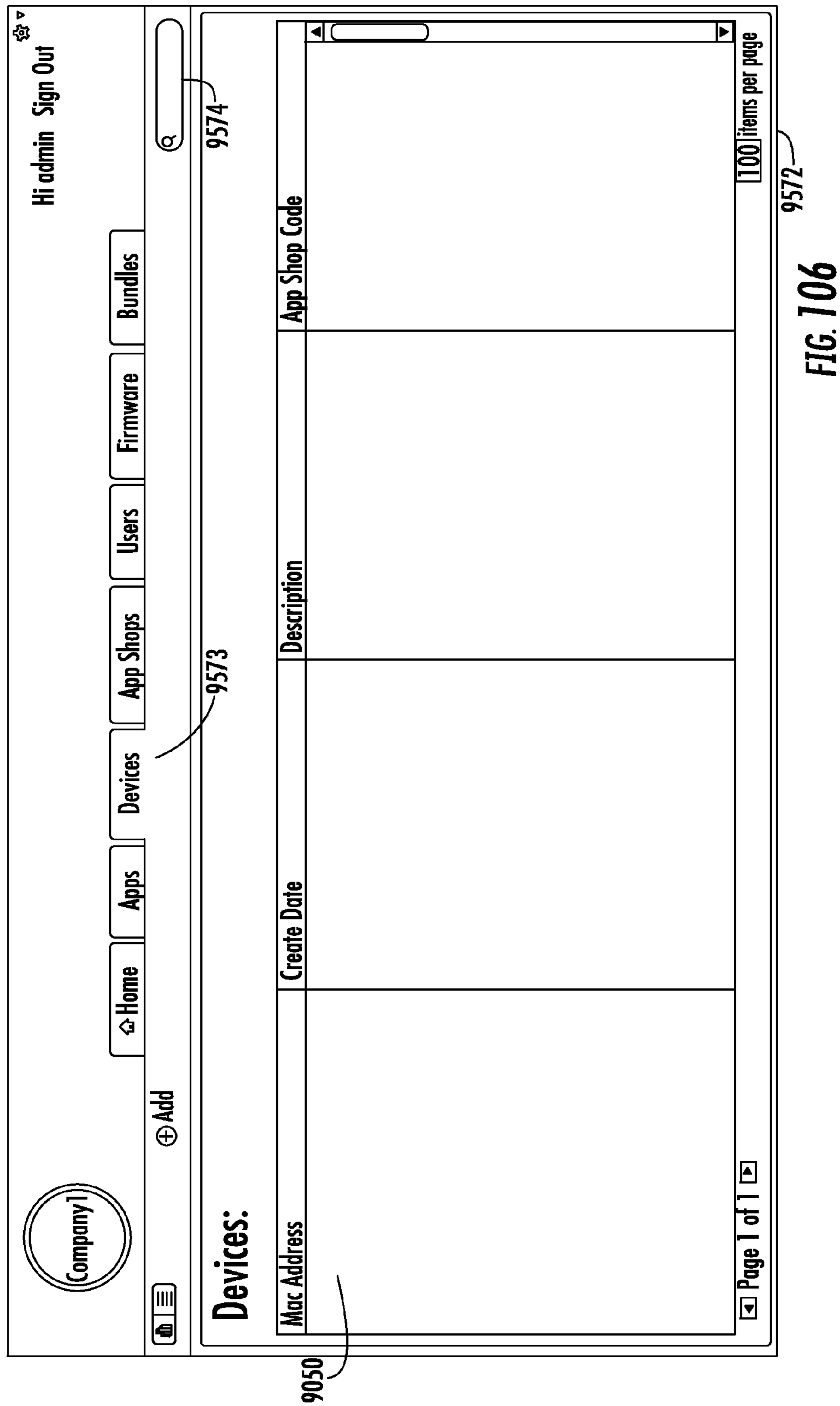
FIG. 106 illustrates an example of a devices page.

The interface 9500 of the administrator portal 9215 also can enable the management of devices, such as portable computing devices 9050. For example, referring to FIG. 106, an example of a devices page 9572 is shown, which can be accessed by a tab 9573. Here, individual portable computing devices 9050 that are associated with the administrator portal 9215 can be displayed and managed. For example, the managing entity may be responsible for operating the administrator portal 9215 and may have assigned portable computing devices 9050 to multiple individuals. In one embodiment, once a portable computing device 9050 registers with the managed services platform 9010 (see FIG. 86), the device 9050 can be listed on the devices page 9572. As such, information about these devices 9050 can be presented here. Information about testing devices for evaluating applications 9316 may also be shown here. At least in this context, reference to a portable computing device 9050 may also refer to a testing device such that all the features and description here may apply to both.

In one arrangement, information associated with the portable computing devices 9050 and displayed on the devices page 9572 can include MAC addresses, creation dates (when the device 9050 was registered with the DMS server 9030 or the administrator portal 9215, for example), a description of the devices 9050 and an application repository code. As an example, the description of a portable computing device 9050 can include a description of the performance function associated with the device 9050. As another example, the application repository code can provide an indication as to which application repository the portable computing device 9050 is associated. That is, when the portable computing device 9050 registers with the DMS server 9030 and the AS server 9040, a code that identifies the application repository 9130 that is supported by the AS server 9040 can be registered with the device 9050. This application repository code can then be presented here at the devices page 9572 or on some other suitable component.

As noted earlier, the administrator portal 9215 may be operated or managed by a managing entity. This managing entity may also assign multiple portable computing devices 9050 to numerous individuals, and these individuals may be associated with the managing entity in some way. For example, the individuals may be employees or customers of the managing entity. As such, there may be many portable computing devices 9050 listed on the devices page 9572. To simplify the task of locating or managing a particular portable computing device 9050, the devices page 9572 can be equipped with a searching module 9574, which can be configured to enable the portable computing devices 9050 to be searched individually. Those skilled in the art will appreciate that there are numerous suitable parameters that can be used to search for individual devices 9050, such as MAC addresses or user-friendly monikers.

Figure 107:
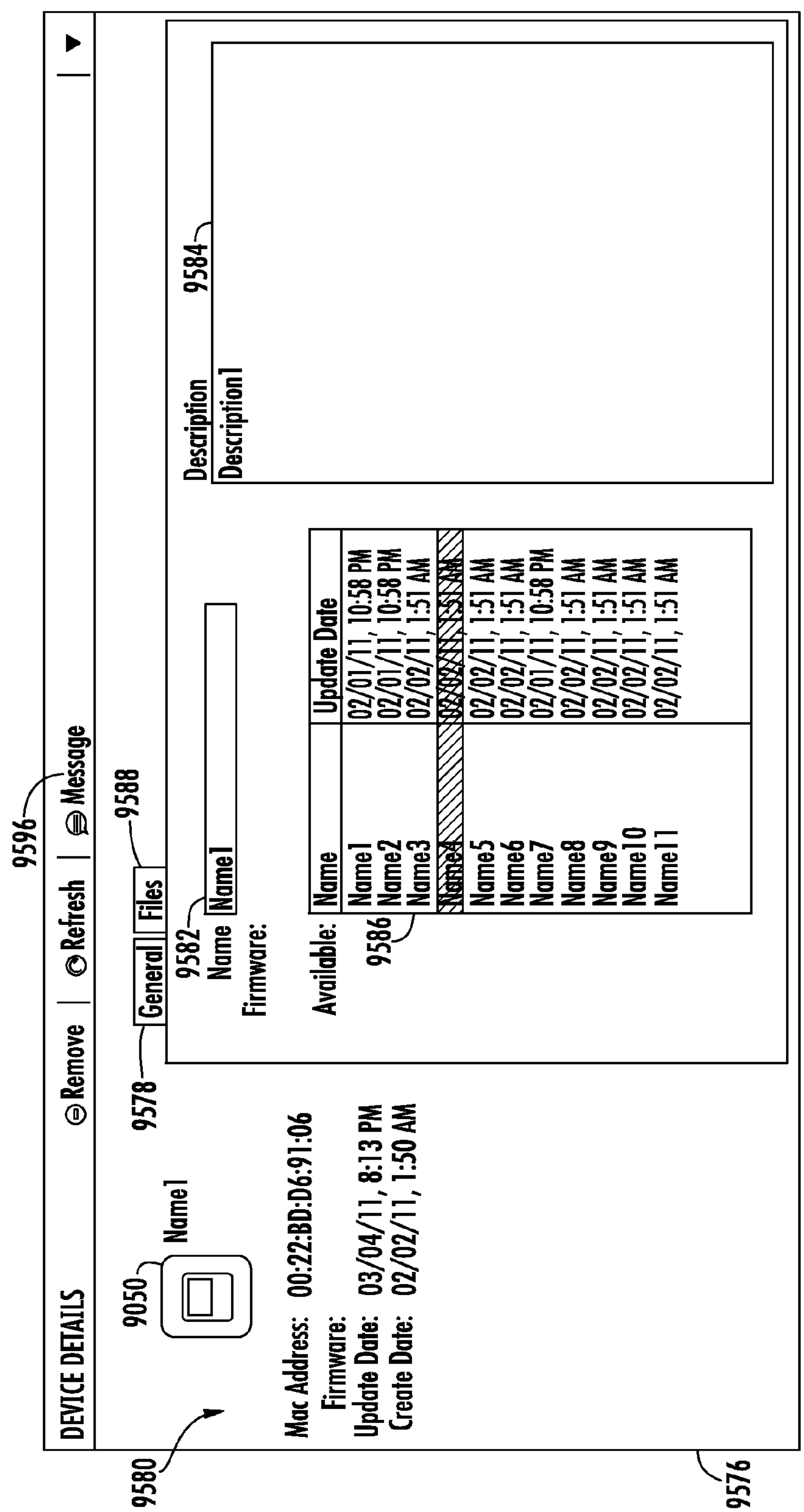
FIG. 107 illustrates an example of a device details page.

Once an individual portable computing device 9050 is identified, a user can select the identified device(s) 9050. In response, a device details page 9576 can be presented, an example of which is shown in FIG. 107. Here, additional details about the selected portable computing device 9050 can be shown by clicking a tab 9578. For example, operational information 9580 for the selected device 9050 can be presented, examples of which can include the MAC address, the firmware currently installed on the device 9050, the last date time that the device 9050 was updated (this can refer to any suitable type of update) and the date the device 9050 was added to the devices page 9572.

A general name 9582 and description 9584 of the portable computing device 9050 may also be shown. The description 9584 can provide details that illustrate the purpose of the portable computing device 9050 or the individual to whom the device 9050 is assigned. In one arrangement, a listing 9586 of available firmware that can be delivered to the device 9050 can also be presented here. As explained earlier, the portable computing devices 9050 can be flashed with various types of firmware to set or alter the look and feel of the devices 9050. The device 9050 can be flashed with a particular firmware simply be selecting one of the firmware version in the listing 9586. As such, a portable computing device 9050 can have content, such as firmware or even settings, delivered to the device 9050 on an individual basis.

Figure 108:
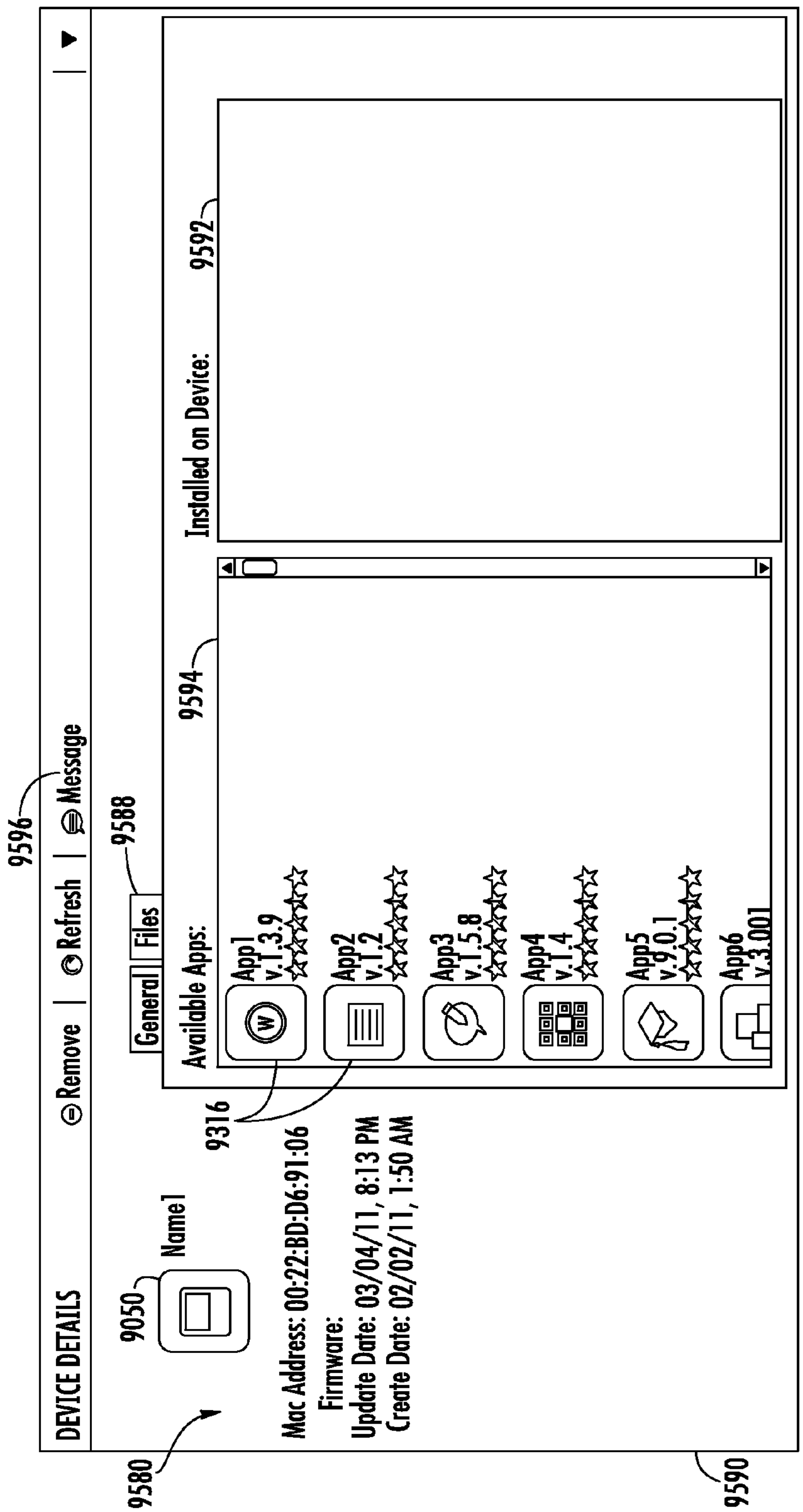
FIG. 108 illustrates an example of a device application page.

Selection of a tab 9588 can cause the presentation of a device application page 9590, an example of which is shown in FIG. 108. Here, the operational information 9580 of the selected portable computing device 9050 can be shown, if desired. The primary purpose of the application page 9590, however, is to present the applications 9316 that are installed on the selected portable computing device 9050. The applications 9316 that are installed on the device 9050 can be listed in an installation list 9592. In addition, applications 9316 that are available to be installed on the selected portable computing device 9050 can be presented in an available list 9594. As an example, the applications 9316 in the available list 9594 can be applications 9316 that have been published in one or more application repositories 9130 or have been approved for publication in at least one application repository 9130. Such application repositories 9130 may or may not be assigned to the managing entity responsible for operating the administrator portal 9215.

The applications 9316 in either the installed list 9592 or the available list 9594 may be individual applications or may be grouped together as part of a bundle. Moreover, certain information about the applications 9316 in either list 9592, 9594 can be presented, such as the rating indicator 9318. In addition, selection of one of the applications 9316 in either list 9592, 9594 can enable one to view additional information about the selected application 9316, in accordance with previous descriptions.

In one arrangement, the applications 9316 that are in the available list 9594 can be installed on a portable computing device 9050. In this section, because the devices page 9572 is generally designed for interaction with portable computing devices 9050 on an individual basis, the available applications 9316 can be installed on a single portable computing device 9050. For example, a user can simply select and drag an application 9316 from the available list 9594 to the installation list 9592. Any suitable number of applications 9316 can be installed on a selected portable computing device 9050 in accordance with this manner. In addition, one or more predefined bundles or groups of applications 9316 can be pushed to a selected portable computing device 9316 by simply selecting such a bundle or group and dragging to the installation list 9592.

As an additional feature, any number of application 9316 or groups or bundles of applications 9316 can be removed from a selected portable computing device 9050 (an individual basis). This process can be accomplished by selecting and dragging the application(s) 9316 from the installation list 9592 to the available list 9594. Of course, other suitable procedures can be followed to install applications 9316 on the device 9050 or to remove applications 9316 from the device 9050. For example, a message can be sent to the device 9050 requesting that the user of the device 9050 add/remove the relevant application 9316. As another example, a message can be sent to another entity requesting that entity to execute the installation/removal process.

In one arrangement, the device details page 9576, the device application page 9590 or both can offer a messaging feature 9596 to enable messages to be sent to portable computing devices 9050, such as on an individual basis. For example, a message feature 9596 can be activated on either the details page 9576 or the application page 9590, which can enable one to generate a message to be sent to the selected portable computing device 9050. The message can be simply text-based or can incorporate any combination of icons, animations, audio, video, haptics, etc. Moreover, the messages can be of an ad hoc nature or can be selected from a list of predefined messages. The messages can also be generated and sent to the device 9050 on an automatic basis based on an event or can be done so if an entity believes that the generation and transmission of a message is warranted.

Figure 109:
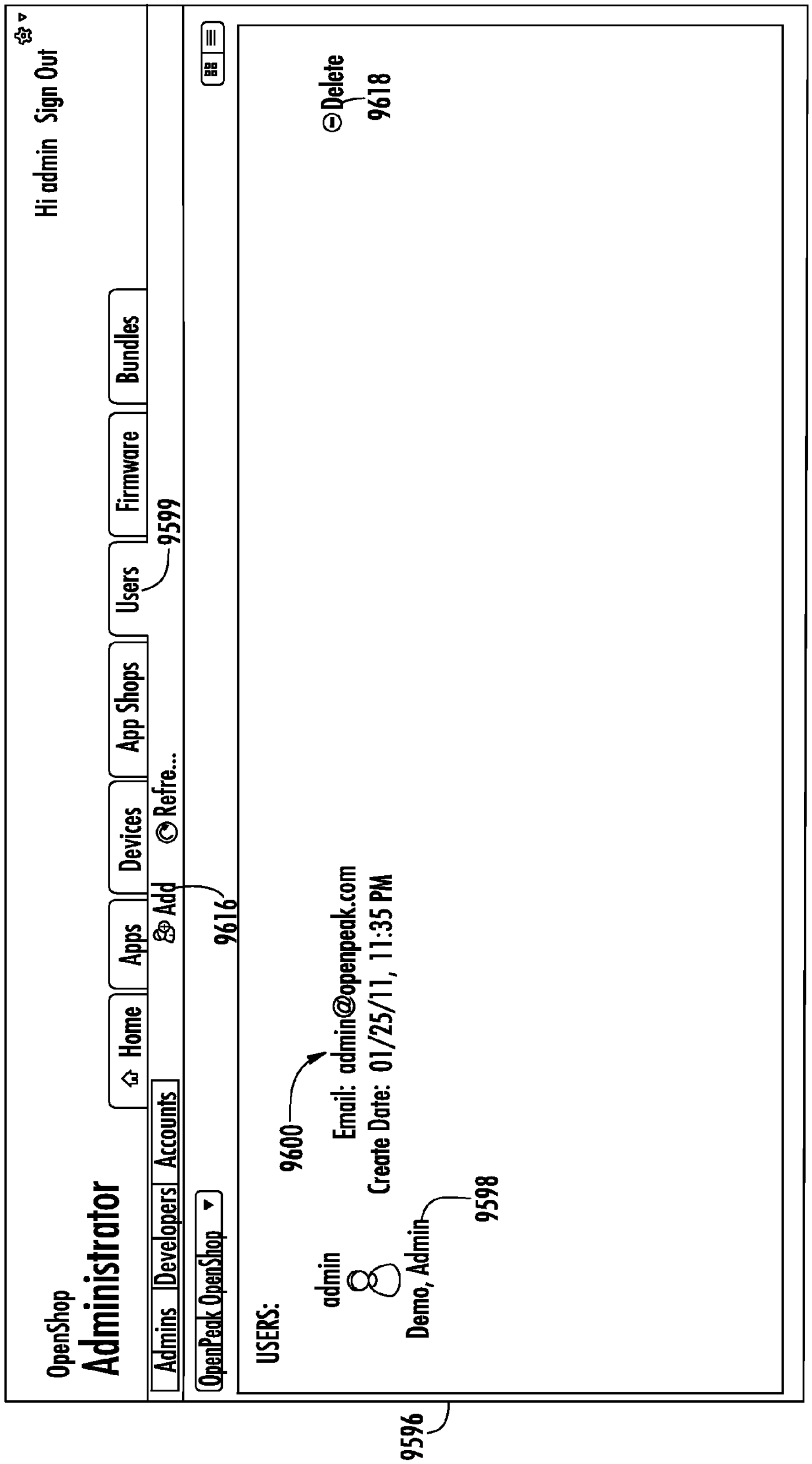
FIG. 109 illustrates an example of a users page that can present one or more user identifications.

The interface 9500 can also provide information related to one or more users, as shown in FIG. 109. For example, a users page 9596 can present one or more user identifications 9598 and can be accessed by selecting a tab 9599. In one arrangement, the user identifications 9598 can be associated with the portable computing devices 9050. As a more specific example, the administrator portal 9215 and one or more portable computing devices 9050 can be associated with the managing entity. The user identifications 9598 can be associated with these devices 9050; thus, the user identifications 9598 can be associated with the managing entity. For example, the user identifications 9598 may represent employees, contractors, vendors or other personnel associated with the managing entity. As such, the portable computing devices 9050 that are associated with the managing entity can include devices 9050 that are assigned to an application repository 9130 of the managing entity, devices 9050 that are assigned to application developers who develop applications for the application repository 9130 of the managing entity and devices 9050 that are assigned to testing personnel. Of course, the users page 9598 is not so limited, as user identifications 9598 associated with other personnel or entities may be presented here. As will be explained later, the administrator portal 9215 is further operable to enable access control to at least some of the portable computing devices 9050 that are associated with the user identifications 9598.

Figure 110:
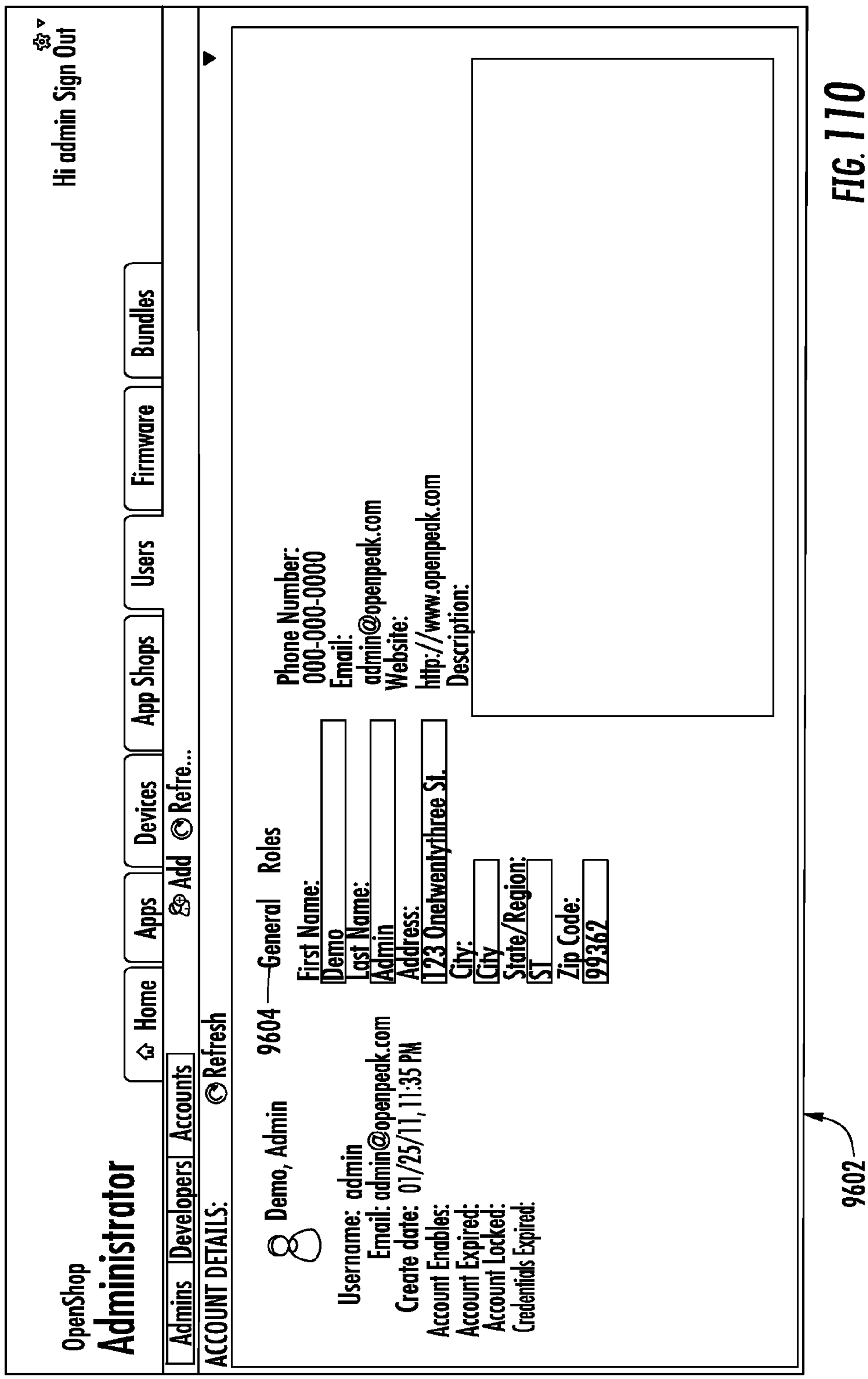
FIG. 110 illustrates an example of an information page.

In one arrangement, the user identification 9598 on the users page 9596 can display general information 9600 about the user. Examples include contact information, MAC address of the device 9050 assigned to the user and/or the date the user identification 9598 was added to the user page 9596. Additional information about the user can be accessed by selecting the user identification 9598. For example, an information page 9602 can be presented, an example of which is shown in FIG. 110. The information page 9602 can be accessed by selecting a tab 9604.

Virtually any type of information associated with the user identification 9598 can be presented on the information page 9602. Non-limiting examples include the name or title of the user, the user's address, the user's contact information, a Web site associated with the user and a description of any relevant characteristic of the user, such as the job function of the user. Account information relating to the user, such as whether the user's account is enabled, expired or locked can also be presented. The status of any credentials assigned to the user can also be shown here. Of course, one skilled in the art will appreciate that other forms of information can be part of this presentation, and the preceding examples are certainly not meant to be limiting.

Figure 111:
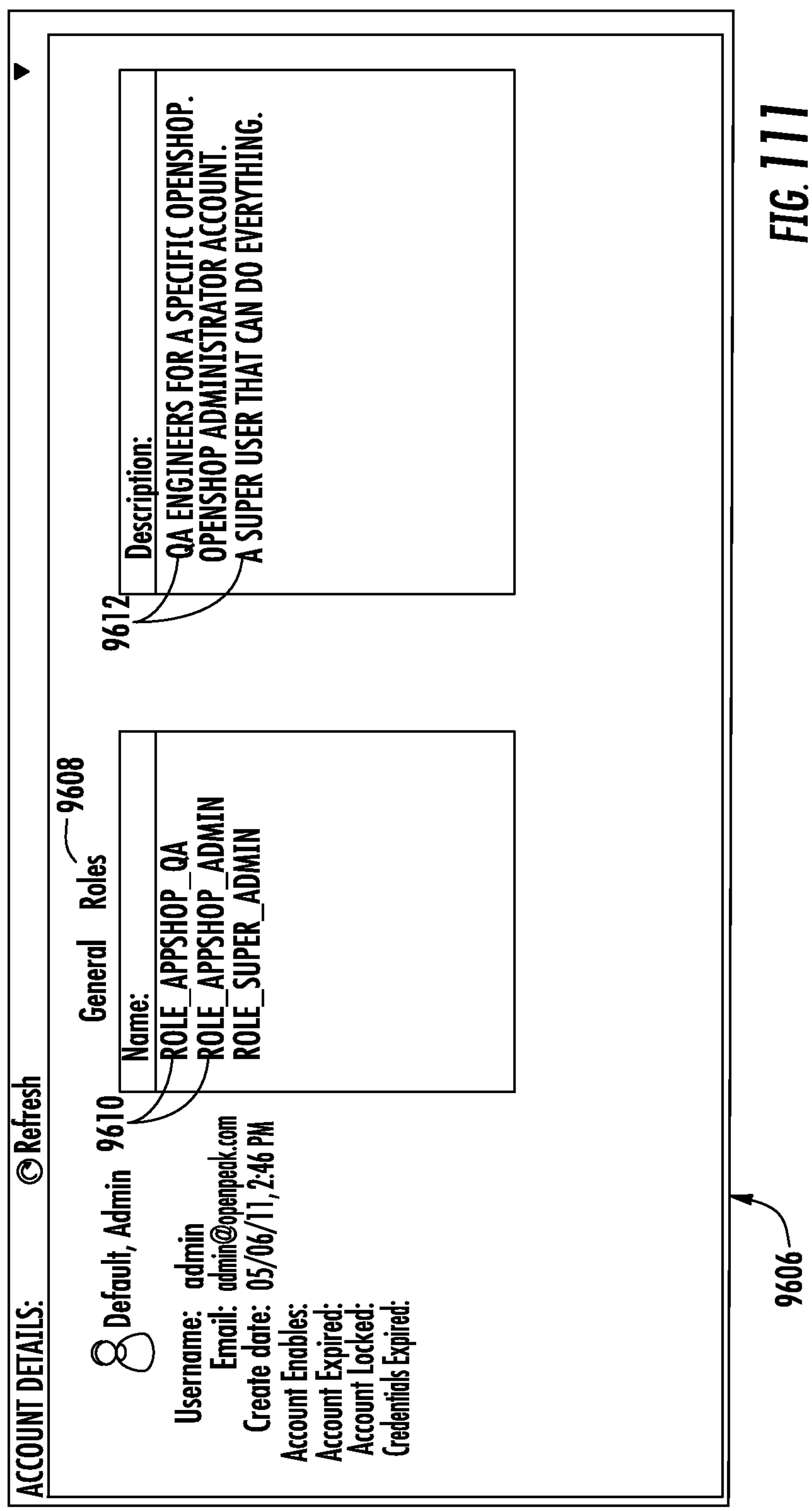
FIG. 111 illustrates an example of a roles page.

In addition, a roles page 9606 can be accessed by selecting a tab 9608, as shown in FIG. 111. Here, one or more roles 9610 that are associated with a user identification 9598 can be presented. A role 9610 can be, for example, a job function, a security clearance or some other feature associated with a user. In one particular example, a role 9610 can signify that a particular user, identified by a certain user identification 9598, is assigned a job function of maintaining the operation of the administrator portal 9215. A description 9612 can provide a user-friendly explanation of the corresponding role 9610.

Referring back to FIG. 109, as noted earlier, the users page 9596 can present, among other things, one or more user identifications 9598. In the example presented above, the user identifications 9598 presented on the users page 9596 may be associated with a managing entity that oversees the operation of the administrator portal 9215. To be clear, the users associated with the user identifications 9598 may serve various roles under the managing entity. As such, these users can be grouped in one of several possible categories to make the management of the user identifications 9598 easier. For example, the categories can be created based on certain job functions performed by the users. Categories may also be created for vendors or contractors, including the application developers and users responsible for reviewing and approving submitted applications. To access such categories, one of several tabs 9614 can be selected. Moreover, a search function (not shown) can be incorporated into the users page 9596 or some other suitable interface to enable searching of the user identifications 9598. User identifications 9598 can be added through an addition feature 9616 or deleted by a deletion feature 9618. Some of the information presented herein may be the same for different users, particularly if such users share a single portable computing device 9050.

Figure 112:
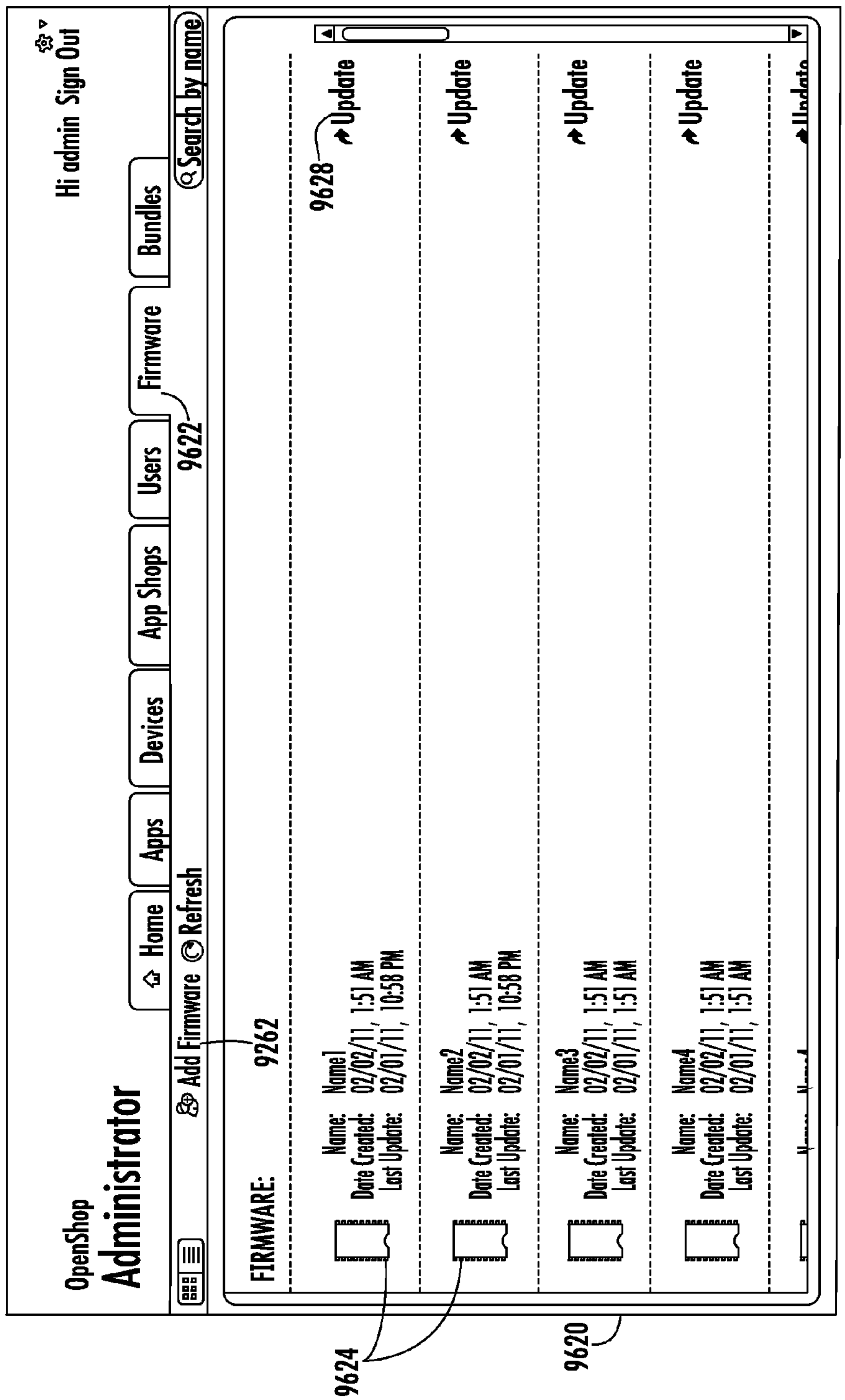
FIG. 112 illustrates an example of a firmware page.

As previously explained, firmware or other software packages can be made available to one or more portable computing devices 9050, such as through the managed services platform 9010. Moreover, such a package can be selected at the administrator portal 9215 for delivery to a portable computing device 9050 by making selections at the device details page 9576 (see FIG. 107). To facilitate this feature, the interface 9500 can include a firmware page 9620, which can be accessed through a tab 9622. An example of the firmware page 9620 is shown in FIG. 112. As an example, the firmware page 9620 can present one or more different firmware packages 9624. A firmware package 9624 is not necessarily limited to firmware, as other forms of software, operational settings and parameters may be part of a firmware package 9624.

As also explained earlier, the receipt of a firmware package 9624 at a portable computing device 9050 can cause the device 9050 to incorporate a certain look and feel associated with that firmware package 9624. For example, the managing entity may wish to assign such devices 9050 to its employees, and the managing entity, through the administrator portal 9215, can direct a particular firmware package 9624 to these devices 9050. This firmware package 9624 can be configured to cause the devices 9050 that receive the package 9624 to, for example, display user interface elements that are associated with the managing entity. The managing entity can develop the firmware package 9624 on its own or can direct another party to do so on the managing entity's behalf. It is understood, however, that the firmware package 9624 associated with the managing entity can be delivered to portable computing devices 9050 that are not necessarily associated with or assigned by the managing entity. Moreover, the firmware packages 9624 presented on the firmware page 9620 are not necessarily limited to the managing entity that operates the administrator portal 9215, as the firmware page 9620 can receive packages 9624 from any suitable party.

As part of the presentation of the firmware packages 9624, the firmware page 9620 can provide information about such packages 9624. Non-limiting examples include the entity to which a firmware package 9624 is associated, the date the package 9624 was created and the date that the package 9624 was last updated. Moreover, an addition feature 9626 can be provided as part of the firmware page 9620, which can allow firmware packages 9624 to be uploaded to the administrator portal 9215. The firmware packages 9624 can also be updated by activating an update feature 9628. When a firmware package 9624 is updated, the administrator portal 9215 can generate a notification. This notification can inform a user or another entity that such an update is available for a particular firmware package 9624. Steps can then be taken to ensure that the relevant portable computing devices 9050 or other components receive the update.

In one arrangement, the firmware page 9620 can provide a search feature 9630, which can permit a user to search for particular firmware packages 9624. In another arrangement, the system 9200 (see FIG. 87) can be configured to enable firmware packages 9624 to be submitted, approved and delivered to portable computing devices 9050, similar to the process described with respect to the publication of applications 9316. Additional details concerning this feature will be presented below.

Figure 113:
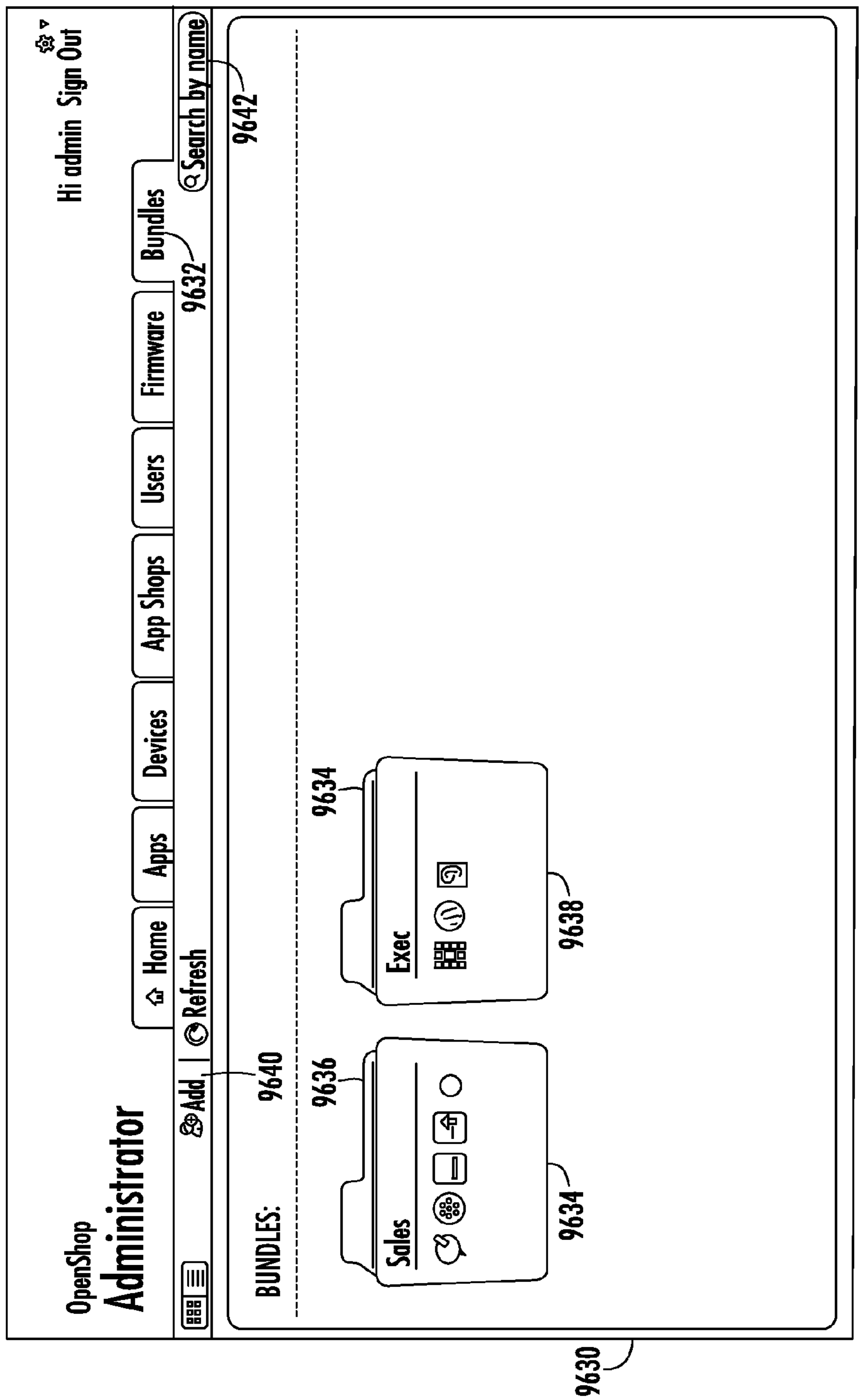
FIG. 113 illustrates an example of a bundles page.

The concept of providing bundles to one or more portable computing devices 9050 was previously described. For example, a bundle may contain content that at least includes one or more configuration settings (including firmware packages) or messages, an application set that contains one or more predefined applications or both. To accommodate this feature, the interface 9500 can provide a bundles page 9630, which can be accessed by a tab 9632. An example of a bundles page 9630 is shown in FIG. 113. In one arrangement, the bundles page 9630 can present one or more bundles 9634, and the bundles 9634 may contain similar or dissimilar content in comparison to one another.

In one particular example, the bundles may be designed for portable computing devices 9050 that are associated with an entity that is managing the administrator portal 9215 or directing another party to manage the portal 9215. That is, the bundles 9634 may be designed for and assigned to portable computing devices 9050 that are associated with the managing entity. As noted earlier, there may be individuals, like employees, contractors, vendors, etc., who are associated with the managing entity and who have been assigned a portable computing device 9050. These individuals may have one or more performance functions based on their relationship with the managing entity. For example, the managing entity may have assigned portable computing devices 9050 to members of a sales team of the managing entity and to executives of the managing entity. Examples of a sales team bundle or sales bundle 9636 and an executive team bundle or executive bundle 9638 are shown in FIG. 113.

In view of the performance functions of the individuals associated with the managing entity, the bundles 9634 can be assigned to one or more performance functions, and the bundles can contain information that is based on their assigned performance functions. In addition, the information contained in the bundles can include one or more configuration settings, one or more applications or both, and the configuration settings and the applications can be arranged based on the assigned performance functions. For example, consider the sales team associated with the managing entity. The managing entity can develop or instruct another party to develop bundles 9634 that are geared towards the performance function of the members of the sales team, i.e., sales. As an example, the settings and applications in the bundle 9634 can be selected based on their ability to assist a member of the sales team in his/her duties. This process can lead to the creation of the sales bundle 9636. The executive bundle 9638 can be created in a similar manner.

The bundles 9634 can be created by any suitable party. As an example, the managing entity can generate the bundles 9634 for the portable computing devices 9050 that are associated with the managing entity. Alternatively, the managing entity can direct another party to prepare the bundles 9634, with the managing entity providing at least some input, for the portable computing devices 9050. Any suitable criteria can be used to determine the type of content that is to be part of a bundle 9634, such as employee or management feedback and input from consultants or the manufacturer(s) of the portable computing devices 9050. In one arrangement, the applications that are part of the bundle 9634 can be selected from the application repository 9130 associated with the managing entity or an application repository 9130 associated with any other suitable party.

Because the bundles 9634 can be created based on different performance functions, it is anticipated that the content may be different for various bundles 9634. Some bundles 9634, however, may contain identical or at least similar content, even if they are designed for different performance functions. Moreover, one or more bundles 9634 or even each bundle 9634 may contain one or more default items or settings that are to be deployed to each associated portable computing device 9050. Default items or settings may also apply across particular team bundles 9634. For example, the managing entity may wish that a particular application be installed on each portable computing device 9050 associated with the managing entity or on every portable computing device 9050 that is assigned to members of a sales team that is associated with the managing entity. In fact, bundles 9634 that only contain default items or settings can be created for delivery to all or a portion of relevant portable computing devices 9050.

Once a bundle 9634 is created, the bundle 9634 can be added to the bundles pages 960, such as by selection of an addition feature 9640. These bundles 9634 can be selectively distributed to the relevant portable computing devices 9050 through the managed services platform 9010 (see FIG. 86 and related discussion). In another arrangement, a search feature 9642 can be incorporated into the bundles page 9630 to search for a particular bundle 9634.

Figure 114:
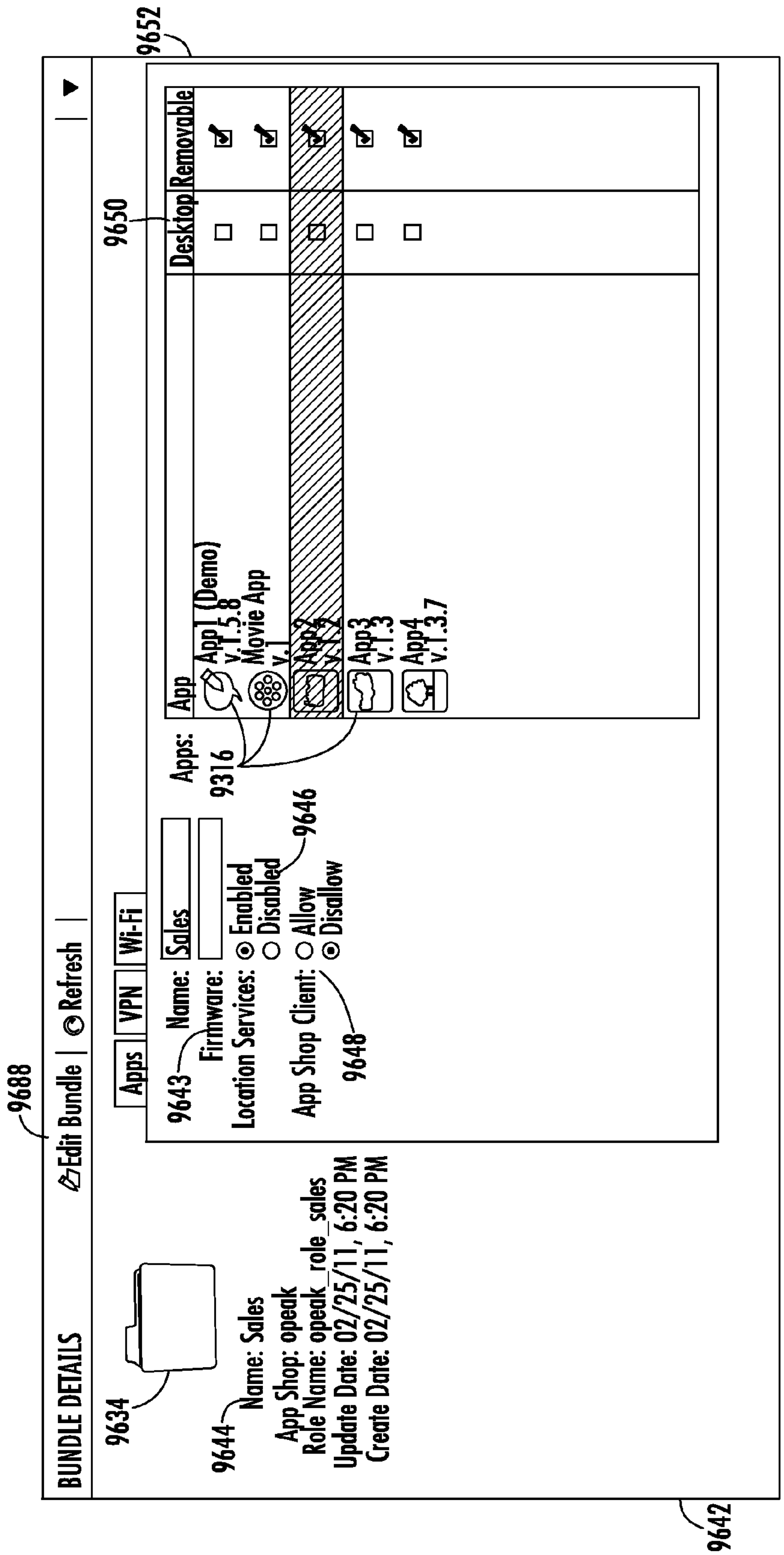
FIG. 114 illustrates an example of a bundle application page.

Similar to processes described above, additional information about a particular bundle 9634 can be gleaned by selecting the bundle 9634 from the bundles page 9630. In addition, the content of a bundle 9634 can be edited. For example, the configuration settings or the applications in a bundle 9634 may be modified. To facilitate these features, a bundle application page 9642 can be presented as part of the interface 9500. This page 9642 can be accessed by selecting a tab 9644, and an example of the page 9642 is shown in FIG. 114.

In one embodiment, general information 9644 that is associated with the selected bundle 9634 can be presented on the bundle application page 9642. The general information 9644 can be metadata about the bundle 9634. Examples of the general information 9644 can include the name of the bundle 9634, the application repository 9130 to which the bundle 9634 is assigned (or to be assigned), a role name (which can give an indication as to the performance function related to the bundle 9634), an update date (last time the bundle 9634 was updated) and/or the creation date of the bundle 9634.

Additional metadata about the bundle 9634 that can be part of the bundle application page 9642 can include a firmware package 9643 that is assigned to the bundle 9634, whether location services 9646 are enabled for the bundle 9634 and whether an application repository permission 9648 is allowed. Location services 9646 can include services or features that are designed to determine the whereabouts of a portable computing device 9050 and, hence, the user of the device 9050. Thus, when enabled, the administrator portal 9215 or some other component or entity can monitor the whereabouts of the relevant portable computing device 9050. Further, the application repository permission 9648 is a setting that enables the relevant portable computing device 9050 to download and install applications from one or more application repositories 9130. When allowed, the device 9050 can be granted permission to execute such downloads/installations. This permission can be extended to multiple application repositories 9130, each of which may or may not be associated with the administrator portal 9215 or, for example, the managing entity described above. The application repository permission 9648 can also be configured to identify the application repositories 9130 to which the permission extends.

As another example, the bundle application page 9642 can show the applications 9316 that are part of the selected bundle 9634. These applications 9316 can be listed in accordance with any suitable protocol, and default applications 9316 can be tagged with an indicator (not shown) designating them as such. Additional information about the applications 9316 can be accessed by selecting an application 9316, in accordance with previous descriptions (see FIGS. 97-100). As part of this listing, a desktop indicator 9650 and a removable indicator 9652 can be provided. As an example, if the desktop indication 9650 is selected or activated, then a shortcut for the application 9316 may be installed on a display of the relevant portable computing device 9050. As another example, if the removable indicator 9652 is selected or activated, then the relevant portable computing device 9050 may have permission to remove, uninstall or otherwise deactivate the application 9316.

Figure 115:
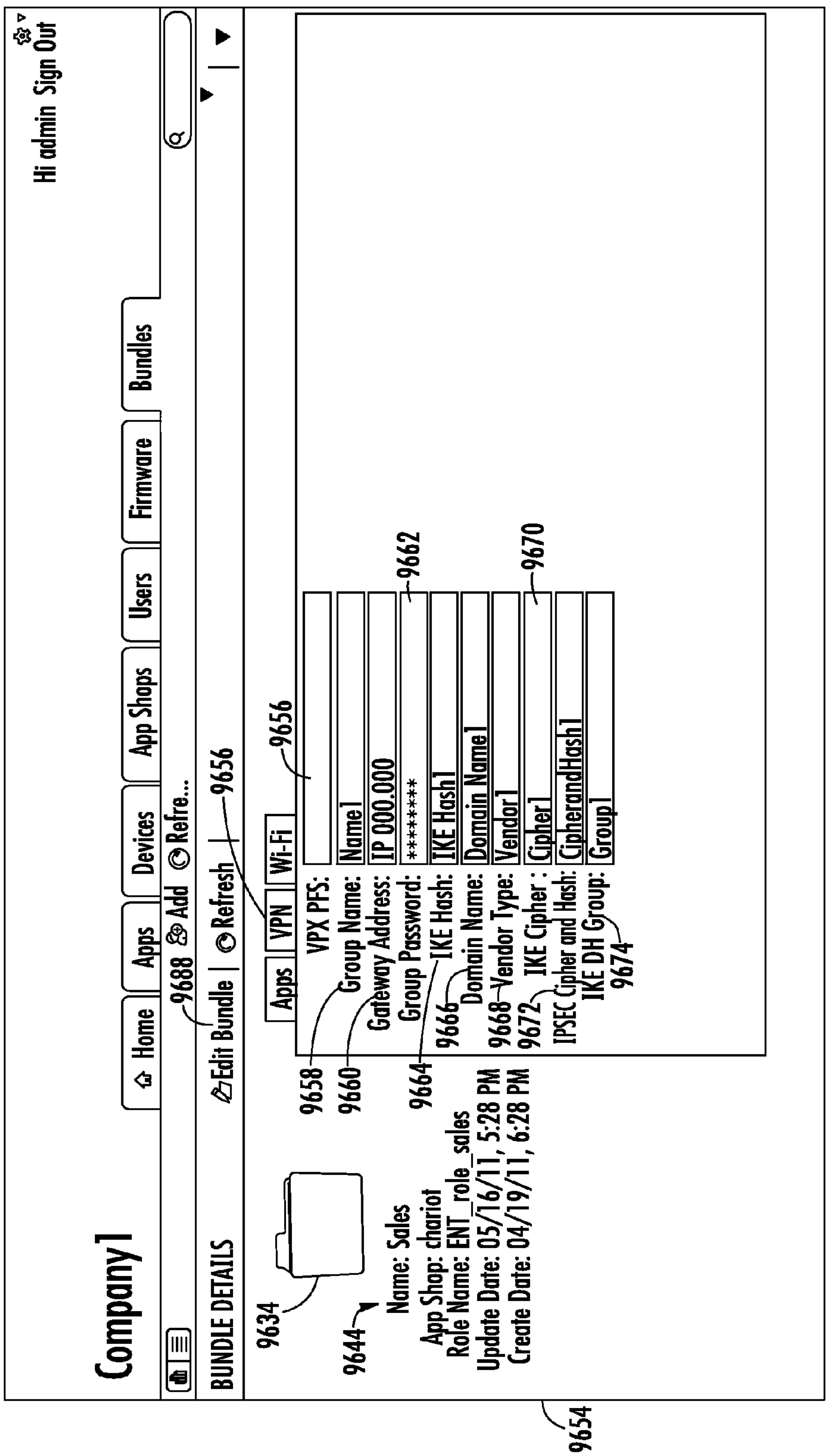
FIG. 115 illustrates an example of a VPN page.

As noted above, certain configuration settings may be part of the content of a bundle 9634. In one embodiment, the bundle 9634 can include VPN settings and Wi-Fi settings, although the bundle 9634 is certainly not limited to these particular examples. Referring to FIG. 115, an example of a VPN page 9654 is shown, which can be accessed by selecting the tab 9656. As is known in the art, a VPN can allow for secure communications for a mobile device. As such, a party that assigns or causes to be assigned portable computing devices 9050 to one or more individuals can ensure secure communications between the devices 9050 and other components by incorporating VPN information/settings into a bundle 9634 to be delivered to one or more devices 9050.

Any suitable type of information can be part of the VPN page 9654. Several examples of such information can include the general information 9644 associated with the bundle 9634, a VPN perfect forward security (PFS) indication 9656 (if selected, then VPN PFS may be required for the relevant portable computing device 9050), a group name 9658, a gateway address 9660, a group password 9662 and an IKE Hash 9664. Other suitable examples of information that can be presented on the VPN page 9654 can include a domain name 9666, a vendor type 9668 (related to the VPN), an IKE cipher 9670, an IPsec cipher and hash 9672 and an IKE DH group 9674. It is understood that the VPN page 9654 is certainly not limited to these particular examples, as other suitable parameters or settings can be presented here.

Figure 116:
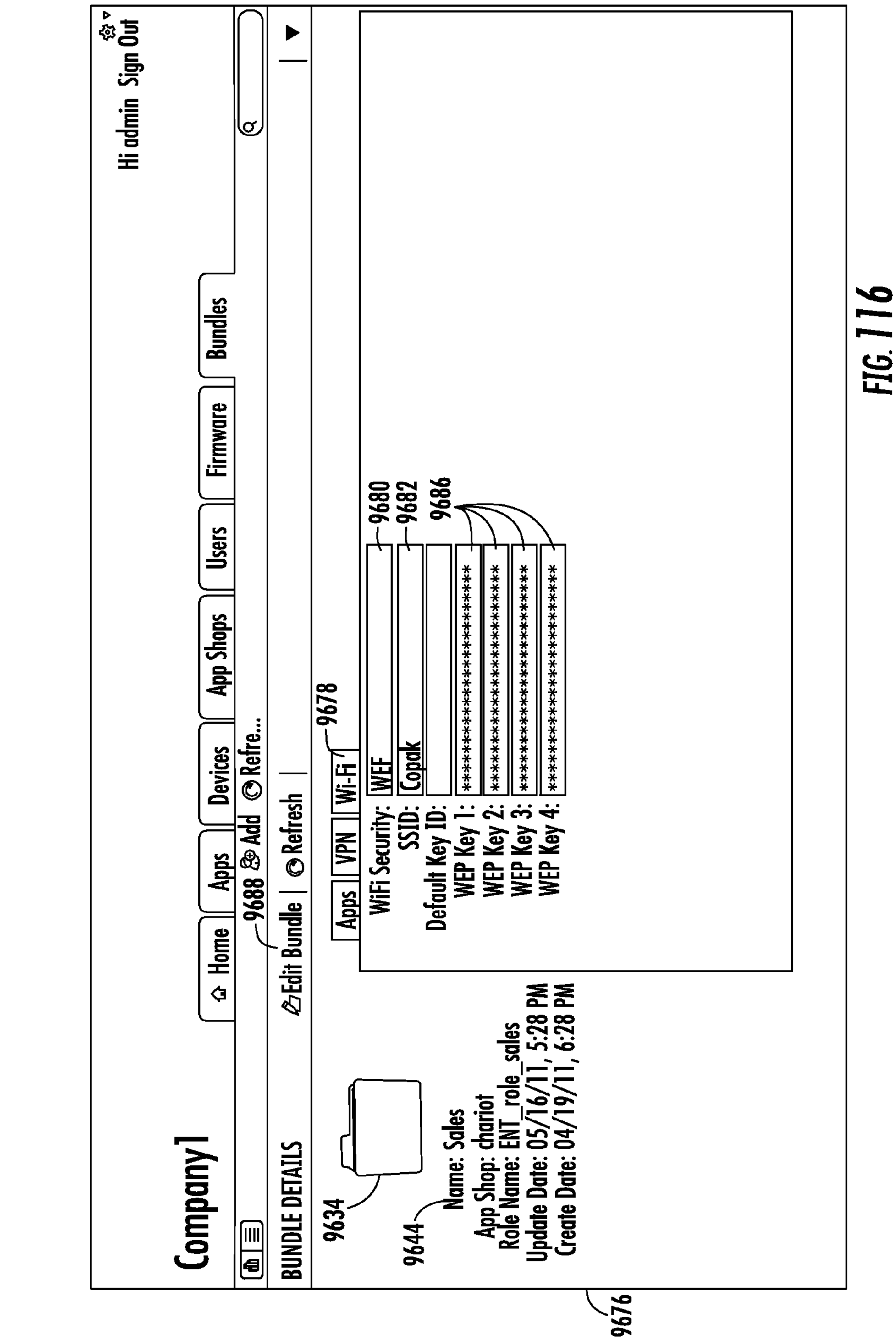
FIG. 116 illustrates an example of a Wi-Fi page.

Referring to FIG. 116, an example of a Wi-Fi page 9676 is shown, which can be accessed by the tab 9678. Similar to the VPN page 9654, the Wi-Fi page 9676 can present the general information 9644 about the bundle 9634. As is known in the art, a Wi-Fi connection can be useful for establishing communications between two or more wireless components, like the portable computing device 9050 and some other wireless unit. As such, information useful for establishing a Wi-Fi connection for the relevant portable computing device 9050 can be part of the bundle 9634. Examples of such information can include a Wi-Fi security protocol 9680, an SSID 9682, a default key ID 9684 and one or more security keys 9686, such as WEP keys. The Wi-Fi page 9676, however, is not limited to these particular examples, as other suitable parameters or settings can be presented here. Moreover, additional pages can be part of the interface 9500 if additional wireless or wired communication protocols are to be used with the portable computing devices 9050. For example, dedicated pages can be created for short range wireless standards/protocols, like Bluetooth or IEEE 802.15.4, or for wide area networks, both wired and wireless. Additional certificates (not shown) that may be applicable to the VPN page 9654, the Wi-Fi page 9676 or both can be part of the information described above.

Figure 117:
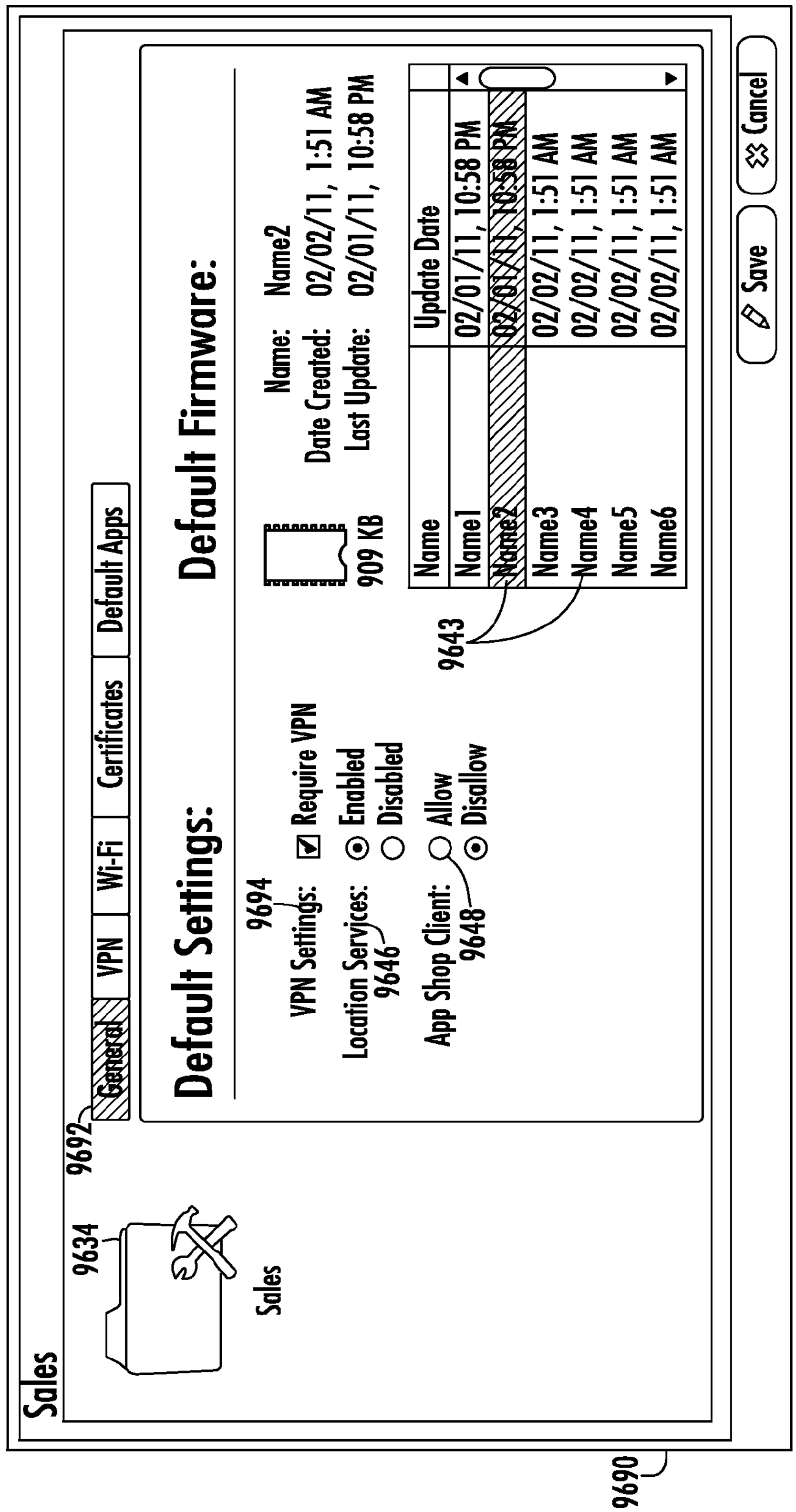
FIG. 117 illustrates an example of a general editing page.

In one arrangement, the content of a bundle 9634 can be edited/modified. To do so, an editing feature 9688 can be activated. The editing feature 9688 can be incorporated into any one of the bundle application page 9642, the VPN page 9654 or the Wi-Fi page 9676 (see FIGS. 114-116). When activated, a general editing page 9690 can be presented, an example of which is shown in FIG. 117. The general editing page 9690 can be accessed by selecting a tab 9692. Here, one or more configuration settings of the relevant bundle 9634 can be modified.

For example, a VPN settings indicator 9694 can be selected to require that the portable computing device 9050 that receives the bundle 9634 uses a VPN when conducting communications. Other exemplary settings that can be altered for the bundle 9634 include the location services 9646, which can be enabled or disabled, and whether the application repository permission 9648 is allowed or disallowed. In another arrangement, a firmware package 9643 can be selected (or changed) to serve as a default firmware package 9643 for the bundle 9634. It is understood that the general editing page 9690 is not limited to the examples listed above, as other configurations settings can be presented here for editing.

Figure 118:
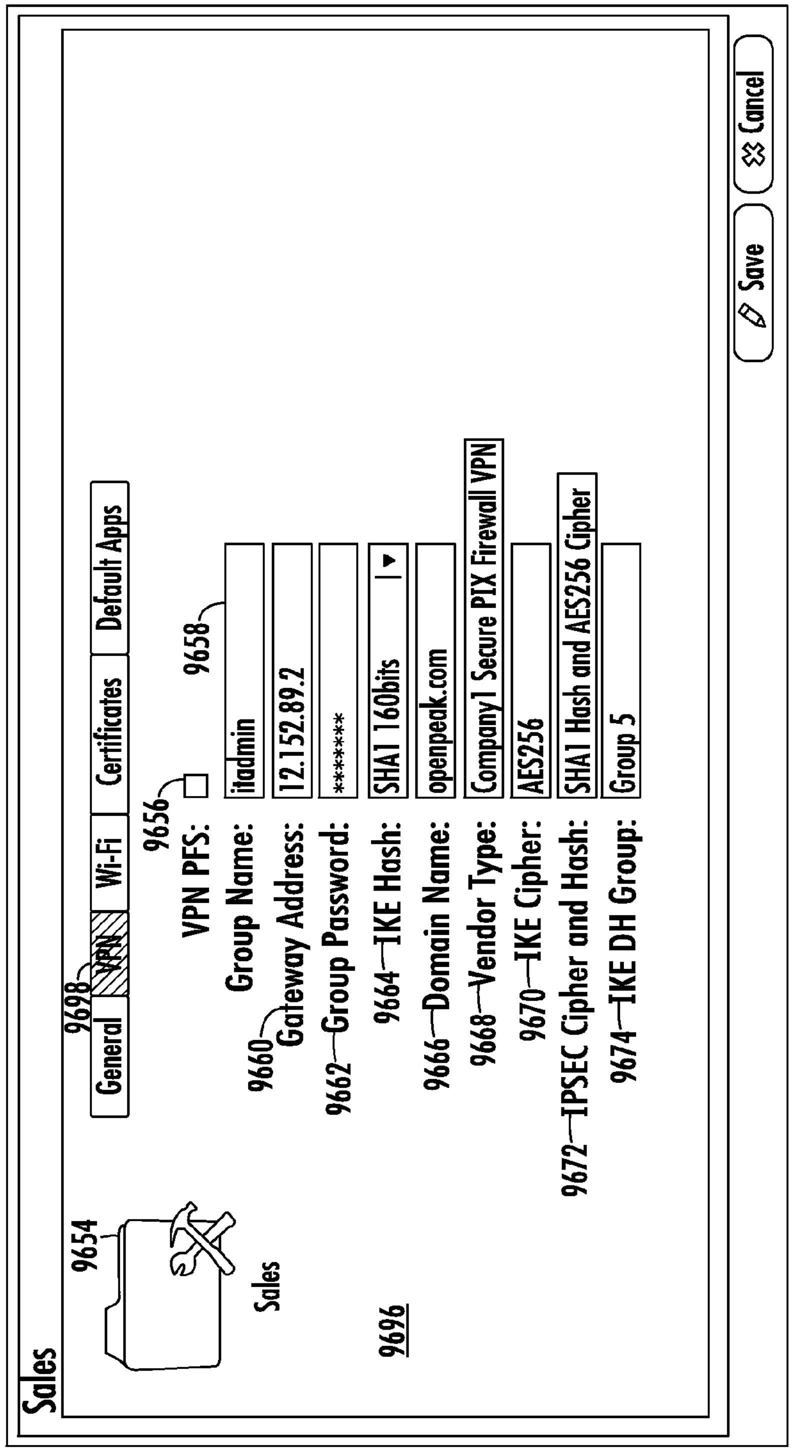
FIG. 118 illustrates an example of a VPN editing page.
Figure 119:
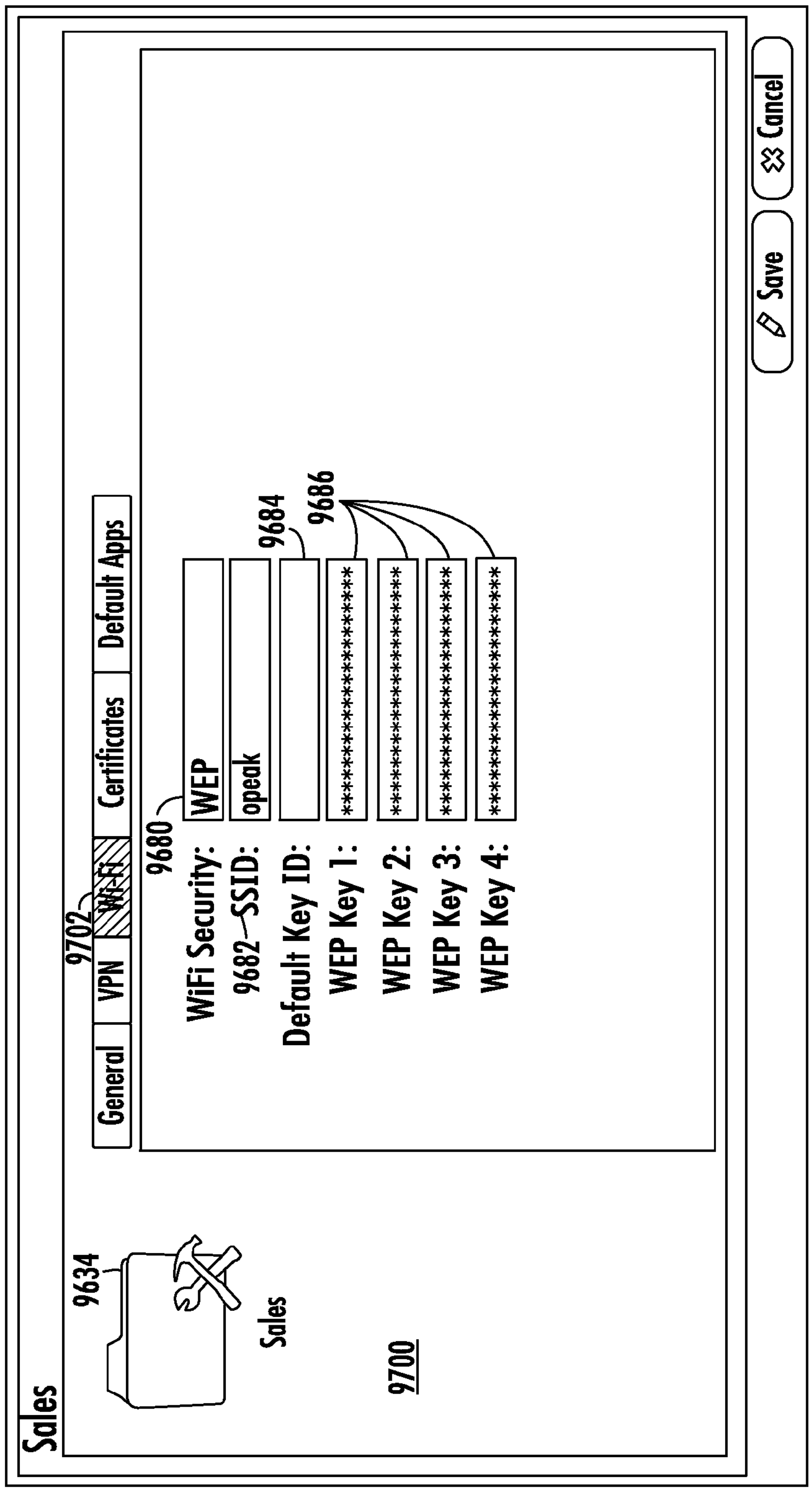
FIG. 119 illustrates an example of a Wi-Fi editing page.
Figure 120:
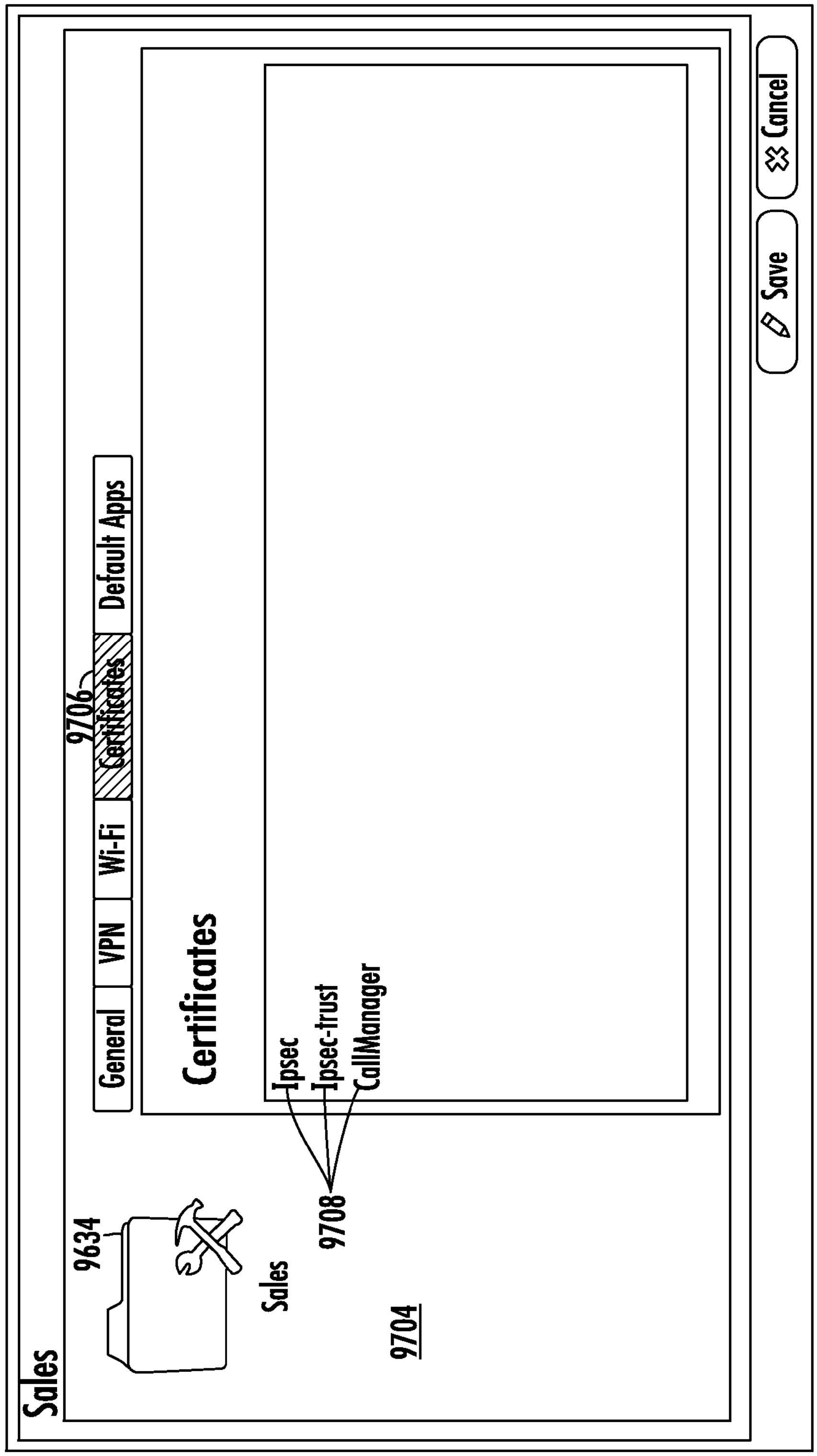
FIG. 120 illustrates an example of a certificates editing page.

Referring to FIG. 118, an example of a VPN editing page 9696, which can be accessed by selecting a tab 9698, is shown. Here, any one of the VPN PFS indication 9656, the group name 9658, the gateway address 9660, the group password 9662, the IKE Hash 9664, the domain name 9666, the vendor type 9668, the IKE cipher 9670, the IPsec cipher and hash 9672 or the IKE DH group 9674 can be edited in any suitable fashion. Referring to FIG. 119, an example of a Wi-Fi editing page 9700 is shown. The Wi-Fi editing page 9700 can be selected through the tab 9702. Here, any one of the Wi-Fi security protocol 9680, the SSID 9682, the default key ID 9684 or the security keys 9686 can be modified in any suitable fashion. A certificates editing page 9704, an example of which is shown in FIG. 120, can also be presented. The certificates editing page 9704, which can be accessed through the tab 9706, can enable the uploading or removal of any suitable type of certificate 9708 for the bundle 9634.

Figure 121:
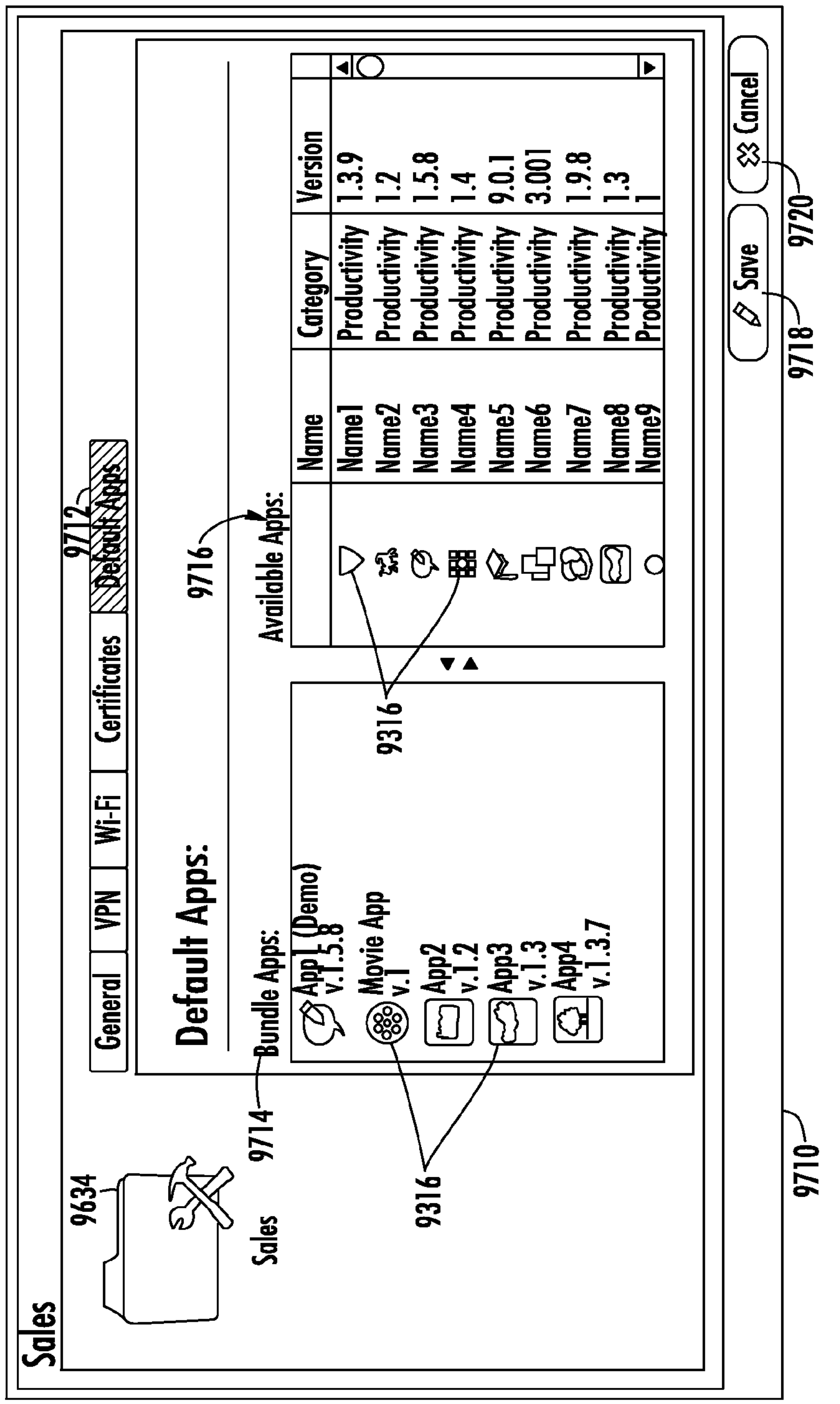
FIG. 121 illustrates an example of an application editing page.

Referring to FIG. 121, an example of an application editing page 9710 is illustrated, which can be accessed by selecting the tab 9712. The application editing page 9710 can permit applications 9316 to be added to or removed from the bundle 9634. These applications 9316 can be designated for a particular bundle 9634, and at least some of them may be considered default applications 9316, either for an entire collection of portable computing devices 9050 or for those devices 9050 that are part of a group (e.g., a sales team or a team of executives).

In one arrangement, the application editing page 9710 can include a bundle application listing 9714 and an available application listing 9716. The bundle application listing 9714 can show the applications 9316 that are currently included as content for the bundle 9634, while the available application listing 9716 can list those applications 9316 that are not currently part of the content for the bundle 9634 but that may be available for being included in the content. Additional information about any of these applications 9316 can be accessed, such as by selecting an application 9316, as described earlier. Here, a user can add applications 9316 to the bundle 9634 by simply clicking and dragging applications 9316 from the available application listing 9716 to the bundle application listing 9714. Applications 9316 can also be removed from the bundle 9634 by clicking and dragging applications 9316 from the bundle application listing 9714 to the available application listing 9716. In any one of the editing pages described above, any edits made can be saved by selecting a save button 9718 or canceled by choosing a cancel button 9720.

Once a bundle 9634 is generated, the bundle 9634 can be stored at any suitable location. For example, a bundle 9634 can be stored in an application repository 9130 for eventual delivery to one or more portable computing devices 9050. Thus, the content of a bundle 9634 may be stored on a portable computing device 9050, in the application repository 9130 (i.e., the AS server 9040) or some other component. To ensure that any edits made at the editing pages (FIGS. 117-121) are properly disseminated, the administrator portal 9215 can signal such modifications to the managed services platform 9010 and to the portable computing devices 9050 through the heart beating process (see FIGS. 86 and 87). Consequently, any edits made at the editing pages can be dynamically applied to the bundles 9634 that are part of the application repository 9130 or that have already been delivered to a portable computing device 9050. As an option, these edits can be propagated according to a predefined schedule to minimize disruptions, as opposed to near real-time delivery.

In view of this description, it is possible to provide content or make modifications to a group of portable computing devices 9050, i.e., a group basis. For example, an operator of the administrator portal 9215, such as the managing entity, could push applications, firmware updates or operational settings to an identified group of portable computing devices 9050. Thus, the devices 9050 assigned to, for example, a specific sales team could be updated with limited interruption to the members of the team.

Figure 122:
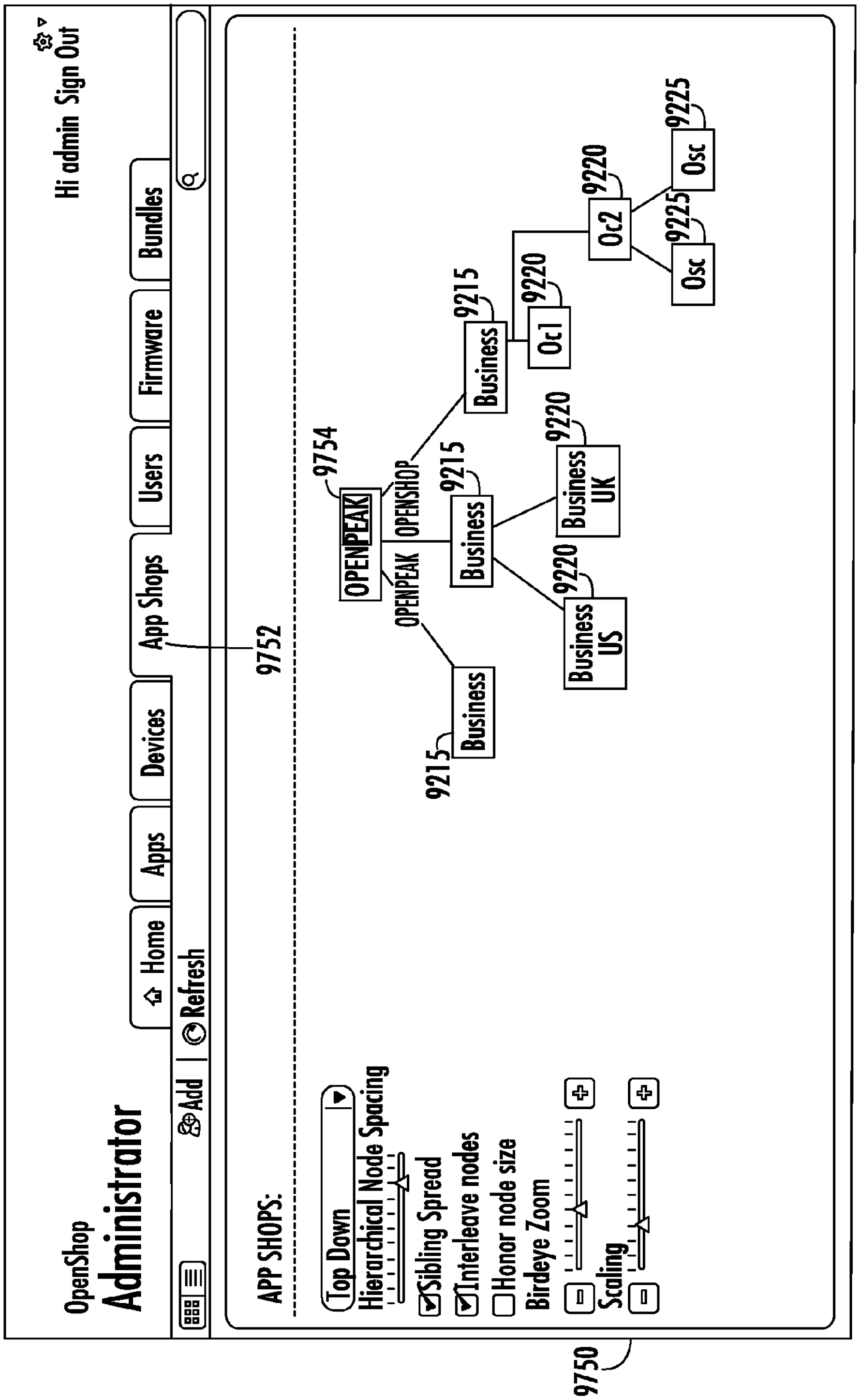
FIG. 122 illustrates an example of a management page.

The interface 9500 can also provide features to manage portable computing devices 9050 on a larger, even global, scale. Referring to FIG. 122, an example of a management page 9750 is shown, and the management page 9750 can be accessed by selecting a tab 9752. As part of the page 9750, a hierarchical arrangement 9754 can be displayed, which can show the relationship between the administrator portals 9215, the client portals 9220 and the sub-client portals 9225 (see also FIG. 87). An oversight portal 9754 can also be part of the arrangement 9754, the structure/function of which will be explained below. Additional information will also be provided later to describe the relationship between the entities of the arrangement 9754. For now, however, the discussion will focus on the administrator portal 9215.

Figure 123:
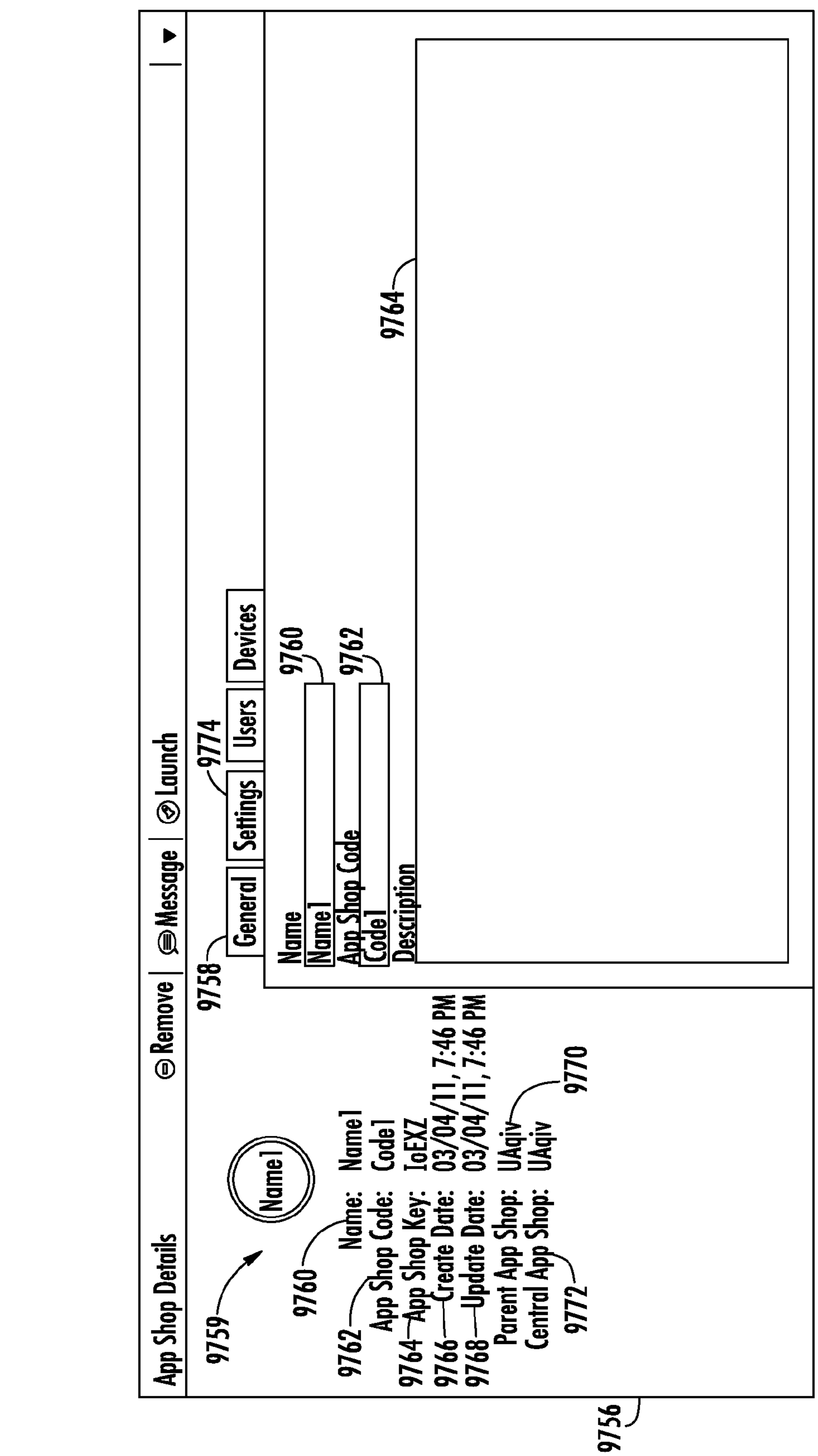
FIG. 123 illustrates an example of an application repository information page.

The administrator portal 9215 of the arrangement 9754 can be selected on the management page 9750. Referring to FIG. 123, an example of an application repository information page 9756 is shown, which can be reached by selecting an administrator portal 9215 on the management page 9750 and a tab 9758 in FIG. 123. As explained previously, the administrator portal 9215 can have one or more application repositories 9130 assigned to the administrator portal 9215 (and, thus, to the entity that oversees operations of the administrator portal 9215, like the managing entity). The information page 9756 can provide information 9759 about the application repository 9130 assigned to the administrator portal 9215 and, for example, the managing entity. Examples of such information relating to the application repository 9130 include a name 9760, a code 9762 that identifies the repository 9130, a description 9764 and a key 9764 (such as a security key) for the application repository 9130. Any one of the name 9760, the code 9762 or the description 9764 can identify the party responsible for the application repository 9130, such as the managing entity. Additional examples include a creation date 9766 and a most recent update date 9768 for the application repository 9130. In one arrangement, an identification code 9770 for a parent application repository 9130 and/or an identification code 9772 for a central application repository 9130 can be provided. Additional information about a parent and a central application repository 9130 will be provided later. It is understood that other suitable types of information about the application repository 9130 can be presented on the application repository information page 9756 or some other suitable location or medium.

Selection of a tab 9774 can enable a user to choose from one or more default pages that present information about default settings or parameters for portable computing devices 9050. In one arrangement, these portable computing devices 9050 can be assigned to a particular application repository 9130, such as the one identified on the application repository information page 9756 (see FIG. 123). As such, these devices 9050 can be associated with the entity responsible for the application repository 9130, such as the managing entity. In one arrangement, these default pages can permit the managing entity to manage all the devices 9050 assigned to the application repository 9130. As an example, this process can enable global management of the devices 9050 assigned to a particular entity.

Figure 124:
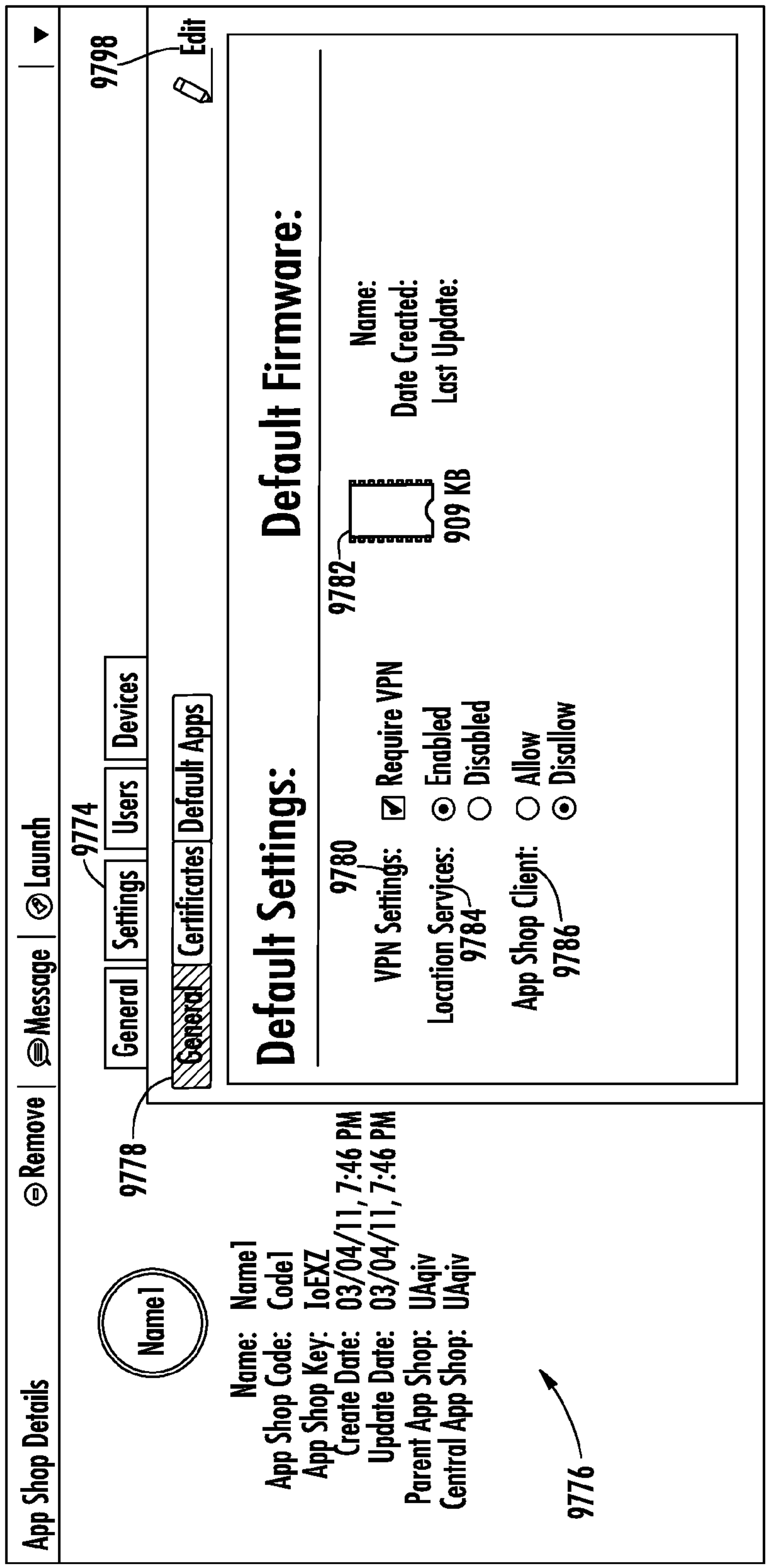
FIG. 124 illustrates an example of a general default page.

For example, a general default page 9776, an example of which is shown in FIG. 124, can be accessed by selecting a tab 9778. Here, several default settings that apply to the portable computing devices 9050 that are under the control of the party operating the administrator portal 9215, such as the managing entity, are presented. The default settings can be a package of operating conditions, settings, applications, parameters, etc. that the managing entity wishes to have applied to the portable computing devices 9050 under its control. In one arrangement, delivery of this content can be in the form of a bundle, similar to the configuration and processes explained in relation to FIGS. 113-121, the difference being that this content may consist of the minimal requirements designed for all portable computing devices 9050 associated with the administrator portal 9215.

As an example, on the general default page 9776, default information like a VPN setting 9780, a firmware package 9782, a location services setting 9784 and an application repository permission setting 9786 can be presented. These settings can be similar to those described with respect to the bundles 9634 of FIG. 114. As such, the default information/settings presented here can be applied to the portable computing devices 9050 when these devices 9050 register with the managed services platform 9010. As will be explained below, edits can be made to these default information/settings and can be propagated to the devices 9050 through the managed services platform 9010. Those skilled in the art will appreciate that other default information can be presented on the general default page 9776, and such page 9776 is certainly not limited to these examples.

Figure 125:
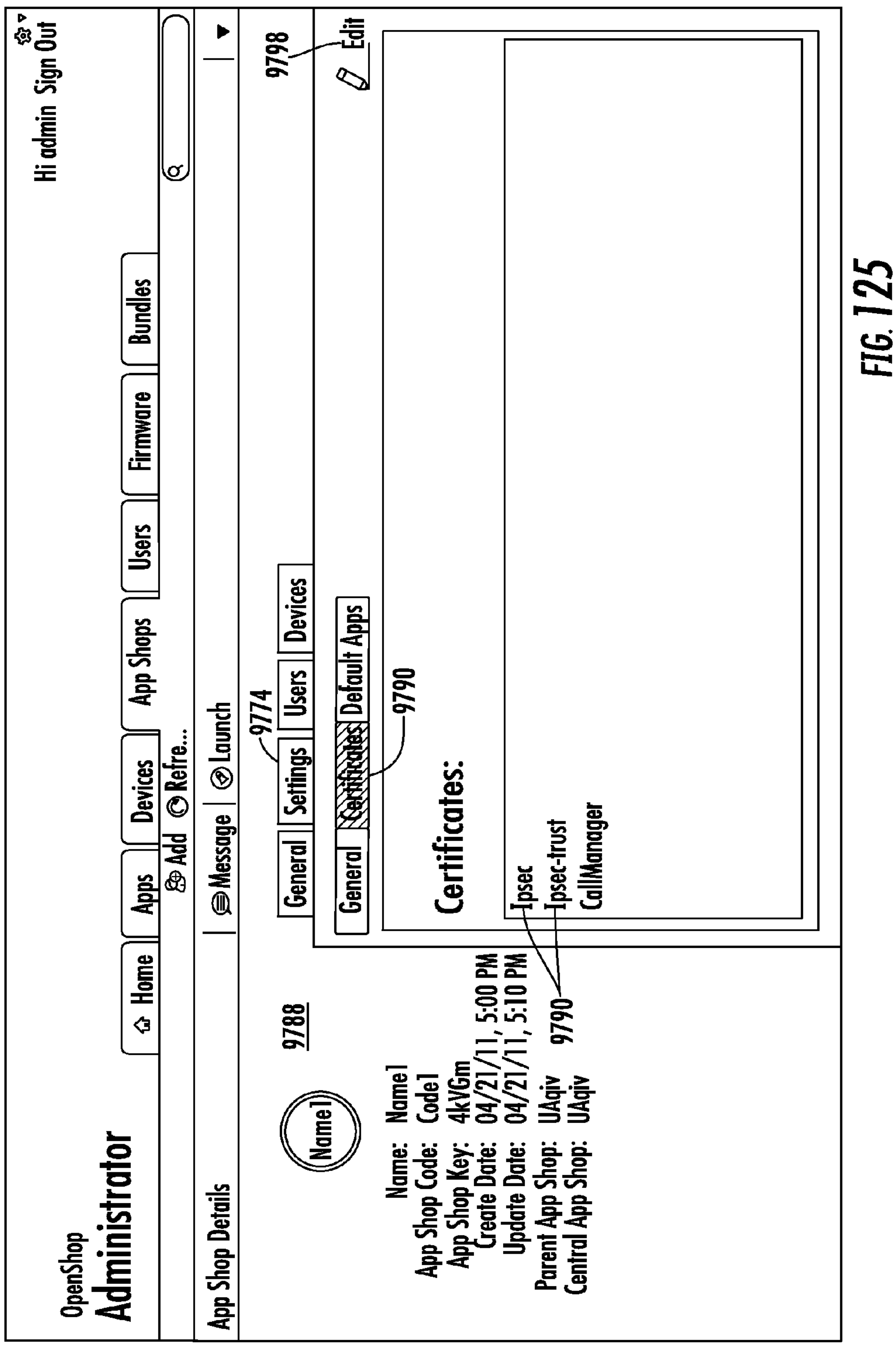
FIG. 125 illustrates an example of a default certificates page.

Referring to FIG. 125, an example of a default certificates page 9788 is shown, which can be accessed via the tab 9790. Like general default page 9776, the default certificates page 9788 can be assigned to the tab 9774. The default certificates page 9788 can list one or more certificates 9790 that can be applied to the portable computing devices 9050, such as during registration or at a later time. These may be security certificates, although that is not necessarily the case. Moreover, certificates can be added, removed or upgraded, each of which can be applied to the portable computing devices 9050.

Figure 126:
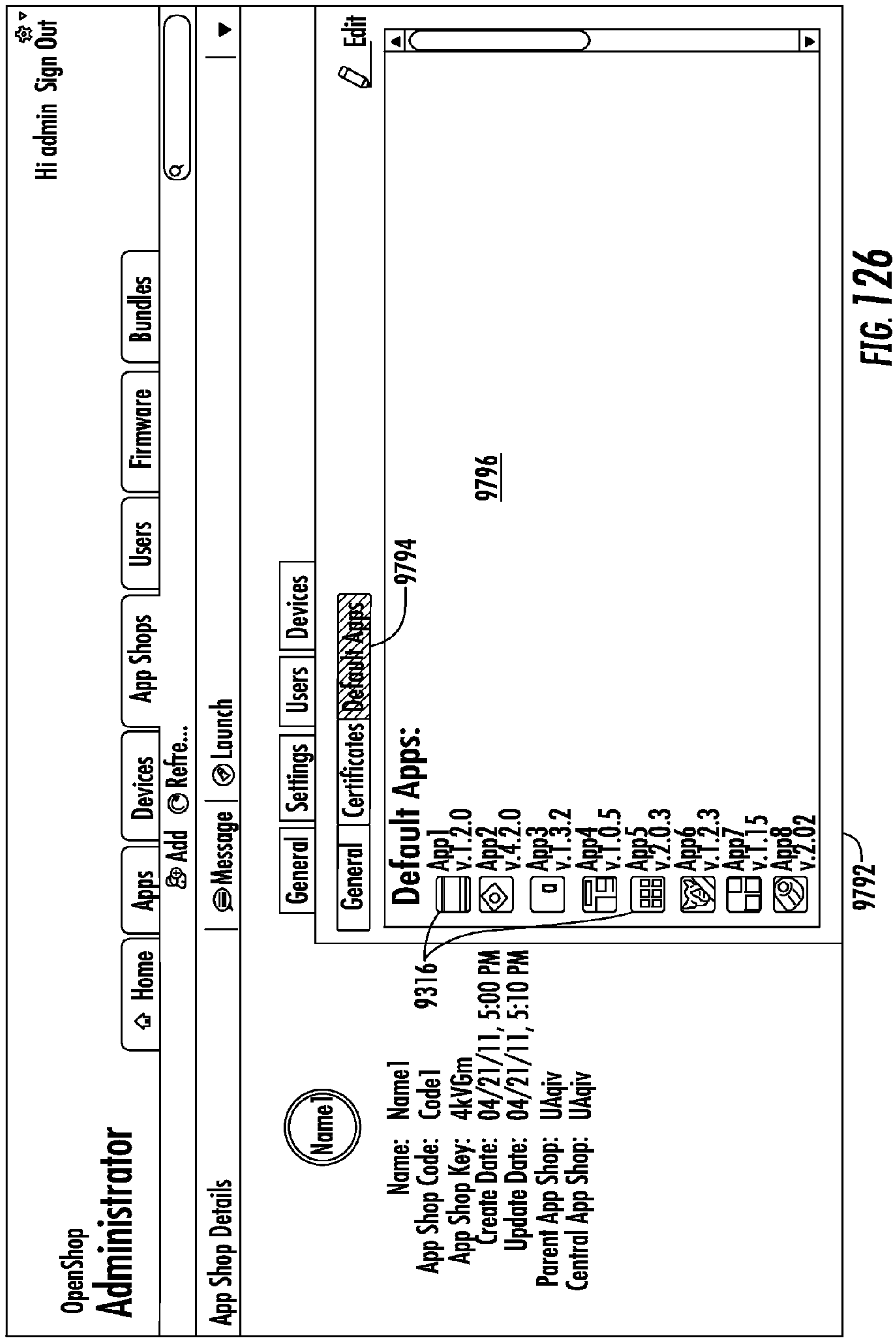
FIG. 126 illustrates an example of a default applications page.

Referring to FIG. 126, an example of a default applications page 9792 is shown. The default applications page 9792, which can be accessed by selecting the tab 9794, can list the applications 9316 that are to be installed on the portable computing devices 9050 as part of a default application set 9796. That is, the default application set 9796 can be the minimum number of applications 9316 that should be installed on the portable computing devices 9050 that are assigned to the administrator portal 9215 and, optionally, the managing entity. As an example, these applications 9316 can be delivered to the devices 9050 when the devices 9050 register with the managed services platform 9010 or at some other later time. Any suitable amount of information relating to the applications 9316 can be presented here, some of which may be accessed by selecting an application 9316 in accordance with previous discussions.

Figure 127:
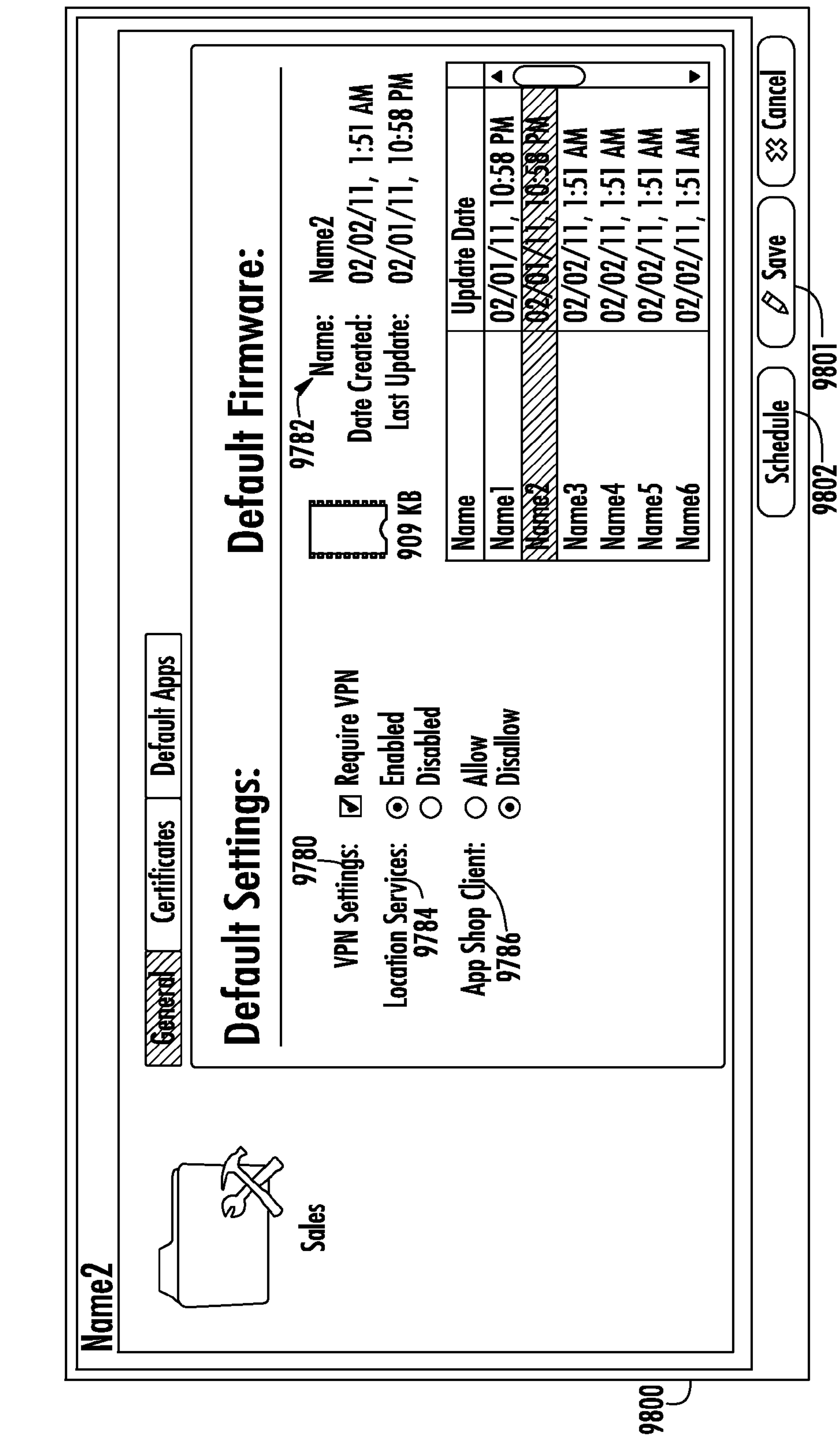
FIG. 127 illustrates an example of a general default edit page.

In one arrangement, the interface 9500 can be configured to enable any of these default settings or applications to be edited. For example, the general default page 9776, the default certificates page 9788 or the default applications page 9792 can include an edit feature 9798, which when activated, can permit modifications to the settings/applications on its respective default page. In one particular example, if the edit feature 9798 on the general default page 9776 is activated, a general default edit page 9800 can be presented, an example of which is shown in FIG. 127. Here, the VPN setting 9780, the firmware package 9782, the location services setting 9784, the application repository permission setting 9786 or any other default setting can be modified. When so modified, the edit can be propagated to the portable computing devices 9050 through the managed services platform 9010 forthwith, such as by selecting a save feature 9801, or at a later time.

Figure 128:
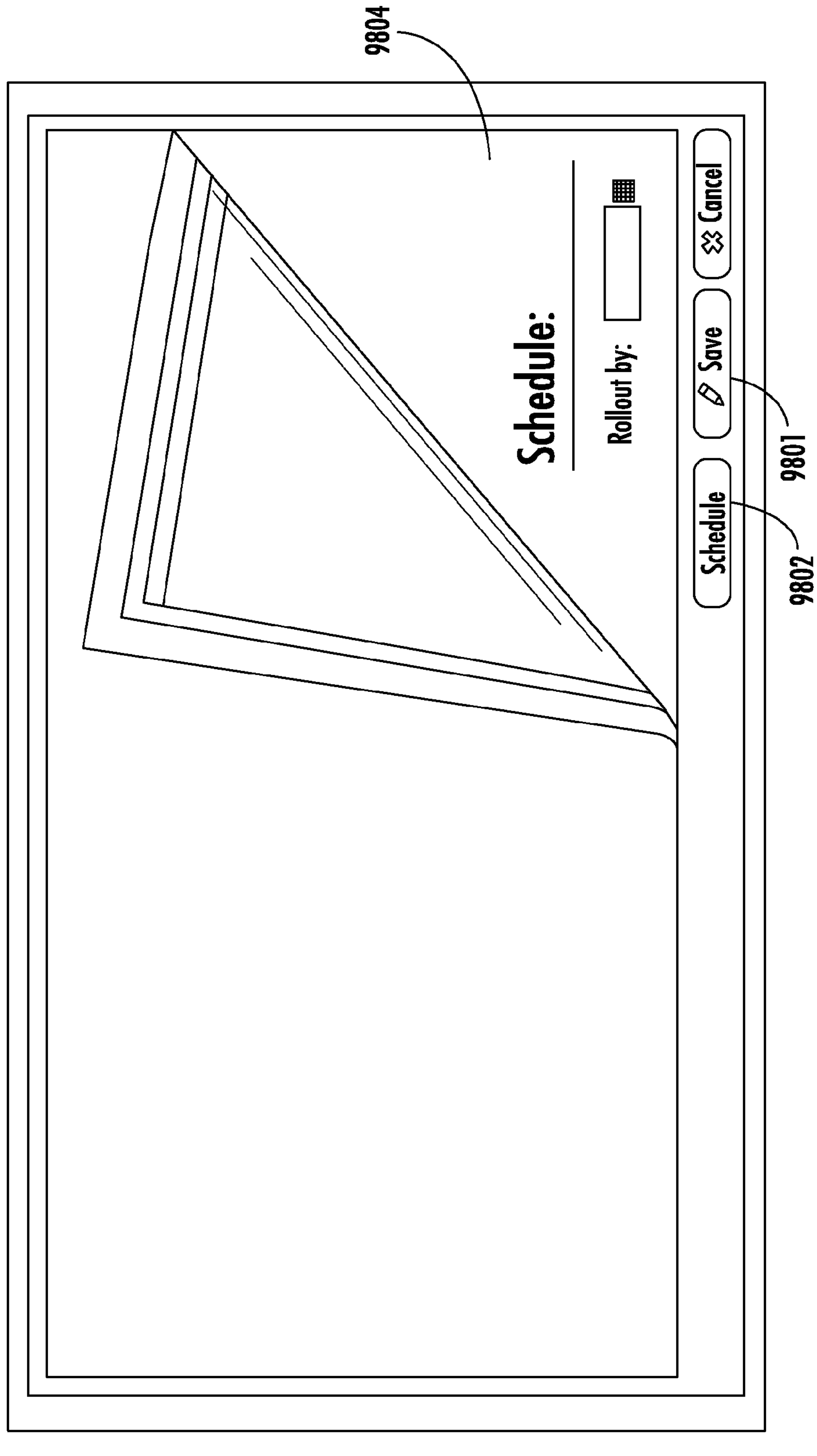
FIG. 128 illustrates an example of a delivery page.

As part of the process of delivering the edits to the portable computing devices 9050, the interface 9500 of the administrator portal 9215 can present a schedule rollout option 9802, which can be used to set a delivery schedule for the editing of the default settings or applications. When the schedule rollout option 9802 is activated, a delivery page 9804 can be presented, an example of which is shown in FIG. 128. Here, a user can select any appropriate time to have the modifications pushed to the portable computing devices 9050. As an example, these edits can be effected at a time that will cause minimal disruptions to the users of the devices 9050, such as during early morning hours.

Figure 129:
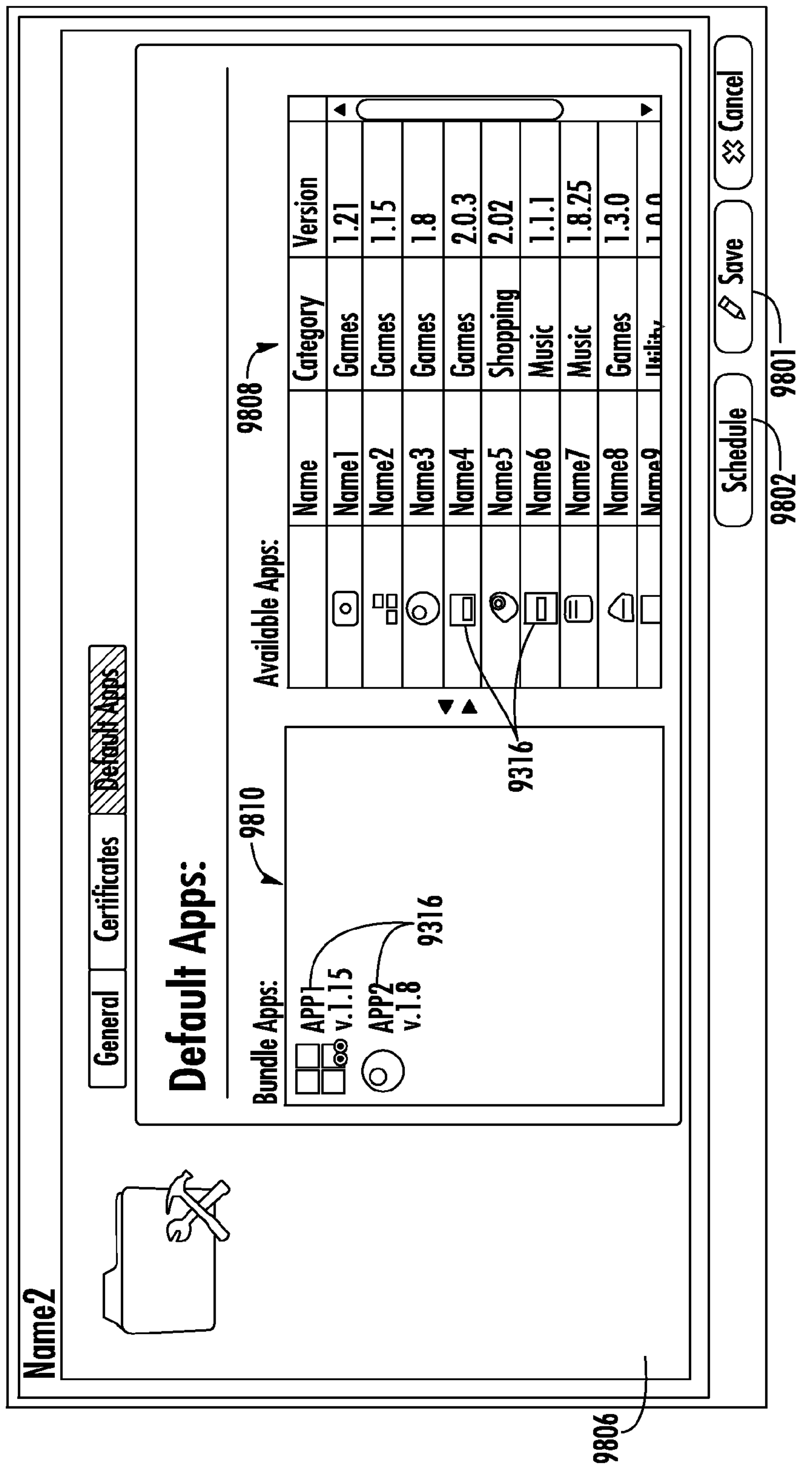
FIG. 129 illustrates an example of an applications edit page.

Edits can also be made to the default certificates page 9788 and the default applications page 9792 and delivered to the devices 9050 in a similar manner. An example of an applications edit page 9806 is shown in FIG. 129. Here, an available applications list 9808 and a current default applications list 9810 can be presented. The current default applications list 9810 can show those applications 9316 that are currently part of the default application set 9796 (see FIG. 126). The available application list 9808, meanwhile, can display the applications 9316 that are available to be part of the current default applications list 9810 and, hence, the default applications list 9796. A user can simply click and drag applications 9316 from the available application list 9808 to the current default applications list 9810 to enable the application(s) to be added to the portable computing devices 9050 on a broadcast or global basis. As an option, such a delivery could be scheduled using the schedule rollout option 9802. As an option, information about the applications 9316 can be reviewed or accessed here, similar to previous descriptions.

In addition to global addition, one could perform a global removal of an application 9316 from the default application list 9796 and, thus, the portable computing devices 9050 associated with the administrator portal. As an example, a user can simply drag one or more applications 9316 from the current default applications list 9810 to the available application list 9808. This change can be executed throughout the portable computing devices 9050 through the managed services platform 9010. The modification can occur in real-time or can be conducted at a later time, such as through the activation of the schedule rollout option 9802.

Figure 130:
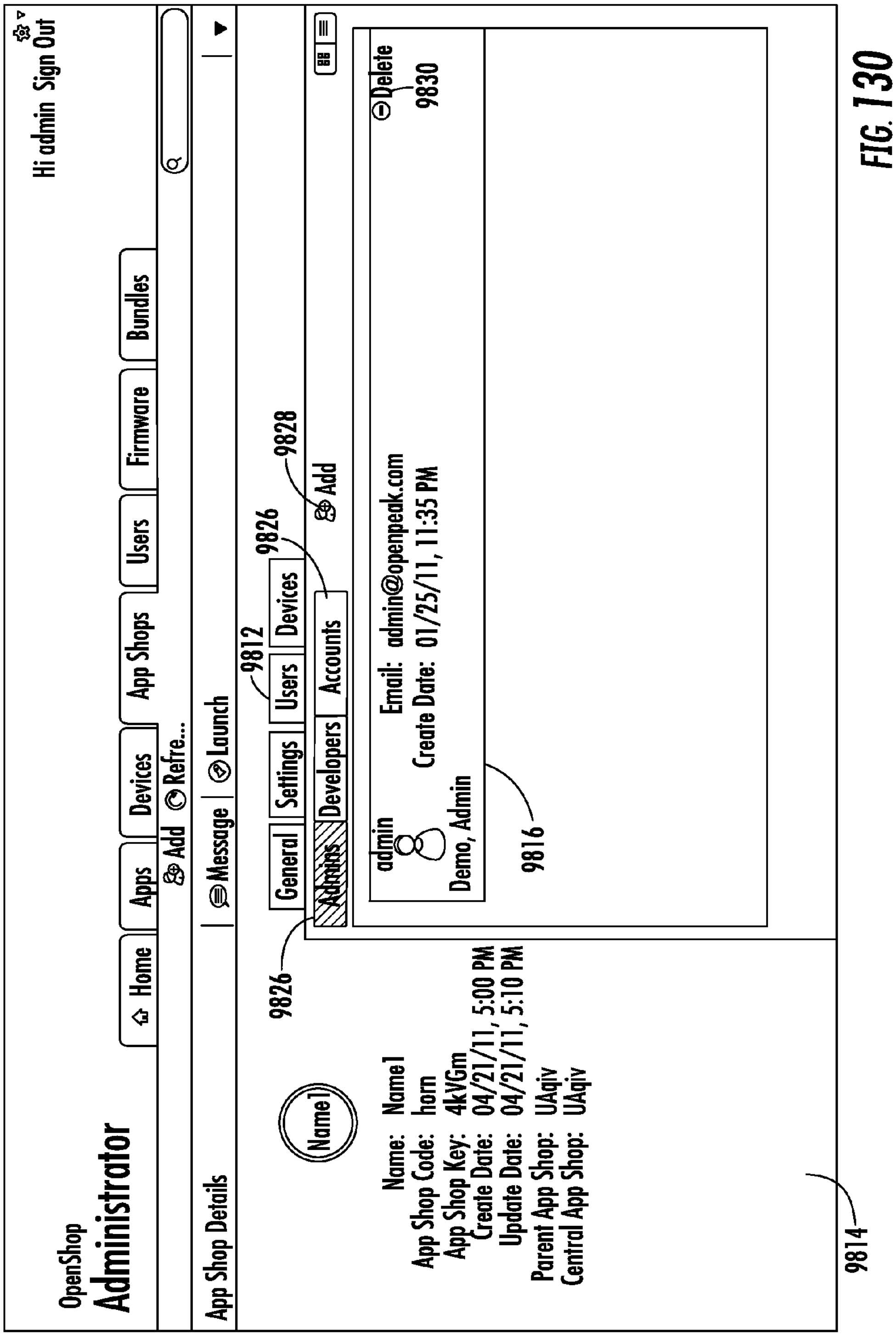
FIG. 130 illustrates an example of a users page.
Figure 131:
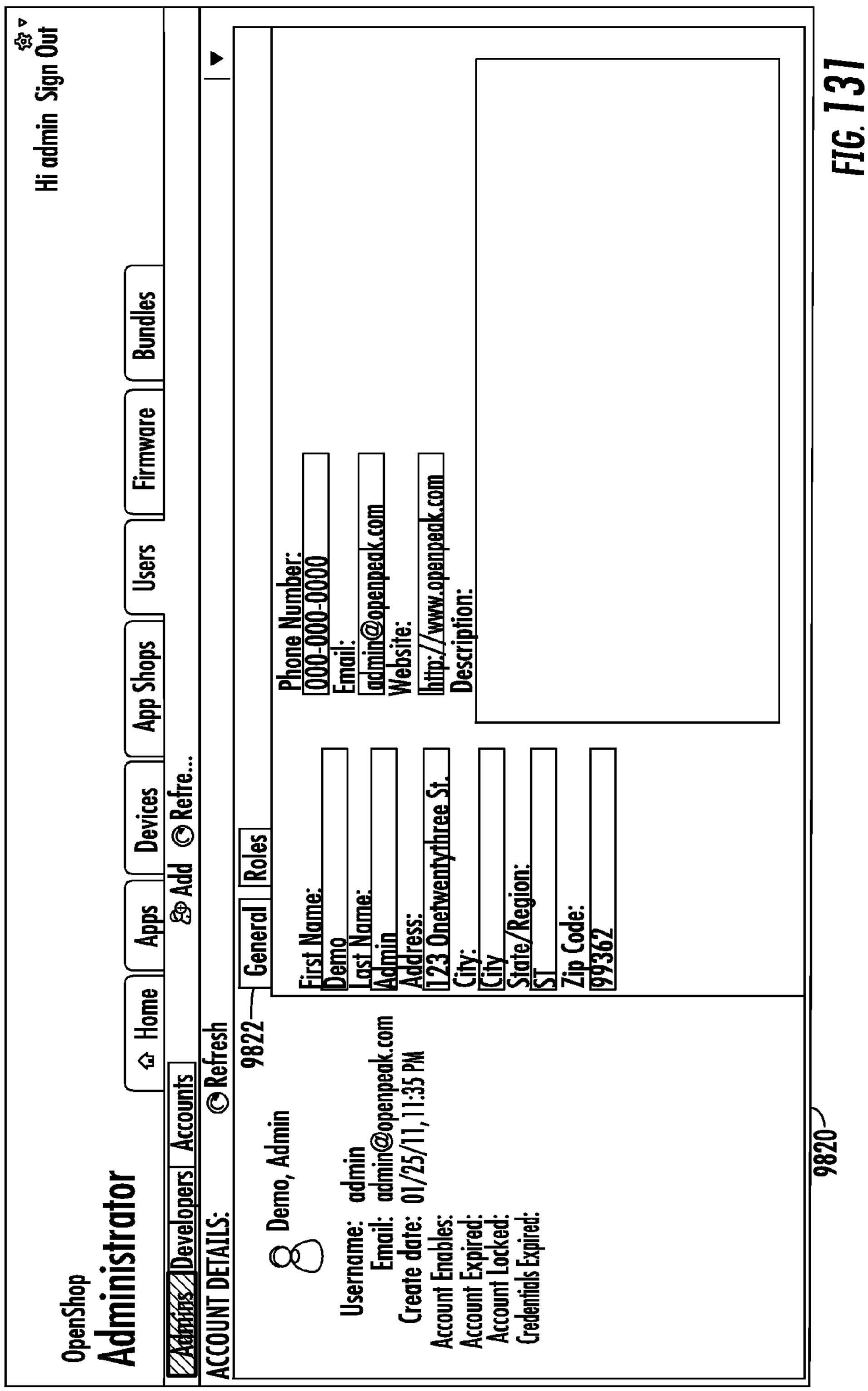
FIG. 131 illustrates an example of an information page.
Figure 132:
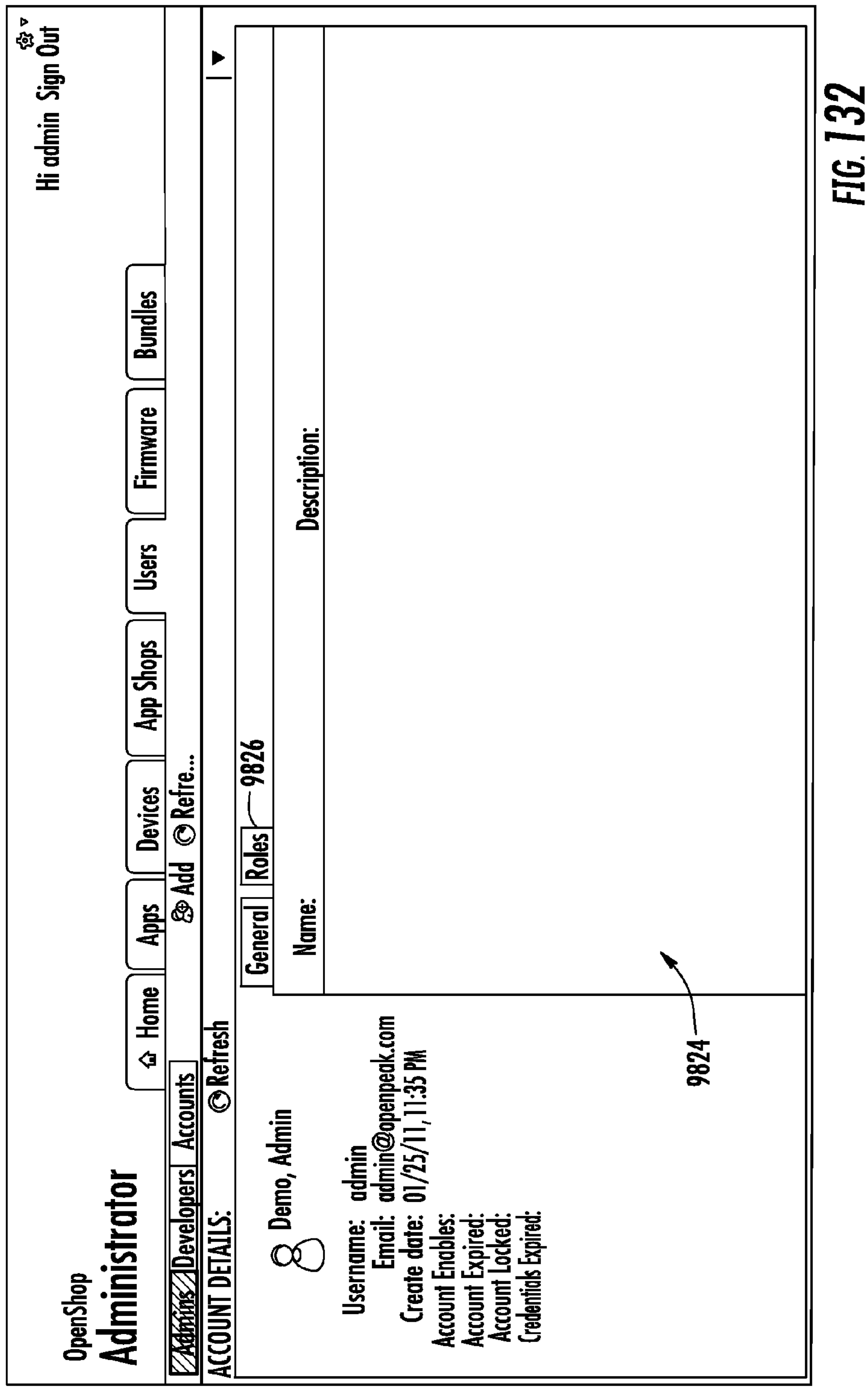
FIG. 132 illustrates an example of a roles page.

Moving from the tab 9774, information about the various users of the portable computing devices 9050 associated with the administrator portal 9215 can be obtained by selecting the tab 9812, which can cause a users page 9814 to be presented. An example of the users page 9814 is shown in FIG. 130. The presentation and functions here can be similar to that described in relation to FIG. 109. For example, the users page 9814 can present one or more user identifications 9816 that display general information 9818 about the corresponding user. Moreover, additional information about the user can be accessed by selecting the user identification 9816, similar to the process described in relation to FIGS. 110 and 111. For example, an information page 9820 can be presented, an example of which is shown in FIG. 131. The information page 9820 can be accessed by selecting a tab 9822. In addition, a roles page 9824 can be accessed by selecting a tab 9826, as shown in FIG. 132. The roles page 9824 here can present information similar to that described in relation to FIG. 111. The information presented here on pages 9820 and 9824 can be similar to the information described with respect to FIGS. 110 and 111, although other forms of information can be added to or excluded from the pages 9820, 9824.

Referring back to FIG. 130, as noted earlier, the users page 9814 can present, among other things, one or more user identifications 9816. In the example presented above, the user identifications 9816 presented on the users page 9814 may be associated with a managing entity that oversees the operation of the administrator portal 9215. The users associated with the user identifications 9816 may serve various roles under the managing entity, and the users can be grouped in one of several possible categories to make the management of the user identifications 9816 easier, similar to those described in relation to FIG. 109. To access such categories, one of several tabs 9826 can be selected. A search function (not shown) can also be incorporated into the users page 9814 or some other suitable interface to enable searching of the user identifications 9816. User identifications 9816 can be added through an addition feature 9828 or deleted by a deletion feature 9830. Some of the information presented herein may be the same for different users, particularly if such users share a single portable computing device 9050. While the features described in FIGS. 130-132 are similar to those written about in relation to FIGS. 109-111, there are some additional elements that are part of the former that will be described below.

Figure 133:
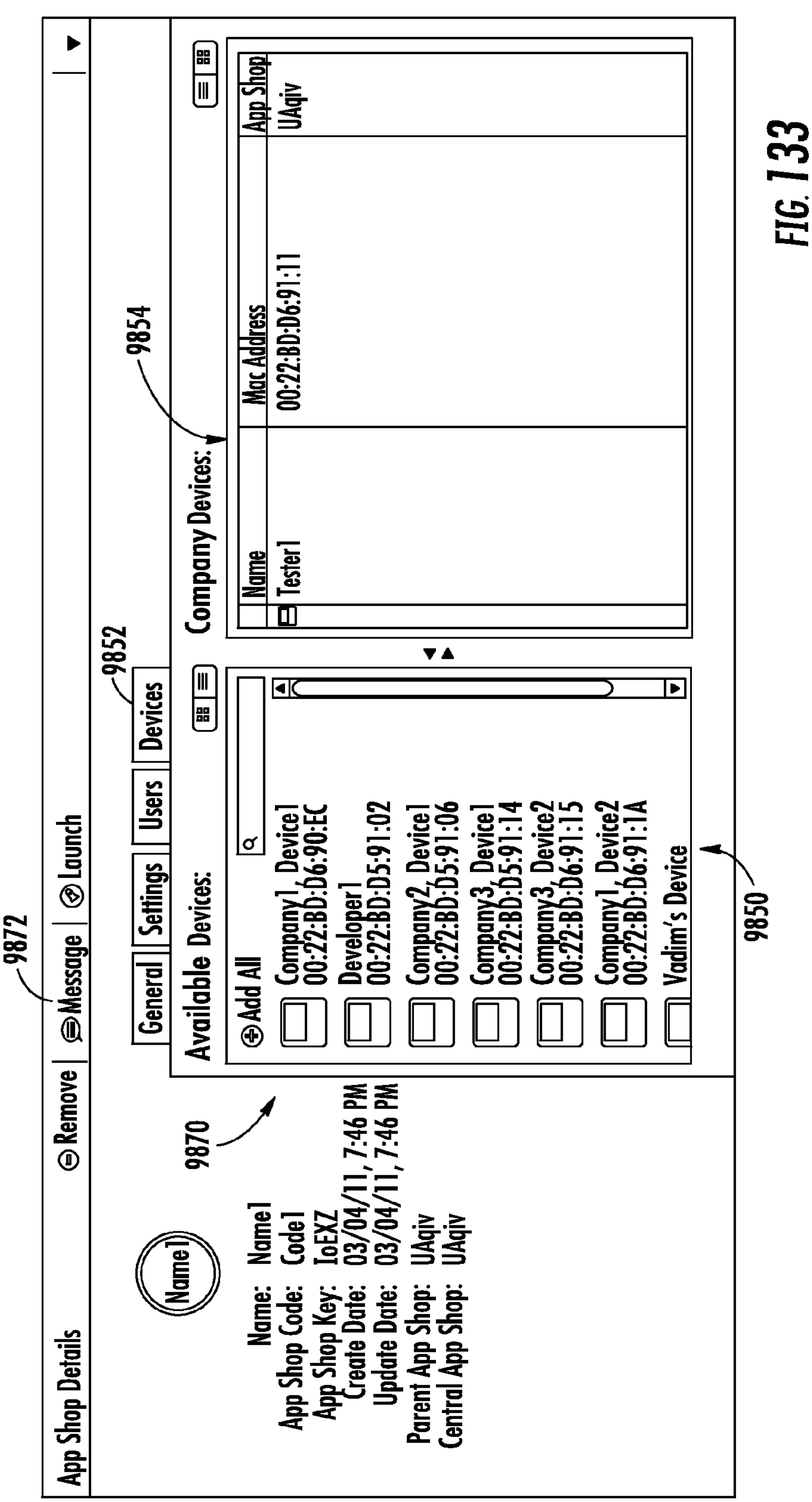
FIG. 133 illustrates an example of a devices page.

In addition to the individual and group management of portable computing devices 9050 (see FIGS. 106-108 and 113-121, respectively), the interface 9500 of the administrator portal 9215 allows for global or broadcast management of such devices 9050. For example, as explained earlier, these devices 9050 can be assigned to a particular application repository 9130 and an entity responsible for operating the administrator portal 9215, such as the managing entity. Referring to FIG. 133, a devices page 9850 is shown, which can be accessed by selecting the tab 9852. Here, the portable computing devices 9050 associated with the administrator portal 9215 can be presented in a devices list 9854. In one arrangement, the devices list 9854 can show all the devices 9050 that are associated with the administrator portal 9215. Various types of information about the portable computing devices 9050—like a name, MAC address and the application repository 9130 to which the device 9050 is assigned—can be presented in the devices list 9854.

It is conceivable that the devices list 9854 may display a high number of portable computing devices 9050. To make the management of these devices 9050 easier, the devices list 9854 can be configured to group the devices 9050 in accordance with several predefined categories. For example, portable computing devices 9050 can be grouped together according to a performance function of users assigned to the devices 9050. As a more specific example, the portable computing devices 9050 assigned to a sales team can be grouped together and given an identity that provides an indication of the sales team grouping. In addition, the devices list 9854 can include a search feature (not shown) to enable searching of individual portable computing devices 9050 or groups of such devices 9050.

The portable computing devices 9050 of the devices list 9854 can include devices 9050 that have registered with the managed services platform 9010 and are assigned to the administrator portal 9215. Such devices 9050 can be referred to as provisioned portable computing devices 9050. In one arrangement, a provisioned device 9050 can take on those elements, like settings, firmware, applications, that the entity that assigns such devices 9050 wishes the devices 9050 to have. For example, the managing entity can set, for example, the default settings, default applications, bundles, etc. that the managing entity wants to be incorporated into the portable computing devices 9050 that the managing entity assigns to individuals.

The devices page 9850 can be configured to enable automatic provisioning of a portable computing device 9050. Specifically, the devices page 9850 can include an available devices list 9870 that shows portable computing devices 9050 that are not provisioned devices 9050, unlike those in the devices list 9854. A non-provisioned device 9050 can be a portable computing device 9050 that may not yet be assigned to the administrator portal 9215 and may not include one or more elements or features (firmware, applications, settings) that have been implemented in the provisioned portable computing devices 9050. For example, a non-provisioned portable computing device 9050 may be assigned to a portal other than the administrator portal 9215 or may not be assigned by the managing entity. As another example, a non-provisioned device 9050 may be a device 9050 that has not yet registered with the managed services platform 9010. For devices 9050 that are assigned to a portal other than the administrator portal 9215, permission to provision the non-provisioned device 9050 may need to be obtained from one or more parties.

In one arrangement, a user of the administrator portal 9215 can provision one or more non-provisioned devices 9050 by dragging them from the available devices list 9870 to the devices list 9854. Once received at the devices list 9854, the portable computing device 9050 can receive content (e.g., in a bundle) to make it a provisioned device 9050, such as default settings, default firmware, default applications. Also, a bundle 9634 (see FIG. 113) can be delivered to the newly-provisioned portable computing device 9050. In fact, virtually any content can be delivered to such a device 9050. Similar to previous discussions, the content can be received at the device 9050 through the managed services platform 9010, in real-time or at a scheduled time. For those devices 9050 that have not yet registered with the managed services platform 9050, the content can be received once a device 9050 initiates such registration.

The devices page 9850 can also be configured to allow one or more provisioned portable computing devices 9050 to return to a non-provisioned state. For instance, a user can drag a provisioned device 9050 from the devices list 9854 to the available devices list 9870. Such a step can cause all or at least a portion of the modifications that were made to put the device 9050 in a provisioned state to be removed, altered or deleted to return the device 9050 to a non-provisioned state. This change can be effected right away or scheduled at a later time.

In one embodiment, the devices page 9850 may include a messaging feature 9872. The messaging feature 9858 can also be incorporated into other pages (see FIGS. 123-126 and 130). Here, messages can be sent to the portable computing devices 9050 on a broadcast or global basis via the managed services platform 9050. This may or may not include all the devices 9050 assigned to the administrator portal 9215. As such, the administrator portal 9215 can quickly and efficiently disseminate messages to its assigned devices 9050. In one arrangement, such messages can be sent to groups of portable computing devices 9050, based on the relevance of the message to those groups. Other factors may be considered when deciding on the reach of the message delivery to the devices 9050, such as security, urgency, content, etc. If desired, in addition to global and group messaging, messages can be transmitted to a device 9050 on an individual basis, similar to that described in relation to FIGS. 106-108.

In view of the above discussion, the administrator portal 9215 can be configured to manage a large number of portable computing devices 9050 assigned to the administrator portal 9215. These devices 9050 may also be associated with a managing entity. This management, as has been presented, can include the selective delivery of applications and/or settings to an application repository 9130 associated with the administrator portal 9215 and to the devices 9050. There are other portals that may operate in a similar fashion.

For example, referring once again to FIGS. 87 and 122, the managed services system 9200 can include one or more client portals 9220 and one or more sub-client portals 9225. The client portals 9220 can be communicatively coupled to one or more administrator portals 9215, while the sub-client portals 9225 can be communicatively coupled to one or more client portals 9220. In view of this arrangement, the administrator portal 9215 can have a working relationship with any number of the client portals 9220 and any number of the sub-client portals 9225. In fact, each of the participant portals in the system 9200 can have working relationships with any other portal in the system 9200. The operator of a portal can determine the parameters of such a relationship and to which portal(s) such a relationship may extend.

The vertical integration here can result in upstream and downstream portals. A downstream portal is defined as a portal that is communicatively coupled to a parent portal, while an upstream portal is defined as a portal that is communicatively coupled to a child portal. For example, the client portals 9220 can be referred to as a downstream portal in relation to the administrator portal 9215. The client portals 9220 can also be considered as an upstream portal in relation to the sub-client portals 9225.

As previously explained, the managed services system 9200 is scalable such that additional entities can be incorporated into the system 9200, and these additional entities include any suitable number of upstream and downstream portals. For example, a sub-sub-client portal (not shown) could be part of the system 9200 and could be communicatively coupled to one or more sub-client portals 9225. Another example of the scalability of the system 9200 is the oversight portal 9754 of FIG. 122. This portal 9754 can be communicatively coupled to have a working relationship with the administrator portal 9215, similar to the arrangement between the administrator portal 9215 and the client portal(s) 9220. In fact, additional upstream portals may be incorporated into the system 9200 such that the oversight portal 9754 can also be designated as a downstream portal. As such, the basic structure presented in FIGS. 87 and 122 is a mere fraction of the complexity that can be reached in the system 9200, given the scalability of the system 9200.

In one arrangement, other portals in the managed services system 9200 can be configured to implement an arrangement and processes that are similar to that described above for the administrator portal 9215. As an example, consider a client portal 9220. The structure of the client portal 9220, as explained earlier, can be similar to that of the administrator portal 9215 (see FIGS. 102 and 103). Moreover the client portal 9220 can be configured to receive applications from an application developer portal after the applications are approved by an approval portal. The application developer portal, the approval portal or both can be the application developer portal 9205 and the approval portal 9210 of FIGS. 87 and 88. In one arrangement, the application developer portal 9205 and the approval portal 9205 can be operated or managed by any suitable entity. For example, a party that manages the administrator portal 9215, such as the managing entity described above, can also manage the application developer portal 9205 and the approval portal 9210. Of course, one or more parties different from the entity can be assigned to manage the application developer portal 9205 or the approval portal 9210.

In an alternative arrangement, the application developer portal and/or the approval portal associated with the client portal 9220 can be separate and distinct from the application developer portal 9205 and the approval portal 9210 of FIGS. 87 and 88. That is, the party responsible for the client portal 9220 may wish to create or direct the creation of an application submission and approval process specifically for the client portal 9220. The operation and structure of the application developer portal and approval portal associated with the client portal 9220 can be similar in structure and operation to those portals 9205, 9210 described in relation to FIGS. 87 and 88 (see also FIGS. 89-101). Like the description above, if separate application developer and approval portals are developed for the client portal 9220, any suitable entity or entities can manage these portals. For example, the client portal 9220 may have a managing entity that is responsible for the operation of the client portal 9220 and its associated application developer and approval portals.

Just as with the administrator portal 9215, the client portal 9220 can selectively publish the applications that it receives. Further, in one embodiment, the client portal 9220 can communicate with a managed services platform 9010 and can be assigned an application repository 9130. The managed services platform 9010 and the application repository 9130 may be the same ones utilized by and assigned to the administrator portal 9215. Alternatively, the client portal 9220 may utilize a managed services platform 9010 and/or be assigned an application repository 9130 that is different from those associated with the administrator portal 9215.

Because the client portal 9220 can be configured and operated in a manner similar to that of the administrator portal 9215, the client portal 9220 can include an interface similar to the interface 9500 of the administrator portal 9215, as described above in relation to FIGS. 104-133. That is, the client portal 9220 can facilitate testing and publication of one or more applications 9316, where the applications 9316 can be published in an application repository 9130 that is associated with the client portal 9220 (see FIGS. 104-105). The client portal 9220 can also manage portable computing devices 9050 associated with the client portal 9220 on an individual basis, such as enabling the installation/removal of applications 9316 from the devices 9050 and the transmission of messages to the devices (see FIGS. 106-108).

The client portal 9220 can also permit one to access information about users of the portable computing devices 9050 (see FIGS. 109-111) and to manage firmware for the devices (see FIG. 112). Also like the administrator portal 9215, the client portal 9220 can be configured to generate, maintain and distribute bundles 9634 to the portable computing devices 9050 (see FIGS. 113-121). As such, the client portal 9220 can also enable the distribution of content (e.g., configuration settings, applications) to the devices 9050 on a group basis. Additionally, the client portal 9220 can permit maintenance/monitoring of its application repository 9130 and global management of portable computing devices 9050, as outlined in FIGS. 124-133. This includes content (e.g., settings, certificates, firmware, applications, etc.) selection and delivery (real-time or scheduled) for the devices 9050, as well as the provisioning on non-provisioned devices 9050. In summary, all the features described with respect to the administrator portal 9215 may apply to the client portal 9220. This principle may also extend to other portals, like the sub-client portals 9225 and the oversight portal 9754 and any other upstream or downstream portals.

Much of the discussion to this point has focused on internal management by a portal. For example, the administrator portal 9215, among other portals, has been described as having the capability of managing portable computing devices 9050 and application repositories 9130 that are associated with or assigned to or by the administrator portal 9215. As mentioned before, the administrator portal 9215 can offer a second set of services that are directed to client portals that have established relationships with the administrator portal 9215, such as the client portals 9220, the sub-client portals 9225, the sub-sub-client portals or any subsequent client portals.

To explain this second set of services, consider the following scenario. A first client portal 9220 and a second client portal 9220 may be communicatively coupled to and have a working relationship with an administrator portal 9215 (see FIG. 87). In addition, the first client portal 9220 can be assigned a first application repository 9130 that is associated with the first client portal 9220, while the second client portal 9220 may be assigned a second application repository 9130 that is associated with the second client portal 9220. As an example, the administrator portal 9215 can be operated and/or managed by the managing entity described above, and the first client portal 9220 can be operated and/or managed by a first client. Similarly, the second client portal 9220 can be managed by a second client. For example, referring to FIG. 122, the administrator portal 9215 can show an arrangement that demonstrates an application repository relationship between a managing entity associated with the administrator portal 9215 and the first and second clients.

In this arrangement, the first and second clients may be organizations, companies, individuals, groups, etc. that desire to have the managing entity provide services for the first and second clients through the first client portal 9220 and the second client portal 9220. Also in this example, there may be multiple portable computing devices 9050 that have been assigned to the first client portal 9220 and multiple devices 9050 that have been assigned to the second client portal 9220.

Continuing with this example, the first client portal 9220, the second client portal 9220 or both may be associated with one or more sub-client portals 9225 (see FIGS. 87 and 122). Thus, the first client can be associated with one or more first sub-clients, and the second client can be associated with one or more second sub-clients. The arrangement, therefore, can demonstrate an application repository relationship between the managing entity, the first and second client and the first and second sub-clients, if such sub-clients exist. The sub-clients may also be organizations, companies, individuals, groups, etc, that want to have the first and/or second clients provide services for them through the first sub-client portal 9225 and the second sub-client portal 9225. As the managed services system 9200 is readily scalable, these types of relationships can exist at any level among the different portals. Moreover, relationships can be forged between portals that are more than one degree apart in terms of vertical separation. For example, the administrator portal 9215 and a sub-client portal 9225 can be configured to enable the administrator portal 9215 to provide services for the sub-client portal 9225.

As explained earlier, the administrator portal 9215 can receive applications 9316 from the approval portal 9210, as submitted at the application developer portal 9205. Thus, the administrator portal 9215 can receive a notification of an application 9316 that has met an approval threshold. In response, the administrator portal 9215 can cause the presentation of the application 9316. The presentation of the application may or may not result in the application 9316 being published in an application repository 9130 associated with, for example, the administrator portal 9215, being delivered to one or more portable computing devices 9050 associated with, for example, the administrator portal 9215 or both.

In one arrangement, the administrator portal 9215 can also cause the transmission of the availability of the application 9316 to the first client portal 9220 for publication in the first application repository 9130. Similarly, the administrator portal 9215 can cause the transmission of the availability of the application 9316 to the second client portal 9220 for publication in the second application repository 9130.

The transmission of the availability of the application 9316 to the first client portal 9220 and the second client portal 9220 for publication can include different scenarios. In one arrangement, the transmission of the availability of the application 9316 for publication can provide a notice of such availability, and the first and second clients can review the application for publication suitability. The process of review can be similar to that described in relation to the administrator portal 9215. If the first or second clients determine that the available application is suitable for publication, the first or second client portal 9220 can cause the application to be published in the appropriate application repository 9130. The first or second clients, through the first or second client portals 9220, also have the option of directing the installation of the application 9316 on relevant portable computing devices 9050 on an individual, group or global (broadcast) basis. This process can be similar to that presented for the administrator portal 9215.

In another arrangement, the transmission of the availability of the application 9316 for publication can result in the automatic publication of the application 9316 in the relevant application repository 9130, the delivery of the application 9316 to the relevant devices 9050 or both. That is, the first and second clients may rely on the judgment of the managing entity to make the determination of whether to publish an application 9316 on their behalf.

In either arrangement, the administrator portal 9215 or other relevant portal can set the transmission of the availability of the application 9316 for publication on a selective basis. For example, the administrator portal 9215 can determine that the availability transmission may be sent to the first client portal 9220 but not the second client portal 9220. This determination can be based on various factors, such as input from the parties responsible for the operation of the client portals 9220 or other portals or some other suitable party. For example, the application developer portal 9205 or the approval portal 9210 can be configured to respectively permit, for example, the application developer or the party responsible for approving the application to make the selective transmission decision or at least recommend a decision.

It is understood that this process is certainly not limited to applications 9316, as the availability of other content can be transmitted to other portals. For example, the administrator portal 9215 can receive a firmware update and—if the update is deemed worthy of dissemination—can distribute the update to the application repository 9130 or some other medium accessible by a portable computing device 9050. The administrator portal 9215 can also distribute such an update to appropriate portable computing devices 9050 through the heartbeat process described above. In either arrangement, when such a firmware update is distributed (or even if it is not), the administrator portal 9215 can notify, for example, the client portal 9220 or any other portal about the availability of the firmware update. The party responsible for the client portal 9220 (or other portal) can then determine whether to distribute the firmware update to its application repository 9130, its portable computing devices 9050 or both. If the firmware update is so distributed (or even if not), the client portal 9220 can notify, for example, a sub-client portal 9225 or some other portal. This process can be repeated for other portals (both upstream and downstream), as desired. It is understood, however, that other content can be distributed in this manner, other than firmware updates. For example, any type of operational settings or parameters or any type of software package for an application repository 9130 or one or more portable computing devices 9050 may be disseminated in a similar fashion.

In fact, this arrangement can enable a node hierarchy in which virtually any form of content can be distributed between nodes. For example, a first node can generate or receive some form of content and can distribute this content to one or more lower level nodes (e.g., child nodes). Once received, a lower level node or some other suitable entity can then determine whether to make this content available to portable computing devices associated with the lower level node or some other node. Any suitable type of criteria may be used to determine whether to disseminate the received content. Non-limiting examples include applications, firmware, settings, policies, certificates, statistics, manuals, publications, video, audio, directives, etc.

In view of the vertical integration of the managed services system 9200, the management of application delivery (or other content delivery) can apply to any portal relationship in the system 9200. For example, if and when a client portal 9220 takes steps to publish an application (whether so in an application repository 9130 or through delivery to a portable computing device 9050), the client portal 9220 can cause the transmission of the availability of the application 9316 for publication to the first or second sub-client portal 9225. The first and second sub-clients, like the first and second clients, can determine whether to publish such applications 9316 or to defer to the judgment of the first or second clients for automatic publication.

The management of services contemplated here is not limited to the management of the distribution of applications. In particular, an upstream portal can be configured to manage the portable computing devices 9050, the users of such devices 9050 or the application repository 9130 associated with a downstream portal. To explain such an arrangement, again consider the relationship between the administrator portal 9215 and the first and second client portals 9220. Assume that the first and second clients have agreed to enter into an agreement with the managing entity (or other party responsible for the administrator portal 9215) such that the managing entity has the right to manage the portable computing devices 9050 and the application repositories 9130 associated with the first and second clients, including the management of the users of such devices 9050 and repositories 9130. In view of the integration and scalability characteristics of the managed services system 9200, such an arrangement can exist between any suitable number of upstream and downstream portals.

For example, the administrator portal 9215 can receive a control notification or some other form of permission from the first client portal 9220 or the second client portal 9220. The term "control notification" is defined as a notification in which one portal is granted permission to manage at least some services on behalf of another portal. Once the administrator portal 9215 receives the control notification, the administrator portal 9215 can begin to manage services for the first or second client portals 9220. In one arrangement, the administrator portal 9215 can receive additional control notifications from sub-client portals 9225 or other downstream portals. This process can permit the administrator portal 9215 to manage services for the sub-client portals 9225 and any other downstream portals. The control notifications can be sent directly from a particular portal or by a portal on behalf of another portal. For example, the client portal 9220 can generate and send a single control notification, which can authorize the administrator portal 9215 to manage services for both the client portal 9220 and a sub-client portal 9225 associated with the client portal 9220. Alternatively, the control notification can be generated and sent from the sub-client portal 9225 without any input from the client portal 9220.

Referring to FIG. 122, the management page 9750 presents an interface that enables a portal to manage services for another portal. In particular, if, for example, a control notification is received, a user of the portal that receives the notification can select from the hierarchical arrangement the portal that sent the notification. This selection may bring up the interfaces that were described above to enable the management of services for the portal sending the control notification.

To explain this process, an example will be presented in which a client portal 9220 has provided the administrator portal 9215 with a control notification. The control notification may indicate that the client portal 9220 wishes to have the administrator portal 9215 manage the application repository 9130 of the client portal 9220 (if one exists) and one or more portable computing devices 9050 that are assigned to or associated with the client portal 9220. For example, in FIG. 122, the administrator portal 9215 with the circle and the subscript "P" can receive the notification from the client portal 9220 with the circle and the subscript "C." A user of the designated administrator portal 9215 in this drawing can then, as an example, select the client portal 9220, tagged in this drawing, too. Doing so can cause the presentation of information relating to the application repository 9130 assigned to the client portal 9220. Specifically, the information related to this application repository 9130 can be presented in a form that is similar to that shown in FIG. 123 for the administrator portal 9215. This feature may also apply to other portals in the arrangement of FIG. 122, such as other client portals or sub-client portals. To permit such access, the user may be required to provide authentication information.

In view of this feature, a user of the administrator portal 9215 can access an interface for the client portal 9220 that can be similar to the application repository information page 9756 for the administrator portal 9215, as pictured in FIG. 123. That is, the application repository information page 9756 for the administrator portal 9215 can be re-branded such that the page 9756 is configured for the client portal 9220. The re-branding may not materially affect the operation of the page 9756, other than that its operation can be directed to the client portal 9220 and some indication of this change may be provided, such as a symbol or some other designation that identifies the client portal 9220. This re-branding can also provide to the user access to all the features described with respect to the application repository information page 9756 on behalf of the client portal 9220. This re-branding principle also may apply to all the pages that follow the application repository information page 9756. For example, a user of the administrator portal 9215 can view the default settings, default certificates or default applications 9316 for the client portal 9220 (see FIGS. 124-126). As another example, the user of the administrator portal 9215 can provide or make edits to the default settings, default certificates or default applications 9316, if the administrator portal 9215 has permission to do so (see FIGS. 127-129). Like the discussion above, these edits can be executed in real-time or in accordance with a delivery schedule.

As such, if permission is granted, the administrator portal 9215 can manage services for the client portal 9220 by accessing information about the application repository 9130 assigned to the client portal 9220 and information about the default settings and applications 9316 for portable computing devices 9050 associated with the client portal 9220. This management may also entail the administrator portal 9215 making changes to the default settings or applications. For example, the administrator portal 9215 can add, remove or even modify applications 9316 with respect to a default application set for the application repository 9130 of the client portal 9220 or the portable computing devices 9050 associated with the client portal 9220. As another example, the administrator portal 9215 can change VPN settings, locations services settings or the default firmware of the portable computing devices 9050 associated with the client portal 9220. These changes to the portable computing devices 9050 can be on a global or broadcast basis on behalf of the client portal 9220, and the administrator portal 9215 can also determine if the edits are to be disseminated right away or based on a delivery schedule.

In addition, a user of the administrator portal 9215 can have access to the user identifications 9816 associated with the portable computing devices 9050 of the client portal 9220, which may include the addition or deletion of the user identifications 9816 and the information related to such user identifications 9816 (see FIGS. 130-132). Further, a user of the administrator portal 9215 can have access to a devices page 9850 (see FIG. 133) that displays the portable computing devices 9050 associated with the client portal 9220. The devices 9050 of the client portal 9220 can be grouped together in accordance with several predefined categories, such as a performance function of users assigned to the devices 9050, and a searching function can be provided.

The portable computing devices 9050 of the client portal 9220 that the administrator portal 9215 can manage can include those devices 9050 that have registered with an appropriate managed services platform 9010 and are assigned to the client portal 9215. As part of its management function, the administrator portal 9215 can also enable automatic provisioning or de-provisioning of a portable computing device 9050 on behalf of the client portal 9220. For example, the administrator portal 9215 can present portable computing devices 9050 that are provisioned devices 9050 or are available devices 9050 that can be provisioned. A provisioned device 9050 in this case can be a portable computing device 9050 that is assigned to an application repository 9130 of the client portal 9220.

In one arrangement, the administrator portal 9215 can also send messages to the portable computing devices 9050 associated with the client portal 9220 on behalf of the client portal 9220. Similar to the description above, the messages can be sent to the portable computing devices 9050 associated with the client portal 9220 on a broadcast or global basis via the managed services platform 9050. This may or may not include all the devices 9050 assigned to the client portal 9220. In short, with the proper permission, the administrator portal 9215 can provide interfaces for managing another portal's application repository, portable computing devices or some other feature in which the interfaces are similar to those for managing the same for the administrator portal 9215 (see FIGS. 122-133) but which may have been re-branded to identify with the client portal 9220.

The administrator portal 9215 can also manage other services for the client portal 9220. For example, several of the interfaces of the administrator portal 9215, such as the application repository information page 9756 and the general default page 9776 (see FIGS. 123 124, respectively), can include a launch feature 9875. When activated, the launch feature 9875 can provide a user of the administrator portal 9215 with the ability to manage additional services for the client portal 9220, if the administrator portal 9215 has permission to do so. Authentication may be required for the user of the administrator portal 9215 to manage these additional services on behalf of the client portal 9220.

As an example of such additional services, the applications page 9550 of FIG. 104 can be presented, which can enable a user to manage one or more applications 9316 on behalf of the client portal 9220. The user can also review information that is associated with the applications 9316 by accessing the application selection page 9560 (see FIG. 105). Similar to that described above, the applications page 9550 and the application selection page 9560 can be re-branded in terms of the client portal 9220; however, the substantive operation of these pages 9550 and 9560 and the information that is presented can be similar to that described above in relation to FIGS. 104 and 105. As such, the administrator portal 9215 can control the operation of the application repository 9130 assigned to the client portal 9220.

For example, the administrator portal 9220 can monitor the progress of the submissions of applications 9316 and receive approved applications 9316 on behalf of the client portal 9220. These applications 9316 can be received from an application developer portal 9205 and an approval portal 9210, as explained above. The administrator portal can also provide lists of pending, available or published applications 9316 that are associated with the client portal 9220. In addition, a user of the administrator portal 9215 can determine whether to cause the publication of such applications 9316, such as in an application repository 9130 associated with the client portal 9220. This determination may include the testing or evaluation of an application 9316 in accordance with criteria set forth by the party overseeing the client portal 9220.

If the application 9316 is published in the application repository 9130 associated with the client portal 9220, the client portal 9220 or the administrator portal 9215 (on behalf of the client portal 9220) can transmit the availability of the application 9316 for publication in an application repository 9130 associated with one or more downstream portals, like a sub-client portal 9225. In one arrangement, once the application 9316 has been published in an application repository 9130 associated with the client portal 9220, the application 9316 can be downloaded to portable computing devices 9050 that are associated with the client portal 9220.

As part of the management of services for the client portal 9220, the administrator portal 9215 can also manage portable computing devices 9050 that are assigned to or associated with the client portal 9220. In particular, the administrator portal 9215 can present the devices page 9572 (see FIG. 106), the device details page 9576 (see FIG. 107) and the device application page 9590, each of which can be re-branded in a configuration that is related to the client portal 9220. As such, through these interfaces, a user of the administrator portal 9215 can see representations of and manage the devices 9050 for the client portal 9220 similar to the way that user would do so for devices 9050 associated with the administrator portal 9215. For example, the administrator portal 9215 can provide access to information about any one of the portable computing devices 9050 associated with the client portal 9220 (see previous examples), can search for such devices 9050 and can enable the installation of content on or removal of content from these devices 9050 on an individual basis, like applications 9316, configuration settings or firmware or software packages. The administrator portal 9215 can also enable a messaging feature to enable a user of the portal 9215 to generate and transmit (through a managed services platform 9010) messages to the portable computing devices 9050 of the client portal 9220 on an individual basis, similar to that process described earlier with respect to messaging to devices 9050 associated with the administrator portal 9215.

As another part of its capabilities, the administrator portal 9215 can present the users page 9596, the information page 9602 and the roles page 9606 (see FIGS. 109-111) in a re-branded format that relates to the client portal 9220. As such, a user of the administrator portal 9215 can access one or more user identifications and related information that can be associated with the portable computing devices 9050 of the client portal 9220. That is, the description related to FIGS. 109-111 in which various types of information relating to users of portable computing devices 9050 associated with the administrator portal 9215 can also apply to those users of devices 9050 that are associated with the client portal 9215. The information that can be accessed for the users associated with the client portal 9220 can be similar to that described earlier with respect to users assigned to the administrator portal 9215, although such information is certainly not necessarily so restricted. The user identifications of the client portal 9220 can also be grouped or categorized and can be searchable. In addition, the administrator portal 9215 can also be used to add or remove user identifications on behalf of the client portal 9220, if the administrator portal 9215 has permission to do so.

When it receives the control notification from the client portal 9220, the administrator portal 9215 can also present the firmware page 9620 (see FIG. 112), which can be re-branded in terms of the client portal 9220. As previously explained, firmware or other software packages can be made available to one or more portable computing devices 9050, such as through the managed services platform 9010. Moreover, such a package can be selected at the administrator portal 9215 for delivery to a portable computing device 9050 associated with the client portal 9220 by making selections at the device details page 9576 (see FIG. 107). The re-branded firmware page 9620 can facilitate this feature for the client portal 9220 by presenting one or more different firmware packages. As noted earlier, a firmware package is not necessarily limited to firmware, as other forms of software, operational settings and parameters may be part of a firmware package. The description of receiving, adding and updating firmware packages and related notifications, as well as the parties responsible for their production and delivery, can be applicable here in terms of the administrator portal 9215 handling this operation on behalf of the client portal 9220. As such, a user of the administrator portal 9215 can help facilitate the distribution of firmware packages to an application repository 9130 and/or one or more portable computing devices 9050 associated with the client portal 9220.

As part of the delegated management, the administrator portal 9215 can also manage bundles on behalf of the client portal 9220. The concept of providing bundles to one or more portable computing devices 9050 was previously described. To accommodate this feature, when the administrator portal 9215 has permission to do so, the administrator portal 9215 can present the bundles page 9630 (see FIG. 113) in a re-branded format that designates its relation to the client portal 9220. Here, bundles that can be designed for portable computing devices 9050 associated with the client portal 9220 can be made available to a user of the administrator portal 9215. The party responsible for the operation of the client portal 9220 can design these bundles or can work with another party, like the managing entity of the administrator portal 9215, to produce the bundles. The bundles—and the content contained therein—prepared on behalf of the client portal 9220 and available on the bundles page 9630 of the administrator portal 9215 can be done so based on a performance function or some other category, similar to the bundles 9634 described earlier. The bundles for the client portal 9220 may also contain default applications, settings or other items, also like the bundles 9634. See the previous discussion for examples of the content that can be contained in the bundles for the client portal 9220 or for information that can be presented for the bundles.

Bundles for the client portal 9220 can easily be added to the re-branded bundles page 9630 of the administrator portal 9215. Subsequently, a user of the administrator portal 9215 can manage these bundles on behalf of the client portal 9220 in accordance with the processes described in relation to FIGS. 113-121. For example, the administrator portal 9215, through re-branded interfaces, can allow a user to access information about the bundles and make edits to the content of the bundles, including the addition or removal of content. The administrator portal 9215 can also enable the storage/distribution of the bundles to the portable computing devices 9050 and/or the application repositories 9130 associated with the client portal 9220, in accordance with those processes described earlier with respect to FIGS. 113-121. This feature includes immediate or dynamic delivery or a delivery based on a predetermined schedule.

As such, it is possible for the administrator portal 9215 to provide content or make modifications to a group of portable computing devices 9050, i.e., a group basis. For example, an operator of the administrator portal 9215, such as the managing entity, could push applications, firmware updates or operational settings to an identified group of portable computing devices 9050 on behalf of the client portal 9220. These principles can also apply to an application repository 9130 associated with the client portal 9220.

In view of the above description, the administrator portal 9215 can be used to manage one or more services for the client portal 9220. In fact, this management can be similar to how the administrator portal 9215 can manage its own application repository 9130 and its own portable computing devices 9050. This management role can also apply to other portals. For example, if the administrator portal 9215 receives a control notification, the administrator portal 9215 can also manage services in a similar manner for a sub-client portal 9225 or other downstream portals. The administrator portal 9215 can provide such services for one or more different portals at the same time or can be configured to provide such services to only one portal at any one point in time.

Moreover, the client portal 9220 can perform the same function in relation to the sub-client portal 9225. That is, if it receives a control notification, the client portal 9220 can manage services for the sub-client portal 9225 or some other downstream portal in accordance with the description above. Like the administrator portal 9215, the client portal 9220 can provide these services to one or multiple portals at any given time. This principle is commensurate with the scalability of the managed services system 9200 (see FIG. 87) such that any portal can provide services on behalf of another portal. It is also understood that a portal can provide such services to both upstream and downstream portals, if desired. For example, as an option, the administrator portal 9215 can manage services for an upstream portal, like the oversight portal 9754, in accordance with the descriptions above. Similarly, the client portal 9220 can manage services on behalf of the administrator portal 9215.

Examples of a managed services system 9200 have been presented here (see FIG. 87). To assist in the understanding of the structure and operation of the system, certain portals were designated with functional labels. For example, because the administrator portal 9215 can provide services for the client portals 9220 in one particular embodiment, the term "administrator" was used in the descriptions above when explaining the features of this portal. Given the flexibility of the system 9200, however, it must be noted that such exemplary designations are not intended to limit the utility of the system 9200. For example, the administrator portal 9215 may operate like a client portal 9220 in relation to the oversight portal 9754. As another example, the client portal 9220 may act like the administrator portal 9215 in relation to the sub-clients 9225. In fact, the roles that the portals of the managed services system 9200 take on may be completely interchangeable.

Figure 134:
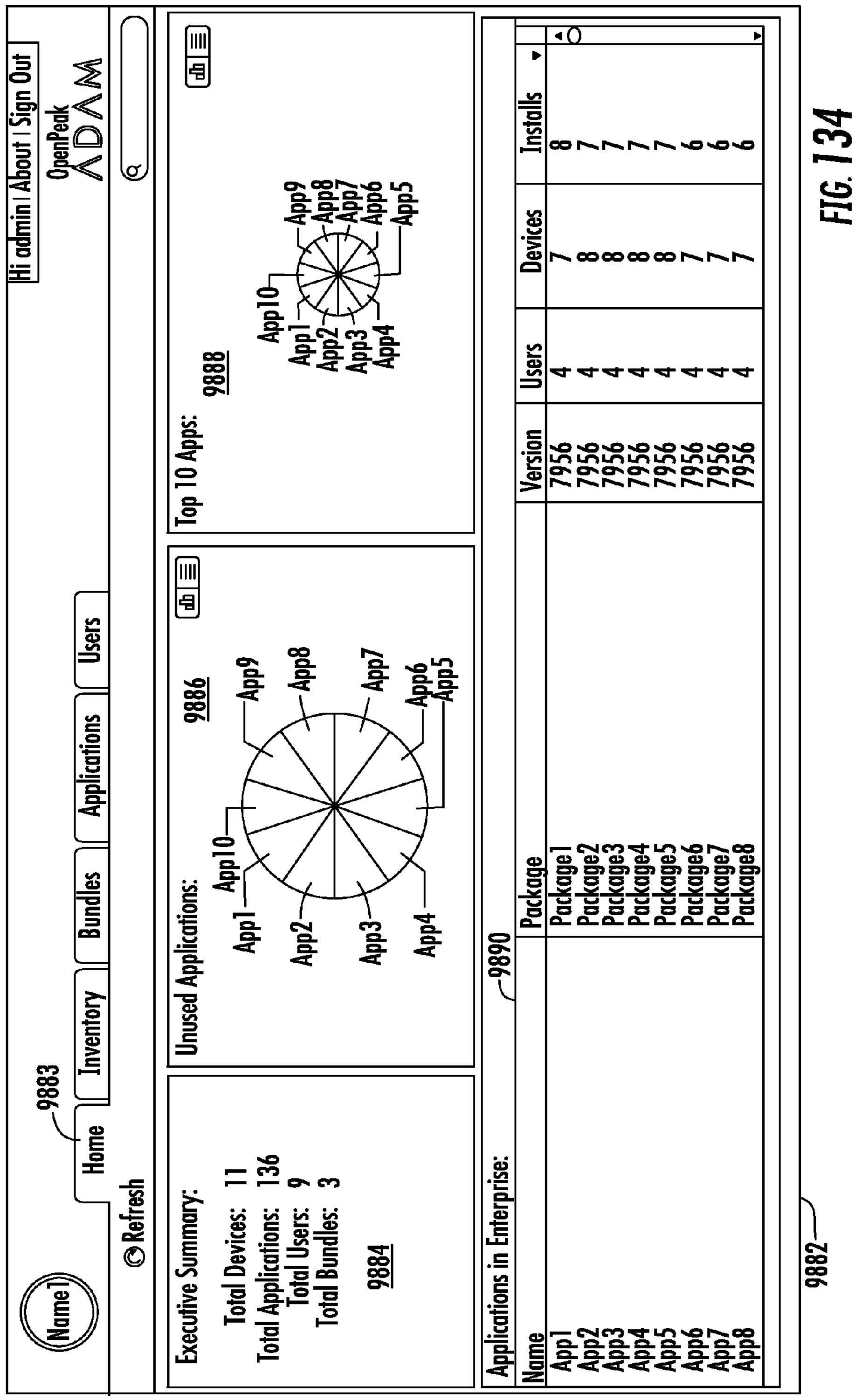
FIG. 134 illustrates an example of an interface that can be useful for enabling the management of portable computing devices.

There may be other interfaces that can be used with the system 9000 (see FIG. 86), the managed services platform 9010 (see FIG. 86) and the managed services system 9200 (see FIG. 87). One such example is shown in FIG. 134. Here, an interface 9880 is illustrated that can be useful for enabling the management of portable computing devices 9050. The principles described above may apply here such that the interface 9880 can be incorporated into any portal and operated by any suitable entity. To describe its operation, reference will be made to the administrator portal 9215, although this interface 9880 could easily be implemented into a client portal 9220, a sub-client portal 9225, an oversight portal 9754 or any other suitable portal. This interface 9880 can be used to facilitate management of portable computing devices 9050 that are associated with any entity, including an entity that is not responsible for operating or managing the portal on which the interface 9880 is implemented. Additional details will follow.

Reference will now be made to FIG. 102. As noted earlier, the administrator portal 9215 can include one or more user interface (UI) elements 9500, and the UI elements 9500 can enable a user to make selections associated with the management of services for one or more portable computing devices 9050. The administrator portal 9215 can also include a processor 9518 that can be communicatively coupled to the UI elements 9500. In one arrangement, the processor 9518 can be operable to receive a request to determine a status of one or more of the portable computing devices 9050 or to cause an action to occur on one or more of the portable computing devices 9050. The processor 9518 can also be operable to provide the status of the one or more portable computing devices 9050 or to effect the action on the one or more portable computing devices 9050. The status of the portable computing devices 9050 can be provided on an individual, group or global basis. Similarly, the action on the portable computing devices 9050 can be effected on an individual, group or global basis.

The term "status of one or more of the portable computing devices" is defined as a measurable characteristic of a portable computing device, while the term "action on one or more of the portable computing devices" means the execution of an operation on a portable computing device and includes operations that are undertaken by the portable computing device or operations that are executed under the direction of another device or system. The term "individual basis" is defined as a circumstance involving a single entity, part, device or component, while the term "group basis" is defined as a circumstance involving a group of entities, parts, devices or components that is fewer than all available entities, parts, devices or components. The term "global basis" is defined as a circumstance involving all available entities, parts, devices or components.

Many examples of providing a status of a portable computing device 9050 or effecting an action on the device 9050 on a particular basis have already been presented. For example, through the interface 9500, a user can cause applications 9316 to be installed on or removed from one or more portable computing devices 9050 on an individual, group or global basis. As another example, bundles 9634—and the content contained therein—can be delivered to or removed from such devices 9050 in accordance with an individual, group or global basis. Moreover, a user can determine the applications 9316 and other content (e.g., firmware) that are installed on such devices 9050, again on an individual, group or global basis.

Referring once again to FIG. 134, the interface 9880 presents an additional interface to permit this management of portable computing devices 9050. As explained previously, the administrator portal 9215 will be used to explain the interface 9880, as the example here will demonstrate the interface 9880 as being implemented on the administrator portal 9215. Similar to earlier descriptions, the administrator portal 9215 can be operated or managed by a first entity or a managing entity.

The interface 9880 can include a home page 9882, which can show various information related to one or more portable computing devices 9050. In one arrangement, these portable computing devices 9050 can be associated with the administrator portal 9215 and/or the managing entity. The home page can be accessed through a tab 9883. An executive summary 9884 can indicate, for example, the total number of portable computing devices 9050, the total number of applications 9316 on these devices 9050, the total number of users of the devices 9050 and the total number of bundles 9634 on the devices 9050. An unused application section 9886 can list or show, for example, the applications 9316 that are available to be installed on the devices 9050 but that are not currently so installed. In contrast, a top applications section 9888 can show, for example, the top applications 9316 for the devices 9050, in terms of the number of times each application 9316 has been installed on a device 9050. Moreover, an applications section 9890 can list all the applications 9316 that are available for installation on the devices 9050. Of course, the information presented here on the home page 9882 in FIG. 134 is merely exemplary in nature, as virtually any other suitable type of material can be shown on the page 9882.

Figure 135:
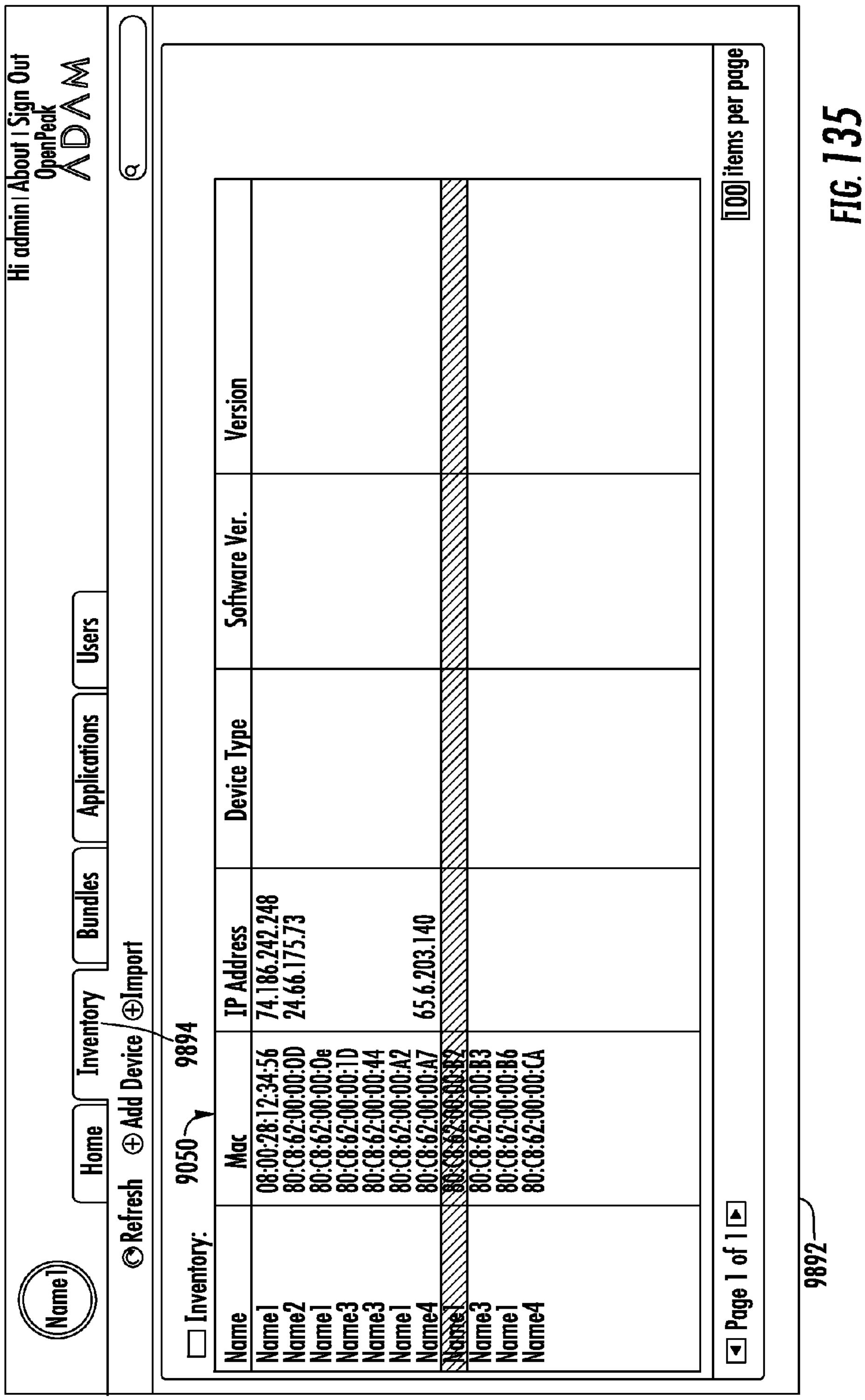
FIG. 135 illustrates an example of a devices page.

Referring to FIG. 135, another devices page 9892 is shown, which can be accessed via a tab 9894. The devices page 9892 shown here is similar in operation and design in comparison with the devices page 9572 described in relation to FIGS. 106-108. That is, the devices page 9892 can enable the management of individual portable computing devices 9050. The devices page 9892, however, shows additional features that can be implemented into a device management system.

Figure 136:
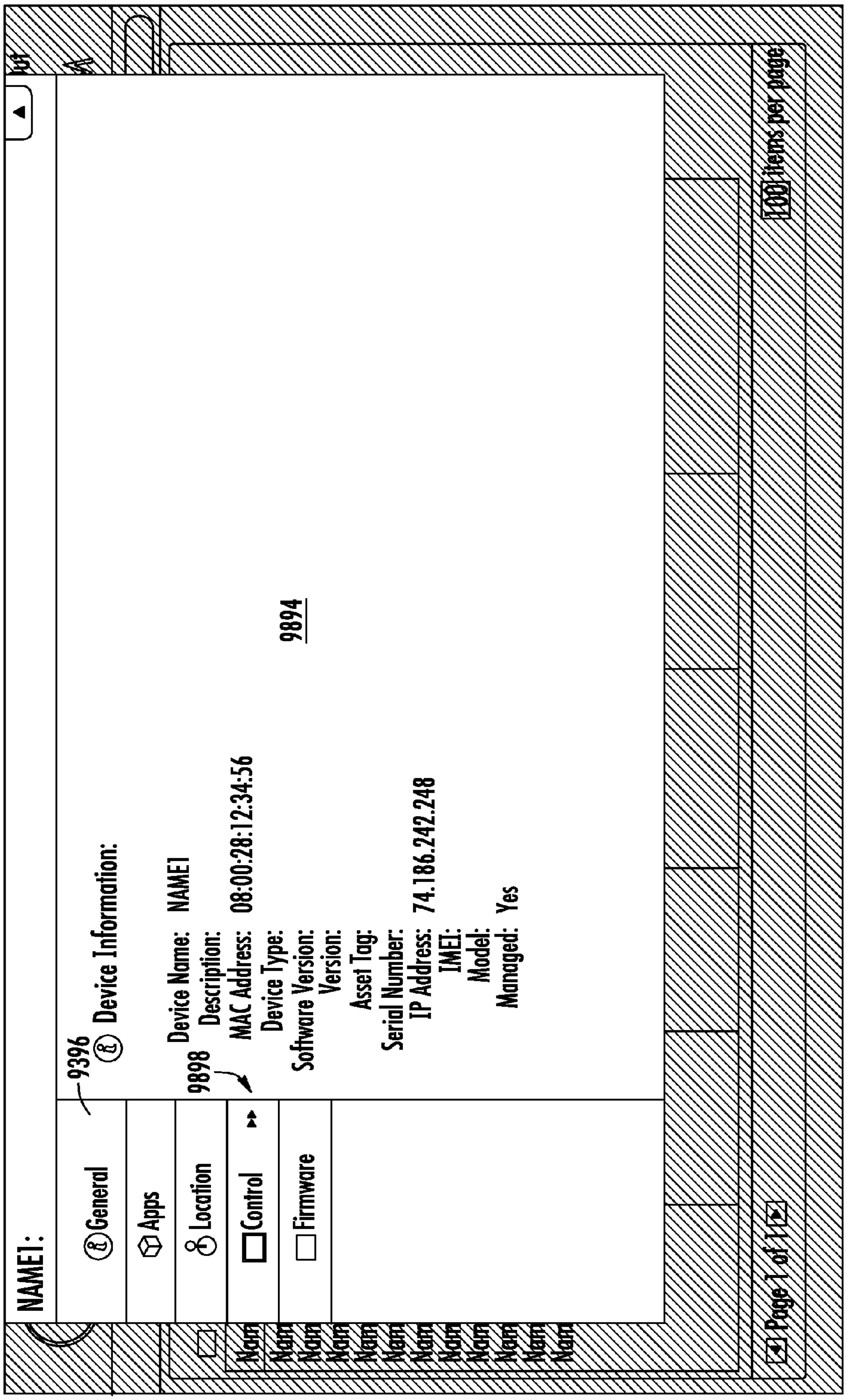
FIG. 136 illustrates an example of a device information page.

For example, selecting a device 9050 on the devices page 9892 can cause a device information page 9894 to be presented, an example of which is shown in FIG. 136. The device information page 9894 can be accessed through a tab 9896 on a tool bar 9898. The device information page 9894 can show any suitable type of information about the selected portable computing device 9050. Examples include a device name, a device description, a MAC address, a device type, a software version, an asset tag, a serial number, an IP address, an international mobile equipment identity (IMEI) number, a model type or an indication as to whether the device 9050 is managed. The device information page 9894 is in no way limited to these particular examples, as other pieces of information about the selected device 9050 can be presented.

Figure 137:
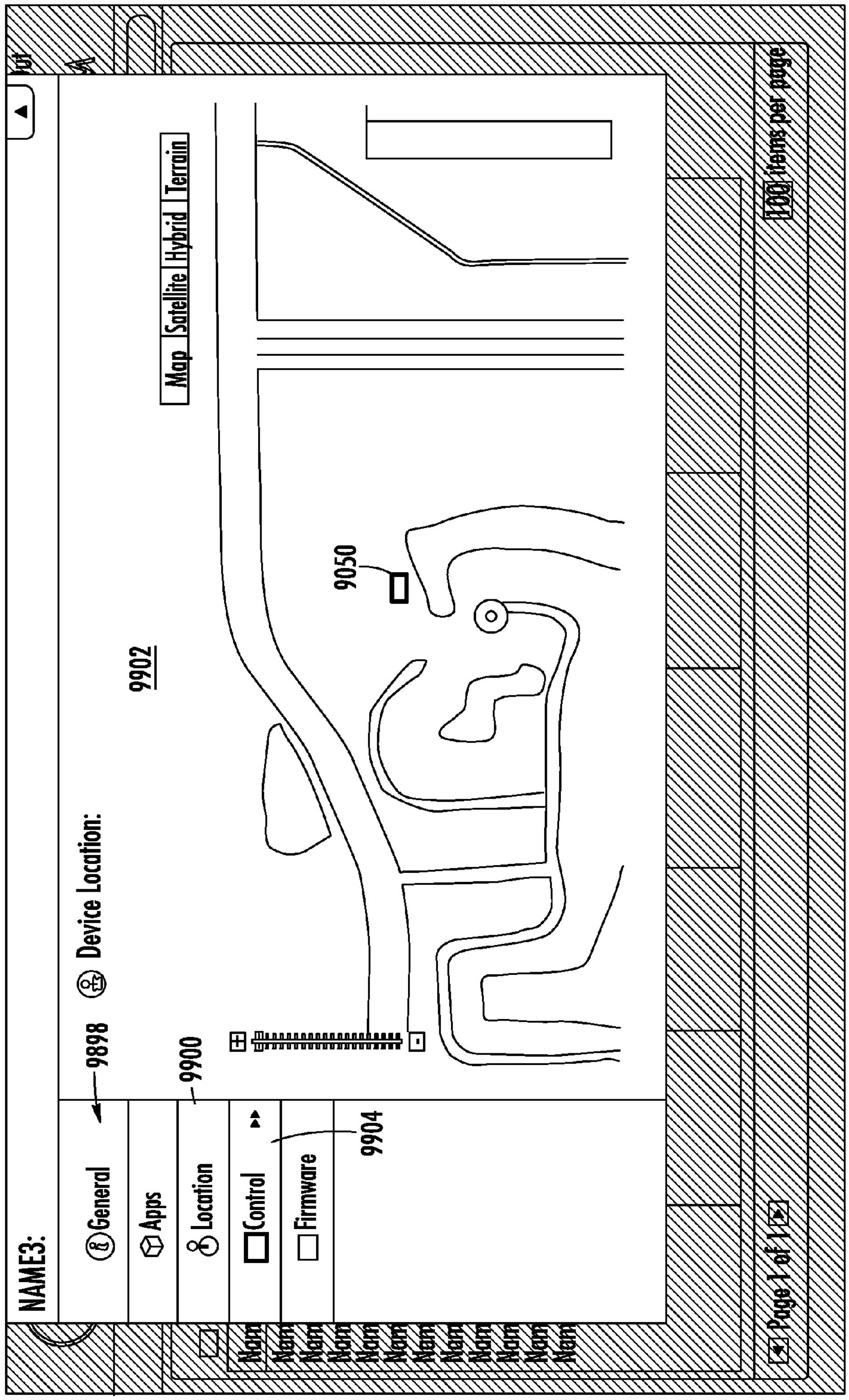
FIG. 137 illustrates an example of a location page.

Selecting a tab 9900 on the tool bar 9898 can cause a location page 9902 to be presented, an example of which is shown in FIG. 137. Through the location page 9902, the status of a portable computing device 9050 can be provide by supplying location information of the device 9050. For example, the location page 9902 can show the physical location of the selected portable computing device 9050, if such a feature has been enabled and/or authorized. The location of the selected device 9050 can be superimposed over a map or imagery of the general area. The location of the device 9050 can be updated in real time, if desired.

Figure 138:
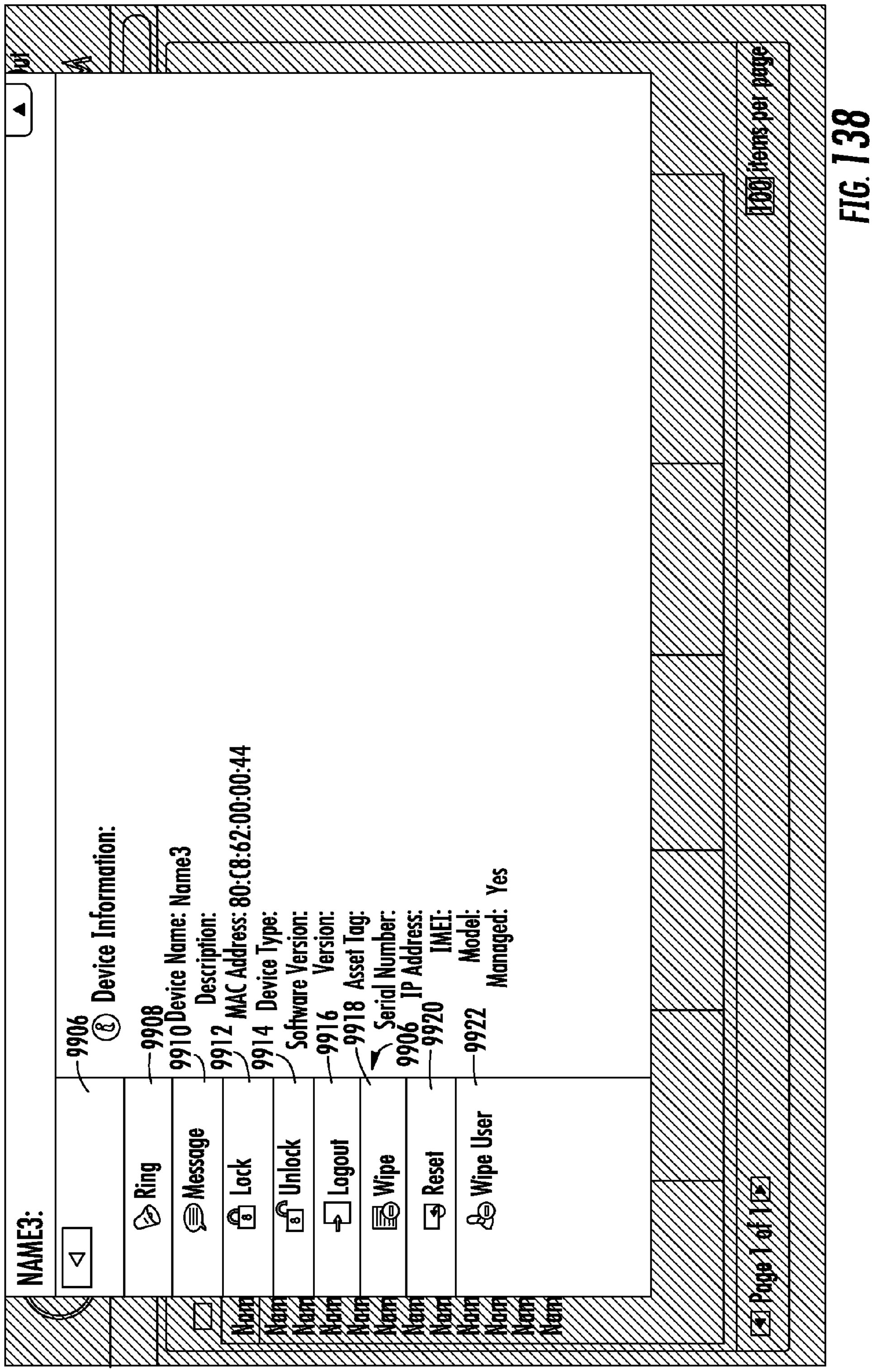
FIG. 138 illustrates an example of a menu.

Selecting another tab 9904 on the tool bar 9898 can cause a menu 9906 to be presented, as shown in FIG. 138. The menu 9906 can offer one or more features for managing the selected portable computing devices 9050. Selection of any one of these features can effect some action on the selected device 9050. For example, a ring feature 9908 can be selected, which can cause a ring tone or other signal to be generated at the device 9050. This ring feature 9908 can override any settings on the device 9050, such as a muting or silence feature on the device 9050, and can help a user locate a lost device 9050, for example. In addition, a message feature 9910 can be activated, which can permit a message to be sent to the selected portable computing device 9050. It must be noted that any message sent to any number of portable computing devices 9050 can be a predefined message or can be dynamically generated.

Selection of a tab 9912 can enable the selected device 9050 to be locked out, while selection of a tab 9914 can enable the device 9050 to be unlocked. In a locked out state, the entire device 9050 can be locked such that the device 9050 may not respond to any inputs from a user. The locked out state is not so limited, however, as the features or operation of the device 9050 can be selectively disabled. For example, in a locked out state, the device 9050 may be permitted to conduct voice calls but not allowed to conduct exchanges involving data. Selection of the tab 9914 can return the device 9050 from the locked state to the original pre-locked state or a state in which at least some features or operation of the device 9050 is enabled again. For example, the device 9050 may be completely disabled in the locked out state and selection of the tab 9914 can once again permit the device 9050 to make emergency calls or other voice calls but not data exchanges.

Selection of a tab 9916 can enable the logout of one or more users of the selected portable computing device 9050. For example, all users of the device 9050 can be logged out or only a portion of the users assigned to the device 9050. This logout feature can be activated at any time and can be set to occur automatically, such as after a predetermined time period during which no activity is detected on the device 9050.

A tab 9918 can be selected to activate a wipe feature. The wipe feature can be used to, for example, return the selected device 9050 back to factory or default settings. This process can be directed at the entire device 9050 or at only portions of the device 9050. In particular, all the features, settings, applications and content of the device 9050 can be returned to the original conditions of the device 9050 or only some of these features, settings, applications or content may be returned to such a condition. For example, several settings of the device 9050 may be returned to default, while other settings may remain intact. As an additional option here, when the wipe feature is activated, one or more security scans can be conducted on the device 9050, with results being reported back to the administrator portal 9215.

Another tab 9920 can be selected to activate a reset feature of the portable computing device 9050. As an example, the reset feature can be similar to a reboot process, although this feature is not necessarily so limited. Moreover, the reset feature can be used to rest or reboot only certain portions of the device 9050. For example, the reset feature can be used to reset a particular application. Of course, the reset feature can be used to reboot the entire operating system and other applications of the device 9050, if so desired. A wipe user feature can also be used to disable or delete the account of a user of the selected device 9050, which can be accessed through a tab 9922. This feature can be utilized if, for example, a user is no longer employed by an entity that has assigned the device 9050 to that user. While the wipe feature can be used to entirely disable or delete all settings, content, applications, etc. associated with a user, the wipe feature can also be used to only disable or delete a portion of such material. For example, only the applications associated with a particular user may be removed or otherwise disabled.

Figure 139:
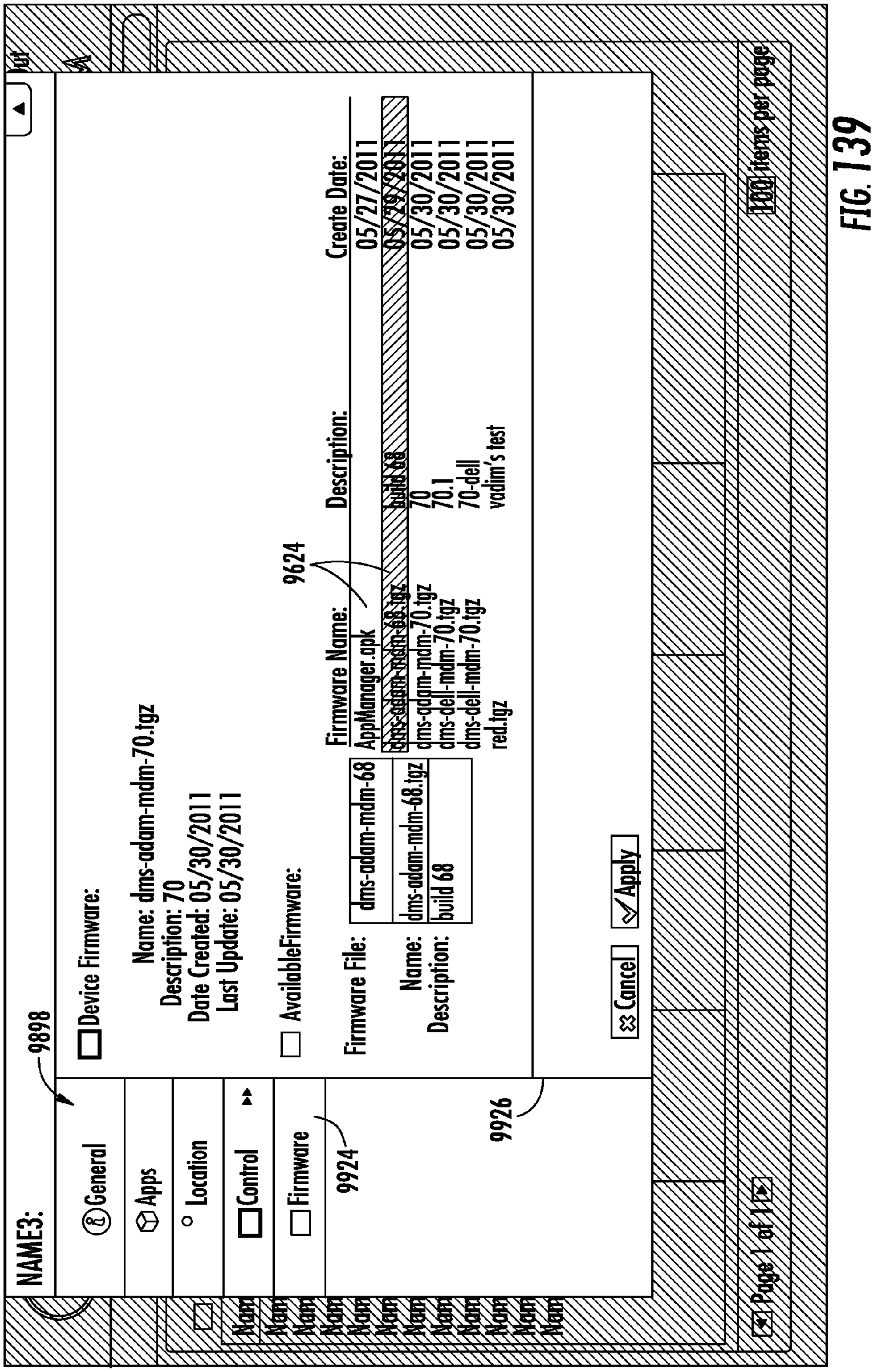
FIG. 139 illustrates an example of a firmware page.

Referring back to the tool bar 9898 (see FIG. 137), selection of a tab 9924 can cause a firmware page 9926 to be presented, an example of which is shown in FIG. 139. The firmware page 9926 is similar to the firmware features described earlier with respect to the device details page 9576 (see FIG. 107) and the firmware page 9620 (see FIG. 112). As such, a particular firmware package 9624 can be selected here and delivered in real-time or based on a scheduled time to the portable computing device 9050 through the managed services platform 9010, as previously explained.

Figure 140:
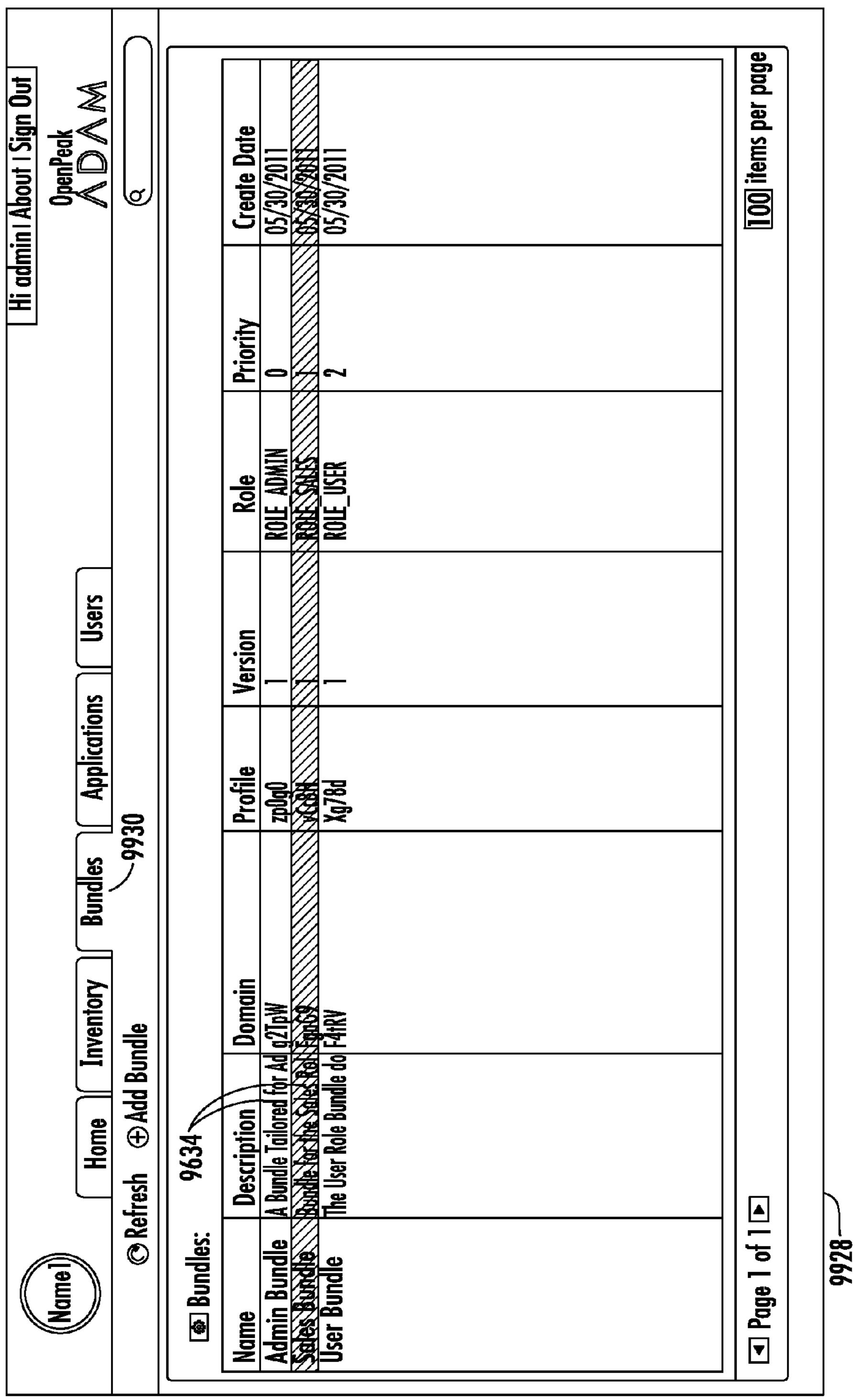
FIG. 140 illustrates an example of a bundles page.

The interface 9880 can also be configured to present and facilitate the distribution of bundles 9634 to portable computing devices 9050. For example, referring to FIG. 140, another bundles page 9928 is presented, which can be accessed through a tab 9930. Like the bundles 9634 presented earlier (see description relating to FIGS. 113-121), the bundles 9634 of this interface 9880 can be used to provide content, such as configuration settings and applications or edits to such content, to any suitable number of portable computing devices 9050 and can be distributed in real-time or in accordance with a delivery schedule.

Figure 141:
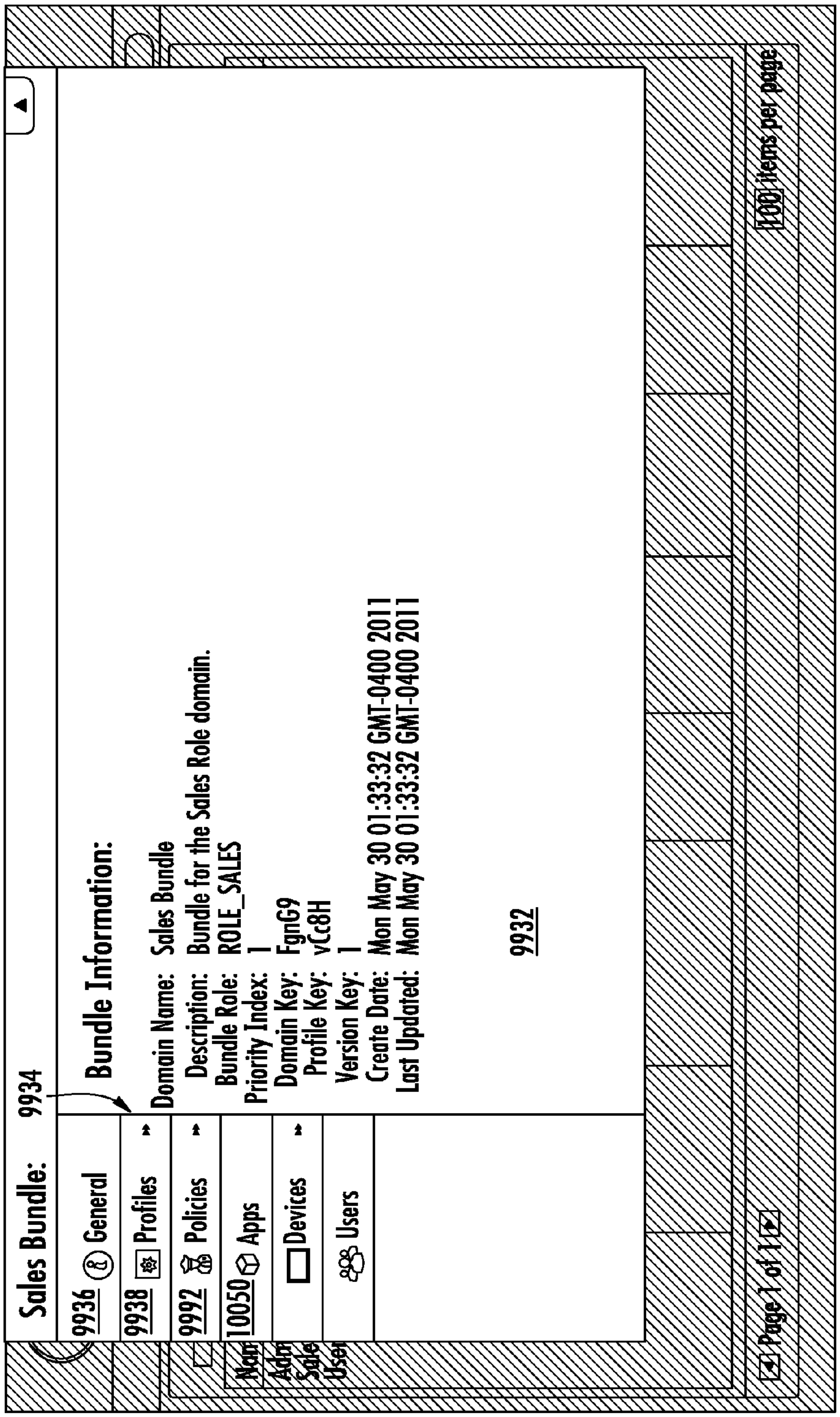
FIG. 141 illustrates an example of a bundle information page.

As an example, a bundle 9634 can be selected from the bundles page 9928, and a bundle information page 9932 can be presented, an example of which is shown in FIG. 141. As part of the bundle information page 9932, a bundle tool bar 9934 can be presented. Selection of a tab 9936 on the bundle tool bar 9934 can enable a user to access the bundle information page 9930. The bundle information page 9932 can provide any suitable type/amount of information about the selected bundle 9634. Examples include a bundle name, a description, a bundle role, a priority index, a domain key, a profile key, a version key, a creation date or a last update date. The bundle role can provide an indication as to which performance function the bundle 9634 is assigned, and the priority index can be used to prioritize the content of the selected bundle 9634 in view of other bundles 9634. In particular, a lower number for the priority index can indicate that the content of the associated bundle 9634 has a higher priority in comparison to a bundle 9634 having a higher number for the priority index. This priority index can be useful if a user of a portable computing device 9050 is assigned two or more different bundles 9634. The domain key and the profile key can be used to facilitate identification of the bundle 9634.

Figure 142:
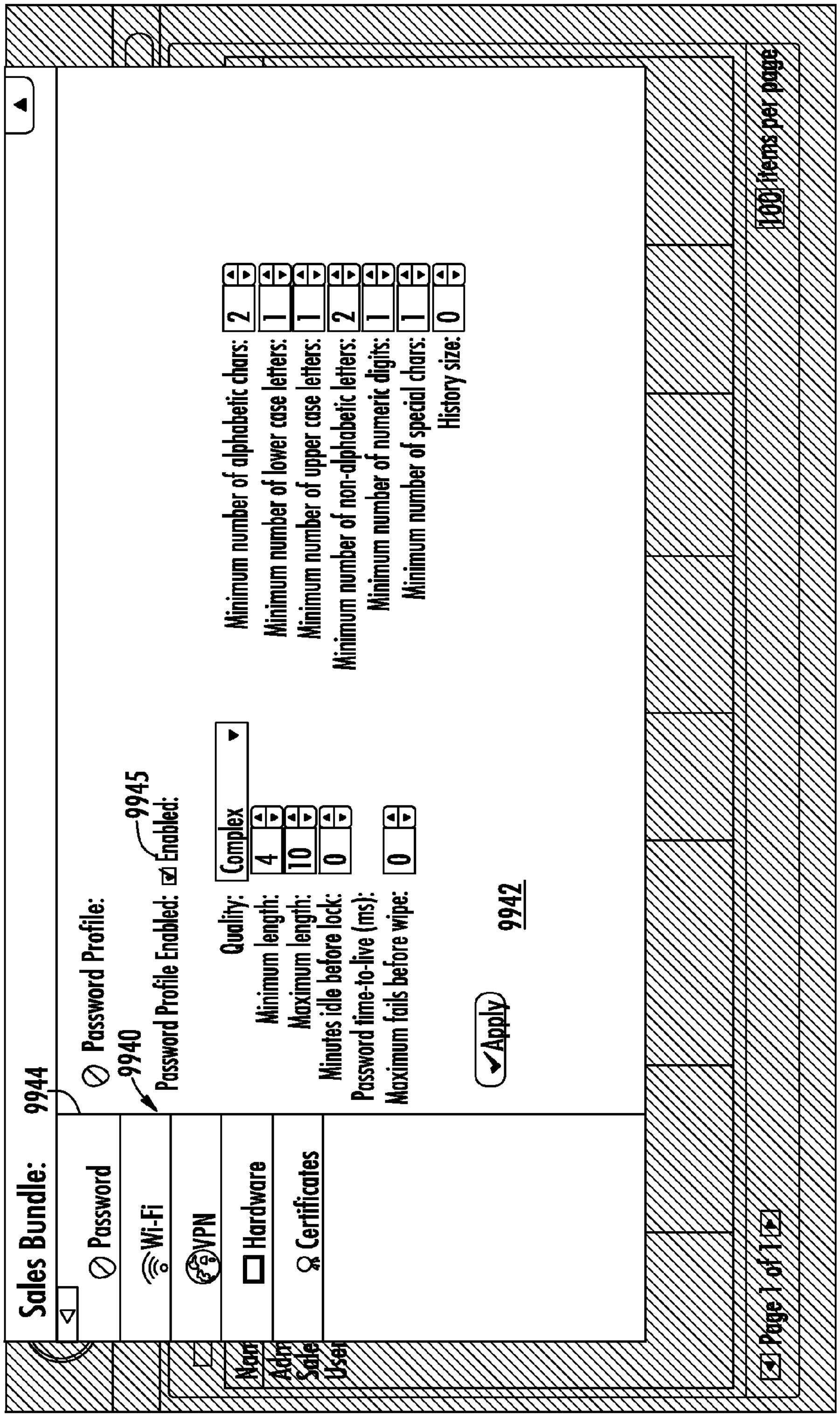
FIG. 142 illustrates an example of a profile menu.

Referring once again to the bundle tool bar 9934, activating a tab 9938 can cause a profile menu 9940 to be presented, an example of which is shown in FIG. 142. The profile menu 9940 can be configured to enable the selection of one or more profile settings, as will be explained below. For example, a password profile page 9942, which can be accessed through a tab 9944, can provide information about and enable the selection of settings related to a password for the bundle 9634. That is, the data here can be part of a bundle 9634 that when delivered to a portable computing device 9050 can establish a password feature for the device 9050. In one arrangement, the password profile page 9942 can present and/or enable the editing of the following password parameters: a level of complexity (i.e., quality); a minimum length; a maximum length; an amount of time before lock; a password lifetime; or a maximum number of times an incorrect password can be entered before the device 9050 is locked or wiped (completely or partially). A password lifetime can identify, for example, the amount of time the password may be in effect. Other examples may include a minimum or maximum number of alphabetic characters, lower case letters, upper case letters, non-alphabetic letters, numeric digits or special characters. In addition, a history size can be provided. The history size can be a parameter that sets the number of previous passwords to be reviewed to minimize the use of recent passwords. For example, a history size of three would direct the portable computing device 9050 or some other remote unit to store the last three passwords used on the device 9050 and to review these three passwords to ensure that these passwords were not currently selected as a password. An enablement feature 9945 can be activated, which can direct the relevant portable computing device 9050 to implement the password profile once the device 9050 receives the bundle 9634.

Any number of the above parameters can be edited or set on the password profile page 9942 for controlling any suitable number or type of password that may be employed on the portable computing device 9050 that has received the bundle 9634. As previously explained, such an editing or setting can be delivered to bundles 9634 installed on portable computing devices 9050 or in other components (like an application repository 9130) in real-time or in accordance with a delivery schedule. These edits can be implemented on the portable computing devices 9050 once the bundles 9634 are updated. The password profile itself can be enabled or disabled here on this page 9942. In addition, the password profile page 9942 may be configured to manage multiple passwords or the interface 9880 can have multiple password profile pages 9942 to accommodate multiple passwords.

Figure 143:
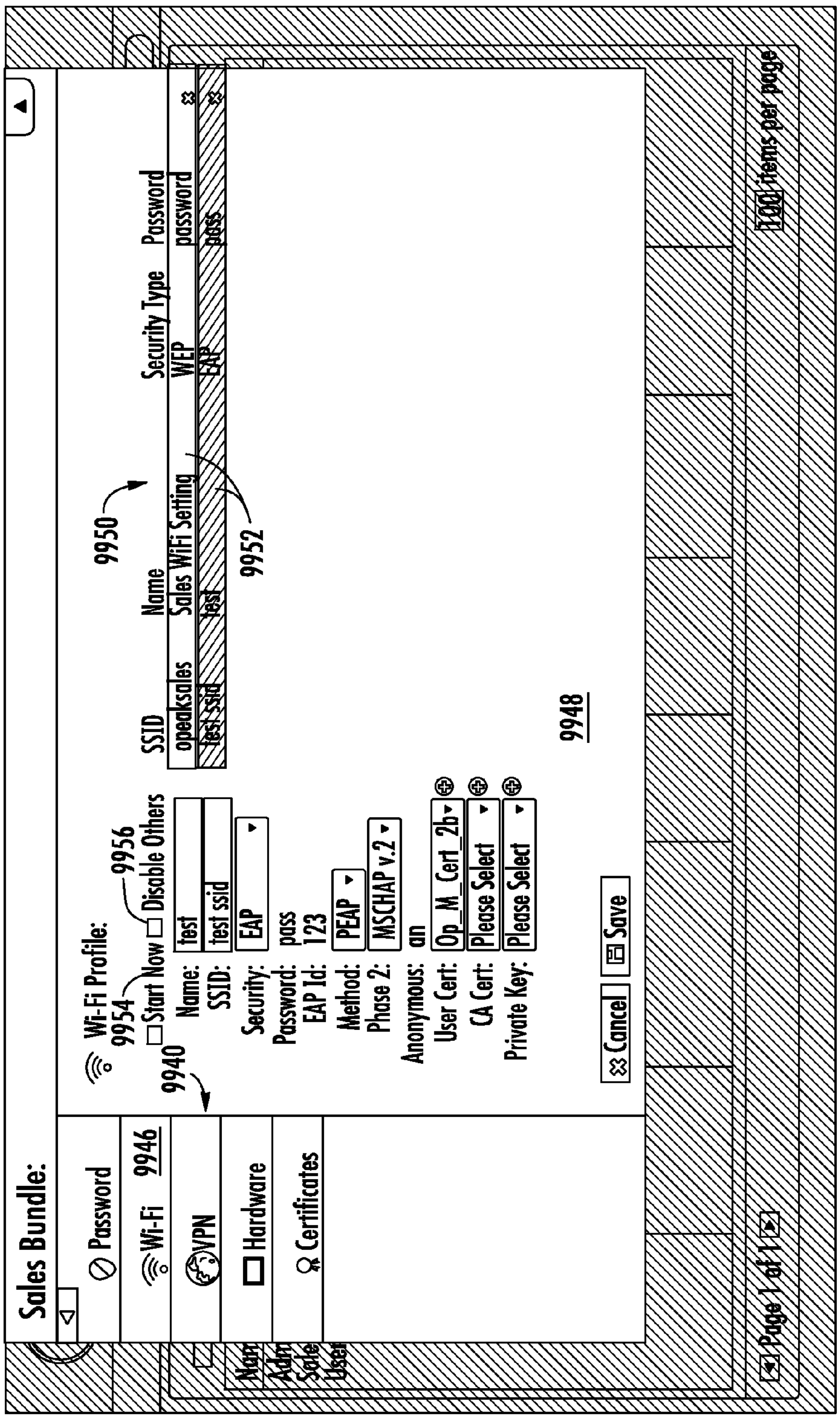
FIG. 143 illustrates an example of a wireless or Wi-Fi profile page.

Activation of a tab 9946 from the profile menu 9940 can cause a wireless or Wi-Fi profile page 9948 to be presented, an example of which is shown in FIG. 143. While the Wi-Fi profile page 9948 of FIG. 143 may be directed to Wi-Fi, it must be noted that the page 9948 is not so limited, as the page 9948 can accommodate any other suitable wireless protocol or standard. In fact, the Wi-Fi profile page 9948 can be configured to accommodate multiple wireless standards/protocols or a separate page can be used to manage different wireless standards/protocols.

The Wi-Fi profile page 9948, in one arrangement, can include a wireless profile listing 9950, which can include one or more wireless profiles 9952, any one of which may be selected for the bundle 9634 and eventually a portable computing device 9050. To the left of the wireless profile listing 9950, settings about the selected wireless profile 9952 can be presented. The following list shows examples of settings for a selected wireless profile 9952: a name; a service set identifier (SSID); a security type; a password; an extensible authentication protocol (EAP) ID; an EAP method; an EAP second phase; an EAP anonymous identifier; certificates for a user and a certificate authority; or a private key. The profile page 9948 can be configured to allow these settings to be edited, if desired.

The Wi-Fi profile page 9948 can also include an initiation feature 9954 and a disablement feature 9956. The initiation feature 9954, if activated, can direct the portable computing device 9050 that receives the bundle 9634 to connect to the SSID identified on the profile page 9948 when the device 9050 comes within range of the network. In contrast, if the initiation feature 9954 is not activated, the profile on the profile page 9948 can simply be saved in the bundle 9634 and the device 9050, and the connection to the network may be executed at a later time. In addition, the disablement feature 9956 can, when activated, direct the portable computing device 9050 that receives the bundle 9634 to disable other wireless profiles on the device 9050 and to prevent future profiles from being installed on the device 9050. This disablement can be complete such that no other profiles are permitted to be used by the device 9050, or other acceptable profiles may be permitted on the device 9050. If the disablement feature 9956 is not activated, then other profiles on the device 9050 may not be disabled.

Figure 144:
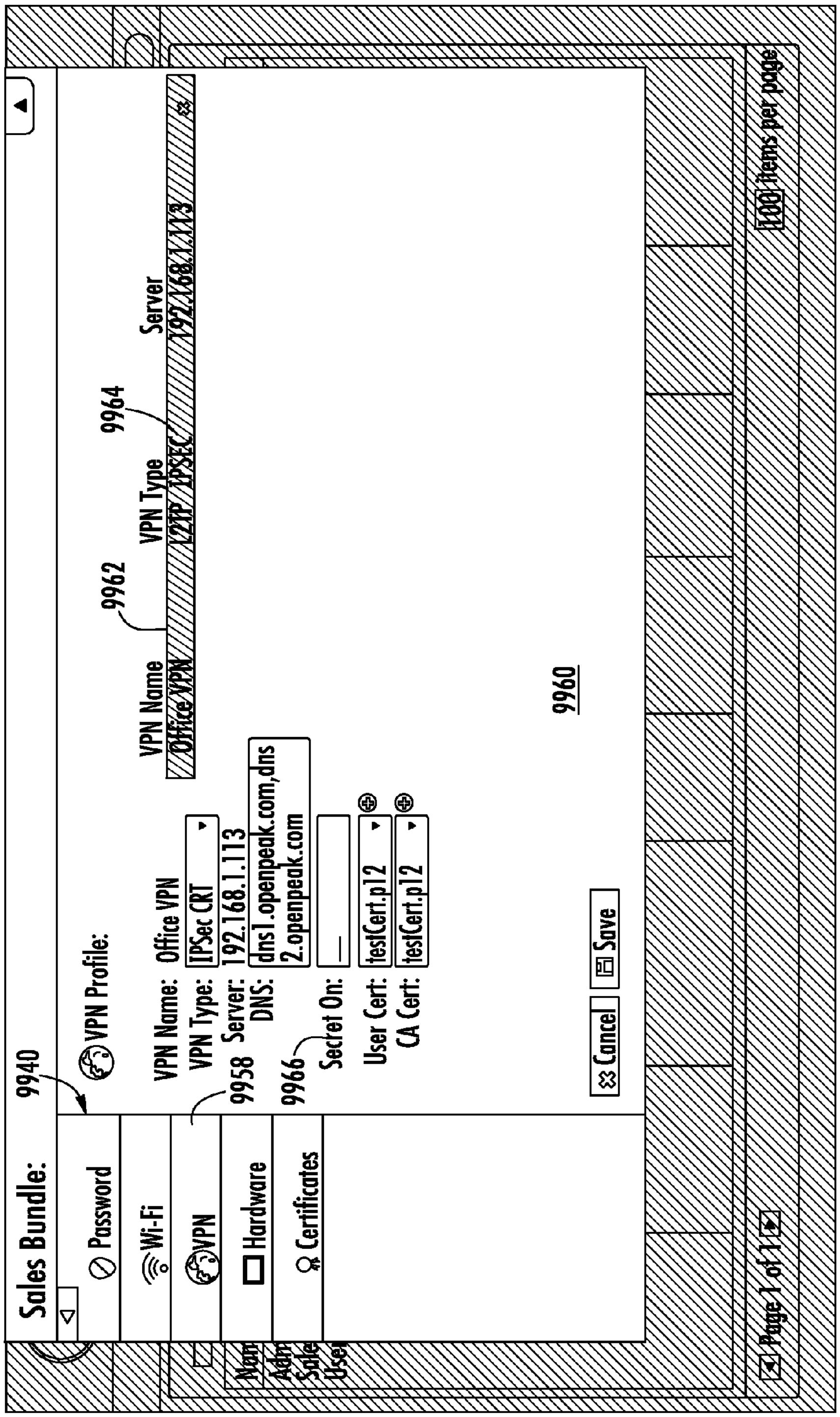
FIG. 144 illustrates an example of a VPN profile page.

Referring to FIG. 144, activation of a tab 9958 on the profile menu 9940 can cause a VPN profile page 9960 to be presented, an example of which is shown here. Like the Wi-Fi profile page 9948, the VPN profile page 9960 can include a VPN profile listing 9962, which can list one or more VPN profiles 9964. A VPN profile 9964 can eventually be implemented on a portable computing device 9050 that receives the bundle 9634 containing the profile 9964. Various settings, which can be editable, can be presented for a selected VPN profile 9964. Examples include a name; a type; a server address; one or more domain names; or certificates for a user and a certificate authority. The VPN profile page 9960 can also include a secret feature 9966. When activated, this feature 9966 can, for example, ensure that Layer 2, Tunnel Protocol secret is enabled, although other standards or protocols may be employed here.

Figure 145:
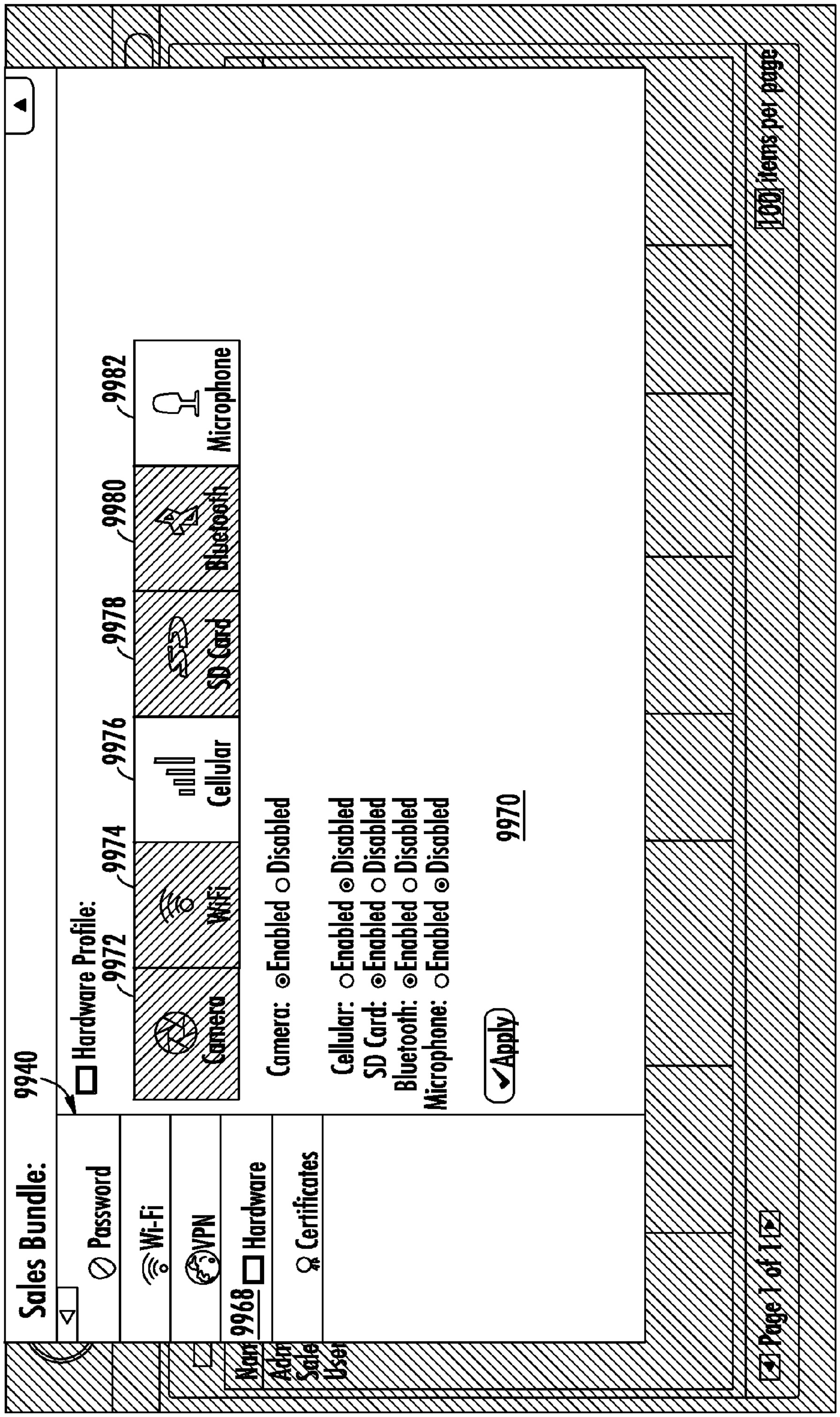
FIG. 145 illustrates an example of a hardware profile page.

Referring to FIG. 145, activation of a tab 9968 on the profile menu 9940 can cause a hardware profile page 9970 to be presented, an example of which is shown here. The hardware profile page 9970 can enable the enablement or disablement of one or more hardware features of the portable computing device 9050 that receives the bundle 9634. For example, activation of a camera feature 9972 can enable a camera on the device 9050 for operation, while deactivation of this camera feature 9972 can disable the camera such that the camera is not functional. The hardware profile page 9970 can also include, for example, a Wi-Fi feature 9974 for enabling/disabling a Wi-Fi stack of the device 9050, cellular feature 9976 for enabling/disabling a cellular stack of the device 9050, a secure digital (SD) card feature 9978 for enabling/disabling an SD card feature of the device 9050, a Bluetooth feature 9980 for enabling/disabling a Bluetooth stack of the device 9050 or a microphone feature 9982 for enabling/disabling one or more microphones of the device 9050. Any suitable indication can be used here to indicate whether a hardware feature is enabled or disabled.

It must be noted that the hardware profile page 9970 is not limited to the examples described above, as other suitable hardware features or physical components can be selectively enabled or disabled through this page 9970. Moreover, any changes made to these settings can be propagated to the devices 9050 in real-time or based on a predefined schedule.

Figure 146:
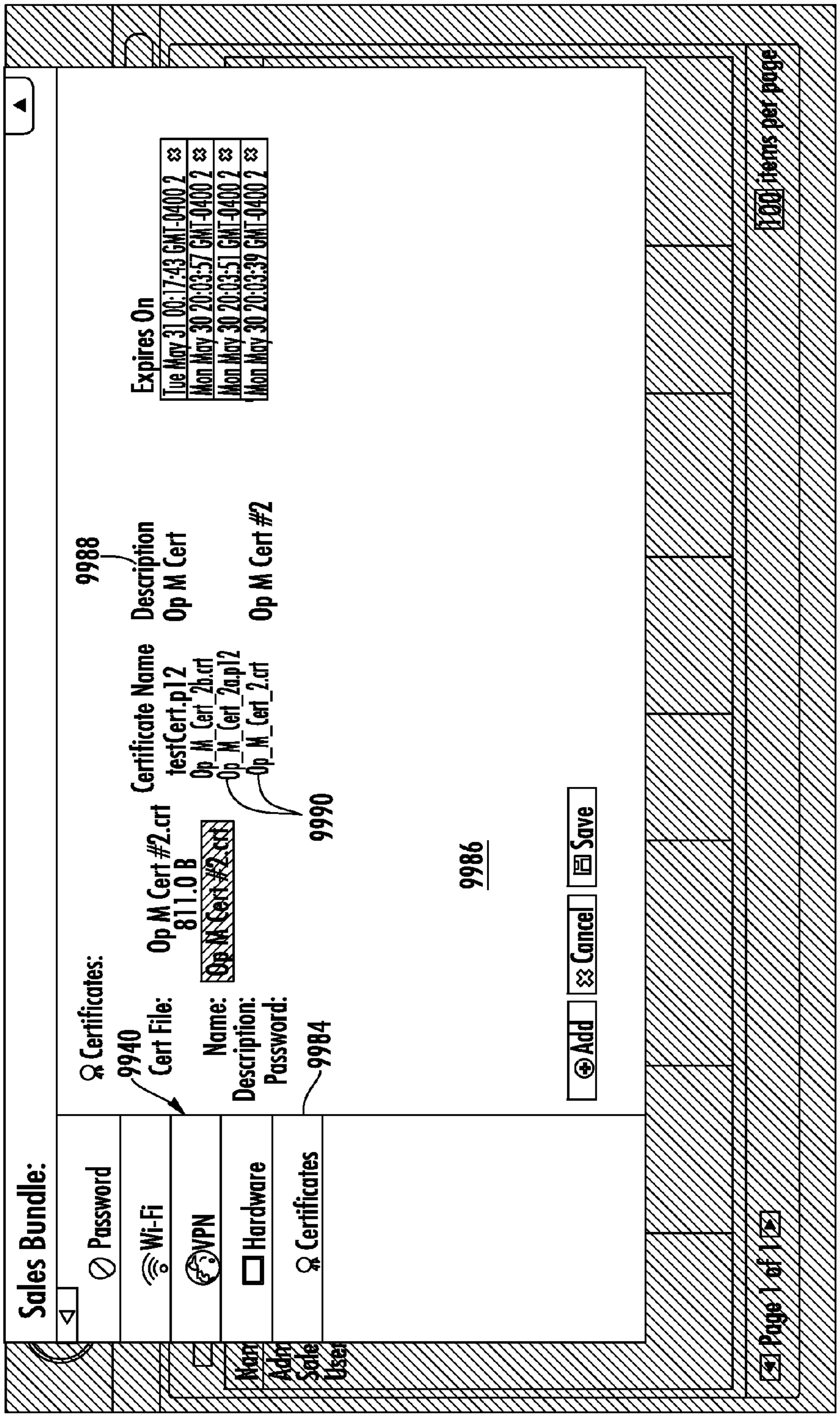
FIG. 146 illustrates an example of a certificate profile page.

Referring to FIG. 146, activation of a tab 9984 on the profile menu 9940 can cause a certificate profile page 9986 to be presented, an example of which is shown here. The certificate profile page 9986 can include a certificate profile listing 9988, which can show one or more certificate profiles 9990. One or more of the certificate profiles 9990 can be part of the bundle 9634 for the portable computing device 9050. Information such as the name, description or password for a selected certificate profile 9990 may be presented on the profile page 9986. Certificate profiles 9990 can be added or removed from the certificate profile listing 9988.

Figure 147:
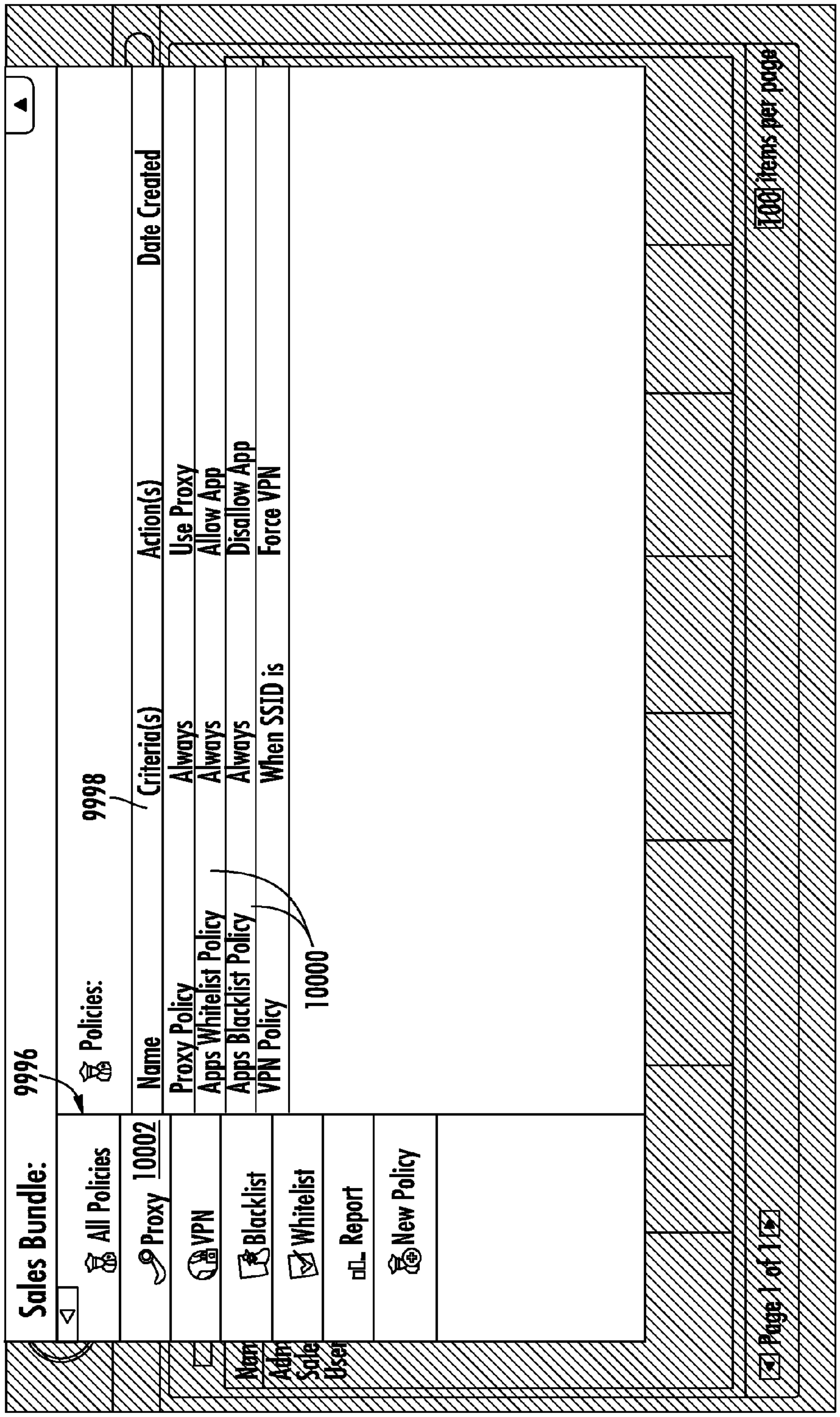
FIG. 147 illustrates an example of a policy page.

Referring back to FIG. 141, selection of another tab 9992 on the bundle tool bar 9934 can present a policy page 9994, which can define one or more actions to be executed in response to a detected event. An example of the policy page 9994 is shown in FIG. 147. The policy page 9994 can include a policy menu 9996 and a policy listing 9998. The policy menu 9996 can provide access to various policy pages, while the policy listing 9998 can list one or more policies 10000 that may be active. As an example, the policy listing 9998 may also show the detected event that may initiate the action associated with a policy 10000 and the action that is taken when such event is detected.

Figure 148:
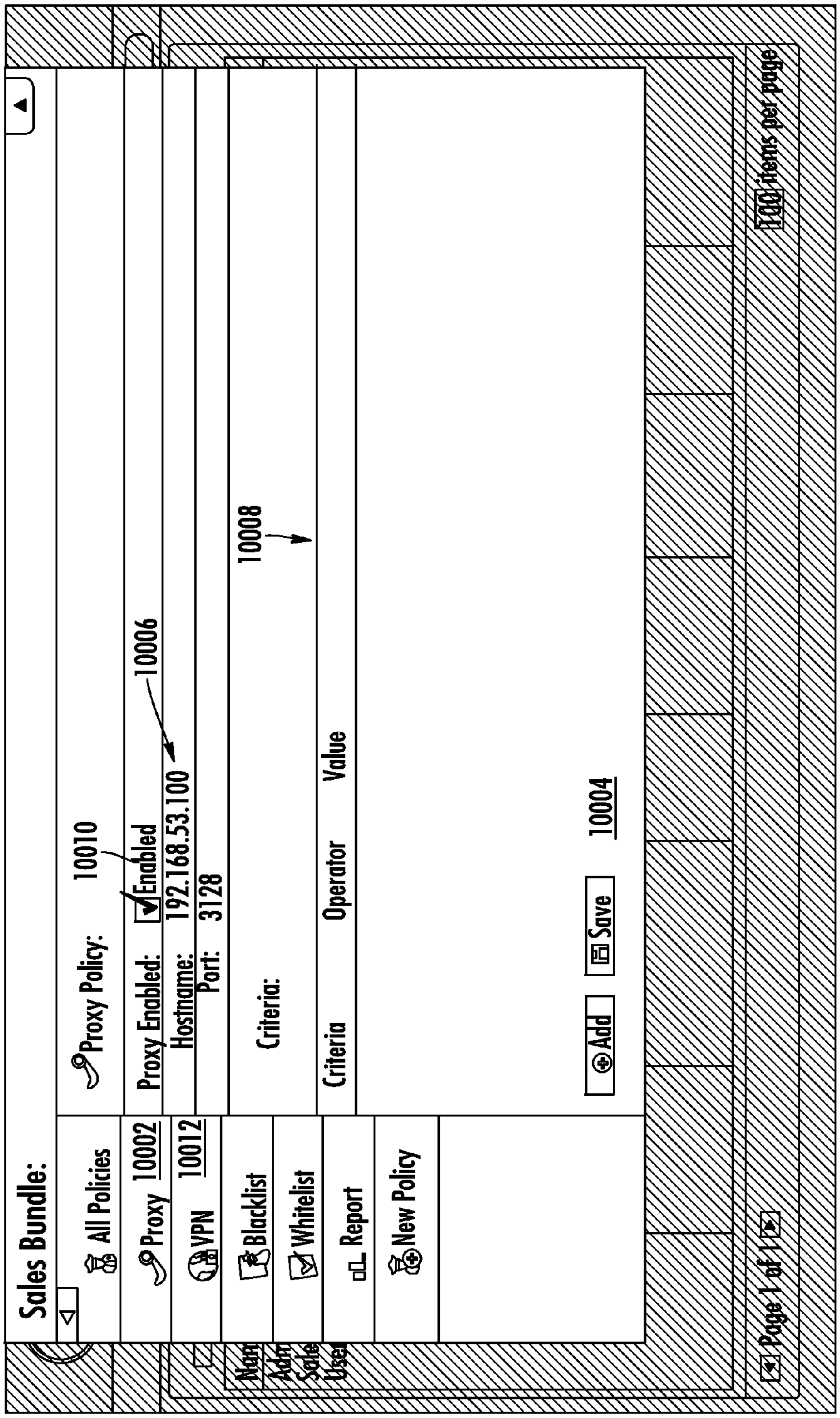
FIG. 148 illustrates an example of a proxy policy page.

Any suitable number of policies can be implemented here. As an example, a tab 10002 can be selected, which can present a proxy policy page 10004, an example of which is shown in FIG. 148. The proxy policy page 10004, in one arrangement, can identify a proxy 10006 to be used by a portable computing device 9050 that has received the bundle 9634, which may also include criteria for determining when to use the proxy 10006. For example, the proxy policy page 10004 can include a criteria listing 10008, and the listing

10008 can present the criteria or detected event that would cause the portable computing device 9050 to use the listed proxy 10006. The proxy policy page 10004 can also include an enabling feature 10010, which can ensure that the portable computing device 9050 uses the proxy 10006 when the predefined event is detected.

In one arrangement, the detected event can be a permanent condition or after a specific event or events are detected or even not detected after some time. For example, the detected event here may be to direct the portable computing device 9050 to use the selected proxy 10006 at all times or after the device 9050 is detected in a certain location. Those skilled in the art will appreciate that there are a great number of criteria that can be used to direct the portable computing device 9050 to use the selected proxy 10006. Moreover, any number of proxies 10006 and detected event information (i.e., criteria) can be added to the proxy policy page 10004 and delivered to the portable computing device 9050 in accordance with any of the methods previously described. Priority rankings can also be used in the case of multiple proxies 10006 or detected events to minimize conflicts.

Figure 149:
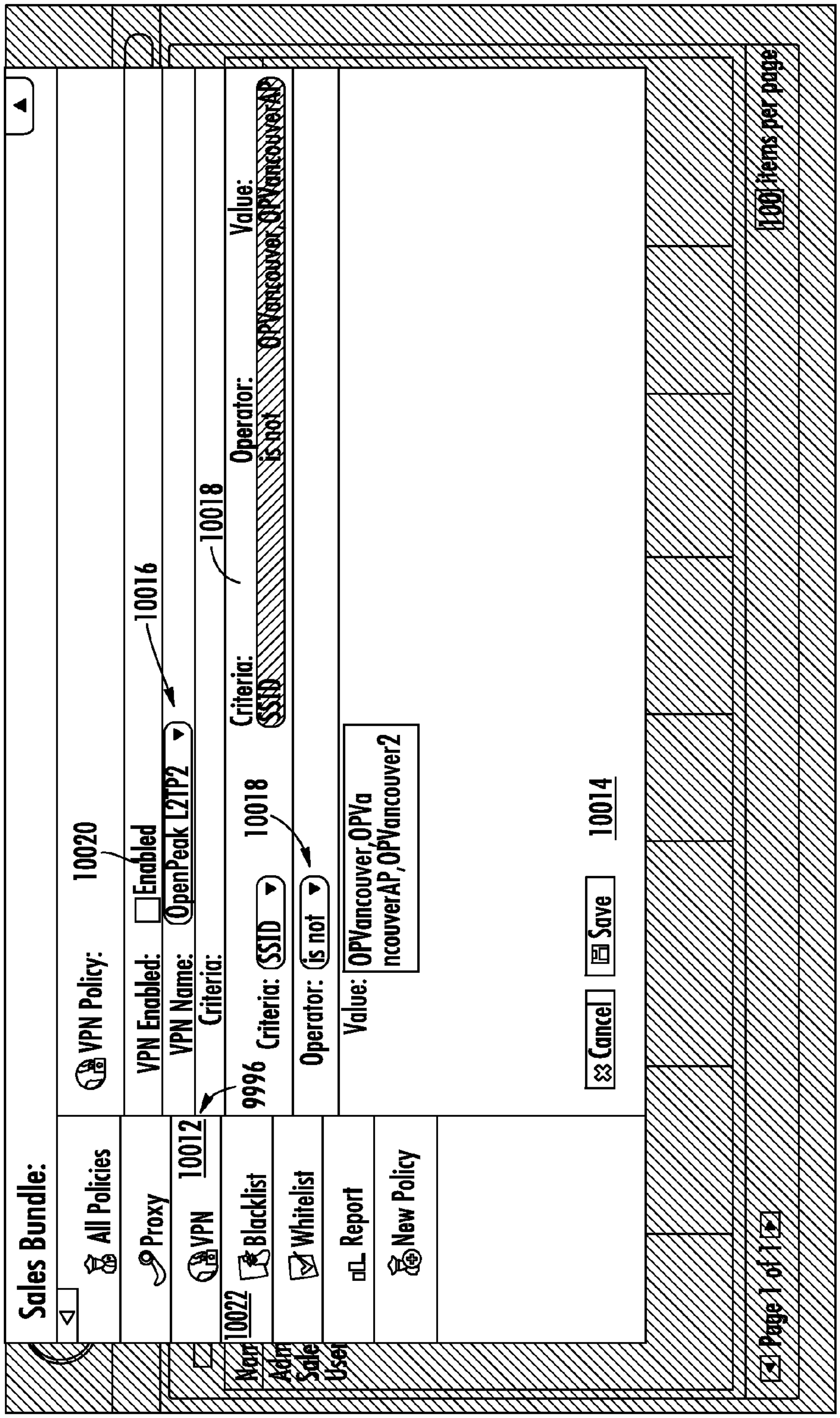
FIG. 149 illustrates an example of a VPN policy page.

Another tab 10012 can be selected, which can cause a VPN policy page 10014 to be presented, an example of which is shown in FIG. 149. The VPN policy page 10014 can be used to force the portable computing device 9050 that receives the bundle 9634 to use a selected VPN 10016 if a predefined event is detected. The VPN policy page 10014 can allow for a single or multiple VPNs 10016. In addition, the VPN policy page 10014 can include a criteria listing 10018 that can present criteria for determining when the device 9050 is to use the selected VPN 10016. For example, it can be determined that the portable computing device 9050 is not using an internal SSID, and in response, the device 9050 can be required to use the VPN 10016. An enabling feature 10020 can be provided to enable or disable the VPN policy. The settings on the VPN policy page 10014 can be edited/modified and such changes can be delivered to the portable computing device 9050 in accordance with previous discussions.

Figure 150:
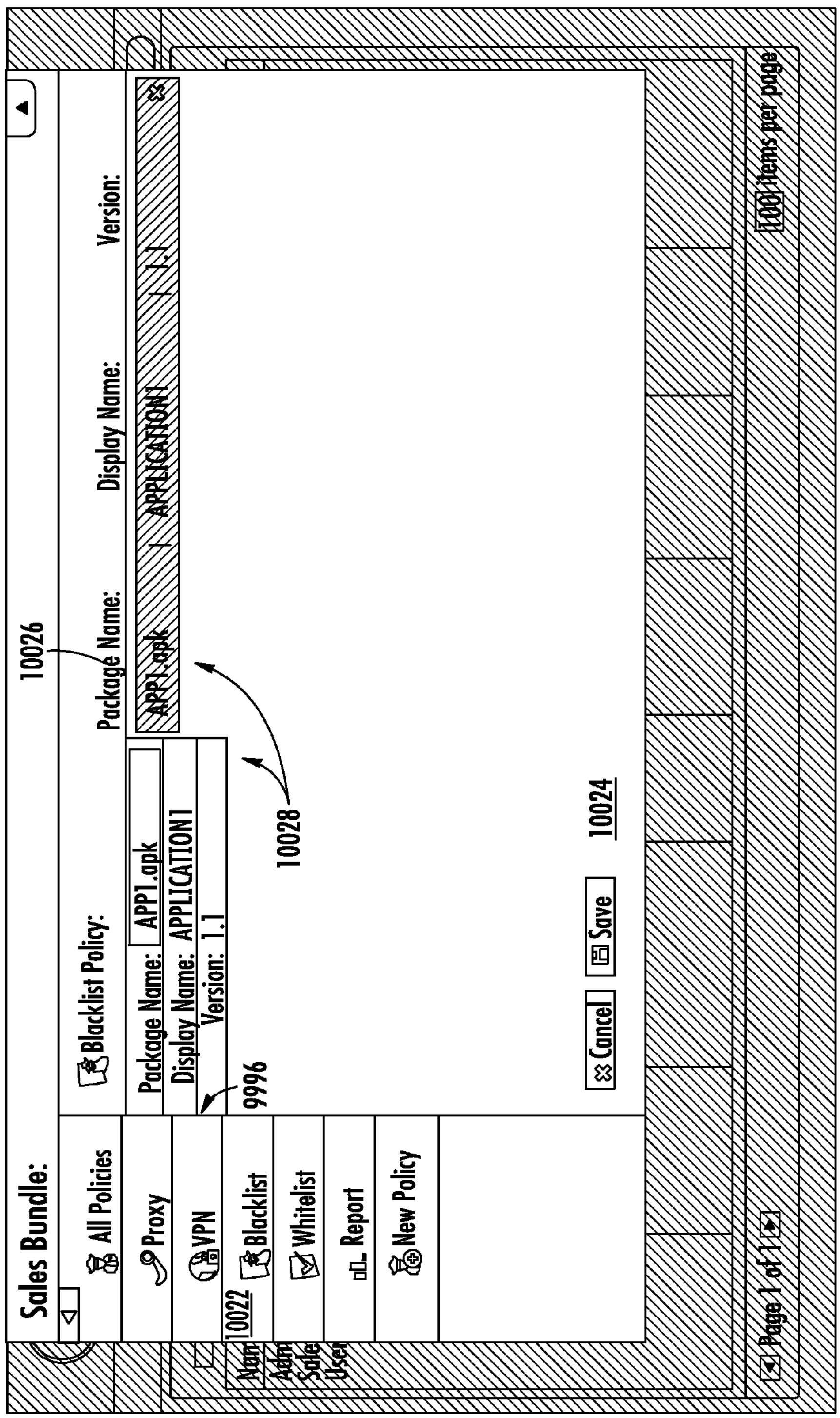
FIG. 150 illustrates an example of a blacklist policy page.

Steps can be taken to ensure that portable computing devices 9050 avoid downloading or installing questionable material, such as malware or unauthorized websites. As an example, a tab 10022 from the policy menu 9996 can be selected, and a blacklist policy page 10024 can be presented, an example of which is shown in FIG. 150. In one arrangement, the blacklist policy page 10024 can include a blocking list 10026, which can list blocked objects 10028 that are not permitted to be accessed by or downloaded or installed on the portable computing device 9050 that has received the bundle 9634. Non-limiting examples of blocked objects 10028 may include applications or Internet sites. Any suitable number of blocked objects 10028 may be added to (or removed from) the blocking list 10026. Again, any changes to the blacklist policy page 10024 can be propagated to the portable computing devices 9050 in accordance with earlier discussions.

Figure 151:
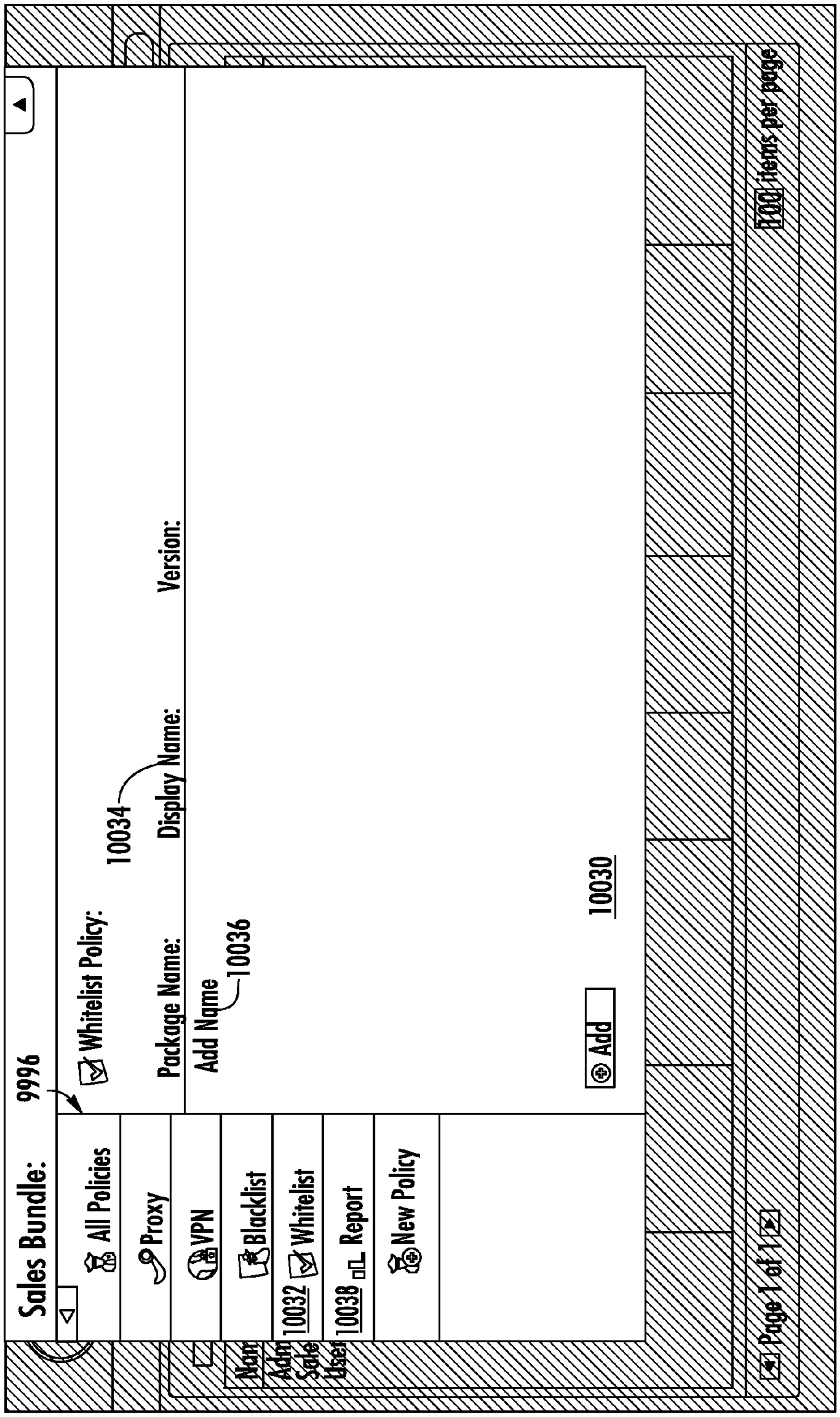
FIG. 151 illustrates an example of a whitelist policy page.

A whitelist policy page 10030, in contrast, can be used to identify material that is permitted to be accessed by or downloaded or installed on the portable computing device 9050, an example of which is shown in FIG. 151. The whitelist policy page 10030 can be accessed by selecting a tab 10032 from the policy menu 9996 and can present an allowance list 10034, which can present allowed objects 10036 that are permitted to be accessed by or downloaded or installed on the device 9050. Non-limiting examples of allowed objects 10036 may include applications or Internet sites. Any suitable number of allowed objects 10036 may be added to (or removed from) the allowance list 10034. Like the blacklist policy page 10024, any changes to the whitelist policy page 10030 can be propagated to the portable computing devices 9050 in accordance with earlier discussions.

In one arrangement, the blacklist policy page 10024 or the whitelist policy page 10030 (or both) can be configured such that their restrictions/allowances may take effect based on detected events (i.e., criteria). For example, the restrictions of the blacklist policy page 10024 may be set to only take effect when a user of the portable computing device 9050 is within a working location, as determined by the detection of a specific SSID.

Figure 152:
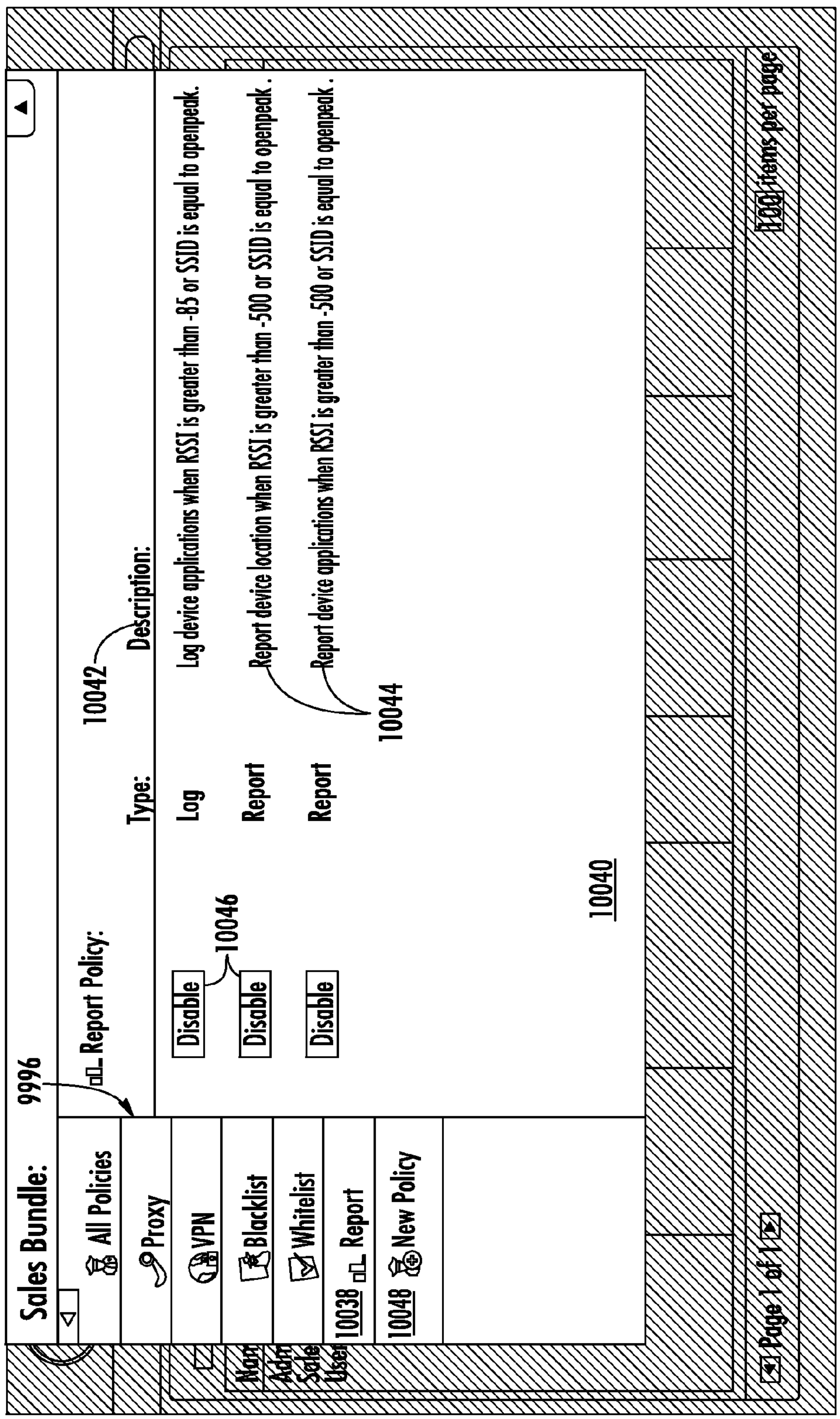
FIG. 152 illustrates an example of a report policy page.

Selecting a tab 10038 on the policy menu 9996 can cause a report policy page 10040 to be presented, an example of which is shown in FIG. 152. The report policy page 10040 can include a report listing 10042, which can show one or more reporting policies 10044. A reporting policy 10044 can cause a portable computing device 9050 that has received the bundle 9634 to report one or more parameters or conditions in response to a detected event. A detected event can be any condition that can be detected and useful for reporting conditions or characteristics about the portable computing device 9050. For example, if the portable computing device 9050 determines that its signal strength (or received signal strength indication (RSSI)) has reached or is above a predetermined threshold or that the SSID in contact with the device 9050 is a certain SSID, then the reporting policy 10044 can direct the device 9050 to report its location to any suitable entity or component.

Any suitable number of reporting policies 10044 may be part of the report listing 10042 and priority rankings can be employed here to minimize conflicts. Reporting policies 10044 can also be added or removed from the report listing 10042, and any edits or changes to the report policy page 10040 can be distributed to the portable computing device 9050 in accordance with prior descriptions. The report policy page 10040 can also include activation/deactivation features 10046, which can be used to selectively activate or deactivate reporting policies 10044.

A new policy tab 10048 can be part of the policy menu 9996. Through this tab 10048, additional policies may be added to the policy menu 9996. The policy menu 9996 can also include a delete policy tab (not shown) for removing unwanted policies.

Figure 153:
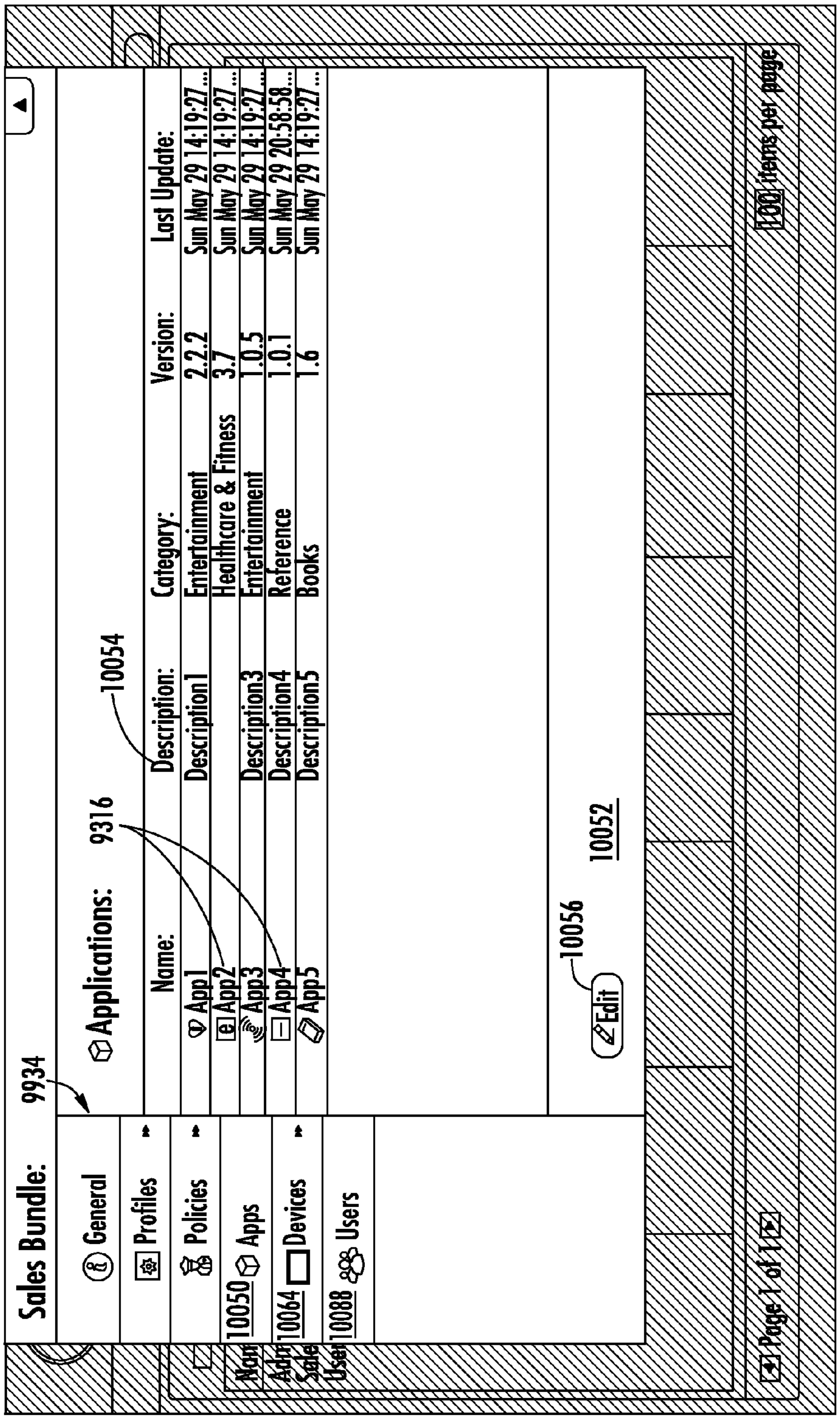
FIG. 153 illustrates an example of an application page.
Figure 154:
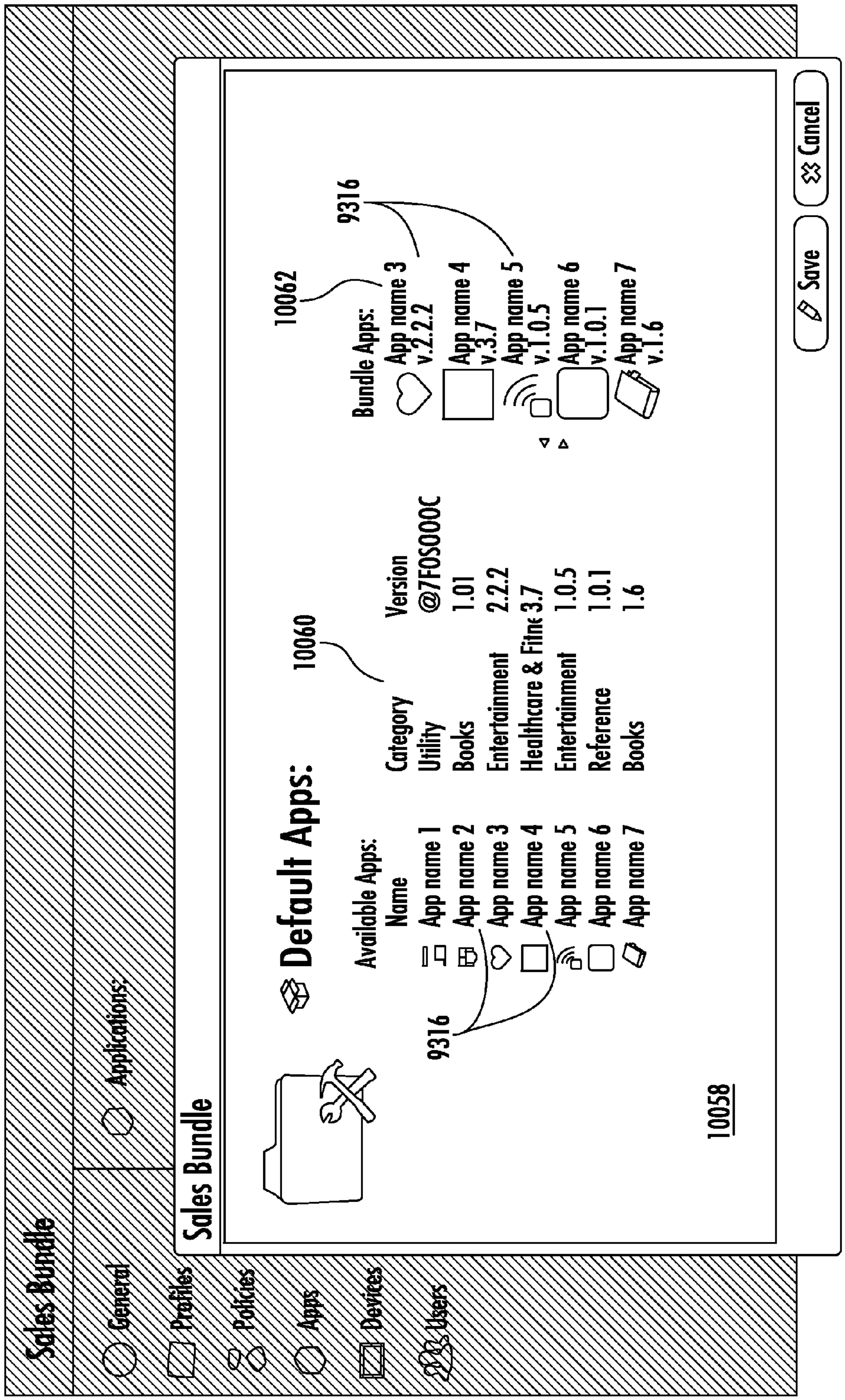
FIG. 154 illustrates an example of an application edit page.

Referring back to the bundle tool bar 9934 of FIG. 141, selection of a tab 10050 can cause an application page 10052 to be presented, an example of which is shown in FIG. 153. The application page 10052, similar to the description presented with respect to, for example, FIGS. 114 and 121, can include an application listing 10054 that can show the applications 9316 that are part of the bundle 9634. As explained previously, in one arrangement, these applications 9316 can be default applications 9316. Selection of an edit feature 10056 can cause an application edit page 10058 to be presented, an example of which is shown in FIG. 154. Here, in accordance with previous descriptions, one or more available applications 9316 in an available application listing 10060 can be added to a bundle application listing 10062 and, hence, the bundle 9634. Moreover, applications 9316 can also be removed from the bundle 9634 by moving applications 9316 from the bundle application listing 10062 back to the available application listing 10060. These edits can be propagated to the portable computing devices 9050 containing the bundle 9634, as previously described, in real-time or based on a delivery schedule.

Figure 155:
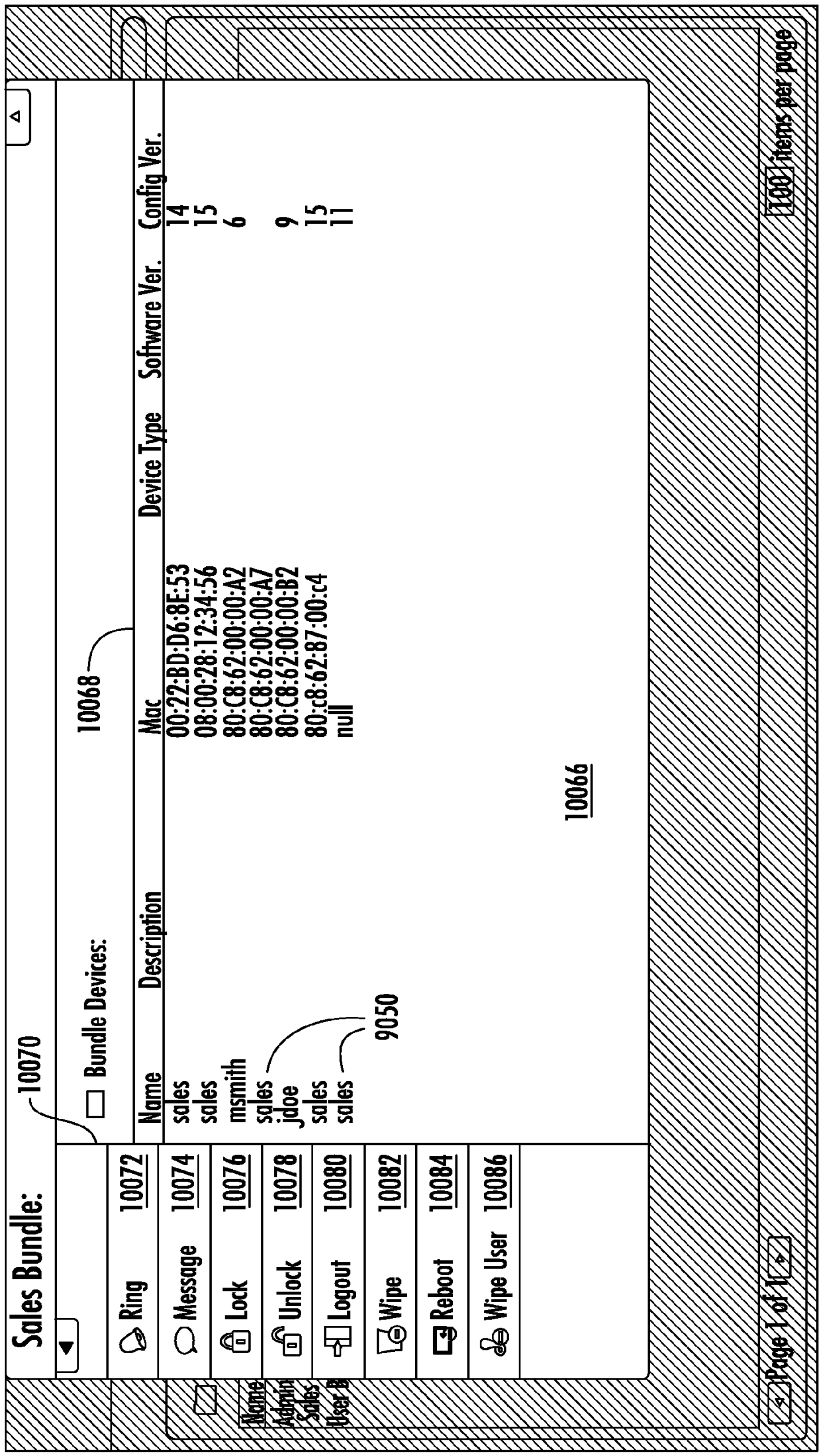
FIG. 155 illustrates an example of a bundle devices page.

Referring back to FIG. 153, the bundle tool bar 9934 can also include another tab 10064, selection of which can cause a bundle devices page 10066 to be presented, an example of which is shown in FIG. 155. The bundle devices page 10066 can include a devices listing 10068, which can show all the portable computing devices 9050 that have received the bundle 9634. The bundle devices page 10066 can also include a devices menu 10070, which can provide selections that are similar to those described with respect to FIG. 138. Through the devices menu 10070, the portable computing devices 9050 that have received the bundle 9634 can be managed by invoking any one of the options of the menu 10070. For example, selection of a ring tab 10072 can cause each of the devices 9050 that have received the bundle 9634 to activate a ringer or some other alert mechanism. As another example, selection of a messaging tab 10074 can cause a message to be delivered to these devices 9050, while selection of a locking tab 10076 and an unlocking tab 10078 can respectively cause the devices 9050 to lock and unlock the devices 9050 (see earlier description for details).

As another example, selection of a logout tab 10080 can cause current users of the portable computing devices 9050 to be logged out, possibly necessitating a re-authentication. As yet another example, selection of a wipe tab 10082 can enable the portable computing devices 9050 to be rest to factory or default settings, which can be designed to affect the entire device 9050 or a portion of the device 9050. A reboot tab 10084 can be selected to facilitate a reboot of the portable computing devices 9050, while a wipe user tab 10086 can be used to reset (e.g., return to factory or default settings) one or more users associated with the portable computing devices 9050.

The tabs presented in the devices menu 10070 can enable the portable computing devices 9050 that have received the bundle 9634 to be managed in accordance with their respective functions, as outlined above. It must be noted, however, that there may be other ways to manage such devices 9050 above those presented here. Moreover, the devices menu 10070 is not necessarily required to have each of the tabs that are shown here.

Figure 156:
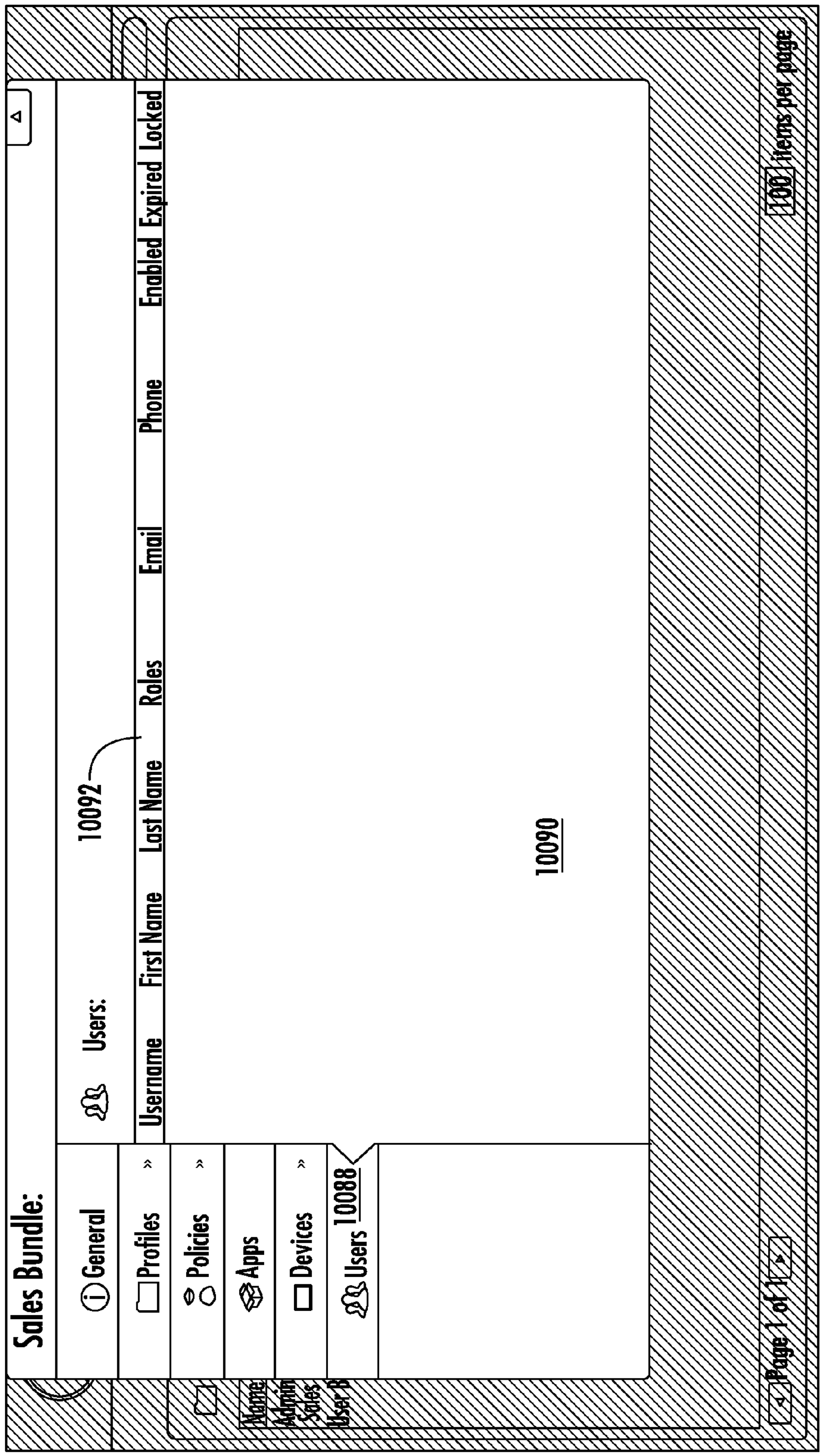
FIG. 156 illustrates an example of a users page.

Referring back to FIG. 153, the bundle tool bar 9934 can also include another tab 10088, selection of which can cause a users page 10090 to be presented, an example of which is shown in FIG. 156. The users page 10090 can include a users listing 10092, which can show each of the users that are assigned to portable computing devices 9050 that have received the bundle 9634. In addition to presenting the users, the users page 10090 can also be configured to enable the management of these users. For example, the users page 10090 can be designed to enable the addition or removal of users, the level of access to content/information provided to the users or the assignment of users to particular bundles 9634.

Figure 157:
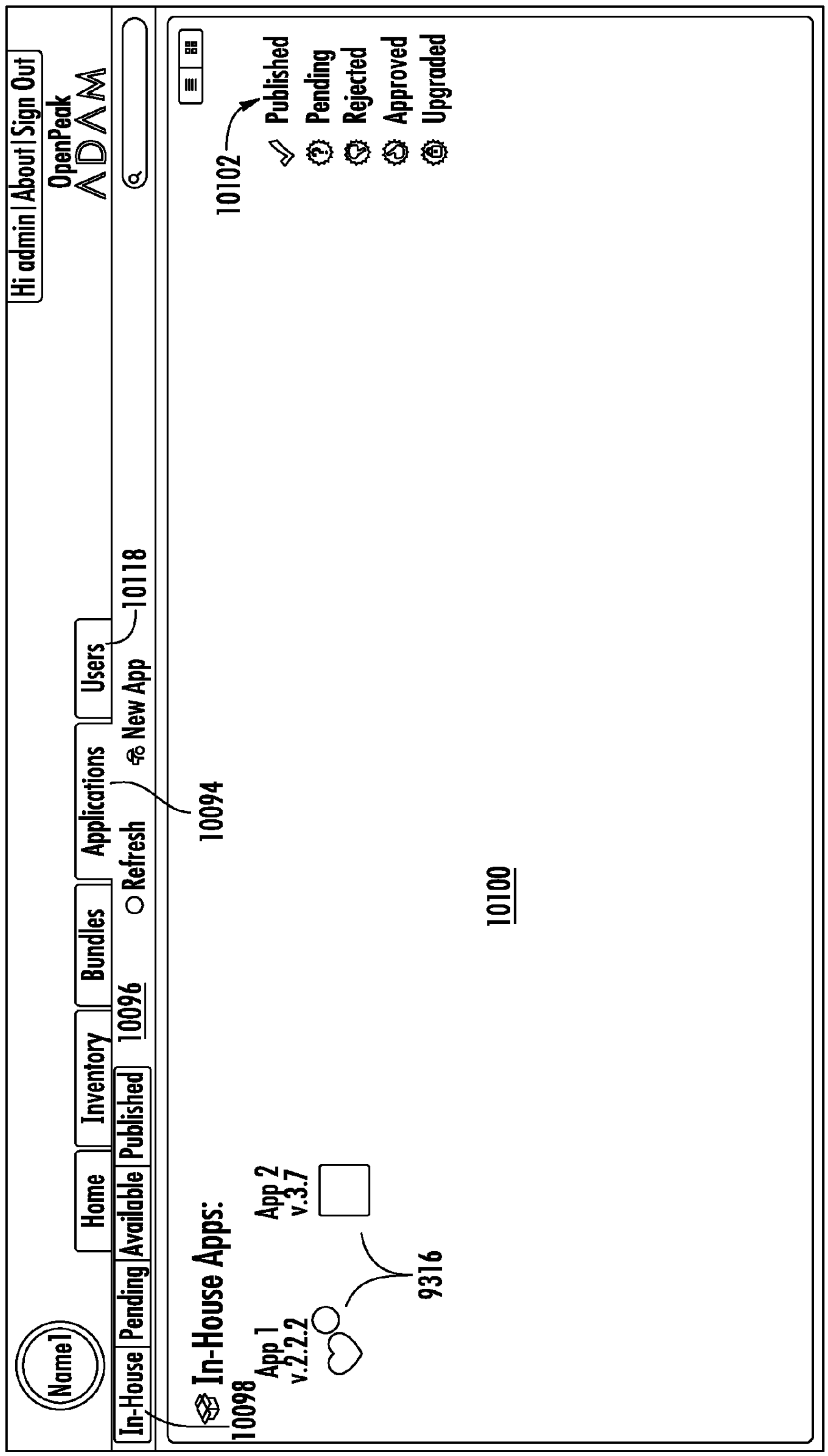
FIG. 157 illustrates an example of an application interface.

Referring to FIG. 157 and moving away from the discussion about bundles 9634, an application tab 10094 can be accessed, which can cause an application interface 10096 to be presented, an example of which is shown here. The applications interface 10096 is similar in function and design to that described in relation to FIGS. 104 and 105. That is, the applications interface 10096 can enable access to pending, available or published applications 9316, as described earlier. The applications interface 10096, however, can provide an additional feature, which can be accessed by selecting an in-house tab 10098. This selection can cause an in-house application page 10100 of the applications interface 10096 to be presented.

The in-house application page 10100 can show applications 9316 that have been submitted for approval for publication, such as in an application repository 9130 (see FIG. 86). That is, the in-house application page 10100 can serve a function similar to the one performed by the approval portal 9210 (see FIG. 87). As such, a user of the administrator portal 9215, for example, can review submitted applications 9316, test/analyze such applications 9316 and determine whether such applications 9316 are acceptable for publication, in accordance with procedures presented earlier. In particular, the in-house application page 10100 can include a status menu 10102 that can present the status indicators 9320 described with respect to FIG. 90, which can be displayed next to applications 9316 to show the status of the applications 9316.

In one arrangement, the applications 9316 that are submitted and presented on the in-house application page 10100 can be associated with the entity that is operating the portal that has implemented the interface 9880. For example, the interface 9880 may be implemented on the administrator portal 9215, and the submitted applications 9316 may be associated with an entity that is responsible for managing or operating the administrator portal 9215. As a more specific example, these applications 9316 can be applications 9316 that have been internally developed by the entity responsible for the administrator portal 9215. Thus, an employee, contractor or vendor can develop applications 9316 for this entity, and the applications 9316 can be uploaded to the in-house application page 10100 for review for possible publication and/or distribution to portable computing devices 9050. The in-house application page 10100 (and subsequent interfaces to be discussed) can enable such internal applications 9316 to be reviewed for publication, similar to previously described methods.

Figure 158:
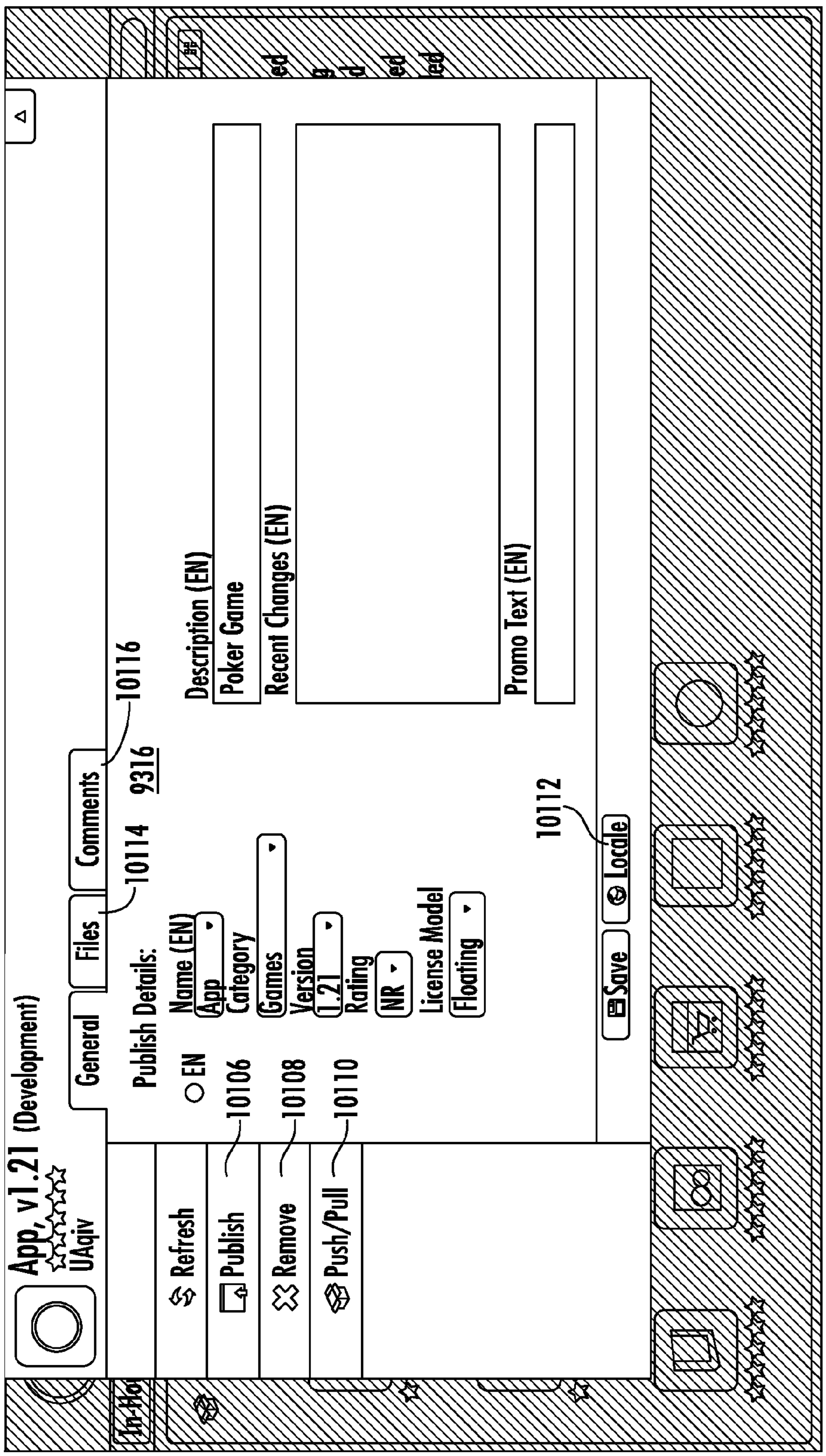
FIG. 158 illustrates an example of an application information page.

Selecting an application 9316 on the in-house application page 10100 can cause an application information page 10104 to be presented, which can show information relating to the selected application 9316. An example of the application information page 10104 is shown in FIG. 158. This information can be similar to that described in relation to FIGS. 98 and 105 and will not be repeated here. Also similar to FIG. 98, the in-house application page 10100 can include a publish feature 10106 for causing the selected, submitted application 9316 to be published, a remove feature 10108 for rejecting the selected, submitted application 9316 for publication and a testing feature 10110 for sending the application 9316 to or removing the application 9316 from a testing device. The remove feature 10108, in another arrangement, can be used to remove an application 9316 from, for example, an application repository 9130 or one or more portable computing devices 9050.

A locale feature 10112 can enable a developer of a submitted application to select a particular country or region and/or an associated language for the information of the application 9316. This process is similar to that outlined in the description related to FIG. 91 (see the language selection 9342). Also, selection of a files tab 10114 can enable a user to determine which files are part of the submitted application 9316 and may be configured to allow for upload or removal of such files. A comments tab 10116 can be used to enter or review comments regarding the submitted application 9316 and its review.

In view of the above, a system that has implemented the interface 9880 can enable an internal review of submitted applications 9316. For example, if installed on the administrator portal 9215, then the portal 9215 can perform at least some of the functions that may be handled by the approval portal 9210. Of course, this feature can be incorporated into other portals other than the administrator portal 9215, like a client portal 9220 or a sub-client portal 9225.

Figure 159:
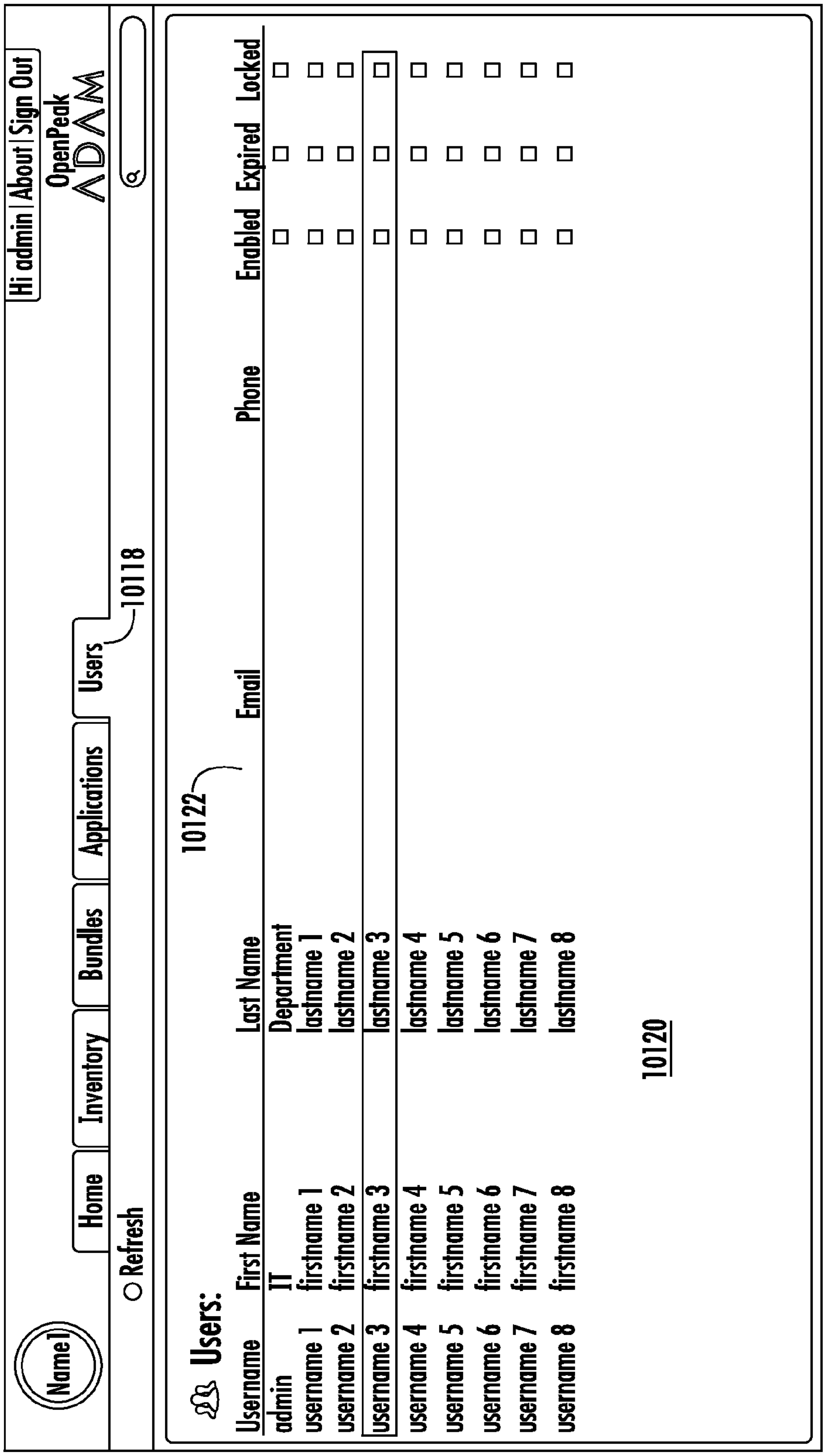
FIG. 159 illustrates an example of a users page.

Referring back to FIG. 157, selection of a users tab 10118 can cause a users page 10120 to be presented, an example of which is shown in FIG. 159. The users page 10120 can include a users listing 10122 that can show one or more users who are associated with, for example, the portable computing devices 9050 that are being managed by the interface 9880. In one arrangement, as has been mentioned previously, the number of users and the number of managed devices 9050 may not be equal, as there may be multiple users for a single device 9050 or a user may be assigned to multiple devices 9050. Here, information about the users can be shown.

Figure 160:
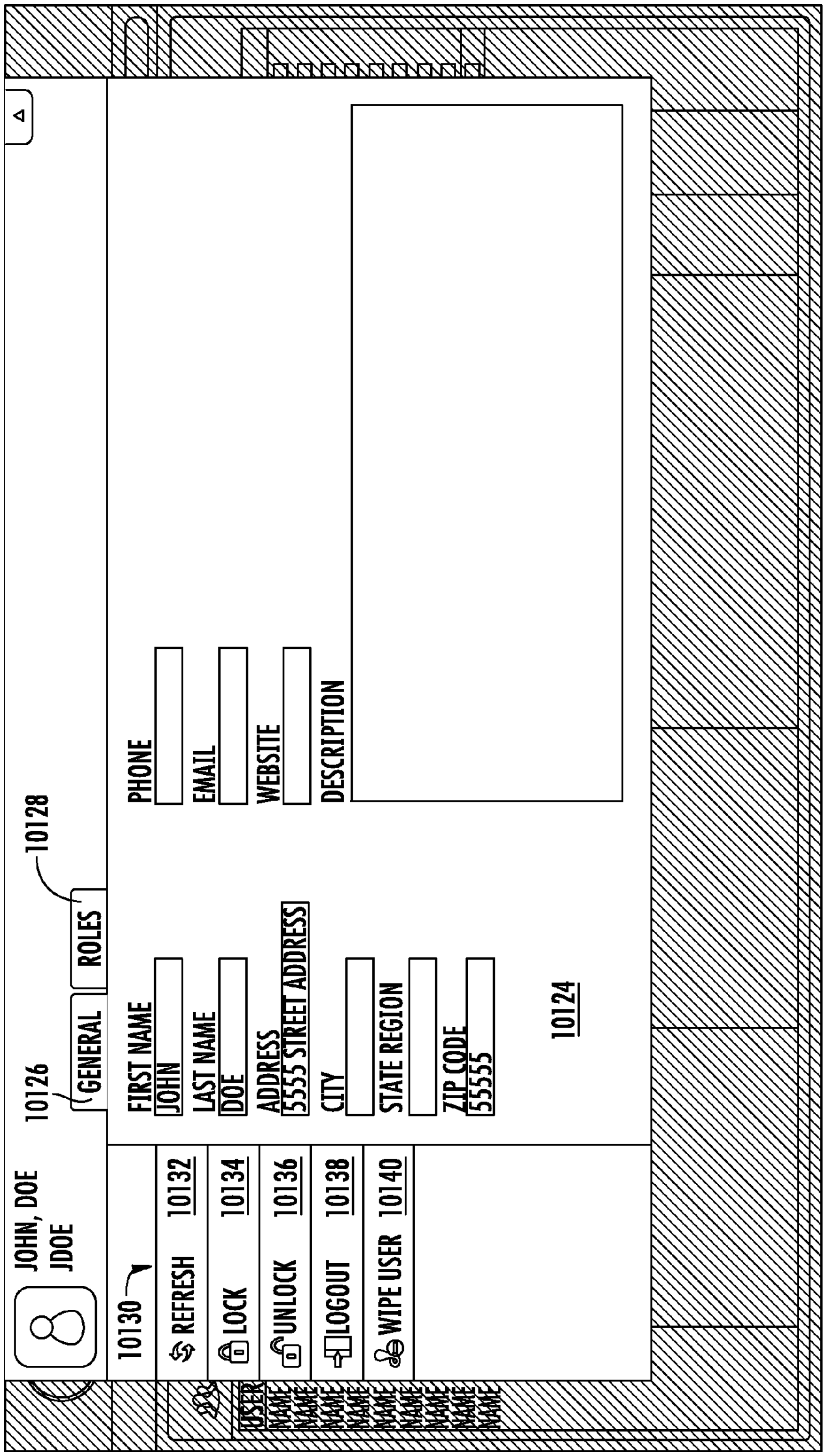
FIG. 160 illustrates an example of a user control page.

Selection of a user can cause a user control page 10124 to be presented, an example of which is shown in FIG. 160. Information about the selected user can be presented here, such as name, contact information and other relevant data, and can be accessed by selecting a general tab 10126. As an option, information about any portable computing device 9050 to which the user is assigned can also be presented here and even managed, if so desired. In one arrangement, the user information can also be edited on the user control page 10124. Moreover, selection of a roles tab 10128 can show the various roles associated with a particular user. A role can identify which type of bundles 9634 may be appropriate for a certain user. For example, if the user is part of a sales team, the role of the user can identify this association and the relevance of a bundle 9634 that is designed for the sales team. A user can have one or more roles, and if multiple roles exist, a priority value can be provided for the roles to show which bundle 9634 of the multiple, associated bundles 9634 should take priority for the user. The role and related information can be also be edited by selecting the roles tab 10128.

A user menu 10130 can allow for additional user control of the selected user. As an example, the user menu 10130 can include a refresh feature 10132, which can direct the portable computing device(s) to which the user is assigned to automatically refresh themselves with, for example, updates, such as software updates. The user menu 10130 can also include a locking feature 10134 and an unlocking feature 10136, which can respectively lock and unlock the device(s) to which the user is assigned. Locking and unlocking processes have been previously described and apply here. A logout feature 10138 can also be part of the user menu 10130, which can cause the user to be logged out of the device(s) to which the user is assigned, while a wipe user feature 10140 can cause at least a portion of the data or settings on the device(s) assigned to the user to return to default or factory settings. Of course, the user menu 10130 is not necessarily limited to these features, as other features may be implemented here or the menu 10130 can have fewer features than those shown here.

The interface 9880 described to this point has focused on an entity managing its own portable computing devices 9050. For example, a corporation can employ this interface 9880 to manage the devices 9050 that it assigns to its employees. In accordance with the discussion presented above, the interface 9880 can be configured to permit an entity to manage devices 9050 that are associated with a second entity. As a more specific example, a first company can operate or manage the administrator portal 9215 and can have the interface 9880 installed on the administrator portal 9215. The first company may receive a control notification or some other authorization from a second company to manage the portable computing devices 9050 associated with the second company. In response, the first company can manage these devices 9050 of the second company through the interface 9880 or any of the other interfaces described above. It is understood, however, that the interface 9880 can be installed on any other suitable portal, as it is not limited to installation on the administrator portal 9215.

As previously noted, user of portable computing devices 9050 in any of the interfaces/systems presented thus far can be managed. In one arrangement, the management of devices 9050 can be supplemented through the management of users. In other words, a request for a status or for an action to be carried out for one or more portable computing devices 9050 can be done so by managing a user of the one or more portable computing devices 9050. This principle may be particularly true if a user is assigned multiple devices 9050.

For example, consider the scenario where a user has been assigned multiple portable computing devices 9050. Instead of focusing just on the management of the devices 9050 associated with the user, the user can be managed to effect changes to the devices 9050. Specifically, a user account or entry, similar to those presented above, can be accessed, and selections can be made with respect to this user. As a more detailed example, the user can be assigned with a particular bundle 9634, and this bundle 9634 can be propagated to each or a portion of the devices 9050 assigned to the user. As another example, a messaging feature can be activated through an interface linked to the user, and a message can be generated for one or more or each of the devices 9050 associated with the user. This arrangement of focusing on a user to manage devices 9050 can be expanded to incorporate any of the processes previously described herein. Moreover, a first entity can manage users associated with a second entity, in accordance with the principles presented above. Authorization may or may not be required to do so.

It must also be noted that content is not necessarily limited to being sent in bundles or in any sort of grouping. For example, instead of sending a bundle of applications to a portable computing device, individual applications may be distributed to one or more portable computing devices. This principle may apply to any type of content, including settings or commands.

The preceding description is certainly not meant to be limiting, and there are several other scenarios to consider. Additional illustrations and examples that further flesh out the some of the principles and arrangements presented thus far will now be provided.

Business professionals today expect the ability to use personal computers, smartphones and tablets of their choice while working from their offices, homes or on the road. Beyond an increased use of mobile devices, this has introduced a diversification of the types of devices having access to, and storage of, enterprise information. The increased penetration of these devices with consumers has created an expectation among users that they can load a wide set of applications on them, in addition to those dictated by their employer.

This movement has created a new set of challenges for information technology (IT) managers who remain responsible for corporate communications, software deployment, security, policy management, integration and service levels. Moreover, since devices and employees tend to be increasingly mobile, the traditional model of managing devices on a local area network no longer suffices.

The systems, methods, arrangements and configurations (referred to as “system” hereinafter for brevity) described herein address these new emerging needs. By combining comprehensive device management services with a fully managed application store, a unique product architecture has been created that offers both end-user flexibility and a comprehensive set of corporate controls for enterprise managers.

These solutions can be leveraged across a variety of hardware platforms and operating systems, creating a cohesive ecosystem with remote management capability. Examples of offerings include (1) a fully managed Android solution; (2) the only multi-tiered and fully-managed application store; (3) the only multi-tiered device management and control platform; (4) platform independent and leveraged to run across a variety of hardware devices and operating systems; (5) targeted application/content delivery to specific customers; (6) full device lifecycle management, including provisioning, updating, redeploying and decommissioning of devices and users; (7) full application lifecycle management, including submission, testing, approval, deployment, updating and deletion; (8) business intelligence reporting, including telecom expense management, which can provide an immediate return on investment to enterprises; (9) immediate revenue opportunities for operating entities, as well as the ability to continue to enhance and increase monetization over time.

The system described herein can extend beyond mobile device management offerings. For example, operating systems, such as Android, can be customized with a number of enhancements that make the operating system far more ideal for enterprise deployments. In particular, a multi-user Android solution that provides real separation between personal and enterprise work spaces is offered, and this solution is applicable to other operating systems. Complete hardware and radio control—including Wi-Fi, Bluetooth, cameras, microphone, cellular radio, and location services—and enhanced VPN support and data security can also be provided. As part of these services, complex device policy management, including VPN policy management, can also be provided. Another feature that can be offered is an enterprise quality cryptographic bootloader, which can protect device integrity at the lowest levels.

The system described herein provides a complete and robust suite of mobile device management features. Several features will be described in more detail below: (1) tiered deployment model; (2) fully managed application shop; (3) multi-user/multi-profile support; (4) fully secured cryptographic bootloader; and (5) remote device provisioning.

The tiered deployment model will be discussed first. In particular, the model can allow for advanced device control including: application management, content management (documents, training videos, audio guides, etc.), firmware management (from system firmware all the way up to the OS), device configuration, policy management, device lifecycle management, reporting and system diagnostics.

Along with remote device management features, a Web-based, tiered management model is provided in which management of groups of devices may be delegated to enterprise customers, who may then further delegate the management of sub-groupings of devices within their own organizations. Within each tier, an administrator can segment users and devices into groups (for example, sales, engineering, marketing, support). As an example, each group can have its own set of device configurations, policies, and applications. Such groups, both inter-tier and intra-tier, may be controlled using a simple and secure administration portal.

The tiered deployment model can also allow for applications, content, policies, and device configurations to be propagated down the tiered tree, while reporting and alerts can propagate up the tree. Parent nodes or portals can dictate what applications, content, policies, device configurations they wish to publish to a child (or client) node and which reports and alerts they wish to receive from child nodes. The parent node may also specify if policies, configurations, and alerts are mandatory for a child node and its decedents or if they are optional. A node is equivalent to a portal, as described above. The model may also be used to deploy new services across a wide range of vertical business markets that can greatly benefit from a hierarchical managed device structure, such as education, healthcare, and government.

Turning to the managed application repository or application shop, small and large enterprises can now ensure that each department or specific team can have access to the most up-to-date business applications, documents, and business media. These applications can be pushed to devices or made available via an enterprise-specific, white-label application repository or shop. At the same time, enterprises can restrict access to non-business-related apps and services on corporate-owned devices as needed, and ensure that minimum security requirements are met by personal devices accessing corporate resources. Not only does this improve productivity and efficiency, but it also reduces the risk of a security breach as a result of questionable apps on individual devices. In accordance with the systems, methods, arrangements and configurations described herein, application management can be enabled across a range of devices and operating systems, so at the click of a button, for example, new content and applications can be sent to a multitude of different device types.

Both corporations and end-users may want the ability to segregate professional and personal information. The multi-profile support described herein can allow a user to have separate profiles and associated policies for each. This allows IT to control how users access key corporate information but can also allow the user the freedom to take full advantage of his/her multimedia devices.

Separate but related is multi-user support, where different users may share a device but login separately to retrieve all of their unique content, like applications. This is ideal for vertically-integrated companies, where a large workforce may share devices (e.g., healthcare, education, government, etc.). Multi-user support also provides an enhanced security framework by presenting secured containers in which all data and information for a user are stored, not just a limited set of personal information. This arrangement also prevents viruses or other malware in one workspace from affecting a different workspace.

From an administrator's perspective, the user-based organization presented herein can streamline the organization of mobile devices. Rather than managing one device at a time, several devices can be grouped into one user and that user can then be assigned the appropriate policies, applications, etc. for their role in the organization. Thus the IT administrator can spend less time managing John Doe's phone, tablet, etc. and instead focus on managing John Doe as a user.

Security and data integrity are a major concern for corporations. To ensure the integrity of devices, a fully secured cryptographic bootloader can be used with such devices. The bootloader can progressively validate each level of software. Starting at the lowest layers of the bootloader, each software component can be first validated for authenticity prior to being executed. In this way, all layers of software, starting from firmware up to the operating system layers, can be at least substantially guaranteed to be authentic and uncompromised. If a software component is found to be invalid, the boot process may fail and, and the device may attempt to revert to a back-up partition. If that partition is also found to be invalid, the device boot sequence may be halted and the device rendered useless. Other actions, such as "phoning home" or otherwise contacting an operating or managing module to obtain the latest stable software, may be available depending on requirements.

Inventory management, software maintenance, and device customization can be costly and time-consuming operations. Remote device provisioning and lifecycle management software, however, can address these complex and essential problems. The device provisioning described herein is operating system and device agnostic—meaning that it is not limited to any platform—and can be used to install and maintain any type of software.

Device provisioning provides an incredible amount of flexibility in deploying software. For example, devices can be deployed with a simple software load that "phones home" or otherwise contacts an authorized module after it has been deployed to download its entire or at least substantial portions of its personality. In another arrangement, the device may have its base operating system distribution pre-installed with a provisioning agent simply customizing the device with any special packages that may be needed by enterprise or consumer customers. For example, consider a generic hardware device capable of running either Android or Windows Phone 8. There is no need for a manufacturer or distributor of the device to pre-provision devices and manage inventory levels of each device. The device provisioning process can allow devices to be deployed into the field and configured once the end user receives the device and has purchased a particular software flavor. After a device and its software have been deployed, the lifecycle management configuration can be used to deploy patches and software updates or distribute special customization packages (i.e., new device themes, etc.). This solution may work for all layers of software, from the firmware all the way up to the application level.

In one arrangement, the software provisioning and life cycle management can be simplified by automatically associating devices with software. For instance, when a manufacturer or distributor ships a tablet to a user whose company is an enterprise customer of that manufacturer or distributor, the act of the user logging into their device can identify the software associated with the device by associating that device with a node under the tree of the manufacturer or distributor. This feature may greatly simplify the provisioning infrastructure of the manufacturer or distributor, while at the same time simplifying IT department deployments. In both cases, provisioning the device becomes a hands-off scenario. Software lifecycle management can also be made easier by providing a framework for rolling out software updates over time. This ability to schedule rollout campaigns helps to mitigate risk associated with introducing new software into the enterprise.

The system described herein presents an end-to-end solution that simplifies device and service deployment and management. In addition, this multi-tier remote device and application management solution spans all channels. Several key functional areas may be encompassed, including (but not limited to) device management, business intelligence, multi-user/multi-profile, application management, security/policy control and application shop or repository.

This system delivers broad versatility and expansive value. For example, service providers can conduct white label deployment and provide new services and custom application shops. Enterprises can manage firmware, control access, enhance security, provide custom application shops and offer enterprise licensing models. Consumers can control content and applications, set budgets and allowances and track location and usage statistics.

The system described herein can create new and incremental business opportunities. For example, the system can be packaged and sold in a number of different ways, either as a stand-alone solution (across a range of devices) or tightly coupled to an existing product of a manufacturer or distributor. This opens up new vertical opportunities for branded devices, and also allows manufacturers or distributors to offer the solution as a service agnostic of any particular hardware device. The ability to offer both these sets of solutions from one source creates tremendous operating efficiencies.

In either case, the model may generate recurring revenue streams from per-user licensing, a very scalable and high margin business. Even more exciting is the number of new vertical industry opportunities this solution can create for a manufacturer or a distributor. There are a number of promising opportunities with a need to deploy technology in a way that can be tightly managed in a tiered hierarchy. Some examples include (1) enterprise deployments where the IT administrator can select different applications and policies for different user groups such as sales, engineering, etc.; (2) education opportunity where students can share a group of tablets (with multi-user support to identify their applications/content), while at the same time restricting how they are able to interact with the devices (e.g., only 10 minutes of Angry Birds per day); and (3) consumer devices that enter the workplace and where users want to preserve their personal information while still accessing proprietary work information (multi-profile). Obvious benefits to a manufacturer or distributor include expanding the relationship with IT manager customer bases, additional and recurring service revenue streams, customer acquisition and retention, as well as a number of others that stem from providing the platform on which to launch future products and services.

The following description presents additional details of the functional areas noted above. For example, for device management, the following points may be relevant: (1) fully-hosted, tier-based deployment model for remote device management; (2) optional cloud-based (or network based) or on-site deployment (for customers with high security restrictions, such as the government or military); (3) remote device settings configuration; and (4) enterprise e-mail configuration.

As another example, for application management, the following points may be relevant: (1) hierarchical management; (2) whitelisting or blacklisting of applications; (3) allowing or disallowing on-device application installations; (4) remote application installations, removals or updates.

For application shop or repository, the following points may be relevant: (1) white-label, hierarchical application shop; (2) full application life-cycle control, including portals for developers, testers and approvers; and (3) application license management, such as free, bulk, single use and license revocation and billing controls.

For multi-user/multi-profile, the following points may be relevant: (1) ability to remotely manage aspects of multiple users and/or multiple profiles; (2) automatic account provisioning; (3) addition or removal of users; and (4) allow corporate access to one profile while maintaining personal information in another profile.

For policy control and security, the following points may be relevant: (1) simple enforcement of IT security and policies; (2) rule-based control of 3G/4G modems; (3) security policies, like rule-based VPN control, password rules, LDAP/Active Directory integration, full cryptographic software validation, secure download of components, disable secure digital (SD) booting and disable device rooting; and (4) security controls, like addition/removal of users, revocation of network access, device locking, logging out of users, disablement of user's ability to enable side-loading of applications, selective or complete wiping of devices (including for both enterprise and personal devices), browser security settings, password resets, role-based access to interfaces, operation in network address translation (NAT) environments and guaranteed message delivery.

For business intelligence, the following points may be relevant: (1) suite of standard and custom reports may be available; (2) application usage tracking; and telecommunications expense management, like usage of voice, data and short message service (SMS).

This next section will focus on device management. The system described herein offers comprehensive, large-scale, device management services, including the ability to push applications, perform firmware updates, send alerts, optimize telecom expenses, set device options, lock and unlock devices, wipe device of user data, and force reboots. As such, the system enables the ability to remotely monitor and manage devices in the field.

For example, fully managed devices may be capable of installing firmware, bootloader, custom supplicants, kernel drivers, operating systems, operating parameters/policies, documents, media, arbitrary files, and certificates from cloud-based servers. Such servers can also verify devices, query device state, and send messages to one or a group of many devices.

Some exemplary features are listed here: (1) remote installation and/or removal of applications; (2) enable and/or disable applications; (3) allow and/or disallow user-initiated application installation; (4) enable and/or disable side loading of applications; (5) enable and/or disable loading applications for SD card; (6) listing of application per user and/or device; (7) listing of all applications deployed in an enterprise or other entity; (8) reporting application usage information; (9) configure password complexity, such as length, age, special characters, etc. (10) automatic wiping device in view of multiple password failures; (11) remote password reset; (12) VPN configuration; (13) VPN policy control; (14) wireless or Wi-Fi configuration; (15) wireless or Wi-Fi policy control; (16) proxy configuration; (17) proxy policy control; (18) encryption support; (19) wipe user data or perform a complete wipe of device; (20) remote lock and unlock of device; (21) remote logout of device's current user; (22) query device's hardware and system state, such as subscriber identity module (SIM) operator, wireless or Wi-Fi status, connected SSID, Bluetooth status, SD card, GPS, etc.; (23) enable and/or disable device peripherals such as wireless or Wi-Fi, cellular modem, Bluetooth, camera, SD card, GPS, etc.; (24) aggregate devices into policy groups so that enterprise can enforce a set of approved configurations; (25) support separate profiles per user; (26) ring or contact device for help in locating the device; and (27) location of device.

This remote device management support can provide IT departments with unparalleled control and management over their mobile devices. It may allow IT departments nearly complete remote configuration of the device and simplifies the process through configuration profiles and automatic updates.

From an operations view, device settings may be associated with users. Each user may be associated with a bundle via an IT-specified user filter. A bundle, as previously explained, can be a set of applications, policies, configurations, and data associated with an IT-defined group. When a user's device logs into the system, the user's bundle contents and configurations may be pushed to the device. The system client can use the bundle configuration information to set device policies, configure device settings and download any required applications and data. In this manner, an IT administrator can create, for example, a small number of bundles to control a large number of devices for a vast number of users. As an example, by assigning a new user to a predefined profile, the administrator can instantly apply appropriate policies to all of that user's devices.

The servers of the system can interact with a managed device client that may reside on each monitored device. This client software can be designed for easy portability and integration, turning a wide range of devices into fully managed devices. This applies to Android and other operating systems.

As there is no single industry standard for mobile operating systems, the solution described herein can be designed to support multi-platform management of various smartphone and tablet operating systems. In addition to a fully managed Android client software, similar functionality can be provided as a third party application, downloadable from the Android Market, for example. This Android version may be restricted to capabilities provided through Android's public APIs; however, it still meets or exceeds the specifications of any other tier-1 mobile device management provider and can be suitably expanded to accommodate other features. It is installable on virtually any Android device. In addition to Android, the system is designed to support iOS, Blackberry, and Windows Phone. Like other players in this part of the mobile device management space, publicly available APIs from the respective operating system vendors can be used to control these devices.

A multi-user framework, as described herein, may provide the most secure encapsulation of enterprise data. Other solutions may claim to encapsulate personal data in a secure container, but these methods only address security concerns for data saved to disk. Since these other personal information containers run within the context of an unmanaged environment, the device is still vulnerable to Trojan and virus exploits that can sniff network traffic, track location, report network configurations, etc. The solution described herein can expand the secured container to the entire user space, giving IT administrators the ability to fully lock down and control the enterprise space, while allowing users to have a fully unmanaged account as well. When switching between accounts, this solution may stop running operating system activities and services, first giving them a chance to persist data, in order to ensure a secure environment for each account. The data for each account may also be sandboxed or isolated so that no other account can access it. Additional information on multi-user/multi-profiles can be found in U.S. Ser. No. 61/411,800, which is incorporated by reference herein in its entirety.

To optimize device flexibility and increase ease of user management, user profiles do not need to be created on a per-device basis and are not necessarily tied to any particular device. The system can support both a proxy connection to the enterprise's directory services server (LDAP, Active Directory, etc.) and a hosted directory services model. An enterprise user's login credentials may be authenticated by the system's servers when he/she signs in to the device. If the device does not have a network connection available when the user logs in, then the user may be authenticated against a local authentication database. If a user is authenticated against the system server and the user does not currently have an account on the client device, the client device may create a local account for the user, download the user's configuration (policy, device settings, applications, media, documents, etc.) from the server and apply the configuration for the user. As such, it is not necessary to manually create user accounts on devices or in the system network or cloud.

A feature of the system's device management framework is its provisioning infrastructure. This allows custom setup of new devices with little to no work on the part of the customer. Upon first boot-up and initial connection to the network, a device can securely connect to the back-end via IP and can contact the provisioning service. The server can respond to the new device with pre-determined provisioning information, such as required certificates, device settings, applications, and, if necessary, updates for firmware. With this automated installation and registration procedure, there is little burden on the end user. It also greatly simplifies the logistic of deploying devices for enterprises and device manufactures.

As explained earlier, an administrator can manage device configuration globally, by groups or by individual devices. The use of bundles and roles within the system management consoles may enable easy configuration and management of thousands of devices with a very limited number of IT generated configurations. Additionally, as the system may be hierarchical in nature, corporate IT can push down policy and configuration requirements to the company's divisions quickly and easily while enforcing compliance. This interface may allow administrators to maintain consistent policies across all the devices in their enterprise.

Another feature of the solution described herein is its ability to perform remote firmware and software updates without placing any burden on the end user, meaning limited or no user interaction. Updates may be applied through staged campaigns whereby they are first applied to a small sample of the customer base to validate the upgrade prior to global rollout. Additionally, this same feature allows for user profile-based and regionally designated updates. As with the automated provisioning method, devices that "heartbeat" with outdated firmware/software can automatically receive updates. The system also supports optional firmware updates that can be applied at the user's discretion. All updates can either be silent or with notification to the user.

The system can apply content management rules to firmware updates to ensure proper lifecycle management. IT administrators may have full control over the firmware deployed in their enterprises. For example, such administrators have the option to automatically promote authorized software to "production ready" status, or they can opt for a trial run on their group of user acceptance test devices. Once the administrator approves and releases the software, it then may become available for production-fielded devices. Finally, various reporting mechanisms can allow administrators to quickly determine the current software levels or configurations of their deployed devices.

The solution described herein can also provide comprehensive application and file management both on the Web services end with a complete application store or repository and on the client side with control of applications and files on devices. A more extensive list of application management features is listed here: (1) hierarchical application and data management; (2) system nodes can publish applications and enterprise data to their child nodes; (3) child nodes can accept or reject applications and enterprise data from parent nodes; (4) each node in the system tree can be individually branded by entity or organization; (5) licensing and fees can be customized per node, incentivizing re-seller networks; (6) allow and/or disallow application execution (e.g., whitelisting or blacklisting); (7) allow and/or disallow on-device application installation; (8) remote installation, remote removal and/or remote updating; (9) application installation, application removal and/or application update reporting; (10) reporting all or a portion of applications deployed in the enterprise; (11) application usage tracking and statistics; (12) full role based application life-cycle facilities; (13) developer portal to allow developers to: (a) test applications prior to publication; (b) publish their applications to one or more nodes; (c) define licensing and fee structures; and (d) track sales and revenue from their applications; (14) application approval portal to allow nodes to evaluate and track applications that developers have submitted for publication; (15) finance portal to allow node owners to track revenue generated by their node; (16) administrator portal to allow full mobile device and application management; (17) consumer portal that provides a simplified management interface client that allows end user to buy or add new applications; and (18) application licensing, such as for a fee, for free or bulk download.

The system also provides for a white-label hosted application store. This feature enables any suitable entity to have its own application store, which can be managed by another entity. As an example, it can provide a Web interface for managing application packages and for developers to upload, describe, and test their software. The client-side interface can also allow customers to browse and search for applications and then go through a checkout process to download and install them onto the device. In one arrangement, a device may be configured such that it may only see applications that are suitable for that device type and available to the node that it is associated with.

A managed application repository or store may be ideal for enterprises and service providers that need to deploy custom applications, impose specific licensing terms on applications, and have complete control over the deployment, update, and revocation of applications on customer devices. In one embodiment, the platform described herein can maintain a hierarchical level of content control where content entered at various nodes may not be accessible by sibling or parent nodes. A sibling node is a node that exists on a level that is equivalent to another node and may have a parent node that is similar to the other node. The content owner can determine when and which lower level nodes may access the content. The hierarchical structure can be unbounded and can support any level of organization or deployment complexity. Several types of portals for application management focused on different types of user, enterprise, SMB, and family can be provided, although at least some portals may use the same web services APIs, simplifying implementation and customization. These features may be inherent in the system and can be configured real-time in a cloud environment or prepackaged in an enterprise appliance bundle.

Developers from around the world can sign up with a developers program through a developer information portal or application developer portal and can obtain a license and supporting documentation. The application developer portal may offer mechanisms for developers to publish and manage their applications.

Standard applications can be uploaded through the application developer portal for beta testing, for example. In particular, the developer or some other suitable entity may enter key attributes of the application (description, graphics, etc.), and can upload the application components. At this time, the developer can install the application via the application developer portal on his/her personal sandbox device. When they are ready, developers may submit completed applications through this portal into a central pool of applications or directly to a specific node.

At this point, the application may be available in the approval portal for the node the application was published to. The node owner can now do a functional check of the application and can make sure the application works correctly. Even though an application may run in a sandboxed environment, the check can ensure that the application runs as advertised and is not attempting to subvert the system.

Following that, the application can be made available to the node administrator, whose managers can use the administrator portal to approve or reject an app for its subscriber base. Service providers can define a policy specifying that applications should pass through to customers or whether they need explicit approval first. The hierarchical architecture of this process also allows administration portals to be offered to other entities as a service.

The system described herein can also add support for multiple users on a single device. User switching can be activated, for example, via a widget, app or lock screen. The widget, which can be a user interface element that covers all or part of a display, may sit on the desktop/home screen and can allow users to easily change to another profile/user. The application can be launched from an application launcher and can allow for personal workspaces to be created, as well as switching. Enterprise user accounts may be automatically created once the enterprise user logs in and can be authenticated against the system servers. Also, non-managed/personal users can be added with, for example, restricted permission levels to ensure that they cannot add or remove other personal accounts. For instance, a child's account would not be able to remove a parent's account. In one arrangement, enterprise accounts may only be removable by an enterprise administrator. The lock screen can allow a user to log into his/her account, even if the device is currently locked by another user. At least some or all of the applications and services may be given a chance to persist their data prior to users being logged off. Each profile (i.e., work, personal, kids, etc.) may have separate data, applications, settings, wallpapers, customizations, logins, etc. The multi-user framework may also provide support for shared, pre-installed system applications and user or administrator-installed, shared third party applications.

Multi-user support can allow users to maintain multiple profiles, such as one for enterprise use and another for personal use. This may provide IT organizations with the ability to manage devices deployed throughout the enterprise, while giving control to users for their personal profile. For example, employees can use their devices on campus and off with separate profiles for work-related applications and personal applications. Each profile can be completely sandboxed from other profiles to ensure the integrity of enterprise profiles. Also, the act of switching profiles may completely bring down all running applications and services, thereby ensuring that any Trojans or viruses that may have been running under a user's personal profile are not active in an enterprise profile. On enterprise profiles, the administrator can manage each user profile, including locking users and wiping user data (e.g., email credentials), for instance, when a device is lost or needs to be replaced.

Multi-user support may also provide IT managers with the ability to conduct all of these actions without impacting the personal profiles of company employees. IT managers can conduct firmware updates, application updates, etc. without interfering with the personal data of an employee.

The system described herein may enable IT administrators to manage device deployments and monitoring through a modular policy management interface, examples of which have been previously presented. Policy control can be broken up into two distinct areas: server side policy control and device side policy control.

Server side policy control may allow an administrator to define the constitution of a deployment group. The system's backend intelligence can manage the synchronization of that configuration to the devices within the managed domain. This feature can allow for phased rollouts of changes made by IT departments. Other policies in the system may be used to enforce scheduled notifications of compliance information or to send software update availability notifications.

On the device side, the policy manager is not necessarily limited to a small, predefined set of policies, but instead continually monitors information flowing through the operating system framework and can use that information to allow arbitrary, complex policies to be defined and enforced by the IT administrator. The policy manager may also interact with a reporting engine to implement scheduled reporting of device performance or configuration metrics, including application usage and installed application lists. Policies can be created for reporting, device logging, alert notifications, and device directives/actions. Multiple policy templates may be provided to enable quick reuse and testing of a policy, along with automatic generation of policies based on system configuration. For example, the system may use the assigned template for default device configurations when new devices are added to the system. This feature can instruct a device to take on a different policy based on the current group to which the device is assigned. Policies may be integral to configuring and enforcing rules on password complexity, application whitelists, data encryption, etc.

The system described herein may provide a broad range of fine-grained policy control options. For instance, policy controls may exist for the following objects: (1) password configuration, including minimum and maximum password length, password complexity (minimum number of alpha characters, numeric characters and special characters), maximum password age; (2) resetting password; (3) maximum password attempts before automatic wiping of account or device; (4) enable and/or disable encryption for application data on both local memory and SD card; (5) enable and/or disable applications; (6) whitelist or blacklist applications; (7) enable and/or disable hardware, such as Bluetooth transceivers, Wi-Fi transceivers, cellular transceivers, GPS modules, SD cards and cameras; (8) enable VPN when not on an enterprise network; (9) enable proxy when on an enterprise network; (10) enable and/or disable client device reporting over cellular networks; and (11) enable and/or disable location services.

The custom bootloader modifications can allow for a series of enterprise requested features. Examples of such features may include the following: (1) ensuring device integrity and fail-safe start-up; (2) validation of the operating system kernel and system file sets as part of the boot process; (3) authentication to ensure that the device remains hardened and has not been rooted; (4) active and standby bootable partitions to prevent device bricking and facilitate in-filed recovery in the event of failure; (5) disallowing booting from an SD card; (6) managing key press detection for alternate or recovery boot modes; and (7) processing stages or pending updates, such as IFWI (microcode) that require a device restart.

The system described herein may also provide an extensive set of features that enterprise IT organizations require from devices deployed in their organizations. Examples of such features include data encryption, device and user wipe, VPN, device configuration, Web proxy setup and certificate installation.

IT organizations may require support for both VPN and proxy support. VPNs can be used to allow devices to connect securely into the corporate network, and a proxy can be used to support certain enterprise network configurations. As an example, the system described herein can support the following types of VPNs: (1) L2TP/IPsec pre-shared key based VPN; (2) L2TP/IPsec certificate based VPN; (3) L2TP only VPN; and (4) PPTP only VPN.

The system described herein can also proxy support to allow devices to access the Internet when on corporate networks. Additional VPN clients or proxy support can be integrated to support various requirements.

Configuring roaming permissions on thousands of devices can be a time-consuming task usually involving calling a cellular provider, providing account details, and changing permissions. The system can simplify roaming management for IT organizations, allowing administrators to easily enable and disable roaming on a device through the system console.

The system described herein can also enable a wide range of tools to ensure enterprise data security. For example, the system supports remote device wipe, for both individual users as well as a complete device wipe to ensure corporate data is removed from lost or stolen devices. The system can also provide support for data encryption to ensure that corporate data cannot be hacked, even if a lost or stolen device cannot be wiped. Remote lock and unlock, password policy configuration, hardware control and the ability to enable/disable applications are also features supported to protect corporate data.

Security implementations can follow industry standards and best practices for securing servers, data and communications. Security is not an add-on but rather a core precept underlying the system design. It manifests itself in several areas.

In particular, customer and administrative Web interactions are performed, for example, via HTTPS using X.509 digital certificates for authentication and key exchange followed by a login/password scheme over the established covert communication channel. In one arrangement, only password hashes may be stored within the system so that passwords cannot be retrieved. Passwords may be salted (adding a string of random characters) and hashed with an SHA-256 algorithm, maximizing security. The system described herein can be designed to support various other single sign-on integration options. If desired by the customer, remote authorization services (such as OpenID, RADIUS, etc.) can be easily enabled and configured on a per node basis.

Post-authentication access control can be role-based. For example, this means that an administrator who manages the allocation of applications across multiple device types may not have access to customer billing data. Likewise, in one arrangement, software and hardware testers may only have access to their development devices and cannot affect production devices or configurations.

Application and firmware packages may be signed and encrypted. For web service access, calling parties may submit an API-KEY along with each web service call. An API-KEY can be similar to a login and password for machine-to-machine communications. Data can be stored on secured, load-balanced, firewalled servers. Applications on customer-facing portals may allow customers to view past usage/billing/download data or delete accounts and thus remove all prior records.

Scalability and fault-tolerance have been considered in the architecture of the system described herein. Services can be on dedicated machines at secure commercial hosting centers, such as Rackspace. Each center, or point of presence (POP), may contain a load balancer that can distribute traffic to multiple web servers and application servers. The back-end database holding customer and appliance records can be replicated within each POP, ensuring that records shall not be lost in the event of a failed server. In addition to being linearly scalable, the database solution can also replicate across datacenters, enabling both high availability and geographic preference to clients. A global load balancing solution can enable clients to connect to a POP that is either closer to their physical location or that may provide the best performance. The near-real time replication of data across all POPs can ensure consistent behavior for clients connecting to different POPs.

Load balancing can serve several key functions. For example, in addition to allowing increased scalability by distributing the load among all available servers, load balancing can provide for increased fault-tolerance since non-functioning systems may be taken out of the balancing pool. This same mechanism can allow for uninterrupted upgrades as machines can be taken out of the pool, upgraded, tested, and then replaced.

Services may be hosted at multiple POPs, not just for geographic proximity to various customers, but also to handle the case where an entire POP fails. For example, the POP may lose power due to a long-term power outage. In this case, a client device may lose connectivity to its preferred POP, but can do a DNS lookup to retrieve SVR records that identify a prioritized list of alternate POPs.

The system described herein was designed to scale to support millions of deployed devices across potentially hundreds or thousands of service providers. The services architecture is designed for fault tolerance and high scalability. Web/application servers may provide the front-facing interface that communicates with replicated databases at the back end. The servers may be located behind a firewall and load balancer. The firewall can redirect certain service requests to specific service providers, if needed. For further scalability during peak traffic periods (e.g., system-wide firmware or software updates), downloads can be seamlessly transitioned to a distributed caching service. The system may scale on demand to handle any amount of traffic and peak surges and provides a global reach and intelligent routing to improve users' experience worldwide.

To ensure efficient management of infrastructure, the system can be centrally monitored using a suitable IT infrastructure monitoring systems. The system may take advantage of the Java enterprise monitoring and management APIs to expose various runtime values through the Java Management Extension API (JMX). Custom-built scripts can be used to monitor all aspects of the system by reading both JMX exposed values directly from the application, as well as SNMP values exposed from the operating system. The scripts can enable these values to be aggregated, monitored and exposed with levels of escalations and built-in event handling. Additionally, custom configurations can be used to help monitor performance thresholds across all of the core services and physical memory, CPU, and other components of the server.

Network operations center (NOC) management services can provide reporting of network traffic, automatically alerting clients when performance falls outside of parameter. Network traffic can also be managed and proactive action can be taken to improve performance.

In one arrangement, the system described herein can provide intelligent monitoring and reporting of all managed devices. Operators can quickly view statistics on individual devices as well as deployment groups. Active monitoring and reporting on devices may be necessary to maintain a stable and consistent deployment of devices. The system, for example, exposes web service based APIs that integrate with third-party monitoring and management systems. Both collected statistics and configuration changes can be made through these APIs.

As an example, online reports of any suitable data may be generated on demand in near real-time from data that is logged in hosted databases. The granularity and format of the data presented can be specified by any suitable entity.

Reports may be viewed for an individual device and global or group views to understand trends across a broad user base. The report outputs may be sorted and filtered. Capabilities for printing, exporting, or broadcasting reports to team members may be included. In addition, operators may configure various types of data collection policies that may then be disseminated to the devices.

There are numerous types of data that can be reported and the following are some examples: (1) total number of deployed devices; (2) total number of devices online; (3) average device uptime or time active; (4) average device critical exceptions (crashes); (5) application exceptions; (6) total active device sessions; (7) history of sessions per device; (8) history of user access (such as in a multi-user environment); (9) history of connection states for a device; (10) history of messages sent to a device, and aggregate views by message sender; (11) total application records by device; (12) application usage (aggregate enter/leave of focus on application); (13) application installation and removal history; (14) current firmware and software version; (15) previously applied updates (update history with date/time stamp); (16) boot records (with firmware/software version and date/time stamp); (17) group assignments (i.e., which individual devices are assigned to which groups); (18) roaming devices; (19) cellular usage and overages; (20) cellular data usages and overages; (21) SMS usage per device and overages; (22) device locations; (23) history of device wireless or Wi-FI connection status and signal strengths; (24) system resource availability (monitoring availability of CPU, memory, disk, etc.); and (25) snapshot view of active processes in the system. Of course, those skilled in the art will appreciate that there are other types of date that can be reported.

Reporting elements may also include features for support services, such as device location tracking, network configuration, device specifications, Wi-Fi status, screen capture, etc. As noted above, these are just a few of the reporting possibilities with the system. The system device reporting and policy engine may track numerous event and state variables to be able to report complex information that may be of specific interest to different market segments. For instance, the reporting infrastructure can easily be used by cellular providers for network optimization by mining dropped call data gathered on both device and network sides to determine network performance issues and optimizations. Using the system's bundle capability along with the simple reporting query generator, an operator can enable and disable this type of reporting for select markets or devices. A large number of permutations and options for reporting provided by the system reporting engine is available.

Using the expense management features incorporated into the system described herein, companies are able to, for example, generate reports showing data, voice and SMS usage associated with each different profile of a device. These reports can help allocate expenses associated with business and personal use or different business users. The system may also support (i.e., generate and transmit) notifications to users and administrators if preset usage limits are exceeded. The expense management service can allow IT departments to keep expenses in check.

V. Family Portal

As explained above, a system can be provided in which portable computing devices can be managed. As also previously explained, this management can extend to the type of content that the portable computing devices can receive, including various settings that may be applied to the devices. While many of the examples presented up to this point have been done so in enterprise environments, it must be understood that the arrangements herein are not so limited. For example, a parent may use the embodiments/methods described herein to manage the portable computing devices of his/her children. Similarly, a teacher may employ such embodiments/methods to manage the portable computing devices of his/her students. In fact, these embodiments/methods can be integrated into any suitable relationship where one party or entity maintains at least some supervisory authority or responsibility with respect to another party or entity.

One example of such a relationship that can rely on the embodiments/methods described thus far will now be presented. In particular, a supervisory portal arrangement will be described in which an administrator (a parent) can manage the portable computing devices of child device users (a spouse and several children). The administrator may manage these portable computing devices through an administrator portal, similar to the one described in FIGS. 87 and 88. The managed portable computing devices can be similar to the portable computing devices 9050 presented in FIG. 86 and can heartbeat with a managed services platform, like the managed services platform 9010 of FIG. 86.

As such, a parent, in this arrangement, can enable content to be delivered to the portable computing devices similar to that described above. For example, as a part of content, a parent can enable the transmission of directives or commands to the portable computing devices. The supervisory portal system can provide a user interface to facilitate remote monitoring or control over one or more child devices. The administrator of the supervisory portal can determine what content is transmitted to one or more child devices. As an example, the administrator can selectively restrict and approve the third party application repositories that can be visited by a child user. In one arrangement, the administrator can obtain updates and download applications. In some instances, the administrator can send directives or have directives sent to have such items installed on one or more child devices.

The supervisory portal system does not change the general operation of the managed services platform, as described above. For example, the supervisory portal system provides a user interface to facilitate communications between an administrator and the managed services platform. For example, a DMS server can receive inputs from the administrator as to controls, policies and/or restrictions to be imposed on child devices. In response, the DMS server can send directives to the affected child devices to impose the policies in accordance with the heartbeat feature described above. The child devices can be communicatively coupled to the DMS server. In one arrangement, if the child devices violate or attempt to violate any of the imposed controls, policies and/or restrictions, then the administrator can be alerted of such act.

An administrator can flag or block applications and other content that the administrator does not want the child users to have. An administrator can identify such applications or content to ensure that unauthorized or questionable applications not be downloaded to a child device. This is similar to the blacklist policy described above.

Again, it will be understood that embodiments of the supervisory portal system are not limited to sending directives to child devices. Indeed, the DMS server can direct the distribution or dissemination of other content to child devices. For example, a parent, as an administrator, can also enable the delivery of bundles or individual applications and firmware packages to the child portable computing devices similar to procedures described above. Alternatively, the administrator can also direct the child devices to download applications or content.

In addition to these examples presented above, the administrator (e.g., parent) can also manage portable computing devices similar to that described above. For example, an administrator (e.g., parent) can cause messages to be generated and delivered to child devices. The administrator can wipe data from child devices. The administrator can perform remote logouts and logins on child devices. In fact, all of the description relating to the management of devices as described previously is applicable to the supervisory portal systems and methods. The inputs will be processed by the DMS platform 9010 or similar system.

Figure 161:
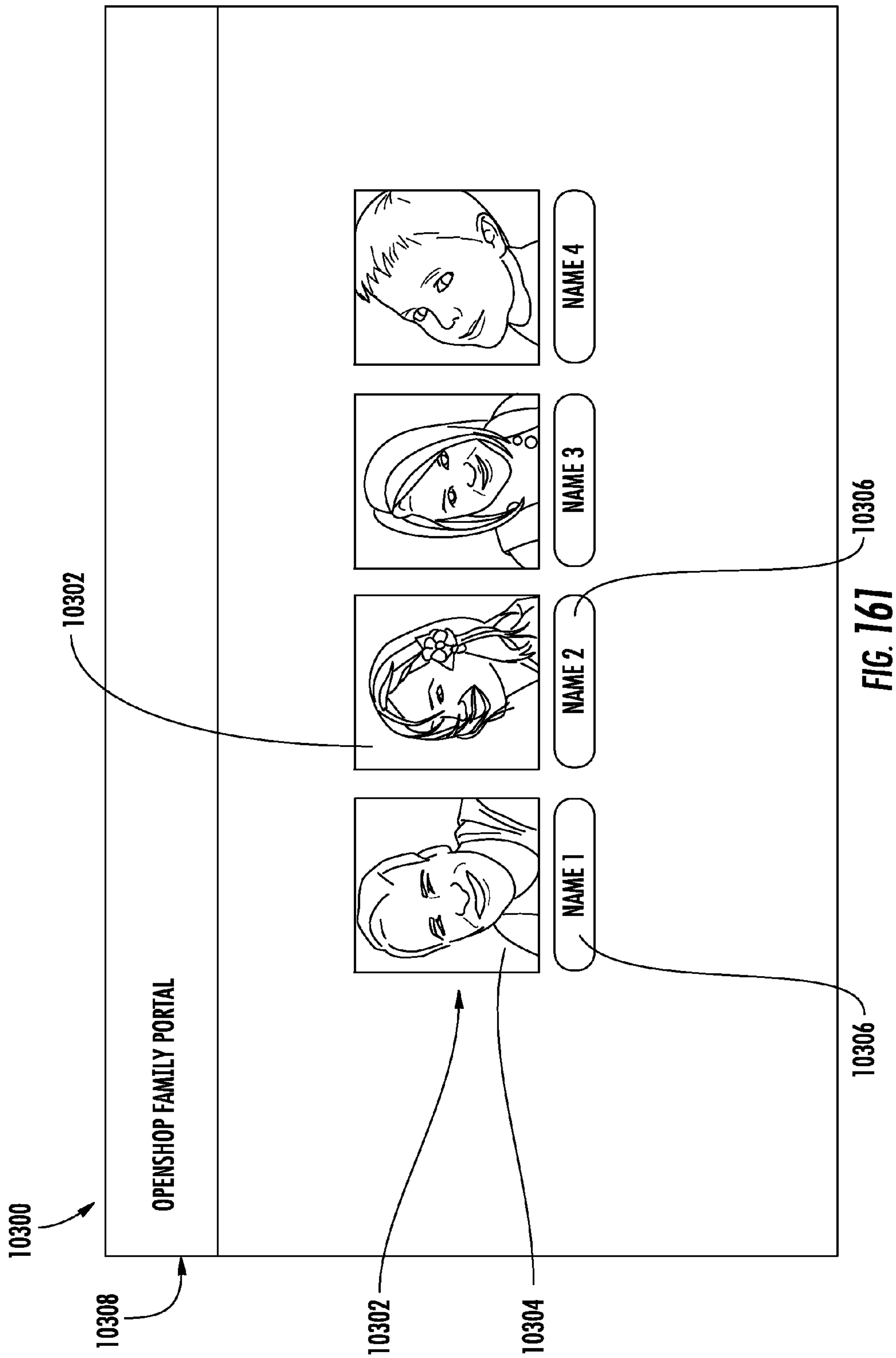
FIG. 161 illustrates an example of a user identification page for a supervisory portal system.

With the above understanding in mind, a user interface and capabilities of the supervisory portal system will now be explained with reference to FIGS. 161-171. While the drawings associated with the supervisory portal system depict a user interface that is configured for use in a family environment, it will be understood that embodiments are not limited to such an application A user of the supervisory portal system can access a portal for carrying out the features described herein. Such access may be by way of any suitable portable computing device equipped with an appropriate software application, including from any child device. A user identification page 10300 can be presented to the user, such as on the display of a computing device. FIG. 161 is an example of one possible user identification page 10300. The user identification page 10300 can have any suitable form, content and features. Thus, it will be understood that the user identification page 10300 shown in FIG. 161 is provided merely as an example and is not intended to be limiting. The user identification page 10300 can present on or more user interface elements. The user interface elements can have any suitable form, such as a graphical user interface element.

In one embodiment, the user interface elements can include a graphical member identifier 10302 for each member associated with the supervisory portal network or possibly for just those particular group members who are authorized to use the particular device being accessed. The graphical member identifier 10302 can be an image, photograph, icon, symbol, logo, name, nickname, screen name, initials, member status, associated number and/or other identifier. The graphical member identifiers 10302 can be customized by the administrator and/or by the child members of the supervisory portal system. In one embodiment, the graphical member identifiers 10302 can include a member photograph 10304 and a member first name 10306, as shown in FIG. 161. The graphical member identifiers 10302 or other user interface elements can accept a user input in any suitable manner. For example, a user may use a keyboard, keypad, display, touch screen, button, joystick, mouse, microphone or other device to select the appropriate graphical member identifier 10302. Naturally, any computing device can be equipped with such devices.

Again, embodiments herein are not limited to the use of graphical member identifiers 10302 to identify the user. Indeed, the system devices can be adapted to accept biometric command inputs to permit identification of the user. As such, retinal, iris, facial, palm, fingerprint and/or voice recognition technologies can be implemented to identify a user. Thus, the device can include a suitable camera, scanner or sensor for retinal, iris, facial, palm and/or fingerprint recognition. Other user identification techniques can be used to identify a user, such as manual input of a user name by a user.

The user identification page 10300 can include a title identifier 10308 of the supervisory portal system. The title identifier 10308 may appear on one or more of pages in the supervisory portal system. The title identifier 10308 can be customized by a system user, such as the administrator.

Figure 162:
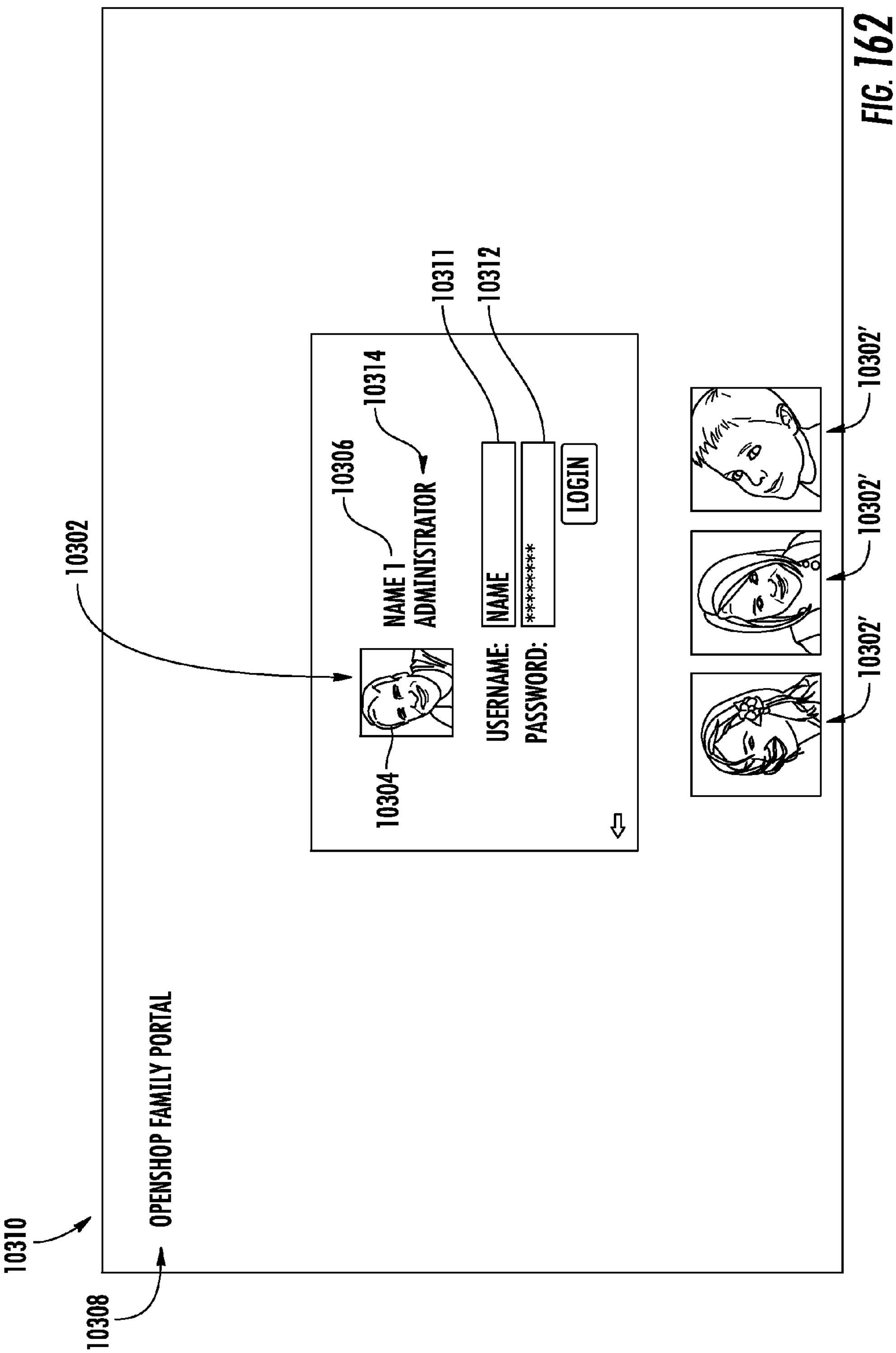
FIG. 162 illustrates an example of a user authentication page for a supervisory portal system.

Once the user is selected, a user authentication page 10310 can be presented to the user, such as on the display of a computing device. FIG. 162 is an example of one possible user authentication page 10310. The user authentication page 10310 can have any suitable form, content and features. Thus, it will be understood that the user authentication page 10310 shown in FIG. 162 is provided merely as an example and is not intended to be limiting.

The user authentication page 10310 can be configured to receive suitable user authentication to unlock the portal so as to permit access thereto. For example, the user authentication page 10310 can provide user interface elements to receive a user authentication input, such as a field to receive username 10311, password 10312, pass code and/or personal identification number. The user authentication input can be expressed in any suitable form, including a verbal command, text, object, pixel, or the like. Alternatively or in addition, biometrics can be collected by a system component to authenticate a user. Accordingly, retinal, iris, facial, palm, fingerprint and/or voice recognition technologies can be implemented to authenticate a user. Thus, the device can include a suitable camera, scanner or sensor for retinal, iris, facial, palm and/or fingerprint recognition. The user input interface can include a display sensor for entering items or drawing patterns on the display of the system device. The user input interface may include a microphone for voice recognition. Of course, the authentication can be combinations of any of the above as well as other things. The supervisory portal system can be configured to store authentication credentials, such as the username and/or password, if desired.

The user authentication page 10310 can have any suitable form and can present any suitable content. For instance, one or more of the graphical identifiers for the selected user can be presented, including any of those described previously including graphical member identifier 10302. A member title identifier 10314 of the selected member may also be presented.

In some instances, an identifier of non-selected members may be displayed. For instance, the graphical member identifiers of the non-selected members 10302' can be presented on the user authentication page 10310 in an offsetting manner to indicate non-selection. Such offsetting can be achieved in any of a number of ways, including, for example, by having the graphical identifiers appear faded, as is shown in FIG. 162.

Figure 163:
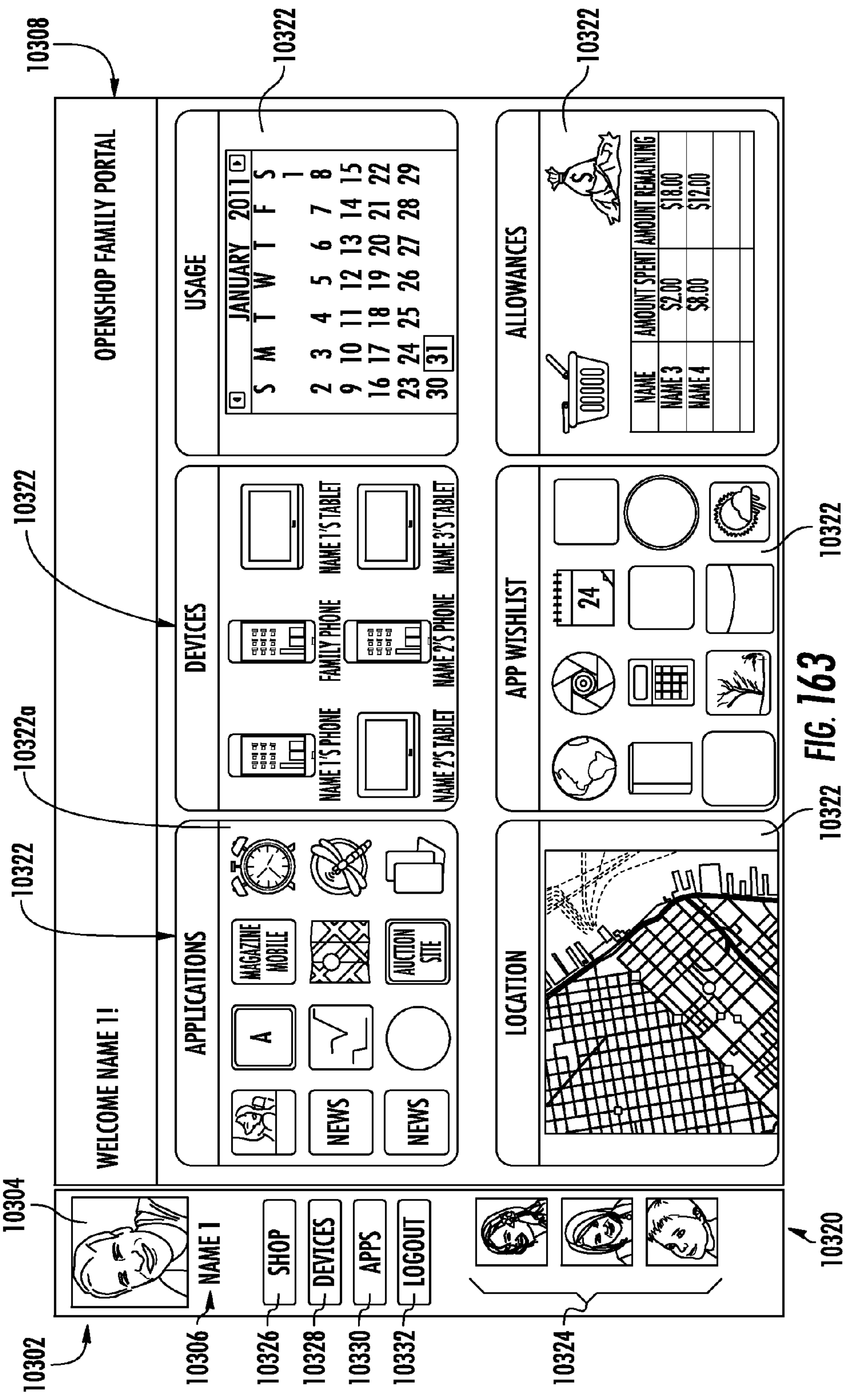
FIG. 163 illustrates an example of a home page for an administrator of a supervisory portal system.

If the user's inputted credentials are authenticated, then a home page 10320 can be presented to the user. FIG. 163 is an example of a possible home page 10320. The home page 10320 can have any suitable form, arrangement, content and features. Thus, it will be understood that the home page 10320 shown in FIG. 163 is provided merely as an example and is not intended to be limiting. The home page 10320 can display one or more identifiers of the authenticated user, including any of the graphical member identifiers 10302 indicated above. Here, the user's photograph 10304 and name 10306 are presented on the home page 10320.

At this point, it should be noted that the description will be primarily directed to the supervisory portal system from the standpoint of the administrator. Aside from the user identification page 10300 and the user authentication page 10310, the following supervisory portal pages described herein may not be available to child members of the supervisory portal system. It should be noted that there can be one or more administrators of the supervisory portal system. For instance, in a family setting, one or both parents can be administrators.

The home page 10320 can present different supervisory features of the supervisory portal system that are subject to the administrator's review and/or control. As an example, the supervisory portal system can allow the administrator to view, access, monitor and/or control applications, devices, usage, location, application wish list, and allowances. A page can be provided for each of these supervisory features. Each of these supervisory features will be described in detail below. Again, these supervisory features are provided as examples and embodiments are not limited to these specific supervisory features. There may be fewer or additional supervisory features available to the administrator.

From the home page 10320, the administrator can select any of the supervisory features of interest for further review. Each of the supervisory features can be presented in any suitable manner. For instance, the supervisory features can be presented on the home page 10320 by a respective user interface element 10322. Each supervisory feature user interface element 10322 can present at least some information can be provided as to that supervisory feature. In one embodiment, relevant information for all child devices can be presented for each supervisory feature. It will be appreciated that the various child devices of the supervisory portal system may have different associated applications, settings and controls. As an example, on the supervisory feature interface element 10322 for applications 10322*a*, the applications installed on all child system devices can be displayed. The relevant information can be presented in any suitable form. For example, an icon and/or the name of each application software program can be presented.

In some instances, it may difficult or impossible to present complete information for all child users under each supervisory feature user interface element 10322. In such case, the presentation of the information under the supervisory feature interface element 10322 can be modified. For instance, a subset of the information may be presented, depending on the available space afforded by the supervisory feature user interface element 10322. In such case, a subset of the total information will be presented. The subset can be determined in any suitable manner, and may be performed automatically, such as by predefined instructions or protocols, or manually by the user. Alternatively, the size of the information can be changed to fit appropriately within the functionality element to minimize or eliminate the need to present a subset of information. Another possibility is that the format in which the information is presented can be changed. Still another possibility is that scroll bars (not shown) can be added.

The home page 10320 can be altered by the administrator. For instance, the administrator can alter the home page 10320 such that each supervisory feature interface element 10322 can present information for a subset of the child users, including information for a single child user. To implement such alterations, child user filters 10324 can be presented on the home page. The child user filters 10324 can be provided in any suitable form, including any of those described above. As shown in FIG. 163, there can be child user filter 10324 for each child user, which may be the same as the graphical member identifiers 10302 presented on the user identification page 10300.

Figure 164:
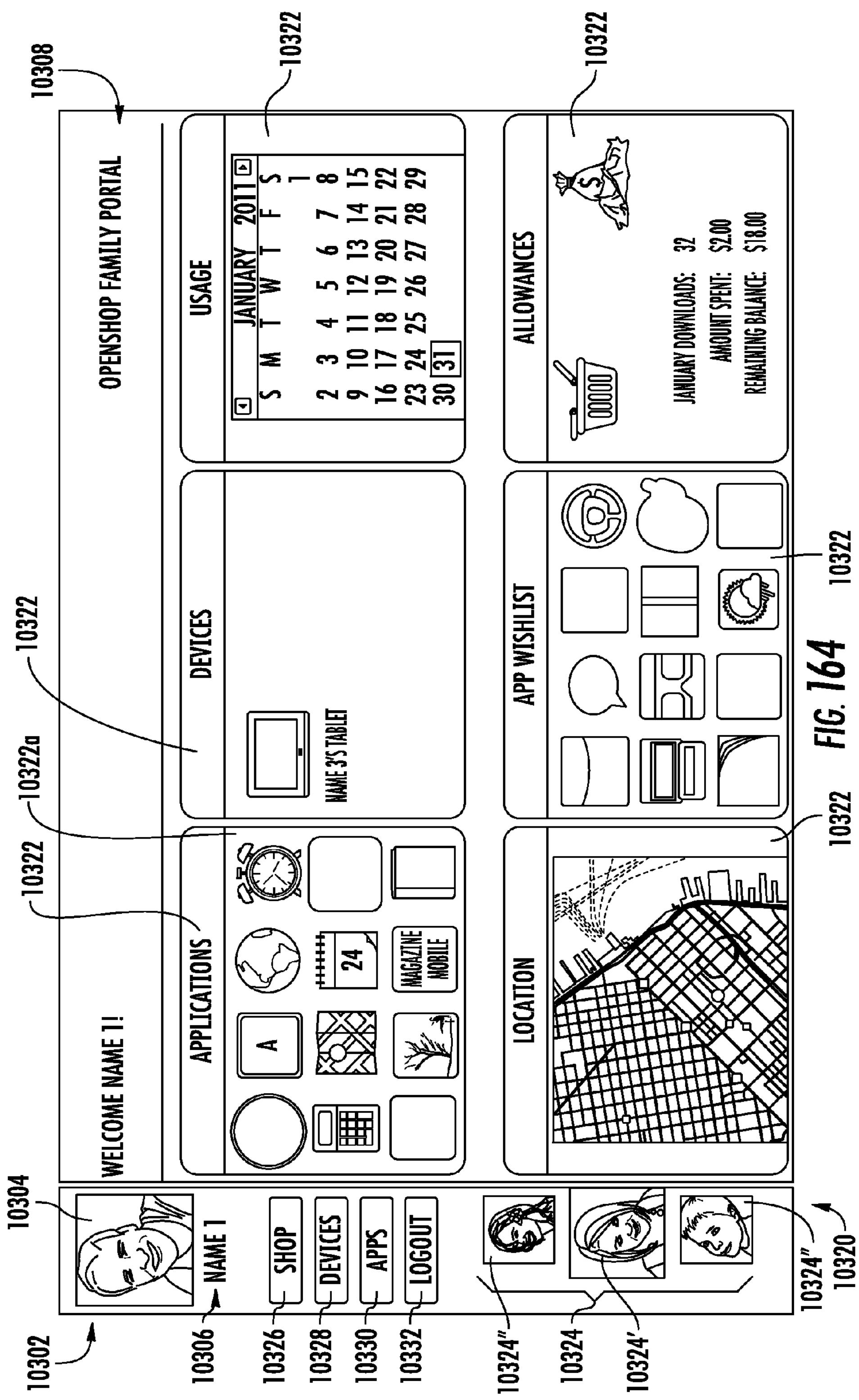
FIG. 164 illustrates an example of a home page for an administrator of a supervisory portal system in which information is displayed for a selected child user.

If the administrator selects one or more of the child user filters 10324, then information for only the selected child user(s) is presented under each of the supervisory feature user interface elements 10322. The appearance and/or content of each of the supervisory feature user interface elements 10322 may change based on the selection. FIG. 164 shows an example of a home page 10320 in which one of the child user filters is selected. As shown, the content of the supervisory feature user interface elements 10322 has changed, showing information in each element 10322 pertaining only to the selected child user.

If one or more child user filters 10324 are selected, the selected child user filters 10324' can be offset from the non-selected child user filters 10324" in some manner to note the selection. For instance, the selected child user filter(s) 10324' can be enlarged relative to the non-selected child user filter(s) 10324", as is shown in FIG. 164. Alternatively, the non-selected child user filter(s) 10324" may be made smaller in size and/or appear faded relative to the selected child user filter(s) 10324'. Still alternatively, the non-selected child user filter(s) 10324" may no longer appear on the home page 10320.

For greater information on any of the individual supervisory features, the administrator can select one of the supervisory feature interface elements 10322 using any suitable user interface technique, including any of those described herein. When such a selection made, a specific supervisory feature page can be presented to the administrator. Various specific supervisory feature pages will be discussed below. Again, the specific supervisory feature pages described herein are provided as examples and are not intended to be an exhaustive list.

It should be noted that additional user interface elements can be presented on the home page and/or on any of the specific functionality pages. For instance, user interface elements for access to an application repository, devices, applications on the administrator device, and logout. For example, a "SHOP" button 10326 can connect the user to an application repository, such as via a suitable communication network. A "DEVICES" button 10328 can cause the devices page to be displayed. One example of a devices page will be described in greater detail below. The "APPS" button 10330 can cause the applications page to be displayed, as will be described in detail below. The "LOGOUT" button 10332 will log the user off of the supervisory portal system.

Figure 165:
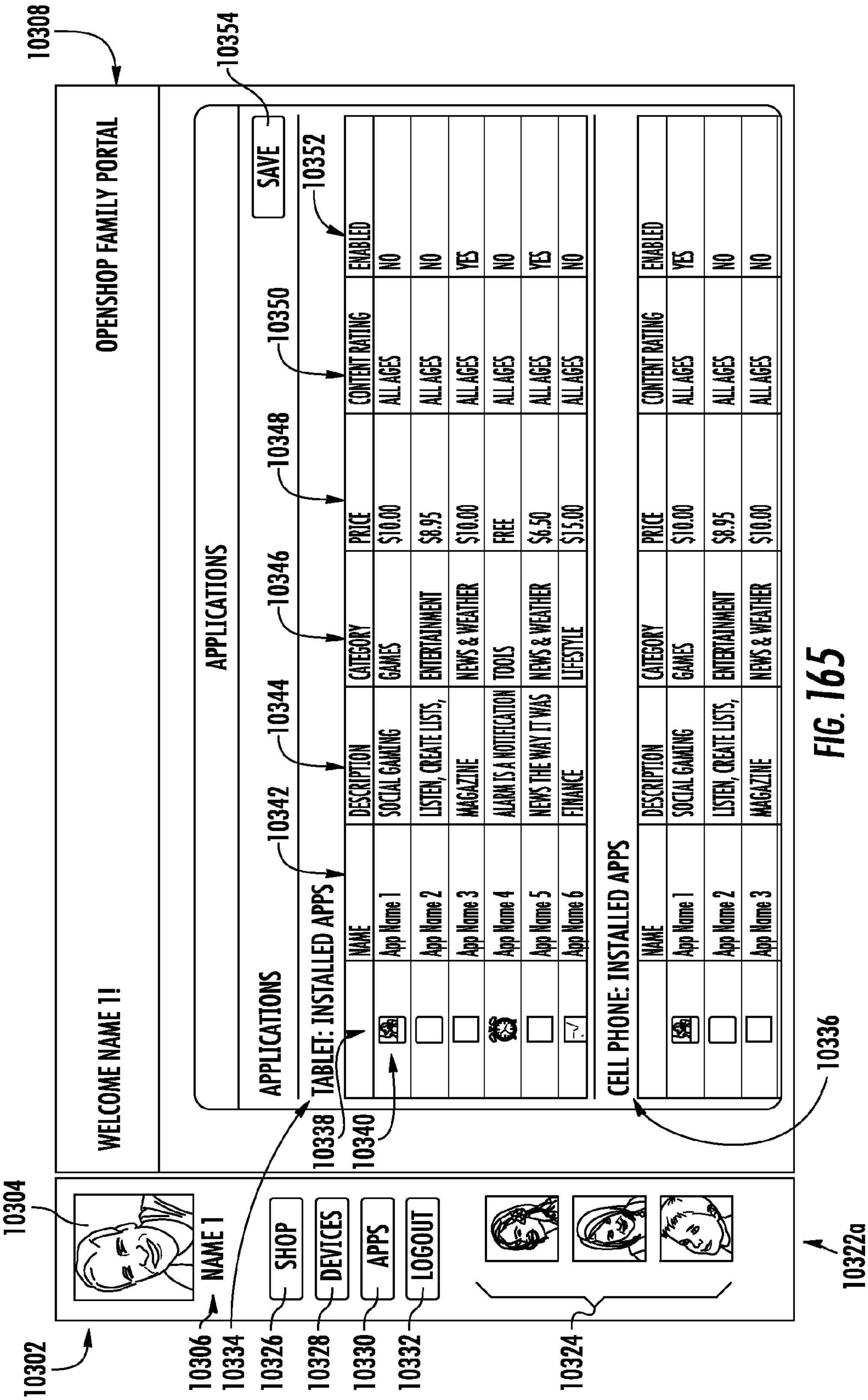
FIG. 165 illustrates an example of an applications page for an administrator of a supervisory portal system.

If selected from the home page 10320 or otherwise, an applications page 10322*a* for supervising applications on child devices can be presented to the administrator. FIG. 165 illustrates an example of an applications page 10322*a* for a supervisory portal system. The applications page 10322*a* can have any suitable form, arrangement, content and features. Thus, it will be understood that the applications page 10322*a* shown in FIG. 165 is provided merely as an example and is not intended to be limiting. The applications page 10322*a* can present information concerning all applications associated with each device of the supervisory portal system. In this context, "applications associated with" is defined as any application that is installed on, downloaded on, accessed by, executed by, or displayed by a child device of the supervisory portal system.

The applications page 10322*a* can be presented in any suitable manner to facilitate user interaction. Information may be presented for all child users of the supervisory portal system. In some instances, information may be presented for the administrator as well. Alternatively, the applications page 10322*a* can be adapted to present the applications associated with one or more system devices that are associated with a particular child user. To that end, child user filters 10324 can be presented, as described above, so that the administrator can select a subset of the identifiers to customize the information presented on the applications page 10322*a*.

Alternatively or in addition to customizing the display of the applications by user, the administrator may be able to customize the presentation of information concerning the associated applications in other ways. For example, the applications can be presented according to the particular system device that they are associated with or according to the type of system device that they are associated with. As shown in FIG. 165, applications associated with a particular category of device are presented under appropriate headings 10334, 10336 for that type of device.

Further, the information can be presented in any suitable form. For instance, the information can be presented in rows and columns. In such case, each application could have its own row, and each column can present information regarding the application. For instance, there can be a first column 10338 for a graphical identifier 10340, such as an icon, associated with each application installed on the device. A second column 10342 may present the name of the application. A third column 10344 can present a description of the application. A fourth column 10346 can present the category of each application. A fifth column 10348 can present the price paid for the application. There can be a sixth column 10350 for a rating of the content of the application. Any suitable content rating system can be used, such as those issued by the Entertainment Software Rating Board (ESRB). There can be a seventh column 10352 of an enablement status of the application. Again, these are just examples of the different information that can be presented. Embodiments are not limited in this respect, as there may be additional or fewer columns than those shown in FIG. 165.

The information displayed on the applications page 10322*a* may be customized by the administrator. For instance, the administrator can add or eliminate columns. The administrator can manipulate the columns so that they appear in a customized order. Any changes made to the applications page 10322*a* can be saved using a "SAVE" button 10354 or other user interface element provided on the page. Additional user interface elements, such as scroll bars (not shown), can be provided to facilitate the administrator's interaction with the applications page 10322*a*.

From the applications page 10322*a*, the administrator may be able to control one or more aspects of the applications associated with the child devices of the supervisory portal system. For example, the supervisory portal system can be configured to allow the administrator to selectively enable and disable individual applications associated with child devices. Any suitable user interface elements can be provided on the applications page 10322*a* to facilitate such capability.

Figure 166:
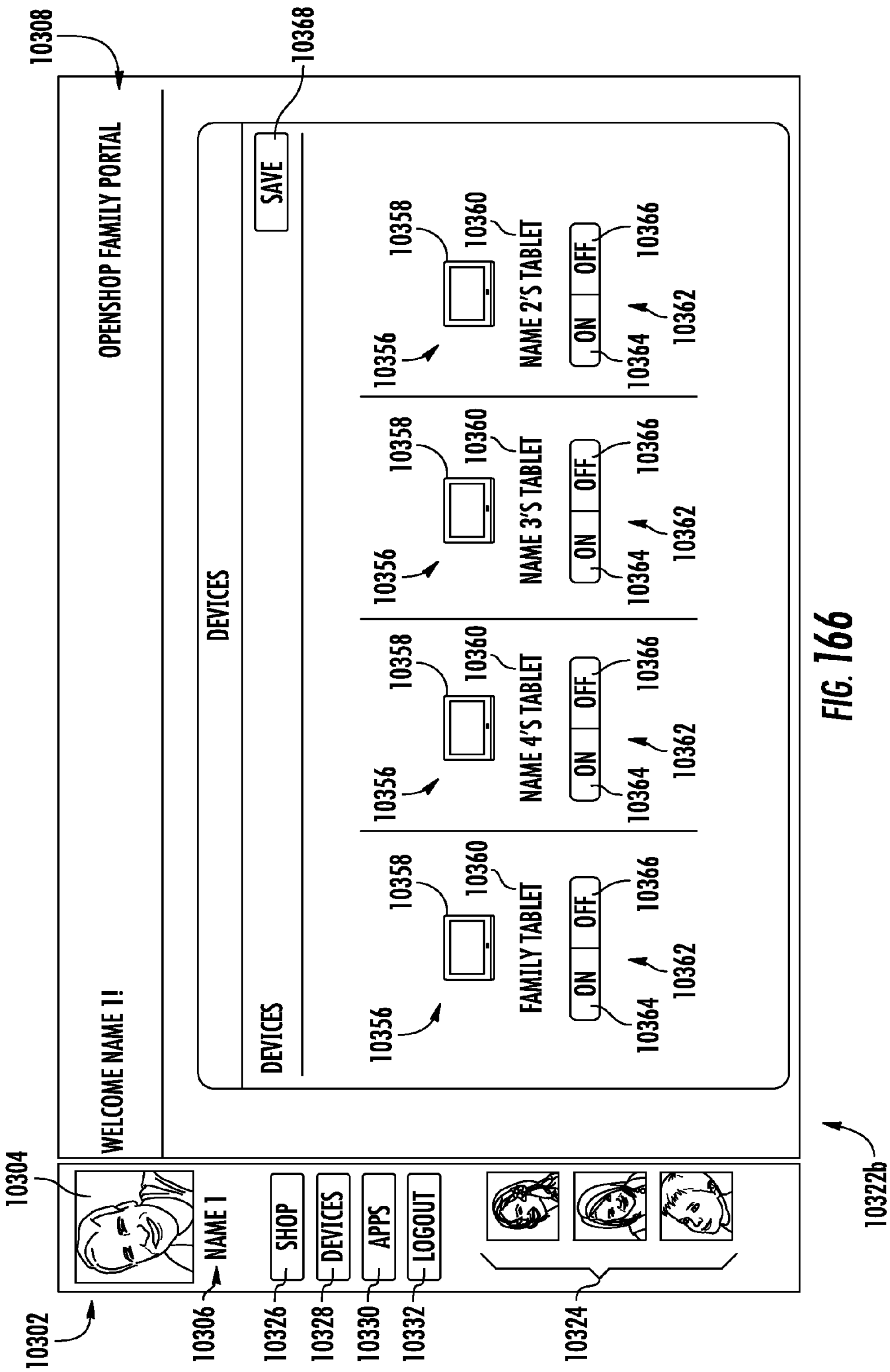
FIG. 166 illustrates an example of a devices page for an administrator of a supervisory portal system.

If selected from the home page 10320 or otherwise, a devices page 10322*b* can be presented to the user. FIG. 166 illustrates an example of a devices page 10322*b*. The devices page 10322*b* can have any suitable form, arrangement, content and features. Thus, it will be understood that the devices page 10322*b* shown in FIG. 166 is provided merely as an example and is not intended to be limiting. On the devices page 10322*b*, the administrator can be presented with all devices of the supervisory portal system. The child devices of the supervisory portal system can be displayed in any suitable manner. For instance, one or more device identifiers 10356 can be presented for each device of the supervisory portal system. The device identifier 10356 can be provided in any suitable form, including graphical and/or textual. For instance, the device identifier 10356 can be an image, photograph, icon, symbol, logo or combinations of these possibilities. As shown in FIG. 166, the device identifier 10356 can be an image of the device, including an actual image of the specific device or an image of the general type of device 10358. The device identifier may also include a device name 10360, which can be the user's name and/or a general descriptor of the device—computer, tablet, phone, smartphone, laptop, etc. The device identifiers 10356 can be customized by the administrator and/or by the child members.

The devices page 10322*b* can display status information for each device. For instance, an activation status 10362 of each device can be presented on the devices page 10322*b*. The activation status 10362 can be associated with the devices in any suitable manner. For example, the activation status 10362 can be presented directly below the device identifier 10356.

With respect to the activation status 10362, there can any suitable activation status information can be displayed. In one embodiment, there can be two settings: on and off. The "on" setting can indicates that the given device is currently powered on or at least enabled to be turned on. The "off" setting can indicate that the given device is currently powered off or otherwise not enabled to be turned on.

The devices page 10322*b* can be configured to allow the administrator to alter the activation status and/or other aspects of one or more of the system devices. Thus, in one embodiment, the administrator can alter the status of one or more of the devices presented on the devices page 10322*b*. For instance, the administrator may be able to selectively activate and deactivate the system devices from the devices page 10322*b*. For instance, as is shown in FIG. 166, each displayed system device can include user interface elements, such as an ON button 10364 and an OFF button 10366, associated therewith. The administrator can select the ON and OFF buttons 10364, 10366 or other user interface elements using any known technique. If the administrator selects the ON button 10364, then the particular device can be activated or at least enabled to be activated. On the other hand, if the administrator selects the OFF button 10366, then that particular system device can be locked or disabled.

The system can be configured to send a directive or have a directive sent to the affected child device. The term "directive" means one or more commands, programs, requests, content or instructions for initiating an action on a device. The directive can be sent in any suitable form, including as a message communicated to the respective receiving child device. In such case, the message can include at least one command to be executed by the receiving child device.

Notifications of an administrator's action can be sent to any affected child users. Such notification can be provided in any suitable form, such as email, instant message, text message or voice message.

The devices page 10322*b* can present information on the devices for all child users of the supervisory portal system. However, the devices page 10322*b* can accept inputs from the administrator to view the system devices associated with a subset of the supervisory portal system users. An earlier discussion of ways in which such customizing can be implemented is equally applicable here. Changes to the status of any of the system devices can be saved using a "SAVE" button 10368 or other suitable user interface element.

Figure 167:
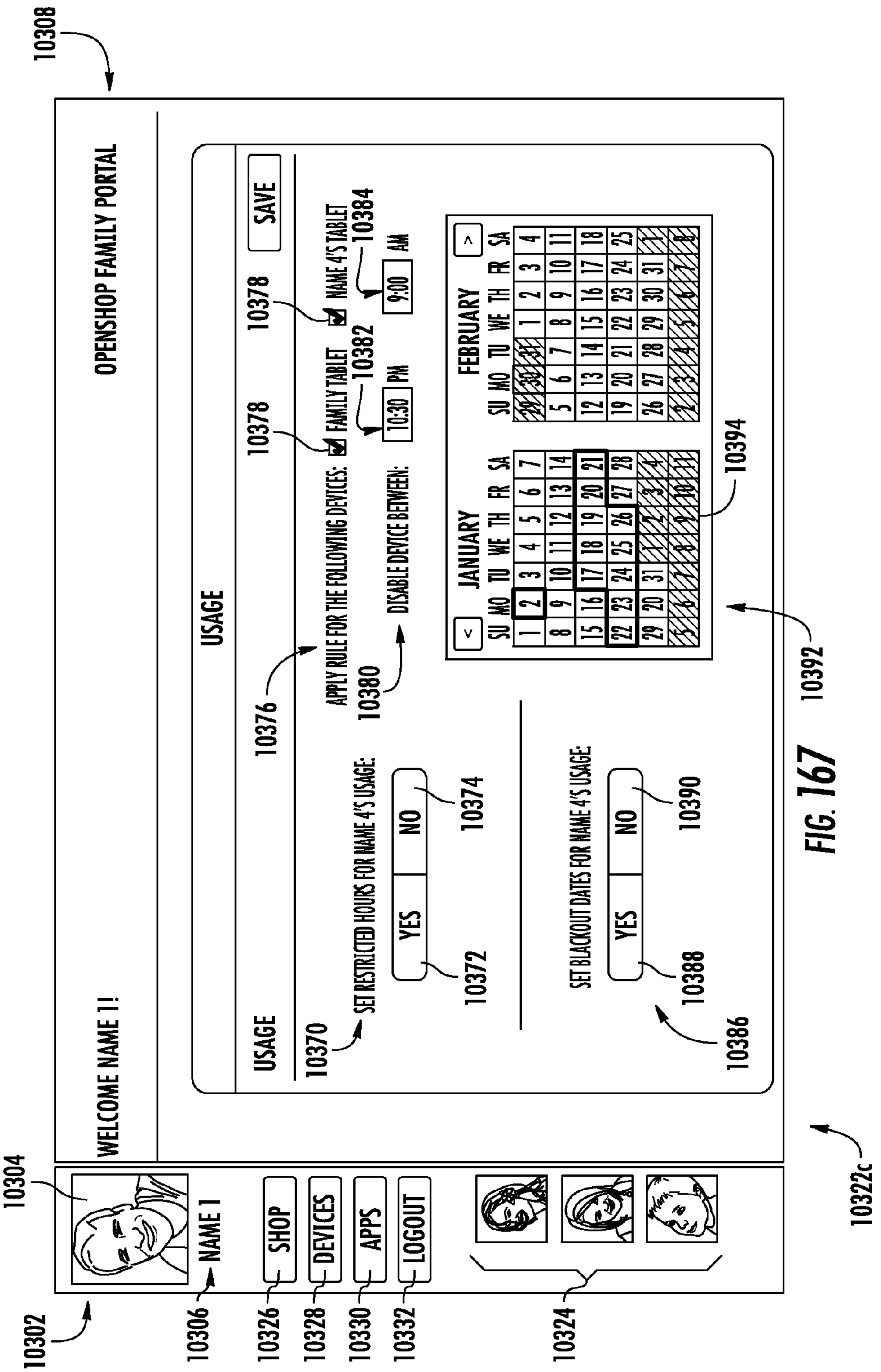
FIG. 167 illustrates an example of a usage page for an administrator of a supervisory portal system.

If selected from the home page 10320 or otherwise, a usage page 10322*c* can be presented to the administrator. FIG. 167 illustrates an example of a usage page 10322*c* of the supervisory portal system. The usage page 10322*c* can have any suitable form, arrangement, content and features. Thus, it will be understood that the usage page 10322*c* shown in FIG. 167 is provided merely as an example and is not intended to be limiting. On the usage page 10322*c*, an administrator can view the usage of one or more devices of the supervisory portal system. Moreover, an administrator can selectively impose usage restrictions on one or more of the devices in the supervisory portal system.

Controls on usage can be set for each child user and/or for each child device. For instance, the usage page can present user interface elements 10370 that can allow for the setting of restricted hours for each child user and/or child device. For example, the restricted hour elements 10370 can allow the administrator to determine whether to impose any restricted hours on a child user or device. The restricted hour elements 10370 can be provided in any suitable form, such as a YES button 10372 and a NO button 10374, as is shown in FIG. 167. If the NO button 10374 or other input is selected, then no further user interface elements for restricted hours may be presented to the administrator. However, if the YES button 10372 is selected, then additional user interface elements may be presented. For instance, user interface elements 10376 can be provided the administrator can select which devices of the supervisory portal system that the restricted hours will apply to. The administrator can make the selections in any appropriate manner. For instance, device check boxes 10378 may be provided for each device presented. If the administrator selects one of the check boxes 10378, the appearance of the check box may change, such as by displaying a check mark within the selected box.

In addition, temporal control options 10380 can be provided to the administrator. As is shown, a child user's usage of the selected devices can be restricted during certain hours. To that end, a disablement start time input element 10382 and a disablement end time input element 10384 can be provided on the usage page 10322*c*. The restricted hours can be input by the administrator in any suitable manner.

Alternatively or in addition to restricted hours, the usage page 10322*c* can allow for the setting of blackout dates for a child user and/or device in which a particular device or user is prevented from using the device. To set blackout dates, a blackout user input 10386 can be provided. For instance, in the example shown in FIG. 167, a YES button 10388 and a NO button 10390 can be provided. If the NO button 10390 or other input is selected, then no further options for blackout dates may be presented to the administrator. If the YES button 10388 is selected, then additional user interface elements 10392 may be presented so that the administrator can input blackout dates. For instance, a calendar 10394, menu or other element can be presented with which the administrator can operatively interact to set the appropriate blackout dates. In the example shown in FIG. 167, the administrator has selected January 17-26 as blackout dates in which the selected devices of the selected child user will be disabled. Changes to the usage controls of the system devices can be saved using a "SAVE" button 10396 or other suitable user interface element.

The DMS server and/or the managed serves platform can be configured to send a directive or have a directive sent to the appropriate device(s) to implement the selected usage restrictions. Notifications of the restrictions can be sent to the affected child user(s). Such notification can be provided in any suitable form, such as email, instant message, text message or voice message, just to name a few possibilities.

Figure 168:
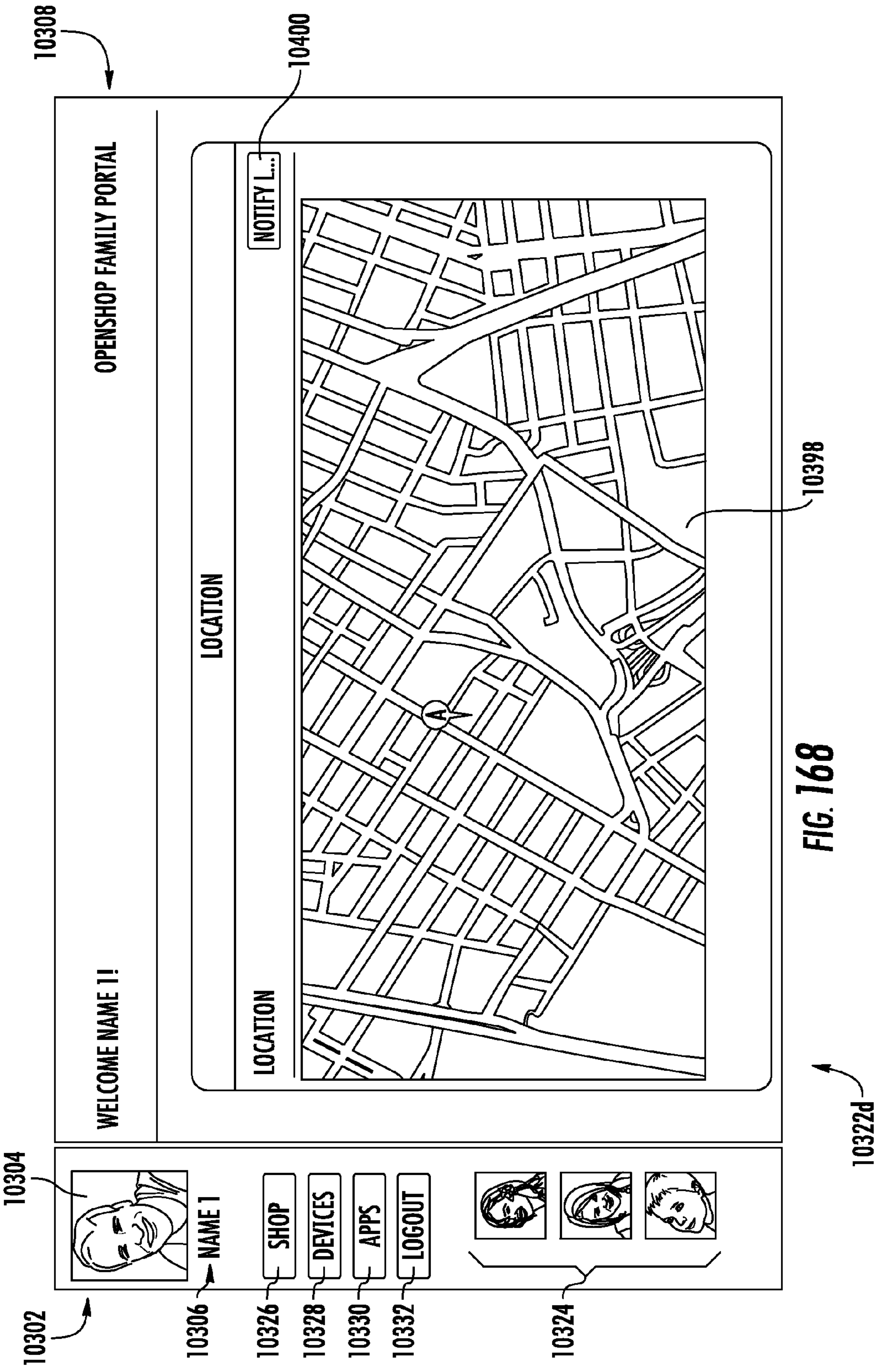
FIG. 168 illustrates an example of a location page for an administrator of a supervisory portal system.

If selected from the home page 10320 or otherwise, a location page 10322*d* can be presented to the administrator. FIG. 168 illustrates an example of a location page 10322*d* of the supervisory portal system. The location page 10322*d* can have any suitable form, arrangement, content and features. Thus, it will be understood that the location page 10322*d* shown in FIG. 168 is provided merely as an example and is not intended to be limiting. On the location page 10322*d*, the current location of one or more of the child devices of the supervisory portal system can be presented. The location of all child devices can be presented at the same time or, as described above, the administrator may select a subset of all child users and/or devices for display.

The location of the child devices can be presented in any suitable format. For instance, the location of each child device can be shown on a map 10398. Any suitable mapping application can be used. The map 10398 can display a set of user interface elements (not shown) for interacting with the map, including, for example, a zoom bar, directional movement, return-to-last results button, satellite view, map view, and/or street level view, one or more of which can enable the user to affect or manipulate the mapping program. Alternatively or in addition, the location of each child device can be presented in terms of coordinates, ZIP code, or the name of the city, county, state and/or country in which the device is location.

The location of the child devices can be determined in any suitable manner. In some embodiments, the child devices can include a positioning system (not shown). The positioning system can be configured to monitor and/or determine the current geographic position of the child device. The positioning system can be any suitable type of positioning system, including, for example, a global positioning system, a local positioning system or a geolocation system. The positioning system may be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System.

Alternatively or in addition, the positioning system can be based on access point geolocation services, such as using the W3C Geolocation Application Programming Interface (API). With such a system, the location of the device can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the device is determined will depend on the manner of operation of the particular positioning system used.

For each child user and/or device, the administrator may set permitted geographic boundaries. Such geographic boundaries can be defined in any suitable manner. For instance, appropriate geographic boundaries can be defined by geographic coordinates, a specified radius about geographic coordinates or an area defined by geographic coordinate boundaries. The administrator can manually input one or more geographic coordinates into the administrator portal, as a location policy, to be considered as acceptable boundaries within which a child user can move. The child device can be configured to reports its location in any suitable form to the DMS server. The DMS server can in turn notify the administrator if the location policy has been violated or take any predefined action set by the administrator.

If the child user is outside of the predefined boundaries, then the administrator can be notified. The notice can be provided in any suitable form including an email, an instant message, a text message or a voice message, just to name a few possibilities. Further, the supervisory portal can send a warning to a child user. Such a warning can be generated automatically or at the request of the administrator. For instance, a user interface element, such as a NOTIFY button 10400, can be provided. If a child user is in a location that the administrator does not approve of, then the administrator can select the NOTIFY button 10400 to send a warning or notification to the child device.

Figure 169:
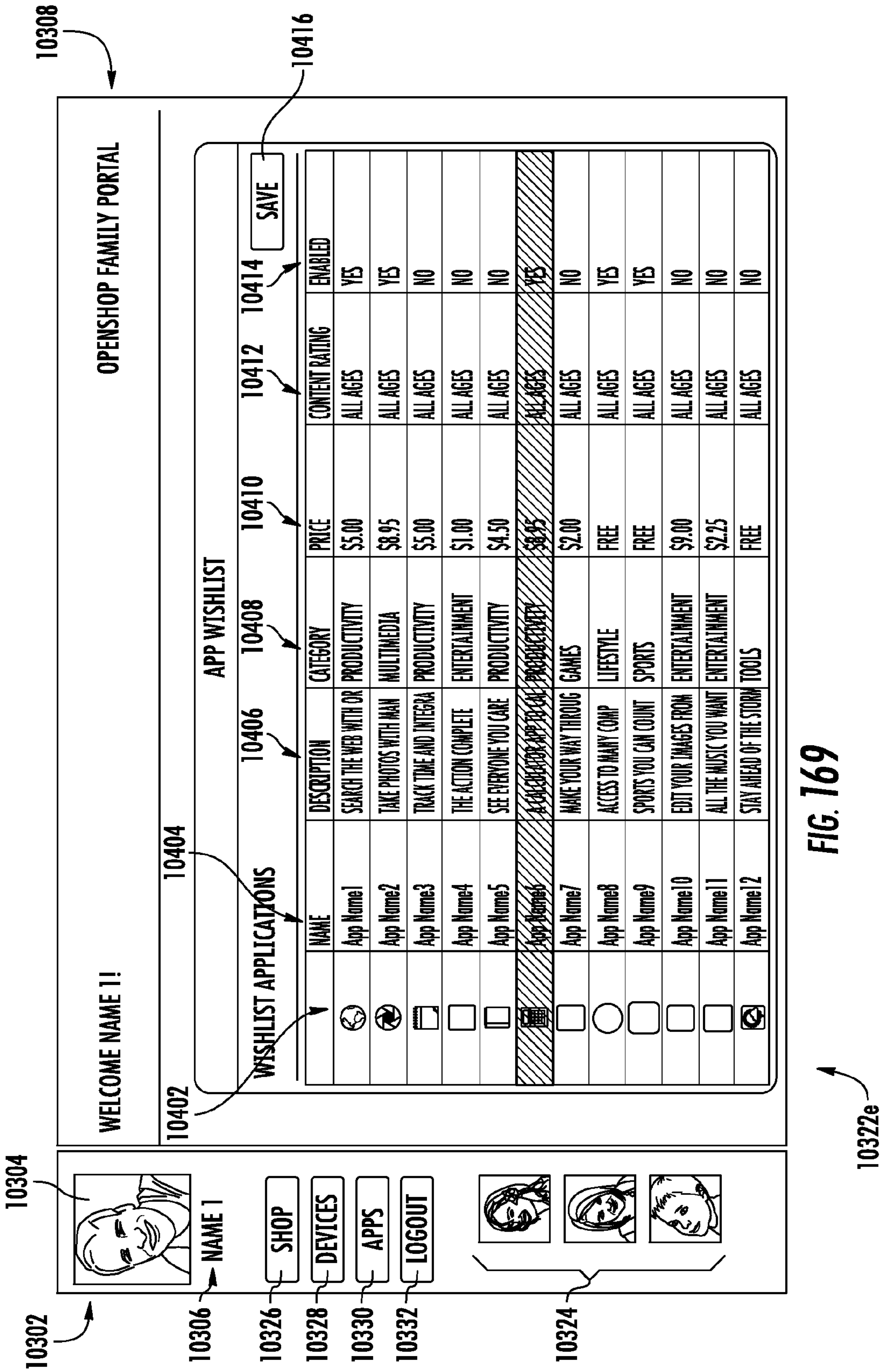
FIG. 169 illustrates an example of a wish list page for an administrator of a supervisory portal system.

If selected from the home page 10320 or otherwise, an application wish list page 10322*e* can be presented to the administrator. FIG. 169 illustrates an example of an application wish list page 10322*e*. The application wish list page 10322*e* can have any suitable form, arrangement, content and features. Thus, it will be understood that the application wish list page 10322*e* shown in FIG. 169 is provided merely as an example and is not intended to be limiting. On the application wish list page 10322*e*, requests from child users seeking permission to download applications can be presented for review and approval or rejection by the administrator.

The supervisory portal system can be configured so that the child users are only permitted to access certain application repositories, as determined by the administrator in a managed services platform as well as in a non-managed services platform. While visiting such application repositories, the child user may discover one or more applications of interest. If the child user is unable to download the application due to the prevailing controls of the supervisory portal system or otherwise, the child user can submit a request to the administrator. The request can be sent in any suitable form by way of a child portal with access to the supervisory portal system. The application wish list page 10322*e* can present all of the applications that one or more of the child users wish to download onto their specific device. The administrator can review the individual requests and can selectively approve or disapprove each request. Appropriate user interface elements can be provided on the application wish list page 10322*e* to facilitate the process.

The application wish list page 10322*e* can be formatted in any suitable manner. For instance, information can be provided in rows and columns Any suitable information can be provided. For example, as is shown in FIG. 169, some possible columns can be: graphical identifier of the application 10402, application name 10404, description of the application 10406, category of the application 10408 (i.e., games, sports, entertainment, tools, productivity, multimedia, etc.), the price of the application 10410, and the content rating 10412. There can also be a column 10414 indicating whether the application is enabled or not. Indeed, while a user may have one or more applications downloaded onto the device, the administrator may be able to selectively enable and disable each individual program from the application wish list page 10322*e*. The columns of the application wish list page 10322*e* can be the substantially the same as the column headings on the applications page 10322*a*. In some instances, the columns of the application wish list page 10322*e* can be different than the column headings on the applications page 10322*a*.

Once an administrator has made inputs relative to the wish list, the administrator can save the changes by saving the changes. To that end, a user interface element, such as a SAVE button, can be provided. The administrator's inputs can be communicated to the DMS server, which in turn sends directives to the affected child device.

As before, the information displayed on the application wish list page 10322*e* can be displayed for all child users. Alternatively, the information can be displayed for a subset of all child users, including information for a single child user. To that end, one or more child users can be selected by interacting with identifiers or other user interface elements provided on the page, as described above.

Notifications of an administrator's action on the request can be sent to the requesting child user. Such notification can be provided in any suitable form, such as email, instant message, text message or voice message.

Figure 170:
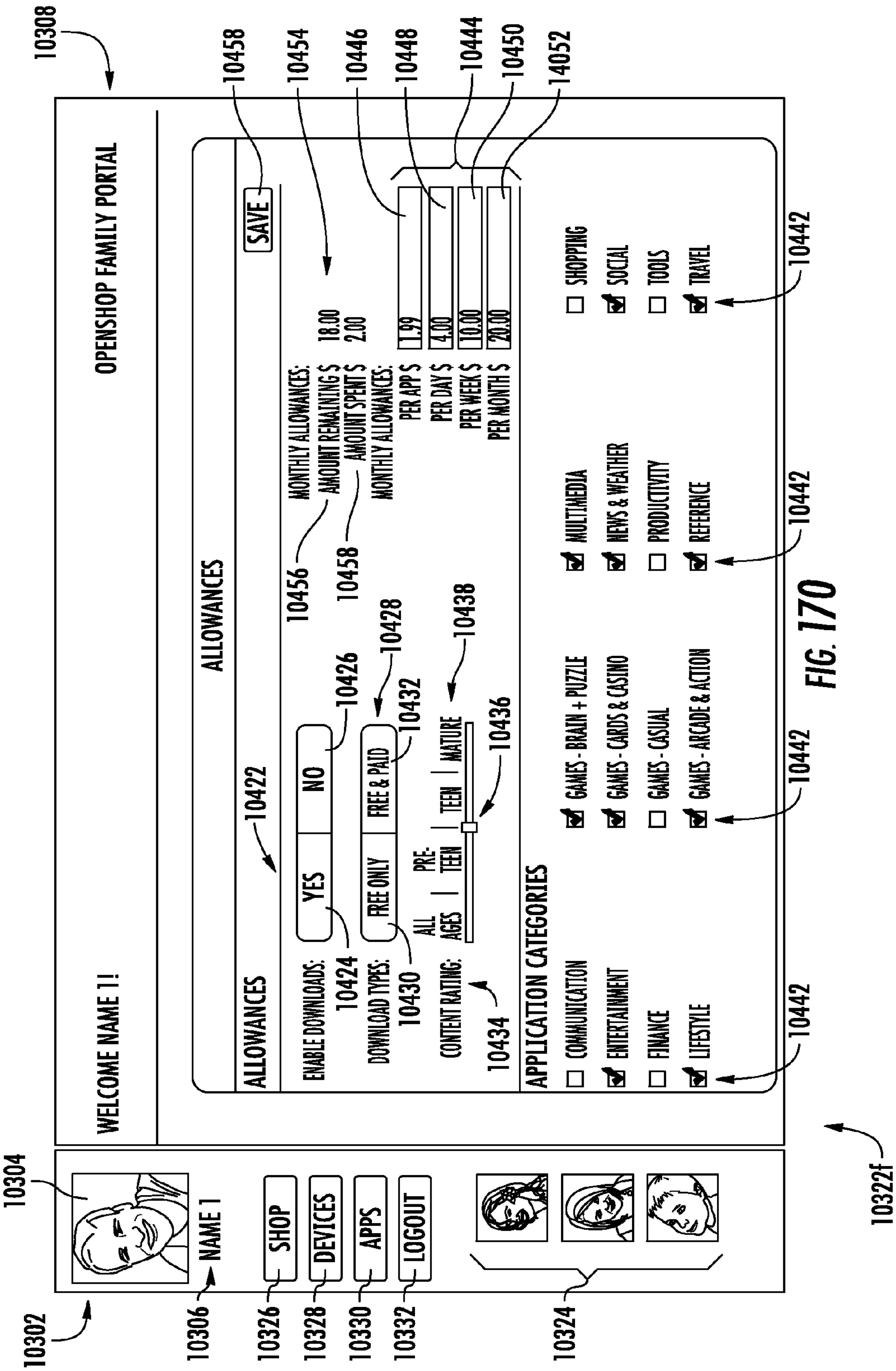
FIG. 170 illustrates an example of an allowances page for an administrator of a supervisory portal system.

If selected from the home page 10320 or otherwise, the administrator can be presented with an allowances page 10322*f*. FIG. 170 illustrates an example of an application wish list page 10322*f*. The application wish list page 10322*f* can have any suitable form, arrangement, content and features. Thus, it will be understood that the application wish list page 10322*f* shown in FIG. 170 is provided merely as an example and is not intended to be limiting. From the allowances page 10322*f*, the administrator can apply allowance limits to one or more child users and/or to one or more child devices of the supervisory portal system. The allowance limits can be provided in any suitable form. Some examples of allowance limits will now be described. It will be understood that the following allowance limits are provided as examples and are not intended to be limiting.

One example of an allowance is whether downloads of applications or other content are permitted by a particular child user and/or on particular a child device. Suitable download enabling user interface elements 10422 can be presented to receive an input from an administrator. For instance, a YES button 10424 and a NO button 10424 can be provided on the allowances page 10322*f*. If the YES button 10424 is selected, then downloads are generally permitted by the child user and/or on the child device. If the NO button 10426 is selected, then downloads are not permitted by the child user and/or on the child device.

However, if downloads are enabled for a child user and/or on a child device, then further allowance limits can be applied by the administrator. Any suitable type of allowance limits can be applied. For instance, limits can be applied to allow only certain types of downloads. The allowances page can present download type user interface elements 10428 to facilitate the setting of such limits. In one embodiment, the download type user interface elements 10428, such as a FREE ONLY button 10430, can be provided to allow the administrator to permit the downloading of free applications and items by a child user and/or on a child device. Additional user interface elements can be provided to address other application types. For instance, user interface elements, such as a FREE & PAID button 10432, can be provided to allow the administrator to permit the downloading of free applications and items as well as those which must be paid for. The buttons 10430, 10432 or other user interface elements can be selected using conventional techniques.

Alternatively or in addition, an administrator can apply allowance limits based on the age content of the downloads. To that end, content rating user interface elements 10434 can be presented on the allowances page 10322*f* to receive an input from the administrator. The content rating user interface elements 10434 can be provided in any suitable form. As an example, FIG. 170 shows an embodiment in which an adjustable scale 10436 is provided. Content descriptors (i.e., all ages, pre-teen, teen, mature) 10438 can be provided along the scale 10436. The content descriptors 10438 can be arranged in any suitable manner, such as in chronological order. The administrator can interact with the scale 10436 to set the appropriate limits for each child user and/or each child device.

Further, the allowances page 10322*f* may allow the administrator to set allowances based on the application category. The type and quantity of categories can vary, and the categories provided in FIG. 170 are only examples. Any suitable user interface elements 10440 can be provided to receive inputs from an administrator to set allowance limits based on application category. As shown in FIG. 170, the application categories user interface elements 10440 can be provided in the form of check boxes 10442 to accept user input. The check boxes 10442 can be selected using conventional techniques. By accepting, the appearance of the check box 10442 may be caused to change, such as by showing a check mark within the box.

Alternatively or in addition to the above possibilities, the allowance page 10322*f* can receive an input from the administrator based on monetary restrictions. For instance, the administrator may impose an allowance for a given time period (such as a month). That is, the administrator can establish a maximum amount that can be spent on downloads by a particular child user and/or on a particular child device within a given time period. Appropriate monetary user interface elements 10444 can be provided to receive appropriate inputs from the administrator.

The monetary user interface elements 10444 can be set in any suitable manner. For instance, the administrator can input a maximum money limit for each downloaded application 10446. Alternatively or in addition, the administrator can input a maximum daily allowance 10448, a maximum weekly allowance 10450, a maximum monthly allowance 10452, a maximum semi-annual allowance (not shown) and/or a maximum annual allowance (not shown). If any of the imposed limits are reached, the system can be configured to restrict a child user from downloading further applications or items unless and until the limit is reset or the administrator changes the parameters of the allowance limits. Appropriate warning and/or notification messages can be sent to the child user and/or the administrator if one or more allowance limits are reached.

The above discussion provided some examples of the kind of limits that can be placed on child users. These examples are not intended to be limited. Indeed, there are numerous examples of other limits that can be imposed. For example, the administrator may impose limits on the quantity of applications or items that can be downloaded within a defined period of time.

The allowances page **10322*f* can provide a status indicator 10454 of the allowance limits of each child user and/or child device. For instance, as is shown in FIG. 170, it can show the monthly allowance in terms of the money remaining 10456 and the amount spent for the month 10458 by the child user. Once an administrator has made inputs relative on the allowances page 10322*f*, the administrator can save the changes by saving the changes. To that end, a user interface element, such as a SAVE button 10458**, can be provided.

The administrator device, the DMS server and/or the managed serves platform can be configured to send a directive or have a directive sent to the appropriate device(s) to implement the inputted allowances. Notifications of any allowances can be sent to the affected child user(s). Such notification can be provided in any suitable form, such as email, instant message, text message or voice message, just to name a few possibilities.

One manner of the operation of the supervisory portal system will now be described in connection with FIG. 171. With these examples in mind, various possible steps of a supervisory portal method 10500 will now be described. The method 10500 illustrated in FIG. 171 may be applicable to the embodiments described above, but it is understood that the method 10500 can be carried out with other suitable systems and arrangements. Moreover, the method 10500 may include other steps that are not shown here, and in fact, the method 10500 is not limited to including every step shown in FIG. 171. The steps that are illustrated here as part of the method 10500 are not limited to this particular chronological order, either.

Figure 171:
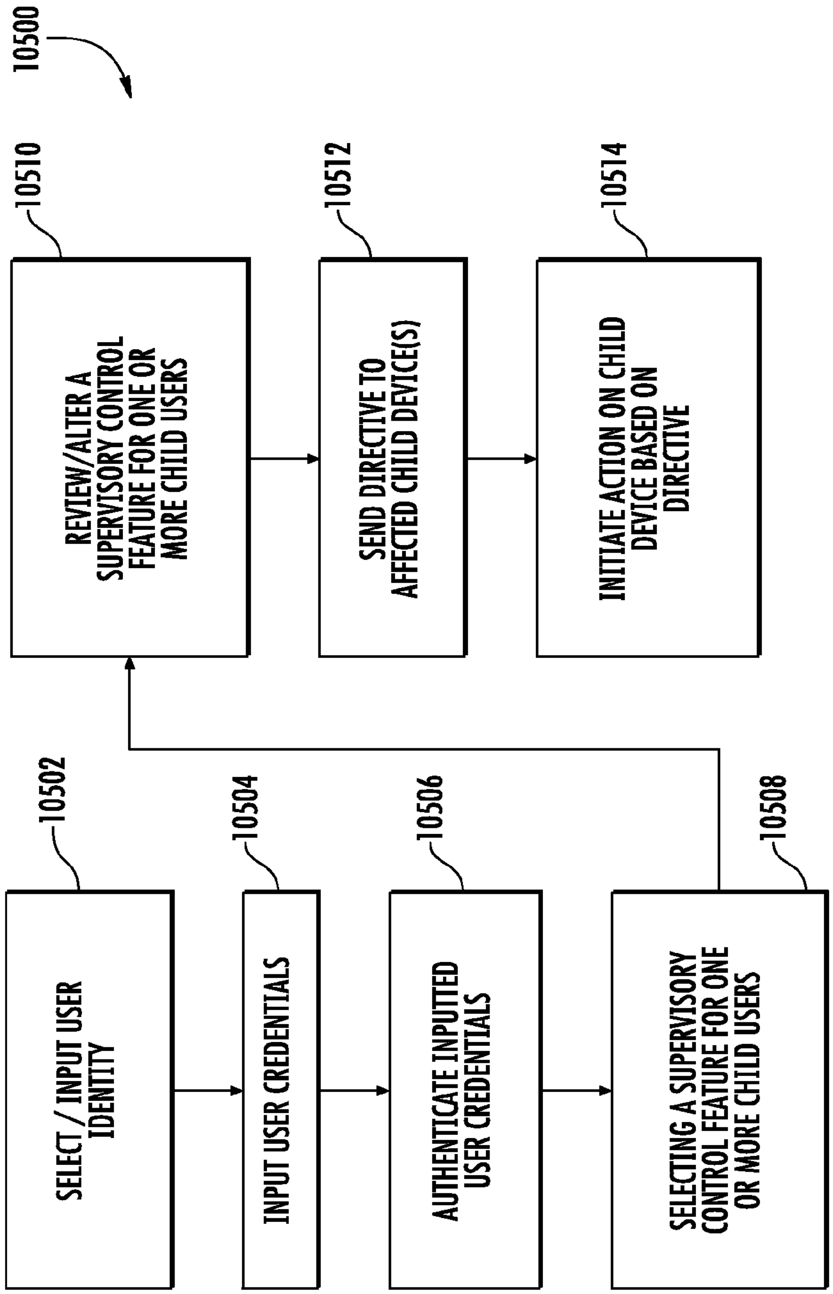
FIG. 171 is an example of a supervisory portal method.

Referring to FIG. 171, an exemplary supervisory portal method 10500 is shown. At step 10502, a user identity can be selected or otherwise inputted on a computing device supervisory portal. At step 10504, a user can be prompted to input user credentials, such as a password, for authentication at step 10506. If sufficient authentication is provided, then access to the supervisory portal is permitted. If the device has been accessed by an administrator, then the administrator can be presented with one or more supervisory control user interface elements over the child devices of the supervisory portal system. The administrator can review information for one or more child devices that are supervised by the administrator.

At step 10508, the administrator can select a supervisory control feature of the supervisory portal system. At step 10510, the user can review, adjust and/or implement a control setting for the selected supervisory feature. Again, examples of such supervisory control features include applications, devices, usage, location, allowances and approval/denial of wish list applications. These and other supervisory features are described above. Supervisory control features can be set on the basis of individual child devices and/or on the basis of individual child users of the supervisory portal system.

At step 10512, the supervisory control feature inputs by the administrator can be sent as a directive to the affected child devices. Such directives can be sent by the DMS server. Once received, an action can be initiated on the child device based on the directive at step 10514.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for approving applications, comprising:

a first computing device that is configured to present a first interface to permit application developers to submit applications for approval for selective publication in a first application repository associated with and under the control of a first client and a second application repository associated with and under the control of a second client; and a second computing device that is communicatively coupled to the first computing device, wherein the second computing device is configured to present a second interface to permit the approval of submitted applications for the selective publication in the first application repository and the second application repository;

wherein if a submitted application is approved, the second computing device is configured to notify the first computing device that the submitted application has been approved;

wherein employees of the first client are permitted to download the approved application from the first application repository through first portable computing devices associated with the first client and employees of the second client are permitted to download the approved application from the second application repository through second portable computing devices associated with the second client;

wherein the first portable computing devices associated with the first client are granted access to the first application repository only in response to the receipt of a bundle of the first client at the first portable computing devices and the second portable computing devices associated with the second client are granted access to the second application repository only in response to the receipt of a bundle of the second client at the second portable computing devices.

2. The system according to claim 1, wherein the first computing device is further configured to enable the upload of applications prior to being submitted for approval.

3. The system according to claim 2, wherein the first computing device is further configured to present an uploaded application and information associated with the uploaded application, wherein the information includes one or more of the following items:

an application name;
a language type;
a category;
a version;
a rating;
a licensing model; or
a transaction price.

4. The system according to claim 3, wherein the first computing device is further configured to enable the selection of the information prior to the uploaded application being submitted for approval.

5. The system according to claim 2, wherein the first computing device is further configured to push the uploaded application to or pull the uploaded application from a testing device.

6. The system according to claim 1, wherein the second computing device is further configured to enable a user to permit the rejection of a submitted application.

7. The system according to claim 6, wherein the second computing device is further configured to notify the first computing device when the submitted application has been rejected.

8. The system according to claim 1, wherein the first computing device is further configured to present one or more of the submitted applications and the submitted applications are assigned a status indicator at the first computing device that provides information as to the stage of review for approval for a submitted application.

9. The system according to claim 8, wherein once an application is submitted for approval, the status indicator indicates the submitted application as being in a pending state.

10. The system according to claim 8, wherein once a submitted application is approved for publication, the status indicator indicates the approved application as being in an approved state.

11. The system according to claim 8, wherein once an approved application is published in either the first application repository or the second application repository, the status indicator indicates the published application as being in a published state.

12. The system according to claim 8, wherein if a submitted application is rejected for approval for publication, the status indicator indicates the submitted application as being rejected.

13. The system according to claim 8, wherein if an application has been upgraded, the status indicator indicates the application as being upgraded.

14. The system according to claim 13, wherein the upgraded application is a submitted application, a published application or a rejected application.

15. The system according to claim 1, wherein the first computing device is further configured to provide performance data relating to a submitted application once the application is published in the first application repository or the second application repository.

16. The system according to claim 1, wherein the first computing device is further configured to provide cumulative performance data relating to a plurality of published applications in the first application repository or the second application repository.

17. The system according to claim 1, wherein the first computing device is further configured to selectively isolate performance data relating to submitted applications such that access to such performance data is restricted.

18. The system according to claim 1, wherein the second computing device is further configured to receive the submitted application and the second interface enables the selection of an approval indicator or a rejection indicator.

19. The system according to claim 18, wherein the submitted application is approved and the second computing device is further configured to notify the first computing device of the approval of the submitted application upon the selection of the approval indicator.

20. The system according to claim 18, wherein the second computing device is further configured to notify the first computing device of the rejection of a submitted application upon the selection of the rejection indicator.

21. The system according to claim 20, wherein the second computing device is further configured to provide the first computing device with rejection information when notifying the first computing device of the rejection of the submitted application.

22. The system according to claim 18, wherein the second computing device is further configured to present the submitted application and to provide information associated with the submitted application.

23. The system according to claim 22, wherein the information associated with the submitted application includes one or more of the following items:

an application name;
a language type;
a category;
a version;
a rating;
a licensing model; or
a transaction price.

24. The system according to claim 1, wherein the second computing device is further configured to push the submitted application to or pull the submitted application from a testing device.

25. The system according to claim 1, wherein the second computing device is further configured to notify a third computing device that the submitted application has been approved and the third computing device is configured to notify operators of the first application repository and the second application repository of the approval of the submitted application.

26. A method for approving applications, comprising:

presenting a first interface to permit application developers to submit applications for approval for selective publication in a first application repository associated with and under the control of a first client and a second application repository associated with and under the control of a second client;

presenting a second interface to permit the approval of submitted applications for the selective publication in the first application repository and the second application repository;

wherein if a submitted application is approved, notifying the application developer that the submitted application has been approved;

wherein employees of the first client are permitted to download the approved application from the first application repository through first portable computing devices associated with the first client and employees of the second client are permitted to download the approved application from the second application repository through second portable computing devices associated with the second client;

wherein the first portable computing devices associated with the first client are granted access to the first application repository only in response to the receipt of a bundle of the first client at the first portable computing devices and the second portable computing devices associated with the second client are granted access to the second application repository only in response to the receipt of a bundle of the second client at the second portable computing devices.

27. The method according to claim 26, further comprising enabling the upload of applications prior to being submitted for approval.

28. The method according to claim 27, further comprising presenting an uploaded application and information associated with the uploaded application, wherein the information includes one or more of the following items:

an application name;
a language type;
a category;
a version;
a rating;
a licensing model; or
a transaction price.

29. The method according to claim 28, further comprising enabling the selection of the information prior to the uploaded application being submitted for approval.

30. The method according to claim 27, further comprising:
pushing the uploaded application to a testing device; or
pulling the uploaded application from a testing device.

31. The method according to claim 26, further comprising:
enabling a user to permit the rejection of a submitted application; and
notifying the application developer that the submitted application has been rejected.

32. The method according to claim 26, further comprising:
presenting one or more of the submitted applications; and
assigning a status indicator to the presented submitted applications, wherein the status indicator provides information as to the stage of review for approval for a submitted application.

33. The method according to claim 32, wherein once an application is submitted for approval, assigning a status indicator comprises assigning a status indicator to the submitted application that indicates that the application is in a pending state.

34. The method according to claim 32, wherein once a submitted application is approved for publication, assigning a status indicator comprises assigning a status indicator to the approved application that indicates that the application is in an approved state.

35. The method according to claim 32, wherein once an approved application is published in either the first application repository or the second application repository, assigning a status indicator comprises assigning a status indicator to the published application that indicates that the application is in a published state.

36. The method according to claim 32, wherein if a submitted application is rejected for approval for publication, assigning a status indicator comprises assigning a status indicator that indicates that the submitted application is in a rejected state.

37. The method according to claim 32, wherein if an application has been upgraded, assigning a status indicator comprises assigning a status indicator that indicates that the application is upgraded.

38. The method according to claim 37, wherein the upgraded application is a submitted application, a published application or a rejected application.

39. The method according to claim 26, further comprising providing performance data relating to a submitted application once the application is published in the first application repository or the second application repository.

40. The method according to claim 26, further comprising providing cumulative performance data relating to a plurality of published applications in the first application repository or the second application repository.

41. The method according to claim 26, further comprising selectively isolating performance data relating to submitted applications such that access to such performance data is restricted.

42. The method according to claim 26, further comprising:
receiving the submitted application; and
enabling the selection of an approval indicator or a rejection indicator.

43. The method according to claim 42, wherein the submitted application is approved and the method further comprises providing a notification of the approval of the submitted application upon the selection of the approval indicator.

44. The method according to claim 42, further comprising providing a notification of the rejection of a submitted application upon the selection of the rejection indicator.

45. The method according to claim 44, wherein providing a notification of the rejection of the submitted application further comprises providing rejection information when providing notification of the rejection of the submitted application.

46. The system according to claim 26, further comprising:
presenting a third interface that is configured to indicate that the submitted application has been approved; and
notifying operators of the first application repository and the second application repository of the approval of the submitted application.

47. A method for approving applications, comprising:
presenting a first interface that is configured to permit an application developer to submit an application for approval for selective publication in a first application repository associated with and under the control of a first client and in a second application repository associated with and under the control of a second client;
presenting a second interface that is configured to enable the approval of the submitted application;
approving the submitted application;
notifying the application developer that the submitted application has been approved; and notifying a managing entity that the submitted application is available for publication in the first application repository that is assigned to, under the control of and associated with the first client and available for publication in the second application repository that is assigned to, under the control of and associated with the second client;

wherein employees of the first client are permitted to download the approved application from the first application repository through first portable computing devices associated with the first client and employees of the second client are permitted to download the approved application from the second application repository through second portable computing devices associated with the second client;

wherein the first portable computing devices associated with the first client are granted access to the first application repository only in response to the receipt of a bundle of the first client at the first portable computing devices and the second portable computing devices associated with the second client are granted access to the second application repository only in response to the receipt of a bundle of the second client at the second portable computing devices.

48. A computing device for accepting applications for selective publication in multiple application repositories, comprising:

a display that is configured to present one or more applications that are received from an application developer; and a processor that is communicatively coupled to the display, wherein the processor is operable to:

receive a publication command for a submitted application;

in response to the receipt of the publication command, cause the transmission of the submitted application to an approval entity for at least possible publication of the submitted application in a first application repository assigned to and under the control of a first client and in a second application repository assigned to and under the control of a second client;

wherein employees of the first client are permitted to download the application from the first application repository through first portable computing devices associated with the first client once the submitted application is published in the first application repository and employees of the second client are permitted to download the approved application from the second application repository through second portable computing devices associated with the second client once the submitted application is published in the second application repository;

wherein the first portable computing devices associated with the first client are granted access to the first application repository only in response to the receipt of a bundle of the first client at the first portable computing devices and the second portable computing devices associated with the second client are granted access to the second application repository only in response to the receipt of a bundle of the second client at the second portable computing devices.

49. The computing device according to claim 48, wherein the processor is further operable to cause the display of performance data relating to the submitted application once the submitted application is published in the first application repository or the second application repository.

50. The computing device according to claim 48, wherein the processor is further operable to receive a notification that the submitted application has been approved for publication in the first application repository or the second application repository.

51. A method for accepting applications for selective publication in multiple application repositories, comprising:

receiving one or more applications;

receiving a publication command for a submitted application; and in response to the receipt of the publication command, sending the submitted application to an approval entity for at least possible publication of the submitted application in a first application repository assigned to and under the control of a first client and in a second application repository assigned to and under the control of a second client;

wherein employees of the first client are permitted to download the application from the first application repository through first portable computing devices associated with the first client when the submitted application is published in the first application repository and employees of the second client are permitted to download the application from the second application repository through second portable computing devices associated with the second client when the submitted application is published in the second application repository;

wherein the first portable computing devices associated with the first client are granted access to the first application repository only in response to the receipt of a bundle of the first client at the first portable computing devices and the second portable computing devices associated with the second client are granted access to the second application repository only in response to the receipt of a bundle of the second client at the second portable computing devices.

52. The method according to claim 51, further comprising presenting performance data relating to the submitted application once the submitted application is published in the first application repository or the second application repository.

53. The method according to claim 51, further comprising receiving a notification that the submitted application has been approved for publication in the first application repository or the second application repository.

54. A computing device for accepting and approving applications for selective publication in multiple application repositories, comprising:

a display that is configured to present one or more applications that are submitted for approval; and a processor that is communicatively coupled to the display, wherein the processor is operable to:

receive an approval command for a submitted application;

in response to the receipt of the approval command, notifying a managing entity that the submitted application is available for publication in a first application repository assigned to and under the control of a first client and in a second application repository assigned to and under the control of a second client;

wherein employees of the first client are permitted to download the approved application from the first application repository through first portable computing devices associated with the first client and employees of the second client are permitted to download the approved application from the second application repository through second portable computing devices associated with the second client;

wherein the first portable computing devices associated with the first client are granted access to the first application repository only in response to the receipt of a bundle of the first client at the first portable computing devices and the second portable computing devices associated with the second client are granted access to the second application repository only in response to the receipt of a bundle of the second client at the second portable computing devices.

55. The device according to claim 54, wherein the computing device is communicatively coupled to a developer computing device and the processor is further operable to notify the developer computing device when the submitted application has been made available for publication in the first client application repository and the second client application repository.

56. The method according to 55, wherein the processor is further operable to:

receive a rejection command for a submitted application; and in response to the receipt of the rejection command, notify the developer computing device of the rejection of the submitted application.

57. A method for accepting and approving applications for selective publication in multiple application repositories, comprising:

presenting one or more applications that are submitted for approval;

receiving an approval command for a submitted application; and in response to the receipt of the approval command, notifying a managing entity that the submitted application is available for publication in a first application repository assigned to and under the control of a first client and in a second application repository assigned to and under the control of a second client;

wherein employees of the first client are permitted to download the approved application from the first application repository through first portable computing devices associated with the first client and employees of the second client are permitted to download the approved application from the second application repository through second portable computing devices associated with the second client;

wherein the first portable computing devices associated with the first client are granted access to the first application repository only in response to the receipt of a bundle of the first client at the first portable computing devices and the second portable computing devices associated with the second client are granted access to the second application repository only in response to the receipt of a bundle of the second client at the second portable computing devices.

58. The method according to claim 57, further comprising notifying a developer computing device when the submitted application has been made available for publication in the first client application repository and the second client application repository.

59. The method according to claim 58, further comprising:

receiving a rejection command for a submitted application; and in response to the receipt of the rejection command, notifying the developer computing device of the rejection of the submitted application.

60. A computer program product, comprising:

a non-transitory computer readable storage medium having stored thereon computer readable program code that when executed by a system comprising a processor and a memory, causes the system to:

receive one or more applications;

receive a publication command for a submitted application; and in response to the receipt of the publication command, send the submitted application to an approval entity for at least possible publication of the submitted application in a first application repository assigned to and under the control of a first client and in a second application repository assigned to and under the control of a second client;

wherein employees of the first client are permitted to download the application from the first application repository through first portable computing devices associated with the first client when the submitted application is published in the first application repository and employees of the second client are permitted to download the application from the second application repository through second portable computing devices associated with the second client when the submitted application is published in the second application repository;

wherein the first portable computing devices associated with the first client are granted access to the first application repository only in response to the receipt of a bundle of the first client at the first portable computing devices and the second portable computing devices associated with the second client are granted access to the second application repository only in response to the receipt of a bundle of the second client at the second portable computing devices.

61. A computer program product, comprising:

a non-transitory computer readable storage medium having stored thereon computer readable program code that when executed by a system comprising a processor and a memory, causes the system to:

present one or more applications that are submitted for approval;

receive an approval command for a submitted application; and in response to the receipt of the approval command, notify a managing entity that the submitted application is available for publication in a first application repository assigned to and under the control of a first client and in a second application repository assigned to and under the control of a second client;

wherein employees of the first client are permitted to download the approved application from the first application repository through first portable computing devices associated with the first client and employees of the second client are permitted to download the approved application from the second application repository through second portable computing devices associated with the second client;

wherein the first portable computing devices associated with the first client are granted access to the first application repository only in response to the receipt of a bundle of the first client at the first portable computing devices and the second portable computing devices associated with the second client are granted access to the second application repository only in response to the receipt of a bundle of the second client at the second portable computing devices.

* * * * *